US012242702B2

United States Patent

(12) United States Patent
Chang et al.

(10) Patent No.: US 12,242,702 B2
(45) Date of Patent: Mar. 4, 2025

(54) SHARED-CONTENT SESSION USER INTERFACES

(71) Applicant: Apple Inc., Cupertino, CA (US)

(72) Inventors: Jae Woo Chang, Cupertino, CA (US); Elliot A. Barer, Sunnyvale, CA (US); Kaely Coon, San Francisco, CA (US); Craig M. Federighi, Los Altos Hills, CA (US); Kyle William Horn, Chicago, IL (US); Marcel Van Os, Santa Cruz, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/484,899

(22) Filed: Sep. 24, 2021

(65) Prior Publication Data

US 2022/0368742 A1 Nov. 17, 2022

Related U.S. Application Data

(60) Provisional application No. 63/197,445, filed on Jun. 6, 2021, provisional application No. 63/189,156, filed on May 15, 2021.

(51) Int. Cl.

*G06F 3/0481* (2022.01)
*G06F 3/04812* (2022.01)
(Continued)

(52) U.S. Cl.

CPC ........ *G06F 3/0481* (2013.01); *G06F 3/04812* (2013.01); *G06F 3/0484* (2013.01);
(Continued)

(58) Field of Classification Search

CPC ........... H04L 65/4023; H04L 65/00–80; H04L 51/046; H04L 12/1818; H04L 12/1822;
(Continued)

(56) References Cited

U.S. PATENT DOCUMENTS

| | | | |
|---|---|---|---|
| 102,663 | A | 5/1870 | Dillen |
| 4,761,642 | A | 8/1988 | Huntzinger et al. |

(Continued)

FOREIGN PATENT DOCUMENTS

| | | | |
|---|---|---|---|
| AU | 2015100713 A4 | 6/2015 | |
| CA | 2876587 A1 | 2/2014 | |

(Continued)

OTHER PUBLICATIONS

Applicant Initiated Interview Summary received for U.S. Appl. No. 16/859,101, mailed on Nov. 30, 2021, 2 pages.

(Continued)

*Primary Examiner* — Tuyetlien T Tran
*Assistant Examiner* — Jianmei F Duckworth
(74) *Attorney, Agent, or Firm* — DLA Piper LLP (US)

(57) ABSTRACT

The present disclosure generally relates to user interfaces for managing shared-content sessions. In some embodiments, content is shared with a group of users participating in a shared-content session. In some embodiments, the content is screen-share content that is shared from one device to other participants of the shared-content session. In some embodiments, the content is synchronized content for which output of the content is synchronized across the participants of the shared-content session.

57 Claims, 195 Drawing Sheets

(51) Int. Cl.

| | |
|---|---|
| ***G06F 3/0484*** | (2022.01) |
| ***G06F 3/04842*** | (2022.01) |
| ***G06F 3/0488*** | (2022.01) |
| ***G06F 3/14*** | (2006.01) |
| ***H04L 12/18*** | (2006.01) |
| ***H04L 51/046*** | (2022.01) |
| ***H04L 51/066*** | (2022.01) |
| ***H04L 51/10*** | (2022.01) |
| ***H04L 51/214*** | (2022.01) |
| ***H04L 65/1073*** | (2022.01) |
| ***H04L 65/402*** | (2022.01) |
| ***H04L 65/403*** | (2022.01) |
| ***H04L 67/55*** | (2022.01) |

(52) U.S. Cl.

CPC ........ *G06F 3/04842* (2013.01); *G06F 3/0488* (2013.01); *G06F 3/1454* (2013.01); *H04L 12/1818* (2013.01); *H04L 12/1822* (2013.01); *H04L 51/046* (2013.01); *H04L 51/066* (2013.01); *H04L 51/10* (2013.01); *H04L 51/214* (2022.05); *H04L 65/1073* (2013.01); *H04L 65/4025* (2022.05); *H04L 65/403* (2013.01); *H04L 67/55* (2022.05); *G06F 2203/04803* (2013.01)

(58) Field of Classification Search

CPC ..... H04L 51/066; H04L 51/10; H04L 51/214; H04L 65/1073; H04L 65/4025; H04L 65/403; H04L 67/55; H04L 65/1089; G06F 3/0481; G06F 3/0484; G06F 3/04812; G06F 3/04842; G06F 3/0488; G06F 3/1454; G06F 2203/04803; G06F 3/0482; G06F 3/04883; G06F 3/04886

USPC .......................................................... 715/221

See application file for complete search history.

(56) References Cited

U.S. PATENT DOCUMENTS

| | | | |
|---|---|---|---|
| 4,885,704 | A | 12/1989 | Takagi et al. |
| 4,896,291 | A | 1/1990 | Gest et al. |
| 5,140,678 | A | 8/1992 | Torres |
| 5,146,556 | A | 9/1992 | Hullot et al. |
| 5,202,961 | A | 4/1993 | Mills et al. |
| 5,227,771 | A | 7/1993 | Kerr et al. |
| 5,229,852 | A | 7/1993 | Maietta et al. |
| 5,237,653 | A | 8/1993 | Noguchi et al. |
| 5,287,447 | A | 2/1994 | Miller et al. |
| 5,333,256 | A | 7/1994 | Green et al. |
| 5,347,295 | A | 9/1994 | Agulnick et al. |
| 5,384,911 | A | 1/1995 | Bloomfield |
| 5,412,776 | A | 5/1995 | Bloomfield et al. |
| 5,416,895 | A | 5/1995 | Anderson et al. |
| 5,428,730 | A | 6/1995 | Baker et al. |
| 5,463,725 | A | 10/1995 | Henckel et al. |
| 5,487,143 | A | 1/1996 | Southgate |
| 5,499,334 | A | 3/1996 | Staab |
| 5,500,936 | A | 3/1996 | Allen et al. |
| 5,557,724 | A | 9/1996 | Sampat et al. |
| 5,560,022 | A | 9/1996 | Dunstan et al. |
| 5,561,811 | A | 10/1996 | Bier |
| 5,581,670 | A | 12/1996 | Bier et al. |
| 5,583,984 | A | 12/1996 | Conrad et al. |
| 5,617,526 | A | 4/1997 | Oran et al. |
| 5,657,049 | A | 8/1997 | Ludolph et al. |
| 5,659,693 | A | 8/1997 | Hansen et al. |
| 5,721,850 | A | 2/1998 | Farry |
| 5,793,365 | A | 8/1998 | Tang et al. |
| 5,825,357 | A | 10/1998 | Malamud et al. |
| 5,910,882 | A | 6/1999 | Burrell |
| 5,949,432 | A | 9/1999 | Gough et al. |
| 6,025,871 | A | 2/2000 | Kantor et al. |
| 6,166,736 | A | 12/2000 | Hugh |
| 6,215,490 | B1 | 4/2001 | Kaply |
| 6,230,170 | B1 | 5/2001 | Zellweger et al. |
| 6,300,951 | B1 | 10/2001 | Filetto et al. |
| 6,346,962 | B1 | 2/2002 | Goodridge |
| 6,486,895 | B1 | 11/2002 | Robertson et al. |
| 6,493,002 | B1 | 12/2002 | Christensen |
| 6,661,437 | B1 | 12/2003 | Miller et al. |
| 6,726,094 | B1 | 4/2004 | Rantze et al. |
| 6,728,784 | B1 | 4/2004 | Mattaway |
| 6,731,308 | B1 | 5/2004 | Tang et al. |
| 6,768,497 | B2 | 7/2004 | Baar et al. |
| 7,007,241 | B2 | 2/2006 | Boeuf |
| 7,102,663 | B2 | 9/2006 | Crook |
| 7,148,911 | B1 | 12/2006 | Mitsui et al. |
| 7,185,054 | B1 | 2/2007 | Ludwig et al. |
| 7,444,645 | B1 | 10/2008 | St-michel et al. |
| 7,458,014 | B1 | 11/2008 | Rubin et al. |
| 7,506,260 | B2 | 3/2009 | Wada et al. |
| 7,571,014 | B1 | 8/2009 | Lambourne et al. |
| 7,676,767 | B2 | 3/2010 | Hofmeister et al. |
| 7,707,514 | B2 | 4/2010 | Forstall et al. |
| 7,739,622 | B2 | 6/2010 | Deline et al. |
| 7,801,971 | B1 | 9/2010 | Amidon et al. |
| 7,814,112 | B2 | 10/2010 | Gupta et al. |
| 7,840,907 | B2 | 11/2010 | Kikuchi et al. |
| 7,876,996 | B1 | 1/2011 | Herz |
| 7,903,171 | B2 | 3/2011 | Takabatake et al. |
| 7,954,056 | B2 | 5/2011 | Graham |
| 7,982,762 | B2 | 7/2011 | Chatting et al. |
| 8,077,157 | B2 | 12/2011 | Sengupta et al. |
| 8,169,463 | B2 | 5/2012 | Enstad et al. |
| 8,171,137 | B1 | 5/2012 | Parks et al. |
| 8,181,119 | B1 | 5/2012 | Ording |
| RE43,462 | E | 6/2012 | Washino et al. |
| 8,196,061 | B1 | 6/2012 | Bhojan |
| 8,224,894 | B1 | 7/2012 | Parks et al. |
| 8,250,071 | B1 | 8/2012 | Killalea et al. |
| 8,259,153 | B1 | 9/2012 | Campbell et al. |
| 8,260,879 | B2 | 9/2012 | Chan |
| 8,269,739 | B2 | 9/2012 | Hillis et al. |
| 8,274,544 | B2 | 9/2012 | Kurtz et al. |
| 8,290,777 | B1 | 10/2012 | Nguyen et al. |
| 8,291,341 | B2 | 10/2012 | Tseng et al. |
| 8,294,105 | B2 | 10/2012 | Alameh et al. |
| 8,370,448 | B2 | 2/2013 | Galchev |
| 8,427,303 | B1 | 4/2013 | Brady et al. |
| 8,438,504 | B2 | 5/2013 | Cranfill et al. |
| 8,443,280 | B2 | 5/2013 | Noyes |
| 8,462,961 | B1 | 6/2013 | Bywaters et al. |
| 8,478,363 | B2 | 7/2013 | Levien et al. |
| 8,478,816 | B2 | 7/2013 | Parks et al. |
| 8,499,236 | B1 | 7/2013 | Keljo |
| 8,502,856 | B2 | 8/2013 | Jeong et al. |
| 8,566,700 | B2 | 10/2013 | Ueda |
| 8,613,070 | B1 | 12/2013 | Borzycki et al. |
| 8,624,952 | B2 | 1/2014 | Currivan et al. |
| 8,656,040 | B1 | 2/2014 | Bajaj et al. |
| 8,698,845 | B2 | 4/2014 | Lemay et al. |
| 8,718,556 | B2 | 5/2014 | Lee et al. |
| 8,725,880 | B2 | 5/2014 | Santamaria et al. |
| 8,762,844 | B2 | 6/2014 | Kim et al. |
| 8,782,513 | B2 | 7/2014 | Migos et al. |
| 8,806,369 | B2 | 8/2014 | Khoe et al. |
| 8,839,122 | B2 | 9/2014 | Anzures et al. |
| 8,856,105 | B2 | 10/2014 | Gargi |
| 8,914,752 | B1 | 12/2014 | Spiegel |
| 8,949,250 | B1 | 2/2015 | Garg et al. |
| 9,080,736 | B1 | 7/2015 | Salzinger et al. |
| 9,095,779 | B2 | 8/2015 | Chan et al. |
| 9,185,062 | B1 | 11/2015 | Yang et al. |
| 9,253,531 | B2 | 2/2016 | Relyea et al. |
| 9,253,631 | B1 | 2/2016 | White et al. |
| 9,380,264 | B1 | 6/2016 | Vakalapudi |
| 9,417,781 | B2 | 8/2016 | Lee et al. |
| 9,442,516 | B2 | 9/2016 | Migos et al. |
| 9,445,048 | B1 | 9/2016 | Nariyawala et al. |
| 9,462,017 | B1 | 10/2016 | Siracusano, Jr. |

(56) References Cited

U.S. PATENT DOCUMENTS 9,483,175 B2 11/2016 Wagner
9,552,015 B2 1/2017 Capela et al.
9,635,314 B2 4/2017 Barkley et al.
9,639,252 B2 5/2017 Jin et al.
9,781,540 B2 10/2017 Jagannathan et al.
9,787,938 B2 10/2017 Cranfill et al.
9,800,951 B1 10/2017 Carlson et al.
9,819,877 B1 11/2017 Faulkner et al.
9,830,056 B1 11/2017 Keely et al.
9,992,450 B1 6/2018 Yuan et al.
10,025,496 B2 7/2018 Park et al.
10,157,040 B2 12/2018 Ballinger et al.
10,194,189 B1 1/2019 Goetz et al.
10,198,144 B2 2/2019 Munoz et al.
10,270,983 B1 4/2019 Van Os et al.
10,284,812 B1 * 5/2019 Van Os ................ H04N 5/2628
10,300,394 B1 5/2019 Evans et al.
10,339,769 B2 7/2019 Mixter et al.
10,353,532 B1 7/2019 Holz et al.
10,362,272 B1 7/2019 Van Os et al.
10,386,994 B2 8/2019 Singal et al.
10,389,977 B1 8/2019 Van Os et al.
10,410,426 B2 9/2019 Kamini et al.
10,523,625 B1 12/2019 Allen et al.
10,523,976 B2 12/2019 Hemmati et al.
10,534,535 B2 1/2020 Lee et al.
10,645,294 B1 5/2020 Manzari et al.
10,757,366 B1 8/2020 Kwatra et al.
10,771,740 B1 9/2020 Reynolds et al.
10,771,741 B1 9/2020 Reynolds et al.
10,783,883 B2 9/2020 Mixter et al.
10,909,586 B2 2/2021 Avedissian et al.
10,924,446 B1 2/2021 Paul
10,929,099 B2 2/2021 Querze et al.
10,963,145 B1 3/2021 Voss et al.
10,972,655 B1 4/2021 Ostap et al.
11,012,575 B1 5/2021 Leblang et al.
11,024,303 B1 6/2021 Devaraj et al.
11,064,256 B1 7/2021 Voss et al.
11,079,913 B1 8/2021 Kim et al.
11,144,885 B2 10/2021 Rosenberg
11,164,113 B2 11/2021 Howard
11,164,580 B2 11/2021 Kraker
11,176,940 B1 11/2021 Zhong et al.
11,212,449 B1 12/2021 Manzari et al.
11,258,619 B2 2/2022 Libin
11,283,916 B2 3/2022 Coffman et al.
11,290,687 B1 3/2022 Becchetti
11,316,709 B2 4/2022 Brown et al.
11,343,613 B2 5/2022 Gordon et al.
11,360,634 B1 6/2022 Chang et al.
11,449,188 B1 9/2022 Chang et al.
11,523,166 B1 12/2022 Tu et al.
11,671,697 B2 6/2023 O'Leary et al.
11,726,647 B2 8/2023 Kim
12,014,118 B2 6/2024 Gruber et al.
12,085,421 B2 9/2024 Yedid et al.
2001/0030597 A1 10/2001 Inoue et al.
2001/0041007 A1 11/2001 Aoki
2002/0010707 A1 1/2002 Chang et al.
2002/0075334 A1 6/2002 Yfantis
2002/0083101 A1 6/2002 Card et al.
2002/0093531 A1 7/2002 Barile
2002/0101446 A1 8/2002 Tang et al.
2002/0105537 A1 8/2002 Orbanes et al.
2002/0113802 A1 8/2002 Card et al.
2002/0118230 A1 8/2002 Card et al.
2002/0120651 A1 8/2002 Pustejovsky et al.
2003/0013493 A1 1/2003 Irimajiri et al.
2003/0030673 A1 2/2003 Ho
2003/0055977 A1 3/2003 Miller
2003/0076352 A1 4/2003 Uhlig et al.
2003/0098884 A1 5/2003 Christensen
2003/0112938 A1 6/2003 Kanakubo et al.
2003/0158886 A1 8/2003 Walls et al.
2003/0160861 A1 8/2003 Barlow et al.
2003/0184598 A1 10/2003 Graham
2003/0218619 A1 11/2003 Ben-Tovim
2003/0225836 A1 12/2003 Lee et al.
2004/0003040 A1 1/2004 Beavers et al.
2004/0017404 A1 1/2004 Schileru-key
2004/0048601 A1 3/2004 Lee et al.
2004/0048612 A1 3/2004 Virtanen et al.
2004/0080531 A1 4/2004 Berstis
2004/0102225 A1 5/2004 Furuta et al.
2004/0125081 A1 7/2004 Hayakawa
2004/0141016 A1 7/2004 Fukatsu et al.
2004/0174398 A1 9/2004 Luke et al.
2004/0205514 A1 10/2004 Sommerer et al.
2004/0218035 A1 11/2004 Crook
2004/0239763 A1 12/2004 Notea et al.
2005/0015286 A1 1/2005 Rudnik et al.
2005/0099492 A1 5/2005 Orr
2005/0124365 A1 6/2005 Balasuriya et al.
2005/0132281 A1 6/2005 Pan et al.
2005/0144247 A1 6/2005 Christensen et al.
2005/0177798 A1 8/2005 Thomson et al.
2005/0183035 A1 8/2005 Ringel et al.
2005/0223068 A1 10/2005 Shohfi et al.
2005/0233780 A1 10/2005 Jani et al.
2005/0239512 A1 10/2005 Hasegawa et al.
2005/0289482 A1 12/2005 Anthony et al.
2006/0002315 A1 1/2006 Theurer et al.
2006/0002523 A1 1/2006 Bettis et al.
2006/0031776 A1 2/2006 Glein et al.
2006/0033724 A1 2/2006 Chaudhri et al.
2006/0055789 A1 3/2006 Jin et al.
2006/0056837 A1 3/2006 Vapaakoski
2006/0071947 A1 4/2006 Ubillos et al.
2006/0098085 A1 5/2006 Nichols et al.
2006/0098634 A1 5/2006 Umemoto et al.
2006/0101122 A1 5/2006 Ishii
2006/0107226 A1 5/2006 Matthews et al.
2006/0149399 A1 7/2006 Norhammar et al.
2006/0150215 A1 7/2006 Wroblewski et al.
2006/0158730 A1 7/2006 Kira
2006/0184894 A1 8/2006 Daniels et al.
2006/0185005 A1 8/2006 Graves et al.
2006/0230346 A1 10/2006 Bhogal et al.
2006/0256188 A1 11/2006 Mock et al.
2007/0004389 A1 1/2007 Wallace et al.
2007/0004451 A1 1/2007 C. Anderson
2007/0015519 A1 1/2007 Casey
2007/0040898 A1 2/2007 Lee et al.
2007/0064112 A1 3/2007 Chatting et al.
2007/0083828 A1 4/2007 Toriyama et al.
2007/0115349 A1 5/2007 Currivan et al.
2007/0115933 A1 5/2007 Muhamed et al.
2007/0124783 A1 5/2007 Ahiska et al.
2007/0160345 A1 7/2007 Sakai et al.
2007/0174761 A1 7/2007 Lin et al.
2007/0177025 A1 8/2007 Kopet et al.
2007/0177804 A1 8/2007 Elias et al.
2007/0226327 A1 9/2007 Redpath
2007/0233736 A1 10/2007 Xiong et al.
2007/0236476 A1 10/2007 Suzuki
2007/0239831 A1 10/2007 Basu
2007/0245249 A1 10/2007 Weisberg et al.
2007/0264977 A1 11/2007 Zinn et al.
2007/0277121 A1 11/2007 Beckman
2007/0279482 A1 12/2007 Oswald et al.
2007/0291736 A1 12/2007 Furlong et al.
2008/0032704 A1 2/2008 Oneil et al.
2008/0034307 A1 2/2008 Cisler et al.
2008/0036849 A1 2/2008 Oh et al.
2008/0063389 A1 3/2008 Fang et al.
2008/0068447 A1 3/2008 Mattila et al.
2008/0074049 A1 3/2008 Kitai et al.
2008/0074550 A1 3/2008 Park
2008/0084482 A1 4/2008 Hansson et al.
2008/0094368 A1 4/2008 Ording et al.
2008/0094370 A1 4/2008 Ording et al.
2008/0117876 A1 5/2008 Hidaka et al.
2008/0122796 A1 5/2008 Jobs et al.

(56) References Cited

U.S. PATENT DOCUMENTS

2008/0129816 A1 6/2008 Mattila et al.
2008/0129844 A1 6/2008 Cusack et al.
2008/0134033 A1 6/2008 Burns et al.
2008/0141182 A1 6/2008 Barsness et al.
2008/0160974 A1 7/2008 Vartiainen et al.
2008/0165144 A1 7/2008 Forstall et al.
2008/0165388 A1 7/2008 Serlet
2008/0168073 A1 7/2008 Siegel et al.
2008/0174570 A1 7/2008 Jobs et al.
2008/0218535 A1 9/2008 Forstall et al.
2008/0246778 A1 10/2008 Ham et al.
2008/0282202 A1 11/2008 Sunday
2008/0307345 A1 12/2008 Hart et al.
2008/0313257 A1 12/2008 Allen et al.
2008/0313278 A1 12/2008 Hochberg
2008/0316295 A1 12/2008 King et al.
2008/0319856 A1 12/2008 Zito et al.
2008/0319944 A1 12/2008 Venolia et al.
2009/0005011 A1 1/2009 Christie et al.
2009/0007017 A1 1/2009 Anzures et al.
2009/0046075 A1 2/2009 Kim et al.
2009/0049446 A1 2/2009 Merten et al.
2009/0089712 A1 4/2009 Sato
2009/0100383 A1 4/2009 Sunday et al.
2009/0103780 A1 4/2009 Nishihara et al.
2009/0106687 A1 4/2009 De et al.
2009/0109276 A1 4/2009 Kim
2009/0113347 A1 4/2009 Hess et al.
2009/0117936 A1 5/2009 Maeng
2009/0140960 A1 6/2009 Mahowald et al.
2009/0158217 A1 6/2009 Stuart
2009/0164322 A1 6/2009 Khan et al.
2009/0164587 A1 6/2009 Gavita et al.
2009/0174763 A1 7/2009 Bengtsson et al.
2009/0179867 A1 7/2009 Shim et al.
2009/0183125 A1 7/2009 Magal et al.
2009/0187825 A1 7/2009 Sandquist et al.
2009/0213086 A1 8/2009 Chae et al.
2009/0228126 A1 9/2009 Spielberg et al.
2009/0228820 A1 9/2009 Kim et al.
2009/0228825 A1 9/2009 Van Os et al.
2009/0228938 A1* 9/2009 White .................. H04N 21/812
725/87
2009/0232129 A1 9/2009 Wong et al.
2009/0235155 A1 9/2009 Ueda
2009/0235162 A1 9/2009 Nuccio et al.
2009/0241054 A1 9/2009 Hendricks
2009/0249244 A1 10/2009 Robinson et al.
2009/0254867 A1 10/2009 Farouki et al.
2009/0256780 A1 10/2009 Small et al.
2009/0259939 A1 10/2009 Lockett et al.
2009/0262200 A1 10/2009 Takabatake et al.
2009/0262206 A1 10/2009 Park
2009/0271381 A1 10/2009 Beezer et al.
2009/0287790 A1 11/2009 Upton et al.
2009/0305679 A1 12/2009 Kim
2009/0309897 A1 12/2009 Morita et al.
2009/0315841 A1 12/2009 Cheng et al.
2009/0319888 A1 12/2009 Oygard
2010/0009719 A1 1/2010 Oh et al.
2010/0011065 A1 1/2010 Scherpa et al.
2010/0023878 A1 1/2010 Douris et al.
2010/0023883 A1 1/2010 Khazaka et al.
2010/0029255 A1 2/2010 Kim et al.
2010/0039498 A1 2/2010 Liu et al.
2010/0040292 A1 2/2010 Clarkson
2010/0044121 A1 2/2010 Simon et al.
2010/0045616 A1 2/2010 Li et al.
2010/0053212 A1 3/2010 Kang et al.
2010/0066763 A1 3/2010 Macdougall et al.
2010/0073454 A1 3/2010 Lovhaugen et al.
2010/0073455 A1 3/2010 Iwabuchi et al.
2010/0085416 A1 4/2010 Hegde et al.
2010/0087230 A1 4/2010 Peh et al.
2010/0095240 A1 4/2010 Shiplacoff et al.
2010/0097438 A1 4/2010 Ujii
2010/0107078 A1 4/2010 Hayashi
2010/0109864 A1 5/2010 Haartsen et al.
2010/0115388 A1 5/2010 Nguyen
2010/0121636 A1 5/2010 Burke et al.
2010/0125807 A1 5/2010 Easterday et al.
2010/0125816 A1 5/2010 Bezos
2010/0159995 A1 6/2010 Stallings et al.
2010/0162108 A1 6/2010 Stallings et al.
2010/0162171 A1 6/2010 Felt et al.
2010/0169435 A1 7/2010 Osullivan et al.
2010/0174606 A1 7/2010 Hoyle
2010/0175018 A1 7/2010 Petschnigg et al.
2010/0177156 A1 7/2010 Kim et al.
2010/0189096 A1 7/2010 Flynn et al.
2010/0205563 A1 8/2010 Haapsaari et al.
2010/0211872 A1 8/2010 Rolston et al.
2010/0241699 A1 9/2010 Muthukumarasamy et al.
2010/0242066 A1 9/2010 Tseng et al.
2010/0247077 A1 9/2010 Yamamoto et al.
2010/0251119 A1 9/2010 Geppert et al.
2010/0251158 A1 9/2010 Geppert et al.
2010/0262714 A1 10/2010 Hiie
2010/0269039 A1 10/2010 Pahlavan et al.
2010/0281399 A1 11/2010 Banker
2010/0295789 A1 11/2010 Shin et al.
2010/0309284 A1 12/2010 Samadani et al.
2010/0311336 A1 12/2010 Huotari et al.
2010/0318928 A1 12/2010 Neuman et al.
2010/0318939 A1 12/2010 Moon
2010/0333045 A1 12/2010 Guéziec et al.
2011/0007029 A1 1/2011 Ben-david
2011/0010667 A1 1/2011 Sakai et al.
2011/0016417 A1 1/2011 Shiplacoff et al.
2011/0029864 A1 2/2011 Stewart et al.
2011/0029891 A1 2/2011 Kim et al.
2011/0030324 A1 2/2011 Higgins
2011/0032324 A1 2/2011 George et al.
2011/0035662 A1 2/2011 King et al.
2011/0041056 A1 2/2011 Griffin et al.
2011/0041096 A1 2/2011 Larco et al.
2011/0041102 A1 2/2011 Kim
2011/0043652 A1 2/2011 King et al.
2011/0065384 A1 3/2011 Cader et al.
2011/0074824 A1 3/2011 Srinivasan et al.
2011/0085017 A1 4/2011 Robinson et al.
2011/0087431 A1 4/2011 Gupta et al.
2011/0087955 A1 4/2011 Ho et al.
2011/0088086 A1 4/2011 Swink et al.
2011/0091182 A1 4/2011 Look et al.
2011/0096174 A1 4/2011 King et al.
2011/0107216 A1 5/2011 Bi
2011/0107241 A1 5/2011 Moore
2011/0115875 A1 5/2011 Sadwick et al.
2011/0117898 A1 5/2011 Pereira et al.
2011/0126148 A1 5/2011 Krishnaraj et al.
2011/0138295 A1 6/2011 Momchilov et al.
2011/0145068 A1 6/2011 King et al.
2011/0145691 A1 6/2011 Noyes
2011/0145692 A1 6/2011 Noyes et al.
2011/0161836 A1 6/2011 Mu et al.
2011/0164032 A1 7/2011 Shadmi
2011/0164042 A1 7/2011 Chaudhri
2011/0164058 A1 7/2011 Lemay
2011/0167058 A1 7/2011 Van Os
2011/0167339 A1 7/2011 Lemay
2011/0167382 A1 7/2011 Van Os
2011/0178811 A1 7/2011 Sheridan
2011/0179386 A1 7/2011 Shaffer et al.
2011/0191710 A1 8/2011 Jang et al.
2011/0193995 A1 8/2011 Goh et al.
2011/0205333 A1 8/2011 Wu et al.
2011/0209099 A1 8/2011 Hinckley et al.
2011/0209104 A1 8/2011 Hinckley et al.
2011/0227810 A1 9/2011 Mckinney et al.
2011/0234746 A1 9/2011 Saleh et al.
2011/0235549 A1 9/2011 Ahlers et al.
2011/0242356 A1 10/2011 Aleksic et al.
2011/0246944 A1 10/2011 Byrne et al.

(56) References Cited

U.S. PATENT DOCUMENTS

2011/0249073 A1 10/2011 Cranfill et al.
2011/0249074 A1 10/2011 Cranfill et al.
2011/0249086 A1 10/2011 Guo et al.
2011/0252062 A1 10/2011 Hanatani et al.
2011/0252146 A1 10/2011 Santamaria et al.
2011/0252364 A1 10/2011 Anzures et al.
2011/0252368 A1 10/2011 Anzures et al.
2011/0252376 A1 10/2011 Chaudhri et al.
2011/0252377 A1 10/2011 Anzures et al.
2011/0252381 A1 10/2011 Chaudhri
2011/0261030 A1 10/2011 Bullock
2011/0273526 A1 11/2011 Mehin et al.
2011/0275358 A1 11/2011 Faenger
2011/0281568 A1 11/2011 Le
2011/0291945 A1 12/2011 Ewing et al.
2011/0295879 A1 12/2011 Logis et al.
2011/0296163 A1 12/2011 Abernethy et al.
2011/0296333 A1 12/2011 Bateman et al.
2011/0296344 A1 12/2011 Habib et al.
2011/0296351 A1 12/2011 Ewing et al.
2011/0314398 A1 12/2011 Yano et al.
2012/0002001 A1 1/2012 Prentice
2012/0019610 A1 1/2012 Hornyak et al.
2012/0023438 A1 1/2012 Xia et al.
2012/0023462 A1 1/2012 Rosing et al.
2012/0033028 A1 2/2012 Murphy et al.
2012/0054278 A1 3/2012 Taleb et al.
2012/0062784 A1 3/2012 Van et al.
2012/0084644 A1 4/2012 Robert et al.
2012/0092436 A1 4/2012 Pahud et al.
2012/0096069 A1 4/2012 Chan
2012/0096076 A1 4/2012 Chan et al.
2012/0096344 A1 4/2012 Ho et al.
2012/0096386 A1 4/2012 Baumann et al.
2012/0102387 A1 4/2012 Badoiu et al.
2012/0105225 A1 5/2012 Valtonen
2012/0114108 A1 5/2012 Katis et al.
2012/0121185 A1 5/2012 Zavesky
2012/0129496 A1 5/2012 Park et al.
2012/0131470 A1 5/2012 Wessling et al.
2012/0136998 A1 5/2012 Hough et al.
2012/0143694 A1 6/2012 Zargahi et al.
2012/0159364 A1 6/2012 Hyun
2012/0159373 A1 6/2012 Archer et al.
2012/0159380 A1 6/2012 Kocienda et al.
2012/0166950 A1 6/2012 Frumar et al.
2012/0173383 A1* 7/2012 Badawiyeh ........ G06Q 30/0631 705/26.7
2012/0179970 A1 7/2012 Hayes
2012/0182381 A1 7/2012 Abate et al.
2012/0185355 A1 7/2012 Kilroy
2012/0185467 A1 7/2012 Prager et al.
2012/0188394 A1 7/2012 Park et al.
2012/0192068 A1 7/2012 Migos et al.
2012/0192102 A1 7/2012 Migos et al.
2012/0192118 A1 7/2012 Migos et al.
2012/0201479 A1 8/2012 Zhang et al.
2012/0214552 A1 8/2012 Sirpal et al.
2012/0216139 A1 8/2012 Ording et al.
2012/0218304 A1 8/2012 Anzures et al.
2012/0223890 A1 9/2012 Borovsky et al.
2012/0229591 A1 9/2012 Lee
2012/0240085 A1 9/2012 Sim et al.
2012/0266098 A1 10/2012 Webber
2012/0274550 A1 11/2012 Campbell et al.
2012/0284256 A1 11/2012 Mahajan et al.
2012/0284673 A1 11/2012 Lamb et al.
2012/0289217 A1 11/2012 Riemer et al.
2012/0290657 A1 11/2012 Parks et al.
2012/0290943 A1 11/2012 Toney et al.
2012/0293605 A1 11/2012 Seferian et al.
2012/0296972 A1 11/2012 Backer
2012/0304079 A1 11/2012 Rideout et al.
2012/0304111 A1 11/2012 Queru
2012/0320141 A1 12/2012 Bowen et al.
2013/0005487 A1 1/2013 Frazzini et al.
2013/0014040 A1 1/2013 Jagannathan et al.
2013/0019182 A1 1/2013 Gil et al.
2013/0041790 A1 2/2013 Murugesan et al.
2013/0046893 A1 2/2013 Hauser et al.
2013/0050263 A1 2/2013 Khoe et al.
2013/0054697 A1 2/2013 Cha et al.
2013/0055113 A1 2/2013 Chazin et al.
2013/0061155 A1 3/2013 Hon
2013/0061175 A1 3/2013 Matas et al.
2013/0070046 A1 3/2013 Wolf et al.
2013/0080525 A1 3/2013 Aoki et al.
2013/0080923 A1 3/2013 Anzures et al.
2013/0088413 A1 4/2013 Raffle et al.
2013/0102281 A1 4/2013 Kanda et al.
2013/0111342 A1 5/2013 Alameh et al.
2013/0111603 A1 5/2013 Sakai et al.
2013/0120254 A1 5/2013 Mun et al.
2013/0122961 A1 5/2013 Choi et al.
2013/0124207 A1 5/2013 Sarin et al.
2013/0132865 A1 5/2013 Li
2013/0145303 A1 6/2013 Prakash et al.
2013/0151623 A1 6/2013 Weiser et al.
2013/0151959 A1 6/2013 Flynn et al.
2013/0162781 A1 6/2013 Hubner et al.
2013/0166580 A1* 6/2013 Maharajh ............... G06Q 50/01 707/758
2013/0169742 A1 7/2013 Wu et al.
2013/0173699 A1 7/2013 Parks et al.
2013/0185642 A1 7/2013 Gammons
2013/0191911 A1 7/2013 Dellinger et al.
2013/0212212 A1 8/2013 Addepalli et al.
2013/0216206 A1 8/2013 Dubin et al.
2013/0219276 A1 8/2013 Shan
2013/0225140 A1 8/2013 Greisson
2013/0282180 A1 10/2013 Layton
2013/0283199 A1 10/2013 Selig et al.
2013/0283283 A1 10/2013 Wang et al.
2013/0298024 A1 11/2013 Rhee et al.
2013/0318158 A1 11/2013 Teng et al.
2013/0318249 A1 11/2013 Mcdonough et al.
2013/0321340 A1 12/2013 Seo et al.
2013/0325949 A1* 12/2013 Virani ..................... H04L 51/04 709/204
2013/0325967 A1 12/2013 Parks et al.
2013/0328770 A1 12/2013 Parham
2013/0332856 A1 12/2013 Sanders et al.
2013/0332886 A1 12/2013 Cranfill et al.
2014/0013271 A1 1/2014 Moore et al.
2014/0018053 A1 1/2014 Cho et al.
2014/0024340 A1 1/2014 Raleigh
2014/0026074 A1 1/2014 Cortes et al.
2014/0032706 A1 1/2014 Kuscher et al.
2014/0043424 A1 2/2014 Gava et al.
2014/0047020 A1 2/2014 Matus et al.
2014/0047382 A1 2/2014 Kim et al.
2014/0058941 A1 2/2014 Moon et al.
2014/0063176 A1 3/2014 Modai et al.
2014/0068477 A1 3/2014 Roh
2014/0082136 A1 3/2014 Garcia Puga et al.
2014/0099004 A1 4/2014 Dibona et al.
2014/0101597 A1 4/2014 Bamford et al.
2014/0105372 A1 4/2014 Nowack et al.
2014/0108084 A1 4/2014 Bargetzi et al.
2014/0108568 A1 4/2014 Lee
2014/0122730 A1 5/2014 Burch et al.
2014/0136481 A1 5/2014 Quan et al.
2014/0149884 A1 5/2014 Flynn et al.
2014/0165012 A1 6/2014 Shen et al.
2014/0168696 A1 6/2014 Matsuhara et al.
2014/0171064 A1 6/2014 Das
2014/0173447 A1 6/2014 Das et al.
2014/0201126 A1 7/2014 Zadeh et al.
2014/0201632 A1 7/2014 Kunigita et al.
2014/0215356 A1 7/2014 Brander et al.
2014/0215404 A1 7/2014 Kong et al.
2014/0218371 A1 8/2014 Du et al.
2014/0218461 A1 8/2014 Deland
2014/0229835 A1 8/2014 Ravine

(56) References Cited

U.S. PATENT DOCUMENTS

2014/0247368 A1 9/2014 Chinn
2014/0280812 A1 9/2014 Bealkowski et al.
2014/0282103 A1 9/2014 Jerry
2014/0282110 A1 9/2014 Chaudhri
2014/0282208 A1 9/2014 Chaudhri
2014/0282240 A1 9/2014 Flynn et al.
2014/0298253 A1 10/2014 Jin et al.
2014/0320387 A1 10/2014 Eriksson et al.
2014/0320425 A1 10/2014 Jeong et al.
2014/0325447 A1 10/2014 Jin et al.
2014/0331149 A1 11/2014 Labey
2014/0337791 A1 11/2014 Agnetta et al.
2014/0340332 A1 11/2014 Lemay et al.
2014/0349754 A1 11/2014 Kaneoka et al.
2014/0351722 A1 11/2014 Frederickson et al.
2014/0354759 A1 12/2014 Cranfill et al.
2014/0359637 A1 12/2014 Yan
2014/0365929 A1 12/2014 Ding
2014/0368547 A1 12/2014 Elings
2014/0368719 A1 12/2014 Kaneko et al.
2014/0373081 A1 12/2014 Dodson et al.
2014/0375577 A1 12/2014 Yeh et al.
2014/0375747 A1 12/2014 Martinez et al.
2014/0380187 A1 12/2014 Gardenfors et al.
2015/0033149 A1 1/2015 Kuchoor
2015/0040012 A1 2/2015 Faaborg et al.
2015/0049591 A1 2/2015 Adams et al.
2015/0058413 A1 2/2015 Ge
2015/0062158 A1 3/2015 Hildreth et al.
2015/0067541 A1 3/2015 Owens et al.
2015/0070272 A1 3/2015 Kim et al.
2015/0078680 A1 3/2015 Shakib et al.
2015/0085057 A1 3/2015 Ouyang et al.
2015/0095804 A1 4/2015 Grossman et al.
2015/0098309 A1 4/2015 Adams et al.
2015/0106720 A1 4/2015 Backer
2015/0116353 A1 4/2015 Miura et al.
2015/0116363 A1 4/2015 Monte et al.
2015/0128042 A1 5/2015 Churchill et al.
2015/0135098 A1 5/2015 Geppert et al.
2015/0163188 A1 6/2015 Faaborg et al.
2015/0169146 A1 6/2015 Lalwani
2015/0169182 A1 6/2015 Khoe et al.
2015/0177914 A1 6/2015 Coyner et al.
2015/0193069 A1 7/2015 Di Censo et al.
2015/0193196 A1 7/2015 Lin et al.
2015/0193392 A1 7/2015 Greenblatt et al.
2015/0199082 A1 7/2015 Scholler et al.
2015/0205488 A1 7/2015 Yi et al.
2015/0206529 A1 7/2015 Kwon et al.
2015/0248167 A1 9/2015 Turbell et al.
2015/0256796 A1 9/2015 Ma
2015/0264304 A1 9/2015 Chastney et al.
2015/0288868 A1 10/2015 Slavin et al.
2015/0296077 A1 10/2015 Wakeyama et al.
2015/0301338 A1 10/2015 Van Heugten
2015/0304366 A1 10/2015 Bader-natal et al.
2015/0304413 A1 10/2015 Park
2015/0309689 A1 10/2015 Jin et al.
2015/0319006 A1 11/2015 Plummer et al.
2015/0319144 A1 11/2015 Barton et al.
2015/0324067 A1 11/2015 Cabral
2015/0332031 A1 11/2015 Mistry et al.
2015/0334140 A1 11/2015 Singh et al.
2015/0339007 A1 11/2015 Yoshizawa et al.
2015/0339466 A1 11/2015 Gao et al.
2015/0347010 A1 12/2015 Yang et al.
2015/0350143 A1 12/2015 Lemay et al.
2015/0350296 A1 12/2015 Yang et al.
2015/0350297 A1 12/2015 Yang et al.
2015/0350533 A1 12/2015 Harris et al.
2015/0358484 A1 12/2015 Permude
2015/0358584 A1 12/2015 Mattson
2015/0365306 A1* 12/2015 Chaudhri .............. H04L 65/403
715/753
2015/0370426 A1 12/2015 Carrigan et al.
2015/0370529 A1 12/2015 Zambetti et al.
2015/0373065 A1 12/2015 Holmquist et al.
2015/0373178 A1 12/2015 Felt et al.
2016/0014059 A1 1/2016 Rathod
2016/0014477 A1 1/2016 Siders
2016/0021155 A1 1/2016 Sawato
2016/0029004 A1 1/2016 Campbell et al.
2016/0048296 A1 2/2016 Gan et al.
2016/0057173 A1 2/2016 Singman et al.
2016/0059864 A1 3/2016 Feit et al.
2016/0062567 A1 3/2016 Yang et al.
2016/0062589 A1 3/2016 Wan et al.
2016/0065708 A1 3/2016 Yang et al.
2016/0065832 A1 3/2016 Kim et al.
2016/0072861 A1* 3/2016 Woolsey ................. H04W 4/14
455/414.1
2016/0073185 A1 3/2016 Kannappan et al.
2016/0099901 A1 4/2016 Allen et al.
2016/0099987 A1 4/2016 Shamma
2016/0127636 A1 5/2016 Ito et al.
2016/0139785 A1 5/2016 Griffin et al.
2016/0142450 A1 5/2016 Paul et al.
2016/0170608 A1 6/2016 Zambetti et al.
2016/0180259 A1 6/2016 Marianko et al.
2016/0210602 A1 7/2016 Siddique et al.
2016/0212374 A1 7/2016 Usbergo et al.
2016/0227095 A1 8/2016 Yoshizawa et al.
2016/0231902 A1 8/2016 Sirpal et al.
2016/0259528 A1 9/2016 Foss et al.
2016/0261653 A1 9/2016 Kim
2016/0277708 A1 9/2016 Rintel et al.
2016/0277903 A1 9/2016 Poosala et al.
2016/0291824 A1 10/2016 Grossman et al.
2016/0299679 A1 10/2016 Park et al.
2016/0306328 A1 10/2016 Ko et al.
2016/0306422 A1 10/2016 Parham et al.
2016/0306504 A1 10/2016 Brunsch et al.
2016/0308920 A1 10/2016 Brunsch et al.
2016/0316038 A1 10/2016 Jolfaei
2016/0320849 A1 11/2016 Koo
2016/0327911 A1 11/2016 Eim et al.
2016/0335041 A1 11/2016 Wachter et al.
2016/0352661 A1 12/2016 Yang et al.
2016/0364106 A1 12/2016 Koum et al.
2016/0380780 A1 12/2016 Stephenson et al.
2017/0006162 A1 1/2017 Bargetzi et al.
2017/0024100 A1 1/2017 Pieper et al.
2017/0024226 A1 1/2017 Yan
2017/0031557 A1 2/2017 Xiangli et al.
2017/0034583 A1 2/2017 Long et al.
2017/0048817 A1 2/2017 Yang et al.
2017/0064184 A1 3/2017 Tsai
2017/0083189 A1 3/2017 Yang et al.
2017/0094019 A1 3/2017 Ahmed et al.
2017/0097621 A1 4/2017 Ackmann et al.
2017/0111587 A1 4/2017 Herbst et al.
2017/0111595 A1 4/2017 Soni et al.
2017/0126592 A1 5/2017 El
2017/0150904 A1 6/2017 Park et al.
2017/0206779 A1 7/2017 Lee et al.
2017/0212667 A1 7/2017 Miyazaki
2017/0220212 A1 8/2017 Yang et al.
2017/0230585 A1 8/2017 Nash et al.
2017/0230705 A1 8/2017 Pardue et al.
2017/0244932 A1 8/2017 Pistilli et al.
2017/0280494 A1 9/2017 Jung et al.
2017/0309174 A1 10/2017 Gonzales et al.
2017/0324784 A1 11/2017 Taine et al.
2017/0336960 A1 11/2017 Chaudhri et al.
2017/0344253 A1 11/2017 Zhang
2017/0353508 A1 12/2017 Yoakum
2017/0357382 A1 12/2017 Miura et al.
2017/0357425 A1 12/2017 Smith et al.
2017/0357434 A1 12/2017 Coffman et al.
2017/0357917 A1 12/2017 Holmes et al.
2017/0359191 A1 12/2017 Smith et al.
2017/0359285 A1* 12/2017 Weinig .................... H04W 4/12
2017/0359461 A1 12/2017 De Vries et al.

(56) References Cited

U.S. PATENT DOCUMENTS

2017/0367484 A1 12/2017 Salvoni et al.
2017/0371496 A1 12/2017 Denoue et al.
2017/0373868 A1 12/2017 Deets, Jr.
2018/0013799 A1 1/2018 Davies
2018/0020530 A1 1/2018 Scordato et al.
2018/0047200 A1 2/2018 O'hara et al.
2018/0048820 A1 2/2018 Hinkel et al.
2018/0061158 A1 3/2018 Greene
2018/0070144 A1 3/2018 Tang et al.
2018/0081522 A1 3/2018 Greenberg et al.
2018/0081538 A1 3/2018 Kim
2018/0091732 A1 3/2018 Wilson et al.
2018/0095616 A1* 4/2018 Valdivia .................. G06F 3/013
2018/0101297 A1 4/2018 Yang et al.
2018/0103074 A1 4/2018 Rosenberg
2018/0123986 A1 5/2018 Faulkner et al.
2018/0124128 A1 5/2018 Faulkner et al.
2018/0124359 A1 5/2018 Faulkner
2018/0131732 A1 5/2018 Aronoff et al.
2018/0139374 A1 5/2018 Yu
2018/0150433 A1 5/2018 Sowden et al.
2018/0157455 A1 6/2018 Troy et al.
2018/0160072 A1 6/2018 Cranfill et al.
2018/0191965 A1 7/2018 Faulkner et al.
2018/0199164 A1 7/2018 Bargetzi et al.
2018/0203577 A1 7/2018 Astavans et al.
2018/0204111 A1 7/2018 Zadeh et al.
2018/0205797 A1 7/2018 Faulkner
2018/0213144 A1 7/2018 Kim et al.
2018/0213396 A1 7/2018 Segal et al.
2018/0227341 A1 8/2018 Rizzi
2018/0228003 A1 8/2018 O'driscoll et al.
2018/0228006 A1 8/2018 Baker et al.
2018/0249047 A1 8/2018 Marlatt
2018/0253152 A1 9/2018 Forsblom et al.
2018/0267774 A1 9/2018 Williams et al.
2018/0286395 A1 10/2018 Li et al.
2018/0288104 A1 10/2018 Padilla et al.
2018/0293959 A1 10/2018 Monga et al.
2018/0295079 A1 10/2018 Longo
2018/0308480 A1 10/2018 Jang et al.
2018/0309801 A1 10/2018 Rathod
2018/0321842 A1 11/2018 Lee et al.
2018/0329586 A1 11/2018 Sundstrom et al.
2018/0332559 A1 11/2018 Gudivada et al.
2018/0338038 A1 11/2018 Ly et al.
2018/0341448 A1 11/2018 Behzadi et al.
2018/0348764 A1 12/2018 Zhang et al.
2018/0359293 A1* 12/2018 Faulkner ............... H04L 65/403
2018/0364665 A1 12/2018 Clymer et al.
2018/0367483 A1 12/2018 Rodriguez et al.
2018/0367484 A1 12/2018 Rodriguez et al.
2018/0375676 A1 12/2018 Bader-Natal et al.
2019/0005419 A1 1/2019 Howard
2019/0025943 A1 1/2019 Jobs et al.
2019/0028419 A1 1/2019 Sullivan
2019/0034849 A1 1/2019 Romaine et al.
2019/0068670 A1 2/2019 Adam et al.
2019/0102049 A1* 4/2019 Anzures ................ G06F 3/0488
2019/0102145 A1 4/2019 Wilberding et al.
2019/0110087 A1 4/2019 Parasseeri et al.
2019/0124021 A1 4/2019 Demattei
2019/0138951 A1 5/2019 Brownhill et al.
2019/0149768 A1 5/2019 McArdle
2019/0149887 A1 5/2019 Williams et al.
2019/0173939 A1 6/2019 Lewis et al.
2019/0199963 A1 6/2019 Ahn et al.
2019/0199993 A1 6/2019 Babu J D et al.
2019/0205861 A1 7/2019 Bace
2019/0208028 A1 7/2019 Larabie-Belanger
2019/0222775 A1 7/2019 Ahn
2019/0228495 A1 7/2019 Tremblay et al.
2019/0236142 A1 8/2019 Balakrishnan et al.
2019/0279634 A1 9/2019 Tak et al.
2019/0297039 A1 9/2019 Rodriguez et al.
2019/0303861 A1 10/2019 Mathias et al.
2019/0332400 A1 10/2019 Spoor et al.
2019/0339769 A1 11/2019 Cox et al.
2019/0339825 A1 11/2019 Anzures et al.
2019/0342507 A1 11/2019 Dye et al.
2019/0342519 A1 11/2019 Van Os et al.
2019/0342621 A1 11/2019 Carrigan et al.
2019/0347181 A1 11/2019 Cranfill et al.
2019/0354252 A1 11/2019 Badr
2019/0361575 A1 11/2019 Ni et al.
2019/0361694 A1 11/2019 Gordon et al.
2019/0362555 A1 11/2019 Chen et al.
2019/0370805 A1* 12/2019 Van Os ................... H04W 4/80
2020/0005539 A1 1/2020 Hwang et al.
2020/0034033 A1 1/2020 Chaudhri et al.
2020/0050502 A1 2/2020 Ghafourifar et al.
2020/0055515 A1 2/2020 Herman et al.
2020/0059628 A1 2/2020 Cranfill et al.
2020/0106952 A1 4/2020 Missig et al.
2020/0106965 A1 4/2020 Malia et al.
2020/0112690 A1 4/2020 Harrison et al.
2020/0127988 A1 4/2020 Bradley et al.
2020/0135191 A1 4/2020 Nourbakhsh
2020/0142667 A1 5/2020 Querze et al.
2020/0143593 A1 5/2020 Rudman et al.
2020/0152186 A1 5/2020 Koh et al.
2020/0183548 A1 6/2020 Anzures et al.
2020/0186378 A1 6/2020 Six et al.
2020/0186576 A1 6/2020 Gopal et al.
2020/0195887 A1 6/2020 Van Os et al.
2020/0213530 A1 7/2020 Ahn
2020/0226896 A1 7/2020 Robertson et al.
2020/0242788 A1 7/2020 Jacobs et al.
2020/0274726 A1 8/2020 Setteboun et al.
2020/0279279 A1 9/2020 Chaudhuri
2020/0296329 A1 9/2020 Tang et al.
2020/0302913 A1 9/2020 Marcinkiewicz
2020/0312318 A1 10/2020 Olson et al.
2020/0322479 A1 10/2020 De Vries et al.
2020/0335187 A1 10/2020 Lefkofsky et al.
2020/0356063 A1 11/2020 Guzman et al.
2020/0383157 A1 12/2020 Lee et al.
2020/0385116 A1 12/2020 Sabripour et al.
2020/0395012 A1 12/2020 Kim et al.
2020/0400957 A1 12/2020 Van Heugten
2021/0043189 A1 2/2021 Pyun
2021/0064317 A1 3/2021 Juenger et al.
2021/0065134 A1 3/2021 Chhabra et al.
2021/0096703 A1 4/2021 Anzures et al.
2021/0097768 A1 4/2021 Malia et al.
2021/0099829 A1 4/2021 Soto et al.
2021/0136129 A1 5/2021 Ponnusamy et al.
2021/0144336 A1 5/2021 Van Os et al.
2021/0152503 A1 5/2021 Rodriguez et al.
2021/0158622 A1 5/2021 Leelaphattarakij et al.
2021/0158830 A1 5/2021 Boehlke
2021/0176204 A1 6/2021 Geppert et al.
2021/0182169 A1 6/2021 Mardente et al.
2021/0195084 A1 6/2021 Olajos et al.
2021/0203878 A1 7/2021 Lee et al.
2021/0217106 A1 7/2021 Hauser et al.
2021/0265032 A1 8/2021 Burgess et al.
2021/0266274 A1 8/2021 Liu et al.
2021/0306288 A1 9/2021 Boyd et al.
2021/0321197 A1 10/2021 Annamraju
2021/0323406 A1 10/2021 So et al.
2021/0333864 A1 10/2021 Harvey et al.
2021/0349680 A1 11/2021 Kim et al.
2021/0352172 A1 11/2021 Kim et al.
2021/0360192 A1 11/2021 Cranfill et al.
2021/0360199 A1 11/2021 Oz et al.
2021/0373672 A1 12/2021 Schwarz et al.
2021/0409359 A1* 12/2021 Eirinberg .............. H04L 51/046
2022/0004356 A1 1/2022 Kim et al.
2022/0006946 A1 1/2022 Missig et al.
2022/0021680 A1 1/2022 Roedel et al.
2022/0046186 A1 2/2022 Fayad et al.
2022/0046222 A1 2/2022 Meier
2022/0050578 A1 2/2022 Waldman et al.

(56) References Cited

U.S. PATENT DOCUMENTS

2022/0053142 A1 2/2022 Manzari et al.
2022/0100362 A1 3/2022 Kim
2022/0100812 A1 3/2022 Anvaripour et al.
2022/0103784 A1 3/2022 Pollefeys
2022/0122089 A1* 4/2022 Bonilla Kuhlmann ..................... G06K 7/1417
2022/0163996 A1 5/2022 Yang et al.
2022/0180862 A1 6/2022 Sharifi et al.
2022/0207840 A1 6/2022 Cansizoglu et al.
2022/0244836 A1 8/2022 O'leary et al.
2022/0247587 A1 8/2022 Rolin et al.
2022/0247918 A1 8/2022 O'leary et al.
2022/0247919 A1 8/2022 O'leary et al.
2022/0253136 A1 8/2022 Holder et al.
2022/0254074 A1 8/2022 Berliner et al.
2022/0263940 A1 8/2022 De Vries et al.
2022/0269882 A1 8/2022 Proschowsky et al.
2022/0278992 A1* 9/2022 Baker .................. H04L 63/105
2022/0286314 A1 9/2022 Meyer et al.
2022/0303150 A1 9/2022 Jensen et al.
2022/0343569 A1 10/2022 Karri et al.
2022/0365643 A1 11/2022 Triverio et al.
2022/0365739 A1 11/2022 Chang et al.
2022/0365740 A1 11/2022 Chang et al.
2022/0368548 A1 11/2022 Chang et al.
2022/0368659 A1 11/2022 Chang et al.
2022/0374136 A1 11/2022 Chang et al.
2023/0004264 A1 1/2023 Anzures et al.
2023/0041125 A1 2/2023 Kim et al.
2023/0094453 A1 3/2023 O'leary et al.
2023/0098395 A1 3/2023 O'leary et al.
2023/0109787 A1 4/2023 O'leary et al.
2023/0143275 A1 5/2023 Opara et al.
2023/0188674 A1 6/2023 Van Os et al.
2023/0213764 A1 7/2023 Arngren et al.
2023/0246857 A1 8/2023 Boucheron et al.
2023/0262196 A1 8/2023 Cranfill et al.
2023/0262317 A1 8/2023 O'leary et al.
2023/0319413 A1 10/2023 Manzari et al.
2023/0370507 A1 11/2023 Chang et al.
2023/0393616 A1 12/2023 Chao et al.
2024/0036804 A1 2/2024 Chang et al.
2024/0064270 A1 2/2024 Van Os et al.
2024/0064395 A1 2/2024 O'Leary et al.
2024/0103677 A1 3/2024 Mckenzie et al.
2024/0103678 A1 3/2024 Dryer et al.
2024/0104819 A1 3/2024 Chand et al.
2024/0111333 A1 4/2024 Yang et al.
2024/0118793 A1 4/2024 Triverio et al.
2024/0163365 A1 5/2024 De Vries et al.
2024/0259669 A1 8/2024 Missig et al.

FOREIGN PATENT DOCUMENTS

CA 2845537 A1 9/2014
CN 1473430 A 2/2004
CN 1525723 A 9/2004
CN 1658150 A 8/2005
CN 1689327 A 10/2005
CN 1801926 A 7/2006
CN 1890996 A 1/2007
CN 1918533 A 2/2007
CN 1985319 A 6/2007
CN 101075173 A 11/2007
CN 101226444 A 7/2008
CN 101296356 A 10/2008
CN 101356493 A 1/2009
CN 101409743 A 4/2009
CN 101431564 A 5/2009
CN 101535938 A 9/2009
CN 101566866 A 10/2009
CN 101682622 A 3/2010
CN 101828166 A 9/2010
CN 101853132 A 10/2010
CN 101854247 A 10/2010
CN 101854261 A 10/2010
CN 101917529 A 12/2010
CN 102215217 A 10/2011
CN 102262506 A 11/2011
CN 102439558 A 5/2012
CN 102572369 A 7/2012
CN 102651731 A 8/2012
CN 102707994 A 10/2012
CN 102750086 A 10/2012
CN 103039064 A 4/2013
CN 103222247 A 7/2013
CN 103237191 A 8/2013
CN 103250138 A 8/2013
CN 103336651 A 10/2013
CN 103384235 A 11/2013
CN 103442774 A 12/2013
CN 103458215 A 12/2013
CN 103582873 A 2/2014
CN 103649985 A 3/2014
CN 103718152 A 4/2014
CN 103748610 A 4/2014
CN 103765385 A 4/2014
CN 104010158 A 8/2014
CN 104081335 A 10/2014
CN 104182123 A 12/2014
CN 104270597 A 1/2015
CN 104427288 A 3/2015
CN 104469143 A 3/2015
CN 104602133 A 5/2015
CN 104834439 A 8/2015
CN 104869046 A 8/2015
CN 104980578 A 10/2015
CN 105094551 A 11/2015
CN 105094957 A 11/2015
CN 105141498 A 12/2015
CN 105204846 A 12/2015
CN 105264473 A 1/2016
CN 105308634 A 2/2016
CN 105389173 A 3/2016
CN 105391778 A 3/2016
CN 105554429 A 5/2016
CN 105578111 A 5/2016
CN 105637451 A 6/2016
CN 105900376 A 8/2016
CN 106210855 A 12/2016
CN 106303648 A 1/2017
CN 106471793 A 3/2017
CN 106713946 A 5/2017
CN 106843626 A 6/2017
CN 107066523 A 8/2017
CN 107122049 A 9/2017
CN 107491257 A 12/2017
CN 107533417 A 1/2018
CN 107534656 A 1/2018
CN 107704177 A 2/2018
CN 107728876 A 2/2018
CN 104025538 B 4/2018
CN 107992248 A 5/2018
CN 108933965 A 12/2018
CN 109196825 A 1/2019
CN 110456971 A 11/2019
CN 111108740 A 5/2020
CN 111601065 A 8/2020
CN 112088530 A 12/2020
CN 112214275 A 1/2021
CN 112261338 A 1/2021
CN 112416223 A 2/2021
EP 0483777 A2 5/1992
EP 0584392 A1 3/1994
EP 1215575 A2 6/2002
EP 1517228 A2 3/2005
EP 1562105 A2 8/2005
EP 1568966 A2 8/2005
EP 1760584 A1 3/2007
EP 1903791 A2 3/2008
EP 1986431 A2 10/2008
EP 2056568 A1 5/2009
EP 2151745 A2 2/2010

(56) References Cited

FOREIGN PATENT DOCUMENTS

| | | | |
|---|---|---|---|
| EP | 2237536 | A1 | 10/2010 |
| EP | 2600584 | A1 | 6/2013 |
| EP | 2682850 | A1 | 1/2014 |
| EP | 2703974 | A1 | 3/2014 |
| EP | 2725473 | A1 | 4/2014 |
| EP | 2770708 | A1 | 8/2014 |
| EP | 2446619 | B1 | 10/2015 |
| EP | 3038427 | A1 | 6/2016 |
| EP | 3091421 | A2 | 11/2016 |
| EP | 2761582 | B1 | 3/2017 |
| EP | 2258103 | B1 | 5/2018 |
| EP | 3163866 | B1 | 5/2020 |
| EP | 4109891 | A1 | 12/2022 |
| IN | 1038/MUM/2005 | | 6/2007 |
| JP | 6-110881 | A | 4/1994 |
| JP | 6-113297 | A | 4/1994 |
| JP | 6-276335 | A | 9/1994 |
| JP | 6-276515 | A | 9/1994 |
| JP | 7-135594 | A | 5/1995 |
| JP | 7-325700 | A | 12/1995 |
| JP | 8-76926 | A | 3/1996 |
| JP | 9-182046 | A | 7/1997 |
| JP | 9-233384 | A | 9/1997 |
| JP | 9-247655 | A | 9/1997 |
| JP | 9-265457 | A | 10/1997 |
| JP | 10-240488 | A | 9/1998 |
| JP | 2000-40158 | A | 2/2000 |
| JP | 2000-200092 | A | 7/2000 |
| JP | 2000-242390 | A | 9/2000 |
| JP | 2000-283772 | A | 10/2000 |
| JP | 2001-67099 | A | 3/2001 |
| JP | 2001-101202 | A | 4/2001 |
| JP | 2001-169166 | A | 6/2001 |
| JP | 2002-251365 | A | 9/2002 |
| JP | 2002-288125 | A | 10/2002 |
| JP | 2002-320140 | A | 10/2002 |
| JP | 2002-351802 | A | 12/2002 |
| JP | 2003-101981 | A | 4/2003 |
| JP | 2003-134382 | A | 5/2003 |
| JP | 2003-189168 | A | 7/2003 |
| JP | 2003-195998 | A | 7/2003 |
| JP | 2003-274376 | A | 9/2003 |
| JP | 2003-526820 | A | 9/2003 |
| JP | 2003-299050 | A | 10/2003 |
| JP | 2003-348444 | A | 12/2003 |
| JP | 2004-187273 | A | 7/2004 |
| JP | 2004-193860 | A | 7/2004 |
| JP | 2004-221738 | A | 8/2004 |
| JP | 2005-45744 | A | 2/2005 |
| JP | 2005-94696 | A | 4/2005 |
| JP | 2005-159567 | A | 6/2005 |
| JP | 2005-222553 | A | 8/2005 |
| JP | 2005-260289 | A | 9/2005 |
| JP | 2005-286445 | A | 10/2005 |
| JP | 2005-303736 | A | 10/2005 |
| JP | 2005-332368 | A | 12/2005 |
| JP | 2006-135495 | A | 5/2006 |
| JP | 2006-166414 | A | 6/2006 |
| JP | 2006-222822 | A | 8/2006 |
| JP | 2006-245732 | A | 9/2006 |
| JP | 2006-246019 | A | 9/2006 |
| JP | 2006-254350 | A | 9/2006 |
| JP | 2006-319742 | A | 11/2006 |
| JP | 2007-88630 | A | 4/2007 |
| JP | 2007-140060 | A | 6/2007 |
| JP | 2007-150877 | A | 6/2007 |
| JP | 2007-150921 | A | 6/2007 |
| JP | 2007-517462 | A | 6/2007 |
| JP | 2007-200329 | A | 8/2007 |
| JP | 2007-201727 | A | 8/2007 |
| JP | 2007-274034 | A | 10/2007 |
| JP | 2007-282263 | A | 10/2007 |
| JP | 2007-300452 | A | 11/2007 |
| JP | 2008-17373 | A | 1/2008 |
| JP | 2008-28586 | A | 2/2008 |
| JP | 2008-76818 | A | 4/2008 |
| JP | 2008-76853 | A | 4/2008 |
| JP | 2008-99330 | A | 4/2008 |
| JP | 2008-125105 | A | 5/2008 |
| JP | 2008-136119 | A | 6/2008 |
| JP | 2008-533838 | A | 8/2008 |
| JP | 2008-276801 | A | 11/2008 |
| JP | 2008-289014 | A | 11/2008 |
| JP | 2009-502048 | A | 1/2009 |
| JP | 2009-80710 | A | 4/2009 |
| JP | 2009-159253 | A | 7/2009 |
| JP | 2009-188975 | A | 8/2009 |
| JP | 2009-217815 | A | 9/2009 |
| JP | 2009-232290 | A | 10/2009 |
| JP | 2009-265692 | A | 11/2009 |
| JP | 2009-296577 | A | 12/2009 |
| JP | 2009-296583 | A | 12/2009 |
| JP | 2010-15239 | A | 1/2010 |
| JP | 2010-97353 | A | 4/2010 |
| JP | 2010-511939 | A | 4/2010 |
| JP | 2010-109789 | A | 5/2010 |
| JP | 2010-522935 | A | 7/2010 |
| JP | 2010-245940 | A | 10/2010 |
| JP | 2010-541398 | A | 12/2010 |
| JP | 2011-118662 | A | 6/2011 |
| JP | 2012-168966 | A | 9/2012 |
| JP | 2012-215938 | A | 11/2012 |
| JP | 2012-244340 | | 12/2012 |
| JP | 2013-25357 | A | 2/2013 |
| JP | 2013-74499 | A | 4/2013 |
| JP | 2013-93699 | A | 5/2013 |
| JP | 2013-105468 | A | 5/2013 |
| JP | 2013-524683 | A | 6/2013 |
| JP | 2013-530433 | A | 7/2013 |
| JP | 2013-191065 | A | 9/2013 |
| JP | 2014-503861 | A | 2/2014 |
| JP | 2014-44724 | A | 3/2014 |
| JP | 2014-71835 | A | 4/2014 |
| JP | 2014-87126 | A | 5/2014 |
| JP | 2014-512044 | A | 5/2014 |
| JP | 2014-170982 | A | 9/2014 |
| JP | 2015-11507 | A | 1/2015 |
| JP | 2015-520456 | A | 7/2015 |
| JP | 2015-170234 | A | 9/2015 |
| JP | 2015-201087 | A | 11/2015 |
| JP | 2016-1446 | A | 1/2016 |
| JP | 2016-24557 | A | 2/2016 |
| JP | 2016-38615 | A | 3/2016 |
| JP | 2016-53929 | | 4/2016 |
| JP | 2016-157292 | A | 9/2016 |
| JP | 2016-167806 | A | 9/2016 |
| JP | 2016-174282 | A | 9/2016 |
| JP | 2017-532645 | A | 11/2017 |
| JP | 2017-228843 | A | 12/2017 |
| JP | 2017-229060 | A | 12/2017 |
| JP | 2018-7158 | A | 1/2018 |
| JP | 2018-56719 | A | 4/2018 |
| JP | 2018-136828 | A | 8/2018 |
| JP | 2018-200624 | A | 12/2018 |
| JP | 2019-114282 | A | 7/2019 |
| JP | 2020-510929 | | 4/2020 |
| JP | 2021-40300 | A | 3/2021 |
| KR | 1997-0031883 | A | 6/1997 |
| KR | 1999-0044201 | A | 6/1999 |
| KR | 10-2004-0016688 | A | 2/2004 |
| KR | 10-2004-0045338 | A | 6/2004 |
| KR | 10-2005-0054684 | A | 6/2005 |
| KR | 10-2006-0031959 | A | 4/2006 |
| KR | 10-2006-0064326 | A | 6/2006 |
| KR | 10-2006-0116902 | A | 11/2006 |
| KR | 10-2007-0111270 | A | 11/2007 |
| KR | 10-2008-0057326 | A | 6/2008 |
| KR | 10-2008-0096042 | A | 10/2008 |
| KR | 10-2009-0002641 | A | 1/2009 |
| KR | 10-2009-0004176 | A | 1/2009 |
| KR | 10-2009-0017901 | A | 2/2009 |
| KR | 10-2009-0017906 | A | 2/2009 |
| KR | 10-2009-0036226 | A | 4/2009 |
| KR | 10-2009-0042499 | A | 4/2009 |

(56) References Cited

FOREIGN PATENT DOCUMENTS

| | | | |
|---|---|---|---|
| KR | 10-0891449 | B1 | 4/2009 |
| KR | 10-2009-0122805 | A | 12/2009 |
| KR | 10-2009-0126516 | A | 12/2009 |
| KR | 10-2012-0003323 | A | 1/2012 |
| KR | 10-2012-0088746 | A | 8/2012 |
| KR | 10-2012-0100433 | A | 9/2012 |
| KR | 10-2013-0063019 | A | 6/2013 |
| KR | 10-2013-0075783 | A | 7/2013 |
| KR | 10-2013-0082190 | A | 7/2013 |
| KR | 10-2013-0141688 | A | 12/2013 |
| KR | 10-2014-0016244 | A | 2/2014 |
| KR | 10-2014-0026263 | A | 3/2014 |
| KR | 10-2014-0043370 | A | 4/2014 |
| KR | 10-2016-0092820 | A | 8/2016 |
| KR | 10-2017-0128498 | A | 11/2017 |
| KR | 10-2018-0085931 | A | 7/2018 |
| KR | 10-2019-0033082 | A | 3/2019 |
| KR | 10-1989433 | B1 | 6/2019 |
| KR | 10-2020-0039030 | A | 4/2020 |
| TV | 201416959 | A | 5/2014 |
| TW | I321955 | B | 3/2010 |
| TW | 201415345 | A | 4/2014 |
| WO | 01/18665 | A1 | 3/2001 |
| WO | 02/11022 | A2 | 2/2002 |
| WO | 2003/077553 | A1 | 9/2003 |
| WO | 2004/032507 | A1 | 4/2004 |
| WO | 2005/060501 | A2 | 7/2005 |
| WO | 2005/086159 | A2 | 9/2005 |
| WO | 2005/109829 | A1 | 11/2005 |
| WO | 2006/048028 | A1 | 5/2006 |
| WO | 2006/063343 | A2 | 6/2006 |
| WO | 2006/073020 | A1 | 7/2006 |
| WO | 2007/002621 | A2 | 1/2007 |
| WO | 2007/008321 | A2 | 1/2007 |
| WO | 2007/063922 | A1 | 6/2007 |
| WO | 2007/102110 | A2 | 9/2007 |
| WO | 2008/030779 | A2 | 3/2008 |
| WO | 2008/030879 | A2 | 3/2008 |
| WO | 2008/040566 | A1 | 4/2008 |
| WO | 2008/067498 | A2 | 6/2008 |
| WO | 2008/090902 | A1 | 7/2008 |
| WO | 2009/005914 | A1 | 1/2009 |
| WO | 2009/042579 | A1 | 4/2009 |
| WO | 2009/042759 | A1 | 4/2009 |
| WO | 2009/143076 | A2 | 11/2009 |
| WO | 2009/148781 | A1 | 12/2009 |
| WO | 2010/001672 | A1 | 1/2010 |
| WO | 2010/134729 | A2 | 11/2010 |
| WO | 2010/137513 | A1 | 12/2010 |
| WO | 2011/126502 | A1 | 10/2011 |
| WO | 2011/126505 | A1 | 10/2011 |
| WO | 2011/146605 | A1 | 11/2011 |
| WO | 2011/146839 | A1 | 11/2011 |
| WO | 2011/161145 | A1 | 12/2011 |
| WO | 2012/028773 | A1 | 3/2012 |
| WO | 2012/037170 | A1 | 3/2012 |
| WO | 2012/051052 | A1 | 4/2012 |
| WO | 2012/079530 | A1 | 6/2012 |
| WO | 2012/087939 | A1 | 6/2012 |
| WO | 2012/103117 | A1 | 8/2012 |
| WO | 2012/126078 | A1 | 9/2012 |
| WO | 2012/154748 | A1 | 11/2012 |
| WO | 2012/170118 | A1 | 12/2012 |
| WO | 2012/170446 | A2 | 12/2012 |
| WO | 2013/097896 | A1 | 7/2013 |
| WO | 2013/114821 | A1 | 8/2013 |
| WO | 2013/132144 | A1 | 9/2013 |
| WO | 2013/173838 | A2 | 11/2013 |
| WO | 2014/052871 | A1 | 4/2014 |
| WO | 2014/058937 | A1 | 4/2014 |
| WO | 2014/077987 | A1 | 5/2014 |
| WO | 2014/168616 | A1 | 10/2014 |
| WO | 2014/197279 | A1 | 12/2014 |
| WO | 2014/200730 | A1 | 12/2014 |
| WO | 2015/192085 | A2 | 12/2015 |
| WO | 2016/022204 | A1 | 2/2016 |
| WO | 2016/168154 | A1 | 10/2016 |
| WO | 2017/218143 | A1 | 12/2017 |
| WO | 2017/218153 | A1 | 12/2017 |
| WO | 2018/057272 | A1 | 3/2018 |
| WO | 2018/213401 | A1 | 11/2018 |
| WO | 2018/213415 | A1 | 11/2018 |
| WO | 2018/213844 | A1 | 11/2018 |
| WO | 2018/232333 | A1 | 12/2018 |
| WO | 2019/067131 | A1 | 4/2019 |
| WO | 2019/217477 | A1 | 11/2019 |
| WO | 2019217009 | A1 | 11/2019 |
| WO | 2021/112983 | A1 | 6/2021 |

OTHER PUBLICATIONS

Applicant-Initiated Interview Summary received for U.S. Appl. No. 17/121,610, mailed on Oct. 29, 2021, 2 pages.
Decision on Appeal received for U.S. Appl. No. 14/641,298, mailed on Nov. 1, 2021, 9 pages.
Decision to Grant received for European Patent Application No. 17810737.1, mailed on Nov. 11, 2021, 2 pages.
Examiner-Initiated Interview Summary received for U.S. Appl. No. 16/859,101, mailed on Dec. 1, 2021, 2 pages.
Final Office Action received for U.S. Appl. No. 15/784,806, mailed on Nov. 9, 2021, 42 pages.
Intention to Grant received for Danish Patent Application No. PA202070617, mailed on Nov. 15, 2021, 2 pages.
Notice of Allowance received for Japanese Patent Application No. 2019-194597, mailed on Nov. 19, 2021, 4 pages (1 pages of Engish translation and 3 pages of Official Copy).
Notice of Allowance received for U.S. Appl. No. 17/157,166, mailed on Nov. 16, 2021, 6 pages.
Notice of Allowance received for U.S. Appl. No. 14/641,298, mailed on Nov. 29, 2021, 8 pages.
Office Action received for European Patent Application No. 15714698.6, mailed on Oct. 13, 2021, 2 pages.
Office Action received for European Patent Application No. 20205496.1, mailed on Nov. 10, 2021, 5 pages.
Record of Oral Hearing received for U.S. Appl. No. 14/641,298, mailed on Oct. 8, 2021, 17 pages.
Advisory Action received for U.S. Appl. No. 10/179,775, mailed on Oct. 13, 2015, 4 pages.
Advisory Action received for U.S. Appl. No. 10/179,775, mailed on Oct. 14, 2010, 2 pages.
Advisory Action received for U.S. Appl. No. 10/179,775, mailed on Sep. 15, 2009, 2 pages.
Advisory Action received for U.S. Appl. No. 12/890,499, mailed on Jan. 11, 2016, 3 pages.
Advisory Action received for U.S. Appl. No. 13/077,855, mailed on Jun. 15, 2016, 4 pages.
Advisory Action received for U.S. Appl. No. 13/077,862, mailed on Apr. 7, 2016, 3 pages.
Advisory Action received for U.S. Appl. No. 13/077,874, mailed on Aug. 19, 2016, 3 pages.
Appeal Decision received for U.S. Appl. No. 13/077,862, mailed on Mar. 22, 2019, 10 pages.
Applicant Initiated Interview Summary received for U.S. Appl. No. 14/641,304, mailed on Dec. 2, 2019, 5 pages.
Applicant Initiated Interview Summary received for U.S. Appl. No. 14/641,304, mailed on Jul. 28, 2020, 5 pages.
Applicant Initiated Interview Summary received for U.S. Appl. No. 15/784,806, mailed on Aug. 2, 2021, 5 pages.
Applicant Initiated Interview Summary received for U.S. Appl. No. 16/790,619, mailed on Jul. 28, 2020, 3 pages.
Applicant-Initiated Interview Summary received for U.S. Appl. No. 15/784,806, mailed on Dec. 21, 2020, 5 pages.
Applicant-Initiated Interview Summary received for U.S. Appl. No. 15/784,806, mailed on Jun. 2, 2020, 5 pages.
Applicant-Initiated Interview Summary received for U.S. Appl. No. 16/528,941, mailed on Jun. 19, 2020, 3 pages.
Applicant-Initiated Interview Summary received for U.S. Appl. No. 16/528,941, mailed on Nov. 10, 2020, 2 pages.

(56) References Cited

OTHER PUBLICATIONS

Applicant-Initiated Interview Summary received for U.S. Appl. No. 16/799,481, mailed on Jul. 24, 2020, 3 pages.
Applicant-Initiated Interview Summary received for U.S. Appl. No. 17/026,818, mailed on Dec. 15, 2020, 7 pages.
Applicant-Initiated Interview Summary received for U.S. Appl. No. 17/026,818, mailed on Mar. 8, 2021, 4 pages.
Applicant-Initiated Interview Summary received for U.S. Appl. No. 17/223,794, mailed on Sep. 7, 2021, 3 pages.
Board Decision received for Chinese Patent Application No. 201510288981.9, mailed on May 6, 2021, 31 pages (3 pages of English Translation and 28 pages of Official Copy).
Board Opinion received for Chinese Patent Application No. 201510288981.9, mailed on Jan. 4, 2021, 21 pages (9 pages of English Translation and 12 pages of Official Copy).
Certificate of Examination received for Australian Patent Application No. 2019100499, mailed on Aug. 15, 2019, 2 pages.
Certificate of Examination received for Australian Patent Application No. 2019101062, mailed on Jun. 2, 2020, 2 pages.
Certificate of Examination received for Australian Patent Application No. 2020101324, mailed on Sep. 7, 2020, 2 pages.
Corrected Notice of Allowance received for U.S. Appl. No. 13/077,874, mailed on Dec. 9, 2016, 2 pages.
Corrected Notice of Allowance received for U.S. Appl. No. 16/109,552, mailed on Jun. 13, 2019, 2 pages.
Corrected Notice of Allowance received for U.S. Appl. No. 16/144,572, mailed on Mar. 21, 2019, 3 pages.
Corrected Notice of Allowance received for U.S. Appl. No. 16/147,432, mailed on Jan. 18, 2019, 3 pages.
Corrected Notice of Allowance received for U.S. Appl. No. 16/147,432, mailed on Jul. 16, 2019, 3 pages.
Corrected Notice of Allowance received for U.S. Appl. No. 16/511,578, mailed on Feb. 13, 2020, 3 pages.
Corrected Notice of Allowance received for U.S. Appl. No. 16/790,619, mailed on Oct. 13, 2020, 3 pages.
Corrected Notice of Allowance received for U.S. Appl. No. 16/799,481, mailed on Oct. 27, 2020, 3 pages.
Corrected Search Report and Opinion received for Danish Patent Application No. PA201870364, mailed on Sep. 5, 2018, 13 pages.
Decision to Grant received for Danish Patent Application No. PA201870362, mailed on May 15, 2020, 2 pages.
Decision to Grant received for European Patent Application No. 10799259.6, mailed on Aug. 31, 2017, 2 pages.
Decision to Grant received for European Patent Application No. 12704175.4, mailed on Jul. 19, 2018, 2 pages.
Decision to Grant received for European Patent Application No. 15713062.6, mailed on Apr. 11, 2019, 2 pages.
Decision to Grant received for German Patent Application No. 102015208532.5, mailed on Sep. 22, 2020, 10 pages (1 page of English Translation and 9 pages of Official Copy).
Decision to Grant received for Japanese Patent Application No. 2019-124728, mailed on Apr. 2, 2021, 4 pages (1 page of English Translation and 3 pages of Official Copy).
Evaluation Report for Utility Model Patent received for Chinese Patent Application No. 201620051290.7, completed on Sep. 19, 2016, 11 pages (6 pages of English Translation and 5 pages of Official Copy).
Examiner Initiated-Interview Summary received for U.S. Appl. No. 16/528,941, mailed on Dec. 1, 2020, 2 pages.
Examiner's Answer to Appeal Brief received for U.S. Appl. No. 14/641,298, mailed on Mar. 22, 2021, 19 pages.
Examiner's Initiated Interview Summary received for U.S. Appl. No. 14/641,298, mailed on Mar. 10, 2020, 4 pages.
Extended European Search Report received for European Patent Application No. 17810737.1, mailed on Oct. 28, 2019, 11 pages.
Extended European Search Report received for European Patent Application No. 18185408.4, mailed on Oct. 17, 2018, 10 pages.
Extended European Search Report received for European Patent Application No. 20166552.8, mailed on Jun. 12, 2020, 9 pages.
Extended European Search Report received for European Patent Application No. 20205496.1, mailed on Mar. 11, 2021, 11 pages.
Final Office Action received for U.S. Appl. No. 10/179,775, mailed on Apr. 5, 2006, 14 pages.
Final Office Action received for U.S. Appl. No. 10/179,775, mailed on Aug. 16, 2013, 12 pages.
Final Office Action received for U.S. Appl. No. 10/179,775, mailed on Jul. 8, 2009, 11 pages.
Final Office Action received for U.S. Appl. No. 10/179,775, mailed on Jun. 22, 2010, 13 pages.
Final Office Action received for U.S. Appl. No. 10/179,775, mailed on May 22, 2015, 15 pages.
Final Office Action received for U.S. Appl. No. 10/179,775, mailed on Oct. 8, 2008, 12 pages.
Final Office Action received for U.S. Appl. No. 12/890,499, mailed on May 22, 2017, 17 pages.
Final Office Action received for U.S. Appl. No. 13/077,874, mailed on May 5, 2016, 26 pages.
Final Office Action received for U.S. Appl. No. 14/641,289, mailed on Jul. 1, 2016, 32 pages.
Final Office Action received for U.S. Appl. No. 14/641,298, mailed on Jun. 26, 2020, 50 pages.
Final Office Action received for U.S. Appl. No. 14/641,298, mailed on May 16, 2019, 50 pages.
Final Office Action received for U.S. Appl. No. 14/641,298, mailed on Oct. 4, 2017, 30 pages.
Final Office Action received for U.S. Appl. No. 14/641,304, mailed on Jul. 24, 2018, 19 pages.
Final Office Action received for U.S. Appl. No. 14/641,304, mailed on Oct. 15, 2019, 21 pages.
Final Office Action received for U.S. Appl. No. 15/784,806, mailed on Aug. 3, 2020, 33 pages.
Final Office Action received for U.S. Appl. No. 15/784,806, mailed on May 22, 2019, 38 pages.
Final Office Action received for U.S. Appl. No. 16/528,941, mailed on Jul. 13, 2020, 15 pages.
Final Office Action received for U.S. Appl. No. 17/026,818, mailed on Jan. 29, 2021, 21 pages.
Final Office Action received for U.S. Appl. No. 15/608,866, mailed on Mar. 8, 2019, 36 pages.
G PAD, "LG's latest UIs that shine even more on the G-Pad", Online available at: http://bungq.com/1014, Nov. 19, 2013, 49 pages (30 pages of English Translation and 19 pages of Official Copy).
Intention to Grant received for Danish Patent Application No. PA201870362, mailed on Feb. 14, 2020, 2 pages.
Intention to Grant received for European Patent Application No. 10799259.6, mailed on Apr. 20, 2017, 8 Pages.
Intention to Grant received for European Patent Application No. 12704175.4, mailed on Mar. 22, 2018, 8 pages.
Intention to Grant received for European Patent Application No. 15713062.6, mailed on Mar. 25, 2019, 7 pages.
Intention to Grant received for European Patent Application No. 15713062.6, mailed on Oct. 8, 2018, 8 pages.
Intention to Grant received for European Patent Application No. 17810737.1, mailed on Jul. 5, 2021, 8 pages.
Intention to Grant received for European Patent Application No. 19729395.4, mailed on Jul. 23, 2021, 10 pages.
International Preliminary Report on Patentability received for PCT Patent Application No. PCT/US2018/032396, mailed on Nov. 28, 2019, 9 pages.
International Preliminary Report on Patentability received for PCT Patent Application No. PCT/US2015/019306, mailed on Dec. 15, 2016, 10 pages.
International Preliminary Report on Patentability received for PCT Patent Application No. PCT/US2015/019309, mailed on Dec. 15, 2016, 10 pages.
International Preliminary Report on Patentability received for PCT Patent Application No. PCT/US2017/035326, mailed on Dec. 20, 2018, 19 pages.
International Preliminary Report on Patentability received for PCT Patent Application No. PCT/US2018/048151, mailed on Apr. 9, 2020, 14 pages.

(56) References Cited

OTHER PUBLICATIONS

International Preliminary Report on Patentability received for PCT Patent Application No. PCT/US2019/031202, mailed on Nov. 19, 2020, 13 pages.
International Search Report and Written Opinion received for PCT Patent Application No. PCT/US2017/035326, mailed on Oct. 5, 2017, 22 pages.
International Search Report and Written Opinion received for PCT Patent Application No. PCT/US2018/032396, mailed on Jul. 30, 2018, 13 pages.
International Search Report and Written Opinion received for PCT Patent Application No. PCT/US2018/048151, mailed on Jan. 10, 2019, 23 pages.
International Search Report and Written Opinion received for PCT Patent Application No. PCT/US2019/031202, mailed on Oct. 4, 2019, 19 pages.
International Search Report and Written Opinion received for PCT Patent Application No. PCT/US2021/031760, mailed on Sep. 16, 2021, 18 pages.
International Search Report received for PCT Patent Application No. PCT/US95/11025, mailed on Jan. 3, 1996, 3 pages.
Invitation to Pay Additional Fees received for PCT Patent Application No. PCT/US2017/035326, mailed on Aug. 7, 2017, 2 pages.
Invitation to Pay Additional Fees received for PCT Patent Application No. PCT/US2018/048151, mailed on Nov. 6, 2018, 18 pages.
Invitation to Pay Additional Fees received for PCT Patent Application No. PCT/US2019/031202, mailed on Aug. 8, 2019, 12 pages.
"LG G Pad 8.3 Tablet Q Remote User", Available at:—<https://mushroomprincess.tistory.com/1320>, Dec. 26, 2013, 37 pages (20 pages of English Translation and 17 pages of Official Copy).
"Microsoft Windows 3.1", available at:—http://www.guidebookgallery.org/screenshots/win31, 1992, pp. 1-31.
Minutes of Oral Hearing received for German Patent Application No. 102015208532.5, mailed on Dec. 13, 2019, 21 pages (3 pages of English Translation and 18 pages of Official Copy).
Minutes of the Oral Proceedings received for European Patent Application No. 19729395.4, mailed on Jul. 21, 2021, 6 pages.
Non-Final Office Action received for U.S. Appl. No. 16/035,422, mailed on Nov. 30, 2018, 13 pages.
Non-Final Office Action received for U.S. Appl. No. 17/157,166, mailed on Jul. 9, 2021, 12 pages.
Non-Final Office Action received for U.S. Appl. No. 10/179,775, mailed on Aug. 14, 2014, 13 pages.
Non-Final Office Action received for U.S. Appl. No. 10/179,775, mailed on Dec. 23, 2009., 13 pages.
Non-Final Office Action received for U.S. Appl. No. 10/179,775, mailed on Dec. 23, 2015, 14 pages.
Non-Final Office Action received for U.S. Appl. No. 10/179,775, mailed on Jan. 22, 2009, 11 pages.
Non-Final Office Action received for U.S. Appl. No. 10/179,775, mailed on Jul. 2, 2007, 12 pages.
Non-Final Office Action received for U.S. Appl. No. 10/179,775, mailed on Mar. 14, 2008, 11 pages.
Non-Final Office Action received for U.S. Appl. No. 10/179,775, mailed on Mar. 28, 2013, 11 pages.
Non-Final Office Action received for U.S. Appl. No. 10/179,775, mailed on Oct. 12, 2005, 16 pages.
Non-Final Office Action received for U.S. Appl. No. 12/890,499, mailed on Nov. 1, 2016, 16 pages.
Non-Final Office Action received for U.S. Appl. No. 13/077,862, mailed on Jul. 17, 2020, 20 pages.
Non-Final Office Action received for U.S. Appl. No. 13/077,862, mailed on Nov. 21, 2019, 18 pages.
Non-Final Office Action received for U.S. Appl. No. 14/641,298, mailed on Mar. 6, 2017, 26 pages.
Non-Final Office received for U.S. Appl. No. 14/641,298, mailed on Nov. 29, 2019, 47 pages.
Non-Final Office Action received for U.S. Appl. No. 14/641,298, mailed on Sep. 19, 2018, 41 pages.
Non-Final Office Action received for U.S. Appl. No. 14/641,304, mailed on Feb. 27, 2019, 18 pages.
Non-Final Office Action received for U.S. Appl. No. 14/641,304, mailed on Mar. 4, 2020, 21 pages.
Non-Final Office Action received for U.S. Appl. No. 14/641,304, mailed on Sep. 11, 2017, 18 pages.
Non-Final Office Action received for U.S. Appl. No. 15/608,866, mailed on Nov. 2, 2018, 46 pages.
Non-Final Office Action received for U.S. Appl. No. 15/784,806, mailed on Apr. 30, 2021, 42 pages.
Non-Final Office Action received for U.S. Appl. No. 15/784,806, mailed on Jan. 4, 2019, 27 pages.
Non-Final Office Action received for U.S. Appl. No. 15/784,806, mailed on Mar. 13, 2020, 36 pages.
Non-Final Office Action received for U.S. Appl. No. 16/109,552, mailed on Oct. 17, 2018, 16 pages.
Non-Final Office Action received for U.S. Appl. No. 16/144,572, mailed on Nov. 30, 2018, 8 pages.
Non-Final Office Action received for U.S. Appl. No. 16/388,403, mailed on Aug. 23, 2019, 10 pages.
Non-Final Office Action received for U.S. Appl. No. 16/528,941, mailed on Dec. 7, 2020, 15 pages.
Non-Final Office Action received for U.S. Appl. No. 16/528,941, mailed on Jan. 30, 2020, 14 pages.
Non-Final Office Action received for U.S. Appl. No. 16/790,619, mailed on May 4, 2020, 13 pages.
Non-Final Office Action received for U.S. Appl. No. 16/799,481, mailed on May 1, 2020, 13 pages.
Non-Final Office Action received for U.S. Appl. No. 16/859,101, mailed on Aug. 5, 2021, 19 pages.
Non-Final Office Action received for U.S. Appl. No. 17/026,818, mailed on Nov. 25, 2020, 20 pages.
Non-Final Office Action received for U.S. Appl. No. 17/121,610, mailed on May 13, 2021, 17 pages.
Non-Final Office Action received for U.S. Appl. No. 17/223,794, mailed on Jun. 16, 2021, 32 pages.
Notice of Acceptance received for Australian Patent Application No. 2012209199, mailed on Jan. 27, 2016, 3 pages.
Notice of Acceptance received for Australian Patent Application No. 2015201884, mailed on Oct. 4, 2016, 3 pages.
Notice of Acceptance received for Australian Patent Application No. 2019266225, mailed on Dec. 23, 2020, 3 pages.
Notice of Acceptance received for Australian Patent Application No. 2021200789, mailed on Feb. 26, 2021, 3 pages.
Notice of Allowance received for Australian Patent Application No. 2016202837, mailed on Apr. 21, 2017, 3 pages.
Notice of Allowance received for Chinese Patent Application No. 201280006317.5, mailed on Feb. 17, 2017, 2 pages (1 page of English Translation and 1 page of Official Copy).
Notice of Allowance received for Chinese Patent Application No. 201620051290.7, mailed on Jun. 22, 2016, 2 Pages (Official Copy only) (See Communication under 37 CFR § 1.98(a) (3)).
Notice of Allowance received for Chinese Patent Application No. 201710240907.9, mailed on Nov. 25, 2019, 2 pages (1 page of English Translation and 1 page of Official Copy).
Notice of Allowance received for Chinese Patent Application No. 201780033771.2, mailed on Feb. 3, 2021, 2 pages (1 page of English Translation and 1 page of Official Copy).
Notice of Allowance received for Chinese Patent Application No. 201880056514.5, mailed on Jan. 11, 2021, 2 pages (1 page of English Translation and 1 page of Official Copy).
Notice of Allowance received for Chinese Patent Application No. 201910400180.5, mailed on Nov. 5, 2020, 2 pages (1 page of English Translation and 1 page of Official Copy).
Notice of Allowance received for Chinese Patent Application No. 202011243876.0, mailed on Sep. 8, 2021, 4 pages (1 page of English Translation and 3 pages of Official Copy).
Notice of Allowance received for Japanese Patent Application No. 2015-095183, mailed on Apr. 21, 2017, 3 pages. (Official Copy Only) (See Communication under 37 CFR § 1.98(a) (3)).
Notice of Allowance received for Japanese Patent Application No. 2016-130565, mailed on Aug. 28, 2017, 3 pages (Official Copy Only) (See Communication under 37 CFR § 1.98(a) (3)).

(56) References Cited

OTHER PUBLICATIONS

Notice of Allowance received for Japanese Patent Application No. 2017-101107, mailed on Jun. 3, 2019, 5 pages (1 page of English Translation and 4 pages of Official Copy).
Notice of Allowance received for Japanese Patent Application No. 2018-183504, mailed on Sep. 27, 2019, 4 pages (1 page of English Translation and 3 pages of Official Copy).
Notice of Allowance received for Korean Patent Application No. 10-2015-0072162, mailed on Dec. 27, 2017, 4 pages (2 pages of English Translation and 2 pages of Official copy).
Notice of Allowance received for Korean Patent Application No. 10-2016-7017508, issued on Apr. 27, 2017, 3 pages (1 page of English translation and 2 pages of Official Copy).
Notice of Allowance received for Korean Patent Application No. 10-2018-0035949, mailed on Nov. 28, 2019, 3 pages (1 page of English Translation and 2 pages of Official Copy).
Notice of Allowance received for Korean Patent Application No. 10-2020-0024632, mailed on Jul. 26, 2021, 3 pages (1 page of English Translation and 2 pages of Official Copy).
Notice of Allowance received for Korean Patent Application No. 10-2020-7032110, mailed on Mar. 8, 2021, 4 pages (1 page of English Translation and 3 pages of Official Copy).
Notice of Allowance Received for Taiwanese Patent Application No. 104117041, mailed on Feb. 24, 2017, 3 pages. (Official Copy Only) (See Communication under 37 CFR § 1.98(a) (3)).
Notice of Allowance received for Taiwanese Patent Application No. 106144804, mailed on Jun. 27, 2018, 6 pages (2 pages of English Translation and 4 pages of Official copy).
Notice of Allowance received for Taiwanese Patent Application No. 104117042, mailed on Nov. 17, 2017, 5 pages (2 pages of English Translation and 3 pages of Official Copy).
Notice of Allowance received for U.S. Appl. No. 16/035,422, mailed on Apr. 10, 2019, 6 pages.
Notice of Allowance received for U.S. Appl. No. 16/528,941, mailed on Aug. 10, 2021, 5 pages.
Notice of Allowance received for U.S. Appl. No. 16/528,941, mailed on May 19, 2021, 5 pages.
Notice of Allowance received for U.S. Appl. No. 10/179,775, mailed on Aug. 24, 2017, 3 pages.
Notice of Allowance received for U.S. Appl. No. 10/179,775, mailed on Jul. 13, 2017, 11 pages.
Notice of Allowance received for U.S. Appl. No. 12/843,814, mailed on Jun. 22, 2016, 13 pages.
Notice of Allowance received for U.S. Appl. No. 13/077,850, mailed on May 5, 2016, 15 pages.
Notice of Allowance received for U.S. Appl. No. 13/077,855, mailed on Jan. 30, 2017, 7 pages.
Notice of Allowance received for U.S. Appl. No. 13/077,862, mailed on Jun. 20, 2019, 9 pages.
Notice of Allowance received for U.S. Appl. No. 13/077,862, mailed on Sep. 20, 2019, 2 pages.
Notice of Allowance received for U.S. Appl. No. 13/077,874, mailed on Nov. 22, 2016, 13 pages.
Notice of Allowance received for U.S. Appl. No. 14/253,494, mailed on Jan. 18, 2017, 4 pages.
Notice of Allowance received for U.S. Appl. No. 14/253,494, mailed on Oct. 4, 2016, 12 pages.
Notice of Allowance received for U.S. Appl. No. 14/641,289, mailed on Aug. 24, 2017, 6 pages.
Notice of Allowance received for U.S. Appl. No. 14/641,289, mailed on Dec. 12, 2017, 5 pages.
Notice of Allowance received for U.S. Appl. No. 14/641,304, mailed on Sep. 9, 2020, 15 pages.
Notice of Allowance received for U.S. Appl. No. 15/608,866, mailed on Feb. 28, 2020, 2 pages.
Notice of Allowance received for U.S. Appl. No. 16/109,552, mailed on Mar. 13, 2019, 25 pages.
Notice of Allowance received for U.S. Appl. No. 16/109,552, mailed on May 13, 2019, 2 pages.
Notice of Allowance received for U.S. Appl. No. 16/144,572, mailed on Feb. 28, 2019, 7 pages.
Notice of Allowance received for U.S. Appl. No. 16/147,432, mailed on Dec. 18, 2018, 13 pages.
Notice of Allowance received for U.S. Appl. No. 16/147,432, mailed on May 20, 2019, 6 pages.
Notice of Allowance received for U.S. Appl. No. 16/383,403, mailed on Jan. 10, 2020, 11 pages.
Notice of Allowance received for U.S. Appl. No. 16/511,578, mailed on Nov. 18, 2019, 12 pages.
Notice of Allowance received for U.S. Appl. No. 16/790,619, mailed on Sep. 8, 2020, 6 pages.
Notice of Allowance received for U.S. Appl. No. 16/799,481, mailed on Sep. 8, 2020, 6 pages.
Notice of Allowance received for U.S. Appl. No. 17/026,818, mailed on May 13, 2021, 10 pages.
Notice of Allowance received for U.S. Appl. No. 15/608,866, mailed on Dec. 18, 2019, 9 pages.
Office Action received for Australian Patent Application No. 2015100490, mailed on Dec. 15, 2016, 2 pages.
Office Action received for Australian Patent Application No. 2016202837, mailed on Jan. 10, 2017, 2 pages.
Office Action received for Australian Patent Application No. 2016266010, mailed on Aug. 23, 2018, 4 pages.
Office Action received for Australian Patent Application No. 2016266010, mailed on May 4, 2018, 4 pages.
Office Action received for Australian Patent Application No. 2016266010, mailed on Nov. 28, 2018, 5 pages.
Office Action received for Australian Patent Application No. 2016266010, mailed on Nov. 30, 2017, 5 pages.
Office Action received for Australian Patent Application No. 2018271366, mailed on Feb. 25, 2020, 5 pages.
Office Action received for Australian Patent Application No. 2018271366, mailed on Jan. 19, 2021, 5 pages.
Office Action received for Australian Patent Application No. 2018271366, mailed on Oct. 26, 2020, 5 pages.
Office Action received for Australian Patent Application No. 2019100499, mailed on Jun. 28, 2019, 4 pages.
Office Action received for Australian Patent Application No. 2019101062, mailed on Apr. 22, 2020, 2 pages.
Office Action received for Australian Patent Application No. 2019101062, mailed on Dec. 5, 2019, 3 pages.
Office Action received for Australian Patent Application No. 2019266225, mailed on Nov. 23, 2020, 4 pages.
Office Action received for Australian Patent Application No. 2020239711, mailed on Sep. 13, 2021, 5 pages.
Office Action received for Chinese Patent Application No. 201280006317.5, mailed on Jul. 11, 2016, 6 pages (1 page of English Translation and 5 pages of Official Copy).
Office Action received for Chinese Patent Application No. 201510288981.9, mailed on Jul. 1, 2019, 16 pages (8 pages of English Translation and 8 pages of Official Copy).
Office Action received for Chinese Patent Application No. 201510288981.9, mailed on Jul. 3, 2018, 19 pages (8 pages of English Translation and 11 pages of official copy).
Office Action received for Chinese Patent Application No. 201510288981.9, mailed on Mar. 6, 2019, 20 pages (10 pages of English Translation and 10 pages of Official Copy).
Office Action received for Chinese Patent Application No. 201710240907.9, mailed on Jun. 5, 2019, 10 pages (5 pages of English Translation and 5 pages of Official Copy).
Office Action received for Chinese Patent Application No. 201780033771.2, mailed on Jul. 15, 2020, 18 pages (9 pages of English Translation and 9 pages of Official Copy).
Office Action received for Chinese Patent Application No. 201880056514.5, mailed on Sep. 2, 2020, 7 pages (1 page of English Translation and 6 pages of Official Copy).
Office Action received for Chinese Patent Application No. 201910400180.5, mailed on Jun. 1, 2020, 11 pages (5 pages of English Translation and 6 pages of Official Copy).
Office Action received for Chinese Patent Application No. 201910704856.X, mailed on Apr. 6, 2021, 13 pages (7 pages of English Translation and 6 pages of Official Copy).

(56) References Cited

OTHER PUBLICATIONS

Office Action received for Chinese Patent Application No. 201910704856.X, mailed on Dec. 9, 2020, 23 pages (13 pages of English Translation and 10 pages of Official Copy).
Office Action received for Chinese Patent Application No. 201910704856.X, mailed on May 27, 2020, 26 pages (14 pages of English Translation and 12 pages of Official Copy).
Office Action received for Chinese Patent Application No. 202010126661.4, mailed on Feb. 3, 2021, 16 pages (9 pages of English Translation and 7 pages of Official Copy).
Office Action received for Chinese Patent Application No. 202011243876.0, mailed on Apr. 6, 2021, 11 pages (5 pages of English Translation and 6 pages of Official Copy).
Office Action received for Danish Patent Application No. PA201570256, mailed on Mar. 17, 2016, 5 pages.
Office Action received for Danish Patent Application No. PA201570256, mailed on May 23, 2017, 3 pages.
Office Action received for Danish Patent Application No. PA201570256, mailed on Oct. 10, 2016, 3 pages.
Office Action received for Danish Patent Application No. PA201870362, mailed on Aug. 22, 2019, 4 pages.
Office Action received for Danish Patent Application No. PA201870362, mailed on Dec. 18, 2018, 2 pages.
Office Action received for Danish Patent Application No. PA201870363, mailed on Mar. 26, 2019, 3 pages.
Office Action received for Danish Patent Application No. PA201870364, mailed on Jan. 28, 2019, 8 pages.
Office Action received for Danish Patent Application No. PA201870364, mailed on Jun. 11, 2019, 11 pages.
Office Action received for Danish Patent Application No. PA202070617, mailed on Sep. 24, 2021, 4 pages.
Office Action received for European Patent Application No. 15713062.6, mailed on Dec. 6, 2017, 7 pages.
Office Action received for European Patent Application No. 17810737.1, mailed on Jan. 20, 2021, 6 pages.
Office Action received for European Patent Application No. 18779093.6, mailed on Dec. 11, 2020, 4 pages.
Office Action received for European Patent Application No. 19729395.4, mailed on Jul. 15, 2020, 4 pages.
Office Action received for European Patent Application No. 19729395.4, mailed on Sep. 29, 2020, 10 pages.
Office Action received for European Patent Application No. 20166552.8, mailed on Mar. 24, 2021, 8 pages.
Office Action received for German Patent Application No. 102015208532.5, mailed on Apr. 1, 2019, 20 pages (10 pages of English Translation and 10 pages of Official Copy).
Office Action received for German Patent Application No. 102015208532.5, mailed on Apr. 21, 2020, 3 pages (1 page of English Translation and 2 pages of Official Copy).
Office Action received for German Patent Application No. 102015208532.5, mailed on Aug. 21, 2019, 15 pages (5 pages of English Translation and 10 pages of Official Copy).
Office Action received for Indian Patent Application No. 201814036860, mailed on Jul. 29, 2021, 8 pages.
Office Action received for Japanese Patent Application No. 2013-550664, mailed on Jun. 10, 2016, 3 pages (Official Copy only) (See Communication under 37 CFR § 1.98(a) (3)).
Office Action received for Japanese Patent Application No. 2015-095183, mailed on Jun. 3, 2016, 13 pages (6 pages of English Translation and 7 pages of Official copy).
Office Action received for Japanese Patent Application No. 2017-101107, mailed on Sep. 7, 2018, 14 pages (7 pages of English Translation and 7 pages of Official Copy).
Office Action received for Japanese Patent Application No. 2019-124728, mailed on Dec. 14, 2020, 4 pages (2 pages of English Translation and 2 pages of Official Copy).
Office Action received for Japanese Patent Application No. 2019-124728, mailed on Sep. 18, 2020, 6 pages (3 pages of English Translation and 3 pages of Official Copy).
Office Action received for Japanese Patent Application No. 2019-194597, mailed on Jan. 18, 2021, 10 pages (5 pages of English Translation and 5 pages of Official Copy).
Office Action received for Korean Patent Application No. 10-2015-0072162, mailed on Feb. 27, 2017., 12 pages (6 pages of English Translation and 6 pages of Official Copy).
Office Action received for Korean Patent Application No. 10-2016-7017508, mailed on Oct. 20, 2016, 5 pages (2 pages of English Translation and 3 pages of Official Copy).
Office Action received for Korean Patent Application No. 10-2018-0035949, mailed on Apr. 24, 2019, 9 pages (4 pages of English Translation and 5 pages of Official Copy).
Office Action received for Korean Patent Application No. 10-2018-0035949, mailed on Dec. 24, 2018, 7 pages (3 pages of English Translation and 4 pages of Official Copy).
Office Action received for Korean Patent Application No. 10-2018-0035949, mailed on Jun. 20, 2018, 9 pages (4 pages of English Translation and 5 pages of Official Copy).
Office Action received for Korean Patent Application No. 10-2020-0024632, mailed on Dec. 29, 2020, 11 pages (5 pages of English Translation and 6 pages of Official Copy).
Office Action received for Korean Patent Application No. 10-2020-0024632, mailed on May 18, 2020, 11 pages (5 pages of English Translation and 6 pages of Official Copy).
Office Action received for Korean Patent Application No. 10-2020-7032110, mailed on Dec. 15, 2020, 6 pages (2 pages of English Translation and 4 pages of official Copy).
Office Action Received for Taiwanese Patent Application No. 104117041, mailed on Aug. 22, 2016, 6 pages (3 pages of English Translation and 3 pages of Official Copy).
Office Action received for Taiwanese Patent Application No. 104117042, mailed on Apr. 20, 2017, 18 pages (7 pages of English Translation and 11 pages of Official Copy).
Office Action Report received for Australian Patent Application No. 2012209199, mailed on Dec. 17, 2015, 3 pages.
"Q Pair, When I connected to LG G Pad 8.3 Q pair G Flex . . .—G Pad 8.3 review", Posting of a blog, Online Available at: < http://www.leaderyou.co.kr/2595>, Dec. 7, 2013, 28 pages (15 page of English Translation and 13 pages of Official Copy).
"QPair", online available at: http://mongri.net/entry/G-Pad-83-Qpair, Retrieved on Mar. 6, 2017, Dec. 20, 2013, 22 pages (10 pages of English Translation and 12 pages of Official Copy).
Result of Consultation received for European Patent Application No. 19729395.4, mailed on Jun. 22, 2021, 3 pages.
Result of Consultation received for European Patent Application No. 19729395.4, mailed on Jun. 23, 2021, 3 pages.
Search Report and Opinion received for Danish Patent Application No. PA201870362, mailed on Sep. 7, 2018, 9 pages.
Search Report and Opinion received for Danish Patent Application No. PA201870363, mailed on Sep. 11, 2018, 12 pages.
Search Report and Opinion received for Danish Patent Application No. PA201870364, mailed on Sep. 4, 2018, 12 pages.
Search Report and Opinion received for Danish Patent Application No. PA202070617, mailed on Dec. 23, 2020, 8 pages.
Summons to Attend Oral Proceedings received for European Application No. 10799259.6, mailed on Aug. 2, 2016, 16 pages.
Summons to Attend Oral Proceedings received for European Patent Application No. 19729395.4, mailed on Mar. 11, 2021, 7 pages.
Summons to Attend Oral Proceedings received for European Patent Application No. 19729395.4, mailed on Mar. 19, 2021, 9 pages.
Supplemental Notice of Allowance received for U.S. Appl. No. 15/608,866, mailed on Feb. 20, 2020, 2 pages.
Written Opinion received for PCT Patent Application No. PCT/US95/11025, mailed on Oct. 4, 1996, 6 pages.
Androidcentral, "How do i respond to group messages from notification bar?", Available online at: https://forums.androidcentral.com/ask-question/952030-how-do-i-respond-group-messages-notification-bar.html, Mar. 25, 2019, 3 pages.
Office Action received for Korean Patent Application No. 10-2012-7020548, mailed on Oct. 10, 2013, 5 pages (Official Copy only) (See Communication under 37 CFR § 1.98(a) (3)).

(56) References Cited

OTHER PUBLICATIONS

Notice of Allowance received for Korean Patent Application No. 10-2013-7022057, mailed on Apr. 27, 2015, 2 pages (Official Copy only) (See Communication under 37 CFR § 1.98(a) (3)).
Office Action received for Korean Patent Application No. 10-2013-7022057, mailed on May 28, 2014, 7 pages (3 pages of English Translation and 4 pages of Official Copy).
Notice of Allowance received for Korean Patent Application No. 10-2014-7033660, issued on Sep. 25, 2015, 3 pages (1 page of English Translation and 2 pages of Official Copy).
Office Action received for Korean Patent Application No. 10-2014-7033660, mailed on Feb. 23, 2015, 3 pages (Official Copy only) (See Communication under 37 CFR § 1.98(a) (3)).
Office Action received for Korean Patent Application No. 10-2015-0072162, mailed on Apr. 20, 2016, 11 pages (6 pages of English Translation and 5 pages of Official Copy).
Notice of Allowance received for Korean Patent Application No. 10-2015-7013849, mailed on Mar. 28, 2016, 3 pages (1 page of English Translation and 2 pages of Official Copy).
Office Action received for Korean Patent Application No. 10-2015-7013849, mailed on Aug. 20, 2015, 5 pages (2 pages of English Translation and 3 pages of Official Copy).
Office Action received for European Patent Application No. 10799259.6, mailed on Jun. 1, 2015, 9 pages.
Decision to Grant received for European Patent Application No. 11150223.3, mailed on Aug. 1, 2013, 2 pages.
Extended European Search Report (includes Partial European Search Report and European Search Opinion) received for European Patent Application No. 11150223.3, mailed on May 16, 2011, 7 pages.
Office Action received for European Patent Application No. 11150223.3, mailed on Mar. 29, 2012, 3 pages.
Final Office Action received for U.S. Appl. No. 12/789,426, mailed on Oct. 10, 2013, 9 pages.
Non-Final Office Action received for U.S. Appl. No. 12/789,426, mailed on Apr. 4, 2013, 8 pages.
Notice of Allowance received for U.S. Appl. No. 12/789,426, mailed on Feb. 20, 2014, 7 pages.
Non-Final Office Action received for U.S. Appl. No. 12/789,436, mailed on Jun. 25, 2012, 23 pages.
Notice of Allowance received for U.S. Appl. No. 12/789,436, mailed on Jan. 7, 2013, 9 pages.
Final Office Action received for U.S. Appl. No. 12/843,814, mailed on Apr. 23, 2015, 28 pages.
Final Office Action received for U.S. Appl. No. 12/843,814, mailed on Jan. 31, 2014, 20 pages.
Final Office Action received for U.S. Appl. No. 12/843,814, mailed on Nov. 14, 2012, 13 pages.
Non-Final Office Action received for U.S. Appl. No. 12/843,814, mailed on Apr. 27, 2012, 26 pages.
Non-Final Office Action received for U.S. Appl. No. 12/843,814, mailed on May 28, 2013, 17 pages.
Non-Final Office Action received for U.S. Appl. No. 12/843,814, mailed on Oct. 8, 2014, 14 pages.
Final Office Action Received for U.S. Appl. No. 12/890,472, mailed on Feb. 6, 2013, 10 pages.
Non-Final Office Action received for U.S. Appl. No. 12/890,472, mailed on Jul. 5, 2012, 9 pages.
Final Office Action received for U.S. Appl. No. 12/890,482, mailed on Sep. 12, 2013, 10 pages.
Non-Final Office Action received for U.S. Appl. No. 12/890,482, mailed on Sep. 27, 2012, 11 pages.
Notice of Allowance received for U.S. Appl. No. 12/890,482, mailed on May 8, 2014, 5 pages.
Final Office Action received for U.S. Appl. No. 12/890,489, mailed on Aug. 14, 2013, 9 pages.
Non-Final Office Action received for U.S. Appl. No. 12/890,489, mailed on Nov. 6, 2014, 22 pages.
Non-Final Office Action received for U.S. Appl. No. 12/890,489, mailed on Nov. 30, 2012, 8 pages.
Notice of Allowance received for U.S. Appl. No. 12/890,489, mailed on Jul. 27, 2015, 8 pages.
Final Office Action received for U.S. Appl. No. 12/890,499, mailed on Jul. 8, 2013, 17 pages.
Final Office Action received for U.S. Appl. No. 12/890,499, mailed on Oct. 19, 2015, 14 pages.
Non-Final Office Action received for U.S. Appl. No. 12/890,499, mailed on Apr. 6, 2015, 14 pages.
Non-Final Office Action received for U.S. Appl. No. 12/890,499, mailed on Nov. 26, 2012, 12 pages.
Non-Final Office Action received for U.S. Appl. No. 12/890,499, mailed on Sep. 11, 2014, 11 pages.
Advisory Action received for U.S. Appl. No. 13/077,850, mailed on Apr. 24, 2014, 3 pages.
Final Office Action Received for U.S. Appl. No. 13/077,850, mailed on Nov. 7, 2013, 14 pages.
Non-Final Office Action received for U.S. Appl. No. 13/077,850, mailed on Mar. 28, 2013, 15 pages.
Non-Final Office Action received for U.S. Appl. No. 13/077,850, mailed on Sep. 10, 2015, 14 pages.
Final Office Action Received for U.S. Appl. No. 13/077,855, mailed on Mar. 17, 2014, 11 pages.
Final Office Action Received for U.S. Appl. No. 13/077,855, mailed on Nov. 7, 2013, 14 pages.
Final Office Action received for U.S. Appl. No. 13/077,855, mailed on Mar. 24, 2016, 19 pages.
Non-Final Office Action received for U.S. Appl. No. 13/077,855, mailed on Aug. 13, 2015, 13 pages.
Non-Final Office Action received for U.S. Appl. No. 13/077,855, mailed on Mar. 28, 2013, 15 pages.
Final Office Action Received for U.S. Appl. No. 13/077,862, mailed on Nov. 8, 2013, 15 pages.
Final Office Action received for U.S. Appl. No. 13/077,862, mailed on Oct. 22, 2015, 16 pages.
Non-Final Office Action received for U.S. Appl. No. 13/077,862, mailed on Dec. 29, 2014, 11 pages.
Non-Final Office Action received for U.S. Appl. No. 13/077,862, mailed on Mar. 15, 2013, 10 pages.
Final Office Action received for U.S. Appl. No. 13/077,867, mailed on May 23, 2013, 10 pages.
Non-Final Office Action received for U.S. Appl. No. 13/077,867, mailed on Dec. 21, 2012, 9 pages.
Non-Final Office Action received for U.S. Appl. No. 13/077,867, mailed on Jul. 20, 2012, 10 pages.
Notice of Allowance received for U.S. Appl. No. 13/077,867, mailed on Mar. 12, 2014, 7 pages.
Notice of Allowance received for U.S. Appl. No. 13/077,867, mailed on Sep. 18, 2013, 8 pages.
Final Office Action received for U.S. Appl. No. 13/077,874, mailed on Dec. 3, 2014, 23 pages.
Non-Final Office Action received for U.S. Appl. No. 13/077,874, mailed on Jun. 19, 2014, 15 pages.
Non-Final Office Action received for U.S. Appl. No. 13/077,874, mailed on Dec. 3, 2015, 23 pages.
Final Office Action received for U.S. Appl. No. 13/333,909, mailed on Dec. 5, 2013, 24 pages.
Non-Final Office Action received for U.S. Appl. No. 13/333,909, mailed on Mar. 19, 2013, 18 pages.
Notice of Allowance received for U.S. Appl. No. 13/333,909, mailed on Mar. 31, 2014, 20 pages.
Decision to Grant received for European Patent Application No. 13175232.1, mailed on Feb. 18, 2016, 2 pages.
Extended European Search Report (includes Partial European Search Report and European Search Opinion) received for European Patent Application No. 13175232.1 mailed on Oct. 21, 2013, 7 pages.
Intention to Grant received for European Patent Application No. 13175232.1, mailed on Sep. 8, 2015, 7 pages.
Office Action received for European Patent Application No. 13175232.1, mailed on Nov. 21, 2014, 5 pages.
Non-Final Office Action received for U.S. Appl. No. 14/253,494, mailed on Dec. 30, 2015, 14 pages.
Non-Final Office Action received for U.S. Appl. No. 14/456,852, mailed on Jul. 1, 2015, 19 pages.

(56) References Cited

OTHER PUBLICATIONS

Notice of Allowance received for U.S. Appl. No. 14/456,852, mailed on Jul. 31, 2015, 8 pages.
Non-Final Office Action received for U.S. Appl. No. 14/641,289, mailed on Jul. 16, 2015, 31 pages.
Non-Final Office Action received for U.S. Appl. No. 14/641,289, mailed on Mar. 11, 2016, 26 pages.
Office Action received for Hong Kong Patent Application No. 151051633, mailed on Jun. 5, 2015, 11 pages (Official Copy Only) (See Communication under 37 CFR § 1.98(a) (3)).
Notice of Acceptance received for Australian Patent Application No. 2010339636, mailed on Jul. 3, 2014, 2 pages.
Office Action received for Australian Patent Application No. 2010339636, issued on Jun. 19, 2013, 3 pages.
Notice of Acceptance Received for Australian Patent Application No. 2010339698, mailed on Dec. 8, 2014, 2 pages.
Office Action Received for Australian Patent Application No. 2010339698, issued on Aug. 8, 2014, 3 pages.
Office Action Received for Australian Patent Application No. 2010339698, mailed on Jun. 14, 2013, Jun. 14, 2013, 3 pages.
Notice of Allowance received for Chinese Patent Application No. 201080063864.8, mailed on Jan. 15, 2016, 4 pages (2 pages of English Translation and 2 pages of Official Copy).
Office Action received for Chinese Patent Application No. 201080063864.8, mailed on Jul. 14, 2015, 8 pages (4 pages of English Translation and 4 pages of Official Copy).
Office Action received for Chinese Patent Application No. 201080063864.8, mailed on Sep. 2, 2014, 31 pages (17 pages of English Translation and 14 pages of Official copy).
Notice of Allowance received for Chinese Patent Application No. 201080064125.0, mailed on Sep. 8, 2015, 3 pages (1 page of English Translation and 2 pages of Official Copy).
Office Action received for Chinese Patent Application No. 201080064125.0, mailed on Jun. 10, 2014, 8 pages (Official Copy only) (See Communication under 37 CFR § 1.98(a) (3)).
Office Action received for Chinese Patent Application No. 201080064125.0, mailed on Mar. 11, 2015, 7 pages (2 pages of English Translation and 5 pages of Official Copy).
Office Action received for Australian Patent Application No. 2012209199, issued on Jan. 15, 2015, 3 pages.
Office Action Received for Chinese Patent Application No. 201280006317.5, mailed on Jan. 11, 2016, 10 pages (5 pages of English Translation and 5 pages of official Copy).
Decision to Grant received for Japanese Patent Application No. 2013-262976, mailed on Nov. 16, 2015, 6 pages (3 pages of English Translation and 3 pages of Official Copy).
Office Action received for Japanese Patent Application No. 2013-262976, mailed on Feb. 20, 2015, 2 pages (Official Copy only) (See Communication under 37 CFR § 1.98(a) (3)).
Office Action received for Japanese Patent Application No. 2013-550664, mailed on Aug. 24, 2015, 9 pages (4 pages of English Translation and 5 pages of Official Copy).
Office Action received for Japanese Patent Application No. 2013-550664, mailed on Sep. 12, 2014, 10 pages (6 pages of English Translation and 4 pages of Official Copy).
Search Report received For Netherlands Patent Application No. 2014737, mailed on Oct. 29, 2015, 9 pages.
Office Action received for Australian Patent Application No. 2015100490, issued on Jun. 9, 2015, 6 pages.
Office Action received for Australian Patent Application No. 2015201884, mailed on Oct. 12, 2015, 4 pages.
Notice of Allowance received for Chinese Patent Application No. 201520364847.8, mailed on Nov. 5, 2015, 9 pages (7 page of English Translation and 2 pages of Official Copy).
Office Action received for Danish Patent Application No. PA201570256, mailed on Jul. 7, 2015, 2 pages.
Anonymous, "Chapter 13: Menus", Apple Human Interface Guidelines, available at <https://developer.apple.com/library/mac/documentation/UserExperience/Conceptual/O SXHIGuidelines/index.html>, retrieved on Aug. 20, 2009, pp. 165-190.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
Baig Ed, "Palm Pre: The Missing Manual", Safari Books Online, Available at <http://my.safaribooksonline.com/book/operating-systems/0596528264>, Aug. 27, 2009, 16 pages.
Benge et al., "Designing Custom Controls", IBM OS/2 Developer, The Magazine for Advanced Software Development, vol. 5, No. 2, 1993, pp. 72-85.
Chan Christine, "Handoff Your Browser to Your iPhone or iPad! Plus A Chance To Win A Copy!", Apr. 12, 2011, 2 pages.
Cuyamaca LRC Computer Labs, "Topics in CommonSpace Application", Available at <http://www.cuyamaca.net/librarylab/Technical%20Help/cmspace.asp>, Retrieved on May 19, 2014, 16 pages.
Esther, "Instructions for Kobo Books: How to change to scrolling mode and do table of contents navigation—Google Groups", XP055513050, Retrieved from the Internet: URL:https://groups.google.com/forum/print/msg/viphone/-dkqODh_31N8acJK2dGPe8J?ctz=4607561_48_52_123900_48_436380 [retrieved on Oct. 5, 2018], Aug. 28, 2010, 3 Pages.
Fahey M., "The iPad Blows Up iPhone Apps Real Good", Available at <www.kotaku.com.au/2010/01/the-ipad-blows-up-iphone-apps-real-good/>, Jan. 28, 2010, 3 pages.
Fehily C., "Visual QuickStart Guide: Microsoft Windows 7", Peachpit Press, Sep. 8, 2009, pp. x,34-37, 40, 71, 76, and 267.
Harris et al., "Inside WordPerfect 6 for Windows", New Riders Publishing, 1994, pp. 1104-1108.
Kimura Ryoji, "Keynote presentation practice guide for iPad & iPhone", K.K. Rutles, first edition, Feb. 29, 2012, 4 pages (Official Copy Only) (See Communication under 37 CFR § 1.98(a) (3)).
King Adrian, "Inside Windows 95", Microsoft Press., Aug. 1994, pp. 176-182.
Moth D., "Share Code—Write Code Once for Both Mobile and Desktop Apps", MSDN Magazine, http://msdn.microsoft.com/en-us/magazine/cc163387.aspx, Jul. 2007, 11 pages.
MR Analytical, "Samsung Gear S3 App Launcher Widget—App Review", Available Online at <https://www.youtube.com/watch?v=HEfTv17peik>, Dec. 26, 2016, 5 pages.
International Preliminary Report on Patentability received for PCT Patent Application No. PCT/US2010/062306, mailed on Jul. 19, 2012, 13 pages.
International Search Report and Written Opinion received for PCT Patent Application No. PCT/US2010/062306, mailed on May 17, 2011, 18 pages.
International Preliminary Report on Patentability received for PCT Patent Application No. PCT/US2010/062314, issued on Jul. 10, 2012, 14 pages.
International Search Report and Written Opinion received for PCT Patent Application No. PCT/US2010/062314, mailed on Jun. 22, 2011, 17 pages.
International Preliminary Report on Patentability received for PCT Patent Application No. PCT/US2012/022401, mailed on Aug. 8, 2013, 12 pages.
International Search Report and Written Opinion received for PCT Patent Application No. PCT/US2012/022401, mailed on Jul. 6, 2012, 16 pages.
Invitation to Pay Additional Fees received for PCT Patent Application No. PCT/US2012/022401, mailed on May 4, 2012, 8 pages.
International Search Report and Written Opinion received for PCT Patent Application No. PCT/US2015/019306, mailed on Jun. 17, 2015, 15 pages.
International Search Report and Written Opinion received for PCT Application No. PCT/US2015/019309, mailed on Jun. 25, 2015, 15 pages.
Pogue David, "Windows Vista for Starters: The Missing Manual", available at <http://academic.safaribooksonline.com/book/operating-systems/0596528264>, Jan. 25, 2007, 18 pages.
Rossignol Joe, "IOS 10 Concept Simplifies Lock Screen with Collapsed Notifications", Available online at: https://www.macrumors.com/2016/06/16/ios-10-collapsed-notifications-concept/, Jun. 16, 2016, 10 pages.

(56) References Cited

OTHER PUBLICATIONS

Senicar et al., "User-Centred Design and Development of an Intelligent Light Switch for Sensor Systems", Technical Gazette, vol. 26, No. 2, available online at: https://hrcak.srce.hr/file/320403, 2019, pp. 339-345.
Trish's World, "Samsung Gear S3 Apps Launcher", Available Online at <https://www.youtube.com/watch?v=zlamYA-4XSQ>, Feb. 5, 2017, 1 page.
Wolfe Joanna, "Annotation Technologies: A Software and Research Review", Computers and Composition, vol. 19, No. 4, 2002, pp. 471-497.
Ziegler Chris, "Palm® Pre.TM. for Dummies®", For Dummies, Oct. 19, 2009, 9 pages.
Corrected Notice of Allowance received for U.S. Appl. No. 14/641,298, mailed on Dec. 9, 2021, 5 pages.
Corrected Notice of Allowance received for U.S. Appl. No. 17/157,166, mailed on Dec. 9, 2021, 4 pages.
Corrected Notice of Allowance received for U.S. Appl. No. 17/157,166, mailed on Dec. 15, 2021, 4 pages.
Decision to Grant received for European Patent Application No. 19729395.4, mailed on Dec. 9, 2021, 2 pages.
Ex Parte Quayle Action received for U.S. Appl. No. 17/121,610, mailed on Dec. 9, 2021, 7 pages.
Notice of Acceptance received for Australian Patent Application No. 2020239711, mailed on Dec. 16, 2021, 3 pages.
Office Action received for Chinese Patent Application No. 201910055588.3, mailed on Nov. 24, 2021, 24 pages (14 pages of English Translation and 10 pages of Official Copy).
Office Action received for Indian Patent Application No. 202014041529, mailed on Dec. 6, 2021, 6 pages.
Office Action received for Japanese Patent Application No. 2020-159840, mailed on Dec. 10, 2021, 13 pages (7 pages of English Translation and 6 pages of Official Copy).
Corrected Notice of Allowance received for U.S. Appl. No. 17/121,610, mailed on Mar. 31, 2022, 3 pages.
Corrected Notice of Allowance received for U.S. Appl. No. 17/157,166, mailed on Apr. 13, 2022, 4 pages.
Examiner-Initiated Interview Summary received for U.S. Appl. No. 17/027,373, mailed on Mar. 31, 2022, 4 pages.
Office Action received for Australian Patent Application No. 2018271366, mailed on May 17, 2021, 5 pages.
Office Action received for Japanese Patent Application No. 2020-159840, mailed on Mar. 28, 2022, 6 pages (3 pages of English Translation and 3 pages of Official Copy).
Applicant-Initiated Interview Summary received for U.S. Appl. No. 15/784,806, mailed on Jan. 24, 2022, 3 pages.
Extended European Search Report received for European Patent Application No. 21206800.1, mailed on Jan. 24, 2022, 8 pages.
Non-Final Office Action received for U.S. Appl. No. 17/476,404, mailed on Feb. 8, 2022, 26 pages.
Non-Final Office Action received for U.S. Appl. No. 17/027,373, mailed on Feb. 2, 2022, 17 pages.
Non-Final Office Action received for U.S. Appl. No. 17/483,679, mailed on Feb. 1, 2022, 19 pages.
Notice of Allowance received for Korean Patent Application No. 10-2021-0143923, mailed on Jan. 27, 2022, 4 pages (1 page of English Translation and 3 pages of Official Copy).
Notice of Allowance received for U.S. Appl. No. 17/483,582, mailed on Jan. 20, 2022, 10 pages.
Office Action received for Chinese Patent Application No. 201910400179.2, mailed on Dec. 27, 2021, 32 pages (13 pages of English Translation and 19 pages of Official Copy).
Supplemental Notice of Allowance received for U.S. Appl. No. 16/859,101, mailed on Feb. 7, 2022, 2 pages.
Applicant-Initiated Interview Summary received for U.S. Appl. No. 17/476,404, mailed on Mar. 18, 2022, 2 pages.
Corrected Notice of Allowance received for U.S. Appl. No. 16/859,101, mailed on Mar. 25, 2022, 2 pages.
Notice of Allowance received for U.S. Appl. No. 17/121,610, mailed on Mar. 11, 2022, 5 pages.
Notice of Allowance received for U.S. Appl. No. 17/157,166, mailed on Mar. 30, 2022, 6 pages.
Office Action received for Chinese Patent Application No. 202010126661.4, mailed on Mar. 4, 2022, 13 pages (8 pages of English Translation and 5 pages of Official Copy).
Office Action received for European Patent Application No. 18779093.6, mailed on Mar. 17, 2022, 4 pages.
Corrected Notice of Allowance received for U.S. Appl. No. 17/483,582, mailed on Feb. 15, 2022, 2 pages.
Office Action received for Chinese Patent Application No. 202110409273.1, mailed on Jan. 11, 2022, 11 pages (6 pages of English Translation and 5 pages of Official Copy).
Notice of Allowance received for Chinese Patent Application No. 201910055588.3, mailed on Mar. 2, 2022, 2 pages (1 page of English Translation and 1 page of Official Copy).
Office Action received for Australian Patent Application No. 2021201243, mailed on Feb. 17, 2022, 4 pages.
Office Action received for Australian Patent Application No. 2021203903, mailed on Feb. 24, 2022, 3 pages.
Supplemental Notice of Allowance received for U.S. Appl. No. 16/859,101, mailed on Feb. 25, 2022, 2 pages.
Corrected Notice of Allowance received for U.S. Appl. No. 17/157,166, mailed on Jan. 5, 2022, 4 pages.
Non-Final Office Action received for U.S. Appl. No. 17/483,549, mailed on Jan. 11, 2022, 5 pages.
Non-Final Office Action received for U.S. Appl. No. 17/483,564, mailed on Jan. 6, 2022, 23 pages.
Notice of Allowance received for U.S. Appl. No. 16/859,101, mailed on Jan. 18, 2022, 10 pages.
Office Action received for Chinese Patent Application No. 202110328602.X, mailed on Dec. 1, 2022, 28 pages (17 pages of English Translation 11 pages of Official Copy).
Office Action received for Korean Patent Application No. 10-2022-0053111, mailed on Dec. 12, 2022, 9 pages (4 pages of English Translation and 5 pages of Official Copy).
Final Office Action received for U.S. Appl. No. 17/479,897, mailed on Jan. 10, 2023, 15 pages.
Notice of Allowance received for U.S. Appl. No. 17/482,977, mailed on Jan. 24, 2023, 10 pages.
Applicant-Initiated Interview Summary received for U.S. Appl. No. 17/482,977, mailed on Dec. 5, 2022, 2 pages.
Applicant-Initiated Interview Summary received for U.S. Appl. No. 17/483,542, mailed on Nov. 23, 2022, 4 pages.
Final Office Action received for U.S. Appl. No. 15/784,806, mailed on Nov. 25, 2022, 52 pages.
International Preliminary Report on Patentability received for PCT Patent Application No. PCT/US2021/031760, mailed on Nov. 24, 2022, 11 pages.
International Search Report and Written Opinion received for PCT Patent Application No. PCT/US2022/029273, mailed on Oct. 27, 2022, 19 pages.
International Search Report and Written Opinion received for PCT Patent Application No. PCT/US2022/029580, mailed on Nov. 7, 2022, 20 pages.
Invitation to Pay Additional Fees and Partial International Search Report received for PCT Patent Application No. PCT/US2022/029580, mailed on Sep. 5, 2022, 13 pages.
Invitation to Pay Additional Fees received for PCT Patent Application No. PCT/US2022/029273, mailed on Sep. 2, 2022, 13 pages.
Invitation to Pay Search Fees received for European Patent Application No. 21728781.2, mailed on Dec. 2, 2022, 3 pages.
Non-Final Office Action received for U.S. Appl. No. 17/483,564, mailed on Nov. 28, 2022, 24 pages.
Non-Final Office Action received for U.S. Appl. No. 17/666,971, mailed on Dec. 8, 2022, 26 pages.
Office Action received for Chinese Patent Application No. 202110328601.5, mailed on Nov. 2, 2022, 32 pages (19 pages of English Translation and 13 pages of Official Copy).
QQ, "Method of QQ voice chat", Online Available at: https://www.taodocs.com/p-47909082.html, May 25, 2016, 3 pages (Official Copy only) See Communication Under 37 CFR § 1.98(a) (3).
Applicant-Initiated Interview Summary received for U.S. Appl. No. 17/483,542, mailed on May 22, 2023, 3 pages.

(56) References Cited

OTHER PUBLICATIONS

Applicant-Initiated Interview Summary received for U.S. Appl. No. 17/483,679, mailed on May 19, 2023, 3 pages.
Decision to Refuse received for European Patent Application No. 20205496.1, mailed on May 12, 2023, 16 pages.
Final Office Action received for U.S. Appl. No. 17/666,971, mailed on May 12, 2023, 29 pages.
Minutes of the Oral Proceedings received for European Patent Application No. 20205496.1, mailed on May 9, 2023, 7 pages.
Non-Final Office Action received for U.S. Appl. No. 17/872,736, mailed on May 11, 2023, 17 pages.
Office Action received for Australian Patent Application No. 2022228207, mailed on Apr. 28, 2023, 3 pages.
Non-Final Office Action received for U.S. Appl. No. 15/784,806, mailed on Oct. 5, 2022, 41 pages.
Non-Final Office Action received for U.S. Appl. No. 17/482,977, mailed on Oct. 13, 2022, 20 pages.
Notice of Allowance received for Chinese Patent Application No. 201910400179.2, mailed on Oct. 9, 2022, 4 pages (1 page of English Translation and 3 pages of Official Copy).
Notice of Allowance received for U.S. Appl. No. 17/027,373, mailed on Oct. 3, 2022, 5 pages.
Office Action received for Chinese Patent Application No. 202111652452.4, mailed on Aug. 29, 2022, 23 pages (12 pages of English Translation and 11 pages of Official Copy).
Notice of Acceptance received for Australian Patent Application No. 2021201243, mailed on Feb. 23, 2023, 3 pages.
Notice of Allowance received for Korean Patent Application No. 10-2021-7017731, mailed on Feb. 28, 2023, 5 pages (2 pages of English Translation and 3 pages of Official Copy).
Office Action received for Chinese Patent Application No. 202111652452.4, mailed on Feb. 11, 2023, 28 pages (13 pages of English Translation and 15 pages of Official Copy).
Office Action received for European Patent Application No. 21728781.2, mailed on Mar. 1, 2023, 13 pages.
Office Action received for Japanese Patent Application No. 2021-206121, mailed on Feb. 20, 2023, 7 pages (3 pages of English Translation and 4 pages of Official Copy).
Applicant-Initiated Interview Summary received for U.S. Appl. No. 15/784,806, mailed on Nov. 3, 2022, 5 pages.
Office Action received for Chinese Patent Application No. 202110328597.2, mailed on Oct. 10, 2022, 13 pages (7 pages of English Translation and 6 pages of Official Copy).
Decision on Opposition received for Australian Patent Application No. 2018271366, mailed on Mar. 3, 2023, 3 pages.
6. Voice chat with friends through QQ, online available at: https://v.qq.com/x/page/a0166p7xrt0.html, Sep. 22, 2015, 1 page (Official Copy Only) (See Communication under 37 CFR § 1.98(a) (3)).
Applicant-Initiated Interview Summary received for U.S. Appl. No. 17/483,564, mailed on Apr. 21, 2023, 5 pages.
Brief Communication Regarding Oral Proceedings received for European Patent Application No. 20205496.1, mailed on Apr. 19, 2023, 1 page.
Corrected Notice of Allowance received for U.S. Appl. No. 17/482,977, mailed on Apr. 24, 2023, 3 pages.
Corrected Notice of Allowance received for U.S. Appl. No. 17/950,900, mailed on Apr. 14, 2023, 2 pages.
Corrected Notice of Allowance received for U.S. Appl. No. 17/950,922, mailed on Apr. 14, 2023, 2 pages.
Jiutian Technology, “Windows 8 Chinese version from entry to proficiency”, Jan. 1, 2014, 5 pages (Official Copy Only) (See Communication under 37 CFR § 1.98(a) (3)).
Non-Final Office Action received for U.S. Appl. No. 17/903,946, mailed on Apr. 14, 2023, 17 pages.
Office Action received for Chinese Patent Application No. 202110327012.5, mailed on Mar. 16, 2023, 12 pages (7 pages of English Translation and 5 pages of Official Copy).
Office Action received for Chinese Patent Application No. 202110328601.5, mailed on Mar. 24, 2023, 25 pages (15 pages of English Translation and 10 pages of Official Copy).
Office Action received for European Patent Application No. 15714698.6, mailed on Apr. 18, 2023, 14 pages.
Result of Consultation received for European Patent Application No. 20205496.1, mailed on Apr. 18, 2023, 3 pages.
Song Jianhua, “Guidelines for Network”, Feb. 29, 2008, 11 pages (Official Copy Only) (See Communication under 37 CFR § 1.98(a) (3)).
Advisory Action received for U.S. Appl. No. 17/483,679, mailed on Sep. 20, 2022, 8 pages.
Invitation to Pay Additional Fees and Partial International Search Report received for PCT Patent Application No. PCT/US2022/029261, mailed on Aug. 29, 2022, 16 pages.
Non-Final Office Action received for U.S. Appl. No. 17/483,542, mailed on Sep. 22, 2022, 18 pages.
Applicant-Initiated Interview Summary received for U.S. Appl. No. 17/476,404, mailed on Jul. 27, 2022, 6 pages.
Abdulezer et al., “Skype For Dummies”, Available Online at: https://ixn.es/Skype%20For%20Dummies.pdf, 2007, 361 pages.
Applicant-Initiated Interview Summary received for U.S. Appl. No. 17/482,987, mailed on Apr. 11, 2022, 4 pages.
Applicant-Initiated Interview Summary received for U.S. Appl. No. 17/483,564, mailed on Jul. 21, 2022, 5 pages.
Applicant-Initiated Interview Summary received for U.S. Appl. No. 17/483,564, mailed on Mar. 14, 2022, 2 pages.
Applicant-Initiated Interview Summary received for U.S. Appl. No. 17/483,679, mailed on Apr. 29, 2022, 2 pages.
Applicant-Initiated Interview Summary received for U.S. Appl. No. 17/483,679, mailed on Aug. 23, 2022, 3 pages.
Applicant-Initiated Interview Summary received for U.S. Appl. No. 17/484,907, mailed on Jan. 10, 2022, 2 pages.
Corrected Notice of Allowance received for U.S. Appl. No. 17/027,373, mailed on Jul. 12, 2022, 2 pages.
Notice of Allowance received for U.S. Appl. No. 17/121,610, mailed on Jun. 7, 2022, 4 pages.
Notice of Allowance received for U.S. Appl. No. 17/121,610, mailed on May 20, 2022, 4 pages.
Notice of Allowance received for U.S. Appl. No. 17/157,166, mailed on Apr. 25, 2022, 4 pages.
Notice of Allowance received for U.S. Appl. No. 17/157,166, mailed on Jun. 29, 2022, 4 pages.
Corrected Notice of Allowance received for U.S. Appl. No. 17/483,549, mailed on Aug. 24, 2022, 3 pages.
Corrected Notice of Allowance received for U.S. Appl. No. 17/484,907, mailed on Aug. 26, 2022, 2 pages.
Corrected Notice of Allowance received for U.S. Appl. No. 17/484,907, mailed on Jun. 15, 2022, 2 pages.
Corrected Notice of Allowance received for U.S. Appl. No. 17/484,907, mailed on Mar. 18, 2022, 2 pages.
Final Office Action received for U.S. Appl. No. 17/476,404, mailed on May 5, 2022, 30 pages.
Final Office Action received for U.S. Appl. No. 17/483,564, mailed on Apr. 18, 2022, 23 pages.
Final Office Action received for U.S. Appl. No. 17/483,679, mailed on May 24, 2022, 21 pages.
“HuddleCamHD SimplTrack2 Auto Tracking Camera Installation & Operation Manual”, Available Online at: https://huddlecamhd.com/wp-content/uploads/2021/01/SimplTrack2-User-Manual-v1_2-6-20.pdf, Jun. 2020, 41 pages.
International Search Report and Written Opinion received for PCT Patent Application No. PCT/US2022/014271, mailed on Jul. 4, 2022, 23 pages.
Invitation to Pay Additional Fees and Partial International Search Report received for PCT Patent Application No. PCT/US2022/014271, mailed on May 12, 2022, 20 pages.
Non-Final Office Action received for U.S. Appl. No. 17/476,404, mailed on Sep. 14, 2022, 31 pages.
Non-Final Office Action received for U.S. Appl. No. 17/479,897, mailed on Aug. 30, 2022, 10 pages.
Non-Final Office Action received for U.S. Appl. No. 17/482,987, mailed on Jan. 18, 2022, 25 pages.
Non-Final Office Action received for U.S. Appl. No. 17/484,907, mailed on Nov. 19, 2021, 24 pages.

(56) References Cited

OTHER PUBLICATIONS

Notice of Acceptance received for Australian Patent Application No. 2021203903, mailed on May 25, 2022, 3 pages.
Notice of Allowance received for Chinese Patent Application No. 202110409273.1, mailed on Aug. 2, 2022, 4 pages (1 page of English Translation and 3 pages of Official Copy).
Notice of Allowance received for Japanese Patent Application No. 2020-159840, mailed on Jul. 8, 2022, 4 pages (1 page of English Translation and 3 pages of Official Copy).
Notice of Allowance received for Japanese Patent Application No. 2021-074395, mailed on Jun. 27, 2022, 4 pages (1 page of English Translation and 3 pages of Official Copy).
Notice of Allowance received for Korean Patent Application No. 10-2020-0123805, mailed on Jun. 19, 2022, 5 pages (2 pages of English Translation and 3 pages of Official Copy).
Notice of Allowance received for U.S. Appl. No. 17/027,373, mailed on Aug. 2, 2022, 2 pages.
Notice of Allowance received for U.S. Appl. No. 17/027,373, mailed on Jun. 3, 2022, 8 pages.
Notice of Allowance received for U.S. Appl. No. 17/121,610, mailed on Jul. 7, 2022, 5 pages.
Notice of Allowance received for U.S. Appl. No. 17/121,610, mailed on Jul. 13, 2022, 4 pages.
Notice of Allowance received for U.S. Appl. No. 17/482,987, mailed on Jun. 23, 2022, 9 pages.
Notice of Allowance received for U.S. Appl. No. 17/482,987, mailed on May 11, 2022, 10 pages.
Notice of Allowance received for U.S. Appl. No. 17/483,549, mailed on Apr. 15, 2022, 10 pages.
Notice of Allowance received for U.S. Appl. No. 17/483,582, mailed on Apr. 19, 2022, 5 pages.
Notice of Allowance received for U.S. Appl. No. 17/484,907, mailed on Jul. 25, 2022, 10 pages.
Notice of Allowance received for U.S. Appl. No. 17/484,907, mailed on Mar. 2, 2022, 13 pages.
Notice of Allowance received for U.S. Appl. No. 17/484,907, mailed on May 20, 2022, 13 pages.
Office Action received for Australian Patent Application No. 2021201243, mailed on Jun. 1, 2022, 5 pages.
Office Action received for Chinese Patent Application No. 202010126661.4, mailed on Jun. 2, 2022, 11 pages (7 pages of English Translation and 4 pages of Official Copy).
Office Action received for Chinese Patent Application No. 202110327012.5, mailed on Apr. 29, 2022, 17 pages (10 pages of English Translation and 7 pages of Official Copy).
Office Action received for Chinese Patent Application No. 202110328597.2, mailed on Apr. 15, 2022, 18 pages (9 pages of English Translation and 9 pages of Official Copy).
Office Action received for Chinese Patent Application No. 202110328601.5, mailed on Apr. 27, 2022, 25 pages (14 pages of English Translation and 11 pages of Official Copy).
Office Action received for Chinese Patent Application No. 202110328602.X, mailed on Mar. 24, 2022, 6 pages (3 pages of English Translation and 3 pages of Official Copy).
Office Action received for Korean Patent Application No. 10-2021-7017731, mailed on May 30, 2022, 5 pages (2 pages of English Translation and 3 pages of Official Copy).
Summons to Attend Oral Proceedings received for European Patent Application No. 20205496.1, mailed on Sep. 8, 2022, 9 pages.
Applicant-Initiated Interview Summary received for U.S. Appl. No. 17/476,404, mailed on Dec. 20, 2022, 2 pages.
Invitation to Pay Search Fees received for European Patent Application No. 15714698.6, mailed on Dec. 16, 2022, 4 pages.
Non-Final Office Action received for U.S. Appl. No. 17/483,679, mailed on Dec. 9, 2022, 31 pages.
Office Action received for Australian Patent Application No. 2021201243, mailed on Dec. 12, 2022, 3 pages.
Office Action received for Australian Patent Application No. 2022201532, mailed on Dec. 19, 2022, 5 pages.
Office Action received for Chinese Patent Application No. 202110327012.5, mailed on Nov. 28, 2022, 16 pages (10 pages of English Translation and 6 pages of Official Copy).
Businesswire, "SMI Gaze Interaction Powers Google Glass Prototype", Online Available at: https://www.youtube.com/watch?v=R3xxqap7DmQ&t=1s, Mar. 3, 2015, 3 pages.
Howmuchtech, "5 Best Smart Glasses of 2022", Online Available at: https://www.youtube.com/watch?v=xll2Ycc6Fv0&t=162s, Dec. 24, 2021, 6 pages.
Special Effect, "Open Drive—Eye Gaze Games | Eye Gaze Controls & Options", Online Available at: https://www.youtube.com/watch?v=lJi2aOdSau8&t=63s, Mar. 18, 2022, 3 pages.
Notice of Acceptance received for Australian Patent Application No. 2018271366, mailed on Mar. 31, 2023, 3 pages.
Office Action received for Indian Patent Application No. 202215025361, mailed on Mar. 29, 2023, 6 pages.
Notice of Allowance received for Japanese Patent Application No. 2022-125792, mailed on Jan. 27, 2023, 4 pages (1 page of English Translation and 3 pages of Official Copy).
Non-Final Office Action received for U.S. Appl. No. 17/483,542, mailed on Jan. 31, 2023, 14 pages.
Dolan Tim, "How to Make a Laptop Webcam into a Document Camera—IPEVO Mirror—Cam Review", Retrieved from the internet: URL:https://www.youtube.com/watch?v =-K8jyZ1hbbg, Aug. 29, 2020, 1 page.
Larson Tom, "How to Turn your Webcam into a Document Camera", Retrieved from the Internet: URL: https://www.youtube.com/watchv=UlaW22FxRZM, Nov. 7, 2020, 1 page.
Applicant-Initiated Interview Summary received for U.S. Appl. No. 17/479,897, mailed on Oct. 31, 2022, 3 pages.
Corrected Notice of Allowance received for U.S. Appl. No. 17/027,373, mailed on Oct. 26, 2022, 2 pages.
International Search Report and Written Opinion received for PCT Patent Application No. PCT/US2022/029261, mailed on Oct. 20, 2022, 18 pages.
Notice of Allowance received for Korean Patent Application No. 10-2022-0091730, mailed on Oct. 4, 2022, 5 pages (2 pages of English Translation and 3 pages of official copy).
Applicant-Initiated Interview Summary received for U.S. Appl. No. 17/950,900, mailed on Jan. 26, 2023, 5 pages.
Final Office Action received for U.S. Appl. No. 17/950,900, mailed on Jan. 23, 2023, 14 pages.
International Search Report and Written Opinion received for PCT Patent Application No. PCT/US2022/044592, mailed on Mar. 14, 2023, 22 pages.
Invitation to Pay Additional Fees received for PCT Patent Application No. PCT/US2022/044592, mailed on Jan. 16, 2023, 21 pages.
Non-Final Office Action received for U.S. Appl. No. 17/476,404, mailed on Mar. 30, 2023, 29 pages.
Non-Final Office Action received for U.S. Appl. No. 17/950,900, mailed on Dec. 1, 2022, 14 pages.
Notice of Allowance received for U.S. Appl. No. 17/950,900, mailed on Mar. 7, 2023, 10 pages.
Notice of Allowance received for U.S. Appl. No. 17/950,922, mailed on Apr. 5, 2023, 10 pages.
Office Action received for Indian Patent Application No. 202015013360, mailed on Mar. 17, 2023, 7 pages.
Office Action received for Indian Patent Application No. 202215025360, mailed on Mar. 29, 2023, 6 pages.
Office Action received for Indian Patent Application No. 202215025363, mailed on Mar. 29, 2023, 6 pages.
Office Action received for Indian Patent Application No. 202215025364, mailed on Mar. 29, 2023, 6 pages.
Non-Final Office Action received for U.S. Appl. No. 17/479,897, mailed on Apr. 25, 2023, 14 pages.
Intention to Grant received for European Patent Application No. 20166552.8, mailed on Jun. 29, 2023, 8 pages.
Notice of Allowance received for Australian Patent Application No. 2022228207, mailed on Jul. 3, 2023, 3 pages.
Notice of Allowance received for U.S. Appl. No. 17/483,564, mailed on Jul. 17, 2023, 46 pages.
Office Action received for European Patent Application No. 21206800.1, mailed on Jun. 30, 2023, 6 pages.

(56) References Cited

OTHER PUBLICATIONS

Office Action received for Korean Patent Application No. 10-2022-0053111, mailed on Jun. 29, 2023, 7 pages (3 pages of English Translation and 4 pages of Official Copy).
Final Office Action received for U.S. Appl. No. 17/483,564, mailed on May 25, 2023, 26 pages.
Notice of Acceptance received for Australian Patent Application No. 2022201532, mailed on May 22, 2023, 3 pages.
Notice of Allowance received for Japanese Patent Application No. 2021-206121, mailed on May 15, 2023, 4 pages (1 page of English Translation and 3 pages of Official Copy).
Office Action received for Chinese Patent Application No. 202110328597.2, mailed on May 15, 2023, 13 pages (6 pages of English Translation and 7 pages of Official Copy).
Intention to Grant received for European Patent Application No. 21728781.2, mailed on Jul. 28, 2023, 9 pages.
Non-Final Office Action received for U.S. Appl. No. 17/732,204, mailed on Aug. 4, 2023, 18 pages.
Non-Final Office Action received for U.S. Appl. No. 17/732,355, mailed on Aug. 4, 2023, 19 pages.
Non-Final Office Action received for U.S. Appl. No. 17/740,104, mailed on Aug. 2, 2023, 15 pages.
Office Action received for Chinese Patent Application No. 202110328597.2, mailed on Jul. 18, 2023, 16 pages (1 page of English Translation and 15 pages of Official Copy).
Office Action received for Chinese Patent Application No. 202110328602.X, mailed on June 6. 29, 2023, 27 pages (18 pages of English Translation and 9 pages of Official Copy).
Applicant-Initiated Interview Summary received for U.S. Appl. No. 17/732,355, mailed on Sep. 20, 2023, 2 pages.
Notice of Allowance received for U.S. Appl. No. 17/950,922, mailed on Sep. 20, 2023, 6 pages.
Notice of Hearing received for Indian Patent Application No. 201814036860, mailed on Sep. 8, 2023, 2 pages.
Applicant-Initiated Interview Summary received for U.S. Appl. No. 17/684,843, mailed on Oct. 5, 2023, 4 pages.
Corrected Notice of Allowance received for U.S. Appl. No. 17/666,971, mailed on Sep. 29, 2023, 2 pages.
Corrected Notice of Allowance received for U.S. Appl. No. 17/872,736, mailed on Oct. 13, 2023, 4 pages.
Corrected Notice of Allowance received for U.S. Appl. No. 17/950,922, mailed on Oct. 2, 2023, 3 pages.
International Search Report and Written Opinion received for PCT Patent Application No. PCT/US2023/017280, mailed on Jun. 26, 2023, 20 pages.
Notice of Allowance received for Korean Patent Application No. 10-2023-7024157, mailed on Sep. 19, 2023, 7 pages (2 pages of English Translation and 5 pages of Official Copy).
Notice of Allowance received for U.S. Appl. No. 17/479,897, mailed on Oct. 3, 2023, 5 pages.
Notice of Allowance received for U.S. Appl. No. 17/732,204, mailed on Oct. 12, 2023, 8 pages.
Notice of Allowance received for U.S. Appl. No. 17/740,104, mailed on Oct. 4, 2023, 5 pages.
Corrected Notice of Allowance received for U.S. Appl. No. 17/950,900, mailed on Jun. 30, 2023, 2 pages.
Examiner Interview Summary received for U.S. Appl. No. 17/903,946, mailed on Jun. 28, 2023, 2 pages.
Office Action received for Chinese Patent Application No. 202111652452.4, mailed on May 19, 2023, 15 pages (8 pages of English Translation and 7 pages of Official Copy).
Office Action received for European Patent Application No. 18779093.6, mailed on Jun. 28, 2023, 4 pages.
Applicant Initiated Interview Summary received for U.S. Appl. No. 17/666,971, mailed on Jun. 9, 2023, 2 pages.
Applicant-Initiated Interview Summary received for U.S. Appl. No. 17/476,404, mailed on Jun. 2, 2023, 2 pages.
Applicant-Initiated Interview Summary received for U.S. Appl. No. 17/479,897, mailed on Jun. 12, 2023, 2 pages.
Applicant-Initiated Interview Summary received for U.S. Appl. No. 17/483,564, mailed on Jun. 21, 2023, 4 pages.
Final Office Action received for U.S. Appl. No. 17/483,679, mailed on Jun. 13, 2023, 33 pages.
Notice of Allowance received for U.S. Appl. No. 17/950,900, mailed on Jun. 16, 2023, 6 pages.
Applicant-Initiated Interview Summary received for U.S. Appl. No. 17/483,679, mailed on Aug. 18, 2023, 2 pages.
Corrected Notice of Allowance received for U.S. Appl. No. 17/479,897, mailed on Aug. 17, 2023, 2 pages.
Ex-Parte Quayle Action received for U.S. Appl. No. 17/903,946, mailed on Aug. 4, 2023, 4 pages.
International Preliminary Report on Patentability received for PCT Patent Application No. PCT/US2022/014271, mailed on Aug. 10, 2023, 17 pages.
Non-Final Office Action received for U.S. Appl. No. 17/684,843, mailed on Aug. 11, 2023, 23 pages.
Notice of Allowance received for U.S. Appl. No. 17/483,542, mailed on Aug. 11, 2023, 9 pages.
Notice of Allowance received for U.S. Appl. No. 17/666,971, mailed on Aug. 16, 2023, 8 pages.
Notice of Allowance received for U.S. Appl. No. 17/872,736, mailed on Aug. 21, 2023, 6 pages.
Corrected Notice of Allowance received for U.S. Appl. No. 17/483,542, mailed on Aug. 25, 2023, 3 pages.
Final Office Action received for U.S. Appl. No. 17/476,404, mailed on Sep. 12, 2023, 30 pages.
Non-Final Office Action received for U.S. Appl. No. 17/483,679, mailed on Sep. 13, 2023, 32 pages.
Notice of Allowance received for U.S. Appl. No. 17/872,736, mailed on Aug. 30, 2023, 4 pages.
Office Action received for Japanese Patent Application No. 2022-116534, mailed on Aug. 28, 2023, 10 pages (5 pages of English Translation and 5 pages of Official Copy).
Applicant-Initiated Interview Summary received for U.S. Appl. No. 17/872,736, mailed on Jul. 25, 2023, 2 pages.
Garrison DR., "An Analysis and Evaluation of Audio Teleconferencing to Facilitate Education at a Distance", Online Available at: https://doi.org/10.1080/08923649009526713, American journal of distance education, Jol. 4, No. 3, Sep. 24, 2009, 14 pages.
Notice of Allowance received for Chinese Patent Application No. 202110328601.5, mailed on Jul. 5, 2023, 5 pages (1 page of English Translation and 4 pages of Official Copy).
Notice of Allowance received for U.S. Appl. No. 17/479,897, mailed on Jul. 26, 2023, 7 pages.
Shangmeng Li, "The Design and Implementation of Mobile Terminal System of Multimedia Conference Based on Symbian Operating System", China Academic Journal Electronic Publishing House, online available at: http://www.cnki.net, 2011, 66 pages (Official Copy only) (See Communication Under 37 CFR § 1.98(a) (3)).
International Preliminary Report on Patentability received for PCT Patent Application No. PCT/US2022/029261, mailed on Nov. 30, 2023, 12 pages,.
Applicant-Initiated Interview Summary received for U.S. Appl. No. 17/476,404, mailed on Oct. 31, 2023, 4 pages.
Applicant-Initiated Interview Summary received for U.S. Appl. No. 17/483,679, mailed on Dec. 18, 2023, 2 pages.
Applicant-Initiated Interview Summary received for U.S. Appl. No. 18/067,350, mailed on Sep. 11, 2023, 4 pages.
Applicant-Initiated Interview Summary received for U.S. Appl. No. 18/165,144, mailed on Feb. 27, 2024, 3 pages.
Corrected Notice of Allowance received for U.S. Appl. No. 17/483,542, mailed on Feb. 5, 2024, 3 pages.
Corrected Notice of Allowance received for U.S. Appl. No. 17/666,971, mailed on Jan. 16, 2024, 2 pages.
Corrected Notice of Allowance received for U.S. Appl. No. 17/732,204, mailed on Dec. 4, 2023, 5 pages.
Corrected Notice of Allowance received for U.S. Appl. No. 17/732,204, mailed on Jan. 18, 2024, 5 pages.
Corrected Notice of Allowance received for U.S. Appl. No. 17/732,204, mailed on Nov. 16, 2023, 6 pages.
Corrected Notice of Allowance received for U.S. Appl. No. 17/740,104, mailed on Jan. 2, 2024, 2 pages.

(56) References Cited

OTHER PUBLICATIONS

Decision to Grant received for European Patent Application No. 21728781.2, mailed on Feb. 8, 2024, 3 pages.
Decision to Refuse received for Japanese Patent Application No. 2022-116534, mailed on Jan. 29, 2024, 5 pages (2 pages of English Translation and 3 pages of Official Copy).
Examiner's Answer to Appeal Brief received for U.S. Appl. No. 15/784,806, mailed on Dec. 22, 2023, 27 pages.
Extended European Search Report received for European Patent Application No. 23172038.4, mailed on Oct. 11, 2023, 10 pages.
Extended European Search Report received for European Patent Application No. 23203414.0, mailed on Jan. 26, 2024, 10 pages.
Final Office Action received for U.S. Appl. No. 17/483,679, mailed on Feb. 6, 2024, 45 pages.
Final Office Action received for U.S. Appl. No. 17/732,355, mailed on Nov. 3, 2023, 21 pages.
Final Office Action received for U.S. Appl. No. 18/067,350, mailed on Dec. 13, 2023, 44 pages.
Intention to Grant received for European Patent Application No. 15714698.6, mailed on Dec. 8, 2023, 9 pages.
Intention to Grant received for European Patent Application No. 21728781.2, mailed on Dec. 12, 2023, 9 pages.
International Preliminary Report on Patentability received for PCT Patent Application No. PCT/US2022/029273, mailed on Nov. 30, 2023, 14 pages.
International Preliminary Report on Patentability received for PCT Patent Application No. PCT/US2022/029580, mailed on Nov. 30, 2023, 14 pages.
International Search Report and Written Opinion received for PCT Patent Application No. PCT/US2023/020569, mailed on Nov. 13, 2023, 23 pages.
Invitation to Pay Additional Fees and Partial International Search Report received for PCT Patent Application No. PCT/US2023/020569, mailed on Sep. 21, 2023, 14 pages.
Non-Final Office Action received for U.S. Appl. No. 18/067,350, mailed on Aug. 3, 2023, 41 pages.
Non-Final Office Action received for U.S. Appl. No. 18/165,144, mailed on Dec. 27, 2023, 20 pages.
Notice of Acceptance received for Australian Patent Application No. 2023248185, mailed on Jan. 23, 2024, 3 pages.
Notice of Allowance received for Korean Patent Application No. 10-2023-7039382, mailed on Feb. 13, 2024, 6 pages (2 pages of English Translation and 4 pages of Official Copy).
Notice of Allowance received for Korean Patent Application No. 10-2024-7000870, mailed on Feb. 13, 2024, 5 pages (2 pages of English Translation and 3 pages of Official Copy).
Notice of Allowance received for U.S. Appl. No. 17/483,542, mailed on Dec. 20, 2023, 6 pages.
Notice of Allowance received for U.S. Appl. No. 17/666,971, mailed on Dec. 15, 2023, 8 pages.
Notice of Allowance received for U.S. Appl. No. 17/684,843, mailed on Feb. 14, 2024, 8 pages.
Office Action received for Australian Patent Application No. 2023201057, mailed on Jan. 25, 2024, 6 pages.
Office Action received for Australian Patent Application No. 2023204396, mailed on Jan. 8, 2024, 5 pages.
Office Action received for Australian Patent Application No. 2023248185, mailed on Nov. 22, 2023, 2 pages.
Office Action received for Australian Patent Application No. 2023248185, mailed on Oct. 20, 2023, 3 pages.
Office Action received for European Patent Application No. 20166552.8, mailed on Nov. 3, 2023, 3 pages.
Office Action received for Korean Patent Application No. 10-2022-0053111, mailed on Oct. 23, 2023, 10 pages (5 pages of English Translation and 5 pages of Official Copy).
Office Action received for Korean Patent Application No. 10-2023-0001668, mailed on Nov. 3, 2023, 5 pages (2 pages of English Translation and 3 pages of Official Copy).
Applicant-Initiated Interview Summary received for U.S. Appl. No. 18/067,350, mailed on Mar. 13, 2024, 4 pages.
Corrected Notice of Allowance received for U.S. Appl. No. 17/684,843, mailed on Mar. 4, 2024, 2 pages.
Office Action received for Korean Patent Application No. 10-2023-7018775, mailed on Feb. 28, 2024, 9 pages (4 pages of English Translation and 5 pages of Official Copy).
Non-Final Office Action received for U.S. Appl. No. 18/067,350, mailed on May 28, 2024, 43 pages.
Notice of Allowance received for Chinese Patent Application No. 202311042451.7, mailed on May 15, 2024, 4 pages (1 page of English Translation and 3 pages of Official Copy).
Avery et al., "Kinect", Wikipedia, Feb. 26, 2015, 14 pages.
Extended European Search Report received for European Patent Application No. 24160234.1, mailed on May 28, 2024, 6 pages.
Final Office Action received for U.S. Appl. No. 18/165,144, mailed on Jun. 11, 2024, 32 pages.
Notice of Acceptance received for Australian Patent Application No. 2024202768, mailed on Jun. 4, 2024, 3 pages.
Notice of Allowance received for U.S. Appl. No. 17/684,843, mailed on Jun. 5, 2024, 5 pages.
Office Action received for European Patent Application No. 22705232.1, mailed on May 27, 2024, 7 pages.
Office Action received for Japanese Patent Application No. 2023-571161, mailed on May 28, 2024, 4 pages (2 pages of English Translation and 2 pages of Official Copy).
Corrected Notice of Allowance received for U.S. Appl. No. 17/903,946, mailed on Apr. 22, 2024, 2 pages.
Non-Final Office Action received for U.S. Appl. No. 17/950,868, mailed on Apr. 24, 2024, 16 pages.
Non-Final Office Action received for U.S. Appl. No. 18/138,348, mailed on Apr. 30, 2024, 16 pages.
Notice of Acceptance received for Australian Patent Application No. 2023204396, mailed on Apr. 15, 2024, 3 pages.
Decision to Grant received for European Patent Application No. 15714698.6, mailed on Apr. 5, 2024, 2 pages.
International Preliminary Report on Patentability received for PCT Patent Application No. PCT/US2022/044592, mailed on Apr. 4, 2024, 21 pages.
International Search Report and Written Opinion received for PCT Patent Application No. PCT/US2023/032792, mailed on Jan. 19, 2024, 15 pages.
International Search Report and Written Opinion received for PCT Patent Application No. PCT/US2023/032911, mailed on Jan. 4, 2024, 18 pages.
International Search Report and Written Opinion received for PCT Patent Application No. PCT/US2023/033372, mailed on Jan. 12, 2024, 21 pages.
Invitation to Pay Additional Fees and Partial International Search Report received for PCT Patent Application No. PCT/US2023/033372, mailed on Nov. 22, 2023, 13 pages.
Non-Final Office Action received for U.S. Appl. No. 17/970,417, mailed on Apr. 10, 2024, 16 pages.
Notice of Allowance received for Korean Patent Application No. 10-2023-7044044, mailed on Mar. 14, 2024, 7 pages (2 pages of English Translation and 5 pages of Official Copy),.
Notice of Allowance received for U.S. Appl. No. 17/903,946, mailed on Apr. 10, 2024, 7 pages.
Office Action received for Japanese Patent Application No. 2023-028786, mailed on Mar. 22, 2024, 10 pages (5 pages of English Translation and 5 pages of Official Copy).
Office Action received for Korean Patent Application No. 10-2023-7040599, mailed on Mar. 12, 2024, 6 pages (2 pages of English Translation and 4 pages of Official Copy). .
Applicant-Initiated Interview Summary received for U.S. Appl. No. 18/067,350, mailed on Jul. 29, 2024, 3 pages.
Extended European Search Report received for European Patent Application No. 24159026.4, mailed on Jul. 10, 2024, 9 pages.
Invitation to Pay Additional Fees received for PCT Patent Application No. PCT/US2024/017017, mailed on May 15, 2024, 3 pages.
Notice of Allowance received for Japanese Patent Application No. 2023-097196, mailed on Jul. 29, 2024, 4 pages (1 page of English Translation and 3 pages of Official Copy).

(56) References Cited

OTHER PUBLICATIONS

Notice of Allowance received for Japanese Patent Application No. 2023-571161, mailed on Jul. 30, 2024, 3 pages (1 page of English Translation and 2 pages of Official Copy).
Office Action received for Japanese Patent Application No. 2023-571312, mailed on Jul. 16, 2024, 4 pages (2 pages of English Translation and 2 pages of Official Copy).
Office Action received for Korean Patent Application No. 10-2024-7019962, mailed on Jul. 16, 2024, 6 pages (2 pages of English Translation and 4 pages of Official Copy).
Office Action received for Chinese Patent Application No. 201910704856.X, mailed on Mar. 8, 2024, 13 pages (7 pages of English Translation and 6 pages of Official Copy).
Extended European Search Report received for European Patent Application No. 24164409.5, mailed on Jun. 14, 2024, 5 pages.
Notice of Allowance received for Korean Patent Application No. 10-2023-0001668, mailed on May 22, 2024, 6 pages (2 pages of English Translation and 4 pages of Official Copy).
Office Action received for Australian Patent Application No. 2023201057, mailed on Jun. 19, 2024, 5 pages.
Office Action received for Chinese Patent Application No. 201910704856.X, mailed on Jun. 11, 2024, 33 pages (1 page of English Translation and 32 pages of Official Copy).
Applicant-Initiated Interview Summary received for U.S. Appl. No. 17/950,868, mailed on Jul. 19, 2024, 2 pages.
Applicant-Initiated Interview Summary received for U.S. Appl. No. 18/165,144, mailed on Jul. 15, 2024, 4 pages.
Non-Final Office Action received for U.S. Patent Application No. 18/380, 116, mailed on Jul. 18, 2024, 16 pages.
Notice of Allowance received for Korean Patent Application No. 10-2023-7040599, mailed on Jun. 26, 2024, 7 pages (2 pages of English Translation and 5 pages of Official Copy).
Office Action received for Chinese Patent Application No. 201910704856.X, mailed on Jun. 23, 2024, 12 pages (6 pages of English Translation and 6 pages of Official Copy).
Office Action received for Chinese Patent Application No. 202110894284.3, mailed on Jun. 27, 2024, 10 pages (5 pages of English Translation and 5 pages of Official Copy).
Office Action received for Chinese Patent Application No. 202311185909.4, mailed on Jun. 12, 2024, 18 pages (10 pages of English Translation and 8 pages of Official Copy).
Anonymous, "Split Your Screen with IPEVO Visualizer Software", On IPEVO, Available online at: https://medium.com/ipevo/split-your-screen-with-ipevo-visualizer-software-e9641024d24f, Feb. 24, 2020, 10 pages.
Applicant-Initiated Interview Summary received for U.S. Appl. No. 17/970,417, mailed on Jun. 26, 2024, 2 pages.
Cosmic Mook,"LINE laboratory, New function Exhaustive Coverage! LINE 120% Application Guide, Inc.", Jan. 24, 2018, 7 pages (Official Copy Only). {See Communication Under Rule 37 CFR § 1.98(a) (3)}.
Examiner-Initiated Interview Summary received for U.S. Appl. No. 17/950,868, mailed on Jul. 5, 2024, 2 pages.
Myoko Mori, "Line Perfect Guidebook [Revised Version]", Sotec Co. Ltd., Dec. 31, 2013, 5 pages (Official Copy Only). {See Communication Under Rule 37 CFR § 1.98(a) (3)}.
Notice of Allowance received for Japanese Patent Application No. 2022-116534, mailed on Jun. 24, 2024, 4 pages (1 page of English Translation and 3 pages of Official Copy).
Notice of Allowance received for Korean Patent Application No. 10-2022-0053111, mailed on Jun. 25, 2024, 7 pages (2 pages of English Translation and 5 pages of Official Copy).
Octoba, "Enjoy free calls with LINE! Part 2", retrieved from: https://web.archive.org/web/20170923013859/https://octoba.net/archives/line-call2.html, Sep. 23, 2017, 13 pages (Official Copy Only). {See Communication Under Rule 37 CFR § 1.98(a) (3)}.
Office Action received for European Patent Application No. 22792995.7, mailed on Jun. 24, 2024, 6 pages.
Office Action received for Japanese Patent Application No. 2023-097196, mailed on Jun. 7, 2024, 7 pages (3 pages of English Translation and 4 pages of Official Copy).
Office Action received for Japanese Patent Application No. 2024-003876, mailed on Jul. 2, 2024, 3 pages (1 page of English Translation and 2 pages of Official Copy).
Decision to Grant received for Japanese Patent Application No. 2024-003876, mailed on Sep. 2, 2024, 3 pages (1 page of English Translation and 2 pages of Official Copy).
Office Action received for Chinese Patent Application No. 202410030102.1, mailed on Jul. 23, 2024, 18 pages (9 pages of English Translation and 9 pages of Official Copy).
Office Action received for Chinese Patent Application No. 202311835200.4, mailed on Aug. 29, 2024, 16 pages (7 pages of English Translation and 9 pages of Official Copy).
Applicant-Initiated Interview Summary received for U.S. Appl. No. 18/067,350, mailed on Nov. 26, 2024, 3 pages.
Applicant-Initiated Interview Summary received for U.S. Appl. No. 18/140,449, mailed on Nov. 26, 2024, 2 pages.
Corrected Notice of Allowance received for U.S. Appl. No. 17/950,868, mailed on Nov. 27, 2024, 3 pages.
Corrected Notice of Allowance received for U.S. Appl. No. 18/138,348, mailed on Nov. 27, 2024, 2 pages.
Notice of Allowance received for U.S. Appl. No. 18/389,655, mailed on Nov. 27, 2024, 8 pages.
Advisory Action received for U.S. Appl. No. 14/263,889, mailed on May 26, 2016, 4 pages.
Advisory Action received for U.S. Appl. No. 15/725,868, mailed on Dec. 10, 2018, 5 pages.
Advisory Action received for U.S. Appl. No. 16/666,073, mailed on Jul. 7, 2020, 5 pages.
Advisory Action received for U.S. Appl. No. 17/950,868, mailed on Sep. 24, 2024, 3 pages.
Applicant-Initiated Interview Summary received for U.S. Appl. No. 14/263,889, mailed on Apr. 15, 2016, 3 pages.
Applicant-Initiated Interview Summary received for U.S. Appl. No. 15/725,868, mailed on Jul. 25, 2018, 3 pages.
Applicant-Initiated Interview Summary received for U.S. Appl. No. 15/725,868, mailed on May 13, 2019,.
Applicant-Initiated Interview Summary received for U.S. Appl. No. 15/725,868, mailed on Nov. 20, 2018, 3 pages.
Applicant-Initiated Interview Summary received for U.S. Appl. No. 17/950,868, mailed on Sep. 10, 2024, 3 pages.
Applicant-Initiated Interview Summary received for U.S. Appl. No. 17/970,417, mailed on Nov. 4, 2024, 2 pages.
Applicant-Initiated Interview Summary received for U.S. Appl. No. 18/140,449, mailed on Aug. 27, 2024, 2 pages.
Applicant-Initiated Interview Summary received for U.S. Appl. No. 18/389,655, mailed on Sep. 20, 2024, 6 pages.
Baudisch et al., "Back-of-device interaction allows creating very small touch devices", Chi 2009 - Digital Life, New World:Conference Proceedings And Extended Abstracts; The 27th Annual Chi Conference On Human Factors In Computing Systems. Available online at <http://dx.doi.org/10.1145/1518701.1518995>, Apr. 9, 2009, pp. 1923-1932.
Corrected Notice of Allowance received for U.S. Appl. No. 15/725,868, mailed on Aug. 23, 2019, 2 pages.
Corrected Notice of Allowance received for U.S. Appl. No. 15/725,868, mailed on Sep. 30, 2019, 3 pages.
Corrected Notice of Allowance received for U.S. Appl. No. 16/666,073, mailed on Apr. 6, 2021, 3 pages.
Corrected Notice of Allowance received for U.S. Appl. No. 16/666,073, mailed on Apr. 26, 2021, 4 pages.
Corrected Notice of Allowance received for U.S. Appl. No. 16/666,073, mailed on Feb. 22, 2021, 3 pages.
Corrected Notice of Allowance received for U.S. Appl. No. 16/666,073, mailed on Mar. 11, 2021, 3 pages.
Corrected Notice of Allowance received for U.S. Appl. No. 17/684,843, mailed on Oct. 7, 2024, 2 pages.
Corrected Notice of Allowance received for U.S. Appl. No. 17/903,946, mailed on Sep. 3, 2024, 2 pages.

(56) References Cited

OTHER PUBLICATIONS

Decision on Appeal received for Korean Patent Application No. 10-2020-7034959, mailed on Jul. 25, 2022, 28 pages (5 pages of English Translation and 23 pages of Official Copy).
Decision on Appeal received for U.S. Appl. No. 15/784,806, mailed on Sep. 4, 2024, 15 pages.
Decision to Grant received for European Patent Application No. 10763539.3, mailed on Jul. 19, 2018, 3 pages.
Decision to Grant received for European Patent Application No. 18188433.9, mailed on Aug. 13, 2020, 3 pages.
Decision to Grant received for Japanese Patent Application No. 2023-571312, mailed on Aug. 29, 2024, 3 pages (1 page of English Translation and 2 pages of Official Copy).
Decision to Refuse received for Japanese Patent Application No. 2013-503731, mailed on Jun. 23, 2014, 4 pages (2 pages of English Translation and 2 pages of Official Copy).
Examiner's Pre-Review Report received for Japanese Patent Application No. 2014-212867, mailed on Nov. 4, 2016, 5 pages (2 pages of English Translation and 3 pages of Official Copy).
Extended European Search Report received for European Patent Application No. 18188433.9, mailed on Oct. 29, 2018, 8 pages.
Final Office Action received for U.S. Appl. No. 12/794,766, mailed on Nov. 26, 2012, 23 pages.
Final Office Action received for U.S. Appl. No. 14/263,889, mailed on Jan. 4, 2016, 9 pages.
Final Office Action received for U.S. Appl. No. 15/725,868, mailed on Sep. 27, 2018, 25 pages.
Final Office Action received for U.S. Appl. No. 16/666,073, mailed on Apr. 17, 2020, 18 pages.
Final Office Action received for U.S. Appl. No. 17/332,829, mailed on Feb. 6, 2023, 19 pages.
Final Office Action received for U.S. Appl. No. 17/950,868, mailed on Aug. 29, 2024, 13 pages.
Final Office Action received for U.S. Appl. No. 17/970,417, mailed on Sep. 18, 2024, 24 pages.
Final Office Action received for U.S. Appl. No. 18/067,350, mailed on Oct. 31, 2024, 44 pages.
Final Office Action received for U.S. Appl. No. 18/138,348, mailed on Oct. 18, 2024, 10 pages.
Final Office Action received for U.S. Appl. No. 18/140,449, mailed on Oct. 18, 2024, 11 pages.
Intention to Grant received for European Patent Application No. 10763539.3, mailed on Mar. 15, 2018, 6 pages.
Intention to Grant received for European Patent Application No. 18188433.9, mailed on Apr. 6, 2020, 9 pages.
Intention to Grant received for European Patent Application No. 22734711.9, mailed on Sep. 13, 2024, 7 pages.
International Preliminary Report on Patentability received for PCT Patent Application No. PCT/US2010/050311, mailed on Oct. 18, 2012, 11 pages.
International Preliminary Report on Patentability received for PCT Patent Application No. PCT/US2023/017280, mailed on Oct. 17, 2024, 15 pages.
International Search Report and Written Opinion received for PCT Patent Application No. PCT/US2010/050311, mailed on Aug. 24, 2011, 15 pages.
International Search Report and Written Opinion received for PCT Patent Application No. PCT/US2024/017017, mailed on Aug. 2, 2024, 27 pages.
Invitation to Pay Additional Fees and Partial International Search Report received for PCT Patent Application No. PCT/US2010/050311, mailed on Dec. 21, 2010, 6 pages.
Koyama, Kaori, "Mac Fan Macintosh Master Book Mac Os X v10.4 "Tiger" & iLife", '06 version, Mainichi Communications Inc. Nobuyuki NAKAGAWA, Jul. 9, 2007, 4 pages (Official Copy Only) {See Communication under Rule 37 CFR § 1.98(a) (3)}.
Non-Final Office Action received for U.S. Appl. No. 12/794,766, mailed on Aug. 5, 2013, 9 pages.
Non-Final Office Action received for U.S. Appl. No. 12/794,766, mailed on Jun. 25, 2012, 18 pages.
Non-Final Office Action received for U.S. Appl. No. 12/794,768, mailed on Oct. 10, 2012, 14 pages.
Non-Final Office Action received for U.S. Appl. No. 14/263,889, mailed on Jul. 2, 2015, 9 pages.
Non-Final Office Action received for U.S. Appl. No. 14/263,889, mailed on Jul. 26, 2016, 11 pages.
Non-Final Office Action received for U.S. Appl. No. 15/725,868, mailed on Apr. 27, 2018, 17 pages.
Non-Final Office Action received for U.S. Appl. No. 15/725,868, mailed on Feb. 12, 2019, 26 pages.
Non-Final Office Action received for U.S. Appl. No. 16/666,073, mailed on Dec. 10, 2019, 16 pages.
Non-Final Office Action received for U.S. Appl. No. 17/332,829, mailed on Aug. 1, 2022, 17 pages.
Non-Final Office Action received for U.S. Appl. No. 18/140,449, mailed on May 24, 2024, 19 pages.
Non-Final Office Action received for U.S. Appl. No. 18/165,144, mailed on Sep. 11, 2024, 25 pages.
Non-Final Office Action received for U.S. Appl. No. 18/389,655, mailed on Aug. 23, 2024, 23 pages.
Non-Final Office Action received for U.S. Appl. No. 18/422,571, mailed on Sep. 26, 2024, 19 pages.
Non-Final Office Action received for U.S. Appl. No. 18/535,820, mailed on Sep. 25, 2024, 27 pages.
Notice of Acceptance received for Australian Patent Application No. 2010350749, mailed on Jan. 13, 2015, 3 pages.
Notice of Acceptance received for Australian Patent Application No. 2015201127, mailed on Feb. 14, 2017, 3 pages.
Notice of Allowance received for Brazilian Patent Application No. BR112012025746-3, mailed on Jul. 6, 2021, 3 pages (1 page of English Translation and 2 pages of Official Copy).
Notice of Allowance received for Chinese Patent Application No. 201010602653.9, mailed on Nov. 15, 2014, 2 pages (1 page of English Translation and 1 page of Official Copy).
Notice of Allowance received for Chinese Patent Application No. 2010106600623.4, mailed on Aug. 11, 2014, 4 pages (1 page of English Translation and 3 pages of Official Copy).
Notice of Allowance received for Chinese Patent Application No. 201410575145.4, mailed on May 10, 2018, 3 pages (1 page of English Translation and 2 pages of Official Copy).
Notice of Allowance received for Chinese Patent Application No. 201910704856.X, mailed on Sep. 30, 2024, 4 pages (1 page of English Translation and 3 pages of Official Copy).
Notice of Allowance received for Japanese Patent Application No. 2014-212867, mailed on Mar. 30, 2018, 3 pages (1 page of English Translation and 2 pages of Official Copy).
Notice of Allowance received for Japanese Patent Application No. 2016-151497, mailed on Jun. 4, 2018, 4 pages (1 page of English Translation and 3 pages of Official Copy).
Notice of Allowance received for Japanese Patent Application No. 2019-182484, mailed on Aug. 30, 2021, 4 pages (1 page of English Translation and 3 pages of Official Copy).
Notice of Allowance received for Japanese Patent Application No. 2021-154573, mailed on Nov. 11, 2022, 4 pages (1 page of English Translation and 3 pages of Official Copy).
Notice of Allowance received for Japanese Patent Application No. 2022-197327, mailed on May 31, 2024, 4 pages (1 page of English Translation and 3 pages of Official Copy).
Notice of Allowance received for Korean Patent Application No. 10-2012-7028535, mailed on Jul. 16, 2014, 5 pages (1 page of English Translation and 4 pages of Official Copy).
Notice of Allowance received for Korean Patent Application No. 10-2014-7005164, mailed on Dec. 21, 2014, 4 pages (1 page of English Translation and 3 pages of Official Copy).
Notice of Allowance received for Korean Patent Application No. 10-2014-7029838, mailed on Jul. 28, 2015, 4 pages (1 page of English Translation and 3 pages of Official Copy).
Notice of Allowance received for Korean Patent Application No. 10-2015-7007050, mailed on Feb. 26, 2016, 4 pages (1 page of English Translation and 3 pages of Official Copy).
Notice of Allowance received for Korean Patent Application No. 10-2016-7014580, mailed on Dec. 17, 2019, 6 pages (2 pages of English Translation and 4 pages of Official Copy).

(56) References Cited

OTHER PUBLICATIONS

Notice of Allowance received for Korean Patent Application No. 10-2018-7036975, mailed on Sep. 18, 2019, 6 pages (2 pages of English Translation and 4 pages of Official Copy).
Notice of Allowance received for Korean Patent Application No. 10-2020-7002845, mailed on Sep. 24, 2020, 5 pages (1 page of English Translation and 4 pages of Official Copy).
Notice of Allowance received for Korean Patent Application No. 10-2023-7005442, mailed on Jan. 22, 2024, 8 pages (2 pages of English Translation and 6 pages of Official Copy).
Notice of Allowance received for Korean Patent Application No. 10-2023-7018775, mailed on Sep. 30, 2024, 7 pages (2 pages of English Translation and 5 pages of Official Copy).
Notice of Allowance received for Korean Patent Application No. 10-2023-7040599, mailed on Oct. 18, 2024, 7 pages (2 pages of English Translation and 5 pages of Official Copy).
Notice of Allowance received for Mexican Patent Application No. MX/a/2012/011623, mailed on Jan. 16, 2014, 2 pages (1 page of English Translation and 1 page of Official Copy).
Notice of Allowance received for Mexican Patent Application No. MX/a/2014/004295, mailed on May 21, 2015, 2 pages (1 page of English Translation and 1 page of Official Copy).
Notice of Allowance received for Mexican Patent Application No. MX/a/2015/010523, mailed on May 25, 2016, 2 pages (1 page of English Translation and 1 page of Official Copy).
Notice of Allowance received for Mexican Patent Application No. MX/a/2016/012174, mailed on Jan. 17, 2020, 3 pages (1 page of English Translation and 2 pages of Official Copy).
Notice of Allowance received for Mexican Patent Application No. MX/a/2020/003290, mailed on Feb. 9, 2023, 4 pages (1 page of English Translation and 3 pages of Official Copy).
Notice of Allowance received for Taiwanese Patent Application No. 099132253, mailed on Apr. 27, 2016, 3 pages (1 page of English Translation and 2 pages of Official Copy).
Notice of Allowance received for Taiwanese Patent Application No. 099132254, mailed on Feb. 18, 2014, 3 pages (1 page of English Translation and 2 pages of Official Copy).
Notice of Allowance received for U.S. Appl. No. 12/794,766, mailed on Jan. 17, 2014, 6 pages.
Notice of Allowance received for U.S. Appl. No. 12/794,768, mailed on Mar. 22, 2013, 6 pages.
Notice of Allowance received for U.S. Appl. No. 14/263,889, mailed on Feb. 1, 2017, 10 pages.
Notice of Allowance received for U.S. Appl. No. 14/263,889, mailed on Jun. 16, 2017, 6 pages.
Notice of Allowance received for U.S. Appl. No. 15/725,868, mailed on Jun. 12, 2019, 9 pages.
Notice of Allowance received for U.S. Appl. No. 15/784,806, mailed on Oct. 23, 2024, 5 pages.
Notice of Allowance received for U.S. Appl. No. 16/666,073, mailed on Jan. 21, 2021, 11 pages.
Notice of Allowance received for U.S. Appl. No. 17/684,843, mailed on Sep. 17, 2024, 5 pages.
Notice of Allowance received for U.S. Appl. No. 17/903,946, mailed on Aug. 27, 2024, 5 pages.
Notice of Allowance received for U.S. Appl. No. 17/950,868, mailed on Oct. 23, 2024, 10 pages.
Office Action received for Australian Patent Application No. 2010350749, mailed on Oct. 16, 2013, 3 pages.
Office Action received for Australian Patent Application No. 2015201127, mailed on Mar. 21, 2016, 3 pages.
Office Action received for Australian Patent Application No. 2023201057, mailed on Oct. 24, 2024, 3 pages.
Office Action received for Brazilian Patent Application No. BR112012025746-3, mailed on Jun. 2, 2020, 7 pages (4 pages of English Translation and 3 pages of Official Copy).
Office Action received for Chinese Patent Application No. 201010602653.9, mailed on Apr. 1, 2013, 21 pages (13 pages of English Translation and 8 pages of Official Copy).
Office Action received for Chinese Patent Application No. 201010602653.9, mailed on Dec. 9, 2013, 10 pages (6 pages of English Translation and 4 pages of Official Copy).
Office Action received for Chinese Patent Application No. 201010602653.9, mailed on May 15, 2014, 6 pages (3 pages of English Translation and 3 pages of Official Copy).
Office Action received for Chinese Patent Application No. 2010106600623.4, mailed on Apr. 28, 2014, 7 pages (4 pages of English Translation and 3 pages of Official Copy).
Office Action received for Chinese Patent Application No. 2010106600623.4, mailed on Jan. 24, 2014, 7 pages (4 pages of English Translation and 3 pages of Official Copy).
Office Action received for Chinese Patent Application No. 2010106600623.4, mailed on May 2, 2013, 27 pages (15 pages of English Translation and 12 pages of Official Copy).
Office Action received for Chinese Patent Application No. 201410575145.4, mailed on Feb. 13, 2017, 18 pages (11 pages of English Translation and 7 pages of Official Copy).
Office Action received for Chinese Patent Application No. 201410575145.4, mailed on Nov. 30, 2017, 17 pages (11 pages of English Translation and 6 pages of Official Copy).
Office Action received for Chinese Patent Application No. 202311753064.4, mailed on Aug. 23, 2024, 18 pages (11 pages of English Translation and 7 pages of Official Copy).
Office Action received for Chinese Patent Application No. 202311831154.0, mailed on Aug. 30, 2024, 13 pages (7 pages of English Translation and 6 pages of Official Copy).
Office Action received for European Patent Application No. 10763539.3, mailed on Jun. 13, 2016, 5 pages.
Office Action received for European Patent Application No. 22705232.1, mailed on Sep. 26, 2024, 8 pages.
Office Action received for European Patent Application No. 22733778.9, mailed on Oct. 22, 2024, 6 pages.
Office Action received for European Patent Application No. 22792995.7, mailed on Oct. 15, 2024, 8 pages.
Office Action received for Japanese Patent Application No. 2013-503731, mailed on Mar. 3, 2014, 8 pages (2 pages of English Translation and 6 pages of Official Copy).
Office Action received for Japanese Patent Application No. 2013-503731, mailed on Sep. 24, 2013, 3 pages (1 page of English Translation and 2 pages of Official Copy).
Office Action received for Japanese Patent Application No. 2014-212867, mailed on Aug. 18, 2017, 4 pages (1 page of English Translation and 3 pages of Official Copy).
Office Action received for Japanese Patent Application No. 2014-212867, mailed on Jun. 29, 2015, 8 pages (4 pages of English Translation and 4 pages of Official Copy).
Office Action received for Japanese Patent Application No. 2016-151497, mailed on Sep. 25, 2017, 7 pages (2 pages of English Translation and 5 pages of Official Copy).
Office Action received for Japanese Patent Application No. 2018-127760, mailed on Feb. 22, 2019, 10 pages (5 pages of English Translation and 5 pages of Official Copy).
Office Action received for Japanese Patent Application No. 2018-127760, mailed on Jul. 5, 2019, 4 pages (1 page of English Translation and 3 pages of Official Copy).
Office Action received for Japanese Patent Application No. 2019-182484, mailed on Dec. 4, 2020, 6 pages (1 page of English Translation and 5 pages of Official Copy).
Office Action received for Japanese Patent Application No. 2022-197327, mailed on Mar. 1, 2024, 14 pages (7 pages of English Translation and 7 pages of Official Copy).
Office Action received for Japanese Patent Application No. 2023-028786, mailed on Aug. 23, 2024, 10 pages (5 pages of English Translation and 5 pages of Official Copy).
Office Action received for Japanese Patent Application No. 2023-572748, mailed on Jul. 29, 2024, 4 pages (2 pages of English Translation and 2 pages of Official Copy).
Office Action received for Korean Patent Application No. 10-2012-7028535, mailed on Nov. 26, 2013, 10 pages (4 pages of English Translation and 6 pages of Official Copy).

(56) References Cited

OTHER PUBLICATIONS

Office Action received for Korean Patent Application No. 10-2014-7005164, mailed on May 23, 2014, 15 pages (6 pages of English Translation and 9 pages of Official Copy).
Office Action received for Korean Patent Application No. 10-2014-7029838, mailed on Dec. 20, 2014, 13 pages (5 pages of English Translation and 8 pages of Official Copy).
Office Action received for Korean Patent Application No. 10-2015-7007050, mailed on Apr. 16, 2015, 14 pages (6 pages of English Translation and 8 pages of Official Copy).
Office Action received for Korean Patent Application No. 10-2015-7007050, mailed on Oct. 23, 2015, 7 pages (3 pages of English Translation and 4 pages of Official Copy).
Office Action received for Korean Patent Application No. 10-2016-7014580, mailed on Jan. 30, 2018, 10 pages (4 pages of English Translation and 6 pages of Official Copy).
Office Action received for Korean Patent Application No. 10-2016-7014580, mailed on Jul. 30, 2018, 7 pages (3 pages of English Translation and 4 pages of Official Copy).
Office Action received for Korean Patent Application No. 10-2016-7014580, mailed on Jun. 29, 2017, 7 pages (1 page of English Translation and 6 pages of Official Copy).
Office Action received for Korean Patent Application No. 10-2016-7014580, mailed on Sep. 19, 2018, 7 pages (3 pages of English Translation and 4 pages of Official Copy).
Office Action received for Korean Patent Application No. 10-2016-7014580, mailed on Sep. 27, 2016, 9 pages (4 pages of English Translation and 5 pages of Official Copy).
Office Action received for Korean Patent Application No. 10-2017-7002774, mailed on Apr. 18, 2017, 10 pages (4 pages of English Translation and 6 pages of Official Copy).
Office Action received for Korean Patent Application No. 10-2017-7002774, mailed on Jul. 30, 2018, 6 pages (3 pages of English Translation and 3 pages of Official Copy).
Office Action received for Korean Patent Application No. 10-2017-7002774, mailed on Sep. 20, 2018, 12 pages (6 pages of English Translation and 6 pages of Official Copy).
Office Action received for Korean Patent Application No. 10-2018-7036975, mailed on Mar. 22, 2019, 11 pages (5 pages of English Translation and 6 pages of Official Copy).
Office Action received for Korean Patent Application No. 10-2020-7002845, mailed on Feb. 17, 2020, 14 pages (6 pages of English Translation and 8 pages of Official Copy).
Office Action received for Korean Patent Application No. 10-2020-7034959, mailed on Jan. 27, 2022, 7 pages (3 pages of English Translation and 4 pages of Official Copy).
Office Action received for Korean Patent Application No. 10-2020-7034959, mailed on Mar. 2, 2021, 12 pages (5 pages of English Translation and 7 pages of Official Copy).
Office Action received for Korean Patent Application No. 10-2020-7034959, mailed on Oct. 27, 2021, 8 pages (4 pages of English Translation and 4 pages of Official Copy).
Office Action received for Korean Patent Application No. 10-2022-7006973, mailed on May 19, 2022, 10 pages (4 pages of English Translation and 6 pages of Official Copy).
Office Action received for Korean Patent Application No. 10-2022-7006973, mailed on Nov. 24, 2022, 6 pages (3 pages of English Translation and 3 pages of Official Copy).
Office Action received for Korean Patent Application No. 10-2023-7005442, mailed on Jul. 25, 2023, 10 pages (4 pages of English Translation and 6 pages of Official Copy).
Office Action received for Korean Patent Application No. 10-2024-7019962, mailed on Sep. 25, 2024, 7 pages (2 pages of English Translation and 5 pages of Official Copy).
Office Action received for Mexican Patent Application No. MX/a/2014/004295, mailed on Aug. 21, 2014, 4 pages (2 pages of English Translation and 2 pages of Official Copy).
Office Action received for Mexican Patent Application No. MX/a/2014/004295, mailed on Jan. 20, 2015, 4 pages (1 page of English Translation and 3 pages of Official Copy).
Office Action received for Mexican Patent Application No. MX/a/2015/010523, mailed on Jan. 26, 2016, 4 pages (2 pages of English Translation and 2 pages of Official Copy).
Office Action received for Mexican Patent Application No. MX/a/2016/012174, mailed on Apr. 10, 2019, 7 pages (4 pages of English Translation and 3 pages of Official Copy).
Office Action received for Mexican Patent Application No. MX/a/2016/012174, mailed on Aug. 8, 2019, 7 pages (2 pages of English Translation and 5 pages of Official Copy).
Office Action received for Mexican Patent Application No. MX/a/2020/003290, mailed on Nov. 11, 2022, 7 pages (2 pages of English Translation and 5 pages of Official Copy).
Office Action received for Mexican Patent Application No. MX/a/2020/003290, mailed on Oct. 26, 2022, 8 pages (3 pages of English Translation and 5 pages of Official Copy).
Office Action received for Mexican Patent Application No. MX/a/2023/005388, mailed on Dec. 15, 2023, 18 pages (9 pages of English Translation and 9 pages of Official Copy).
Office Action received for Mexican Patent Application No. MX/a/2023/005388, mailed on Jun. 2, 2023, 24 pages (12 pages of English Translation and 12 pages of Official Copy).
Office Action received for Taiwanese Patent Application No. 099132253, mailed on Jun. 24, 2013, 16 pages (8 pages of English Translation and 8 pages of Official Copy).
Office Action received for Taiwanese Patent Application No. 099132253, mailed on Mar. 27, 2014, 10 pages (4 pages of English Translation and 6 pages of Official Copy).
Office Action received for Taiwanese Patent Application No. 099132254, mailed on May 27, 2013, 24 pages (12 pages of English Translation and 12 pages of Official Copy).
Record of Oral Hearing received for U.S. Appl. No. 15/784,806, mailed on Aug. 28, 2024, 16 pages.
Sharf et al., "SnapPaste:an interactive technique for easy mesh composition", The Visual Computer; International Journal of Computer Graphics, Springer, Berlin, De, vol. 22, No. 9-11. Available Online at <http://dx.doi.org/10.1007/s00371-006-0068-5>, Aug. 25, 2006, pp. 835-844.
That Guy who Loves METV and SSBB MODS, "Kinect Party Gameplay", Available online at: https://youtu.be/bkbOlzfyLzc?si=QAAKh_V4aqYOiegL, Oct. 20, 2021, 2 pages.
Xbox, "Kinect Tips, Part 3: Gesture Controls", Available online at: https://youtu.be/VXhhE-196qQ?si=gLmHbp9jOm-wOfNW, May 7, 2014, 3 pages.
Corrected Notice of Allowance received for U.S. Appl. No. 17/745,680, mailed on Nov. 20, 2024, 2 pages.
International Preliminary Report on Patentability received for PCT Patent Application No. PCT/US2023/020569, mailed on Nov. 21, 2024, 16 pages.
Notice of Allowance received for U.S. Appl. No. 17/483,679, mailed on Nov. 21, 2024, 8 pages.
Advisory Action received for U.S. Appl. No. 17/970,417, mailed on Dec. 12, 2024, 5 pages.
Notice of Allowance received for Japanese Patent Application No. 2023-028786, mailed on Dec. 2, 2024, 4 pages (1 page of English Translation and 3 pages of Official Copy).
Notice of Allowance received for Korean Patent Application No. 10-2024-0112016, mailed on Dec. 2, 2024, 6 pages (2 pages of English Translation and 4 pages of Official Copy).
Notice of Allowance received for U.S. Appl. No. 17/745,680, mailed on Dec. 12, 2024, 2 pages.
Office Action received for Japanese Patent Application No. 2024-146741, mailed on Nov. 25, 2024, 12 pages (6 pages of English Translation and 6 pages of Official Copy).
Intention to Grant received for European Patent Application No. 24160234.1, mailed on Nov. 4, 2024, 9 pages.
International Search Report and Written Opinion received for PCT Patent Application No. PCT/US2024/023231, mailed on Oct. 23, 2024, 24 pages.
Invitation to Pay Additional Fees and Partial International Search Report received for PCT Patent Application No. PCT/US2024/023231, mailed on Aug. 29, 2024, 17 pages.
Notice of Allowance received for U.S. Appl. No. 17/745,680, mailed on Nov. 12, 2024, 8 pages.

(56) References Cited

OTHER PUBLICATIONS

Notice of Allowance received for U.S. Appl. No. 18/138,348, mailed on Nov. 13, 2024, 10 pages.
Applicant-Initiated Interview Summary received for U.S. Appl. No. 18/165,144, mailed on Dec. 23, 2024, 4 pages.
Applicant-Initiated Interview Summary received for U.S. Appl. No. 18/422,571, mailed on Jan. 2, 2025, 2 pages.
Notice of Allowance received for U.S. Appl. No. 15/784,806, mailed on Jan. 2, 2025, 5 pages.
Office Action received for Australian Patent Application No. 2023201057, mailed on Dec. 19, 2024, 4 pages.

* cited by examiner

800

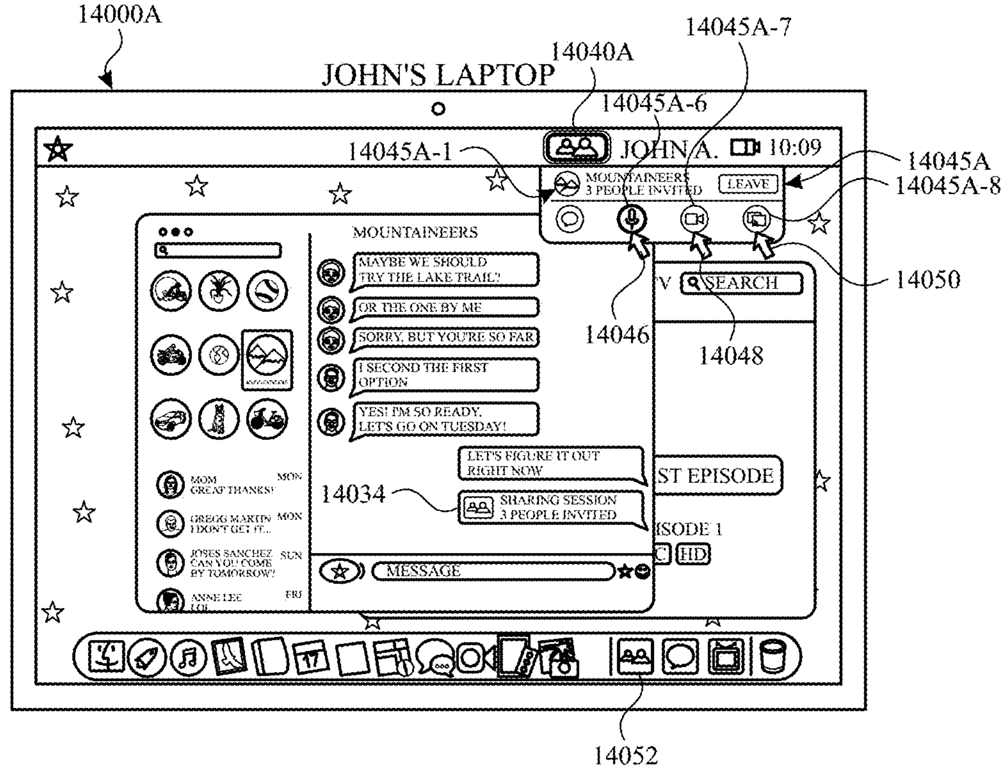
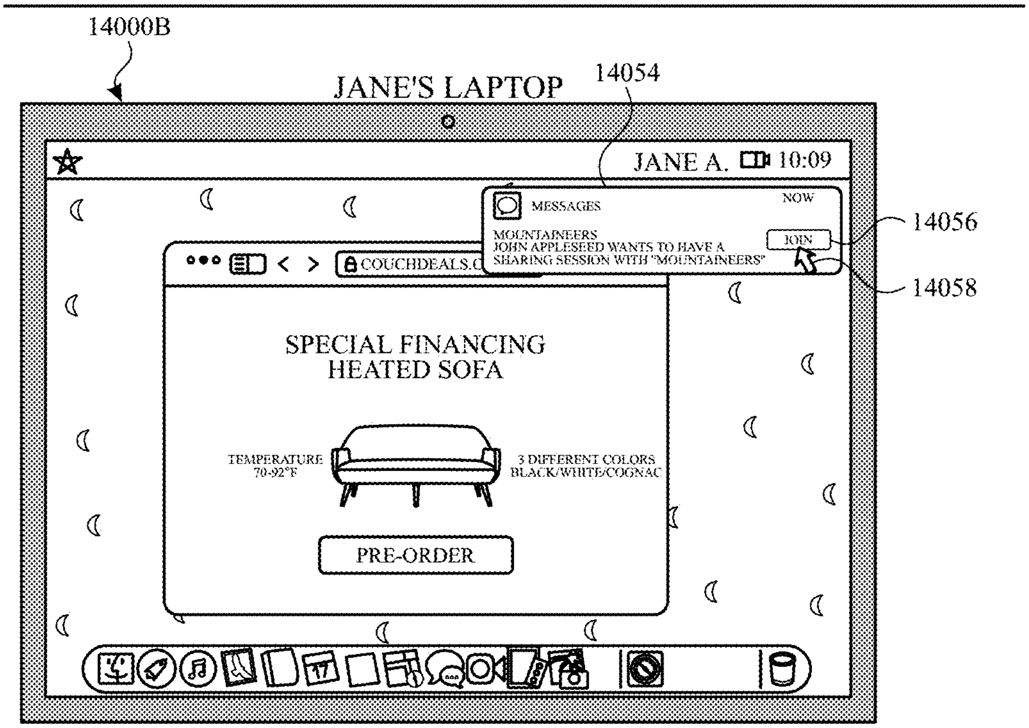
*FIG. 14B*

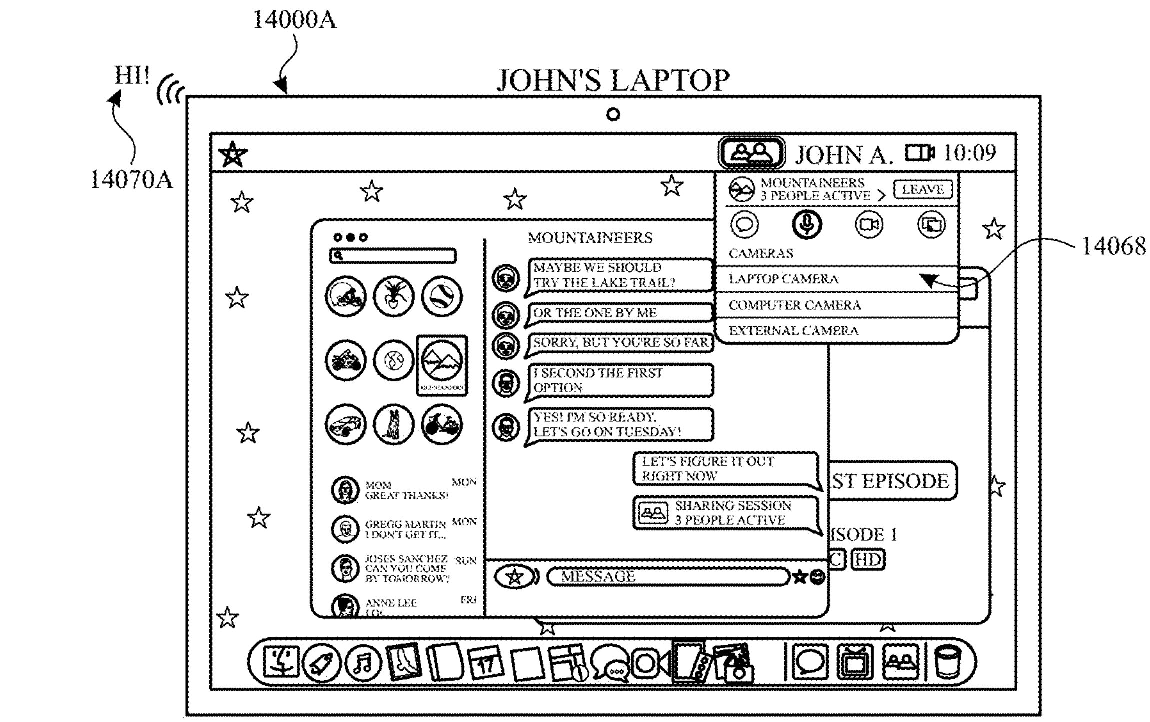
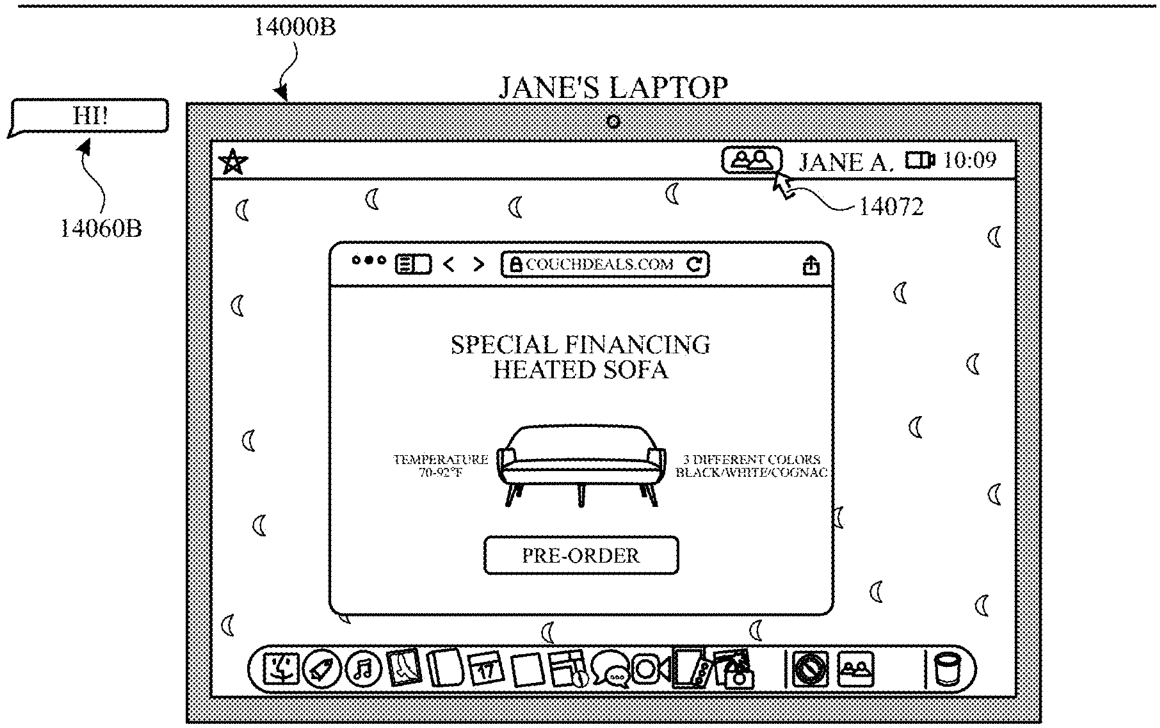
*FIG. 14D*

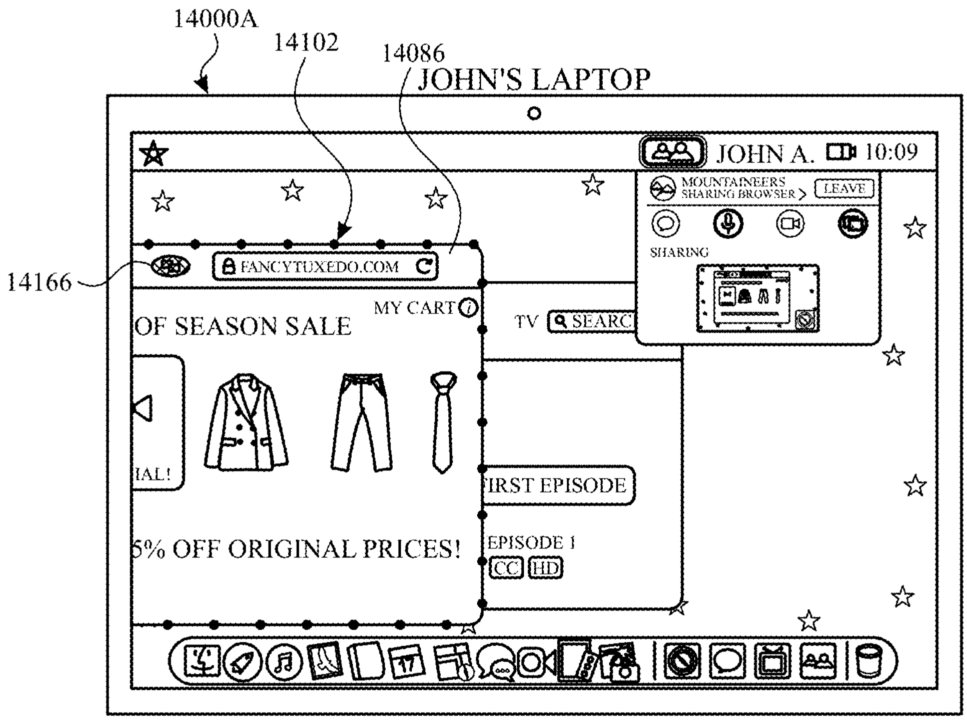
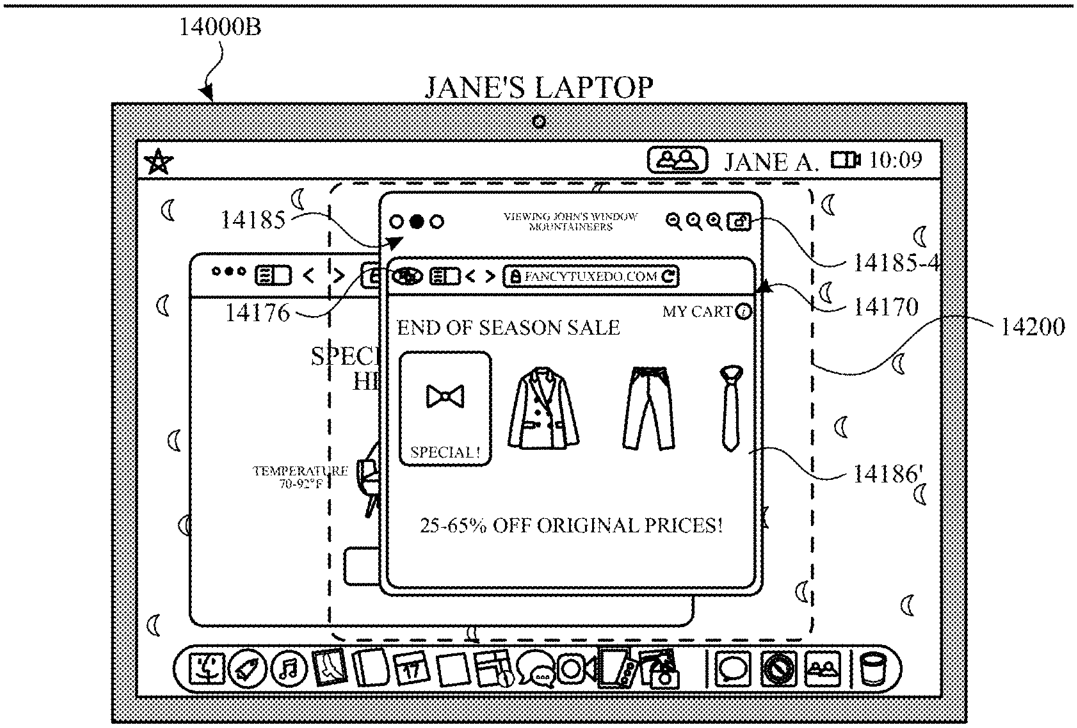
*FIG. 14U*

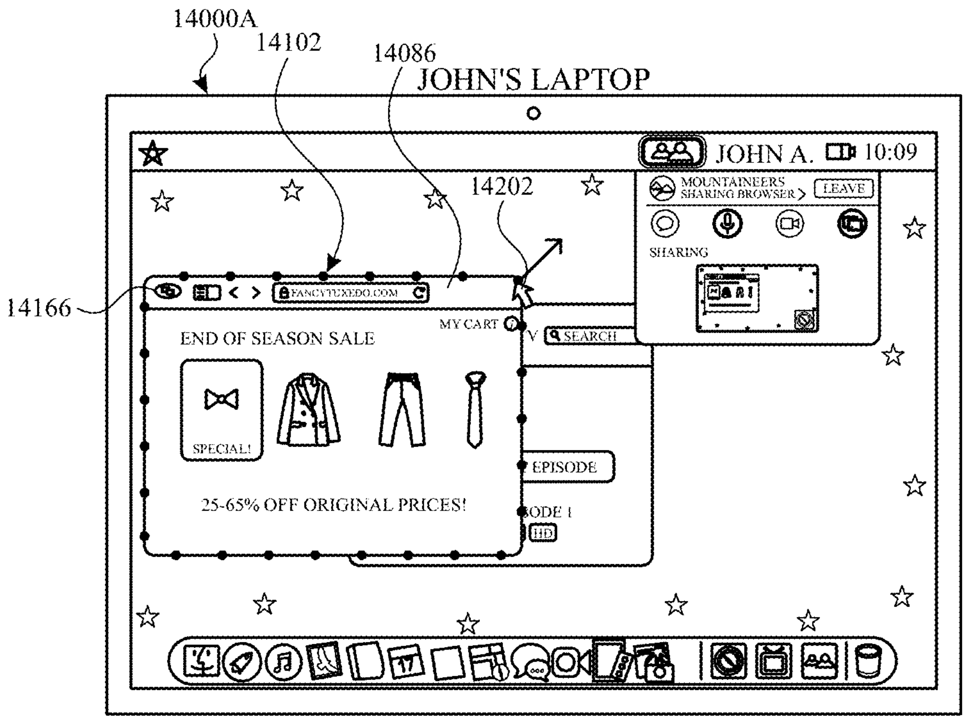
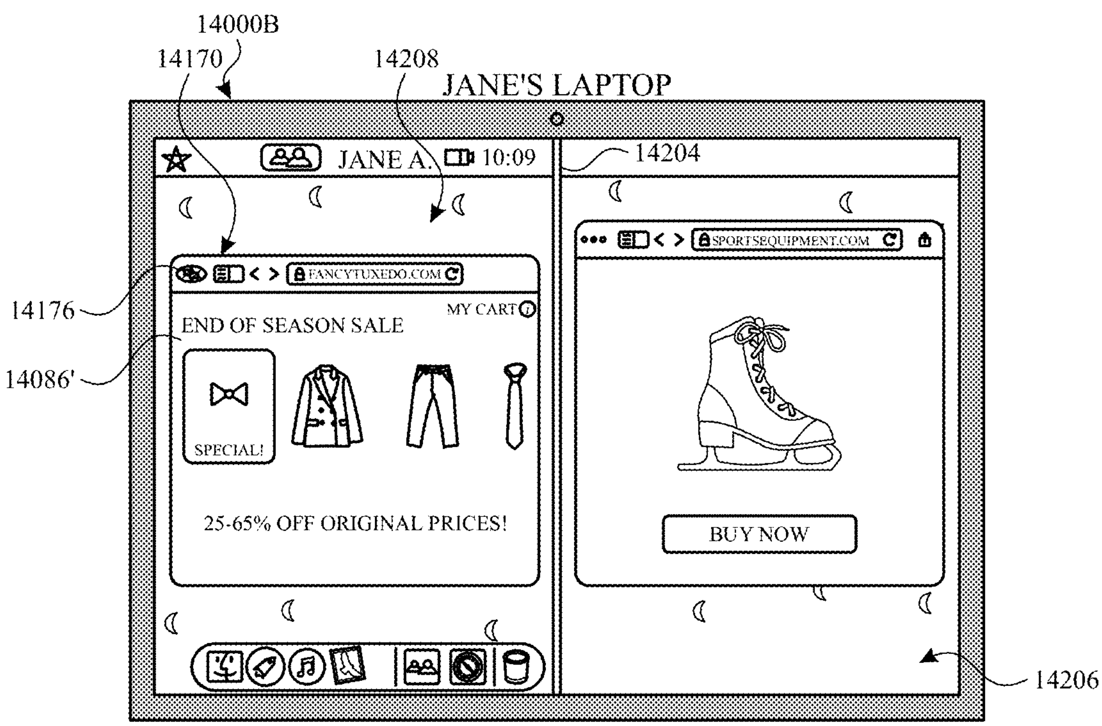
*FIG. 14V*

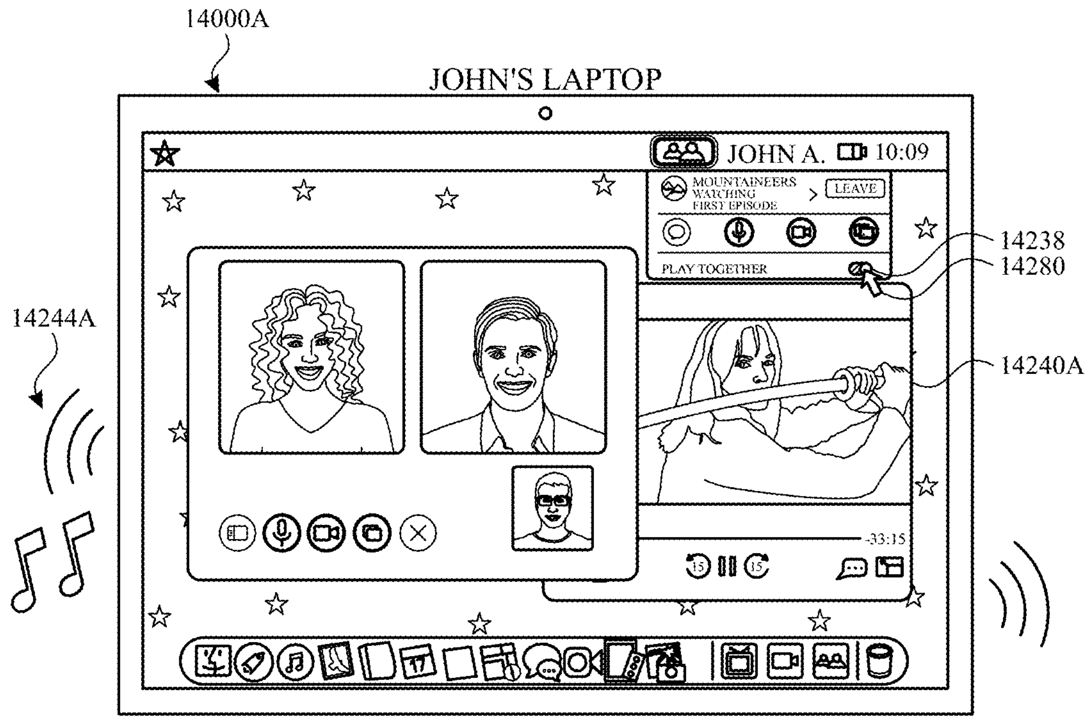
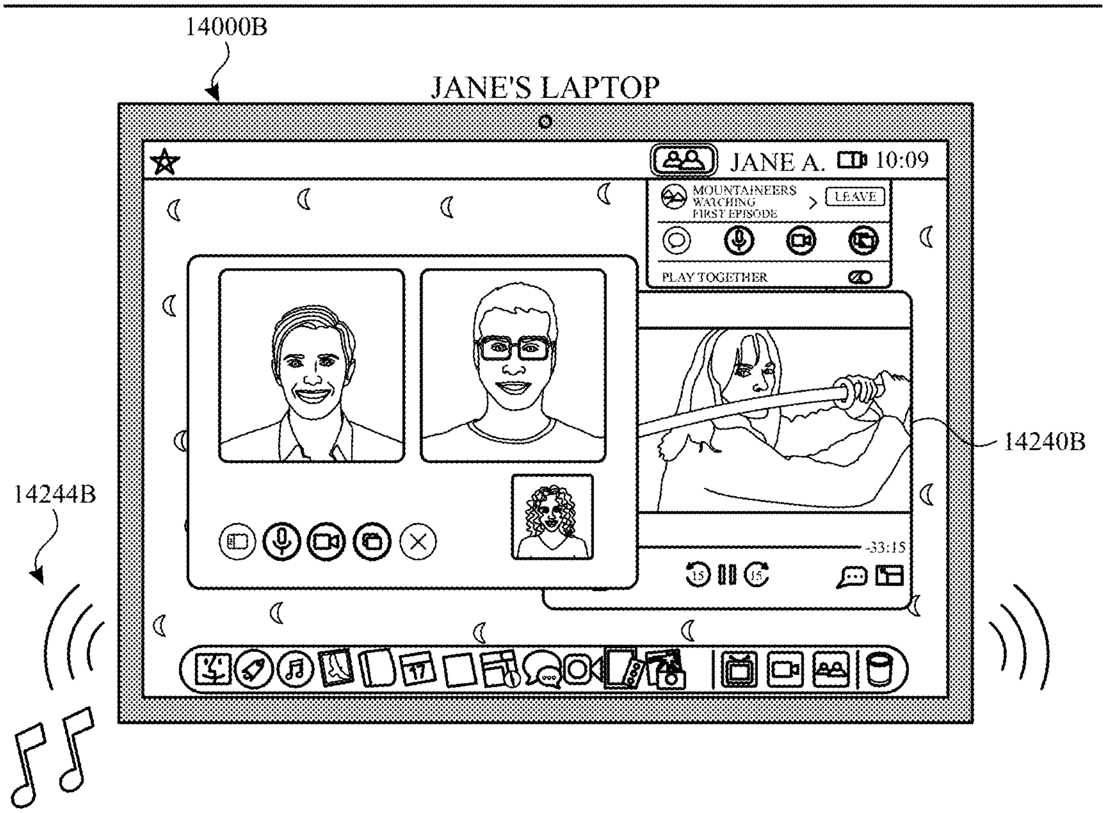
*FIG. 14AF*

Figure 15:
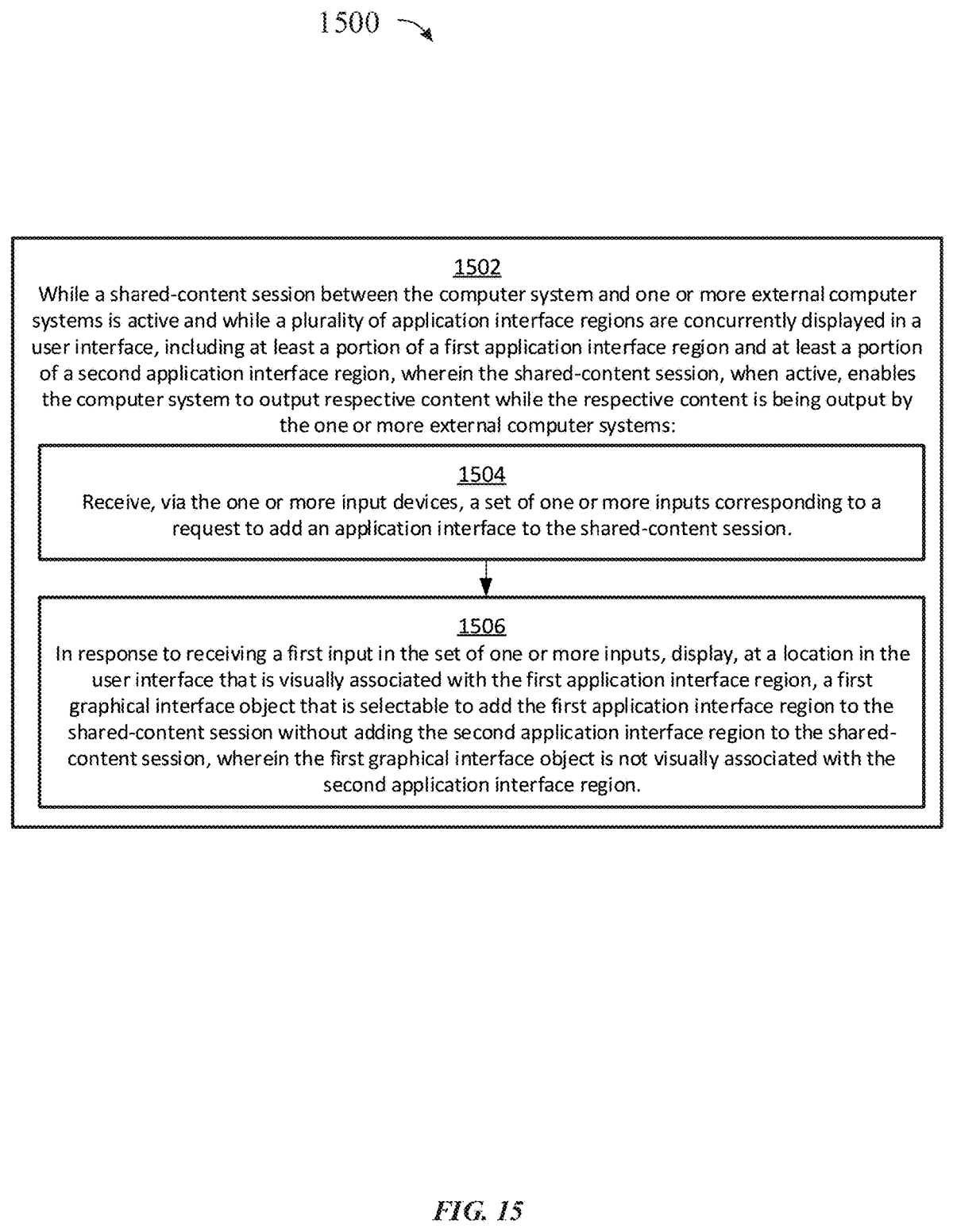

1500

1502
While a shared-content session between the computer system and one or more external computer systems is active and while a plurality of application interface regions are concurrently displayed in a user interface, including at least a portion of a first application interface region and at least a portion of a second application interface region, wherein the shared-content session, when active, enables the computer system to output respective content while the respective content is being output by the one or more external computer systems:

1504
Receive, via the one or more input devices, a set of one or more inputs corresponding to a request to add an application interface to the shared-content session.

1506
In response to receiving a first input in the set of one or more inputs, display, at a location in the user interface that is visually associated with the first application interface region, a first graphical interface object that is selectable to add the first application interface region to the shared-content session without adding the second application interface region to the shared-content session, wherein the first graphical interface object is not visually associated with the second application interface region.

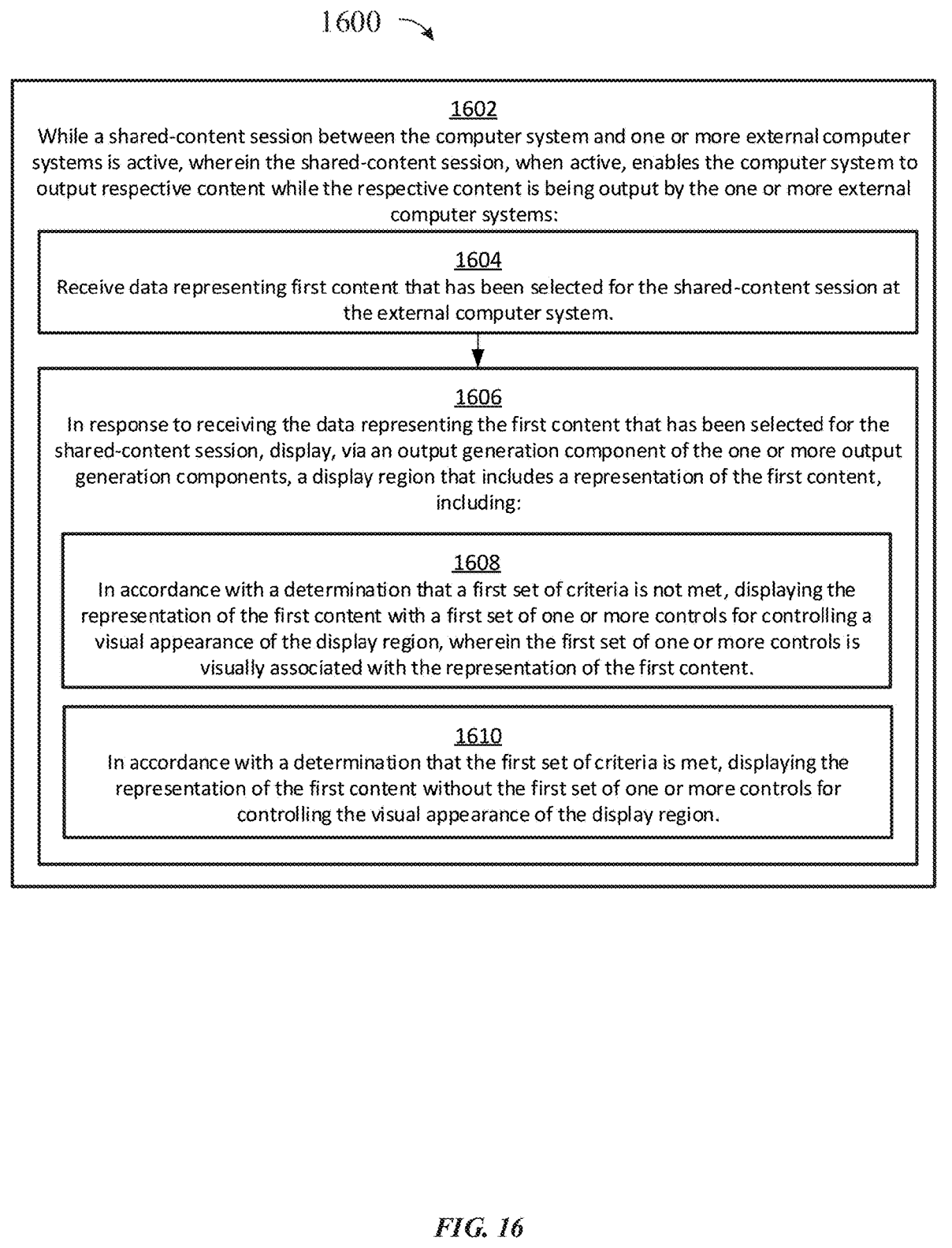

1602
While a shared-content session between the computer system and one or more external computer systems is active, wherein the shared-content session, when active, enables the computer system to output respective content while the respective content is being output by the one or more external computer systems:

1604
Receive data representing first content that has been selected for the shared-content session at the external computer system.

1606
In response to receiving the data representing the first content that has been selected for the shared-content session, display, via an output generation component of the one or more output generation components, a display region that includes a representation of the first content, including:

1608
In accordance with a determination that a first set of criteria is not met, displaying the representation of the first content with a first set of one or more controls for controlling a visual appearance of the display region, wherein the first set of one or more controls is visually associated with the representation of the first content.

1610
In accordance with a determination that the first set of criteria is met, displaying the representation of the first content without the first set of one or more controls for controlling the visual appearance of the display region.

*FIG. 16*

SHARED-CONTENT SESSION USER INTERFACES

CROSS-REFERENCE TO RELATED APPLICATIONS

This application claims the benefit of priority of U.S. Provisional Patent Application Ser. No. 63/189,156, entitled "SHARED-CONTENT SESSION USER INTERFACES," filed May 15, 2021; and U.S. Provisional Patent Application Ser. No. 63/197,445, entitled "SHARED-CONTENT SESSION USER INTERFACES," filed Jun. 6, 2021. The contents of these applications are hereby incorporated by reference in their entirety.

FIELD

The present disclosure relates generally to computer user interfaces, and more specifically to techniques for managing shared-content sessions.

BACKGROUND

Computer systems can include hardware and/or software for displaying interfaces for various types of communication and information sharing.

BRIEF SUMMARY

Some techniques for communication and information sharing using electronic devices, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

The present technique provides electronic devices with faster, more efficient methods and interfaces for managing shared-content sessions. Such methods and interfaces optionally complement or replace other methods for managing shared-content sessions. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method is performed at a computer system that is in communication with one or more output generation components and one or more input devices. The method comprises: detecting, via the one or more input devices, a first set of one or more inputs corresponding to a request to output content; and in response to detecting the first set of one or more inputs corresponding to a request to output the content: in accordance with a determination that there is an active shared-content session between the computer system and an external computer system, wherein the shared-content session, when active, enables the computer system to output respective content while the respective content is being output by the external computer system: outputting, via an output generation component of the one or more output generation components, a first notification that includes an indication that the content will be output by the external computer system when the content is output by the computer system; and outputting the content via an output generation component of the one or more output generation components.

In accordance with some embodiments, a non-transitory computer-readable storage medium is described. The non-transitory computer-readable storage medium stores one or more programs configured to be executed by one or more processors of a computer system that is in communication with one or more output generation components and one or more input devices, the one or more programs including instructions for: detecting, via the one or more input devices, a first set of one or more inputs corresponding to a request to output content; and in response to detecting the first set of one or more inputs corresponding to a request to output the content: in accordance with a determination that there is an active shared-content session between the computer system and an external computer system, wherein the shared-content session, when active, enables the computer system to output respective content while the respective content is being output by the external computer system: outputting, via an output generation component of the one or more output generation components, a first notification that includes an indication that the content will be output by the external computer system when the content is output by the computer system; and outputting the content via an output generation component of the one or more output generation components.

In accordance with some embodiments, a transitory computer-readable storage medium is described. The transitory computer-readable storage medium stores one or more programs configured to be executed by one or more processors of a computer system that is in communication with one or more output generation components and one or more input devices, the one or more programs including instructions for: detecting, via the one or more input devices, a first set of one or more inputs corresponding to a request to output content; and in response to detecting the first set of one or more inputs corresponding to a request to output the content: in accordance with a determination that there is an active shared-content session between the computer system and an external computer system, wherein the shared-content session, when active, enables the computer system to output respective content while the respective content is being output by the external computer system: outputting, via an output generation component of the one or more output generation components, a first notification that includes an indication that the content will be output by the external computer system when the content is output by the computer system; and outputting the content via an output generation component of the one or more output generation components.

In accordance with some embodiments, a computer system is described. The computer system comprises: one or more output generation components; one or more input devices; one or more processors; and memory storing one or more programs configured to be executed by the one or more processors, the one or more programs including instructions for: detecting, via the one or more input devices, a first set of one or more inputs corresponding to a request to output content; and in response to detecting the first set of one or more inputs corresponding to a request to output the content: in accordance with a determination that there is an active shared-content session between the computer system and an external computer system, wherein the shared-content session, when active, enables the computer system to output respective content while the respective content is being output by the external computer system: outputting, via an output generation component of the one or more output generation components, a first notification that includes an indication that the content will be output by the external computer system when the content is output by the computer system; and outputting the content via an output generation component of the one or more output generation components.

In accordance with some embodiments, a computer system is described. The computer system comprises: one or more output generation components; one or more input devices; means for detecting, via the one or more input devices, a first set of one or more inputs corresponding to a request to output content; and means for, in response to detecting the first set of one or more inputs corresponding to a request to output the content: in accordance with a determination that there is an active shared-content session between the computer system and an external computer system, wherein the shared-content session, when active, enables the computer system to output respective content while the respective content is being output by the external computer system: outputting, via an output generation component of the one or more output generation components, a first notification that includes an indication that the content will be output by the external computer system when the content is output by the computer system; and outputting the content via an output generation component of the one or more output generation components.

In accordance with some embodiments, a computer program product is described. The computer program product comprises one or more programs configured to be executed by one or more processors of a computer system that is in communication with one or more output generation components and one or more input devices, the one or more programs including instructions for: detecting, via the one or more input devices, a first set of one or more inputs corresponding to a request to output content; and in response to detecting the first set of one or more inputs corresponding to a request to output the content: in accordance with a determination that there is an active shared-content session between the computer system and an external computer system, wherein the shared-content session, when active, enables the computer system to output respective content while the respective content is being output by the external computer system: outputting, via an output generation component of the one or more output generation components, a first notification that includes an indication that the content will be output by the external computer system when the content is output by the computer system; and outputting the content via an output generation component of the one or more output generation components.

In accordance with some embodiments, a method performed at a computer system that is in communication with one or more output generation components and one or more input devices is described. The method comprises: while displaying, via an output generation component of the one or more output generation components, a first user interface while a shared-content session between the computer system and an external computer system is active: receiving an indication that first content has been selected for the shared-content session at the external computer system, wherein the first content is associated with a first application on the computer system; and in response to receiving the indication that the first content has been selected for the shared-content session, outputting, via an output generation component of the one or more output generation components, a first notification generated by a second application that is different from the first application that is associated with the first content; and after outputting the first notification and while the shared-content session between the computer system and the external computer system is active, outputting, via an output generation component of the one or more output generation components, the first content using the first application that is associated with the first content.

In accordance with some embodiments, a non-transitory computer-readable storage medium is described. The non-transitory computer-readable storage medium stores one or more programs configured to be executed by one or more processors of a computer system that is in communication with one or more output generation components and one or more input devices, the one or more programs including instructions for: while displaying, via an output generation component of the one or more output generation components, a first user interface while a shared-content session between the computer system and an external computer system is active: receiving an indication that first content has been selected for the shared-content session at the external computer system, wherein the first content is associated with a first application on the computer system; and in response to receiving the indication that the first content has been selected for the shared-content session, outputting, via an output generation component of the one or more output generation components, a first notification generated by a second application that is different from the first application that is associated with the first content; and after outputting the first notification and while the shared-content session between the computer system and the external computer system is active, outputting, via an output generation component of the one or more output generation components, the first content using the first application that is associated with the first content.

In accordance with some embodiments, a transitory computer-readable storage medium is described. The transitory computer-readable storage medium stores one or more programs configured to be executed by one or more processors of a computer system that is in communication with one or more output generation components and one or more input devices, the one or more programs including instructions for: while displaying, via an output generation component of the one or more output generation components, a first user interface while a shared-content session between the computer system and an external computer system is active: receiving an indication that first content has been selected for the shared-content session at the external computer system, wherein the first content is associated with a first application on the computer system; and in response to receiving the indication that the first content has been selected for the shared-content session, outputting, via an output generation component of the one or more output generation components, a first notification generated by a second application that is different from the first application that is associated with the first content; and after outputting the first notification and while the shared-content session between the computer system and the external computer system is active, outputting, via an output generation component of the one or more output generation components, the first content using the first application that is associated with the first content.

In accordance with some embodiments, a computer system that is in communication with one or more output generation components and one or more input devices is described. The computer system comprises: one or more processors; and memory storing one or more programs configured to be executed by the one or more processors, the one or more programs including instructions for: while displaying, via an output generation component of the one or more output generation components, a first user interface while a shared-content session between the computer system and an external computer system is active: receiving an indication that first content has been selected for the shared-content session at the external computer system, wherein the first content is associated with a first application on the computer system; and in response to receiving the indication that the first content has been selected for the shared-content session, outputting, via an output generation component of the one or more output generation components, a first notification generated by a second application that is different from the first application that is associated with the first content; and after outputting the first notification and while the shared-content session between the computer system and the external computer system is active, outputting, via an output generation component of the one or more output generation components, the first content using the first application that is associated with the first content.

In accordance with some embodiments, a computer system that is in communication with one or more output generation components and one or more input devices is described. The computer system comprises: means for, while displaying, via an output generation component of the one or more output generation components, a first user interface while a shared-content session between the computer system and an external computer system is active: receiving an indication that first content has been selected for the shared-content session at the external computer system, wherein the first content is associated with a first application on the computer system; and in response to receiving the indication that the first content has been selected for the shared-content session, outputting, via an output generation component of the one or more output generation components, a first notification generated by a second application that is different from the first application that is associated with the first content; and means for, after outputting the first notification and while the shared-content session between the computer system and the external computer system is active, outputting, via an output generation component of the one or more output generation components, the first content using the first application that is associated with the first content.

In accordance with some embodiments, a computer program product is described. The computer program product comprises one or more programs configured to be executed by one or more processors of a computer system that is in communication with one or more output generation components and one or more input devices, the one or more programs including instructions for: while displaying, via an output generation component of the one or more output generation components, a first user interface while a shared-content session between the computer system and an external computer system is active: receiving an indication that first content has been selected for the shared-content session at the external computer system, wherein the first content is associated with a first application on the computer system; and in response to receiving the indication that the first content has been selected for the shared-content session, outputting, via an output generation component of the one or more output generation components, a first notification generated by a second application that is different from the first application that is associated with the first content; and after outputting the first notification and while the shared-content session between the computer system and the external computer system is active, outputting, via an output generation component of the one or more output generation components, the first content using the first application that is associated with the first content.

In accordance with some embodiments, a method is described. The method is performed at a computer system that is in communication with one or more output generation components and one or more input devices. The method comprises: receiving, via the one or more input devices, an input corresponding to a request to add first content to a shared-content session between the computer system and an external computer system; and in response to receiving the input: in accordance with a determination that the first content is content of a first type, and prior to adding the first content to the shared-content session, outputting an alert that the first content is going to be added to the shared-content session, wherein the alert includes an option to cancel adding the first content to the shared-content session before the first content is added to the shared-content session; and in accordance with a determination that the first content is content of a second type that is different from the first type, adding the first content to the shared-content session without outputting the alert that the first content is going to be added to the shared-content session before the first content is added to the shared-content session.

In accordance with some embodiments, a non-transitory computer-readable storage medium is described. The non-transitory computer-readable storage medium stores one or more programs configured to be executed by one or more processors of a computer system that is in communication with one or more output generation components and one or more input devices the one or more programs including instructions for: receiving, via the one or more input devices, an input corresponding to a request to add first content to a shared-content session between the computer system and an external computer system; and in response to receiving the input: in accordance with a determination that the first content is content of a first type, and prior to adding the first content to the shared-content session, outputting an alert that the first content is going to be added to the shared-content session, wherein the alert includes an option to cancel adding the first content to the shared-content session before the first content is added to the shared-content session; and in accordance with a determination that the first content is content of a second type that is different from the first type, adding the first content to the shared-content session without outputting the alert that the first content is going to be added to the shared-content session before the first content is added to the shared-content session.

In accordance with some embodiments, a transitory computer-readable storage medium is described. The transitory computer-readable storage medium stores one or more programs configured to be executed by one or more processors of a computer system that is in communication with one or more output generation components and one or more input devices the one or more programs including instructions for: receiving, via the one or more input devices, an input corresponding to a request to add first content to a shared-content session between the computer system and an external computer system; and in response to receiving the input: in accordance with a determination that the first content is content of a first type, and prior to adding the first content to the shared-content session, outputting an alert that the first content is going to be added to the shared-content session, wherein the alert includes an option to cancel adding the first content to the shared-content session before the first content is added to the shared-content session; and in accordance with a determination that the first content is content of a second type that is different from the first type, adding the first content to the shared-content session without outputting the alert that the first content is going to be added to the shared-content session before the first content is added to the shared-content session.

In accordance with some embodiments, a computer system is described. The computer system comprises: one or more output generation components; one or more input devices; one or more processors; and memory storing one or more programs configured to be executed by the one or more processors, the one or more programs including instructions for: receiving, via the one or more input devices, an input corresponding to a request to add first content to a shared-content session between the computer system and an external computer system; and in response to receiving the input: in accordance with a determination that the first content is content of a first type, and prior to adding the first content to the shared-content session, outputting an alert that the first content is going to be added to the shared-content session, wherein the alert includes an option to cancel adding the first content to the shared-content session before the first content is added to the shared-content session; and in accordance with a determination that the first content is content of a second type that is different from the first type, adding the first content to the shared-content session without outputting the alert that the first content is going to be added to the shared-content session before the first content is added to the shared-content session.

In accordance with some embodiments, a computer system is described. The computer system comprises: one or more output generation components; one or more input devices; means for receiving, via the one or more input devices, an input corresponding to a request to add first content to a shared-content session between the computer system and an external computer system; and means for, in response to receiving the input: in accordance with a determination that the first content is content of a first type, and prior to adding the first content to the shared-content session, outputting an alert that the first content is going to be added to the shared-content session, wherein the alert includes an option to cancel adding the first content to the shared-content session before the first content is added to the shared-content session; and in accordance with a determination that the first content is content of a second type that is different from the first type, adding the first content to the shared-content session without outputting the alert that the first content is going to be added to the shared-content session before the first content is added to the shared-content session.

In accordance with some embodiments, a computer program product is described. The computer program product comprises one or more programs configured to be executed by one or more processors of a computer system that is in communication with one or more output generation components and one or more input devices, the one or more programs including instructions for: receiving, via the one or more input devices, an input corresponding to a request to add first content to a shared-content session between the computer system and an external computer system; and in response to receiving the input: in accordance with a determination that the first content is content of a first type, and prior to adding the first content to the shared-content session, outputting an alert that the first content is going to be added to the shared-content session, wherein the alert includes an option to cancel adding the first content to the shared-content session before the first content is added to the shared-content session; and in accordance with a determination that the first content is content of a second type that is different from the first type, adding the first content to the shared-content session without outputting the alert that the first content is going to be added to the shared-content session before the first content is added to the shared-content session.

In accordance with some embodiments, a method is described. The method is performed at a computer system that is in communication with one or more output generation components and one or more input devices. The method comprises: receiving, via the one or more input devices, an input corresponding to a request to display a first user interface of a first application; and in response to receiving the input: in accordance with a determination that a first set of criteria is met, wherein the first set of criteria is met when a shared-content session between the computer system and an external computer system is active, and the first application is capable of playing content that can be added to the shared-content session, wherein the shared-content session, when active, enables the computer system to output respective content while the respective content is being output by the external computer system, outputting, via an output generation component of the one or more output generation components, an indication that the first application is capable of playing content that can be added to the shared-content session and outputting the first user interface for the first application; and in accordance with a determination that the first set of criteria is not met, outputting the first user interface for the first application without outputting the indication that the first application is capable of playing content that can be added to the shared-content session.

In accordance with some embodiments, a non-transitory computer-readable storage medium is described. The non-transitory computer-readable storage medium stores one or more programs configured to be executed by one or more processors of a computer system that is in communication with one or more output generation components and one or more input devices, the one or more programs including instructions for: receiving, via the one or more input devices, an input corresponding to a request to display a first user interface of a first application; and in response to receiving the input: in accordance with a determination that a first set of criteria is met, wherein the first set of criteria is met when a shared-content session between the computer system and an external computer system is active, and the first application is capable of playing content that can be added to the shared-content session, wherein the shared-content session, when active, enables the computer system to output respective content while the respective content is being output by the external computer system, outputting, via an output generation component of the one or more output generation components, an indication that the first application is capable of playing content that can be added to the shared-content session and outputting the first user interface for the first application; and in accordance with a determination that the first set of criteria is not met, outputting the first user interface for the first application without outputting the indication that the first application is capable of playing content that can be added to the shared-content session.

In accordance with some embodiments, a transitory computer-readable storage medium is described. The transitory computer-readable storage medium stores one or more programs configured to be executed by one or more processors of a computer system that is in communication with one or more output generation components and one or more input devices, the one or more programs including instructions for: receiving, via the one or more input devices, an input corresponding to a request to display a first user interface of a first application; and in response to receiving the input: in accordance with a determination that a first set of criteria is met, wherein the first set of criteria is met when a shared-content session between the computer system and an external computer system is active, and the first application is capable of playing content that can be added to the shared-content session, wherein the shared-content session, when active, enables the computer system to output respective content while the respective content is being output by the external computer system, outputting, via an output generation component of the one or more output generation components, an indication that the first application is capable of playing content that can be added to the shared-content session and outputting the first user interface for the first application; and in accordance with a determination that the first set of criteria is not met, outputting the first user interface for the first application without outputting the indication that the first application is capable of playing content that can be added to the shared-content session.

In accordance with some embodiments, a computer system is described. The computer system comprises: one or more output generation components and one or more input devices; one or more processors; and memory storing one or more programs configured to be executed by the one or more processors, the one or more programs including instructions for: receiving, via the one or more input devices, an input corresponding to a request to display a first user interface of a first application; and in response to receiving the input: in accordance with a determination that a first set of criteria is met, wherein the first set of criteria is met when a shared-content session between the computer system and an external computer system is active, and the first application is capable of playing content that can be added to the shared-content session, wherein the shared-content session, when active, enables the computer system to output respective content while the respective content is being output by the external computer system, outputting, via an output generation component of the one or more output generation components, an indication that the first application is capable of playing content that can be added to the shared-content session and outputting the first user interface for the first application; and in accordance with a determination that the first set of criteria is not met, outputting the first user interface for the first application without outputting the indication that the first application is capable of playing content that can be added to the shared-content session.

In accordance with some embodiments, a computer system is described. The computer system comprises: one or more output generation components; one or more input devices; means for receiving, via the one or more input devices, an input corresponding to a request to display a first user interface of a first application; and means for, in response to receiving the input: in accordance with a determination that a first set of criteria is met, wherein the first set of criteria is met when a shared-content session between the computer system and an external computer system is active, and the first application is capable of playing content that can be added to the shared-content session, wherein the shared-content session, when active, enables the computer system to output respective content while the respective content is being output by the external computer system, outputting, via an output generation component of the one or more output generation components, an indication that the first application is capable of playing content that can be added to the shared-content session and outputting the first user interface for the first application; and in accordance with a determination that the first set of criteria is not met, outputting the first user interface for the first application without outputting the indication that the first application is capable of playing content that can be added to the shared-content session.

In accordance with some embodiments, a computer program product is described. The computer program product comprises one or more processors of a computer system that is in communication with one or more output generation components and one or more input devices, the one or more programs including instructions for: receiving, via the one or more input devices, an input corresponding to a request to display a first user interface of a first application; and in response to receiving the input: in accordance with a determination that a first set of criteria is met, wherein the first set of criteria is met when a shared-content session between the computer system and an external computer system is active, and the first application is capable of playing content that can be added to the shared-content session, wherein the shared-content session, when active, enables the computer system to output respective content while the respective content is being output by the external computer system, outputting, via an output generation component of the one or more output generation components, an indication that the first application is capable of playing content that can be added to the shared-content session and outputting the first user interface for the first application; and in accordance with a determination that the first set of criteria is not met, outputting the first user interface for the first application without outputting the indication that the first application is capable of playing content that can be added to the shared-content session.

In accordance with some embodiments, a method is described. The method is performed at a computer system that is in communication with one or more output generation components and one or more input devices. The method comprises: receiving first data associated with a request to add first content to a shared-content session between an external computer system and the computer system; and in response to receiving the first data associated with the request to add the first content to the shared-content session: in accordance with a determination that content output criteria are met based on whether the content is available to be output by the computer system in a predetermined manner, outputting, via an output generation component of the one or more output generation components, the first content; and in accordance with a determination that the content output criteria are not met, outputting, via the output generation component of the one or more output generation components, a notification that the first content has been added to the shared-content session without outputting the first content at the computer system.

In accordance with some embodiments, a non-transitory computer-readable storage medium is described. The non-transitory computer-readable storage medium stores one or more programs configured to be executed by one or more processors of a computer system that is in communication with one or more output generation components and one or more input devices, the one or more programs including instructions for: receiving first data associated with a request to add first content to a shared-content session between an external computer system and the computer system; and in response to receiving the first data associated with the request to add the first content to the shared-content session: in accordance with a determination that content output criteria are met based on whether the content is available to be output by the computer system in a predetermined manner, outputting, via an output generation component of the one or more output generation components, the first content; and in accordance with a determination that the content output criteria are not met, outputting, via the output generation component of the one or more output generation components, a notification that the first content has been added to the shared-content session without outputting the first content at the computer system.

In accordance with some embodiments, a transitory computer-readable storage medium is described. The transitory computer-readable storage medium stores one or more programs configured to be executed by one or more processors of a computer system that is in communication with one or more output generation components and one or more input devices, the one or more programs including instructions for: receiving first data associated with a request to add first content to a shared-content session between an external computer system and the computer system; and in response to receiving the first data associated with the request to add the first content to the shared-content session: in accordance with a determination that content output criteria are met based on whether the content is available to be output by the computer system in a predetermined manner, outputting, via an output generation component of the one or more output generation components, the first content; and in accordance with a determination that the content output criteria are not met, outputting, via the output generation component of the one or more output generation components, a notification that the first content has been added to the shared-content session without outputting the first content at the computer system.

In accordance with some embodiments, a computer system is described. The computer system comprises: one or more output generation components; one or more input devices; one or more processors; and memory storing one or more programs configured to be executed by the one or more processors, the one or more programs including instructions for: receiving first data associated with a request to add first content to a shared-content session between an external computer system and the computer system; and in response to receiving the first data associated with the request to add the first content to the shared-content session: in accordance with a determination that content output criteria are met based on whether the content is available to be output by the computer system in a predetermined manner, outputting, via an output generation component of the one or more output generation components, the first content; and in accordance with a determination that the content output criteria are not met, outputting, via the output generation component of the one or more output generation components, a notification that the first content has been added to the shared-content session without outputting the first content at the computer system.

In accordance with some embodiments, a computer system is described. The computer system comprises: one or more output generation components; one or more input devices; means for receiving first data associated with a request to add first content to a shared-content session between an external computer system and the computer system; and means for, in response to receiving the first data associated with the request to add the first content to the shared-content session: in accordance with a determination that content output criteria are met based on whether the content is available to be output by the computer system in a predetermined manner, outputting, via an output generation component of the one or more output generation components, the first content; and in accordance with a determination that the content output criteria are not met, outputting, via the output generation component of the one or more output generation components, a notification that the first content has been added to the shared-content session without outputting the first content at the computer system.

In accordance with some embodiments, a computer program product is described. The computer program product comprises one or more programs configured to be executed by one or more processors of a computer system that is in communication with one or more output generation components and one or more input devices, the one or more programs including instructions for: receiving first data associated with a request to add first content to a shared-content session between an external computer system and the computer system; and in response to receiving the first data associated with the request to add the first content to the shared-content session: in accordance with a determination that content output criteria are met based on whether the content is available to be output by the computer system in a predetermined manner, outputting, via an output generation component of the one or more output generation components, the first content; and in accordance with a determination that the content output criteria are not met, outputting, via the output generation component of the one or more output generation components, a notification that the first content has been added to the shared-content session without outputting the first content at the computer system.

In accordance with some embodiments, a method is described. The method is performed at a computer system that is in communication with one or more output generation components and one or more input devices. The method comprises: displaying, via an output generation component of the one or more output generation components, a messaging interface for a respective message conversation, including concurrently displaying: a message display region of the respective message conversation between two or more participants of the respective message conversation that includes a plurality of messages from different participants to other participants in the message conversation; and a graphical representation of an ongoing shared-content session with one or more participants of the message conversation, wherein the graphical representation of the ongoing shared-content session includes first information about one or more parameters of the shared-content session, including content in the shared-content session and participant status in the shared-content session; after displaying the messaging interface and after one or more parameters of the ongoing shared-content session have changed, receiving a request to display a portion of the respective message conversation that includes the graphical representation of the shared-content session; and in response to receiving the request to display the portion of the respective message conversation that includes the graphical representation of the shared-content session, displaying the plurality of messages from different participants to other participants in the message conversation along with an updated graphical representation of the ongoing shared-content session, wherein the updated representation of the ongoing shared-content session includes second information about the one or more parameters of the shared-content session, that is different from the first information, including different content in the shared-content session and/or different participant status in the shared-content session.

In accordance with some embodiments, a non-transitory computer-readable storage medium is described. The non-transitory computer-readable storage medium stores one or more programs configured to be executed by one or more processors of a computer system that is in communication with one or more output generation components and one or more input devices, the one or more programs including instructions for: displaying, via an output generation component of the one or more output generation components, a messaging interface for a respective message conversation, including concurrently displaying: a message display region of the respective message conversation between two or more participants of the respective message conversation that includes a plurality of messages from different participants to other participants in the message conversation; and a graphical representation of an ongoing shared-content session with one or more participants of the message conversation, wherein the graphical representation of the ongoing shared-content session includes first information about one or more parameters of the shared-content session, including content in the shared-content session and participant status in the shared-content session; after displaying the messaging interface and after one or more parameters of the ongoing shared-content session have changed, receiving a request to display a portion of the respective message conversation that includes the graphical representation of the shared-content session; and in response to receiving the request to display the portion of the respective message conversation that includes the graphical representation of the shared-content session, displaying the plurality of messages from different participants to other participants in the message conversation along with an updated graphical representation of the ongoing shared-content session, wherein the updated representation of the ongoing shared-content session includes second information about the one or more parameters of the shared-content session, that is different from the first information, including different content in the shared-content session and/or different participant status in the shared-content session.

In accordance with some embodiments, a transitory computer-readable storage medium is described. The transitory computer-readable storage medium stores one or more programs configured to be executed by one or more processors of a computer system that is in communication with one or more output generation components and one or more input devices, the one or more programs including instructions for: displaying, via an output generation component of the one or more output generation components, a messaging interface for a respective message conversation, including concurrently displaying: a message display region of the respective message conversation between two or more participants of the respective message conversation that includes a plurality of messages from different participants to other participants in the message conversation; and a graphical representation of an ongoing shared-content session with one or more participants of the message conversation, wherein the graphical representation of the ongoing shared-content session includes first information about one or more parameters of the shared-content session, including content in the shared-content session and participant status in the shared-content session; after displaying the messaging interface and after one or more parameters of the ongoing shared-content session have changed, receiving a request to display a portion of the respective message conversation that includes the graphical representation of the shared-content session; and in response to receiving the request to display the portion of the respective message conversation that includes the graphical representation of the shared-content session, displaying the plurality of messages from different participants to other participants in the message conversation along with an updated graphical representation of the ongoing shared-content session, wherein the updated representation of the ongoing shared-content session includes second information about the one or more parameters of the shared-content session, that is different from the first information, including different content in the shared-content session and/or different participant status in the shared-content session.

In accordance with some embodiments, a computer system is described. The computer system comprises: one or more output generation components; one or more input devices; one or more processors; and memory storing one or more programs configured to be executed by the one or more processors, the one or more programs including instructions for: displaying, via an output generation component of the one or more output generation components, a messaging interface for a respective message conversation, including concurrently displaying: a message display region of the respective message conversation between two or more participants of the respective message conversation that includes a plurality of messages from different participants to other participants in the message conversation; and a graphical representation of an ongoing shared-content session with one or more participants of the message conversation, wherein the graphical representation of the ongoing shared-content session includes first information about one or more parameters of the shared-content session, including content in the shared-content session and participant status in the shared-content session; after displaying the messaging interface and after one or more parameters of the ongoing shared-content session have changed, receiving a request to display a portion of the respective message conversation that includes the graphical representation of the shared-content session; and in response to receiving the request to display the portion of the respective message conversation that includes the graphical representation of the shared-content session, displaying the plurality of messages from different participants to other participants in the message conversation along with an updated graphical representation of the ongoing shared-content session, wherein the updated representation of the ongoing shared-content session includes second information about the one or more parameters of the shared-content session, that is different from the first information, including different content in the shared-content session and/or different participant status in the shared-content session.

In accordance with some embodiments, a computer system is described. The computer system comprises: one or more output generation components; one or more input devices; means for displaying, via an output generation component of the one or more output generation components, a messaging interface for a respective message conversation, including concurrently displaying: a message display region of the respective message conversation between two or more participants of the respective message conversation that includes a plurality of messages from different participants to other participants in the message conversation; and a graphical representation of an ongoing shared-content session with one or more participants of the message conversation, wherein the graphical representation of the ongoing shared-content session includes first information about one or more parameters of the shared-content session, including content in the shared-content session and participant status in the shared-content session; means for, after displaying the messaging interface and after one or more parameters of the ongoing shared-content session have changed, receiving a request to display a portion of the respective message conversation that includes the graphical representation of the shared-content session; and means for, in response to receiving the request to display the portion of the respective message conversation that includes the graphical representation of the shared-content session, displaying the plurality of messages from different participants to other participants in the message conversation along with an updated graphical representation of the ongoing shared-content session, wherein the updated representation of the ongoing shared-content session includes second information about the one or more parameters of the shared-content session, that is different from the first information, including different content in the shared-content session and/or different participant status in the shared-content session.

In accordance with some embodiments, a computer program product is described. The computer program product comprises one or more programs configured to be executed by one or more processors of a computer system that is in communication with one or more output generation components and one or more input devices, the one or more programs including instructions for: displaying, via an output generation component of the one or more output generation components, a messaging interface for a respective message conversation, including concurrently displaying: a message display region of the respective message conversation between two or more participants of the respective message conversation that includes a plurality of messages from different participants to other participants in the message conversation; and a graphical representation of an ongoing shared-content session with one or more participants of the message conversation, wherein the graphical representation of the ongoing shared-content session includes first information about one or more parameters of the shared-content session, including content in the shared-content session and participant status in the shared-content session; after displaying the messaging interface and after one or more parameters of the ongoing shared-content session have changed, receiving a request to display a portion of the respective message conversation that includes the graphical representation of the shared-content session; and in response to receiving the request to display the portion of the respective message conversation that includes the graphical representation of the shared-content session, displaying the plurality of messages from different participants to other participants in the message conversation along with an updated graphical representation of the ongoing shared-content session, wherein the updated representation of the ongoing shared-content session includes second information about the one or more parameters of the shared-content session, that is different from the first information, including different content in the shared-content session and/or different participant status in the shared-content session.

In accordance with some embodiments, a method is described. The method is performed at a computer system that is in communication with one or more output generation components and one or more input devices. The method comprises: while a shared-content session between the computer system and one or more external computer systems is active: receiving, via the one or more input devices, a request to display information associated with the shared-content session; and in response to receiving the request to display information associated with the shared-content session: displaying, via an output generation component of the one or more output generation components, an indication of one or more participants in the shared-content session and one or more users that have been invited to the shared-content session but have not joined the shared-content session; in accordance with a determination that the shared-content session includes first content, displaying, via the output generation component of the one or more output generation components, a representation of the first content; and in accordance with a determination that the shared-content session includes second content different from the first content, displaying, via the output generation component of the one or more output generation components, a representation of the second content that is different from the representation of the first content.

In accordance with some embodiments, a non-transitory computer-readable storage medium is described. The non-transitory computer-readable storage medium stores one or more programs configured to be executed by one or more processors of a computer system that is in communication with one or more output generation components and one or more input devices, the one or more programs including instructions for: while a shared-content session between the computer system and one or more external computer systems is active: receiving, via the one or more input devices, a request to display information associated with the shared-content session; and in response to receiving the request to display information associated with the shared-content session: displaying, via an output generation component of the one or more output generation components, an indication of one or more participants in the shared-content session and one or more users that have been invited to the shared-content session but have not joined the shared-content session; in accordance with a determination that the shared-content session includes first content, displaying, via the output generation component of the one or more output generation components, a representation of the first content; and in accordance with a determination that the shared-content session includes second content different from the first content, displaying, via the output generation component of the one or more output generation components, a representation of the second content that is different from the representation of the first content.

In accordance with some embodiments, a transitory computer-readable storage medium is described. The transitory computer-readable storage medium stores one or more programs configured to be executed by one or more processors of a computer system that is in communication with one or more output generation components and one or more input devices, the one or more programs including instructions for: while a shared-content session between the computer system and one or more external computer systems is active: receiving, via the one or more input devices, a request to display information associated with the shared-content session; and in response to receiving the request to display information associated with the shared-content session: displaying, via an output generation component of the one or more output generation components, an indication of one or more participants in the shared-content session and one or more users that have been invited to the shared-content session but have not joined the shared-content session; in accordance with a determination that the shared-content session includes first content, displaying, via the output generation component of the one or more output generation components, a representation of the first content; and in accordance with a determination that the shared-content session includes second content different from the first content, displaying, via the output generation component of the one or more output generation components, a representation of the second content that is different from the representation of the first content.

In accordance with some embodiments, a computer system is described. The computer system comprises: one or more output generation components; one or more input devices; one or more processors; and memory storing one or more programs configured to be executed by the one or more processors, the one or more programs including instructions for: while a shared-content session between the computer system and one or more external computer systems is active: receiving, via the one or more input devices, a request to display information associated with the shared-content session; and in response to receiving the request to display information associated with the shared-content session: displaying, via an output generation component of the one or more output generation components, an indication of one or more participants in the shared-content session and one or more users that have been invited to the shared-content session but have not joined the shared-content session; in accordance with a determination that the shared-content session includes first content, displaying, via the output generation component of the one or more output generation components, a representation of the first content; and in accordance with a determination that the shared-content session includes second content different from the first content, displaying, via the output generation component of the one or more output generation components, a representation of the second content that is different from the representation of the first content.

In accordance with some embodiments, a computer system is described. The computer system comprises: one or more output generation components; one or more input devices; means for, while a shared-content session between the computer system and one or more external computer systems is active: receiving, via the one or more input devices, a request to display information associated with the shared-content session; and in response to receiving the request to display information associated with the shared-content session: displaying, via an output generation component of the one or more output generation components, an indication of one or more participants in the shared-content session and one or more users that have been invited to the shared-content session but have not joined the shared-content session; in accordance with a determination that the shared-content session includes first content, displaying, via the output generation component of the one or more output generation components, a representation of the first content; and in accordance with a determination that the shared-content session includes second content different from the first content, displaying, via the output generation component of the one or more output generation components, a representation of the second content that is different from the representation of the first content.

In accordance with some embodiments, a computer program product is described. The computer program product comprises one or more programs configured to be executed by one or more processors of a computer system that is in communication with one or more output generation components and one or more input devices, the one or more programs including instructions for: while a shared-content session between the computer system and one or more external computer systems is active: receiving, via the one or more input devices, a request to display information associated with the shared-content session; and in response to receiving the request to display information associated with the shared-content session: displaying, via an output generation component of the one or more output generation components, an indication of one or more participants in the shared-content session and one or more users that have been invited to the shared-content session but have not joined the shared-content session; in accordance with a determination that the shared-content session includes first content, displaying, via the output generation component of the one or more output generation components, a representation of the first content; and in accordance with a determination that the shared-content session includes second content different from the first content, displaying, via the output generation component of the one or more output generation components, a representation of the second content that is different from the representation of the first content.

In accordance with some embodiments, a method performed at a computer system that is in communication with one or more output generation components and one or more input devices is described. The method comprises: while a shared-content session between the computer system and one or more external computer systems is active and while a plurality of application interface regions are concurrently displayed in a user interface, including at least a portion of a first application interface region and at least a portion of a second application interface region, wherein the shared-content session, when active, enables the computer system to output respective content while the respective content is being output by the one or more external computer systems: receiving, via the one or more input devices, a set of one or more inputs corresponding to a request to add an application interface to the shared-content session; and in response to receiving a first input in the set of one or more inputs, displaying, at a location in the user interface that is visually associated with the first application interface region, a first graphical interface object that is selectable to add the first application interface region to the shared-content session without adding the second application interface region to the shared-content session, wherein the first graphical interface object is not visually associated with the second application interface region.

In accordance with some embodiments, a non-transitory computer-readable storage medium is described. The non-transitory computer-readable storage medium stores one or more programs configured to be executed by one or more processors of a computer system that is in communication with one or more output generation components and one or more input devices, the one or more programs including instructions for: while a shared-content session between the computer system and one or more external computer systems is active and while a plurality of application interface regions are concurrently displayed in a user interface, including at least a portion of a first application interface region and at least a portion of a second application interface region, wherein the shared-content session, when active, enables the computer system to output respective content while the respective content is being output by the one or more external computer systems: receiving, via the one or more input devices, a set of one or more inputs corresponding to a request to add an application interface to the shared-content session; and in response to receiving a first input in the set of one or more inputs, displaying, at a location in the user interface that is visually associated with the first application interface region, a first graphical interface object that is selectable to add the first application interface region to the shared-content session without adding the second application interface region to the shared-content session, wherein the first graphical interface object is not visually associated with the second application interface region.

In accordance with some embodiments, a transitory computer-readable storage medium is described. The transitory computer-readable storage medium stores one or more programs configured to be executed by one or more processors of a computer system that is in communication with one or more output generation components and one or more input devices, the one or more programs including instructions for: while a shared-content session between the computer system and one or more external computer systems is active and while a plurality of application interface regions are concurrently displayed in a user interface, including at least a portion of a first application interface region and at least a portion of a second application interface region, wherein the shared-content session, when active, enables the computer system to output respective content while the respective content is being output by the one or more external computer systems: receiving, via the one or more input devices, a set of one or more inputs corresponding to a request to add an application interface to the shared-content session; and in response to receiving a first input in the set of one or more inputs, displaying, at a location in the user interface that is visually associated with the first application interface region, a first graphical interface object that is selectable to add the first application interface region to the shared-content session without adding the second application interface region to the shared-content session, wherein the first graphical interface object is not visually associated with the second application interface region.

In accordance with some embodiments, a computer system that is in communication with one or more output generation components and one or more input devices is described. The computer system comprises: one or more processors; and memory storing one or more programs configured to be executed by the one or more processors, the one or more programs including instructions for: while a shared-content session between the computer system and one or more external computer systems is active and while a plurality of application interface regions are concurrently displayed in a user interface, including at least a portion of a first application interface region and at least a portion of a second application interface region, wherein the shared-content session, when active, enables the computer system to output respective content while the respective content is being output by the one or more external computer systems: receiving, via the one or more input devices, a set of one or more inputs corresponding to a request to add an application interface to the shared-content session; and in response to receiving a first input in the set of one or more inputs, displaying, at a location in the user interface that is visually associated with the first application interface region, a first graphical interface object that is selectable to add the first application interface region to the shared-content session without adding the second application interface region to the shared-content session, wherein the first graphical interface object is not visually associated with the second application interface region.

In accordance with some embodiments, a computer system that is in communication with one or more output generation components and one or more input devices is described. The computer system comprises: means for, while a shared-content session between the computer system and one or more external computer systems is active and while a plurality of application interface regions are concurrently displayed in a user interface, including at least a portion of a first application interface region and at least a portion of a second application interface region, wherein the shared-content session, when active, enables the computer system to output respective content while the respective content is being output by the one or more external computer systems: receiving, via the one or more input devices, a set of one or more inputs corresponding to a request to add an application interface to the shared-content session; and in response to receiving a first input in the set of one or more inputs, displaying, at a location in the user interface that is visually associated with the first application interface region, a first graphical interface object that is selectable to add the first application interface region to the shared-content session without adding the second application interface region to the shared-content session, wherein the first graphical interface object is not visually associated with the second application interface region.

In accordance with some embodiments, a computer program product is described. The computer program product comprises one or more programs configured to be executed by one or more processors of a computer system that is in communication with one or more output generation components and one or more input devices, the one or more programs including instructions for: while a shared-content session between the computer system and one or more external computer systems is active and while a plurality of application interface regions are concurrently displayed in a user interface, including at least a portion of a first application interface region and at least a portion of a second application interface region, wherein the shared-content session, when active, enables the computer system to output respective content while the respective content is being output by the one or more external computer systems: receiving, via the one or more input devices, a set of one or more inputs corresponding to a request to add an application interface to the shared-content session; and in response to receiving a first input in the set of one or more inputs, displaying, at a location in the user interface that is visually associated with the first application interface region, a first graphical interface object that is selectable to add the first application interface region to the shared-content session without adding the second application interface region to the shared-content session, wherein the first graphical interface object is not visually associated with the second application interface region.

In accordance with some embodiments, a method performed at a computer system that is in communication with one or more output generation components and one or more input devices is described. The method comprises: while a shared-content session between the computer system and one or more external computer systems is active, wherein the shared-content session, when active, enables the computer system to output respective content while the respective content is being output by the one or more external computer systems: receiving data representing first content that has been selected for the shared-content session at the external computer system; and in response to receiving the data representing the first content that has been selected for the shared-content session, displaying, via an output generation component of the one or more output generation components, a display region that includes a representation of the first content, including: in accordance with a determination that a first set of criteria is not met, displaying the representation of the first content with a first set of one or more controls for controlling a visual appearance of the display region, wherein the first set of one or more controls is visually associated with the representation of the first content; and in accordance with a determination that the first set of criteria is met, displaying the representation of the first content without the first set of one or more controls for controlling the visual appearance of the display region.

In accordance with some embodiments, a non-transitory computer-readable storage medium is described. The non-transitory computer-readable storage medium stores one or more programs configured to be executed by one or more processors of a computer system that is in communication with one or more output generation components and one or more input devices, the one or more programs including instructions for: while a shared-content session between the computer system and one or more external computer systems is active, wherein the shared-content session, when active, enables the computer system to output respective content while the respective content is being output by the one or more external computer systems: receiving data representing first content that has been selected for the shared-content session at the external computer system; and in response to receiving the data representing the first content that has been selected for the shared-content session, displaying, via an output generation component of the one or more output generation components, a display region that includes a representation of the first content, including: in accordance with a determination that a first set of criteria is not met, displaying the representation of the first content with a first set of one or more controls for controlling a visual appearance of the display region, wherein the first set of one or more controls is visually associated with the representation of the first content; and in accordance with a determination that the first set of criteria is met, displaying the representation of the first content without the first set of one or more controls for controlling the visual appearance of the display region.

In accordance with some embodiments, a transitory computer-readable storage medium is described. The transitory computer-readable storage medium stores one or more programs configured to be executed by one or more processors of a computer system that is in communication with one or more output generation components and one or more input devices, the one or more programs including instructions for: while a shared-content session between the computer system and one or more external computer systems is active, wherein the shared-content session, when active, enables the computer system to output respective content while the respective content is being output by the one or more external computer systems: receiving data representing first content that has been selected for the shared-content session at the external computer system; and in response to receiving the data representing the first content that has been selected for the shared-content session, displaying, via an output generation component of the one or more output generation components, a display region that includes a representation of the first content, including: in accordance with a determination that a first set of criteria is not met, displaying the representation of the first content with a first set of one or more controls for controlling a visual appearance of the display region, wherein the first set of one or more controls is visually associated with the representation of the first content; and in accordance with a determination that the first set of criteria is met, displaying the representation of the first content without the first set of one or more controls for controlling the visual appearance of the display region.

In accordance with some embodiments, a computer system that is in communication with one or more output generation components and one or more input devices is described. The computer system comprises: one or more processors; and memory storing one or more programs configured to be executed by the one or more processors, the one or more programs including instructions for: while a shared-content session between the computer system and one or more external computer systems is active, wherein the shared-content session, when active, enables the computer system to output respective content while the respective content is being output by the one or more external computer systems: receiving data representing first content that has been selected for the shared-content session at the external computer system; and in response to receiving the data representing the first content that has been selected for the shared-content session, displaying, via an output generation component of the one or more output generation components, a display region that includes a representation of the first content, including: in accordance with a determination that a first set of criteria is not met, displaying the representation of the first content with a first set of one or more controls for controlling a visual appearance of the display region, wherein the first set of one or more controls is visually associated with the representation of the first content; and in accordance with a determination that the first set of criteria is met, displaying the representation of the first content without the first set of one or more controls for controlling the visual appearance of the display region.

In accordance with some embodiments, a computer system that is in communication with one or more output generation components and one or more input devices is described. The computer system comprises: means for, while a shared-content session between the computer system and one or more external computer systems is active, wherein the shared-content session, when active, enables the computer system to output respective content while the respective content is being output by the one or more external computer systems: receiving data representing first content that has been selected for the shared-content session at the external computer system; and in response to receiving the data representing the first content that has been selected for the shared-content session, displaying, via an output generation component of the one or more output generation components, a display region that includes a representation of the first content, including: in accordance with a determination that a first set of criteria is not met, displaying the representation of the first content with a first set of one or more controls for controlling a visual appearance of the display region, wherein the first set of one or more controls is visually associated with the representation of the first content; and in accordance with a determination that the first set of criteria is met, displaying the representation of the first content without the first set of one or more controls for controlling the visual appearance of the display region.

In accordance with some embodiments, a computer program product is described. The computer program product comprises one or more programs configured to be executed by one or more processors of a computer system that is in communication with one or more output generation components and one or more input devices, the one or more programs including instructions for: while a shared-content session between the computer system and one or more external computer systems is active, wherein the shared-content session, when active, enables the computer system to output respective content while the respective content is being output by the one or more external computer systems: receiving data representing first content that has been selected for the shared-content session at the external computer system; and in response to receiving the data representing the first content that has been selected for the shared-content session, displaying, via an output generation component of the one or more output generation components, a display region that includes a representation of the first content, including: in accordance with a determination that a first set of criteria is not met, displaying the representation of the first content with a first set of one or more controls for controlling a visual appearance of the display region, wherein the first set of one or more controls is visually associated with the representation of the first content; and in accordance with a determination that the first set of criteria is met, displaying the representation of the first content without the first set of one or more controls for controlling the visual appearance of the display region.

In accordance with some embodiments, a method is described. The method is performed at a computer system that is in communication with one or more output generation components and one or more input devices. The method comprises: displaying, via the one or more output generation components, a first user interface, including concurrently displaying, in the first user interface: a view of content of a shared-content session that is displayed overlaying a background user interface; and a first representation of a participant of a real-time communication session, wherein the first representation of the participant of the real-time communication session is displayed at a first respective location relative to the view of the content of the shared-content session; while displaying the first user interface, receiving a request to move the view of the content in the first user interface; in response to receiving the request to move the view of the content, moving the view of the content in accordance with the request and moving the first representation of the participant so that the first representation of the participant is displayed at the first respective location relative to the view of the content of the shared-content session; after moving the view of the content and the first representation of the participant, detecting a request to cease to display the view of the content of the shared-content session over the background user interface; and in response to detecting the request to cease to display the view of the content of the shared-content session over the background user interface, displaying, via the one or more output generation components, a view of the content that is not displayed over the background user interface without displaying a representation of the participant at the first respective location relative to the view of the content of the shared-content session.

In accordance with some embodiments, a non-transitory computer-readable storage medium is described. The non-transitory computer-readable storage medium storing one or more programs configured to be executed by one or more processors of a computer system that is in communication with one or more output generation components and one or more input devices, the one or more programs including instructions for: displaying, via the one or more output generation components, a first user interface, including concurrently displaying, in the first user interface: a view of content of a shared-content session that is displayed overlaying a background user interface; and a first representation of a participant of a real-time communication session, wherein the first representation of the participant of the real-time communication session is displayed at a first respective location relative to the view of the content of the shared-content session; while displaying the first user interface, receiving a request to move the view of the content in the first user interface; in response to receiving the request to move the view of the content, moving the view of the content in accordance with the request and moving the first representation of the participant so that the first representation of the participant is displayed at the first respective location relative to the view of the content of the shared-content session; after moving the view of the content and the first representation of the participant, detecting a request to cease to display the view of the content of the shared-content session over the background user interface; and in response to detecting the request to cease to display the view of the content of the shared-content session over the background user interface, displaying, via the one or more output generation components, a view of the content that is not displayed over the background user interface without displaying a representation of the participant at the first respective location relative to the view of the content of the shared-content session.

In accordance with some embodiments, a transitory computer-readable storage medium is described. The transitory computer-readable storage medium stores one or more programs configured to be executed by one or more processors of a computer system that is in communication with one or more output generation components and one or more input devices, the one or more programs including instructions for: displaying, via the one or more output generation components, a first user interface, including concurrently displaying, in the first user interface: a view of content of a shared-content session that is displayed overlaying a background user interface; and a first representation of a participant of a real-time communication session, wherein the first representation of the participant of the real-time communication session is displayed at a first respective location relative to the view of the content of the shared-content session; while displaying the first user interface, receiving a request to move the view of the content in the first user interface; in response to receiving the request to move the view of the content, moving the view of the content in accordance with the request and moving the first representation of the participant so that the first representation of the participant is displayed at the first respective location relative to the view of the content of the shared-content session; after moving the view of the content and the first representation of the participant, detecting a request to cease to display the view of the content of the shared-content session over the background user interface; and in response to detecting the request to cease to display the view of the content of the shared-content session over the background user interface, displaying, via the one or more output generation components, a view of the content that is not displayed over the background user interface without displaying a representation of the participant at the first respective location relative to the view of the content of the shared-content session.

In accordance with some embodiments, a computer system is described. The computer system comprises: one or more output generation components; one or more input devices; one or more processors; an memory storing one or more programs configured to be executed by the one or more processors, the one or more programs including instructions for: displaying, via the one or more output generation components, a first user interface, including concurrently displaying, in the first user interface: a view of content of a shared-content session that is displayed overlaying a background user interface; and a first representation of a participant of a real-time communication session, wherein the first representation of the participant of the real-time communication session is displayed at a first respective location relative to the view of the content of the shared-content session; while displaying the first user interface, receiving a request to move the view of the content in the first user interface; in response to receiving the request to move the view of the content, moving the view of the content in accordance with the request and moving the first representation of the participant so that the first representation of the participant is displayed at the first respective location relative to the view of the content of the shared-content session; after moving the view of the content and the first representation of the participant, detecting a request to cease to display the view of the content of the shared-content session over the background user interface; and in response to detecting the request to cease to display the view of the content of the shared-content session over the background user interface, displaying, via the one or more output generation components, a view of the content that is not displayed over the background user interface without displaying a representation of the participant at the first respective location relative to the view of the content of the shared-content session.

In accordance with some embodiments, a computer system is described. The computer system comprises: one or more output generation components; one or more input devices; means for displaying, via the one or more output generation components, a first user interface, including concurrently displaying, in the first user interface: a view of content of a shared-content session that is displayed overlaying a background user interface; and a first representation of a participant of a real-time communication session, wherein the first representation of the participant of the real-time communication session is displayed at a first respective location relative to the view of the content of the shared-content session; means for, while displaying the first user interface, receiving a request to move the view of the content in the first user interface; means for, in response to receiving the request to move the view of the content, moving the view of the content in accordance with the request and moving the first representation of the participant so that the first representation of the participant is displayed at the first respective location relative to the view of the content of the shared-content session; means for, after moving the view of the content and the first representation of the participant, detecting a request to cease to display the view of the content of the shared-content session over the background user interface; and means for, in response to detecting the request to cease to display the view of the content of the shared-content session over the background user interface, displaying, via the one or more output generation components, a view of the content that is not displayed over the background user interface without displaying a representation of the participant at the first respective location relative to the view of the content of the shared-content session.

In accordance with some embodiments, a computer program product is described. The computer program product comprises one or more programs configured to be executed by one or more processors of a computer system that is in communication with one or more output generation components and one or more input devices, the one or more programs including instructions for: displaying, via the one or more output generation components, a first user interface, including concurrently displaying, in the first user interface: a view of content of a shared-content session that is displayed overlaying a background user interface; and a first representation of a participant of a real-time communication session, wherein the first representation of the participant of the real-time communication session is displayed at a first respective location relative to the view of the content of the shared-content session; while displaying the first user interface, receiving a request to move the view of the content in the first user interface; in response to receiving the request to move the view of the content, moving the view of the content in accordance with the request and moving the first representation of the participant so that the first representation of the participant is displayed at the first respective location relative to the view of the content of the shared-content session; after moving the view of the content and the first representation of the participant, detecting a request to cease to display the view of the content of the shared-content session over the background user interface; and in response to detecting the request to cease to display the view of the content of the shared-content session over the background user interface, displaying, via the one or more output generation components, a view of the content that is not displayed over the background user interface without displaying a representation of the participant at the first respective location relative to the view of the content of the shared-content session.

In accordance with some embodiments, a method performed at a computer system that is in communication with one or more output generation components and one or more input devices is described. The method comprises: displaying, via the one or more output generation components, a user interface of a video communication application, including displaying, concurrently in the user interface of the video communication application: dynamic visual content; and one or more representations of participants of a video communication session, wherein the one or more representations of participants of the video communication session are displayed in a first arrangement; detecting a change in size and/or position of the dynamic visual content that changes an amount of the user interface of the video communication application that is covered by the dynamic video content; and in response to detecting the change in size and/or position of the dynamic visual content, displaying, via the one or more output generation components, the one or more representations of participants of the video communication session in a second arrangement in the user interface of the video communication application, wherein the second arrangement is different from the first arrangement and is based on the change in size and/or position of the dynamic visual content.

In accordance with some embodiments, a non-transitory computer-readable storage medium is described. The non-transitory computer-readable storage medium stores one or more programs configured to be executed by one or more processors of a computer system that is in communication with one or more output generation components and one or more input devices, the one or more programs including instructions for: displaying, via the one or more output generation components, a user interface of a video communication application, including displaying, concurrently in the user interface of the video communication application: dynamic visual content; and one or more representations of participants of a video communication session, wherein the one or more representations of participants of the video communication session are displayed in a first arrangement; detecting a change in size and/or position of the dynamic visual content that changes an amount of the user interface of the video communication application that is covered by the dynamic video content; and in response to detecting the change in size and/or position of the dynamic visual content, displaying, via the one or more output generation components, the one or more representations of participants of the video communication session in a second arrangement in the user interface of the video communication application, wherein the second arrangement is different from the first arrangement and is based on the change in size and/or position of the dynamic visual content.

In accordance with some embodiments, a transitory computer-readable storage medium is described. The transitory computer-readable storage medium stores one or more programs configured to be executed by one or more processors of a computer system that is in communication with one or more output generation components and one or more input devices, the one or more programs including instructions for: displaying, via the one or more output generation components, a user interface of a video communication application, including displaying, concurrently in the user interface of the video communication application: dynamic visual content; and one or more representations of participants of a video communication session, wherein the one or more representations of participants of the video communication session are displayed in a first arrangement; detecting a change in size and/or position of the dynamic visual content that changes an amount of the user interface of the video communication application that is covered by the dynamic video content; and in response to detecting the change in size and/or position of the dynamic visual content, displaying, via the one or more output generation components, the one or more representations of participants of the video communication session in a second arrangement in the user interface of the video communication application, wherein the second arrangement is different from the first arrangement and is based on the change in size and/or position of the dynamic visual content.

In accordance with some embodiments, a computer system that is in communication with one or more output generation components and one or more input devices is described. The computer system comprises: one or more processors; and memory storing one or more programs configured to be executed by the one or more processors, the one or more programs including instructions for: displaying, via the one or more output generation components, a user interface of a video communication application, including displaying, concurrently in the user interface of the video communication application: dynamic visual content; and one or more representations of participants of a video communication session, wherein the one or more representations of participants of the video communication session are displayed in a first arrangement; detecting a change in size and/or position of the dynamic visual content that changes an amount of the user interface of the video communication application that is covered by the dynamic video content; and in response to detecting the change in size and/or position of the dynamic visual content, displaying, via the one or more output generation components, the one or more representations of participants of the video communication session in a second arrangement in the user interface of the video communication application, wherein the second arrangement is different from the first arrangement and is based on the change in size and/or position of the dynamic visual content.

In accordance with some embodiments, a computer system that is in communication with one or more output generation components and one or more input devices is described. The computer system comprises: means for displaying, via the one or more output generation components, a user interface of a video communication application, including displaying, concurrently in the user interface of the video communication application: dynamic visual content; and one or more representations of participants of a video communication session, wherein the one or more representations of participants of the video communication session are displayed in a first arrangement; means for detecting a change in size and/or position of the dynamic visual content that changes an amount of the user interface of the video communication application that is covered by the dynamic video content; and means for, in response to detecting the change in size and/or position of the dynamic visual content, displaying, via the one or more output generation components, the one or more representations of participants of the video communication session in a second arrangement in the user interface of the video communication application, wherein the second arrangement is different from the first arrangement and is based on the change in size and/or position of the dynamic visual content.

In accordance with some embodiments, a computer program product is described. The computer program product comprises one or more programs configured to be executed by one or more processors of a computer system that is in communication with one or more output generation components and one or more input devices, the one or more programs including instructions for: displaying, via the one or more output generation components, a user interface of a video communication application, including displaying, concurrently in the user interface of the video communication application: dynamic visual content; and one or more representations of participants of a video communication session, wherein the one or more representations of participants of the video communication session are displayed in a first arrangement; detecting a change in size and/or position of the dynamic visual content that changes an amount of the user interface of the video communication application that is covered by the dynamic video content; and in response to detecting the change in size and/or position of the dynamic visual content, displaying, via the one or more output generation components, the one or more representations of participants of the video communication session in a second arrangement in the user interface of the video communication application, wherein the second arrangement is different from the first arrangement and is based on the change in size and/or position of the dynamic visual content.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing shared-content sessions, thereby increasing the effectiveness, efficiency, and user satisfaction with such devices. Such methods and interfaces may complement or replace other methods for managing shared-content sessions.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 15 depicts a flow diagram illustrating a method for managing a shared-content session, in accordance with some embodiments.

FIG. 16 depicts a flow diagram illustrating a method for managing a shared-content session, in accordance with some embodiments.

DESCRIPTION OF EMBODIMENTS

Figure 1A:
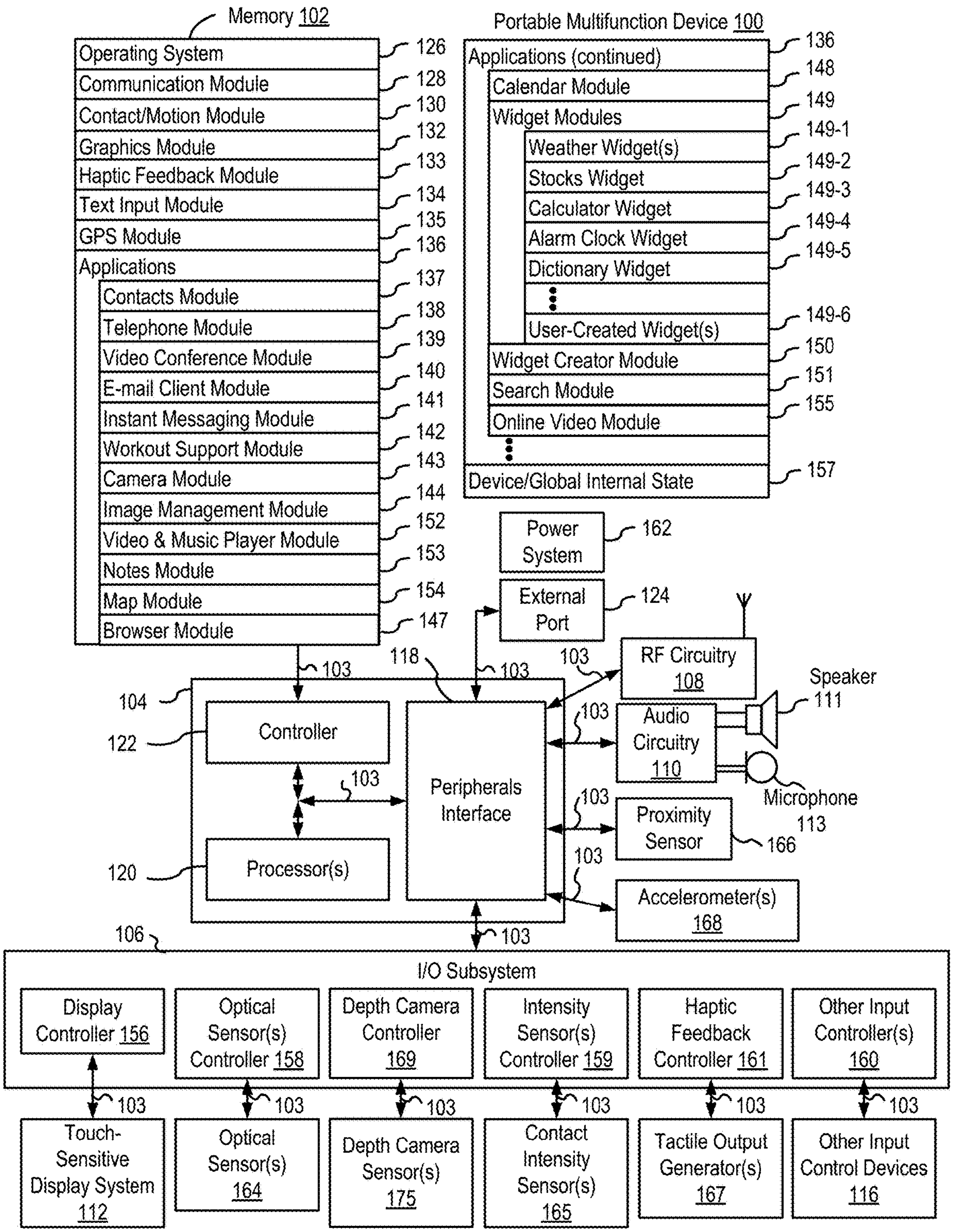
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing shared-content sessions. Such techniques can reduce the cognitive burden on a user who accesses content in a shared-content session, thereby enhancing productivity. Further, such techniques can reduce processor and battery power otherwise wasted on redundant user inputs.

Below, FIGS. 1A-1B, 2, 3, 4A-4B, and 5A-5C provide a description of exemplary devices for performing the techniques for managing shared-content sessions. FIGS. 6A-6EQ illustrate exemplary user interfaces for managing shared-content sessions. FIGS. 7-13 and 17-18 are flow diagrams illustrating methods of managing shared-content sessions in accordance with some embodiments. The user interfaces in FIGS. 6A-6EQ are used to illustrate the processes described below, including the processes in FIGS. 7-13 and 17-18. FIGS. 14A-14AG illustrate exemplary user interfaces for managing shared-content sessions. FIGS. 15-16 are flow diagrams illustrating methods of managing shared-content sessions in accordance with some embodiments. The user interfaces in FIGS. 14A-14AG are used to illustrate the processes described below, including the processes in FIGS. 15-16.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term “tactile output” refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user’s sense of touch. For example, in situations where the device or the component of the device is in contact with a surface of a user that is sensitive to touch (e.g., a finger, palm, or other part of a user’s hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a “down click” or “up click” of a physical actuator button. In some cases, a user will feel a tactile sensation such as an “down click” or “up click” even when there is no movement of a physical actuator button associated with the touch-sensitive surface that is physically pressed (e.g., displaced) by the user’s movements. As another example, movement of the touch-sensitive surface is, optionally, interpreted or sensed by the user as “roughness” of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an “up click,” a “down click,” “roughness”), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
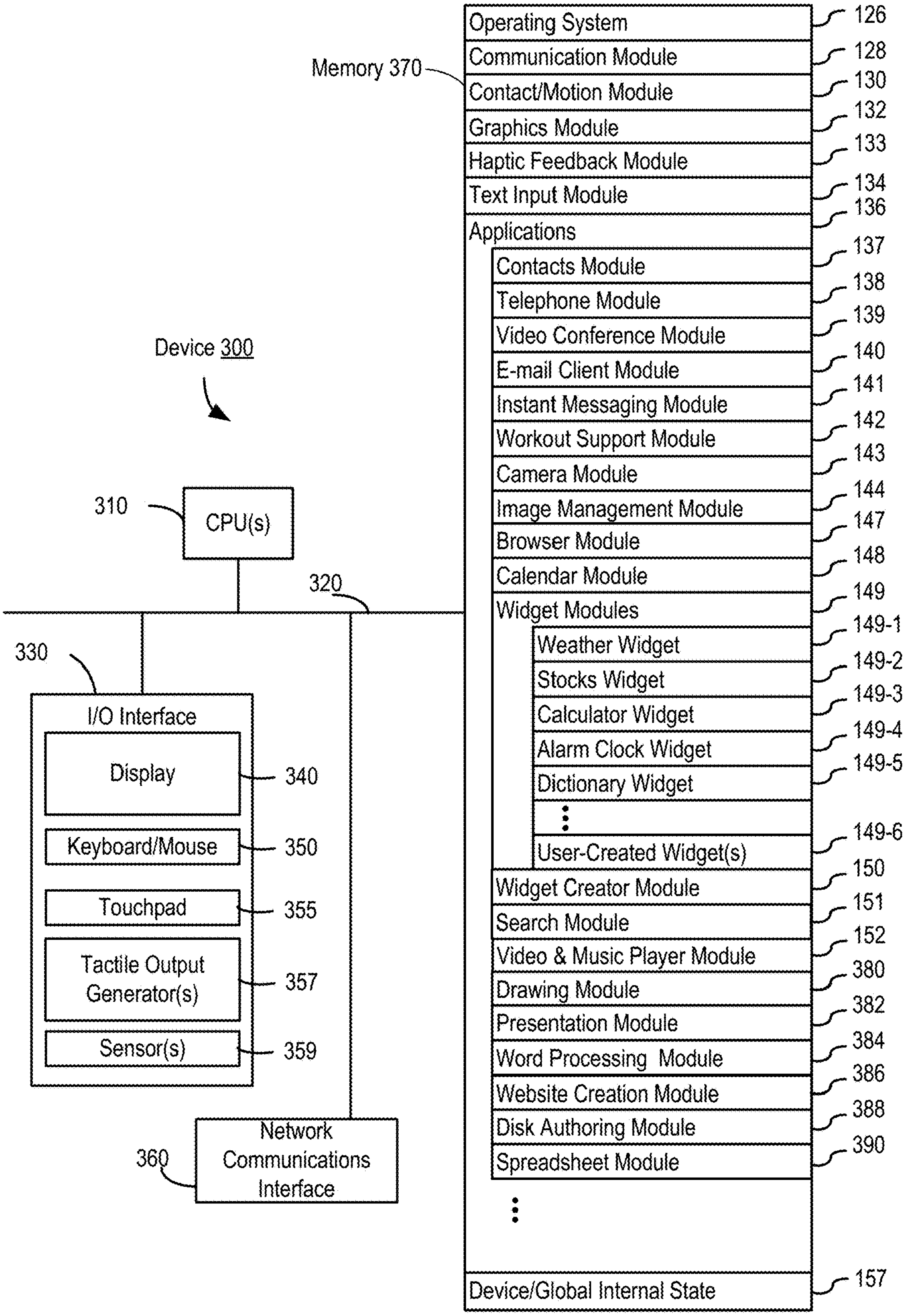
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
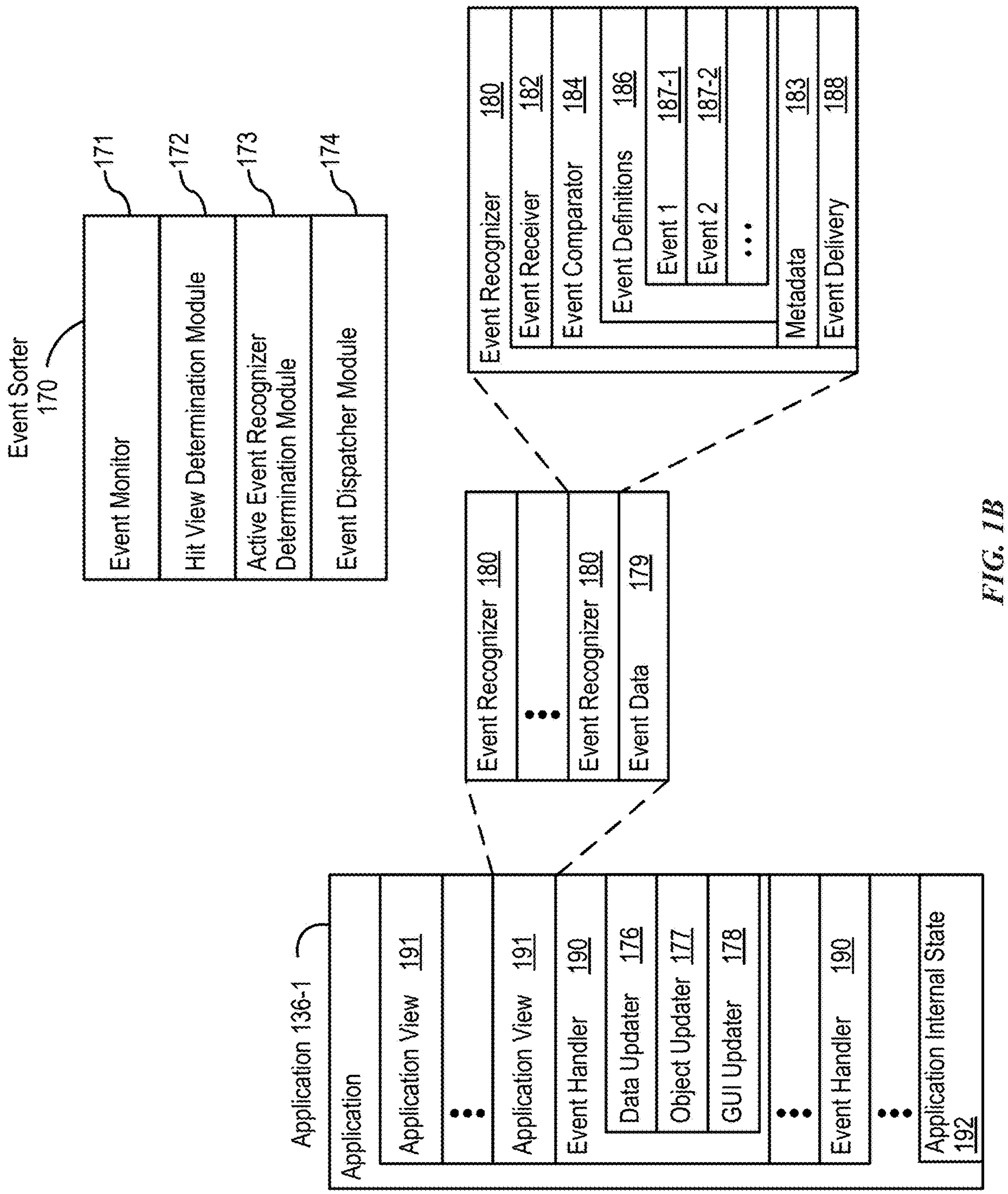
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
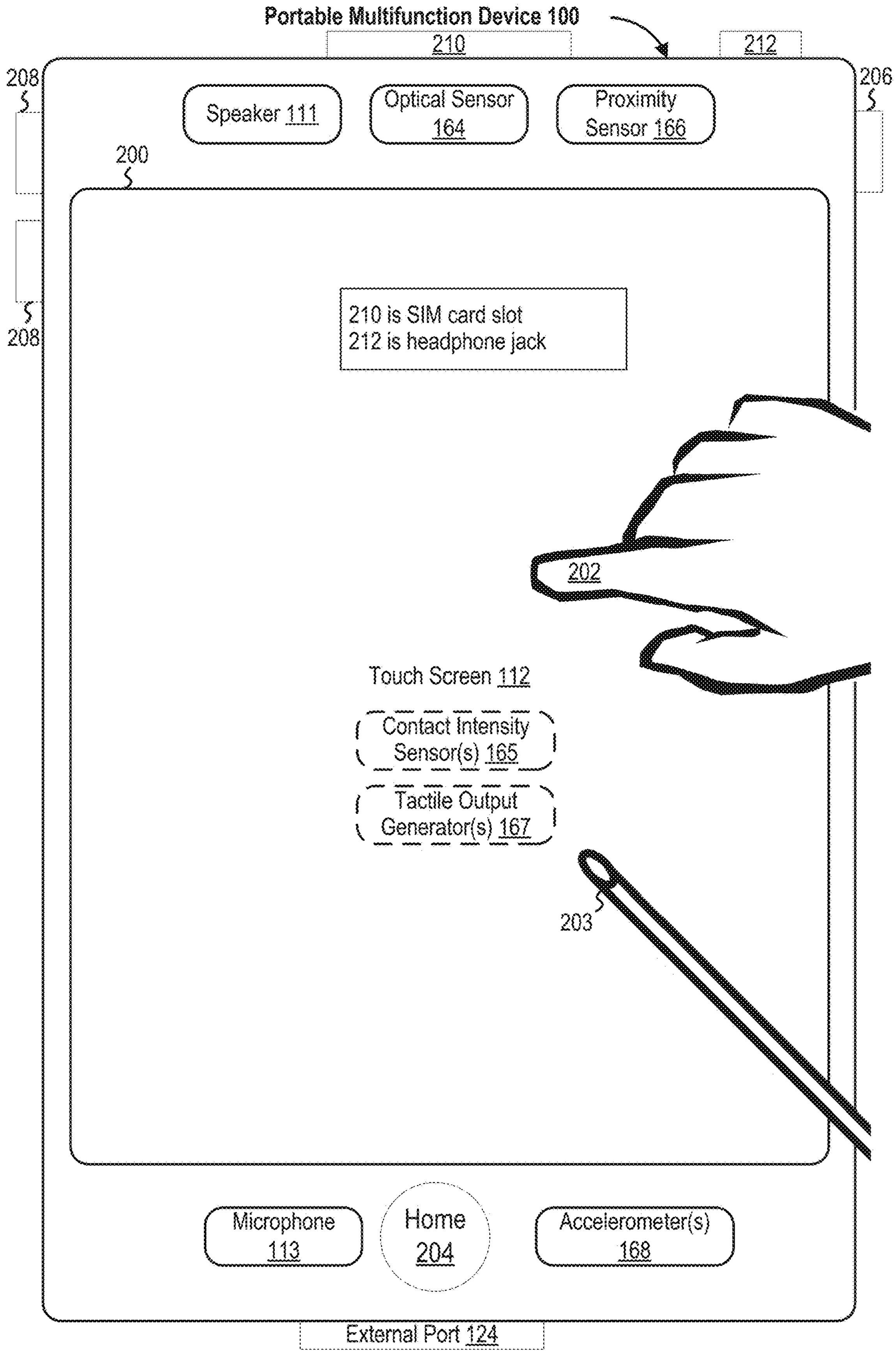
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
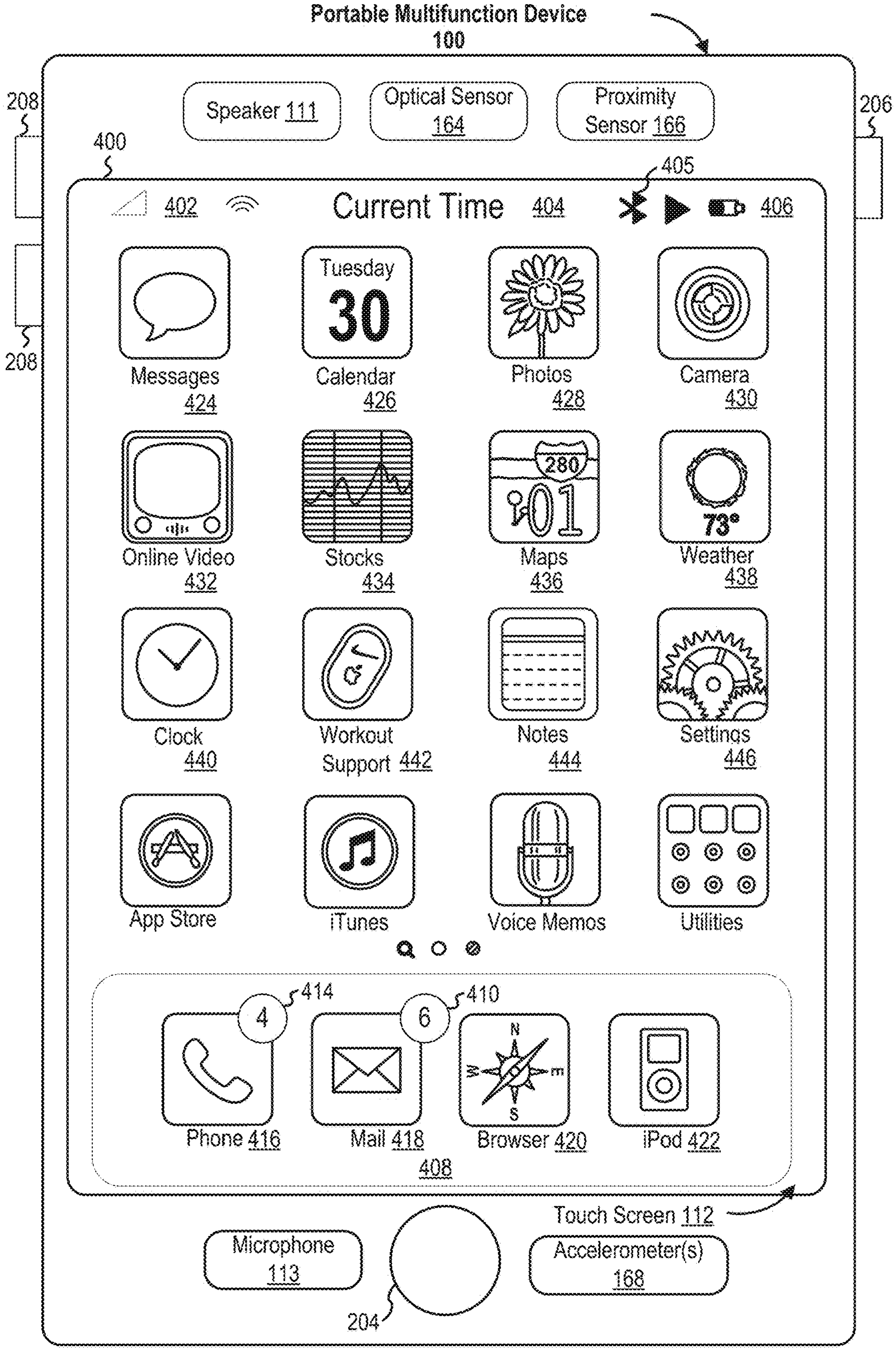
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
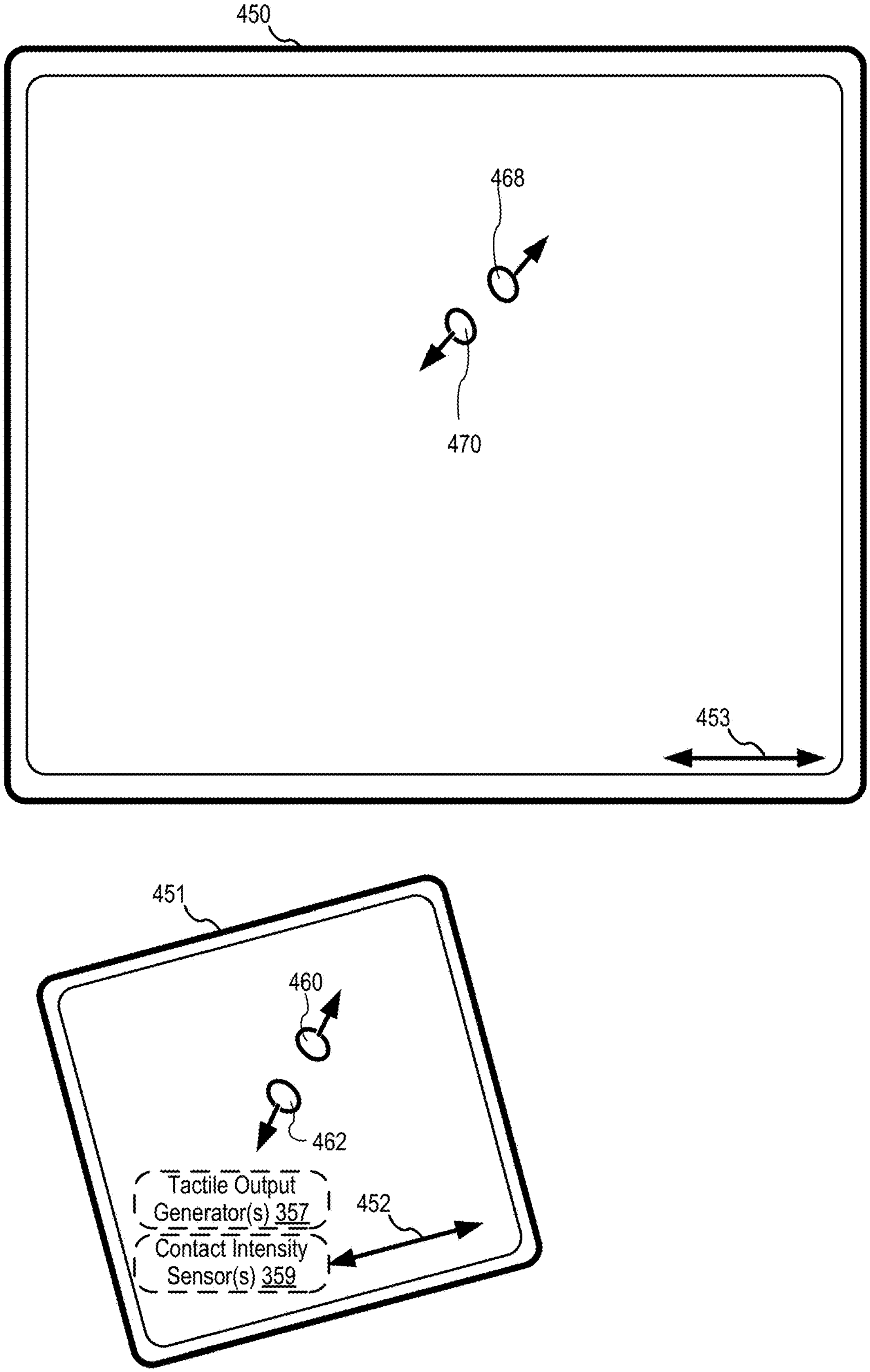
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
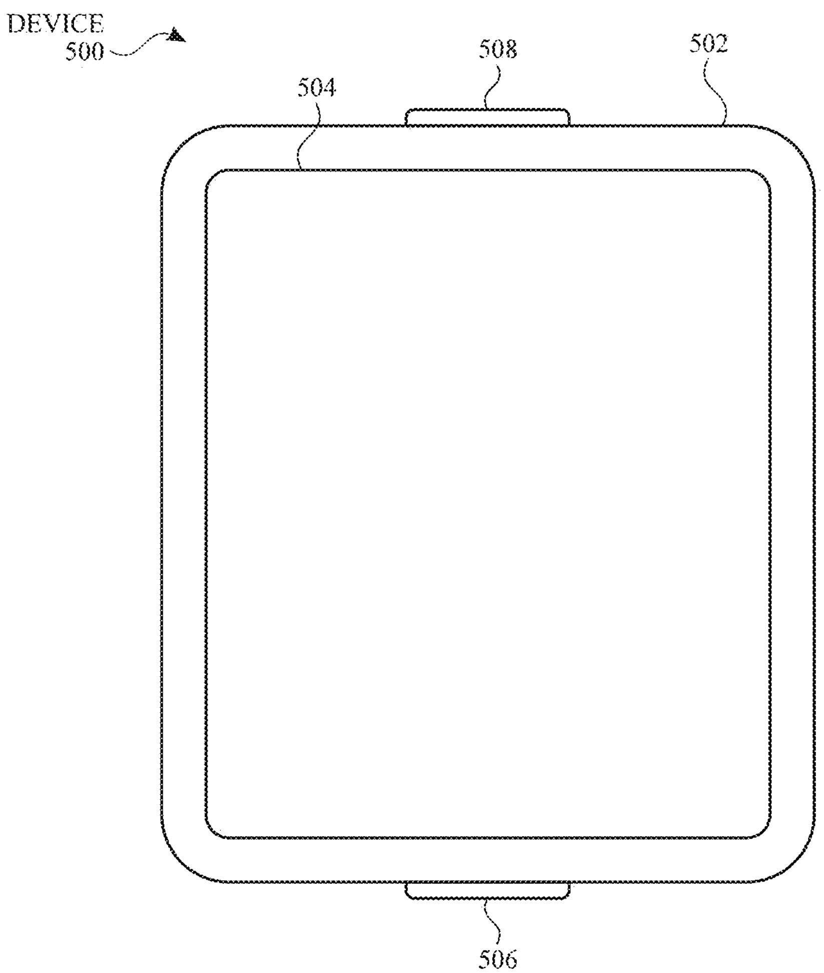
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
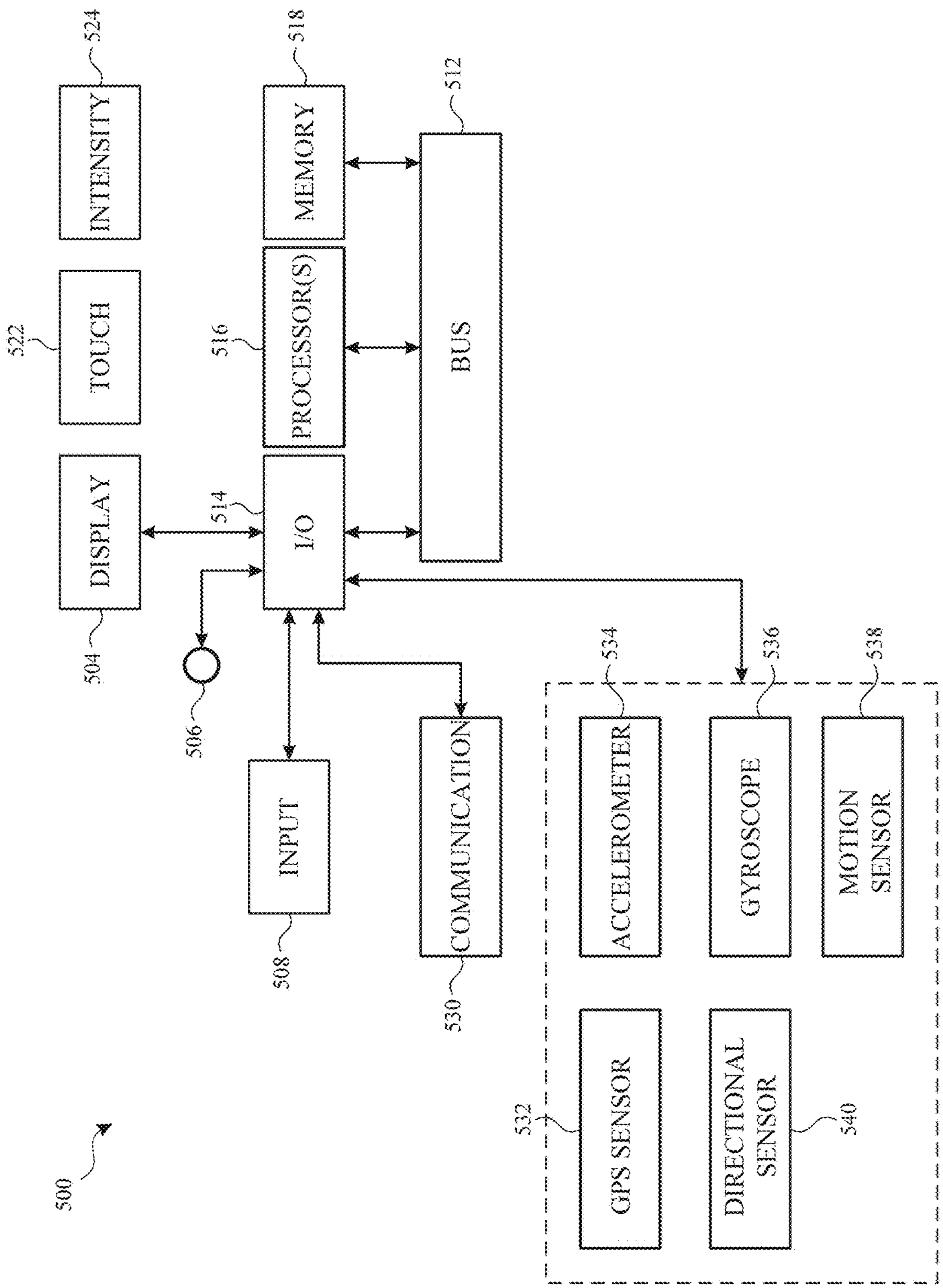
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700-1300 and 1500-1800 (FIGS. 7-13 and 15-18). A computer-readable storage medium can be any medium that can tangibly contain or store computer-executable instructions for use by or in connection with the instruction execution system, apparatus, or device. In some examples, the storage medium is a transitory computer-readable storage medium.

In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Figure 5C:
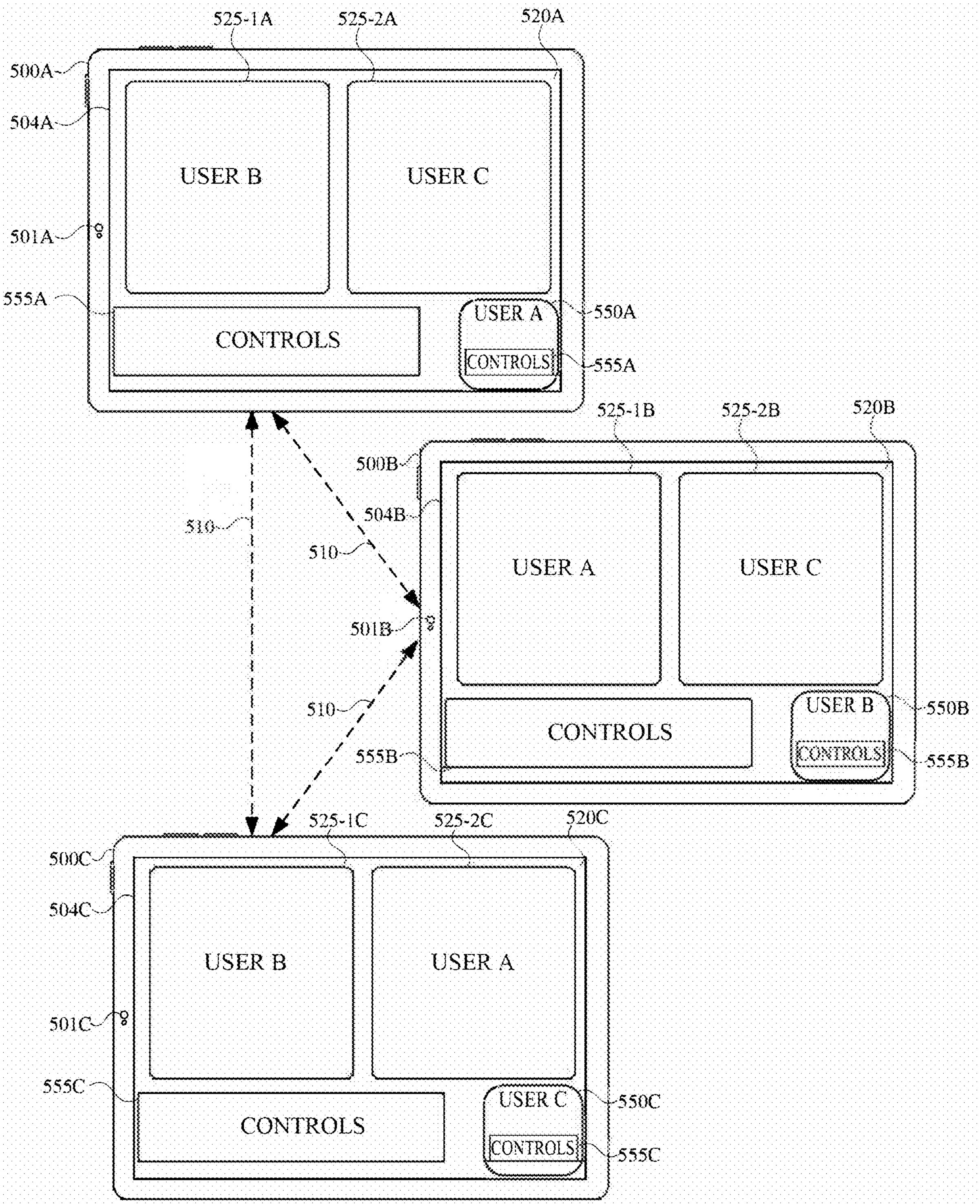
FIG. 5C illustrates an exemplary diagram of a communication session between electronic devices, in accordance with some embodiments.

FIG. 5C depicts an exemplary diagram of a communication session between electronic devices 500A, 500B, and 500C. Devices 500A, 500B, and 500C are similar to electronic device 500, and each share with each other one or more data connections 510 such as an Internet connection, Wi-Fi connection, cellular connection, short-range communication connection, and/or any other such data connection or network so as to facilitate real time communication of audio and/or video data between the respective devices for a duration of time. In some embodiments, an exemplary communication session can include a shared-data session whereby data is communicated from one or more of the electronic devices to the other electronic devices to enable concurrent output of respective content at the electronic devices. In some embodiments, an exemplary communication session can include a video conference session whereby audio and/or video data is communicated between devices 500A, 500B, and 500C such that users of the respective devices can engage in real time communication using the electronic devices.

In FIG. 5C, device 500A represents an electronic device associated with User A. Device 500A is in communication (via data connections 510) with devices 500B and 500C, which are associated with User B and User C, respectively. Device 500A includes camera 501A, which is used to capture video data for the communication session, and display 504A (e.g., a touchscreen), which is used to display content associated with the communication session. Device 500A also includes other components, such as a microphone (e.g., 113) for recording audio for the communication session and a speaker (e.g., 111) for outputting audio for the communication session.

Device 500A displays, via display 504A, communication UI 520A, which is a user interface for facilitating a communication session (e.g., a video conference session) between device 500B and device 500C. Communication UI 520A includes video feed 525-1A and video feed 525-2A. Video feed 525-1A is a representation of video data captured at device 500B (e.g., using camera 501B) and communicated from device 500B to devices 500A and 500C during the communication session. Video feed 525-2A is a representation of video data captured at device 500C (e.g., using camera 501C) and communicated from device 500C to devices 500A and 500B during the communication session.

Communication UI 520A includes camera preview 550A, which is a representation of video data captured at device 500A via camera 501A. Camera preview 550A represents to User A the prospective video feed of User A that is displayed at respective devices 500B and 500C.

Communication UI 520A includes one or more controls 555A for controlling one or more aspects of the communication session. For example, controls 555A can include controls for muting audio for the communication session, changing a camera view for the communication session (e.g., changing which camera is used for capturing video for the communication session, adjusting a zoom value), terminating the communication session, applying visual effects to the camera view for the communication session, activating one or more modes associated with the communication session. In some embodiments, one or more controls 555A are optionally displayed in communication UI 520A. In some embodiments, one or more controls 555A are displayed separate from camera preview 550A. In some embodiments, one or more controls 555A are displayed overlaying at least a portion of camera preview 550A.

In FIG. 5C, device 500B represents an electronic device associated with User B, which is in communication (via data connections 510) with devices 500A and 500C. Device 500B includes camera 501B, which is used to capture video data for the communication session, and display 504B (e.g., a touchscreen), which is used to display content associated with the communication session. Device 500B also includes other components, such as a microphone (e.g., 113) for recording audio for the communication session and a speaker (e.g., 111) for outputting audio for the communication session.

Device 500B displays, via touchscreen 504B, communication UI 520B, which is similar to communication UI 520A of device 500A. Communication UI 520B includes video feed 525-1B and video feed 525-2B. Video feed 525-1B is a representation of video data captured at device 500A (e.g., using camera 501A) and communicated from device 500A to devices 500B and 500C during the communication session. Video feed 525-2B is a representation of video data captured at device 500C (e.g., using camera 501C) and communicated from device 500C to devices 500A and 500B during the communication session. Communication UI 520B also includes camera preview 550B, which is a representation of video data captured at device 500B via camera 501B, and one or more controls 555B for controlling one or more aspects of the communication session, similar to controls 555A. Camera preview 550B represents to User B the prospective video feed of User B that is displayed at respective devices 500A and 500C.

In FIG. 5C, device 500C represents an electronic device associated with User C, which is in communication (via data connections 510) with devices 500A and 500B. Device 500C includes camera 501C, which is used to capture video data for the communication session, and display 504C (e.g., a touchscreen), which is used to display content associated with the communication session. Device 500C also includes other components, such as a microphone (e.g., 113) for recording audio for the communication session and a speaker (e.g., 111) for outputting audio for the communication session.

Device 500C displays, via touchscreen 504C, communication UI 520C, which is similar to communication UI 520A of device 500A and communication UI 520B of device 500B. Communication UI 520C includes video feed 525-1C and video feed 525-2C. Video feed 525-1C is a representation of video data captured at device 500B (e.g., using camera 501B) and communicated from device 500B to devices 500A and 500C during the communication session. Video feed 525-2C is a representation of video data captured at device 500A (e.g., using camera 501A) and communicated from device 500A to devices 500B and 500C during the communication session. Communication UI 520C also includes camera preview 550C, which is a representation of video data captured at device 500C via camera 501C, and one or more controls 555C for controlling one or more aspects of the communication session, similar to controls 555A and 555B. Camera preview 550C represents to User C the prospective video feed of User C that is displayed at respective devices 500A and 500B.

While the diagram depicted in FIG. 5C represents a communication session between three electronic devices, the communication session can be established between two or more electronic devices, and the number of devices participating in the communication session can change as electronic devices join or leave the communication session.

For example, if one of the electronic devices leaves the communication session, audio and video data from the device that stopped participating in the communication session is no longer represented on the participating devices. For example, if device 500B stops participating in the communication session, there is no data connection 510 between devices 500A and 500C, and no data connection 510 between devices 500C and 500B. Additionally, device 500A does not include video feed 525-1A and device 500C does not include video feed 525-1C. Similarly, if a device joins the communication session, a connection is established between the joining device and the existing devices, and the video and audio data is shared among all devices such that each device is capable of outputting data communicated from the other devices.

The embodiment depicted in FIG. 5C represents a diagram of a communication session between multiple electronic devices, including the example communication sessions depicted in FIGS. 6A-6EQ and 14A-14AG. In some embodiments, the communication sessions depicted in FIGS. 6A-6EQ and 14A-14AG includes two or more electronic devices, even if other electronic devices participating in the communication session are not depicted in the figures.

Attention is now directed towards embodiments of user interfaces ("UI") and associated processes that are implemented on an electronic device, such as portable multifunction device 100, device 300, or device 500.

FIGS. 6A-6EQ illustrate exemplary user interfaces for managing shared-content sessions, in accordance with some embodiments. The user interfaces in these figures are used to illustrate the processes described below, including the processes in FIGS. 7-13 and 17-18. In some embodiments, the user interfaces in FIGS. 6A-6EQ can be used to illustrate the processes described below with respect to FIGS. 15-16.

The present disclosure describes embodiments for managing a shared-content session (also referred to as a sharing session) in which respective content can be concurrently output at multiple devices participating in the shared-content session. In some embodiments, the respective content is screen-share content. For example, the content of a host device's displayed screen is shared with participants of the shared-content session such that the participants can view, at their respective devices, the screen content of the host device (the sharing device, or, the device whose screen content is being shared), including any changes to the displayed screen content, in real time. In some embodiments, the respective content is synchronized content that is output concurrently at the respective devices of the participants of the shared-content session. For example, the respective devices of the participants separately access the respective content (e.g., a video, a movie, a TV show, and/or a song) from a remote server and/or local memory and are synchronized in their respective output of the content such that the content is output (e.g., via an application local to the respective devices) concurrently at the respective devices as each device separately accesses the respective content from the remote server(s) and/or local memory. In some embodiments, the respective devices exchange information (e.g., via a server) to facilitate synchronization. For example, the respective devices can share play state and/or playback location information of the content, as well as indications of local commands (e.g., play, pause, stop, fast forward, and/or rewind) in order to implement the commands on the output of the content on other devices. Sharing play state and/or playback location information is more efficient and effective for synchronizing the content at the respective devices, because the host device is not transmitting the content to the respective devices, but rather, smaller data packets containing the play state and/or playback location information. Additionally, each respective device outputs the content at a size and quality that is appropriate for the respective device and connectivity (e.g., data connection conditions such as data transmission and/or processing speeds) of the device, thereby providing a more customized, yet synchronized, playback experience at each of the respective devices. In some embodiments, an application (or "app") is available (e.g., downloaded and/or installed) at a respective device to enable the device to participate in shared-content sessions.

As discussed herein, the term "share," "sharing," or "shared" is used generally to refer to a situation in which content (e.g., screen-share content and/or synchronized content) is, or is capable of, being output (e.g., viewed and/or played) concurrently at multiple devices that are participating in a shared-content session. Unless specifically noted otherwise, these terms do not require that the content being "shared" is transmitted from any particular device participating in the shared-content session to any of the other devices with which the content is being shared. In some embodiments, the content that is being shared in the shared-content session is content that is separately accessed by each respective device, for example, from a remote server or another source other than one of the devices participating in the shared-content session. For example, in some embodiments, when media content, such as a movie, is being played at devices participating in the shared-content session, the movie is said to be shared with the participants, even though the respective participants are accessing (e.g., from a movie application) and playing the movie separate from (but concurrently with) the other participants in the shared-content session. In some embodiments, screen-share content is shared with participants of the shared-content session by transmitting, from a host device, image data representing content displayed on a display screen of the host device to other devices participating in the shared-content session.

In some embodiments, one or more audio channels are active (e.g., open) during the shared-content session such that participants of the shared-content session can speak to one another in real time while the shared-content session is ongoing and, optionally, while content is being shared (e.g., screen-share content and/or synchronized content) via the shared-content session. In some embodiments, one or more video channels are open (e.g., via a video conferencing application that is local to respective devices) such that participants of the shared-content session can participate in a live video communication (e.g., video chat) while the shared-content session is ongoing and, optionally, while content is being shared via the shared-content session. Various aspects of these embodiments, and further details of a shared-content session, are discussed below with reference to the figures.

Figure 6A:
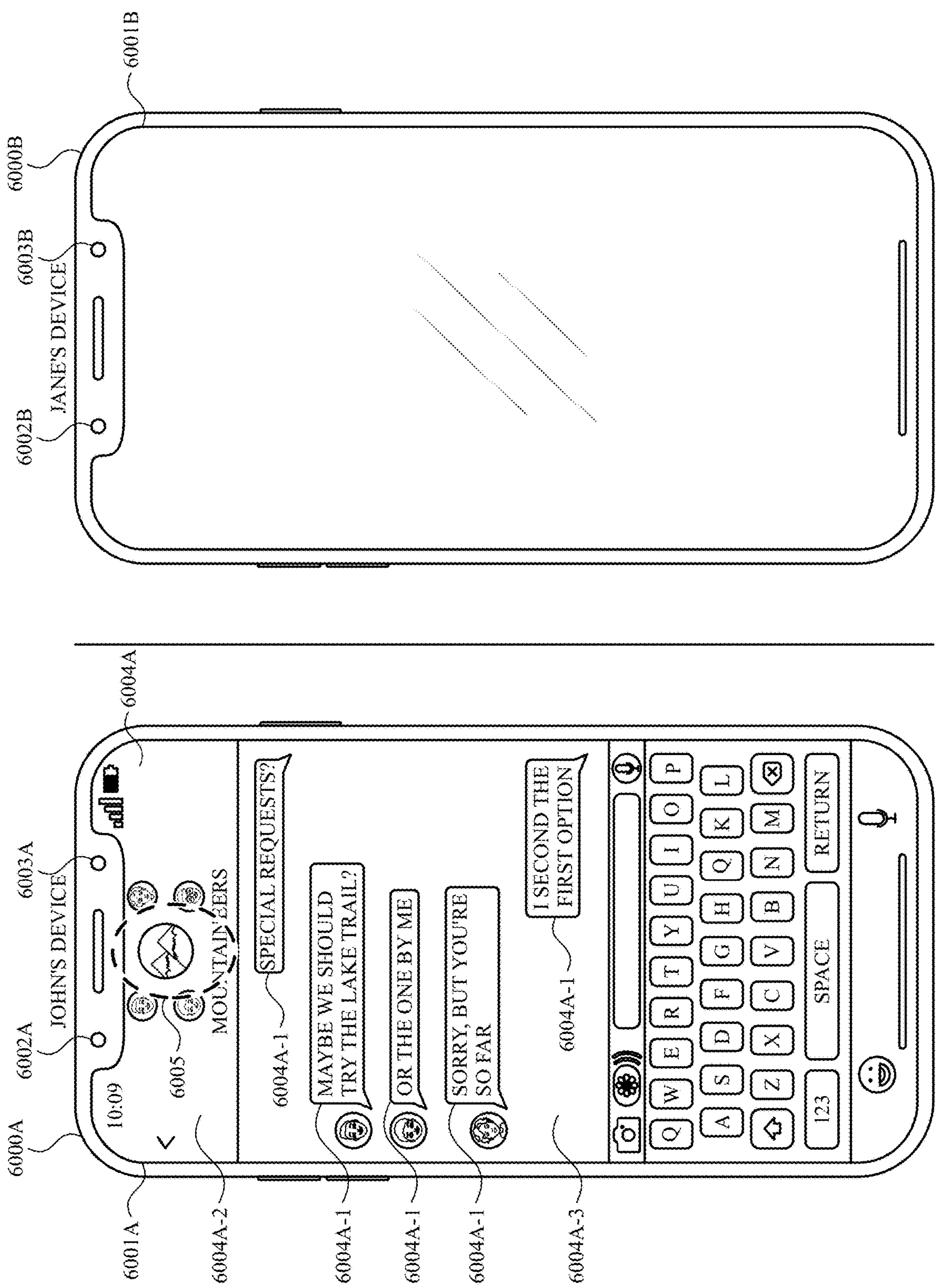
FIGS. 6A-6EQ illustrate exemplary user interfaces for managing a shared-content session, in accordance with some embodiments.

FIG. 6A illustrates exemplary devices for participating in shared-content sessions, in accordance with some embodiments. Specifically, these devices include John's device 6000A (e.g., a smartphone) and Jane's device 6000B (e.g., a smartphone), which are shown side-by-side to illustrate concurrent states of the respective devices, including the user interfaces and inputs at the respective devices. John's device 6000A includes display 6001A, one or more cameras 6002A, and one or more microphones 6003A (also referred to as mic 6003A). Jane's device 6000B includes display 6001B, one or more cameras 6002B, and one or more microphones 6003B (also referred to as mic 6003B). John's device 6000A is similar to Jane's device 6000B. In the description that follows, reference numbers can include the letter "A" to refer to elements of John's device, can include the letter "B" to refer to elements of Jane's device, or can include no letter to refer to elements of either or both devices. For example, devices 6000A and 6000B can be referred to using reference number 6000—that is, reference number 6000 can be used herein to refer to John's device 6000A or Jane's device 6000B, or both. Reference can be made in a similar manner to other elements sharing a common reference number. For example, displays 6001A and 6001B, cameras 6002A and 6002B, and microphones 6003A and 6003B can be referred to using reference numbers 6001, 6002, and 6003, respectively. In some embodiments, device 6000 includes one or more features of devices 100, 300, and/or 500.

In the embodiments provided herein, John's device 6000A can be described as performing a set of functions associated with the shared-content session, and Jane's device 6000B can be described as performing a different set of functions associated with the shared-content session. These descriptions are not intended to limit the functions performed by the respective devices, but rather, are provided to illustrate various aspects and embodiments of a shared-content session. Thus, unless specified otherwise, the functions that are described as being performed by John's device 6000A are similarly capable of being performed by Jane's device 6000B and the devices of other participants in the shared-content session. Similarly, the functions that are described as being performed by Jane's device 6000B are similarly capable of being performed by John's device 6000A and the devices of other participants in the shared-content session, unless specified otherwise.

FIGS. 6A-6L illustrate example embodiments in which John initiates a shared-content session for members of a group called "Mountaineers."

In FIG. 6A, device 6000A and 6000B are not in a shared-content session (a shared-content session is not active, and the devices are not currently participating in any shared-content sessions). John's device 6000A displays, via display 6001A, messages interface 6004A. Jane's device 6000B is not displaying any content (e.g., device 6000B is a locked and/or inactive state). In FIG. 6A, messages interface 6004A depicts a group message conversation that includes messages 6004A-1 among participants of a group called "Mountaineers." Messages 6004A-1 are displayed in message display region 6004A-3. Messages interface 6004A includes a Mountaineers group logo that is displayed in header region 6004A-2. John's device 6000A detects, via display 6001A, input 6005 (e.g., a tap input; a tap gesture) in header region 6004A-2 and, in response, displays options 6006 as depicted in FIG. 6B.

Figure 6B:
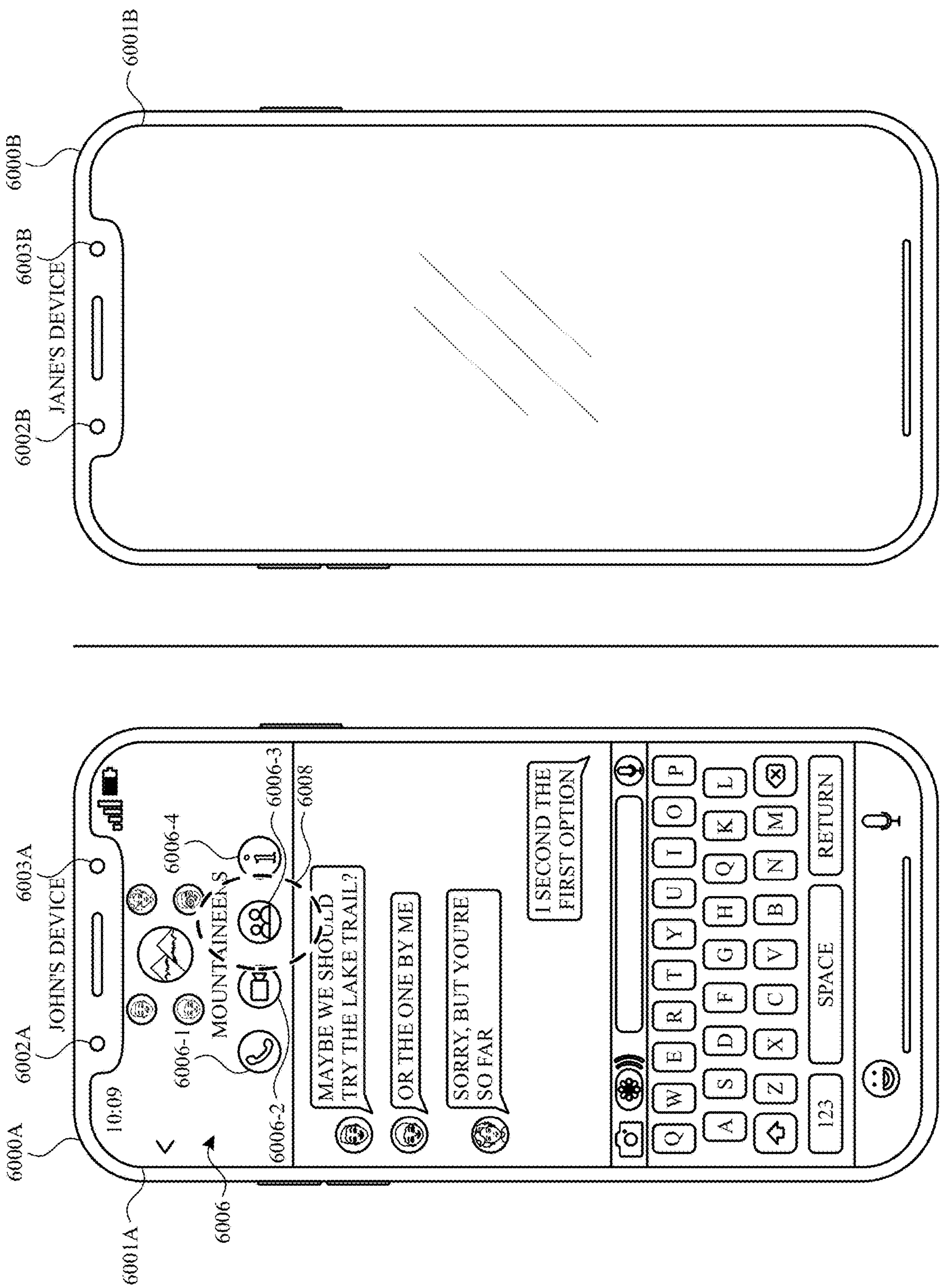

In FIG. 6B, John's device 6000A expands header region 6004A-2 to display options 6006, in response to detecting input 6005. The options include phone option 6006-1, video conference option 6006-2, sharing option 6006-3, and status option 6006-4. Phone option 6006-1 is selectable to call the members of the Mountaineers group. Video conference option 6006-2 is selectable to initiate a video conference session with members of the Mountaineers group. Sharing option 6006-3 is selectable to initiate a shared-content session with members of the Mountaineers group. Status option 6006-4 is selectable to view a status card for the Mountaineers group. In FIG. 6B, John's device 6000A detects input 6008 on sharing option 6006-3 and, in response, initiates a shared-content session with members of the Mountaineers group.

Figure 6C:
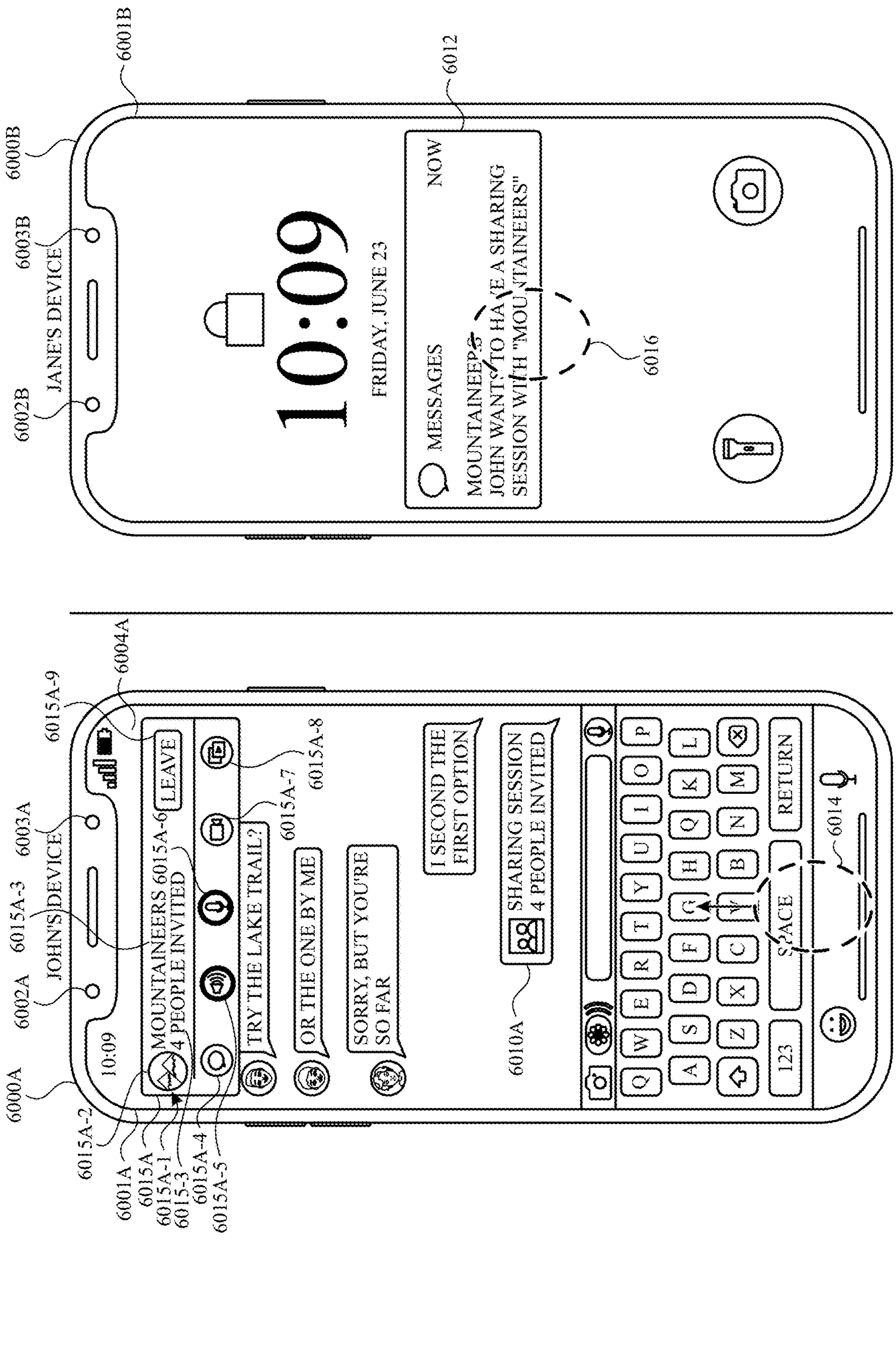

In FIG. 6C, John's device 6000A has initiated a shared-content session with members of the Mountaineers group. John's device 6000A displays control region 6015A, which provides information associated with the active shared-content session between John's device 6000A and other participants in the Mountaineers group and includes selectable options for controlling operations, parameters, and/or settings of the active shared-content session. Additionally, John's device 6000A displays dynamic graphic 6010A in messages interface 6004A. Dynamic graphic 6010A is displayed in a message display region with messages 6004A-1, indicates that a shared-content session has been started, and includes a status of the shared-content session (e.g., four people are invited to join). Dynamic graphic 6010A updates dynamically based on detected changes to various parameters of the shared-content session and, in some embodiments, is selectable to perform various functions associated with the shared-content session. In some embodiments, dynamic graphic 6010A is displayed in messages interface 6004A, even if the shared-content session is initiated from an application other than the messages application (e.g., from a video conferencing application). In some embodiments, dynamic graphic 6010A can include different information such as the name and/or logo of the group participating in the shared-content session, names of participants, activities occurring in the shared-content session, or other relevant information. In some embodiments, dynamic graphic 6010A can include an option that is selectable to join or leave the shared-content session. The content displayed in dynamic graphic 6010A is specific to John's device 6000A. For example, in the embodiment depicted in FIG. 6C, dynamic graphic 6010A does not include a selectable "join" option because John's device 6000A has already joined the shared-content session in response to the request to initiate the shared-content session.

Control region 6015A provides information associated with the shared-content session. As depicted in FIG. 6C, at least some of this information is displayed in status region 6015A-1, which includes identifiers 6015A-2 representing a name of the group participating in the shared-content session and the group's logo. Status region 6015A-1 also includes status 6015A-3, which currently indicates that four participants are invited to join the shared-content session. Control region 6015A also includes various options that are selectable to control operations, parameters, and/or settings of the shared-content session. For example, messages option 6015A-4 is selectable to, in some embodiments, view a messages conversation (e.g., message interface 6004A) between the participants of the shared-content session. Speaker option 6015A-5 is selectable to, in some embodiments, enable or disable the audio output at John's device 6000A via the shared-content session (or to enable or disable a speaker mode at John's device 6000A). Mic option 6015A-6 is selectable to, in some embodiments, enable or disable an audio channel for the shared-content session with respect to John's device 6000A. Mic option 6015A-6 is currently shown in an enabled state (e.g., bolded) to indicate that mic 6003A is enabled and that the audio channel for John's device 6000A is enabled for the shared-content session. Video option 6015A-7 is selectable to, in some embodiments, initiate a video conference session with the participants of the shared-content session, view an ongoing video conference session, to enable/disable a camera, and/or to select different cameras to be used for the shared-content session. Sharing option 6015A-8 is selectable to, in some embodiments, initiate a screen-sharing option whereby the content of John's screen is shared with participants of the shared-content session. Leave option 6015A-9 is selectable to, in some embodiments, cause John (or John's device 6000A) to leave the shared-content session, optionally without terminating the shared-content session for other participants of the shared-content session. In some embodiments, sharing option 6015A-8 is selectable to display and/or change various media playback settings.

In some embodiments, an appearance of sharing option 6015A-8 is used to indicate a playback status of content and/or playback settings for media output during the shared-content session. For example, in some embodiments, sharing option 6015A-8 is shown in a bolded (or otherwise visually emphasized) state when content is being output via the shared-content session (e.g., when screen-share content or synchronized content is being output), and is unbolded (or otherwise visually deemphasized) when screen-share or synchronized content is not being output during the shared-content session. In some embodiments, sharing option 6015A-8 is bolded or unbolded to indicate various playback settings, such as settings for determining whether to prompt the user to share selected media with the participants of the shared-content session, as discussed in greater detail below. In some embodiments, sharing option 6015A-8 can be selected to change playback settings, as discussed in greater detail below.

In response to John initiating the shared-content session, members of the Mountaineers group receive an invitation to join the shared-content session. Because Jane is a member of the Mountaineers group, Jane's device 6000B displays invitation 6012, which contains information about the shared-content session and invites Jane to join the shared-content session.

Figure 6D:
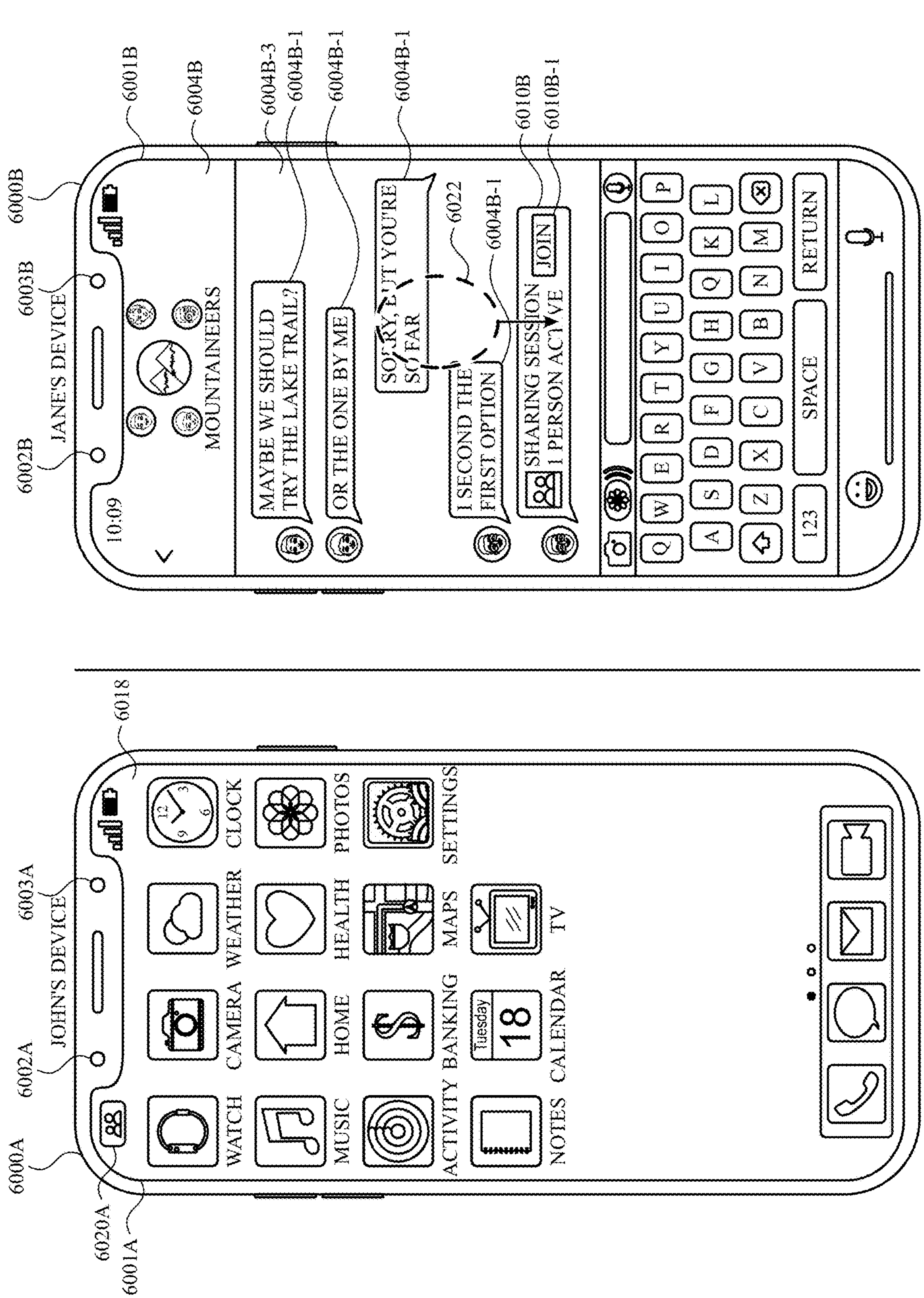

As depicted in FIG. 6C, John's device 6000A detects home gesture 6014, and Jane's device 6000B detects input 6016 on invitation 6012. In response to detecting home gesture 6014, John's device 6000A displays home screen 6018, and dismisses control region 6015A. In some embodiments, control region 6015A is automatically dismissed when no input is detected at the control region for a predetermined amount of time (e.g., one second, three seconds, or five seconds). In some embodiments, when a device is participating in a shared-content session, and the control region is not being displayed, the device displays a visual indication of the ongoing shared-content session as a reminder to the user that the shared-content session is ongoing. As shown in FIG. 6D, John's device 6000A displays sharing pill 6020A in a status region of home screen 6018. Sharing pill 6020A is selectable to display control region 6015A.

In response to detecting input 6016, Jane's device 6000B displays messages interface 6004B, including messages 6004B-1 of the ongoing group conversation and dynamic graphic 6010B displayed in message display region 6004B-3. Dynamic graphic 6010B is similar to dynamic graphic 6010A, however, the information presented in dynamic graphic 6010B is specific to Jane's device 6000B, just as the information presented in dynamic graphic 6010A is specific to John's device 6000A. For example, because Jane's device has not yet joined the shared-content session, dynamic graphic 6010B includes join option 6010B-1, which is selectable to join the shared-content session. Additionally, dynamic graphic 6010B indicates that one person has joined the shared-content session.

Figure 6E:
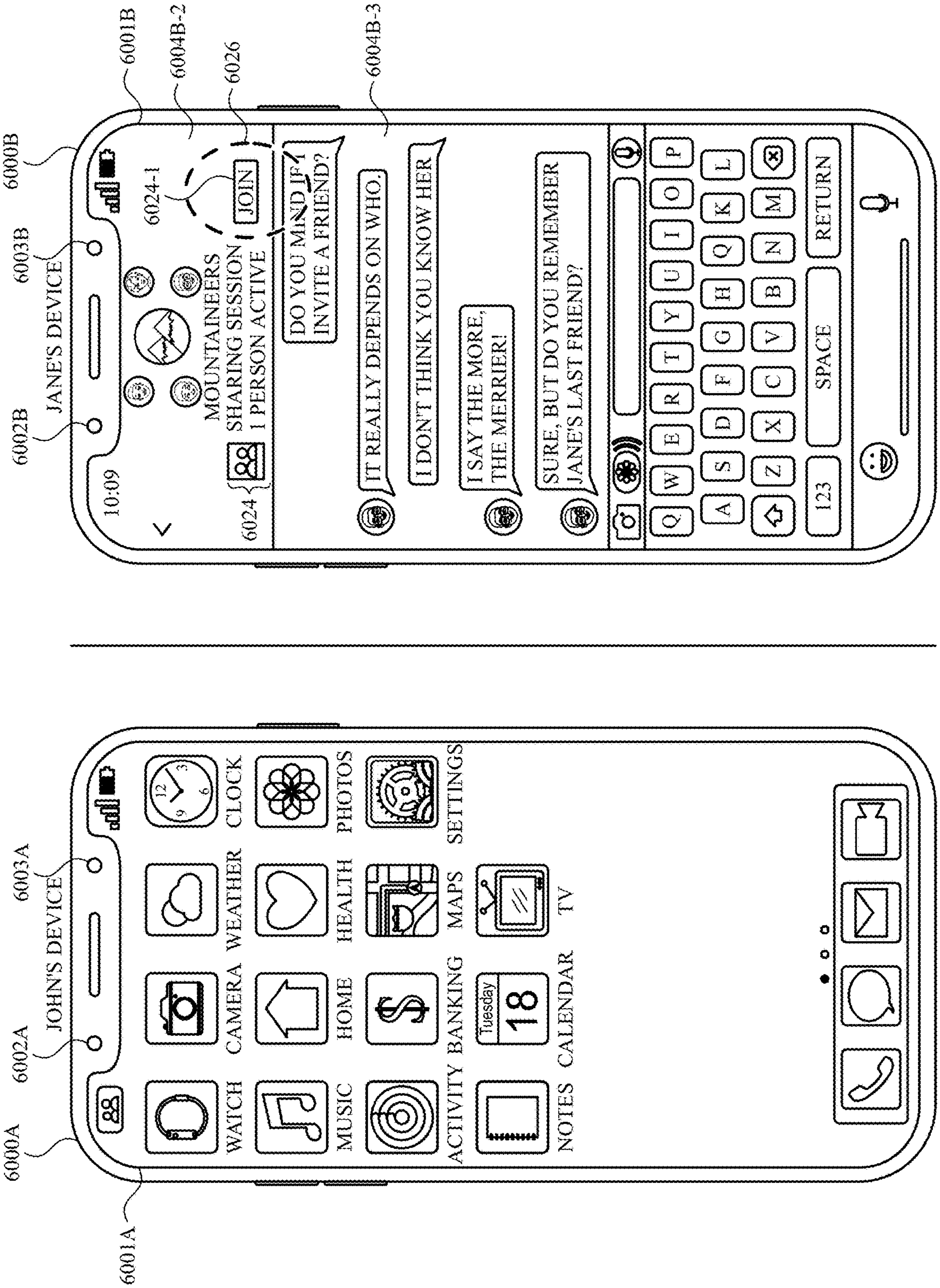

In FIG. 6D, Jane's device 6000B detects scroll input 6022 and, in response, scrolls the messages presented in message display region 6004B-3, as shown in FIG. 6E. In FIG. 6E, message display region 6004B-3 is updated to show message display region 6004B-3 scrolled in response to input 6022, including showing that dynamic graphic 6010B has been scrolled out of view. Because dynamic graphic 6010B was scrolled out of view, Jane's device 6000B expands header region 6004B-2 to include dynamic content 6024, which represents the content of dynamic graphic 6010B, including join option 6024-1, which is similar to join option 6010B-1. In some embodiments, header region 6004B-2 is expanded to include dynamic content 6024 in response to a scroll gesture in an opposite direction from input 6022. In some embodiments, join option 6024-1 (or a "leave" option, as appropriate) is persistently displayed in header region 6004B-2, even when the header region is not expanded (e.g., as shown in FIG. 6D) Jane's device 6000B detects input 6026 on join option 6024-1 and, in response, joins the shared-content session.

Figure 6F:
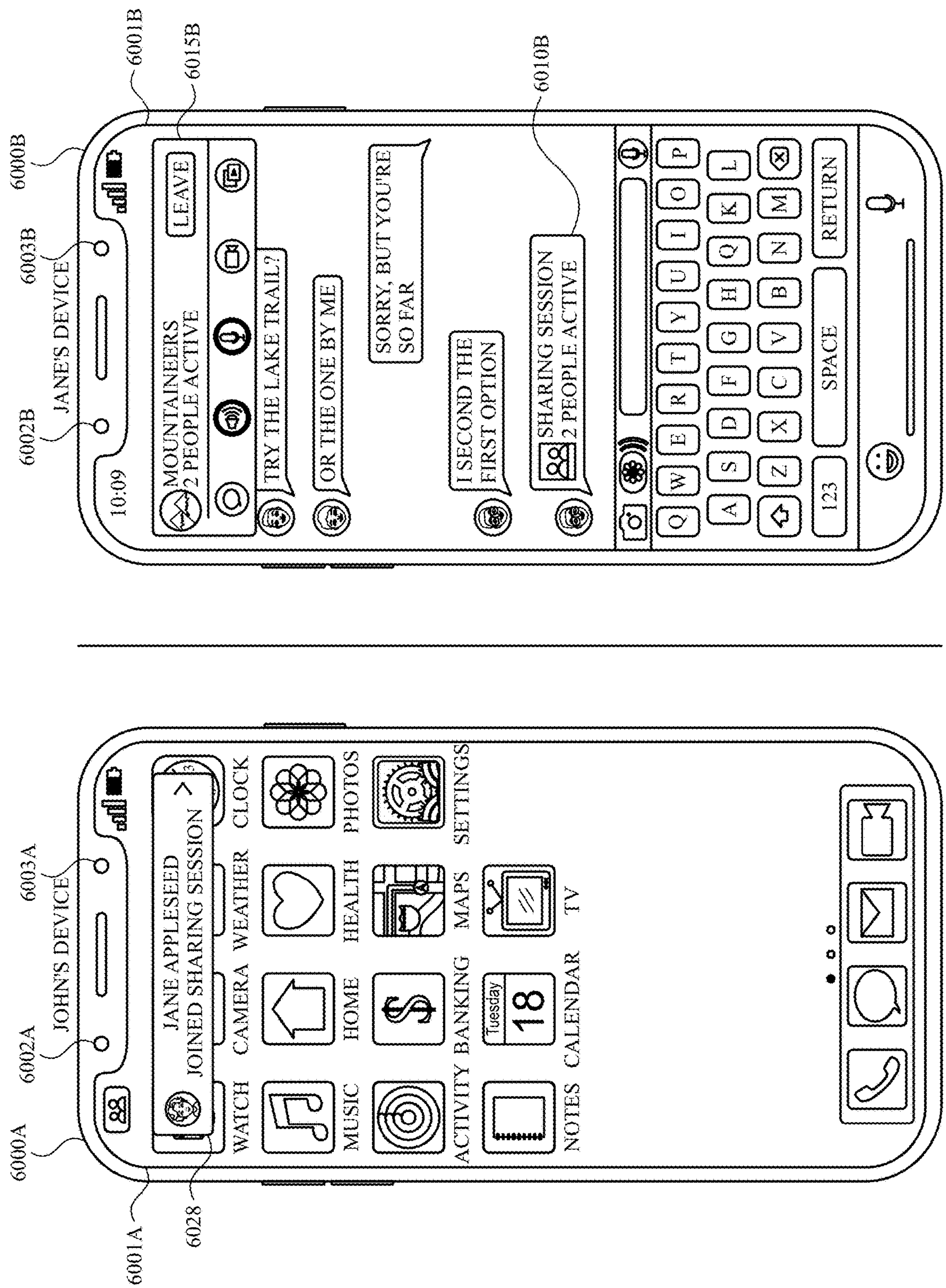

In FIG. 6F, John's device 6000A displays notification 6028 indicating that Jane has joined the shared-content session. In some embodiments, notifications (such as notification 6028) are temporarily displayed and then automatically dismissed after a predetermined amount of time. In some embodiments, notifications that are associated with the shared-content session (e.g., notifications generated by a system-level application for hosting the shared-content session) are displayed for a shorter period of time that standard notifications (e.g., text message notifications and/or email notifications) displayed at device 6000. For example, shared-content session notifications can be displayed for two seconds, whereas standard notifications are displayed for six seconds. In some embodiments, notifications associated with the shared-content session are displayed in an animated effect whereby the notification is displayed animating out of sharing pill 6020 or screen-sharing pill 6021.

After joining the shared-content session, Jane's device 6000B displays control region 6015B, and displays messages interface 6004B with dynamic graphic 6010B updated based on Jane joining the shared-content session. For example, dynamic graphic 6010B indicates that two people are now active (John and Jane joined) in the shared-content session. Control region 6015B is similar to control region 6015A, and is updated in FIG. 6F to indicate that two people have joined the shared-content session.

Figure 6G:
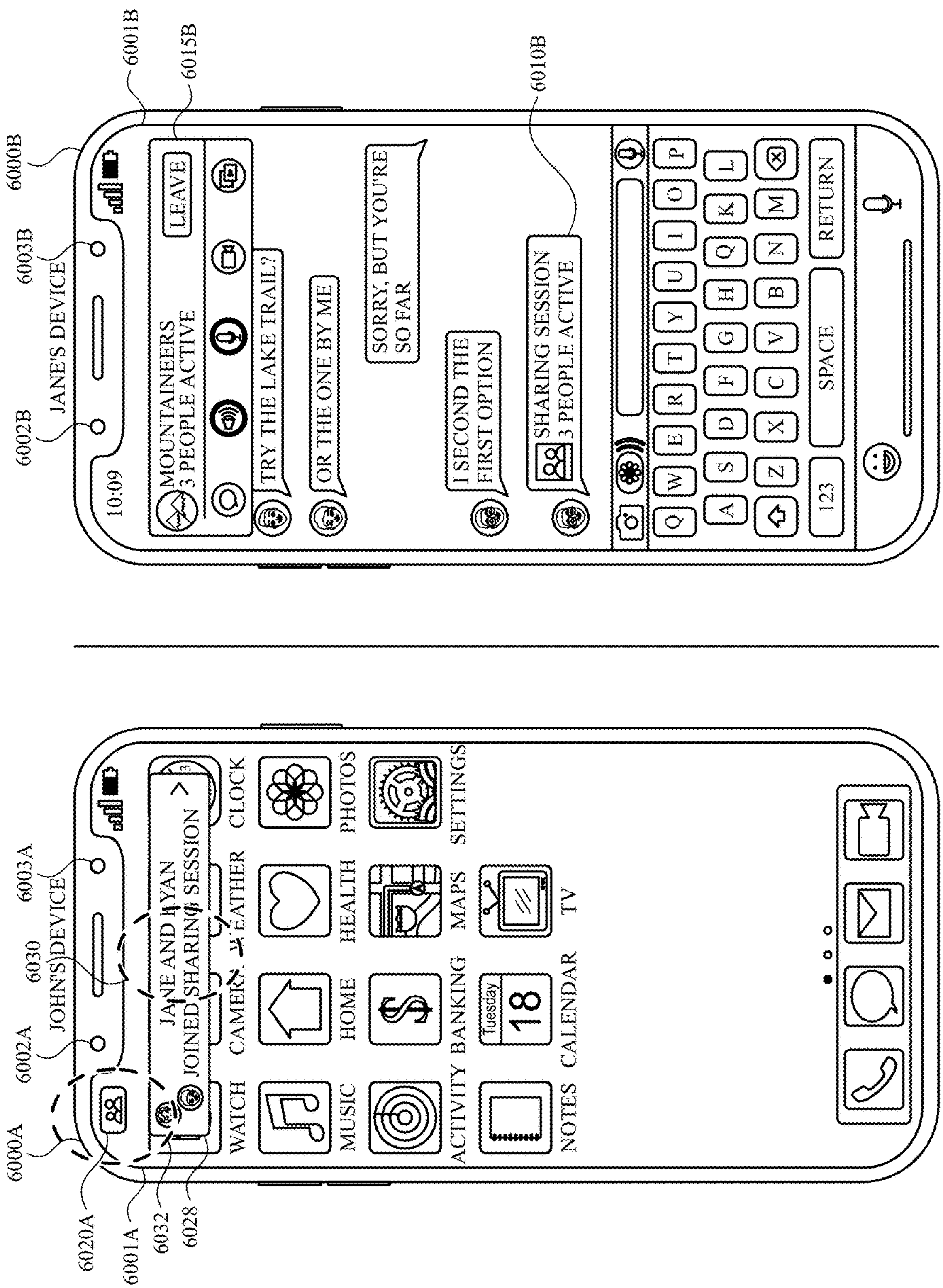

In FIG. 6G, Ryan has now joined the shared-content session. In response, Jane's device 6000B updates dynamic graphic 6010B and control region 6015B to indicate that three people are active in the shared-content session. Because control region 6015B is displayed, Jane's device 6000B suppresses display of a notification announcing that Ryan joined the shared-content session. In some embodiments, Jane's device 6000B displays a notification that Ryan joined the shared-content session.

Referring to John's device 6000A in FIG. 6G, the display of notification 6028 has not expired, so John's device 6000A updates notification 6028 to indicate that Ryan has also joined. In some embodiments, notifications can be combined when appropriate. For example, instead of displaying separate notifications that Jane joined and that Ryan joined, the two notifications are combined into a single notification (by way of updating notification 6028) so that John's device 6000A is not displaying multiple notifications, which can be distracting and unhelpful to John as well as cause unnecessary work for device 6000A. In some embodiments, notifications that become irrelevant (e.g., stale) prior to being displayed are not displayed. For example, if Ken had joined after Ryan, but before notification 6028 was updated, instead of displaying the updated notification depicted in FIG. 6G, John's device 6000A would have updated notification 6028 to indicate that Jane and two others have joined the shared-content session.

In some embodiments, John's device 6000A displays group status information (e.g., a group card) in response to input 6030 on notification 6028. In response to detecting input 6032 on sharing pill 6020A, John's device 6000A displays control region 6015A, as depicted in FIG. 6H.

Figure 6H:
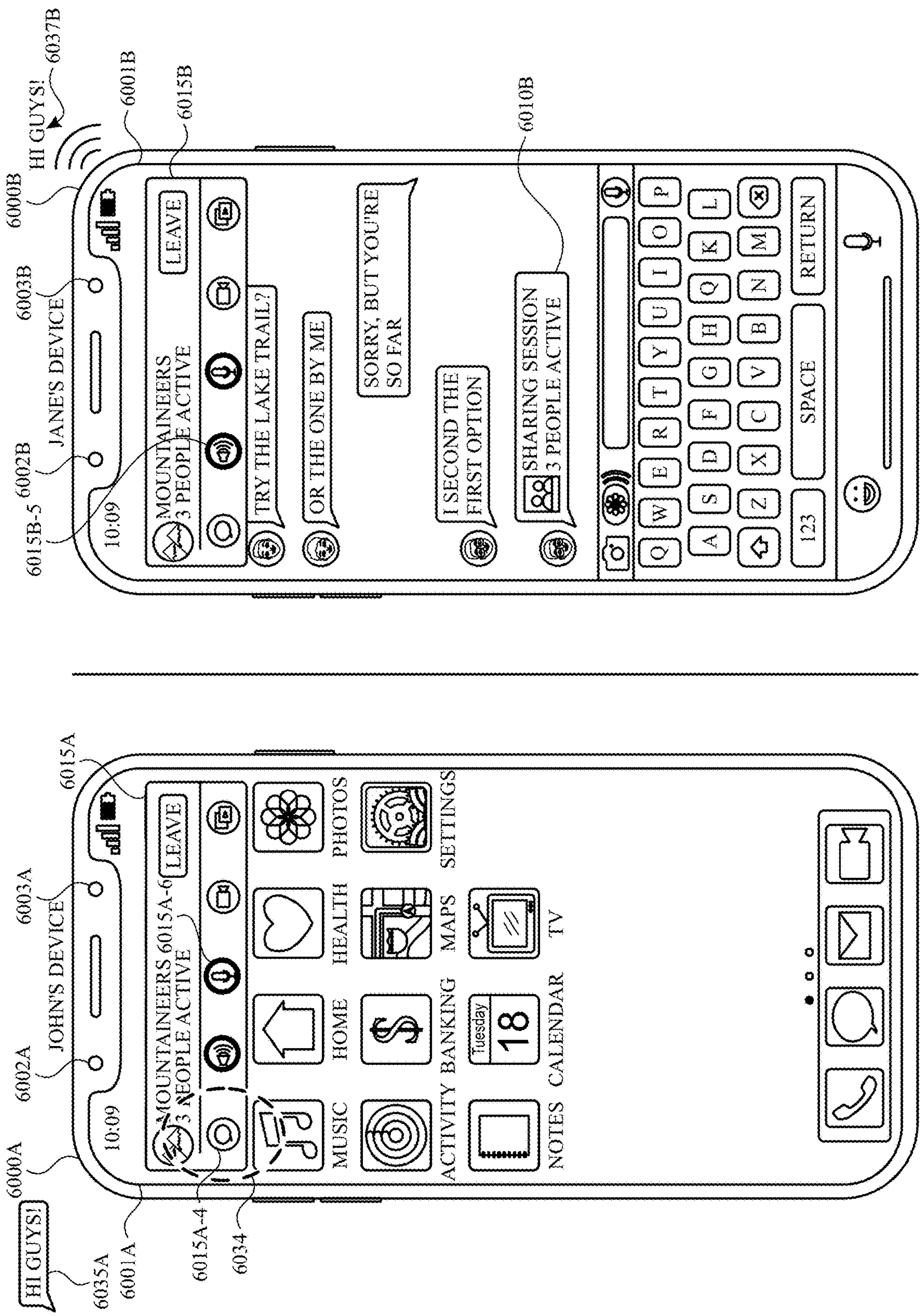

In FIG. 6H, John's device 6000A displays control region 6015A, which is updated since it was last displayed (in response to two people joining) to indicate that three people are active in the shared-content session. Microphone 6003A is enabled (in some embodiments, by default) as indicated by mic option 6015A-6. Accordingly, when John speaks to the Mountaineers group (as indicated by audio input 6035A), John's device 6000A receives John's voice as audio input and shares (e.g., transmits) the audio input with other participants of the shared-content session. Accordingly, Jane's device 6000B (as well as other devices participating in the shared-content session) produces audio output 6037B of John's voice. A speaker at Jane's device 6000B is enabled (in some embodiments, by default), as indicated by speaker option 6015B-5, and outputs the audio of John's voice. In this way, participants of the shared-content session are able to talk to each other during the shared-content session.

Figure 6I:
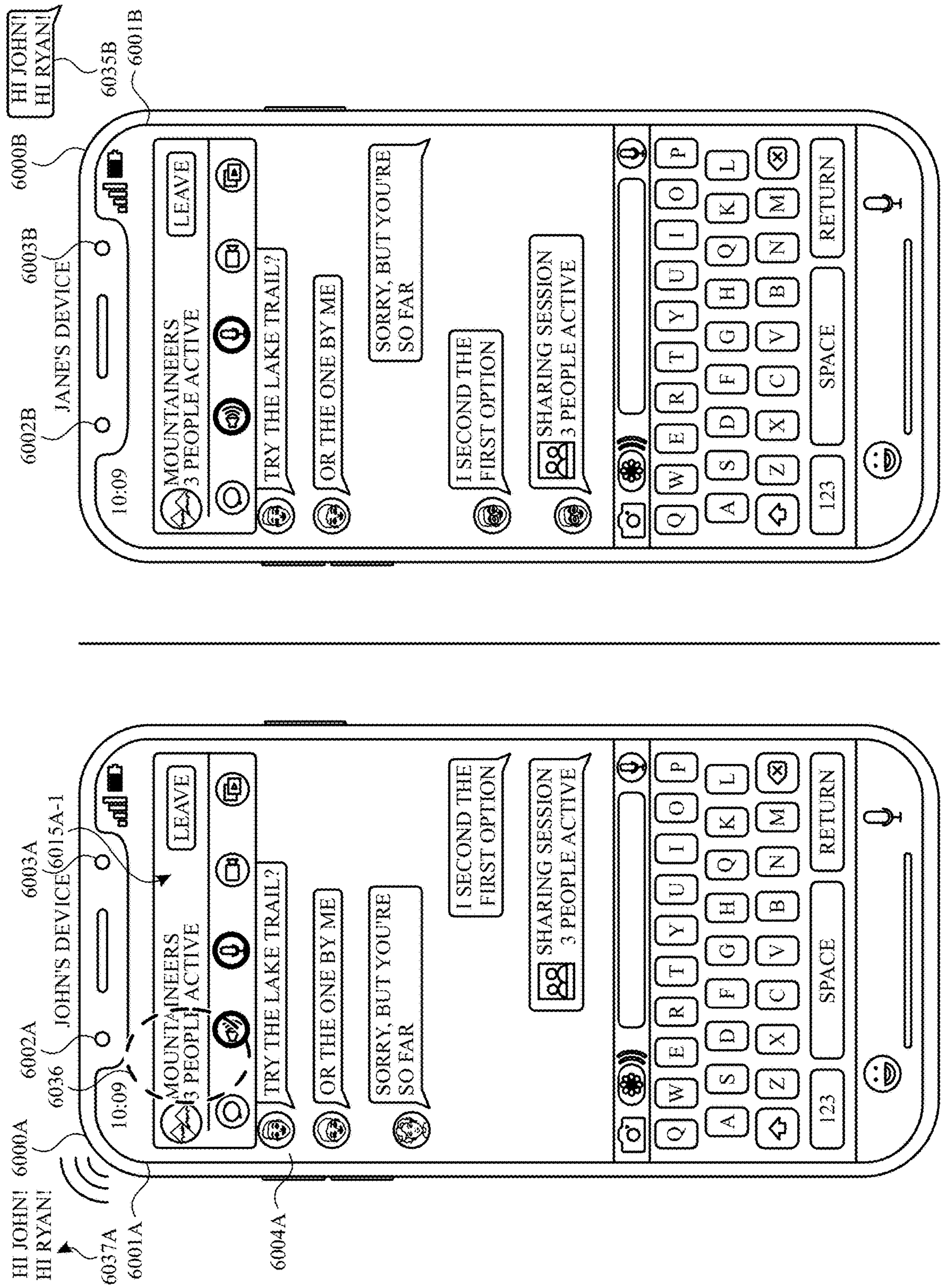

In response to detecting input 6034 on messages option 6015A-4, John's device 6000A displays messages interface 6004A, as depicted in FIG. 6I. In FIG. 6I, Jane speaks to the Mountaineers group as indicated in audio input 6035B, and the audio is output at the participant devices, as indicated by audio output 6037A. John's device 6000A detects input 6036 on control region status region 6015A-1 and, in response, displays group card interface 6038A, as depicted in FIG. 6J.

Figure 6J:
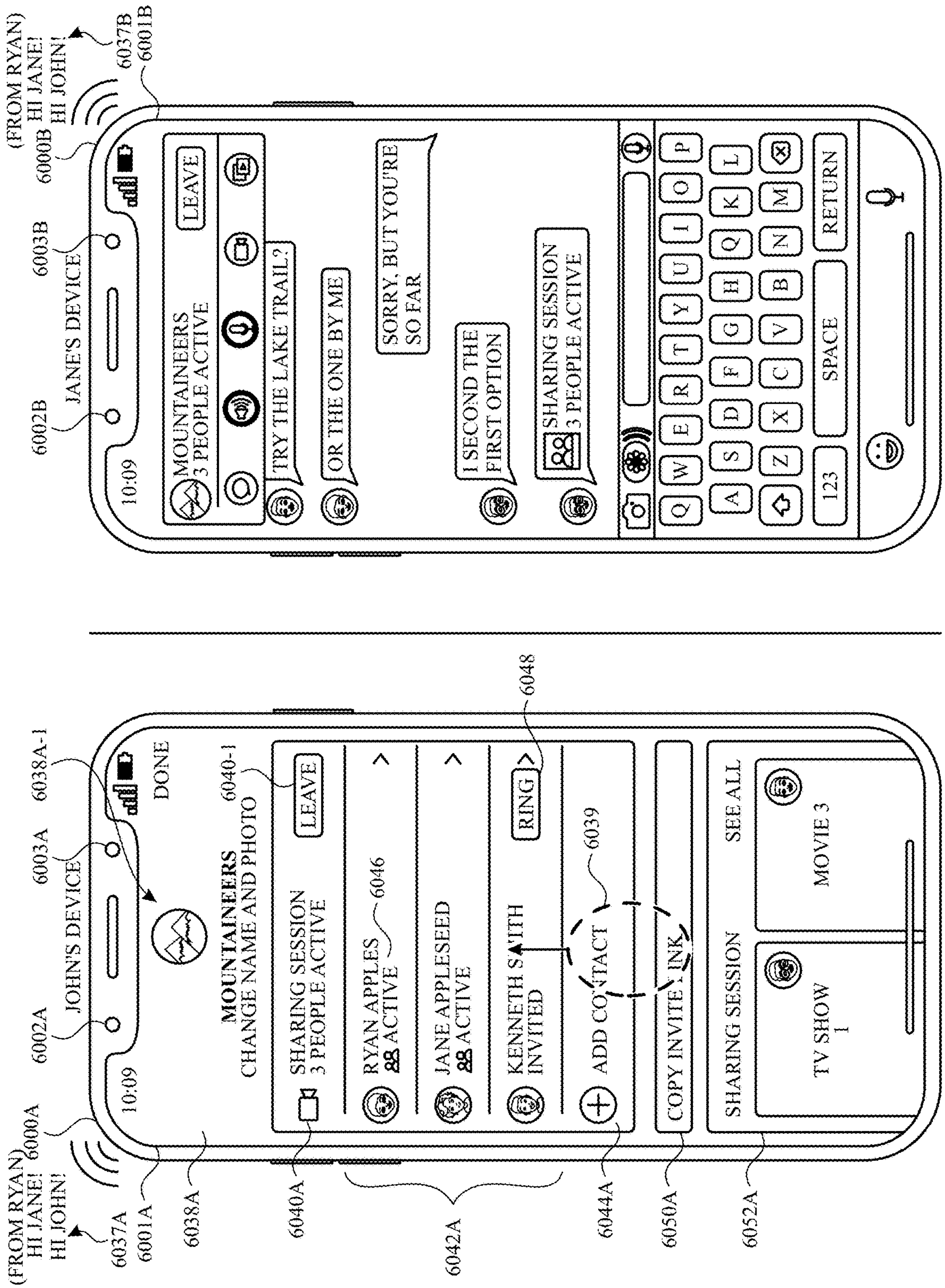

In FIG. 6J, Ryan speaks to the Mountaineers group as indicated by audio output 6037A and 6037B at John's and Jane's devices 6000. John's device 6000A displays group card interface 6038A in response to input 6036, and in FIG. 6K, the group card interface is scrolled to display additional content in response to scroll input 6039. In some embodiments, John's device 6000A displays group card interface 6038A in response to an input on a notification (e.g., input 6030 on notification 6028).

Group card interface 6038A provides information about the Mountaineers group and content that has been output during the current shared-content session and past shared-content sessions for the group, including identifying information 6038A-1 such as a logo, name, picture, etc. Group card interface 6038A includes status information 6040A (including leave option 6040-1 that is selectable to leave the shared-content session), a listing of members 6042A of the Mountaineers group, and add contact option 6044A that is selectable to add a contact to the Mountaineers group. The listing of members 6042A includes the names of the other group members, along with status information 6046 for the respective members. For example, in FIG. 6J, Ryan and Jane are shown as active participants of the shared-content session. Ken is shown as invited, because he has not yet accepted the invitation to join the shared-content session. The group card interface also includes reminder option 6048, which is displayed for group members who have not joined the shared-content session and can be selected to cause a reminder (e.g., a ring, alert, and/or notification) to occur at the member's device to remind the member to join the shared-content session. Group card interface 6038A also includes copy option 6050A, which is selectable to copy a link that can be sent to a contact to invite them to join the Mountaineers group. Group card interface 6038A also includes content history 6052A, which indicates content that has previously been output (or in some embodiments, is currently being output) in a shared-content session with the group. Group card interface 6038A also includes preferred (e.g., favorited) content 6054A that has been output during shared-content sessions. Group card interface Content history 6052A and preferred content 6054A include indications 6056 of members who initiated sharing of the respective content or, in some embodiments, who favorited the respective content.

Figure 6K:
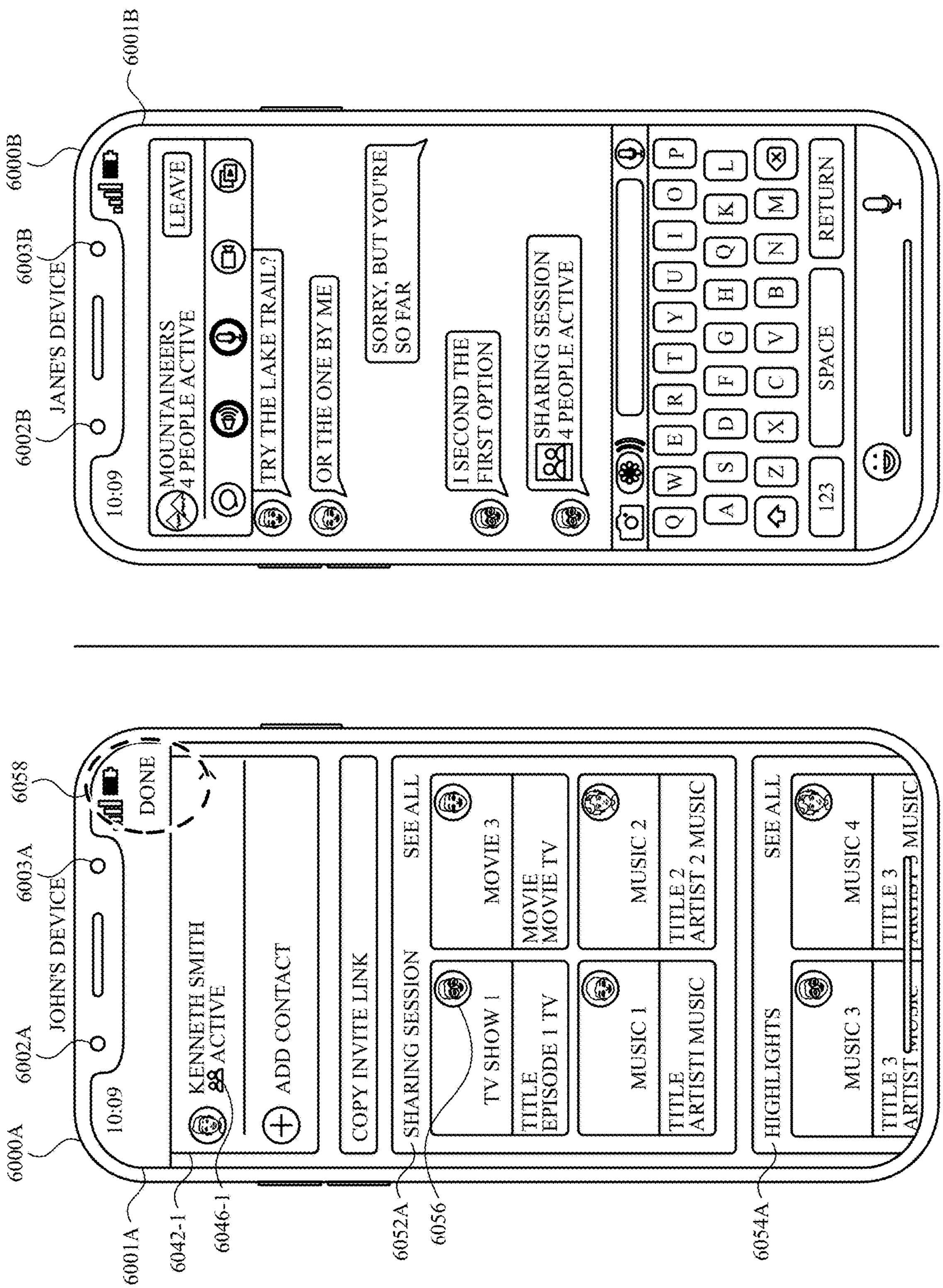

In FIG. 6K, Ken has joined the shared-content session. Accordingly, Ken's member listing 6042-1 and status 6046-1 are updated to indicate that Ken is active in the shared-content session. Additionally, control region 6015B and dynamic graphic 6010B are updated on Jane's device 6000B to indicate the change in parameters of the shared-content session in response to Ken joining. In some embodiments, John's and Jane's devices 6000 display a notification that Ken has joined the shared-content session.

Figure 6L:
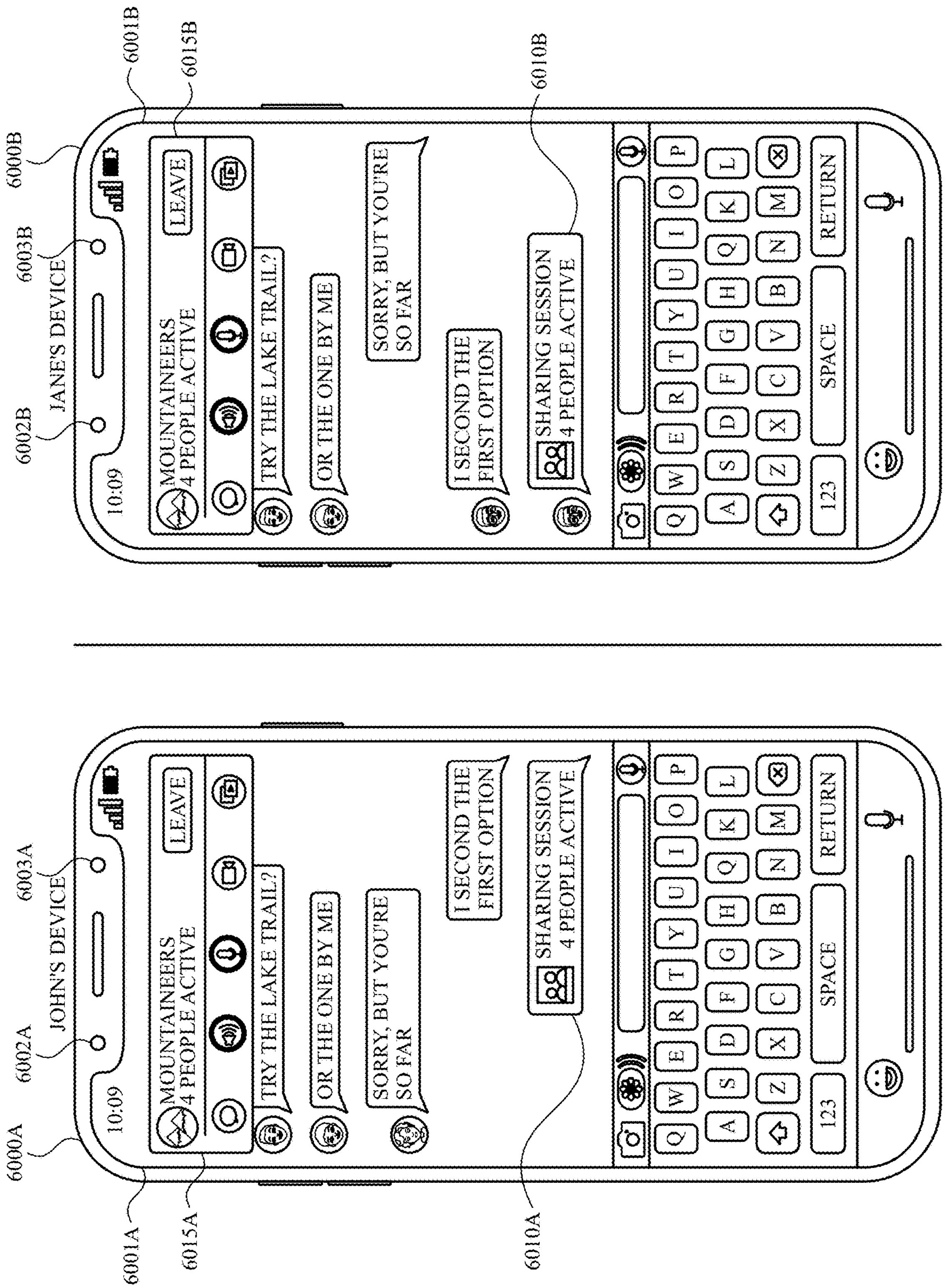

In FIG. 6L, John's device 6000A displays control region 6015A and messages interface 6004A with dynamic graphic 6010A, in response to detecting input 6058 in FIG. 6K. Control region 6015A and dynamic graphic 6010A are updated to indicate Ken joined the shared-content session in a similar manner to the control region and dynamic graphic on Jane's device 6000B.

Figure 6M:
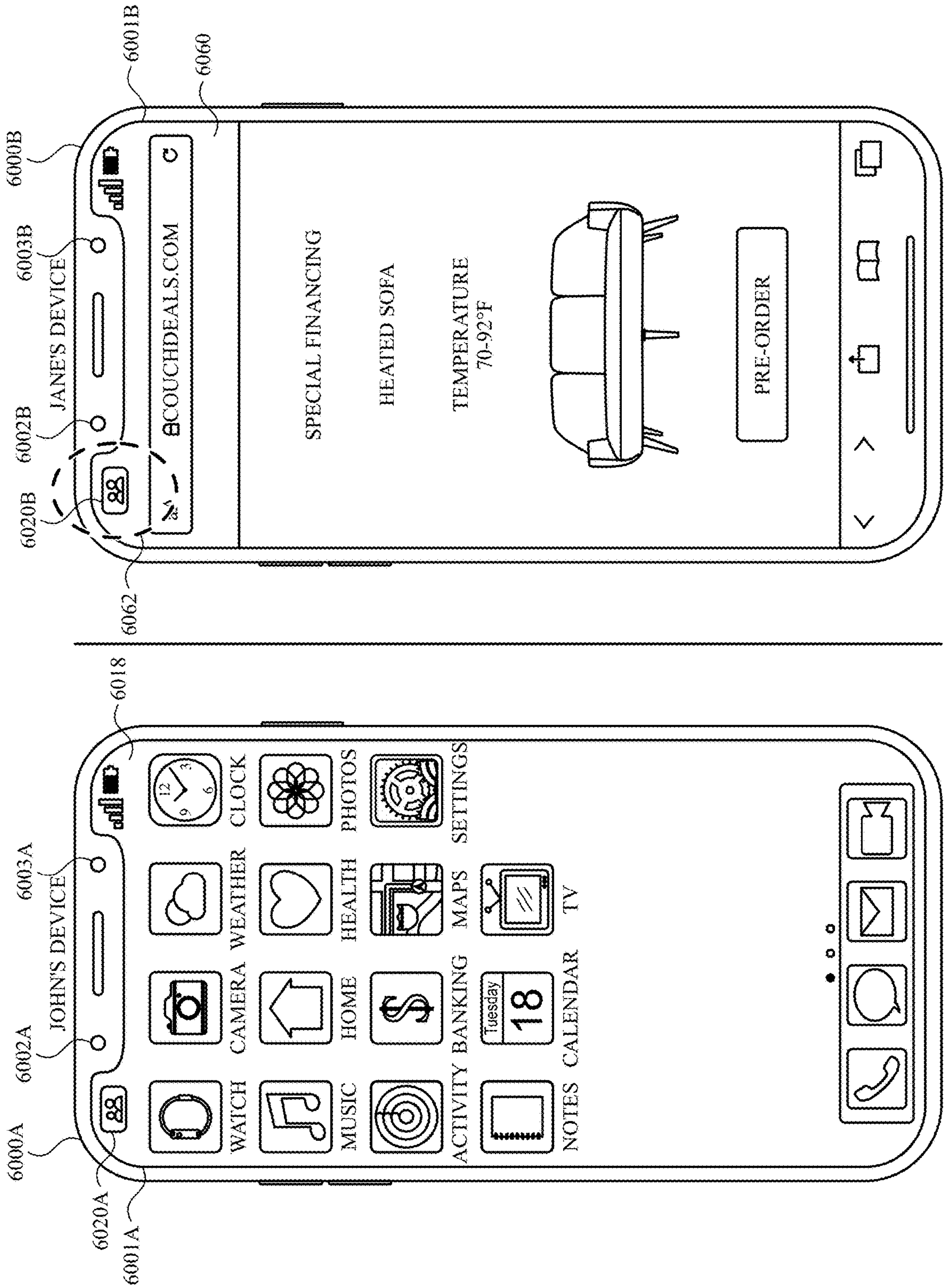
Figure 6N:
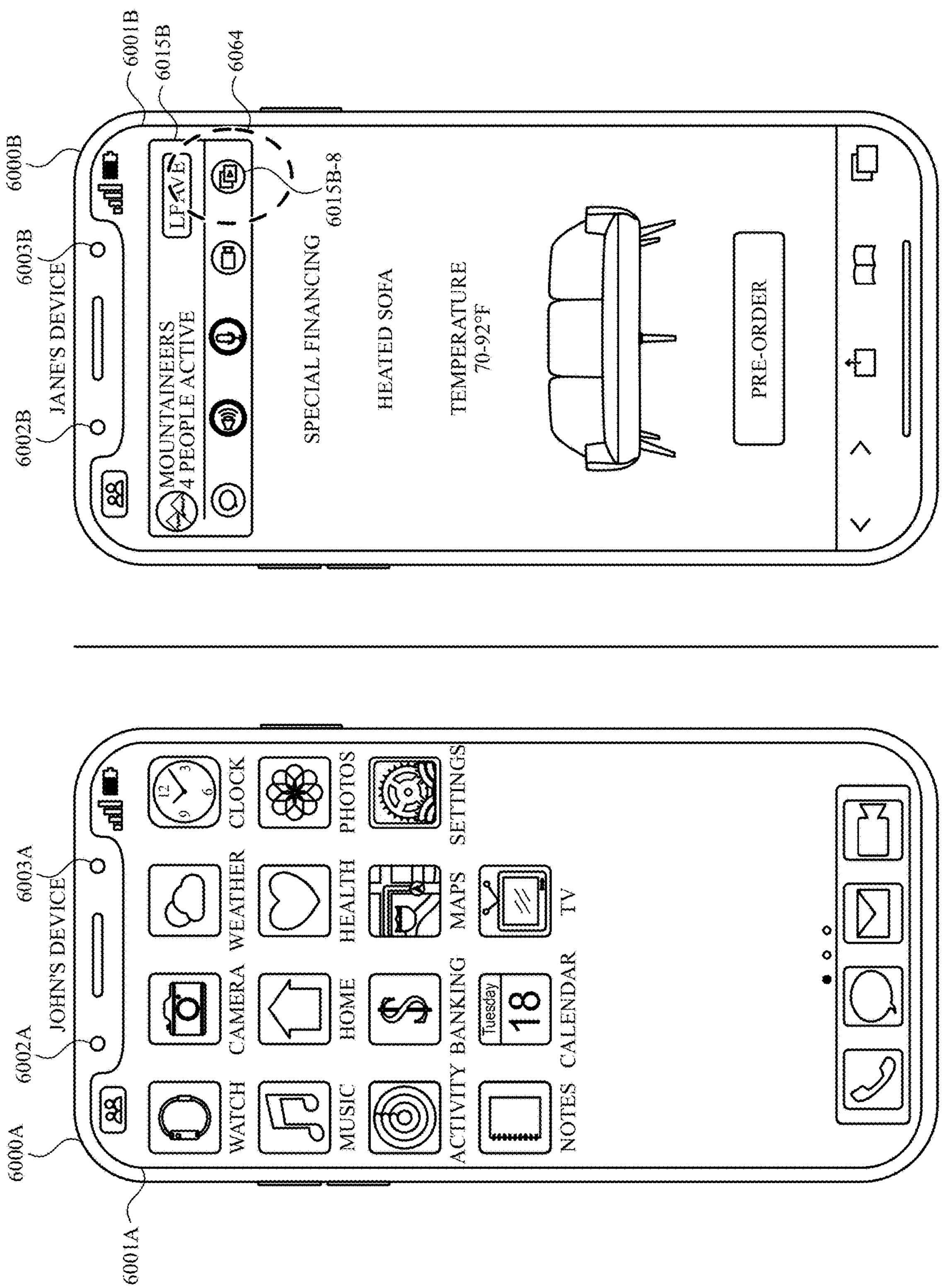

FIGS. 6M-6X depict example user interfaces of embodiments in which Jane initiates screen-sharing with the Mountaineers group during the shared-content session. In FIG. 6M, Jane's device 6000B displays browser interface 6060 and detects input 6062 on sharing pill 6020B. In FIG. 6N, Jane's device 6000B displays control region 6015B in response to input 6062 and detects input 6064 on sharing option 6015B-8 to initiate screen-sharing with the Mountaineers group.

Figure 6O:
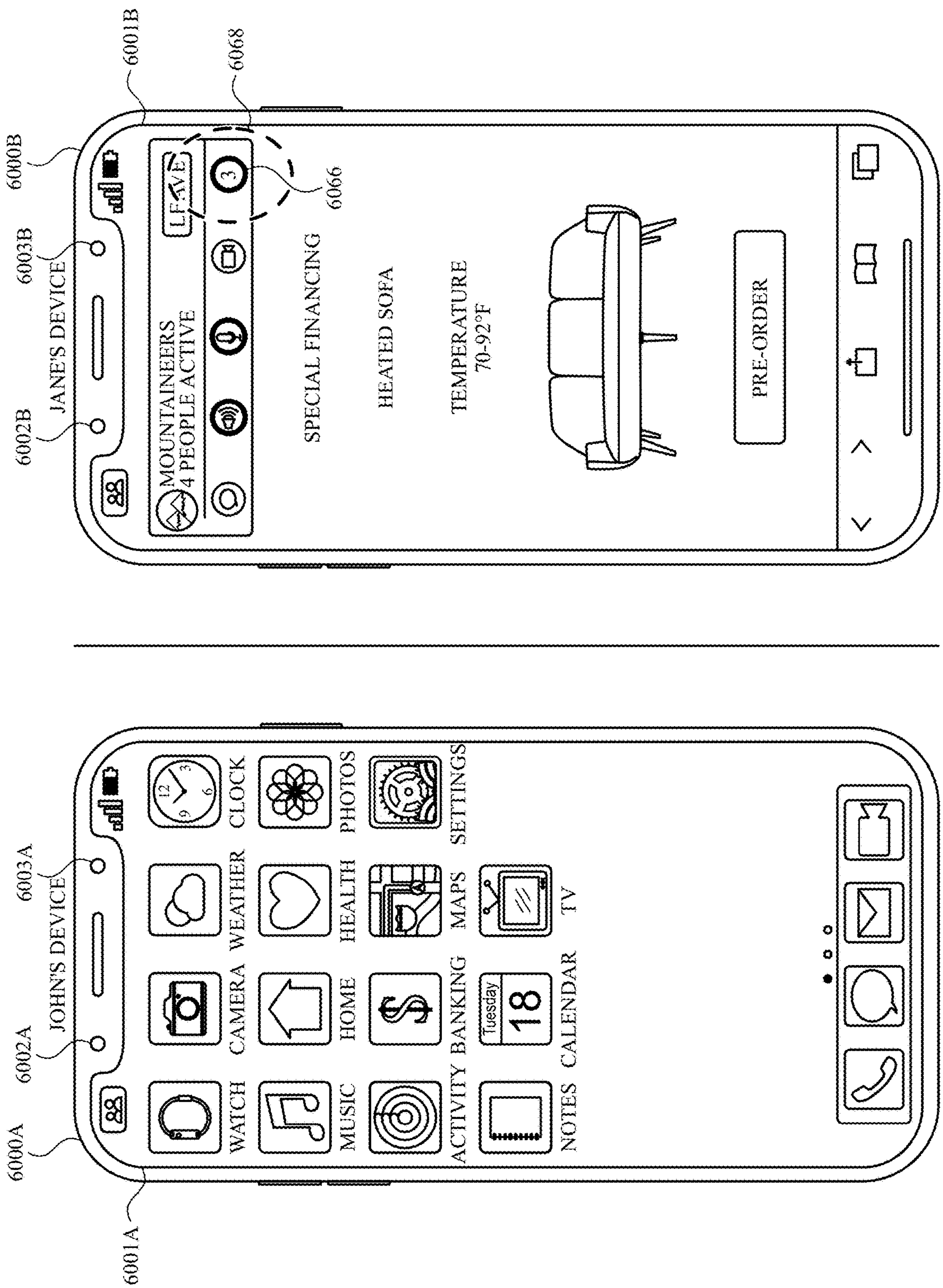

In FIG. 6O, Jane's device 6000B replaces sharing option 6015B-8 with countdown 6066, which counts down an amount of time until Jane's device 6000B shares the contents of its screen with the Mountaineers group. In some embodiments, in response to detecting input 6068 on countdown 6066, Jane's device 6000B cancels the request to initiate screen sharing and reverts to the interface depicted in FIG. 6N. In some embodiments, in response to detecting an input on countdown 6066, Jane's device 6000B displays a notification with an option to confirm cancelling the screen sharing request. If input 6068 is not detected, Jane's device 6000B begins sharing the contents of its screen at the end of the countdown, as illustrated in FIG. 6P.

Figure 6P:
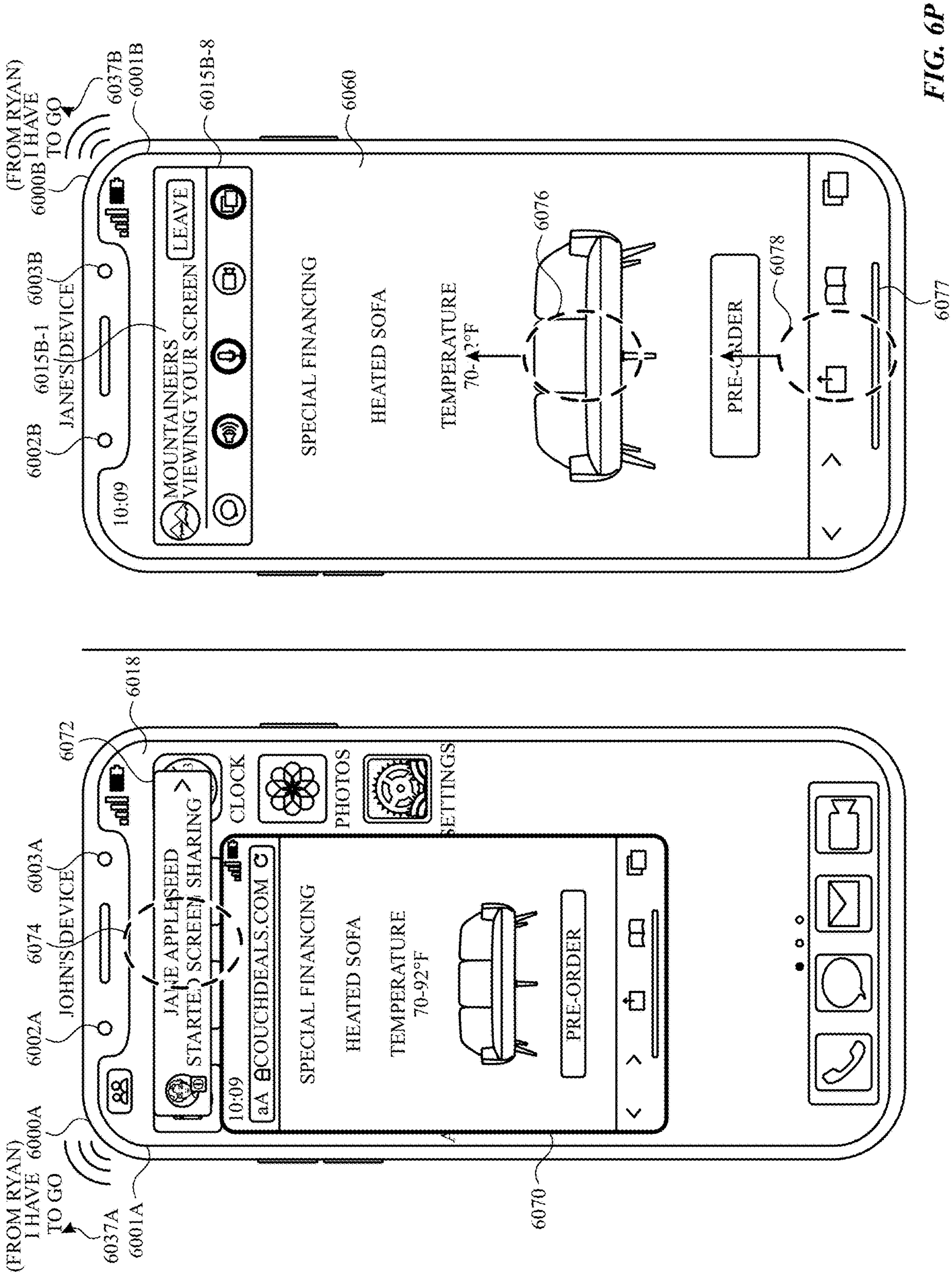

At the end of the countdown, Jane's device 6000B begins sharing the content of its screen with the members of the Mountaineers group and updates control region 6015B to indicate the screen-sharing status of Jane's device 6000B, as shown in FIG. 6P. For example, status region 6015B-1 is updated to indicate that the Mountaineers group is viewing Jane's screen, and sharing option 6015B-8 changes appearance to indicate that the screen content of Jane's device 6000B is being shared (e.g., output) to participants of the shared-content session (e.g., members of the Mountaineers group). In some embodiments, sharing option 6015B-8 is shown bolded when content other than screen-share content is being output for members participating in the shared-content session (e.g., when media such as a show and/or music is being output as part of the shared-content session).

John's device 6000A displays screen-share window 6070 and notification 6072 indicating that Jane has started sharing the content of her device's screen. In some embodiments, notification 6072 automatically dismisses after a predetermined amount of time. Screen-share window 6070 is a real-time representation of the content that is currently displayed on Jane's device 6000B. Accordingly, because Jane's device 6000B is currently displaying browser interface 6060, screen-share window 6070 includes representation 6060' of browser interface 6060. Screen-share window 6070 is displayed over home screen 6018 such that John's device 6000A displays screen-share window 6070 with home screen 6018 in the background. In some embodiments, screen-share window 6070 is automatically displayed over the user interface that is currently displayed at John's device 6000A when the screen sharing begins. For example, if John's device 6000A was displaying messages interface 6004A when Jane's device 6000B began sharing its screen, screen-share window 6070 would be displayed over the messages interface.

Screen-share window 6070 is displayed as a window that is optionally overlaid on another user interface (e.g., John's home screen 6018) and can be moved separately from the user interface over which it is displayed. In some embodiments, such windows are referred to herein as a picture-in-picture window or "PiP." In some embodiments, a PiP can include shared content such as screen-share content and/or synchronized content. In some embodiments, a PiP can include content that is independent of a shared-content session such as a video feed from a video conference (although, in some embodiments, such PiPs can be displayed in connection with a shared-content session).

FIG. 6P depicts input 6074 on notification 6072 of John's device 6000A. FIG. 6P also depicts scroll input 6076 on browser interface 6060 and home input 6078 on home affordance 6077 of Jane's device 6000B. Ryan speaks to the Mountaineers group, as indicated by audio output 6037A and 6037B at John's and Jane's devices 6000.

Figure 6Q:
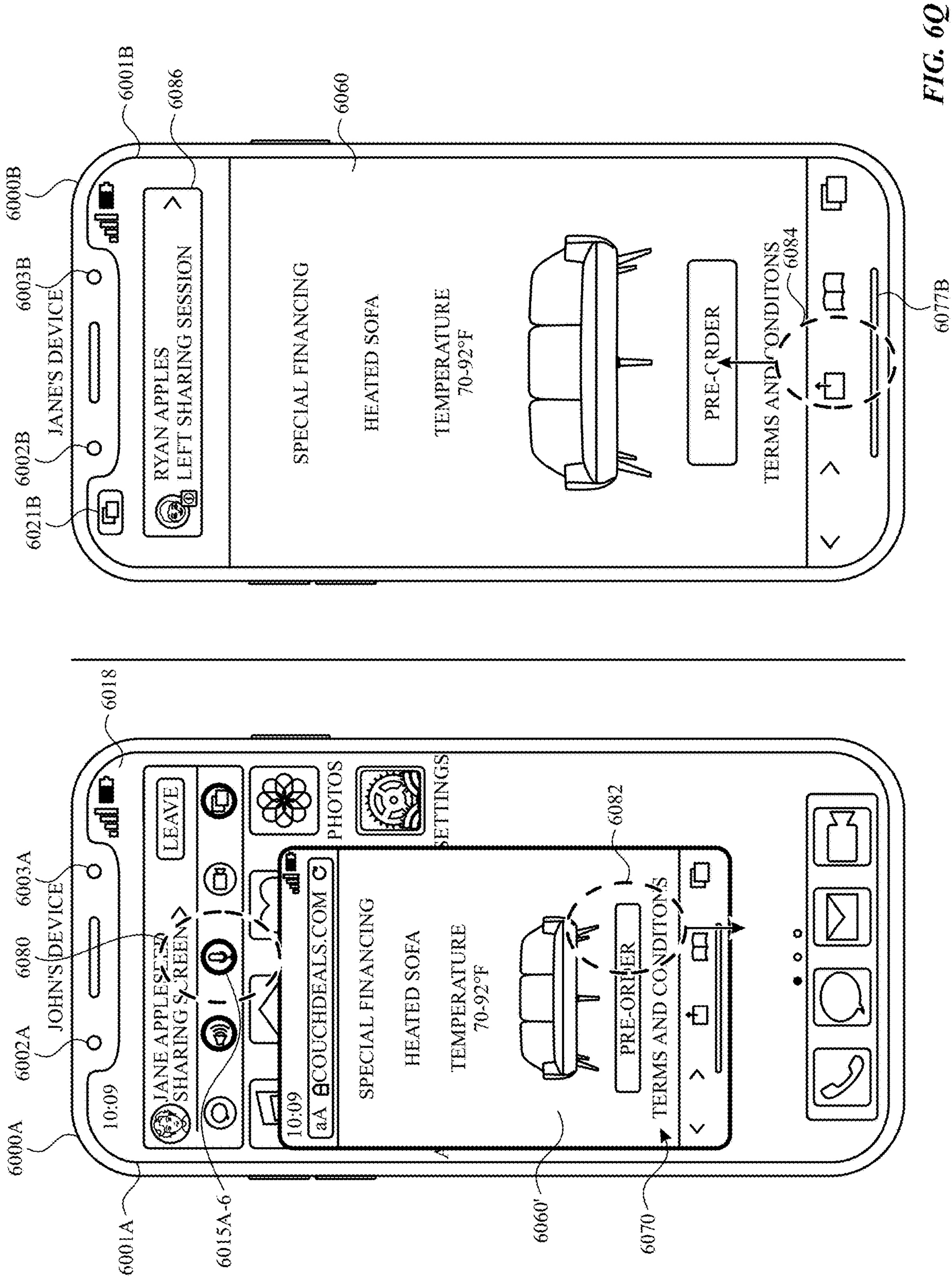

In response to detecting scroll input 6078, Jane's device 6000B scrolls browser interface 6060, and in response to detecting home input 6078, Jane's device 6000B dismisses control region 6015B, as depicted in FIG. 6Q. In some embodiments, Jane's device 6000B automatically dismisses control region 6015B after a predetermined amount of time. In some embodiments, control region 6015 is displayed for a longer period of time than standard notifications (e.g., email notifications and/or text message notifications). For example, control region 6015 is displayed until it is intentionally dismissed by a user. When a device is sharing the content of its screen, and the control region is dismissed (e.g., hidden), the device displays screen-sharing pill 6021B, as depicted in Jane's device 6000B in FIG. 6Q. In some embodiments, screen-sharing pill 2021B is different in appearance than sharing pill 6020B, but similar in function. For example, screen-sharing pill 6021B serves as a reminder to a user that a shared-content session is ongoing, but the different appearance indicates to the user that their device is sharing the content of its screen via the shared-content session. In some embodiments, screen-sharing pill 6021B can be selected to display control region 6015B.

In FIG. 6Q, John's device 6000A displays control region 6015A in response to input 6074. In order to provide an unobstructed view of control region 6015A and screen content 6070, John's device 6000A automatically moves the position of screen-share window 6070 on display 6001A. Because screen-share window 6070 is a real-time representation of the content of Jane's screen, when Jane scrolls the browser interface (via input 6076), screen-share window 6070 is automatically scrolled to match the scrolled position of browser interface 6060 on Jane's device 6000B. This is illustrated by the scrolled appearance of representation 6060' in screen-share window 6070 in FIG. 6Q.

Figure 6R:
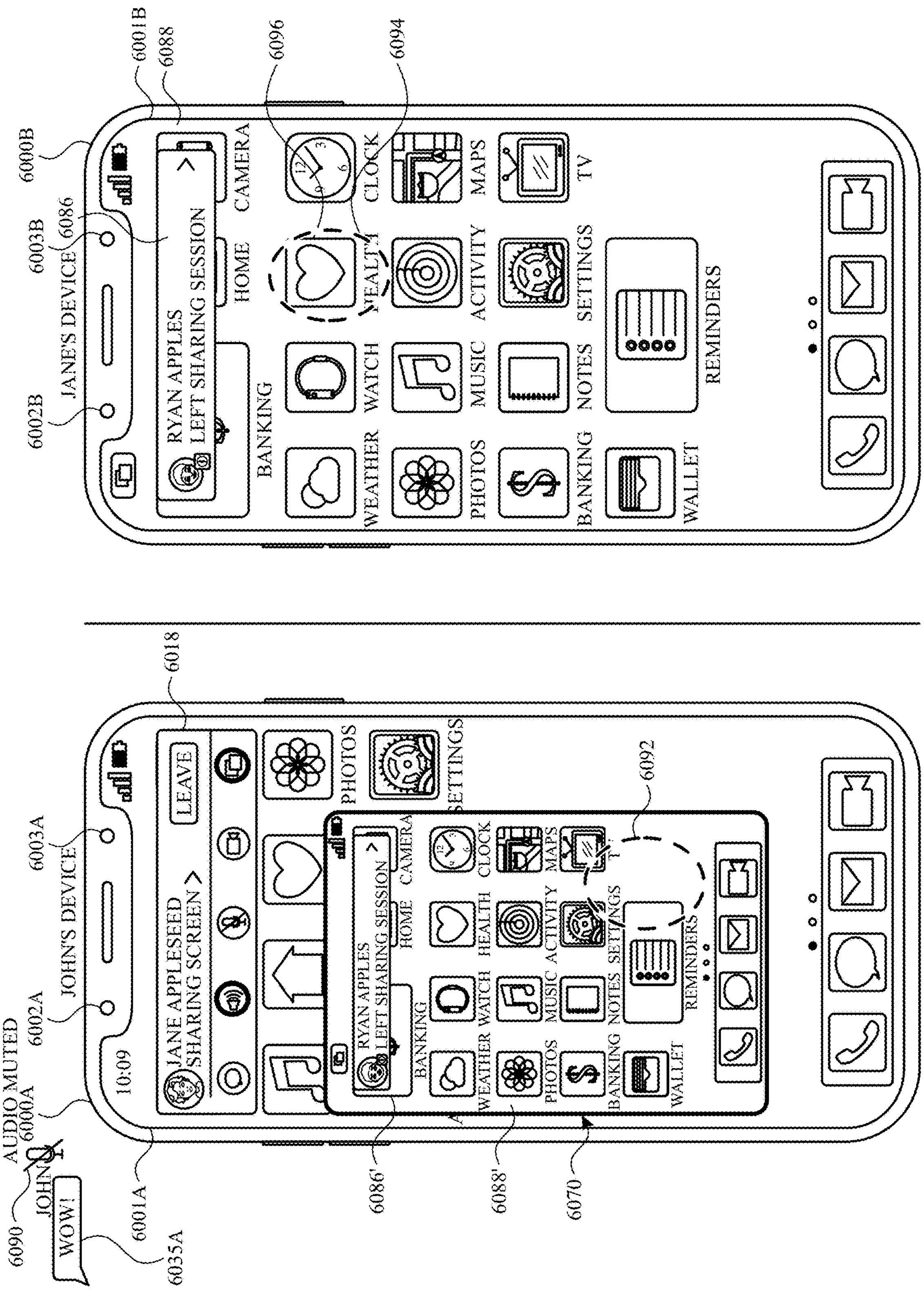

In FIG. 6Q, John's device detects input 6080 on mic option 6015A-6 to mute microphone 6003A, and detects drag input 6082 to move the position of screen-share window 6070 on display 6001A. Jane's device 6000B detects home input 6084 on home affordance 6077B to dismiss browser interface 6060 and display home screen 6088, as depicted in FIG. 6R. In some embodiments, a home gesture (e.g., similar to home input 6078 or home input 6084) causes John's device 6000A to dismiss control region 6015A. In some embodiments, a home gesture (optionally detected after the control region is dismissed) causes John's device 6000A to dismiss (e.g., hide display of) screen-share window 6070.

In some embodiments, some notifications are suppressed while control region 6015 is displayed. For example, in FIG. 6Q, Jane's device 6000B displays notification 6086 indicating that Ryan left the shared-content session, but a similar notification is not displayed on John's device 6000A because control region 6015A is displayed.

In FIG. 6R, John's device 6000A displays screen-share window 6070 having a moved position on the display in response to drag input 6082. Screen-share window 6070 is also updated to show Jane has navigated to home screen 6088, by displaying representation 6088' of Jane's home screen 6088. In some embodiments, notifications from Jane's device 6000B are displayed in screen-share window 6070 on John's device 6000A. For example, in FIG. 6R, screen-share window 6070 includes representation 6086' of notification 6086. In some embodiments, notifications are not shared in screen-share window 6070. In some embodiments, screen-share window 6070 can be resized in response to various inputs such as, e.g., pinch and/or de-pinch gestures. In some embodiments, John's device 6000A remembers the moved and/or resized position of the screen-share window 6070 such that, when content (e.g., screen-share content and/or media content output during the shared-content session) is shared with John's device 6000A in the future, John's device 6000A displays the shared content at the moved and/or resized position.

John's device 6000A continues to display control region 6015A, and John speaks while the microphone for the shared-content session (e.g., microphone 6003A) is muted, as indicated by mute glyph 6090. Accordingly, John's voice is not communicated in the shared-content session, as indicated by the lack of output audio at Jane's device 6000B. John's device 6000A detects input 6092 on screen-share window 6070.

Figure 6S:
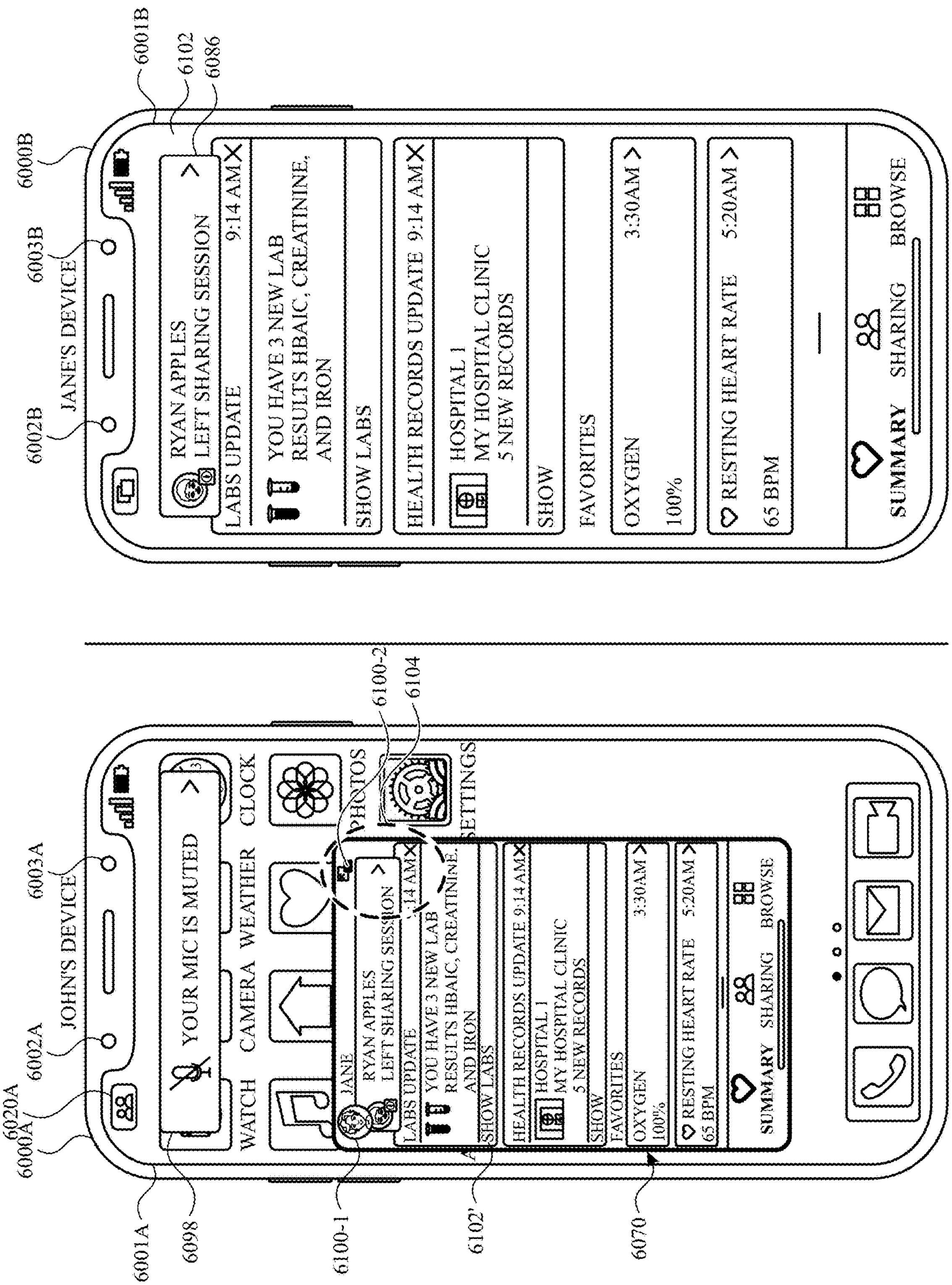

In FIG. 6R, Jane's device 6000B continues to display notification 6086 while input 6094 is detected at health application icon 6096. In FIG. 6S, Jane's device 6000B launches the health application and displays health interface 6102 in response to input 6094. Accordingly, John's device 6000A updates display of screen-share window 6070 to show representation 6102' of health interface 6102. John's device 6000A also displays chrome 6100, including identifier 6100-1 and expand icon 6100-2. Identifier 6100-1 shows Jane's name and avatar to indicate that the screen-share window 6070 represents the content of Jane's device 6000B. Expand icon 6100-2 is selectable (e.g., in response to input 6104) to enlarge screen-share window 6070 to, for example, an expanded display state (e.g., a full-screen display state or using all of the screen outside of a portion of the screen designated for system status information and/or system controls). In some embodiments, screen-share window 6070 is enlarged in response to a tap on screen-share window 6070 when chrome 6100 is not displayed, rather than requiring a subsequent tap on expand icon 6100-2.

In FIG. 6S, John's device 6000A dismisses control region 6015A and displays sharing pill 6020A. John's device 6000A displays sharing pill 6020A, whereas Jane's device 6000B displays screen-sharing pill 6021B, which indicates that John's device is participating in a shared-content session without sharing its screen and that Jane's device 6000B is participating in a shared-content session while sharing its screen with the participants of the shared-content session.

John's device 6000A displays notification 6098 in response to detecting John speaking while the mic is muted. Notification 6098 and a notification similar to notification 6086 were suppressed (e.g., stored in a queue) on John's device 6000A while control region 6015A was displayed. However, because control region 6015A is no longer displayed in FIG. 6S, John's device 6000A displays notifications that were previously suppressed and are not stale (e.g., expired or irrelevant). Notification 6098 and notification 6086 (displayed on Jane's device) are not stale because the conditions triggering their display remains true, and, optionally, the time allotted for displaying the notifications has not expired. In some embodiments, rather than displaying all notifications that are not stale, John's device 6000A displays notifications based on a priority attributed to the respective notifications such that a notification having highest priority is displayed first for a predetermined amount of time, and is then dismissed. Subsequently, a notification having the next-highest priority is displayed and then dismissed. In FIG. 6S, notification 6098 is attributed a higher priority than notifications announcing a participant leaving the shared-content session. Therefore, when John's device 6000A hides control region 6015A, it displays notification 6098, but not a notification announcing that Ryan left the shared-content session. In some embodiments, a priority of notifications stored in the queue can change over time (e.g., the notification can become stale). For example, if an allotted time for displaying a notification expires prior to displaying the notification, then that notification is not displayed.

In some embodiments, notifications are prioritized in different tiers based on the type of the notification. For example, notifications triggered by user action are attributed a highest level of priority (e.g., Tier 1). Examples of user actions that trigger Tier 1 notifications include interactions with elements of control region 6015 (e.g., audio routing, microphone on/off, camera on/off, local screen sharing on/off). Notifications indicating that the microphone is muted are, in some embodiments, attributed a medium level of priority (e.g., Tier 2). Notification 6098 is an example of a Tier 2 notification. In some embodiments, notifications that are automatically triggered based on activity in the shared-content session are attributed a lower level of priority (e.g., Tier 3). Examples of Tier 2 notifications can include account updates (e.g., announcing that a user joined the shared-content session), notifications that content is playing only for the user of the device, notifications for applications supporting the shared-content session application, playback actions, queue actions, remote screen-sharing actions, and reminder notifications related to the shared-content session (e.g., a reminder that members of the shared-content session are still playing content after the user stops playing private content).

In some embodiments, some types of notifications replace one another when they are displayed. For example, notifications that content is "playing only for me," notifications associated with apps that support shared-content sessions, playback actions, queue actions, remote screen-sharing actions, and reminder notifications related to the shared-content session replace one another and, in some embodiments, expire after three seconds. In some embodiments, some notifications can be coalesced and, optionally have no expiration. For example, if five users join a shared-content session, a single notification can be displayed that says a user and four others joined.

In some embodiments, notifications related to playback actions, queue actions, and remote sharing actions have a higher priority than reminder notifications related to the shared-content session. In some embodiments, notifications for apps that support shared-content sessions have a higher priority than notifications related to playback actions, queue actions, and remote sharing actions. In some embodiments, notifications that content is "playing only for me" have a higher priority than notifications for apps that support shared-content sessions. In some embodiments, notifications related to account updates have a higher priority than notifications that content is "playing only for me."

In response to detecting input 6104, John's device 6000A displays screen-share window 6070 in an enlarged, expanded and/or full-screen state (or using all of the screen outside of a portion of the screen designated for system status information and/or system controls), thereby presenting a full screen view of Jane's screen. Control region 6015A is again displayed when screen-share window 6070 is enlarged, indicating in control region status region 6015A-1 that Jane is sharing her screen with members of the Mountaineers group. It should be appreciated, however, that while Jane is sharing the contents of her screen, the shared content can be manipulated at each respective device viewing the contents of her screen in the shared-content session. For example, while John is viewing Jane's screen-share content in an expanded or full-screen state, other participants of the shared-content session can be viewing Jane's screen-share content in a smaller window or PiP (similar to screen-share window 6070 in FIG. 6S), and having different displayed locations on the participants' respective devices.

Because the contents of Jane's screen is displayed in full-screen view, some of the content from Jane's device 6000B overlaps with some of the content displayed on John's device 6000A. For example, representation 6021B' of screen-share pill 6021B is displayed layered beneath clock 6106 in a status bar region of John's device 6000A. In some embodiments, other information in the status bar region of John's device (the region that includes the clock and other relevant information such as a battery charge indication and signal strength indicator(s)) overlaps with corresponding regions from Jane's device. In some embodiments the home affordance 6077B from Jane's device overlaps with the home affordance 6077A on John's device. In some embodiments, content from Jane's screen is shown blurred and beneath content in John's status region. For example, representation 6021B' is shown blurred (indicated by hatching) and beneath John's clock 6106. In some embodiments, Jane's content is shown displayed over John's content, either with or without being blurred.

Figure 6T:
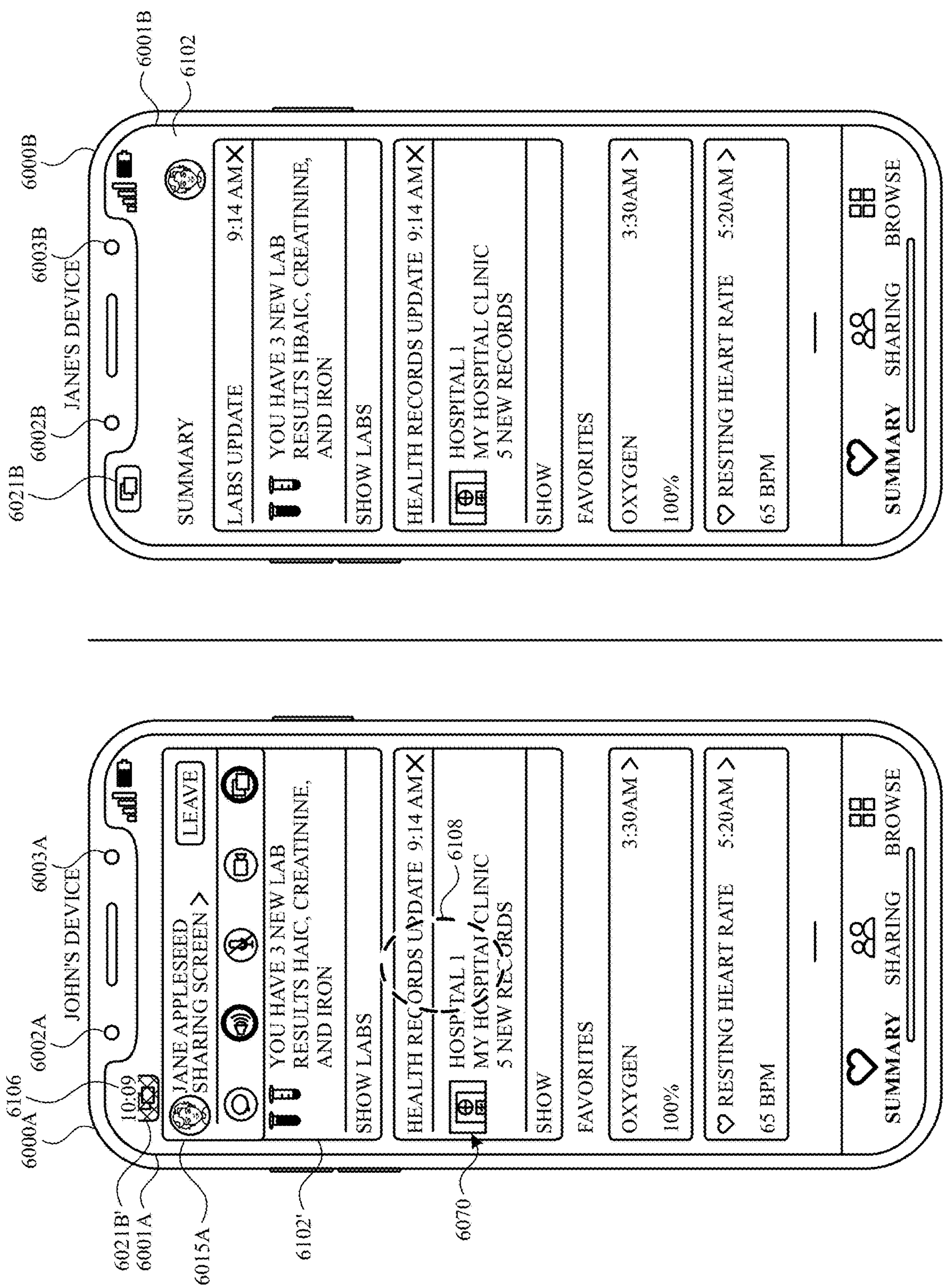
Figure 6U:
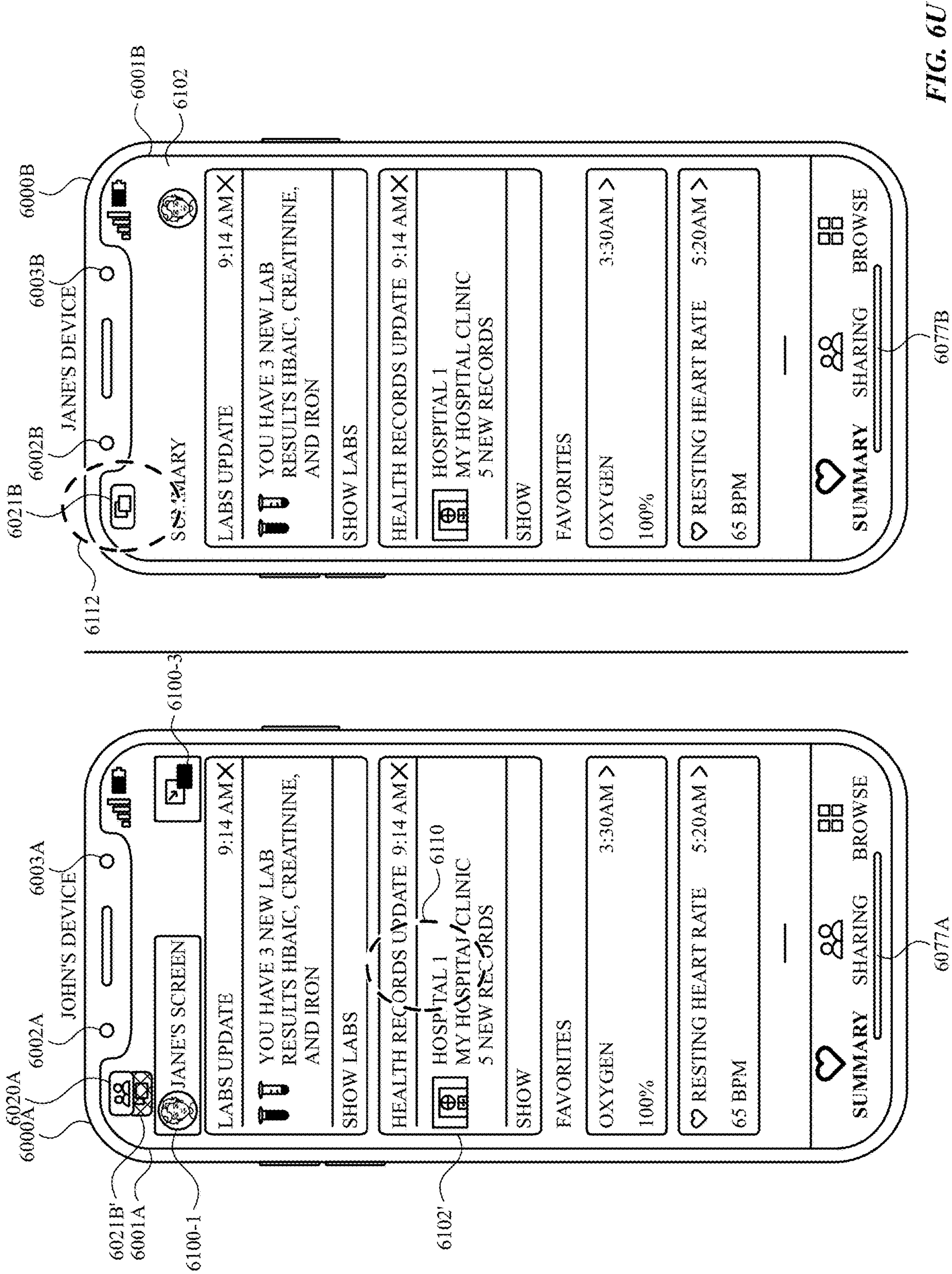

In FIG. 6T, Jane's device 6000B continues to display health interface 6102, and dismisses notification 6086 (e.g., after a predetermined amount of time has elapsed). On John's device 6000A, control region 6015A is dismissed to display chrome 6100 in response to input 6108, as shown in FIG. 6U. In FIG. 6U, John's device 6000A dismisses control region 6015A and displays sharing pill 6020A and chrome 6100, including identifier 6100-1 and reduce icon 6100-3. Reduce icon 6100-3 can be selected to reduce screen-share window 6070 from the full-screen view in FIG. 6U to the PiP depicted in FIG. 6S. In some embodiments, a home gesture (e.g., an upward swipe on home affordance 6077A)

causes device 6000A to reduce screen-share window 6070 from the full-screen view to the PiP view. Sharing pill 6020A is displayed over the screen-share content from Jane's device (e.g., representation 6021B' of screen-share pill 6021B), in a manner similar to that described above regarding clock 6106. John's device 6000A dismisses chrome 6100 in response to input 6110. In some embodiments, John's device 6000A automatically dismisses chrome 6100 after displaying the chrome for a predetermined amount of time.

Figure 6V:
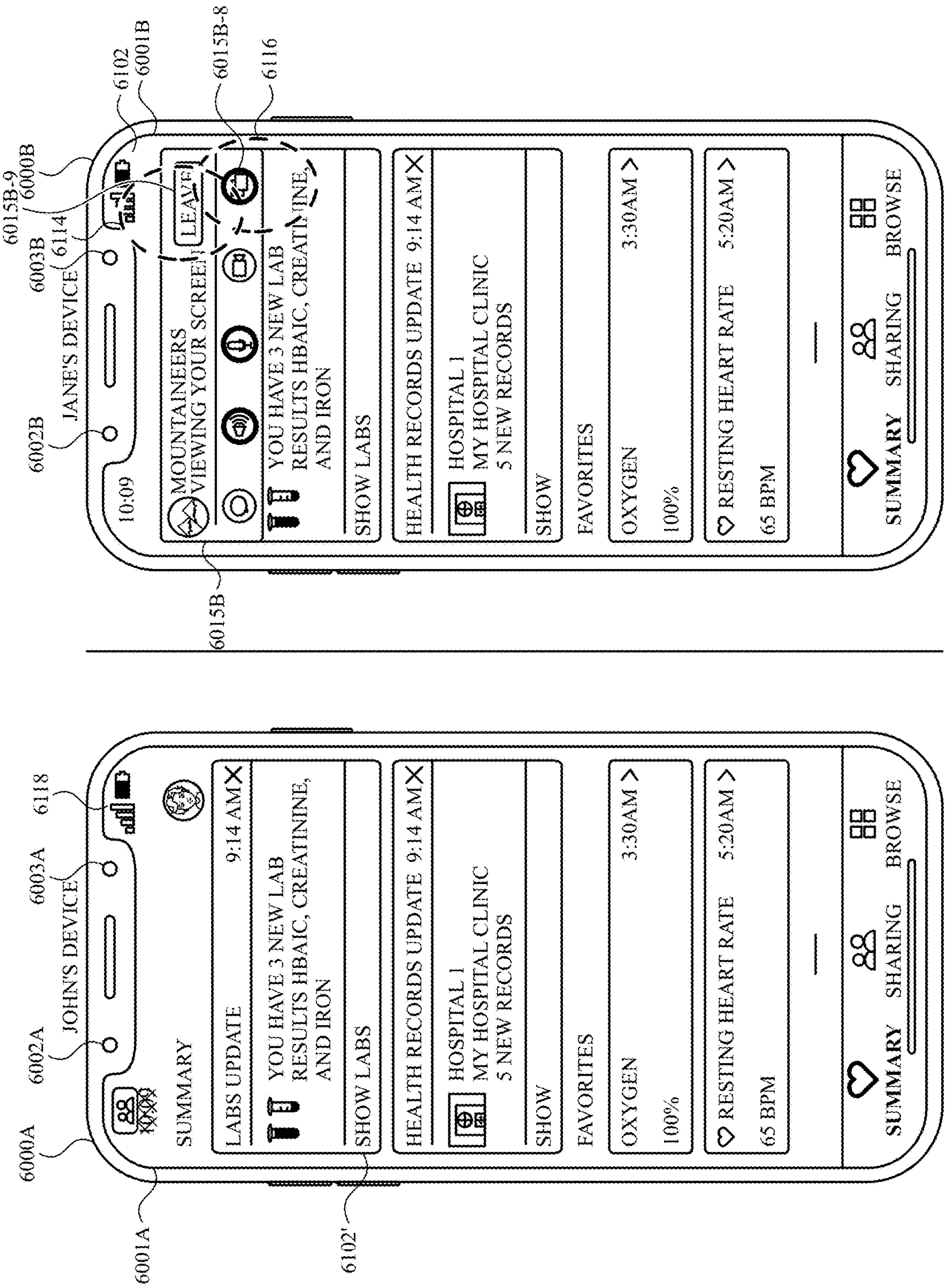

In FIG. 6U, Jane's device 6000B detects input 6112 on screen-share pill 6021B and, in response, displays control region 6015B, as shown in FIG. 6V. Control region status region 6015B-1 indicates that the Mountaineers are viewing Jane's screen. Jane can select sharing option 6015B-8 (which has a bolded appearance indicating screen-sharing is active) to stop sharing her screen with the Mountaineers group. Jane can select leave option 6015B-9 to leave the shared-content session and terminate screen-sharing with the Mountaineers group.

In FIG. 6V, John's device 6000A displays privacy indicator 6118, indicating that certain components of John's device (e.g., camera 6002A and/or microphone 6003A) are currently, or recently, in use. Privacy indicator 6118 can be displayed in embodiments depicted in other figures described herein.

Figure 6W:
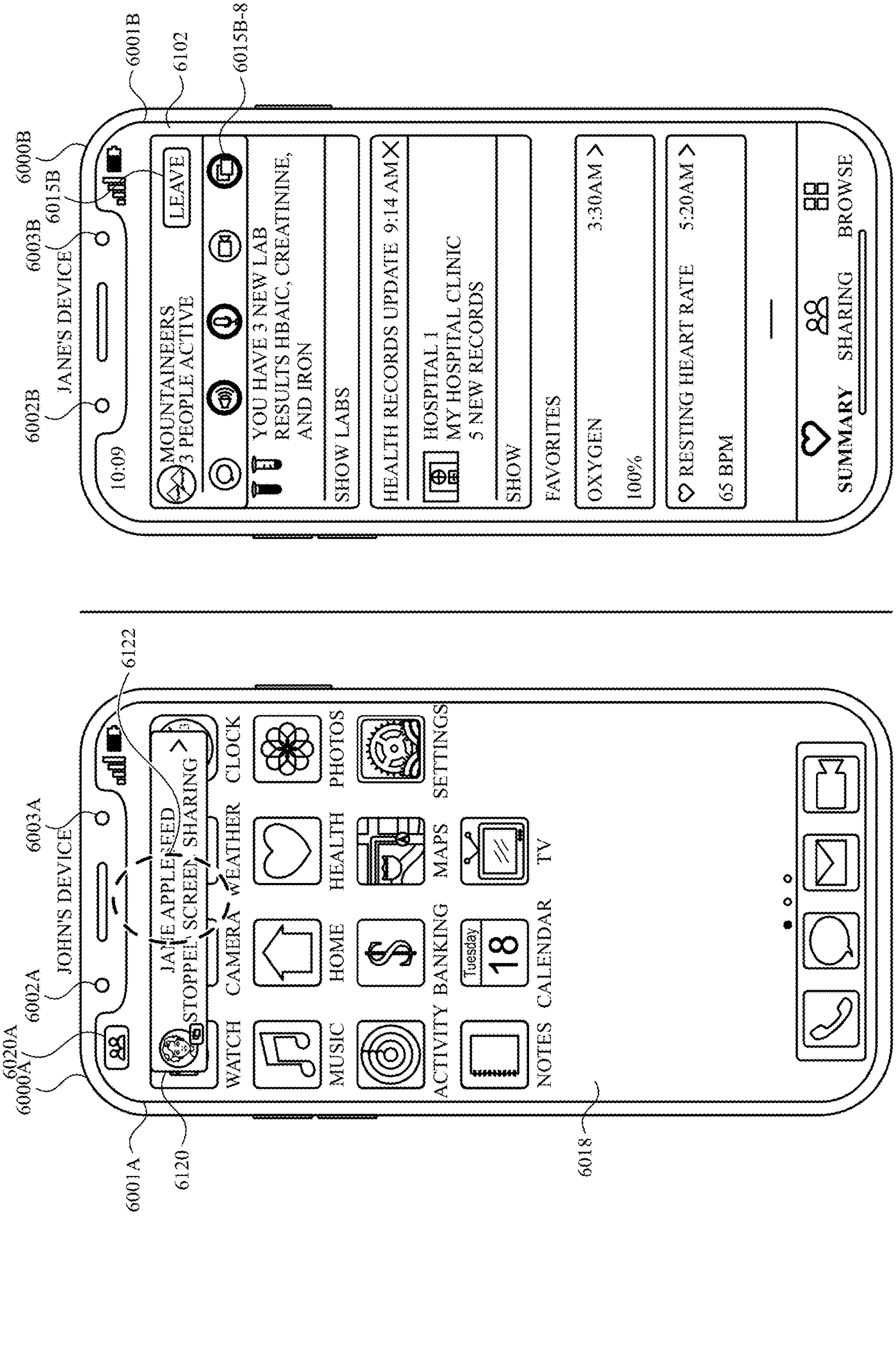

FIG. 6W depicts John's and Jane's devices 6000 when Jane selects sharing option 6015B-8 in response to input 6116. Specifically, Jane's device 6000B stops sharing the content of its screen with the Mountaineers group, as indicated by the unbolded appearance of sharing option 6015B-8 and the updated control region status region 6015B-1, which now notes that three people are active in the Mountaineers group (as a result of Ryan leaving the shared-content session). John's device 6000A stops displaying screen-share window 6070 (returning to home screen 6018) and displays notification 6120 indicating that Jane stopped sharing her screen. Sharing pill 6020A indicates that John's device 6000A is still participating in the shared-content session, even though Jane's screen sharing has stopped. In some embodiments, John's device 6000A displays group card interface 6038A in response to input 6122 on notification 6120.

Figure 6X:
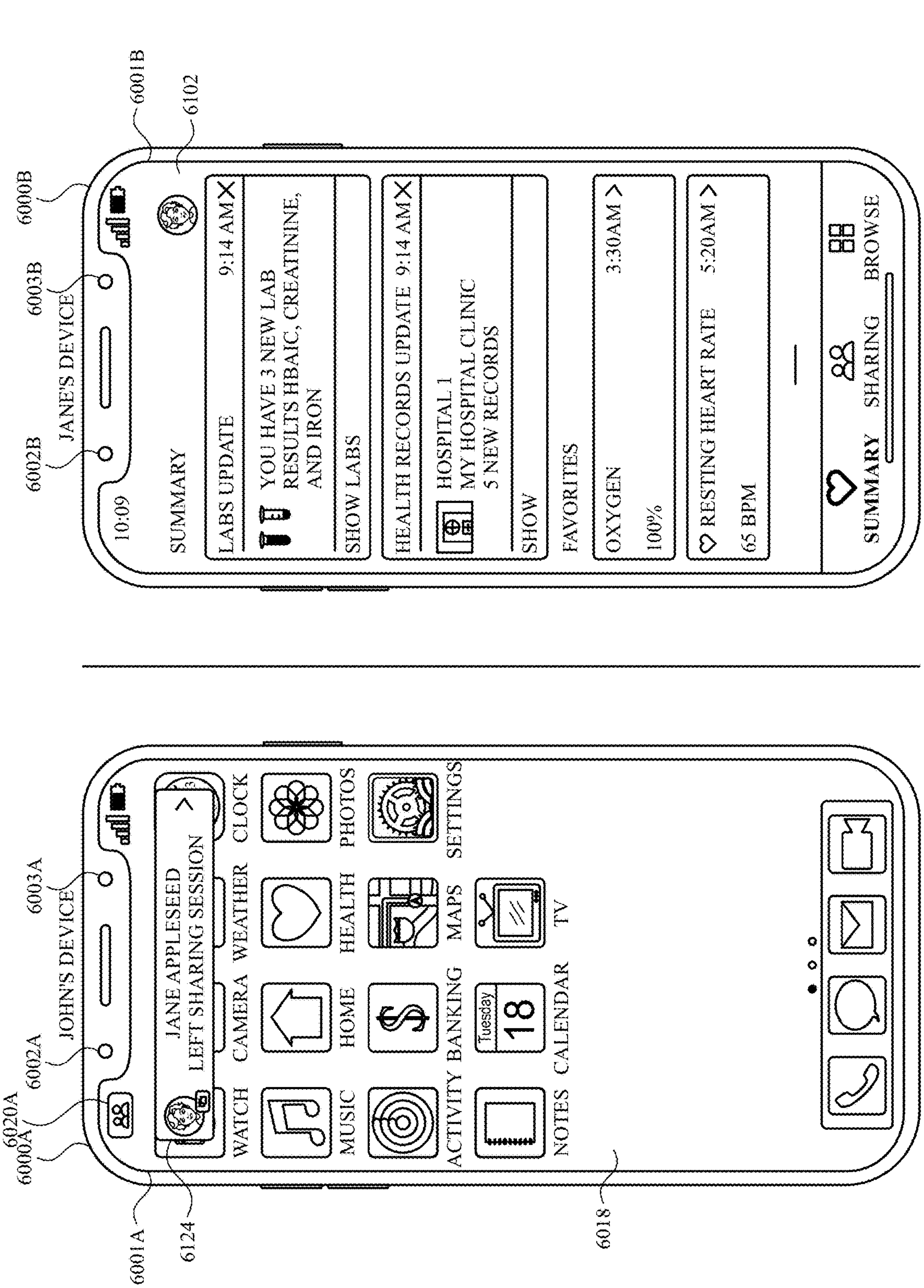

FIG. 6X depicts John's and Jane's devices 6000 when Jane selects leave option 6015B-9 in response to input 6114. Specifically, Jane's device 6000B stops sharing the content of its screen with the Mountaineers group and leaves (e.g., disconnects from or stops participating in) the shared-content session, as indicated by not displaying control region 6015B or sharing pill 6020B. John's device 6000A stops displaying screen-share window 6070 and displays notification 6124 indicating that Jane left the shared-content session. Although Jane's device left the shared-content session, John's device continues to remain in the shared-content session, as indicated by sharing pill 6020A.

Figure 6Z:
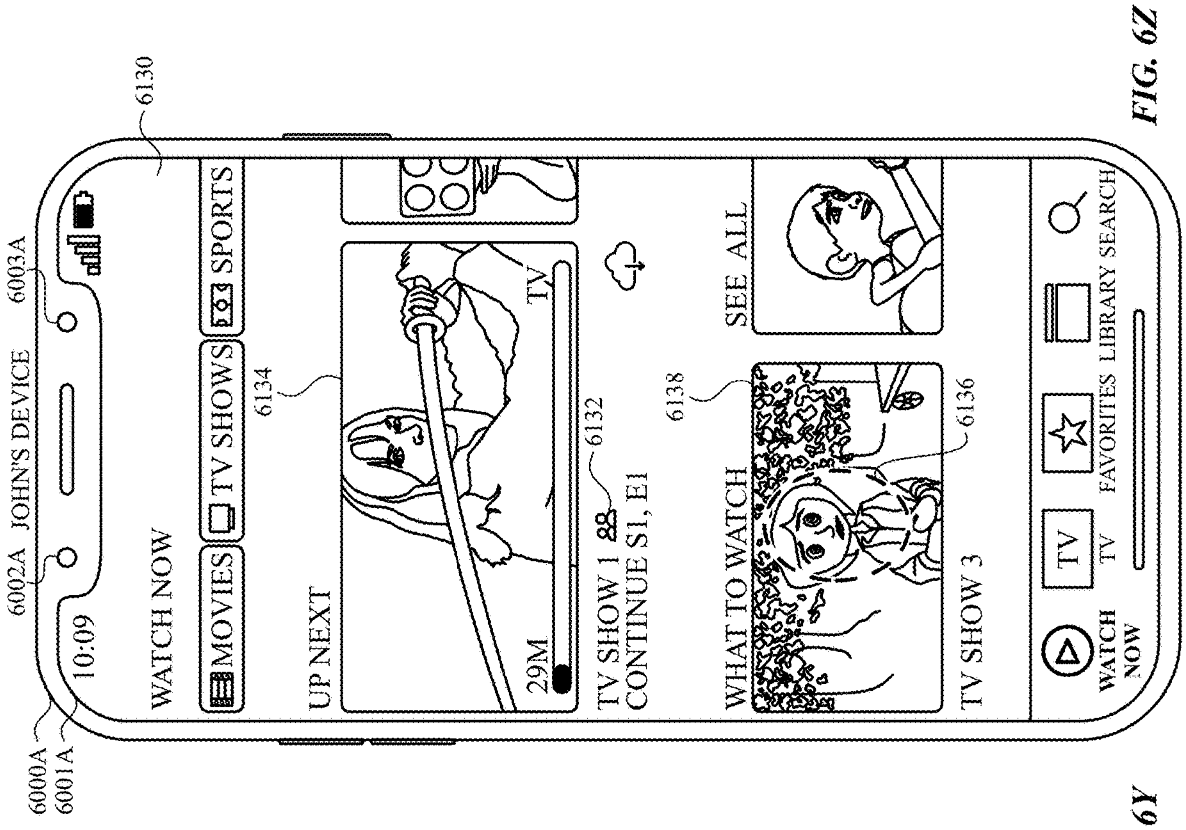
Figure 6Y:
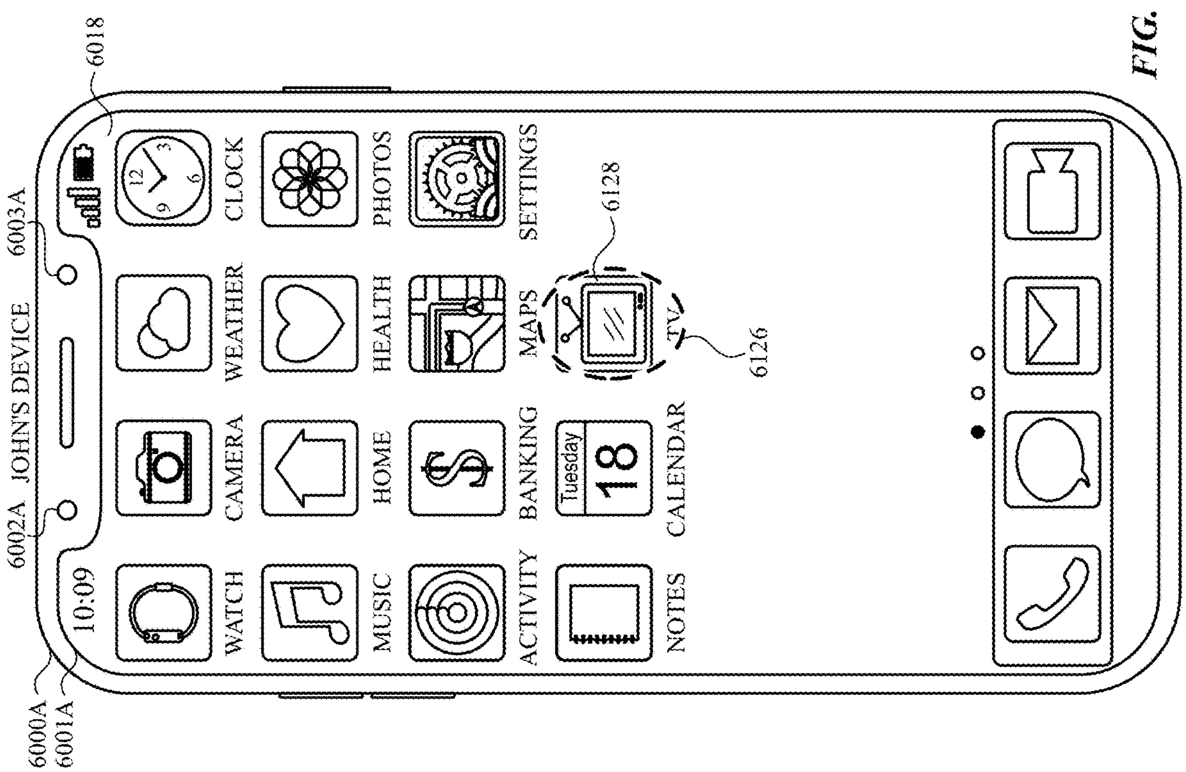
Figure 6A:
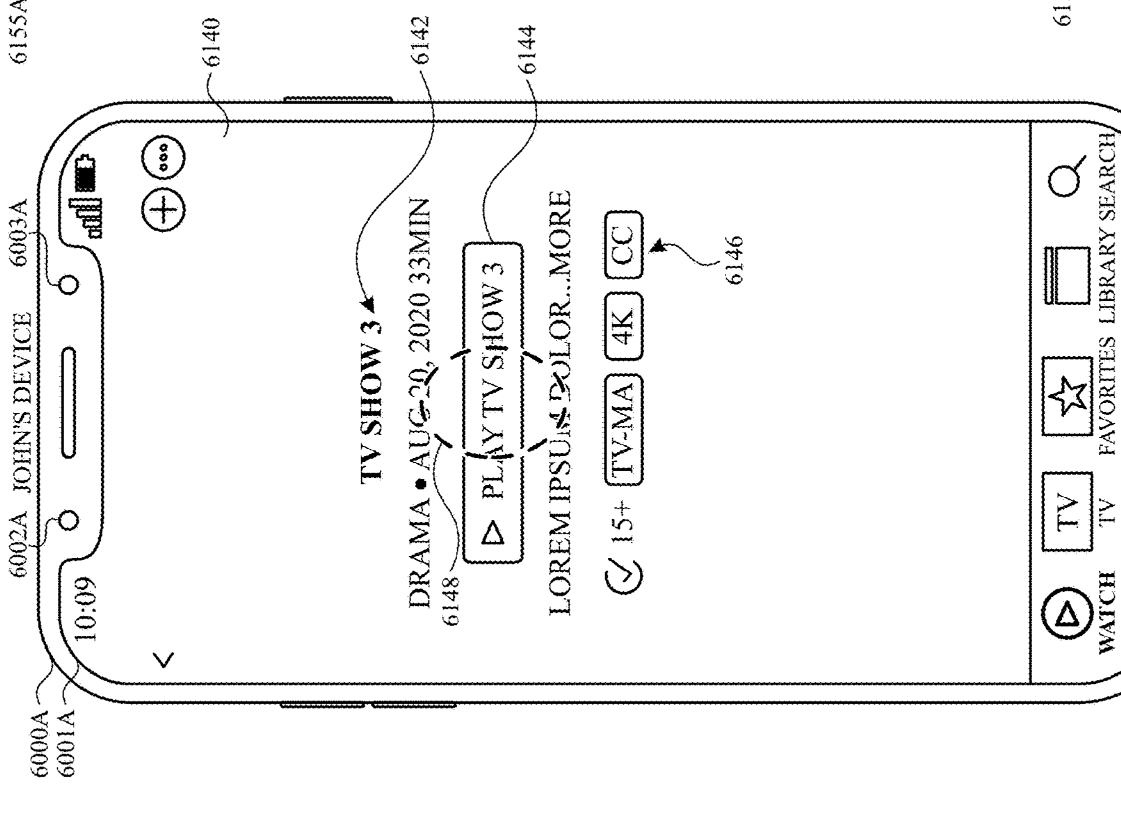
Figure 6A:
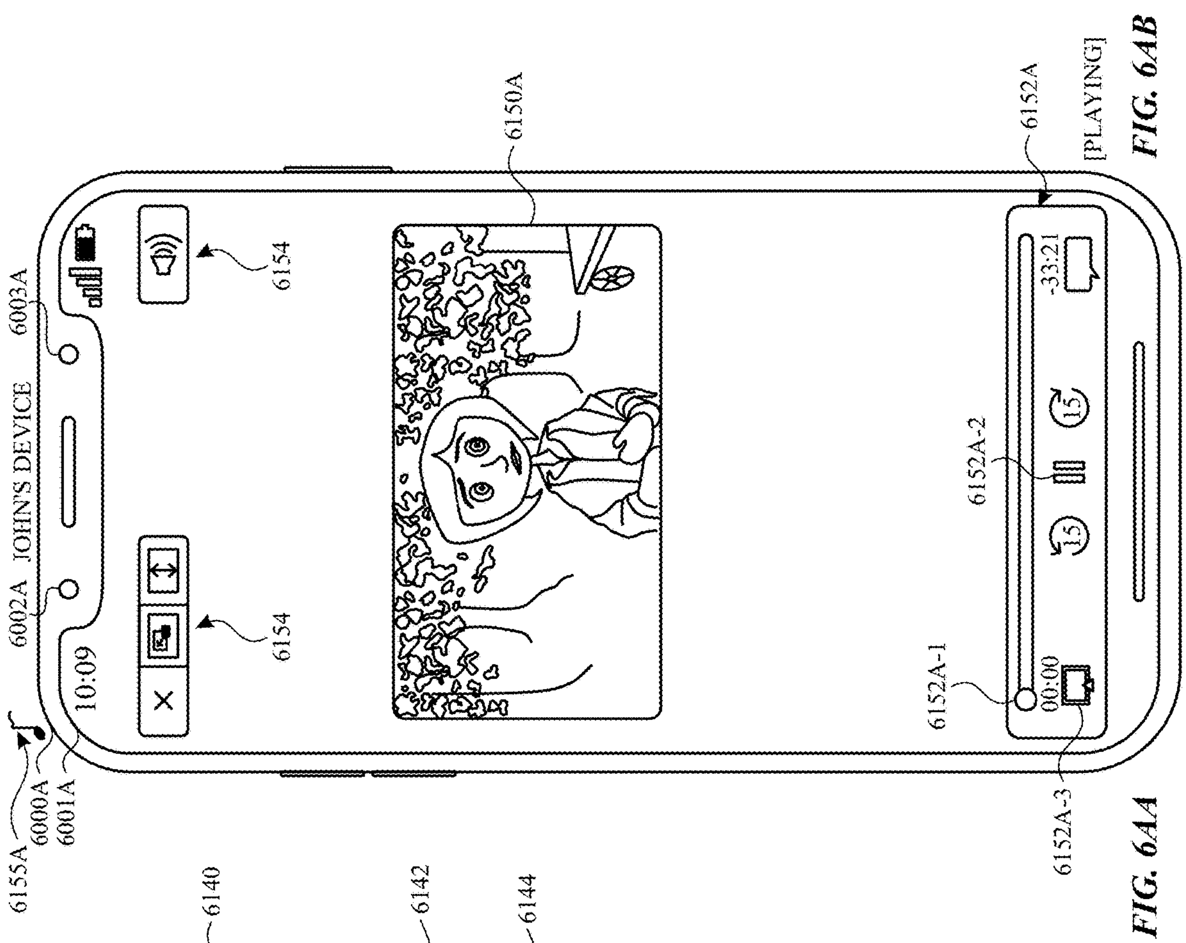
Figure 6A:
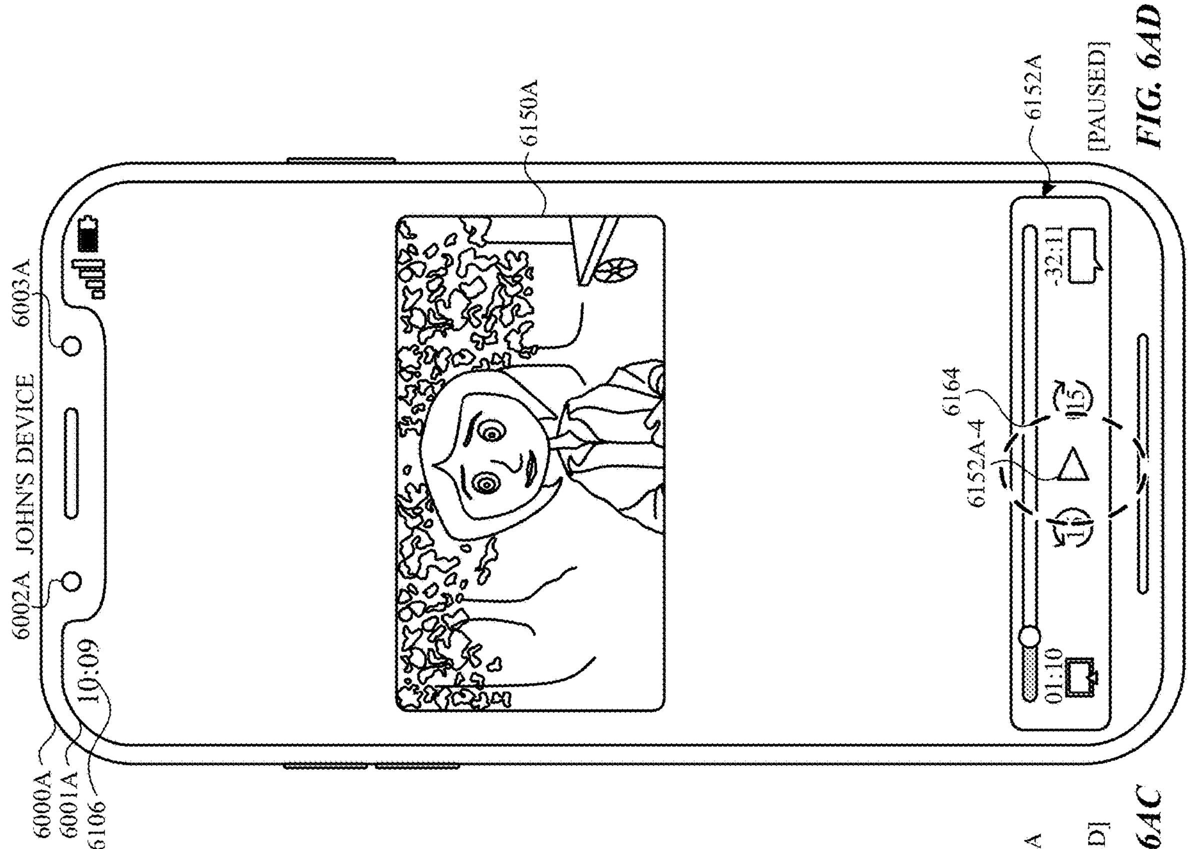
Figure 6A:
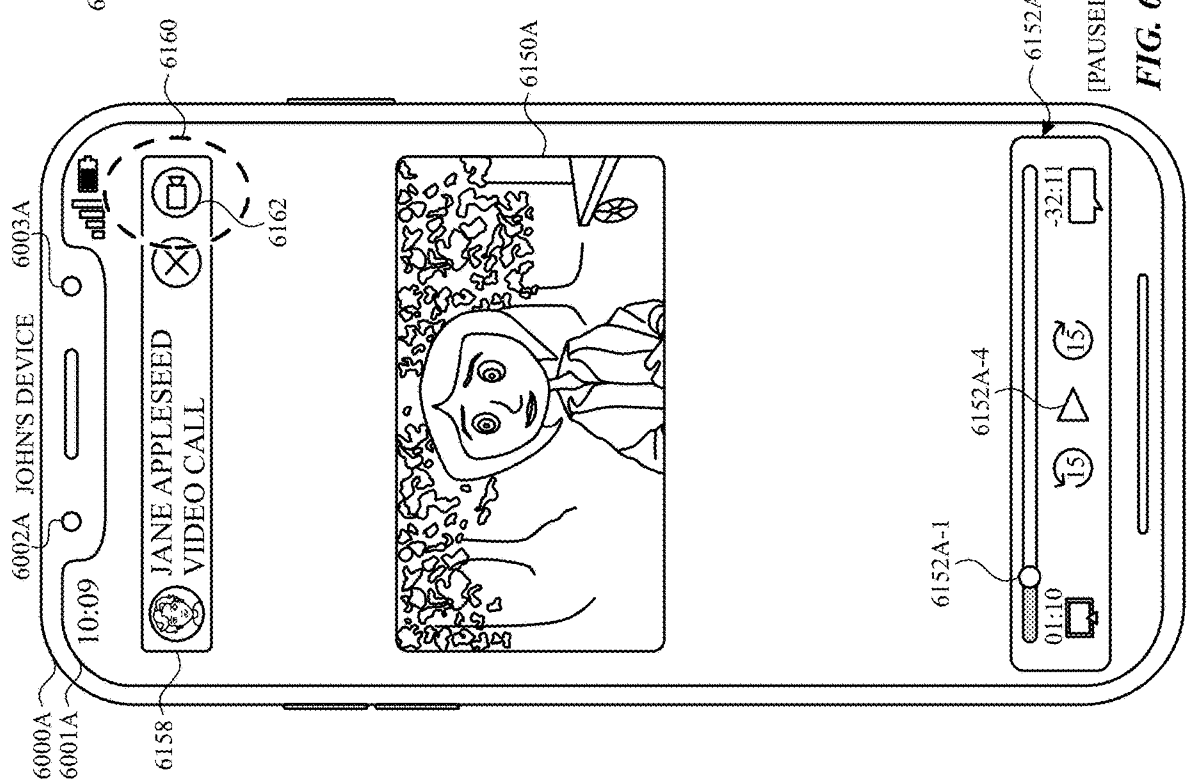
Figure 6A:
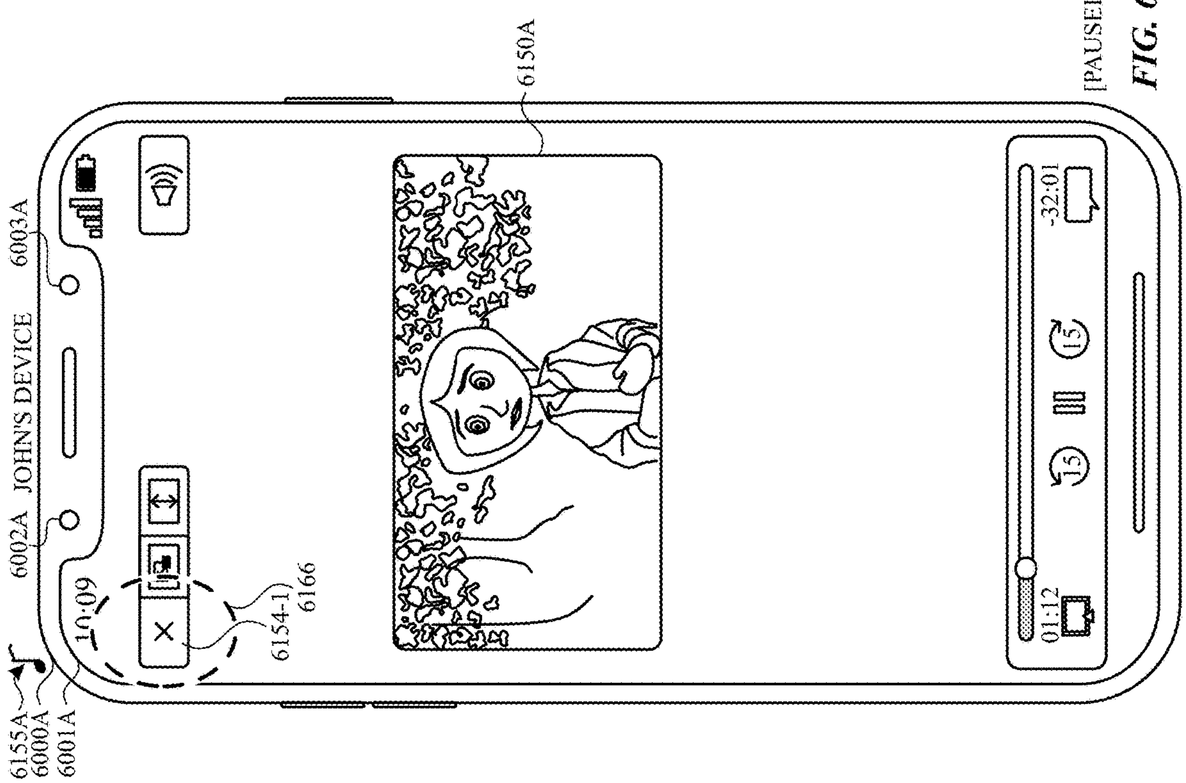
Figure 6A:
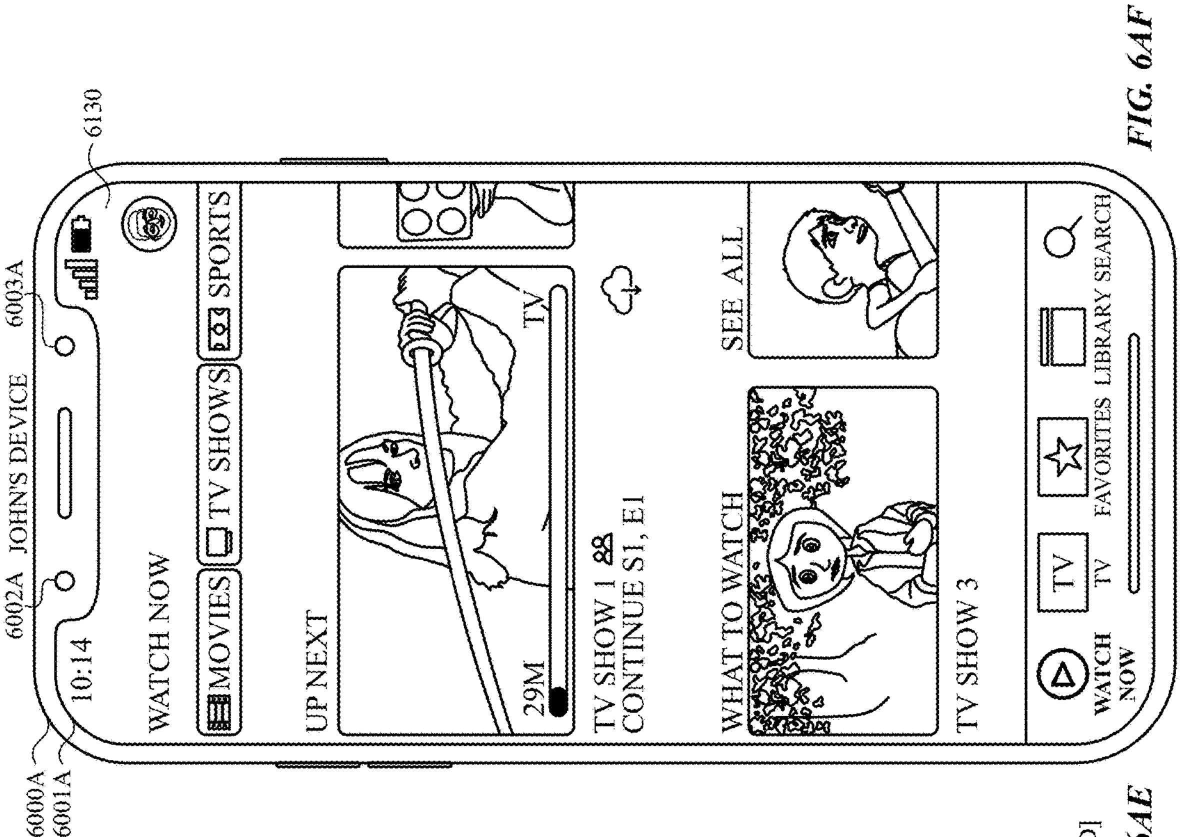
Figure 6A:
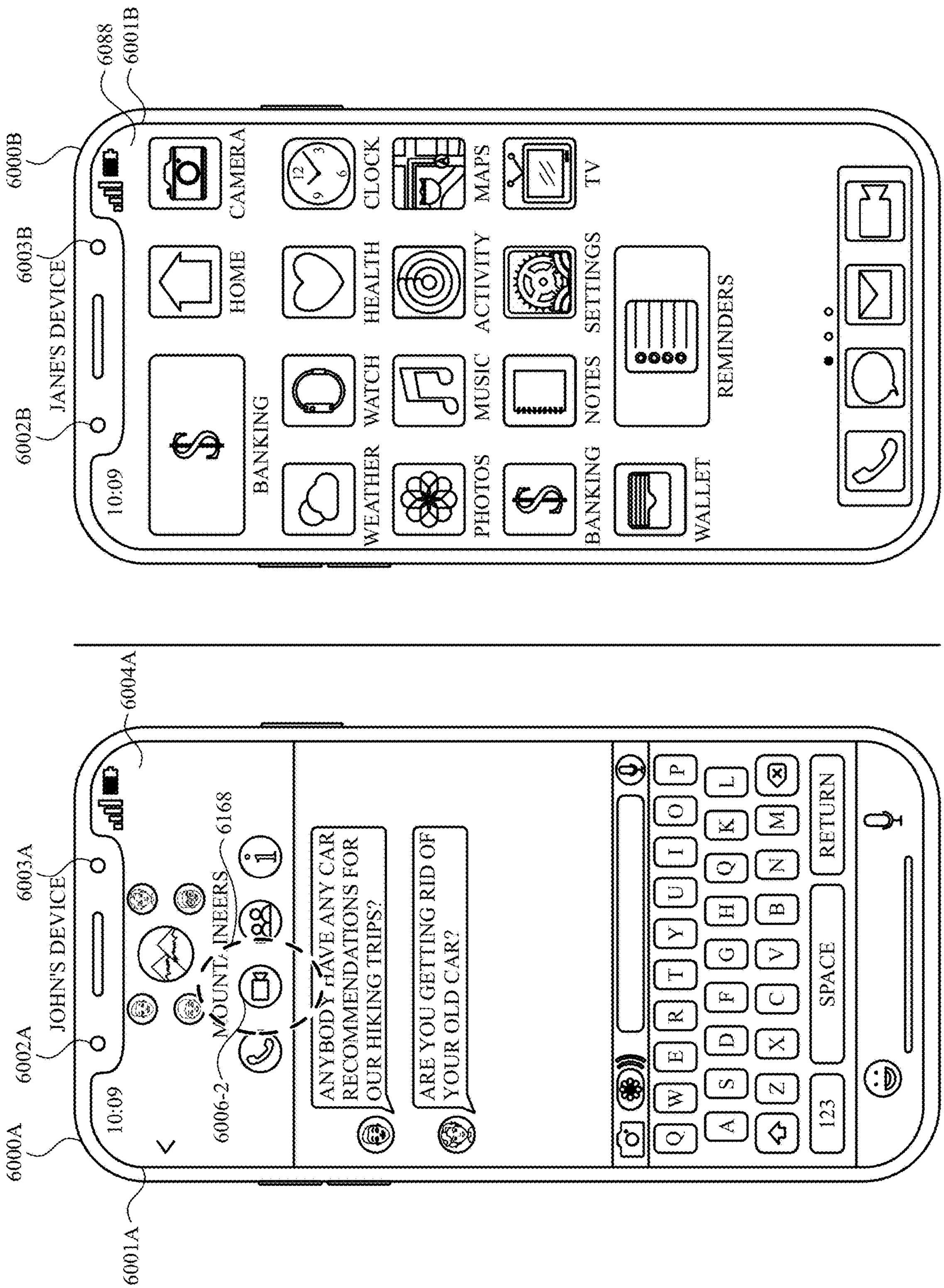
Figure 6A:
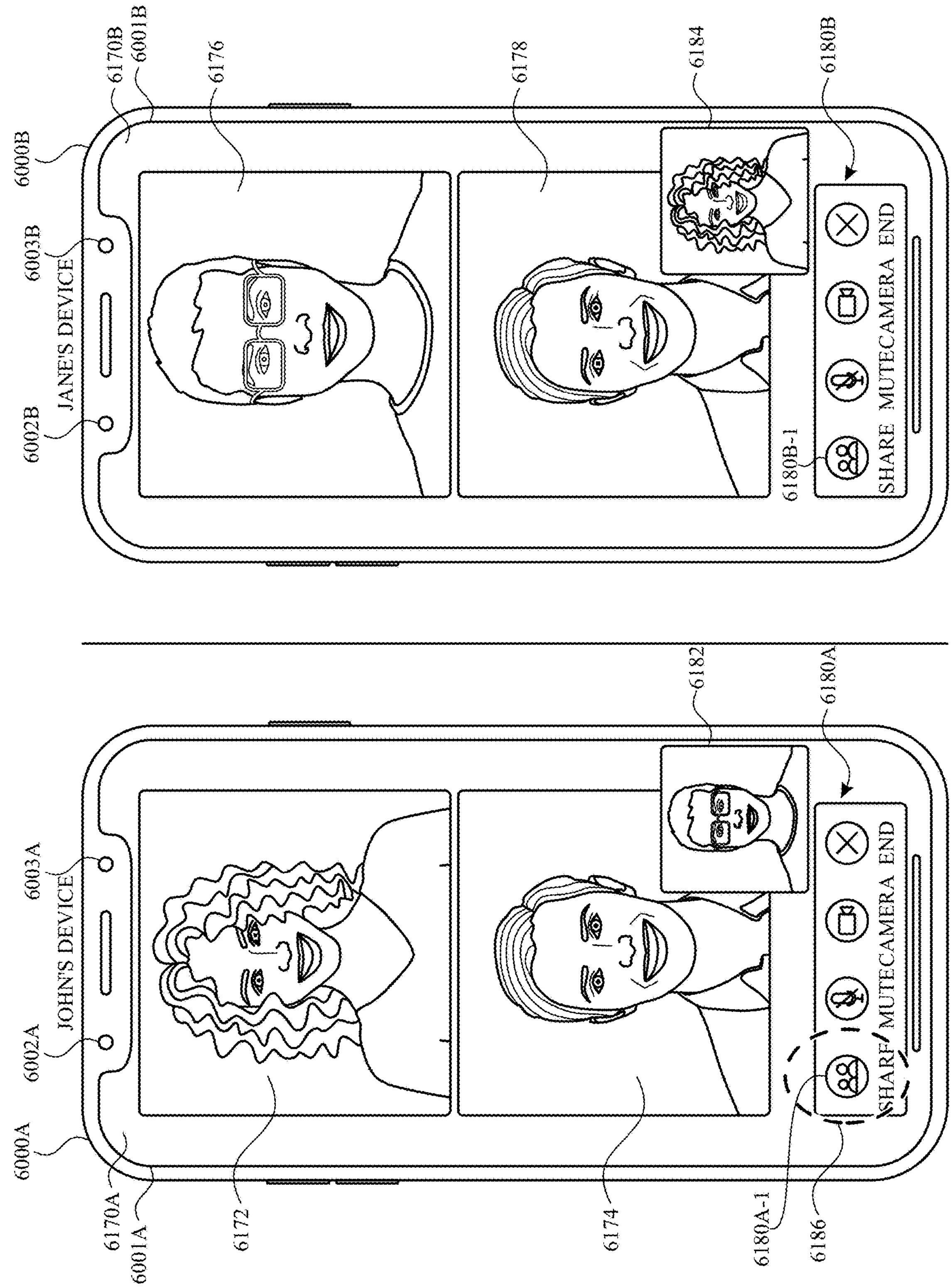
Figure 6A:
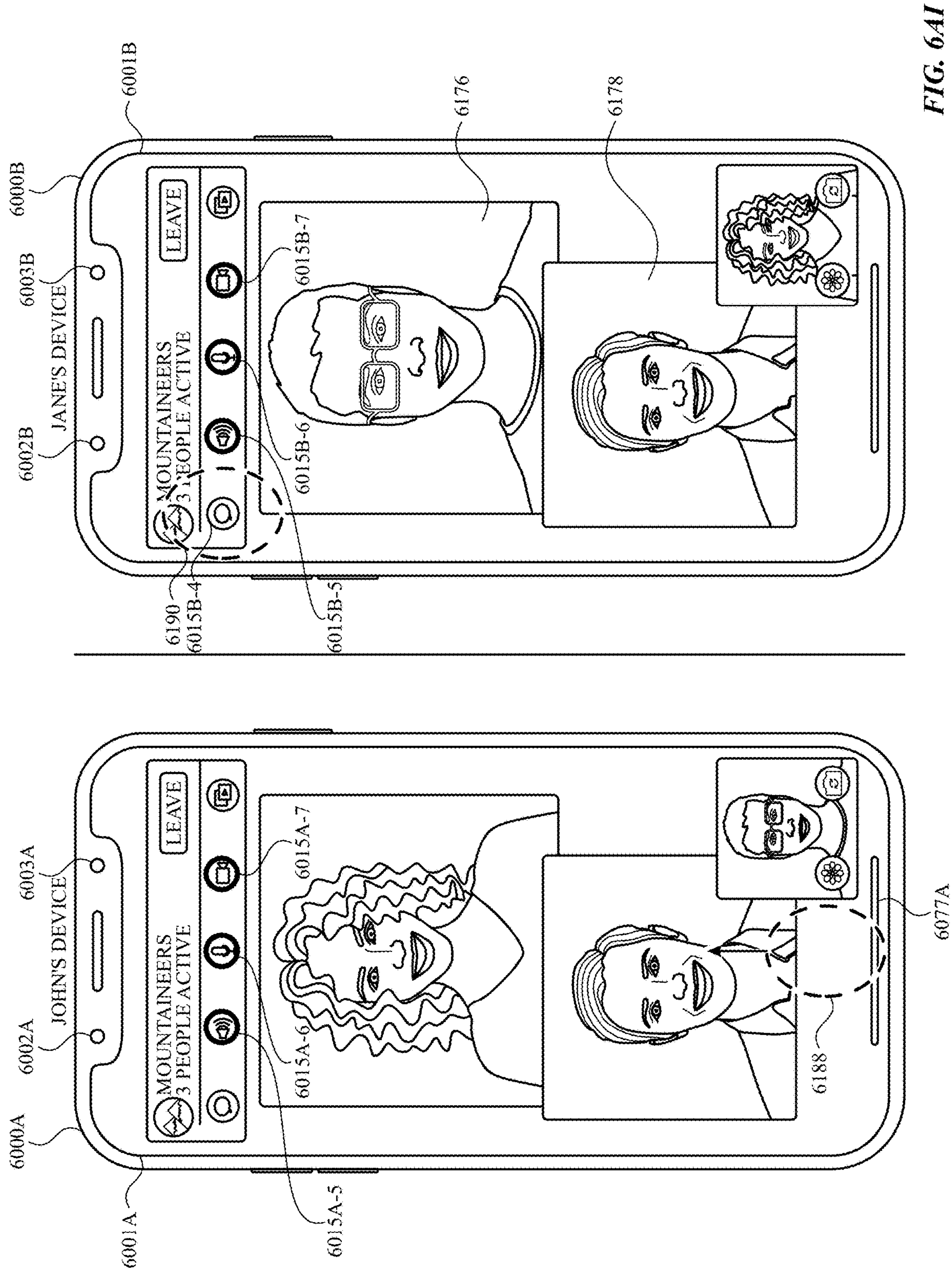
Figure 6A:
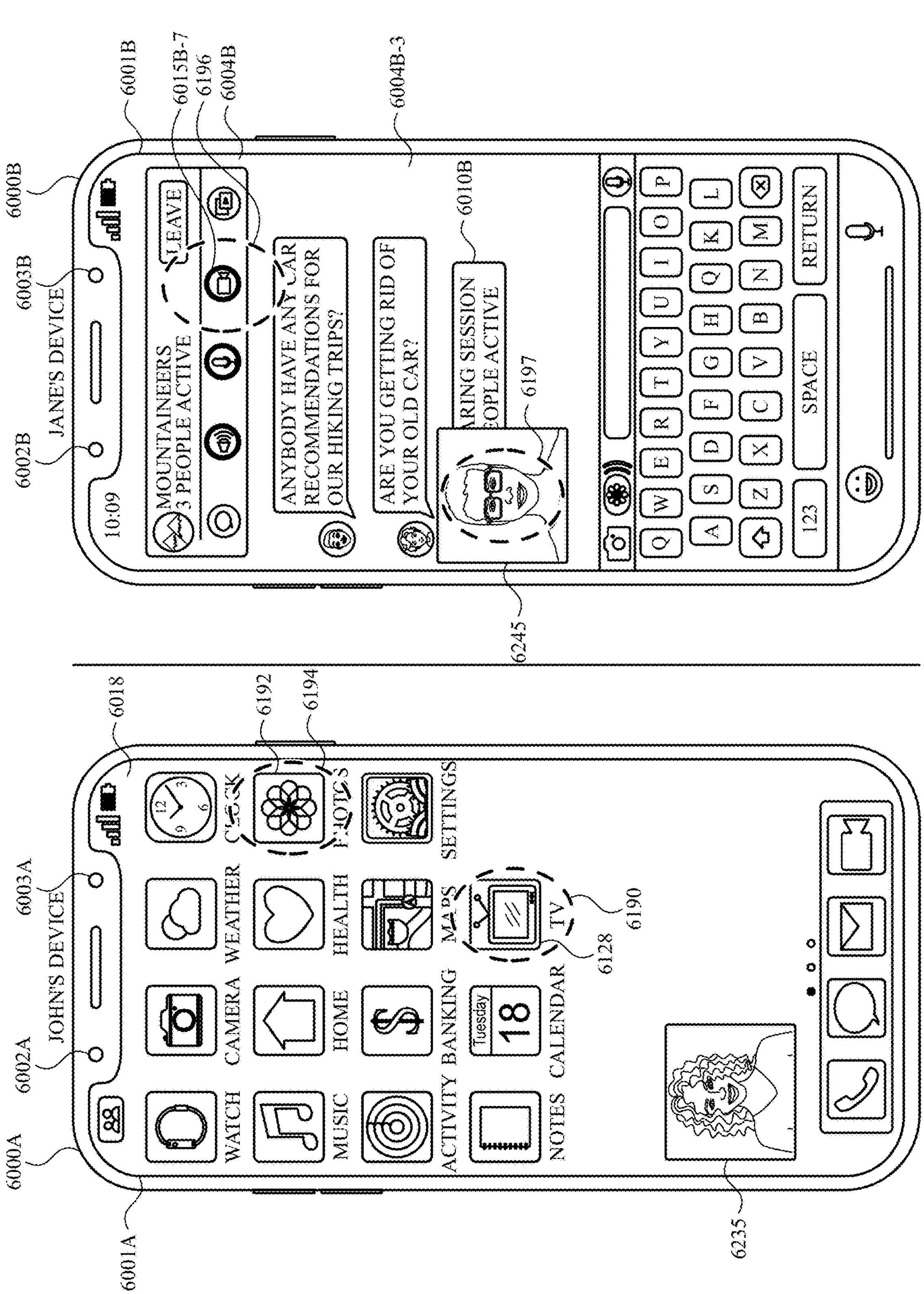
Figure 6A:
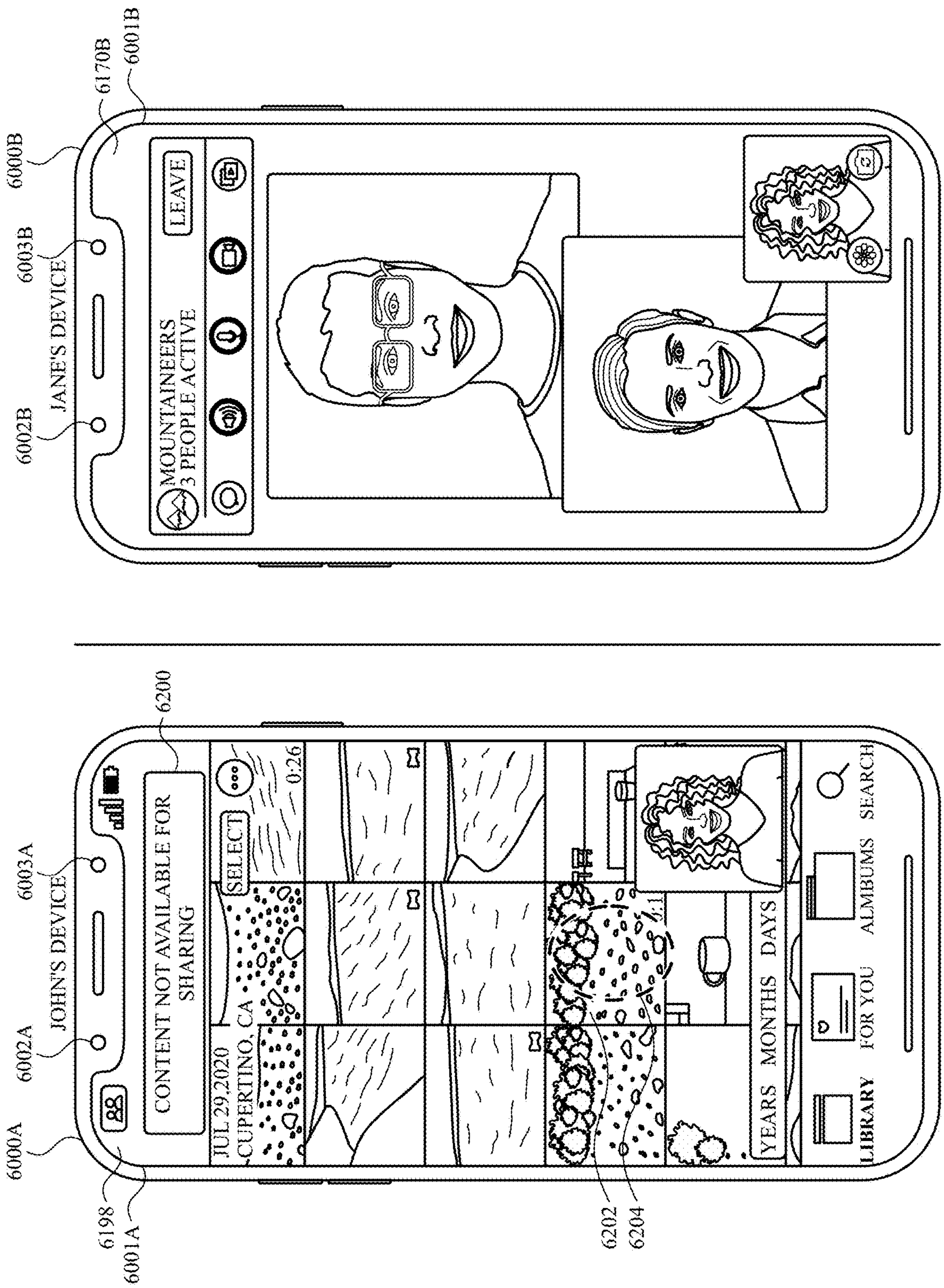
Figure 6A:
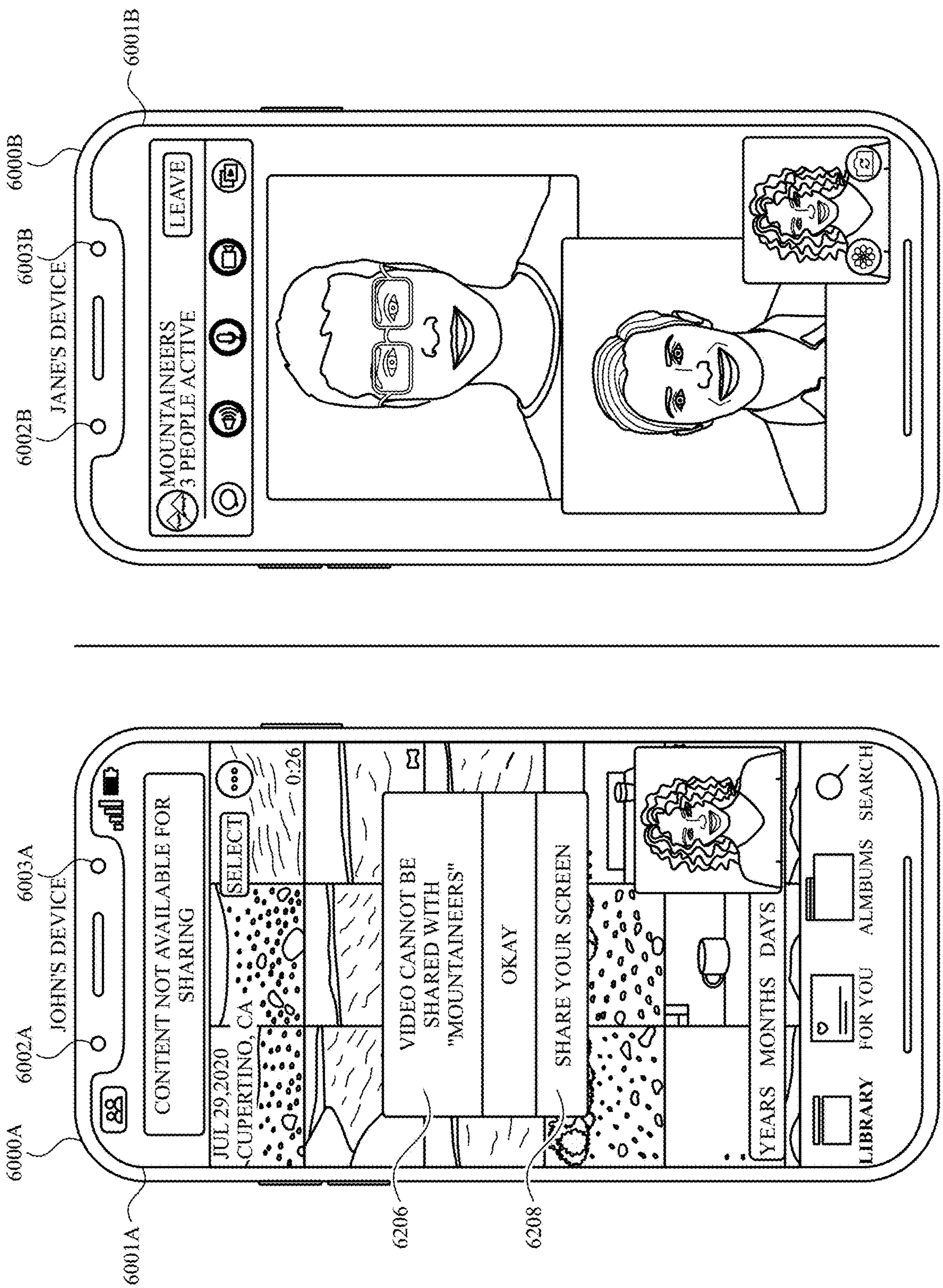
Figure 6A:
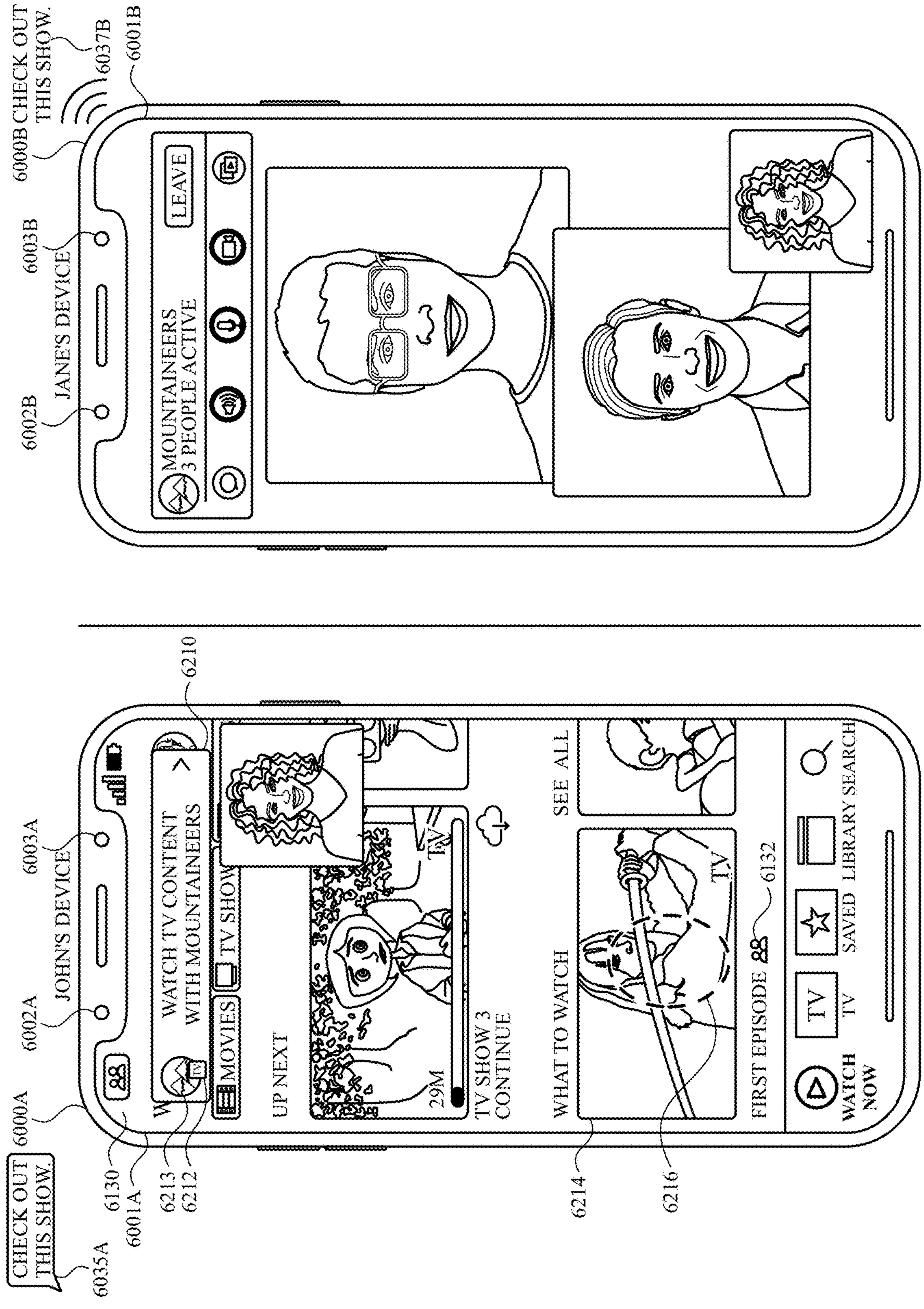
Figure 6A:
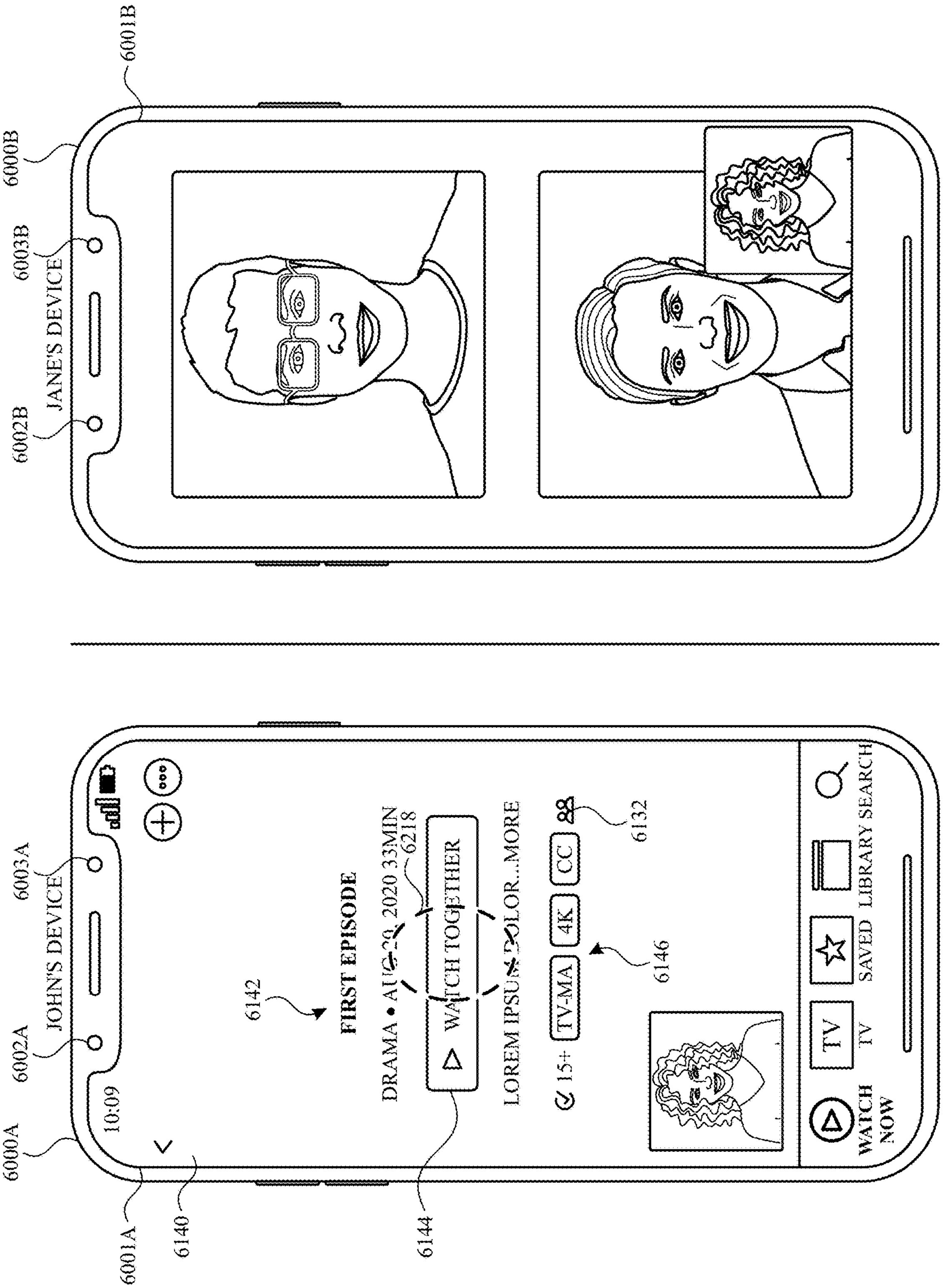
Figure 6A:
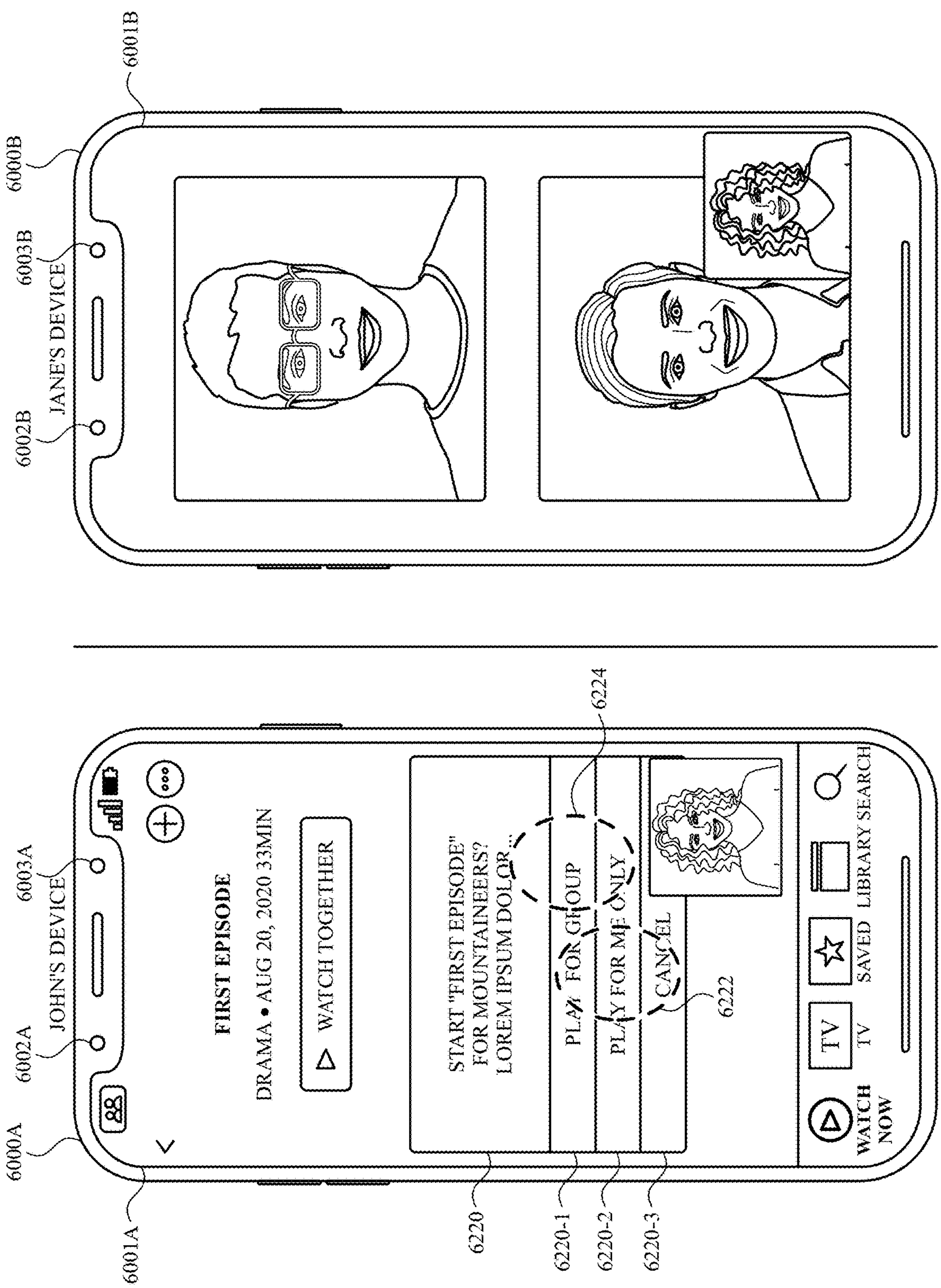
Figure 6A:
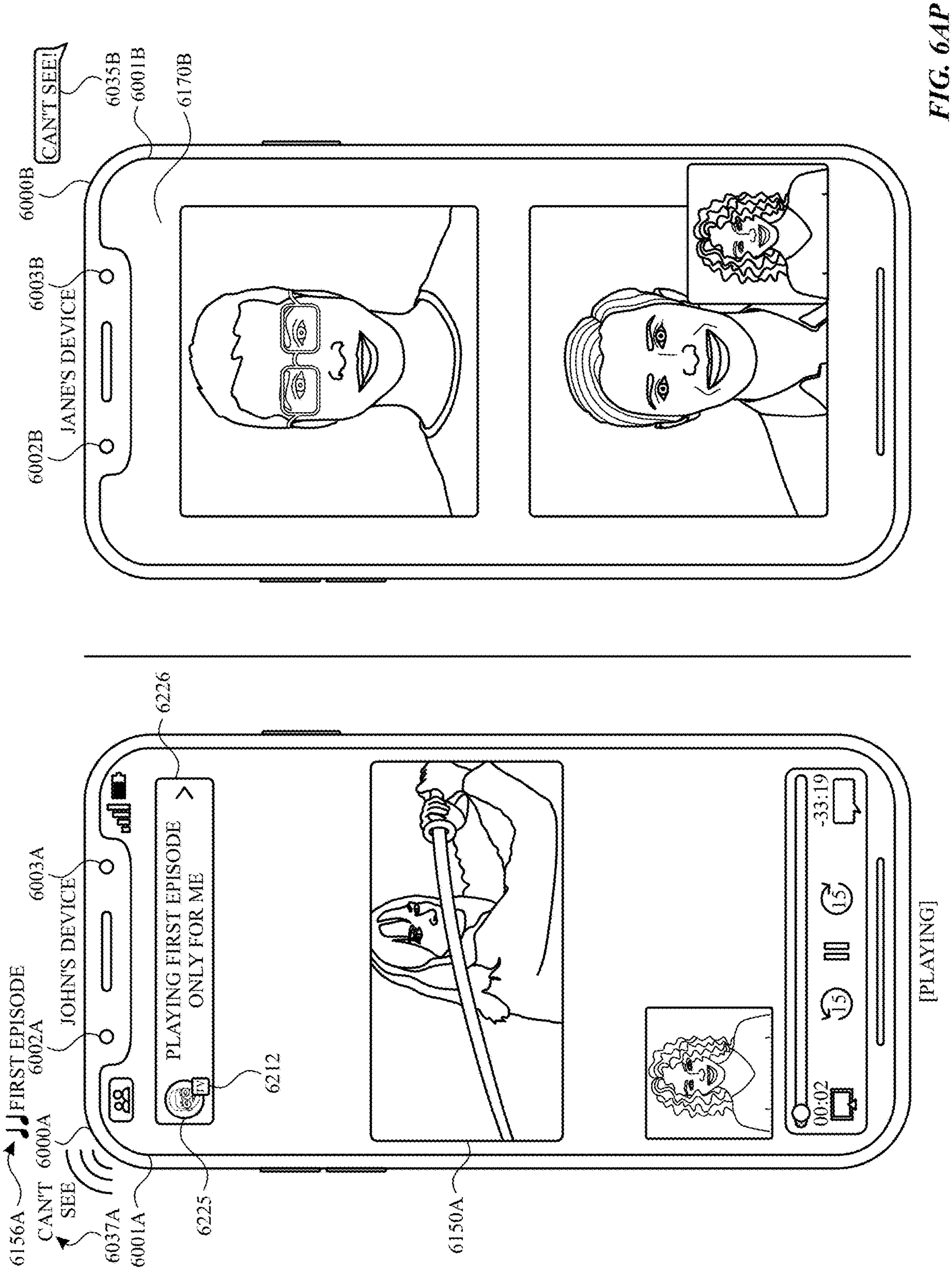
Figure 6A:
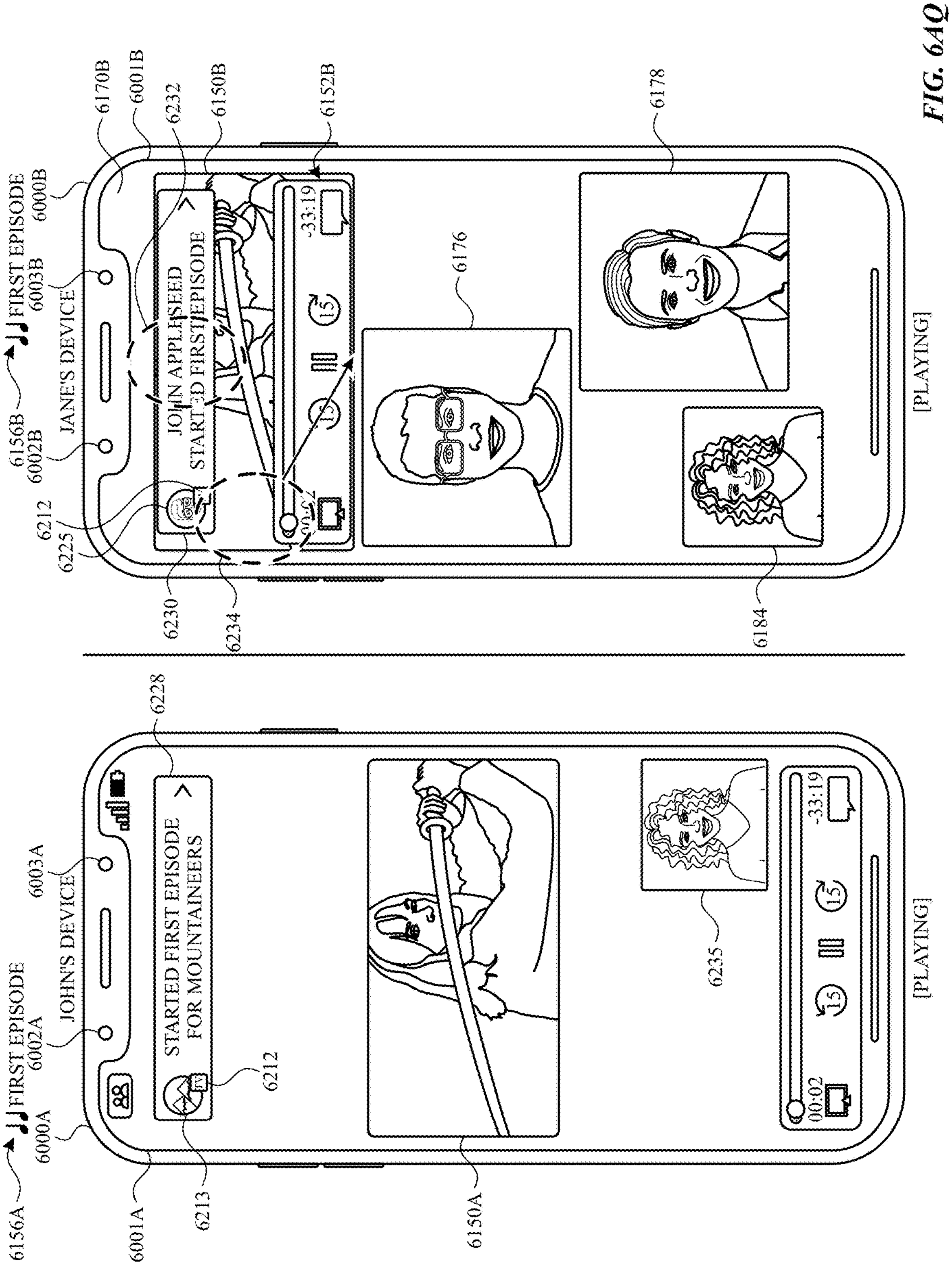
Figure 6A:
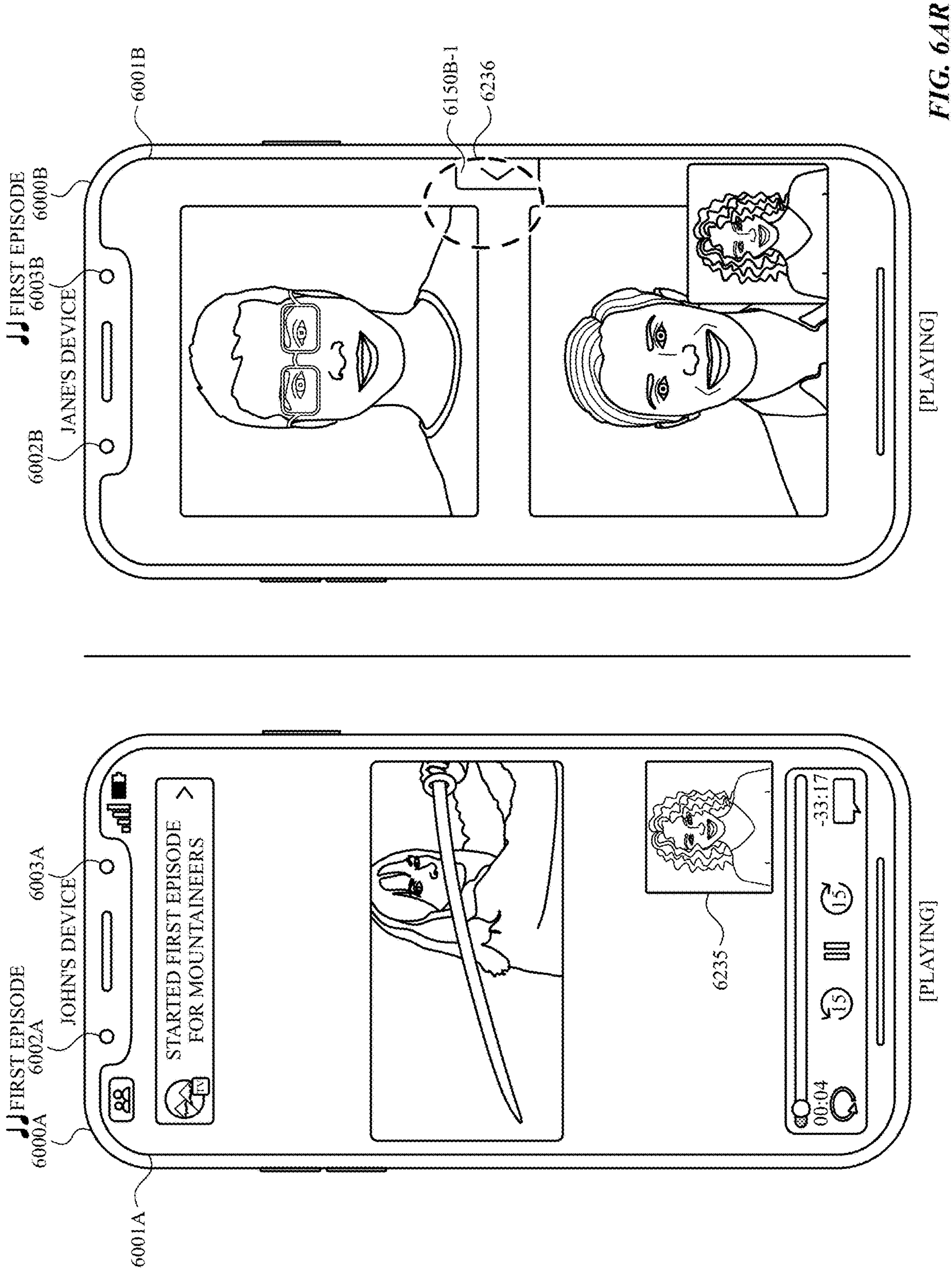
Figure 6A:
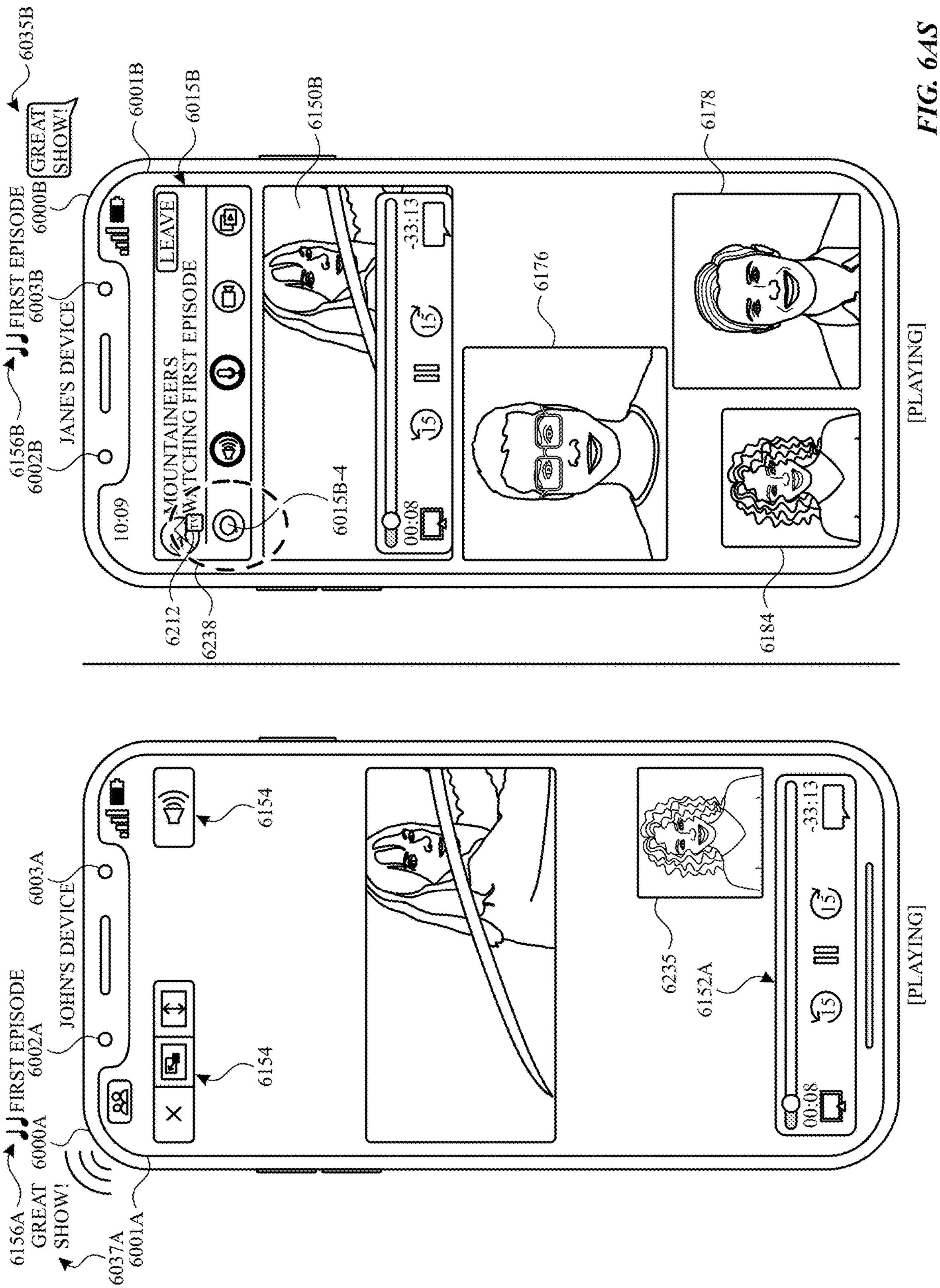
Figure 6A:
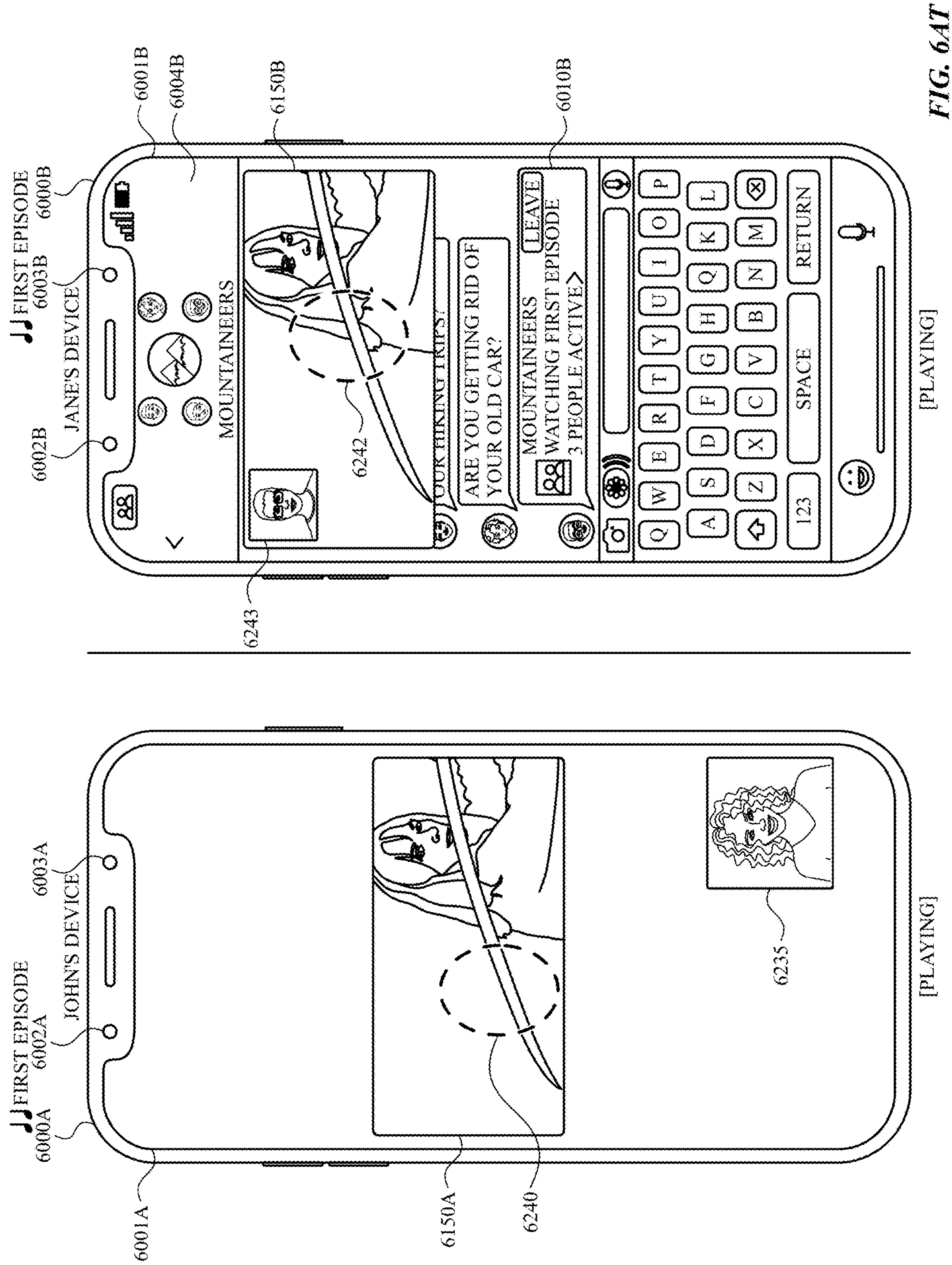
Figure 6A:
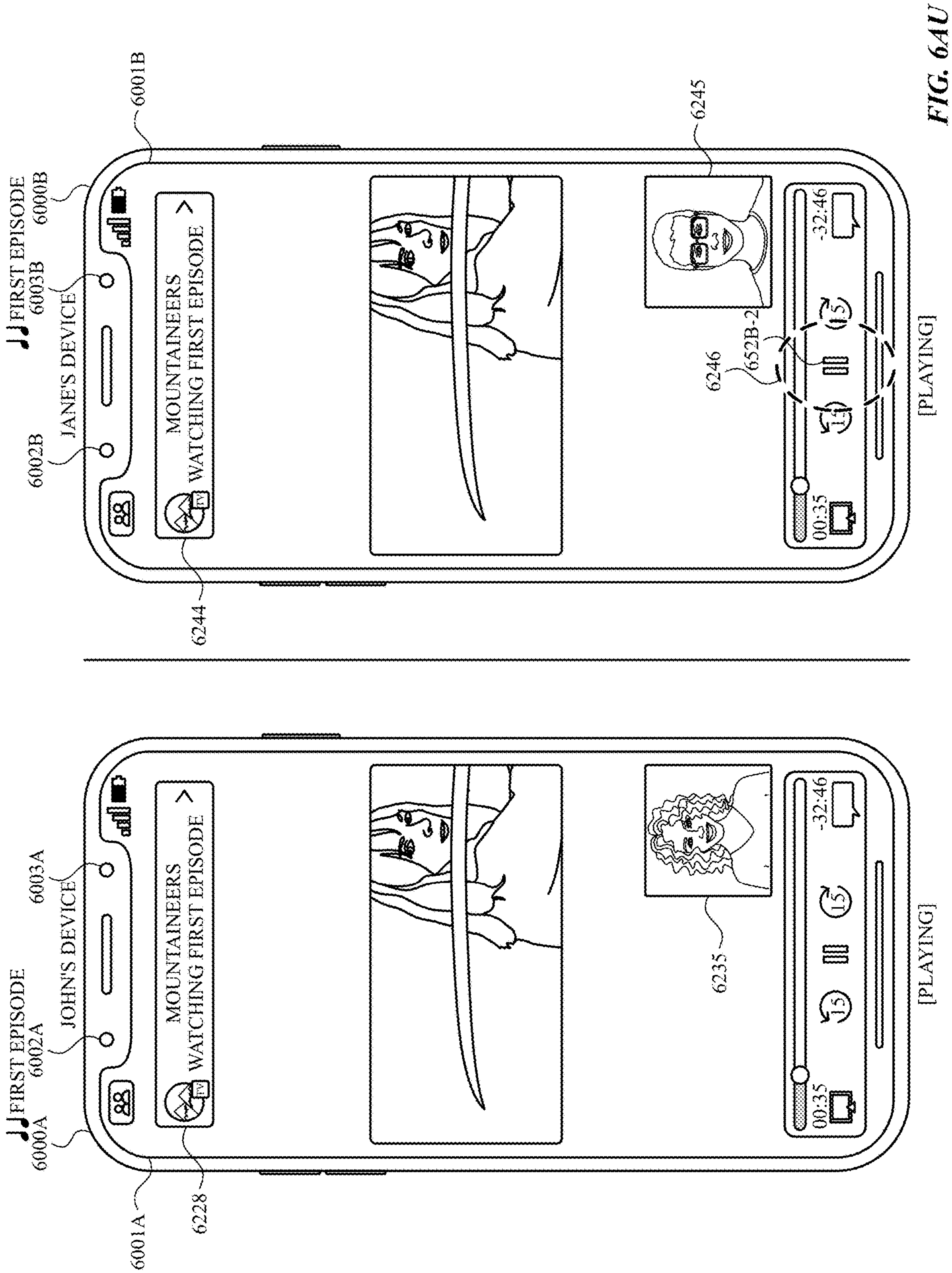
Figure 6A:
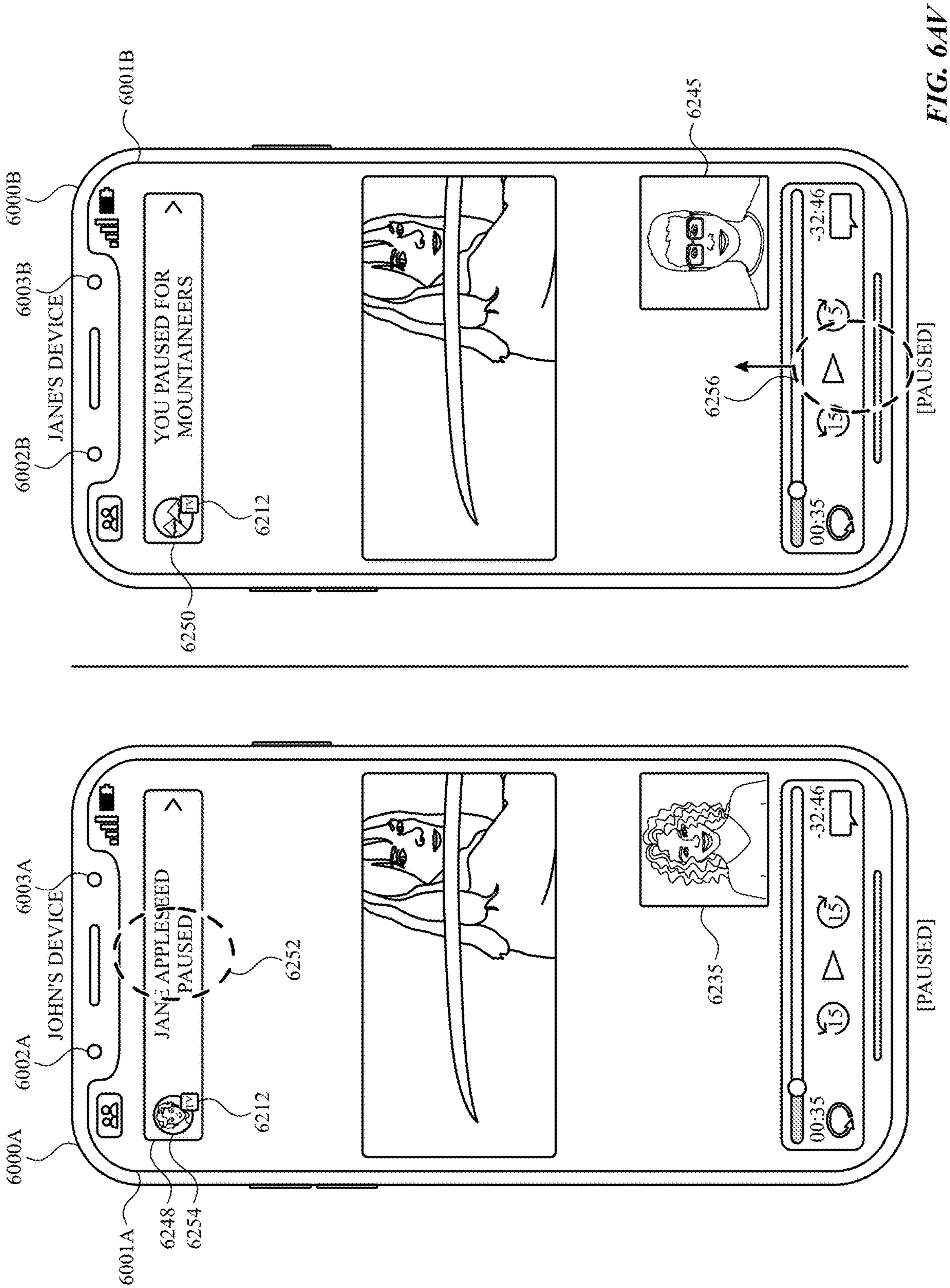
Figure 6A:
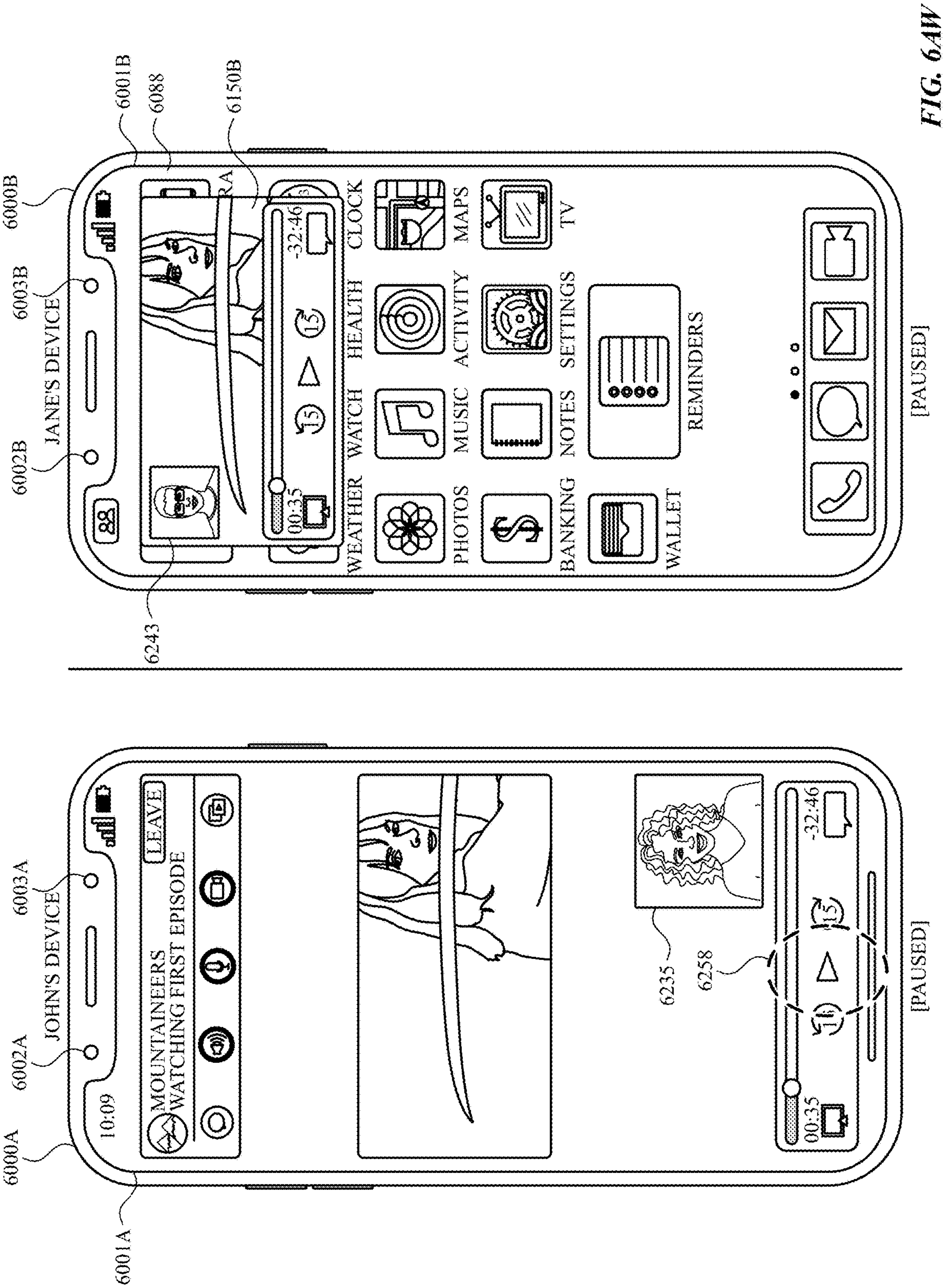
Figure 6A:
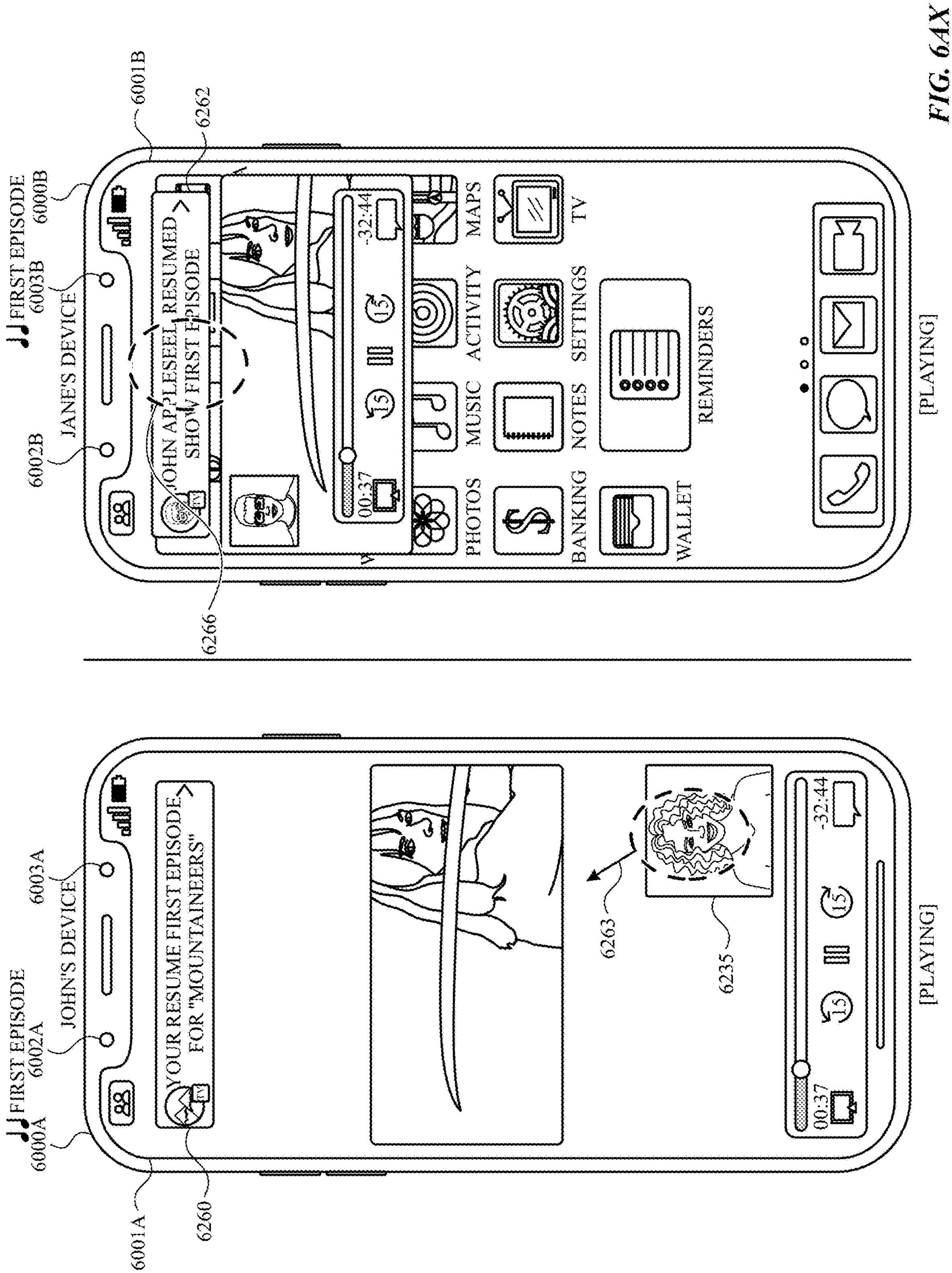
Figure 6A:
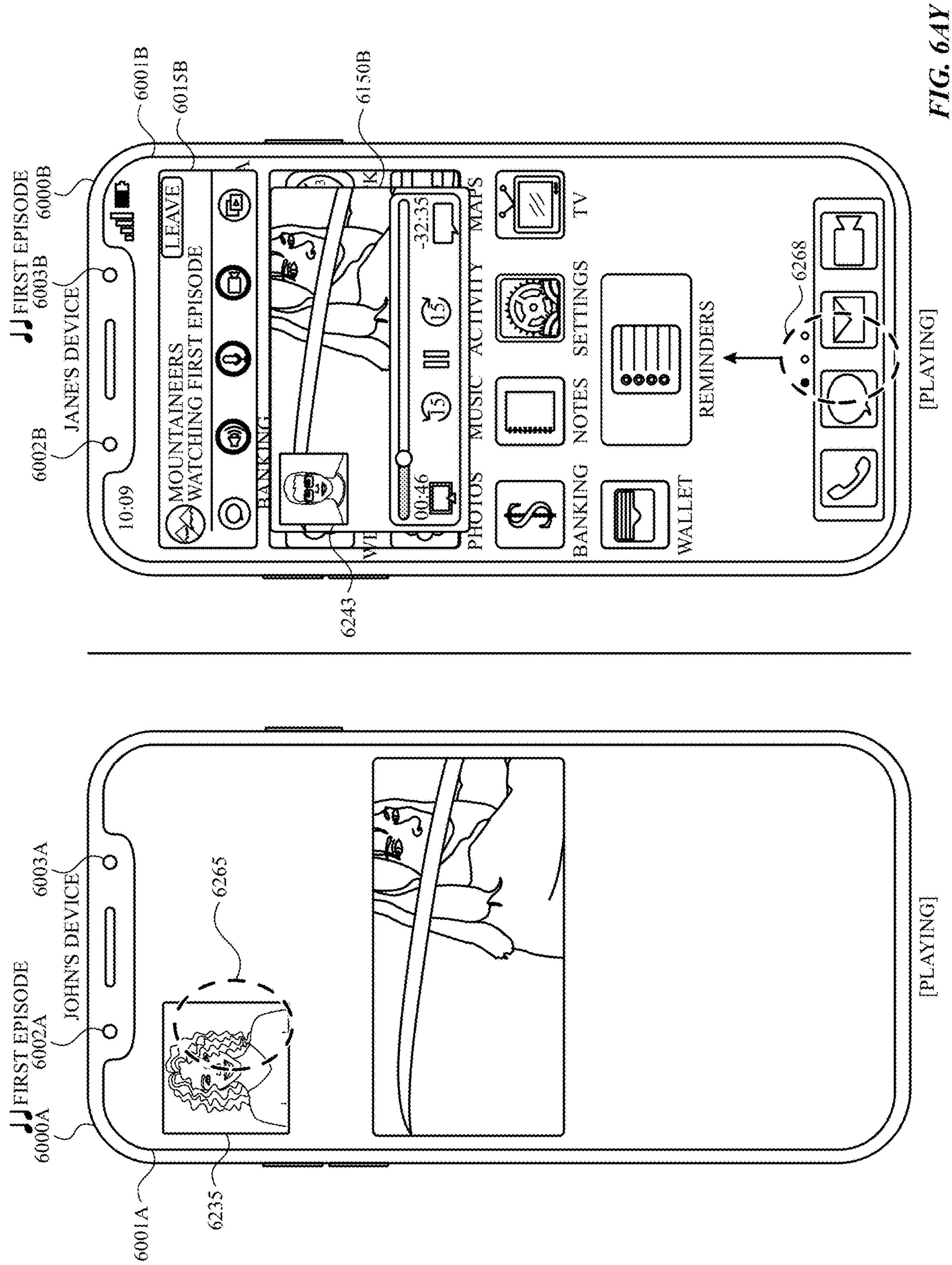
Figure 6A:
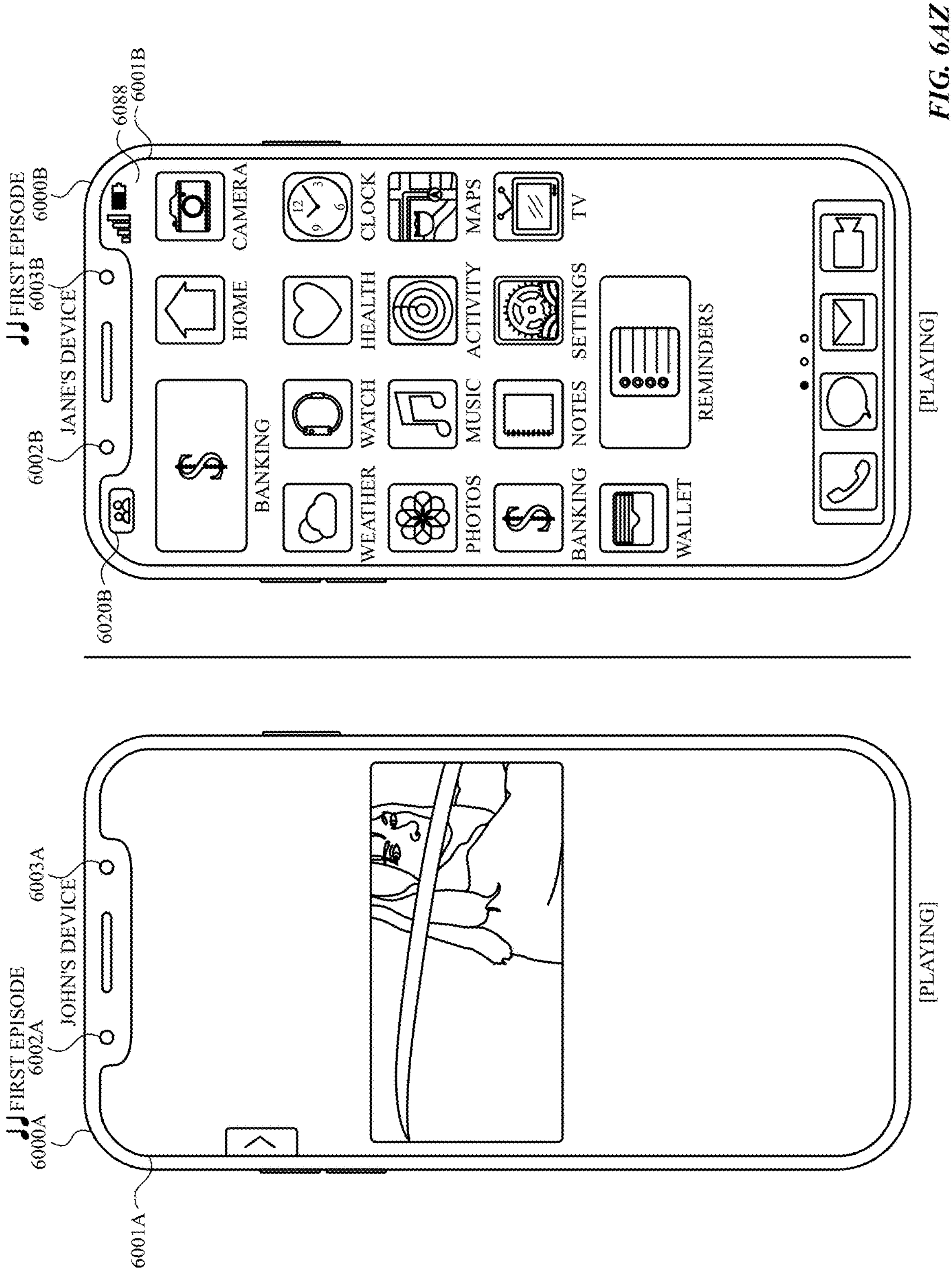
Figure 6B:
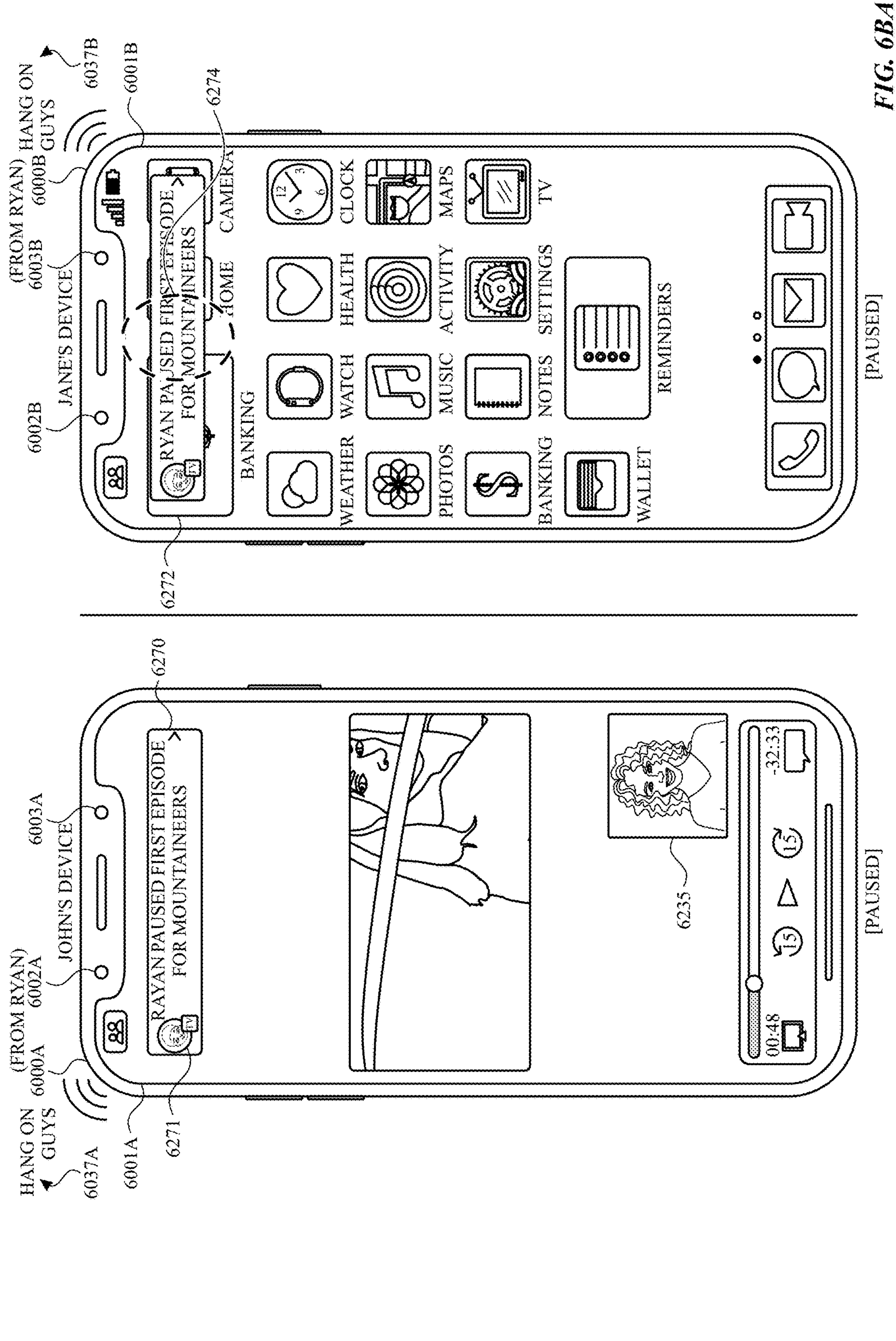
Figure 6B:
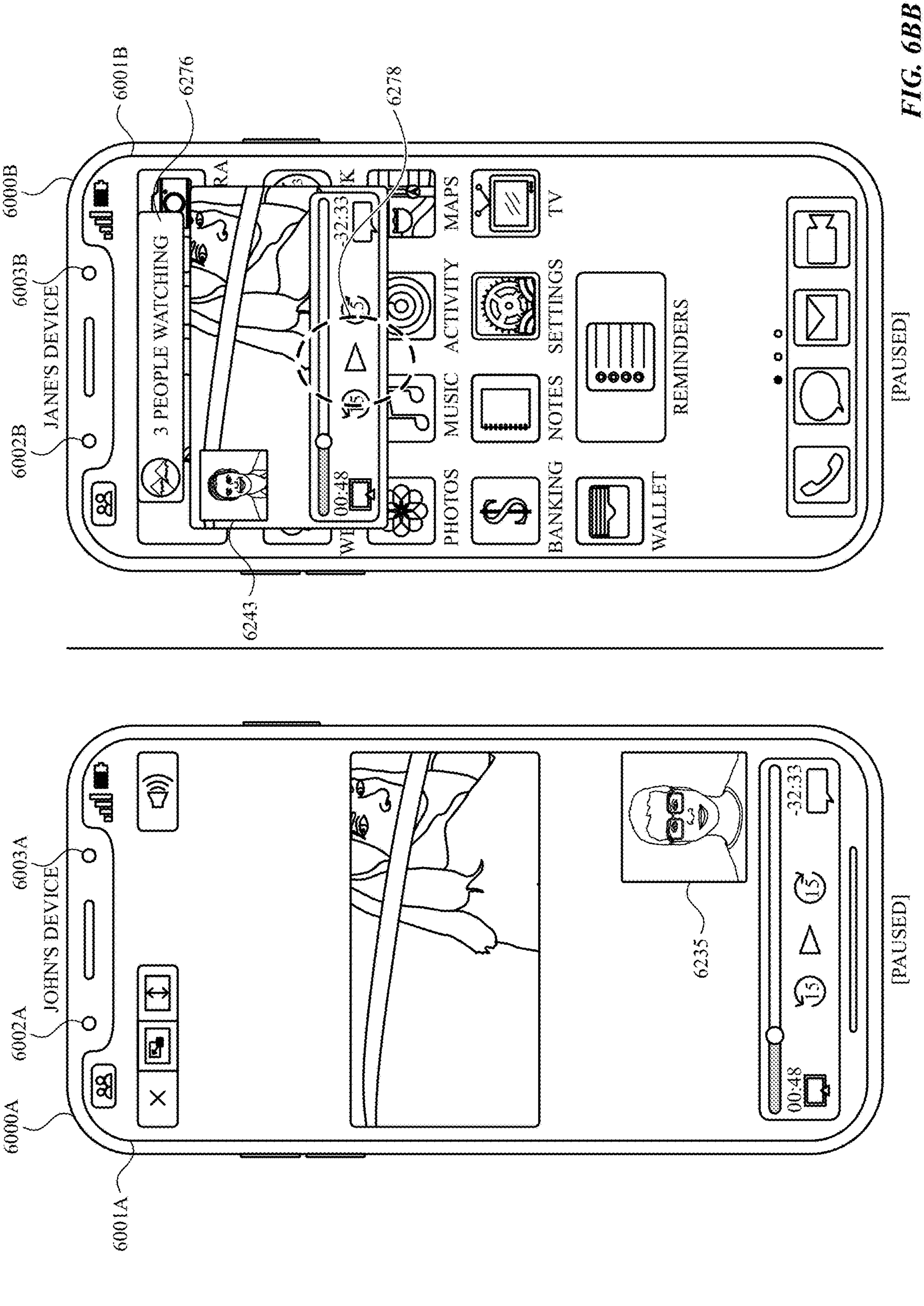
Figure 6B:
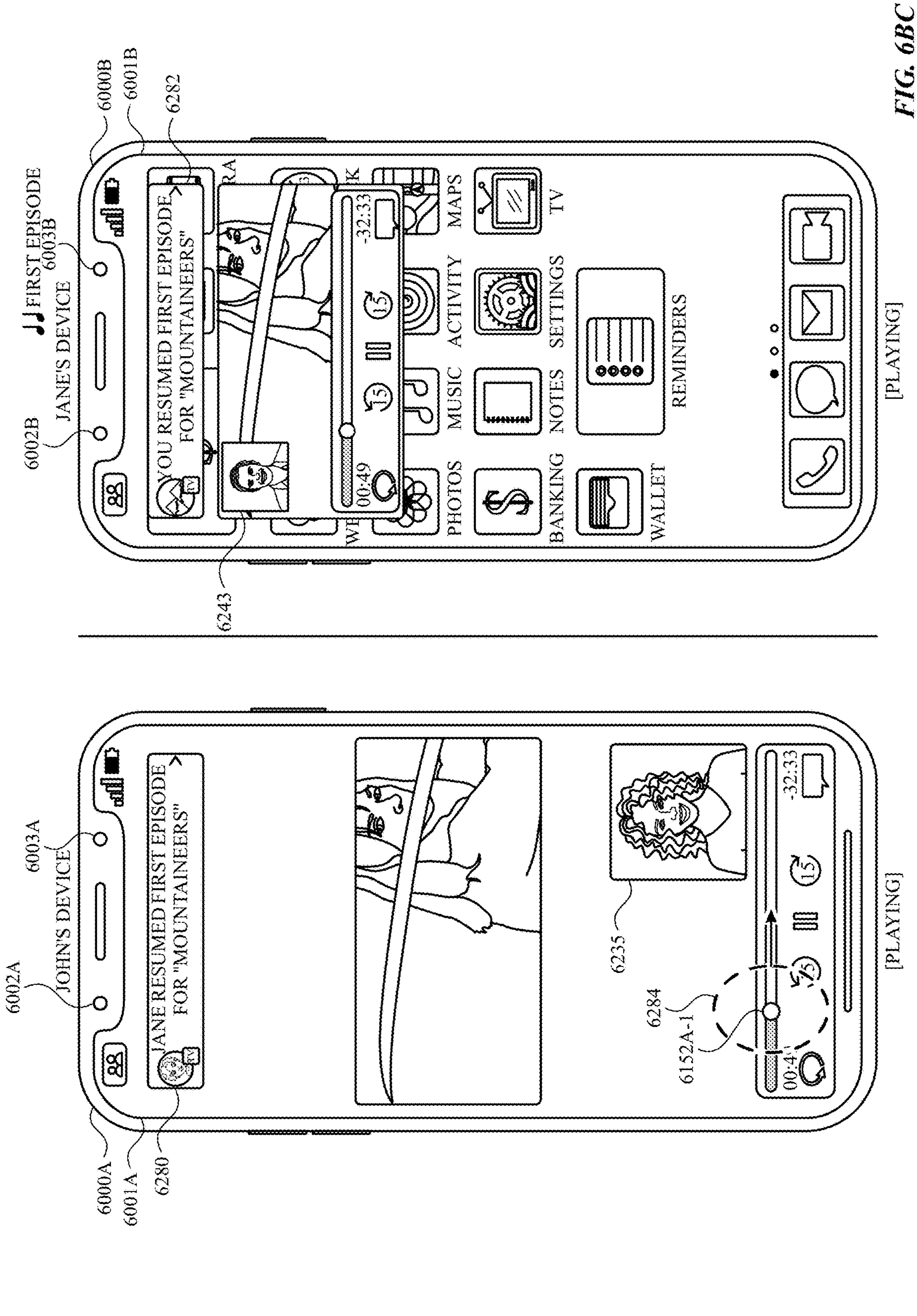
Figure 6B:
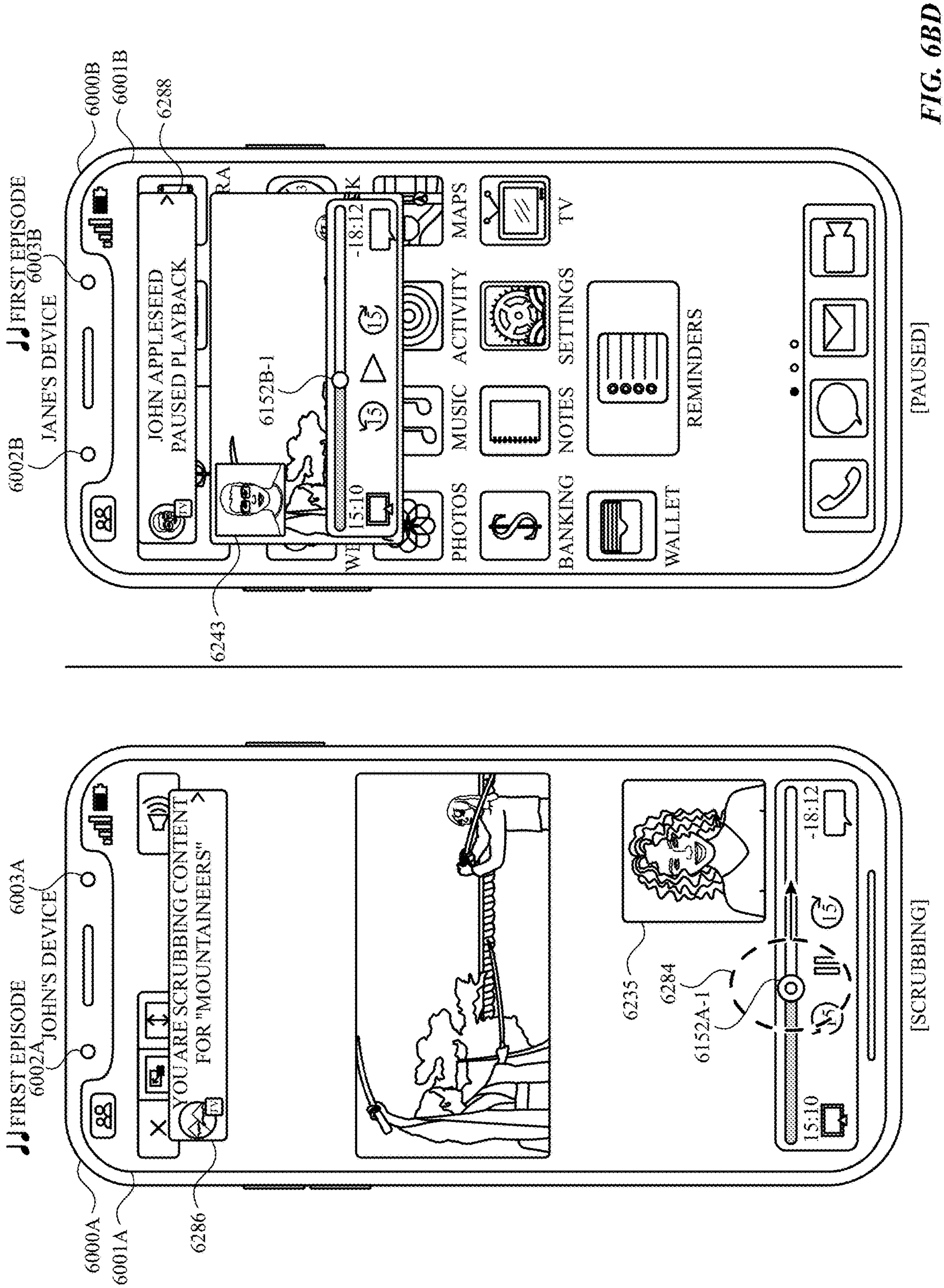
Figure 6B:
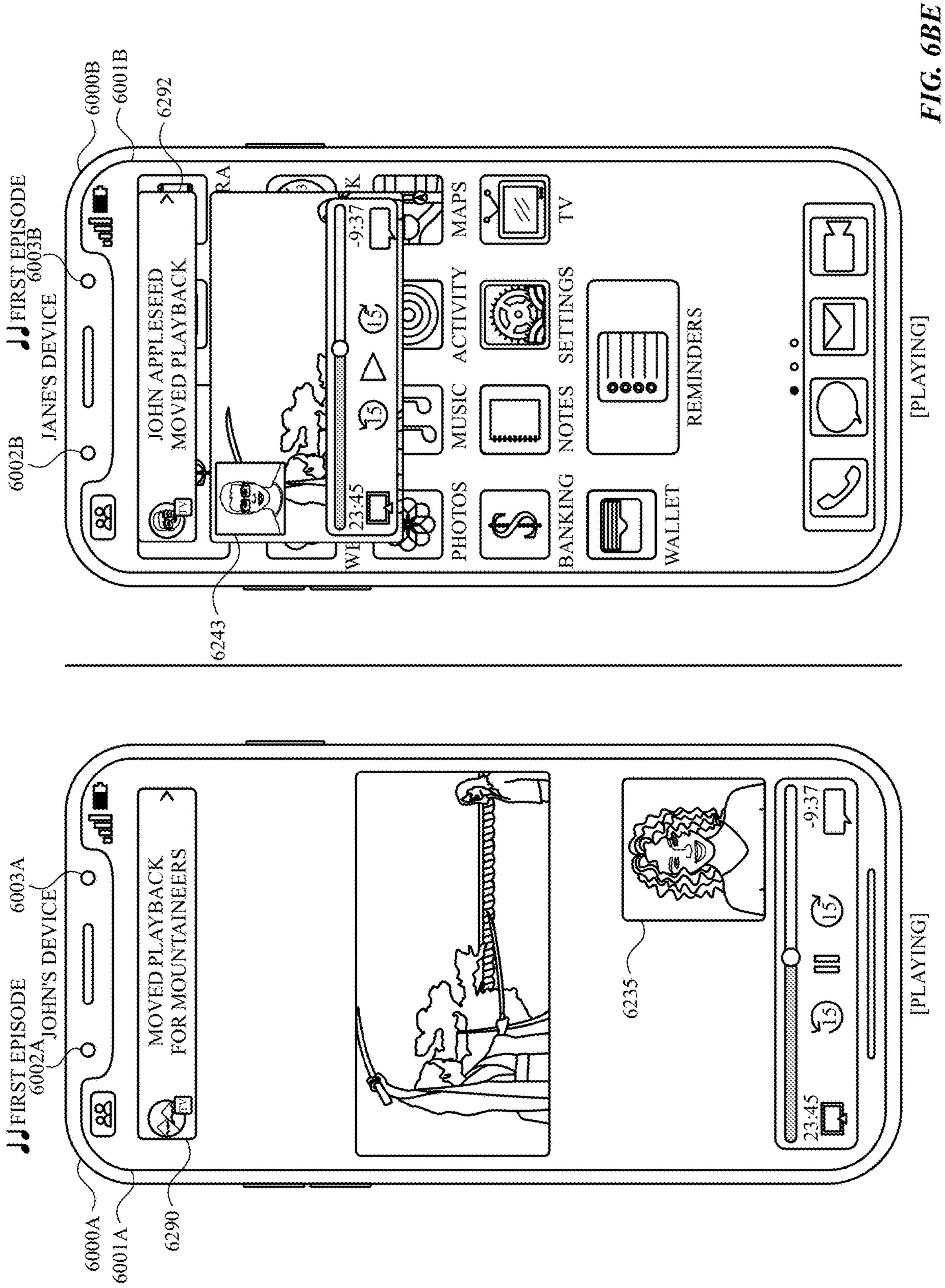
Figure 6B:
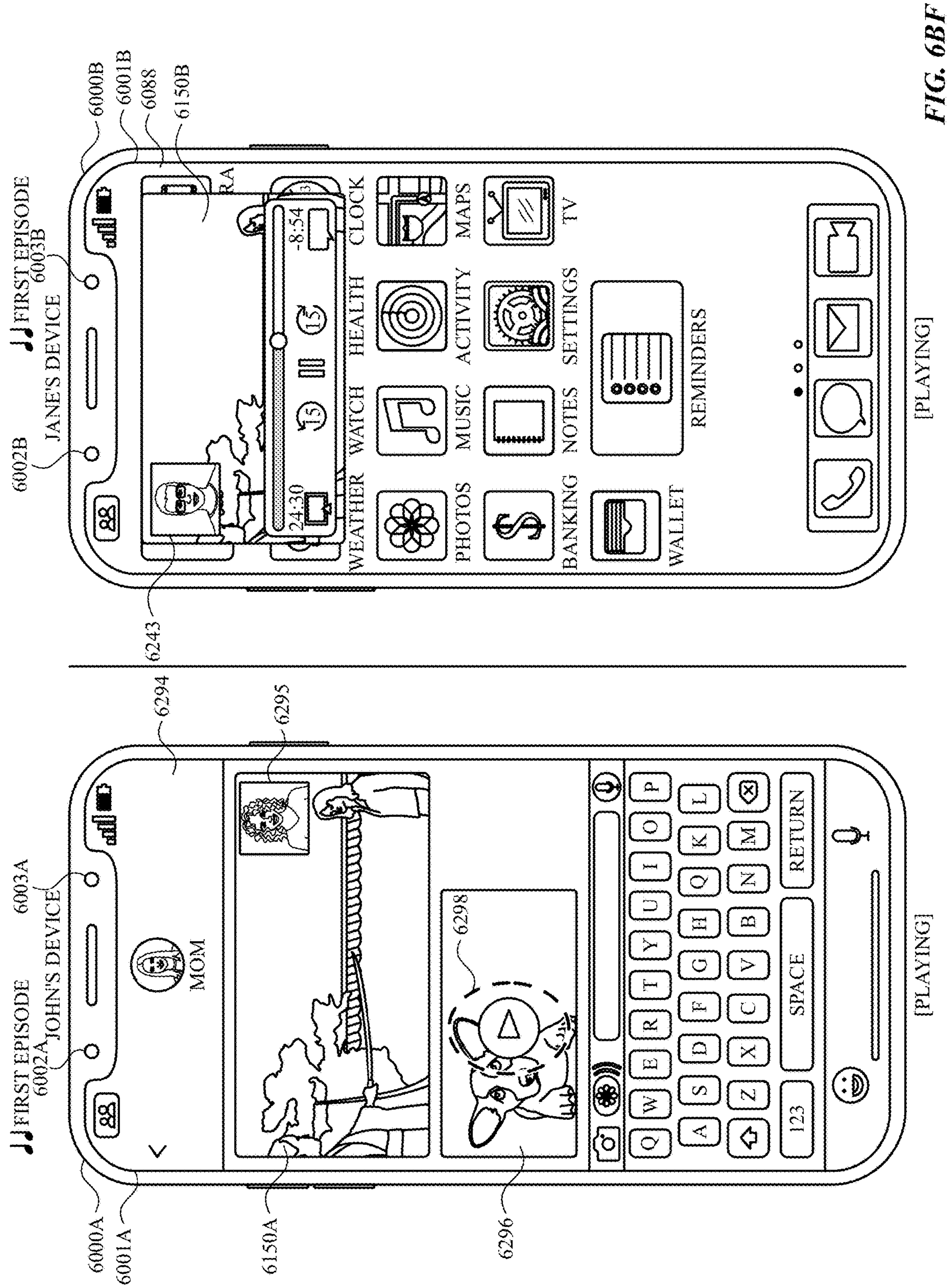
Figure 6B:
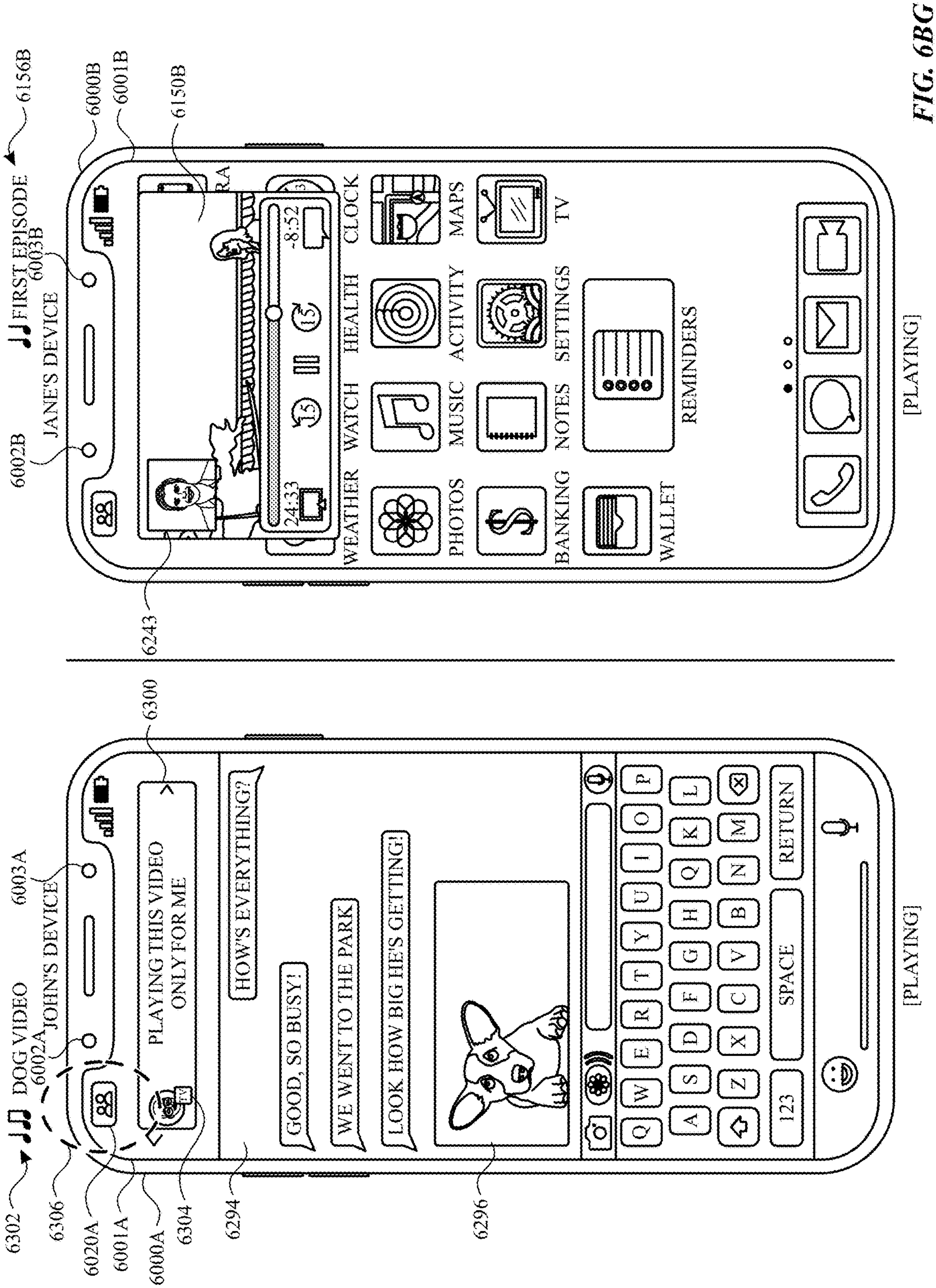
Figure 6B:
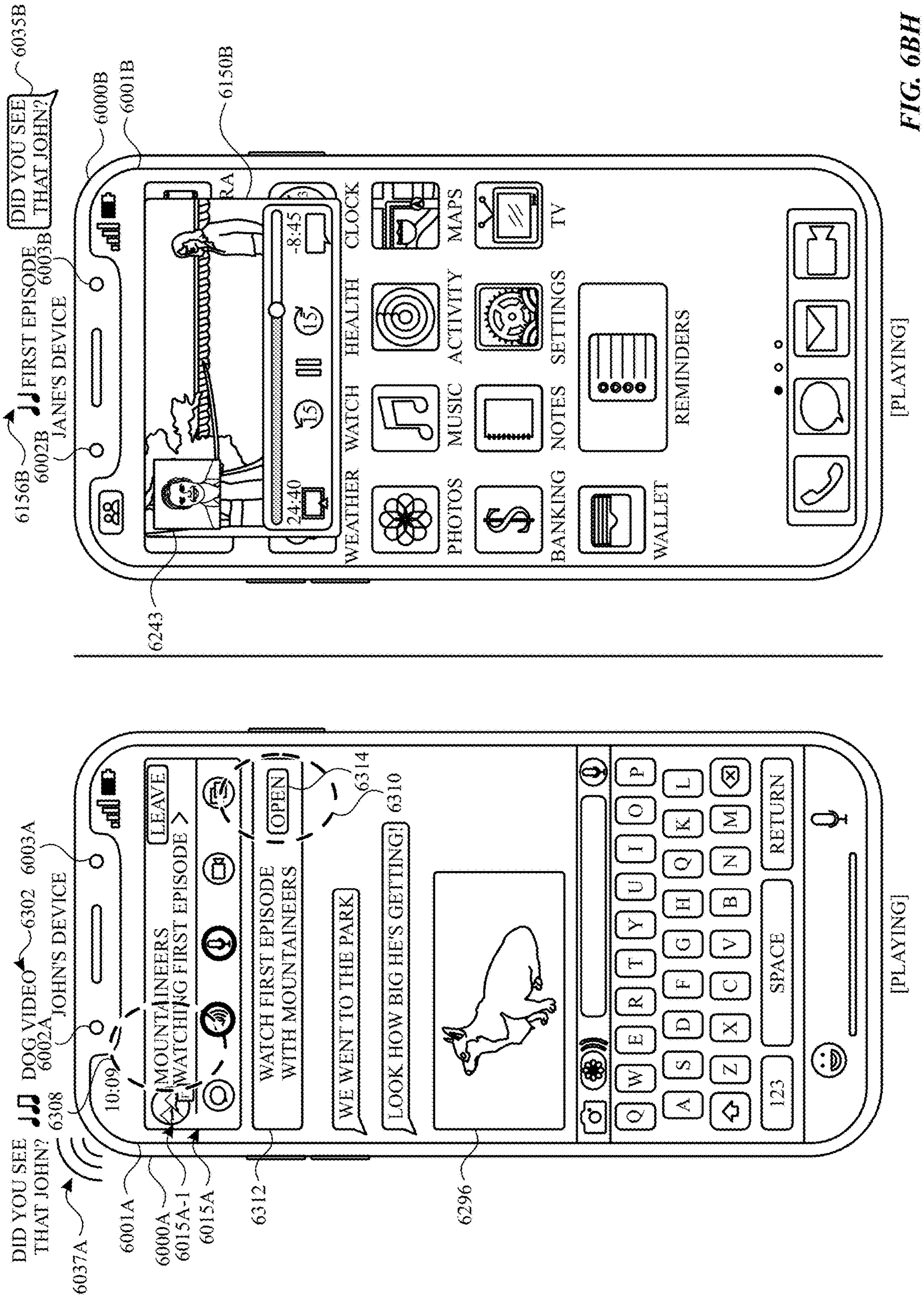
Figure 6B:
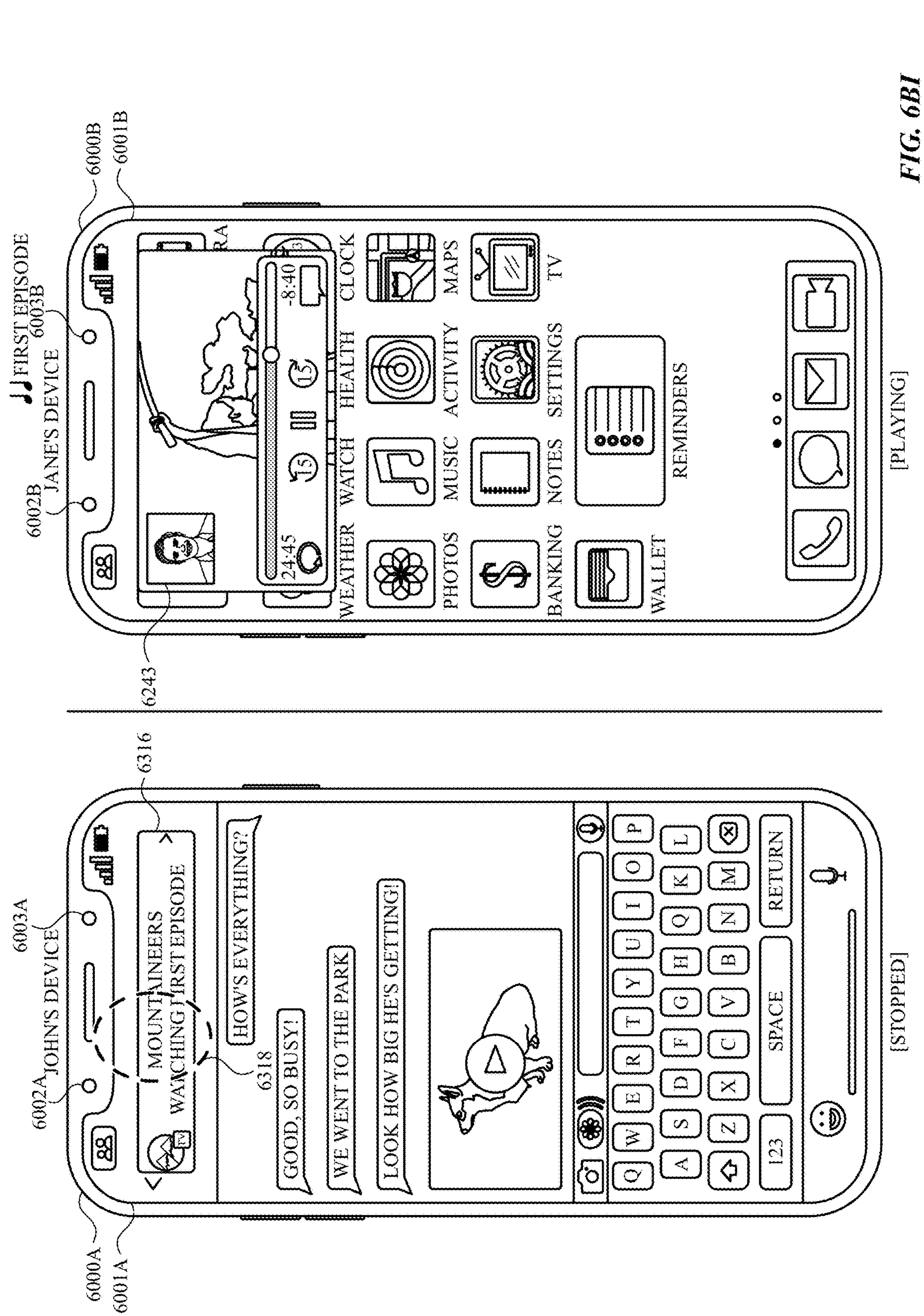
Figure 6B:
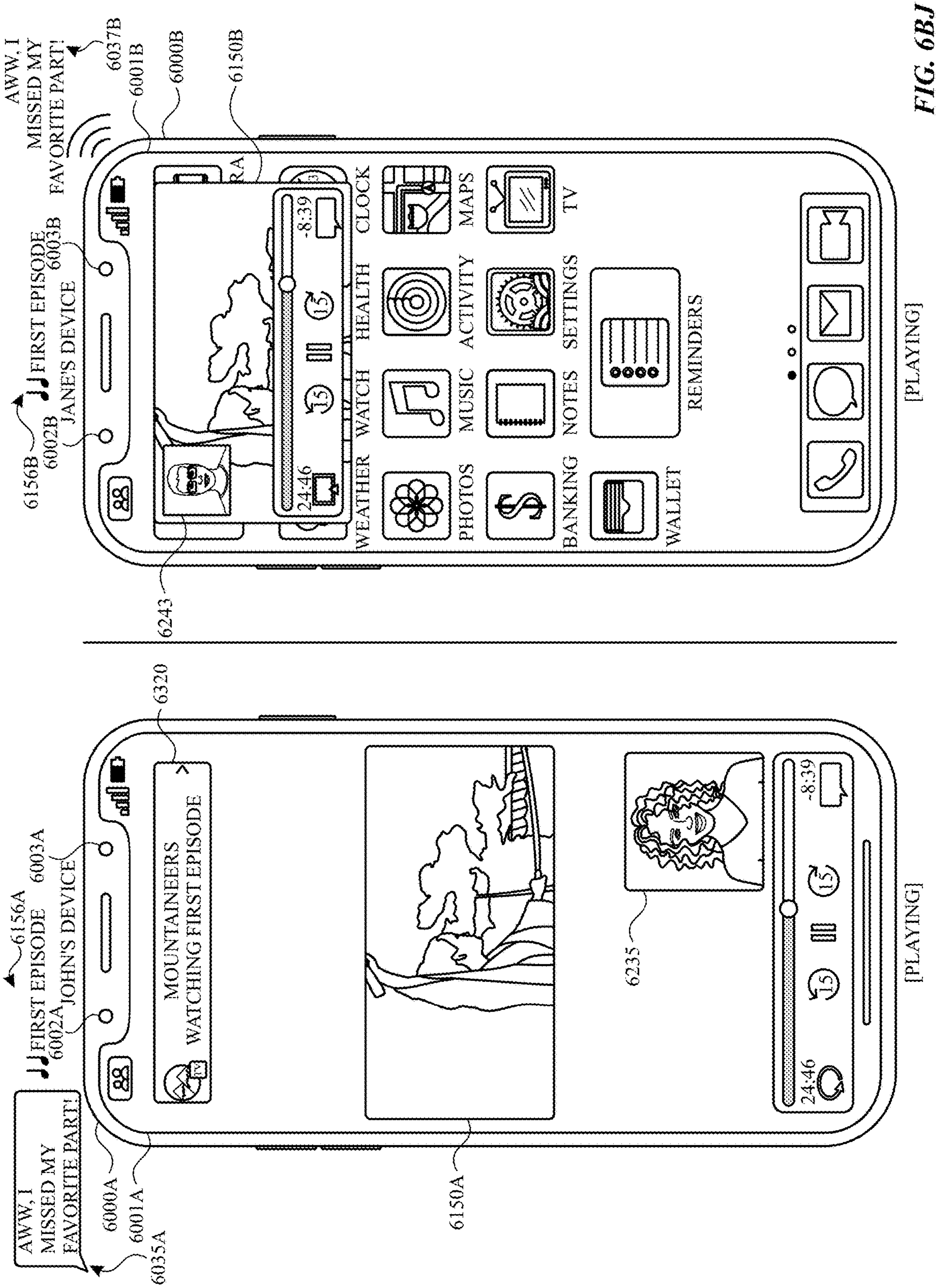
Figure 6B:
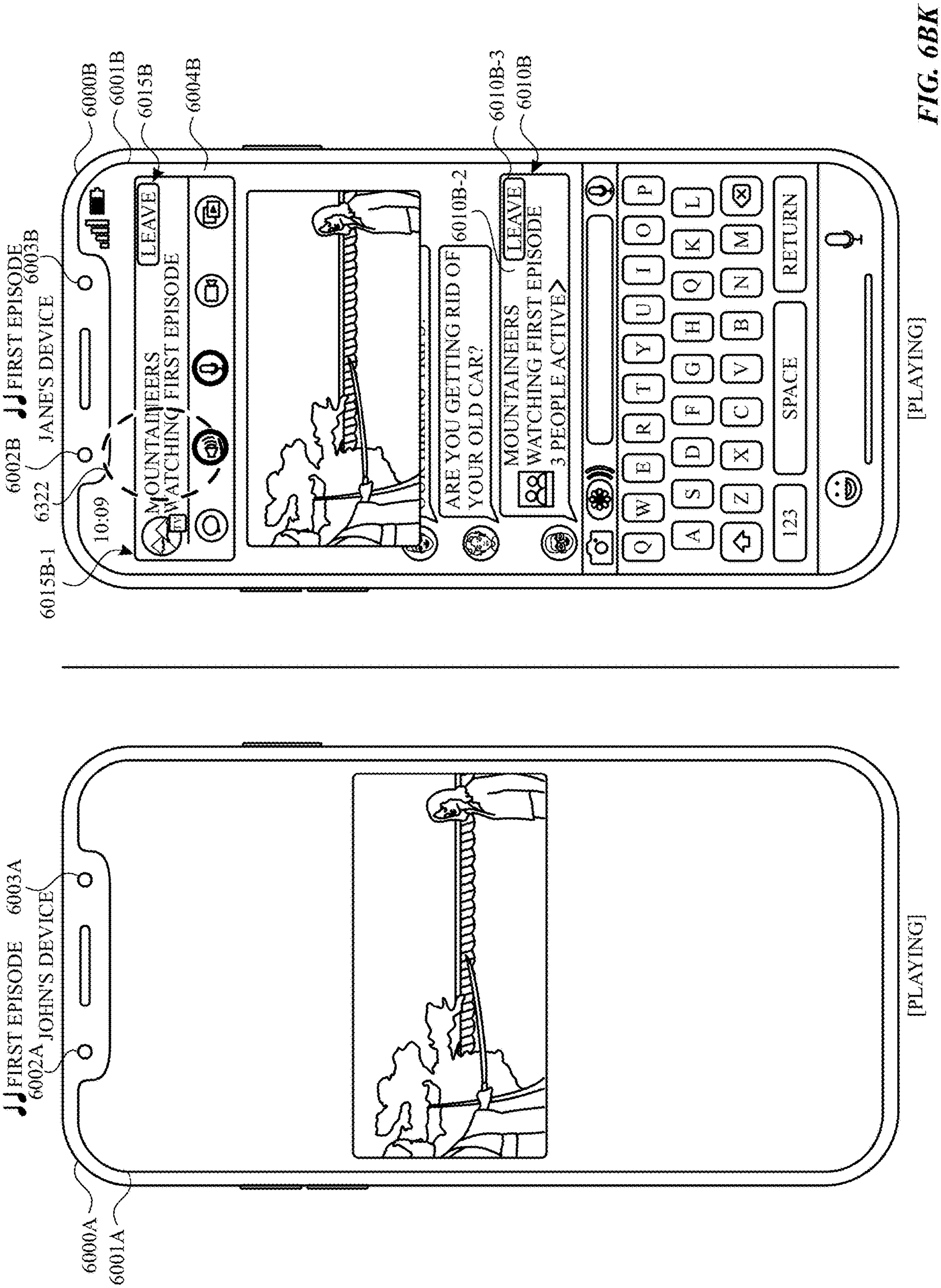
Figure 6B:
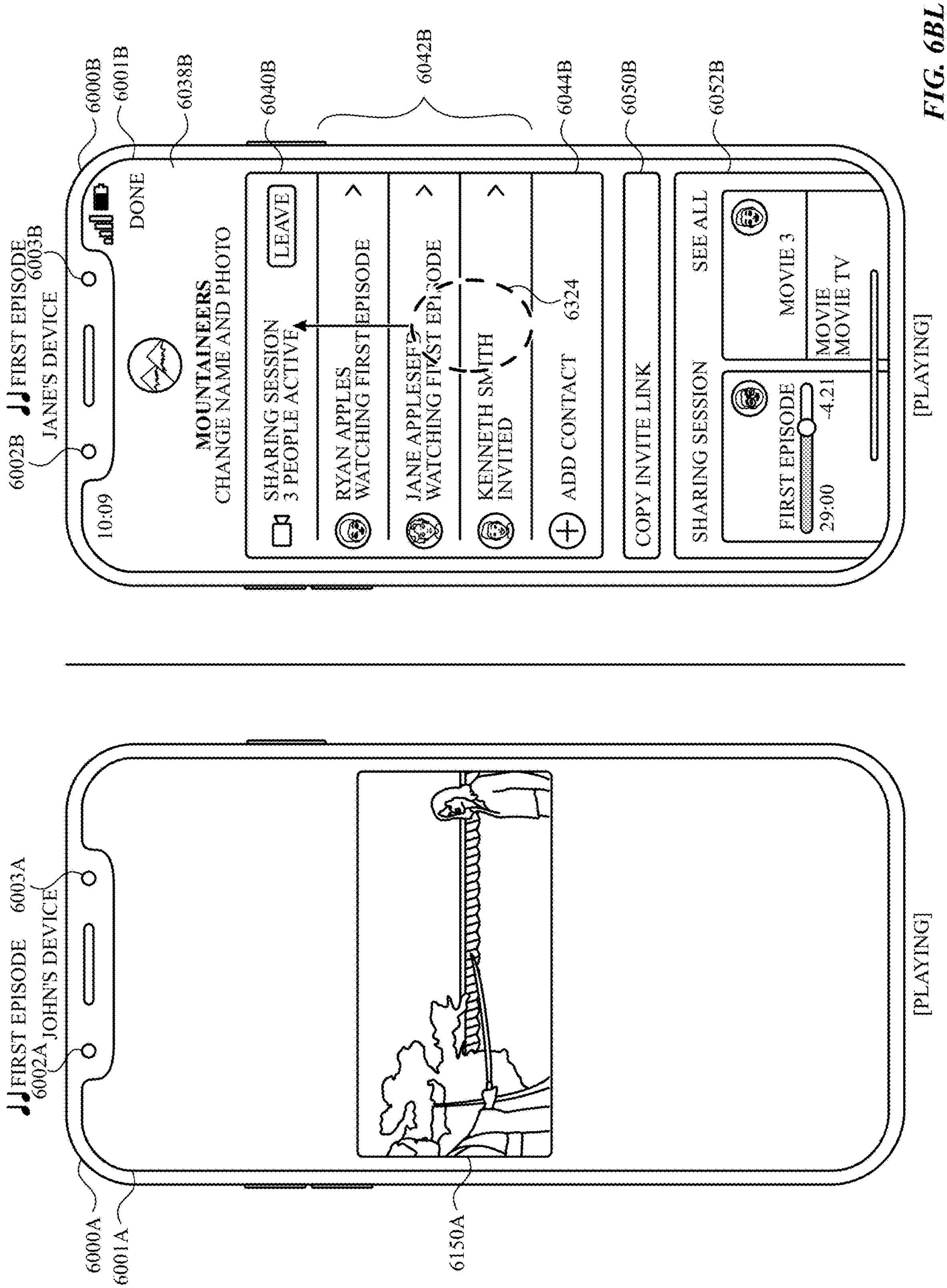
Figure 6B:
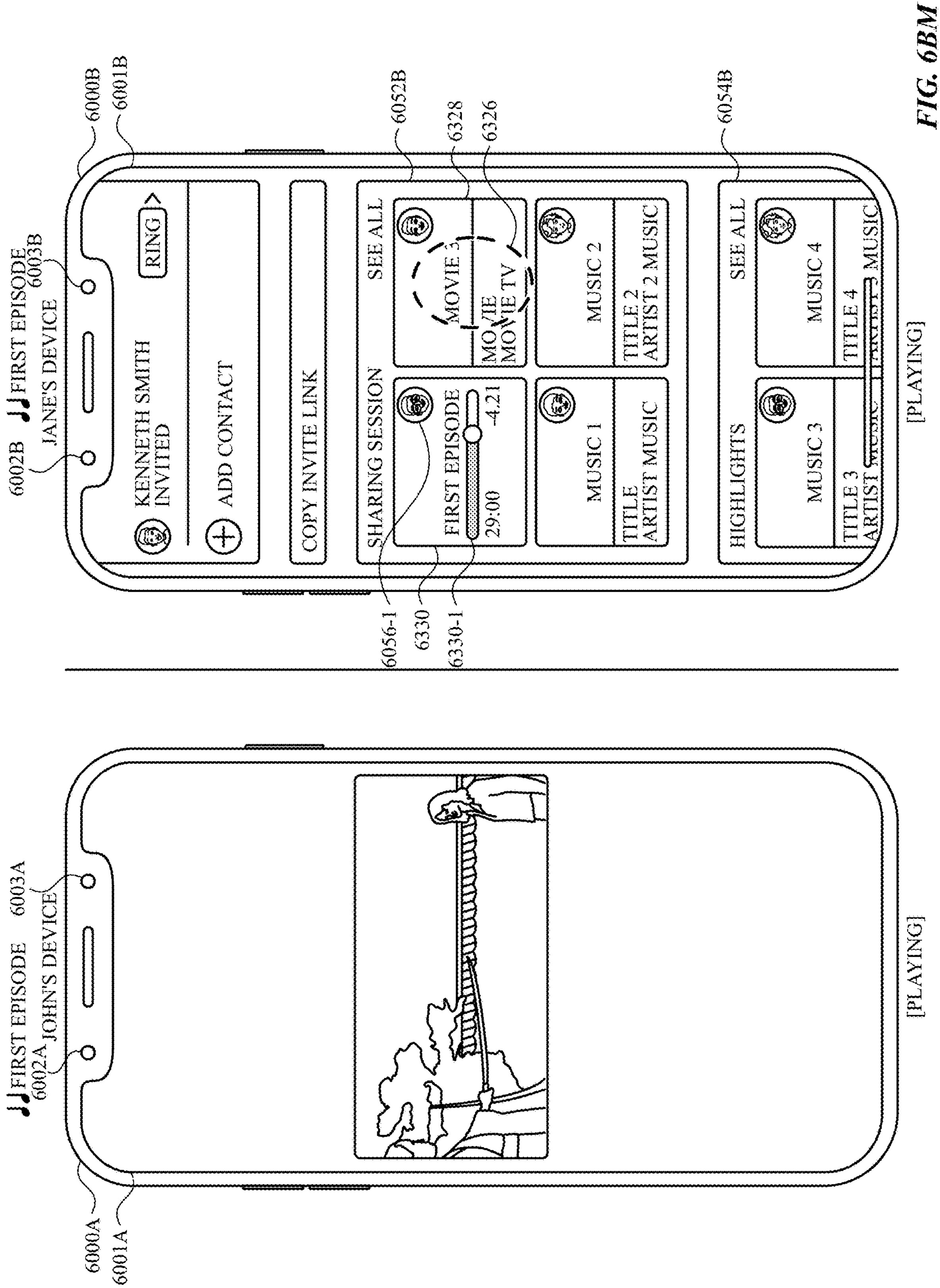
Figure 6B:
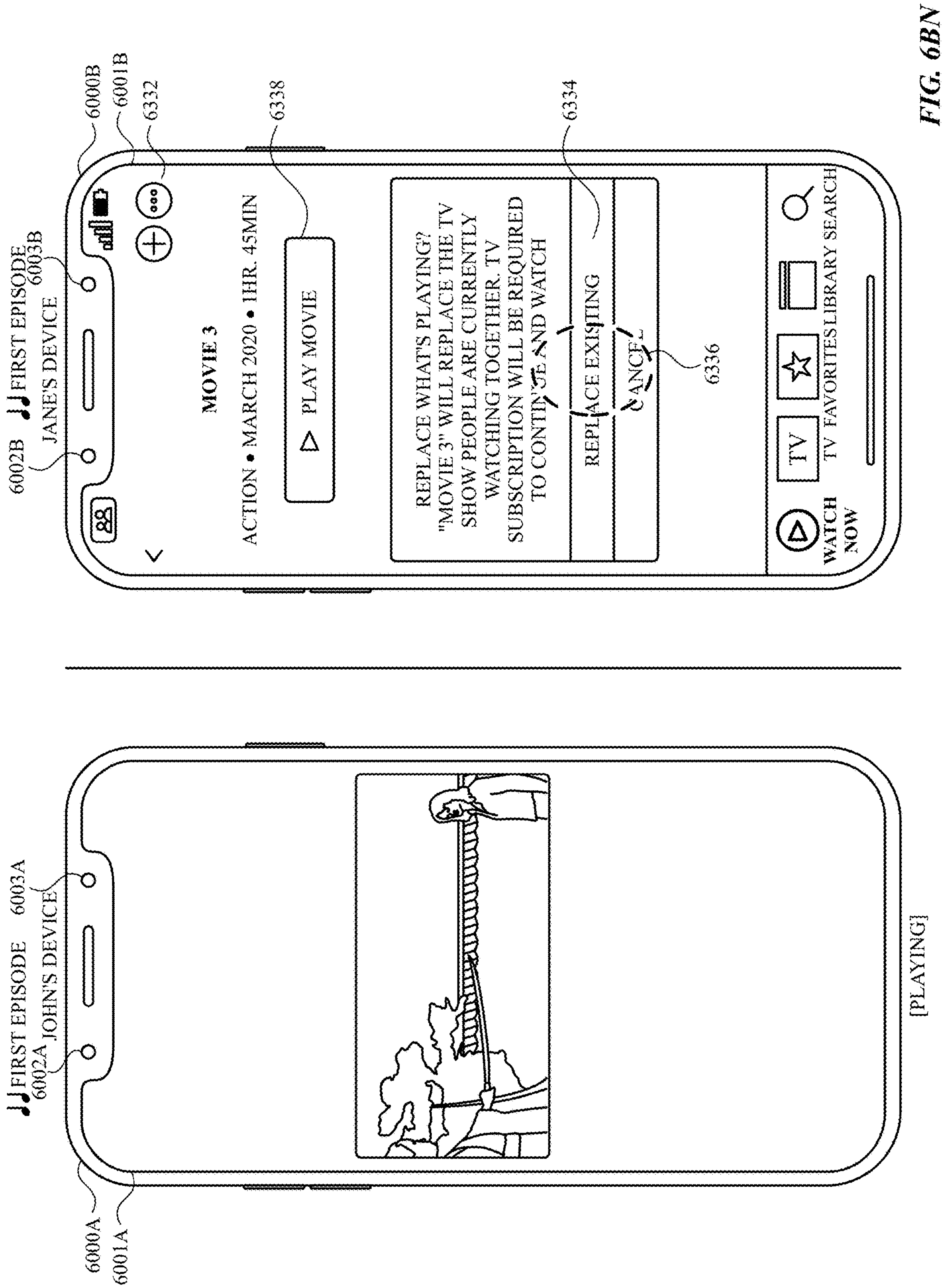
Figure 6B:
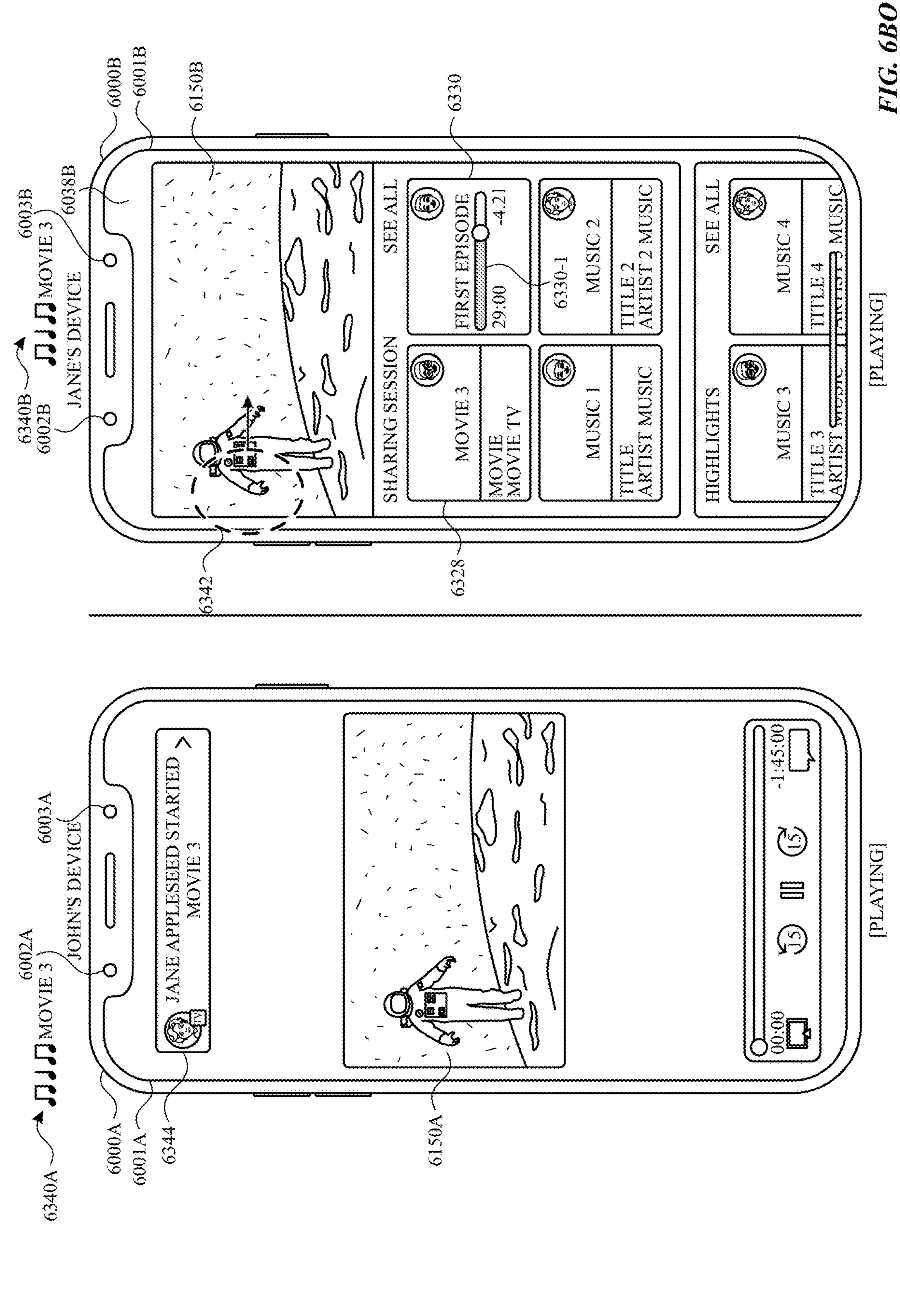
Figure 6B:
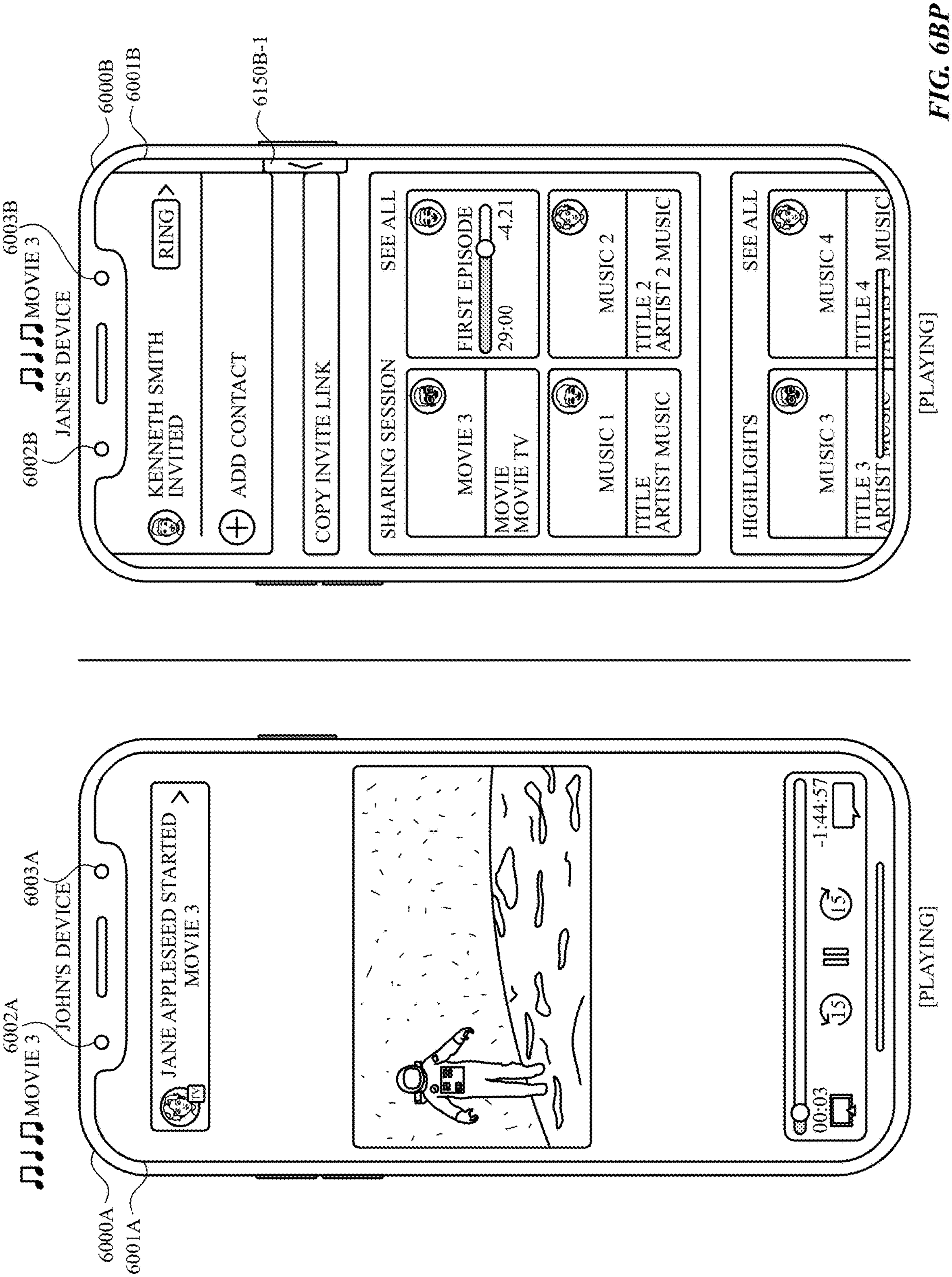
Figure 6B:
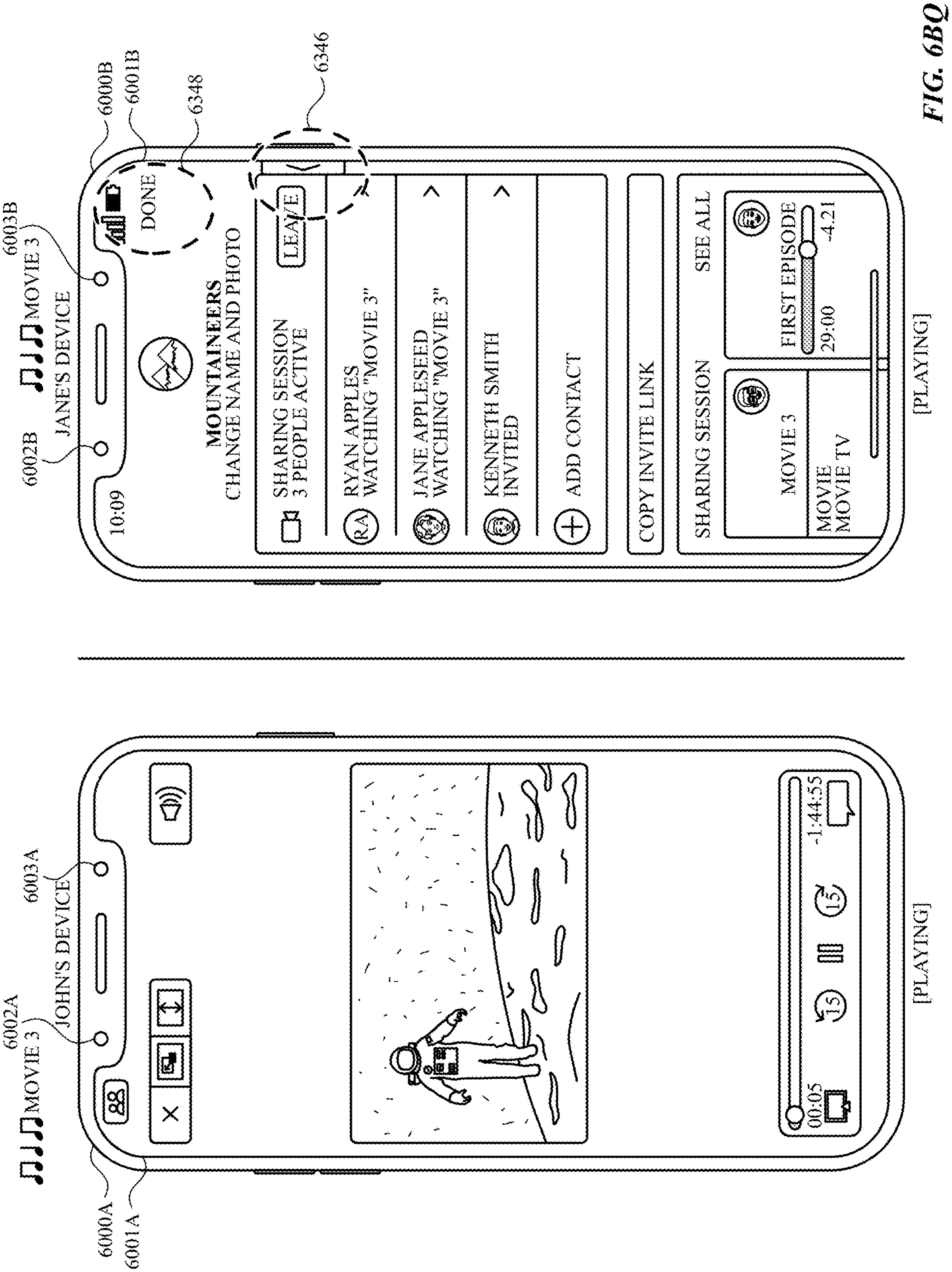
Figure 6B:
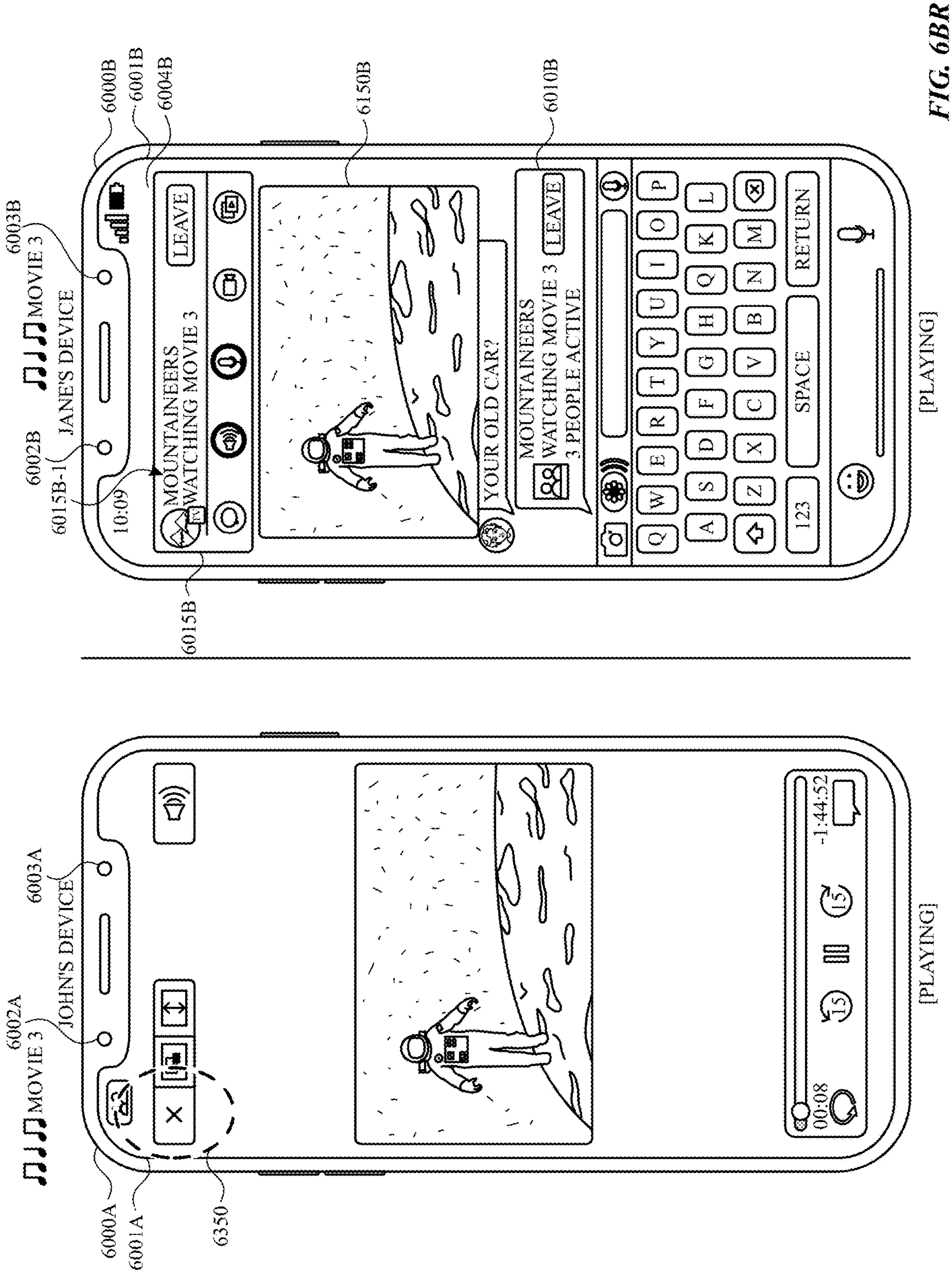
Figure 6B:
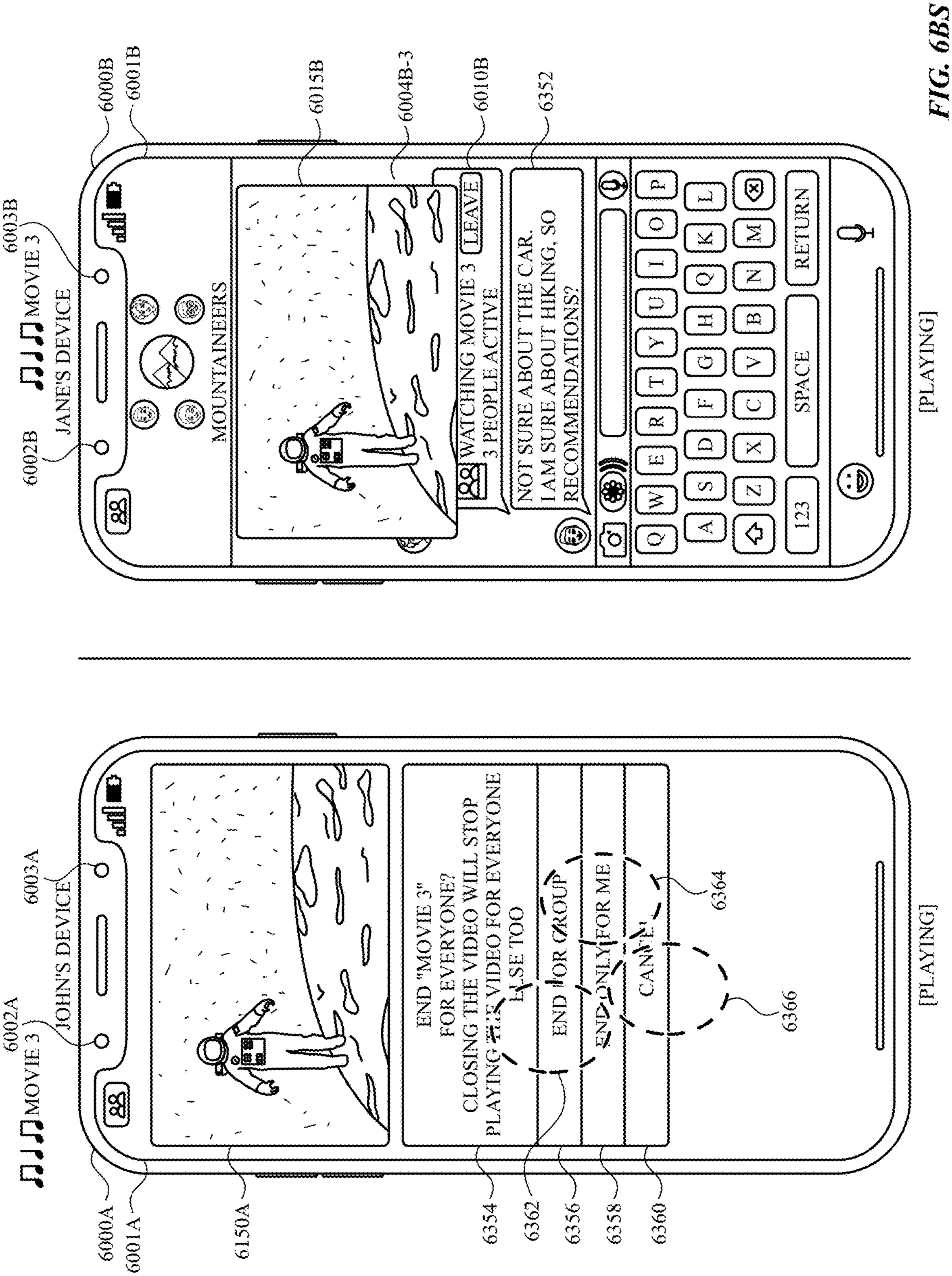
Figure 6B:
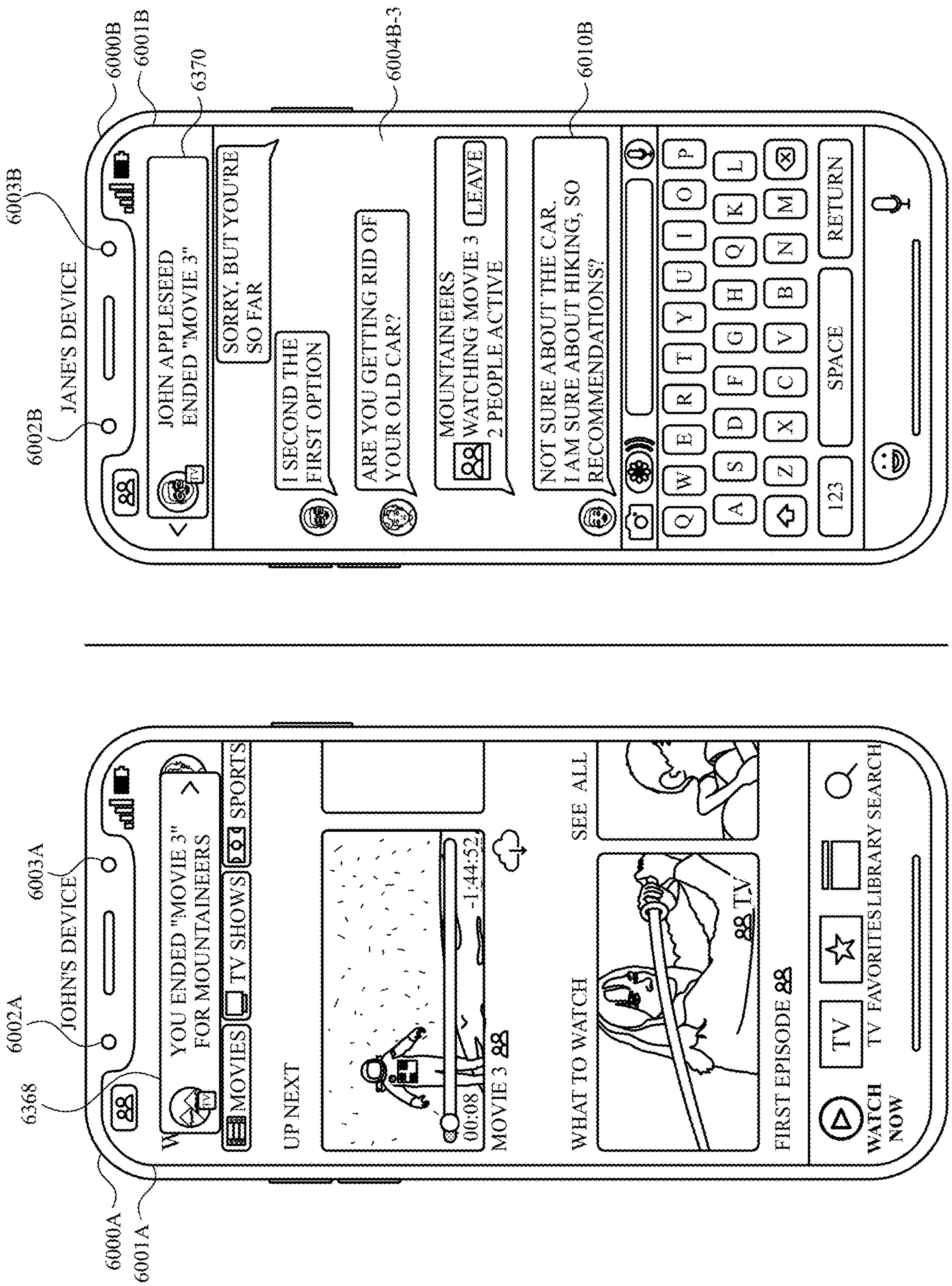
Figure 6B:
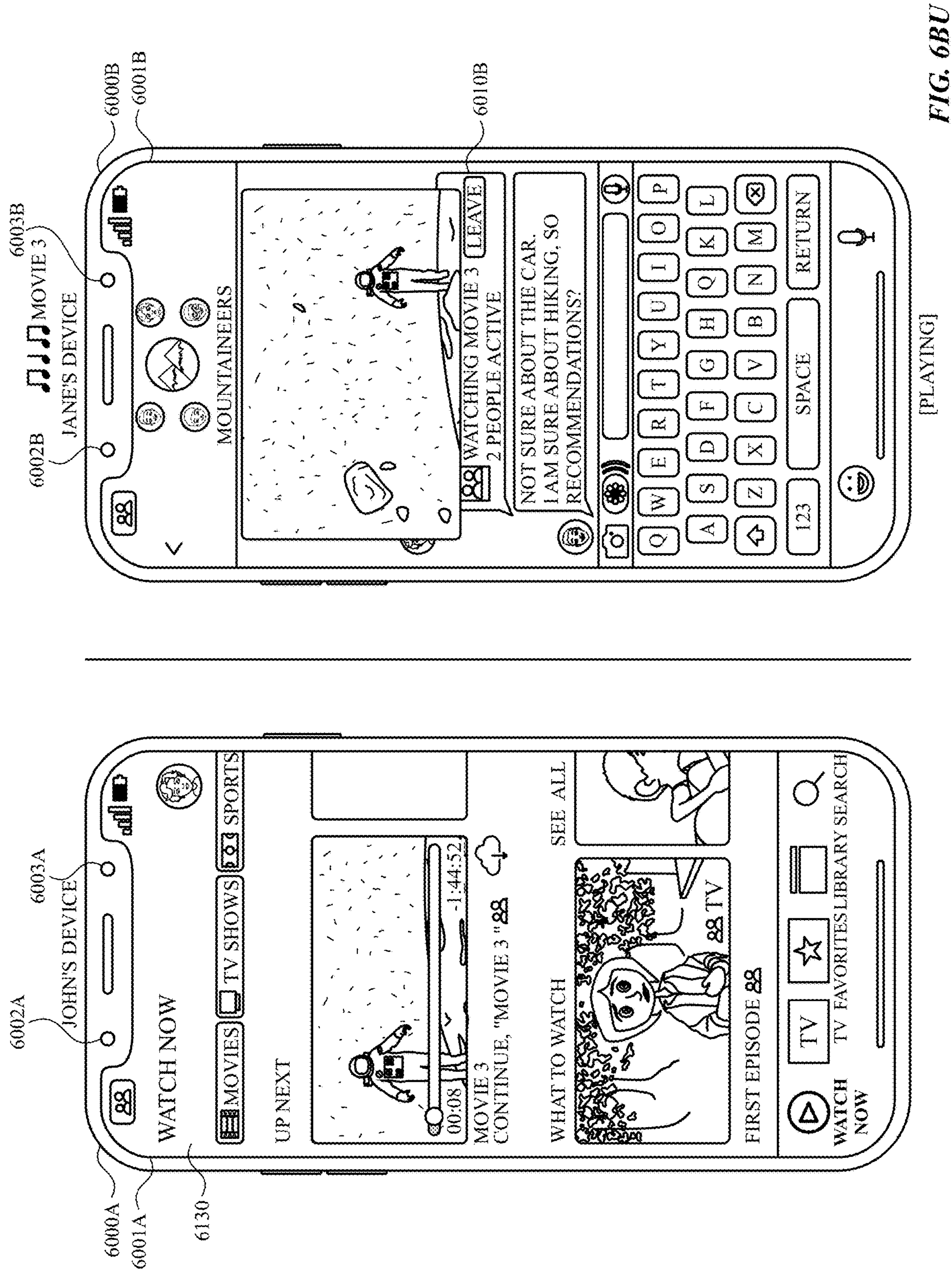
Figure 6B:
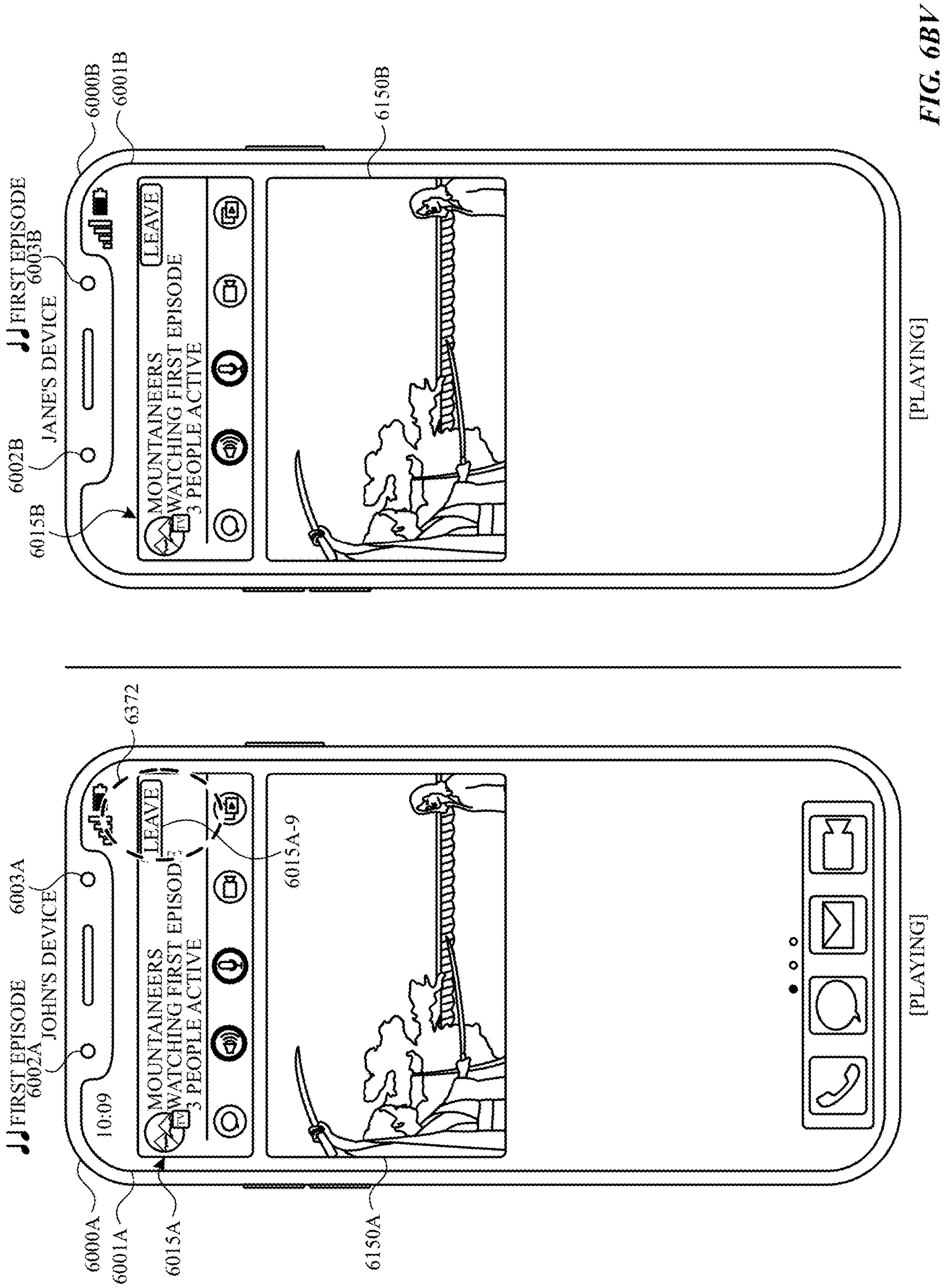
Figure 6B:
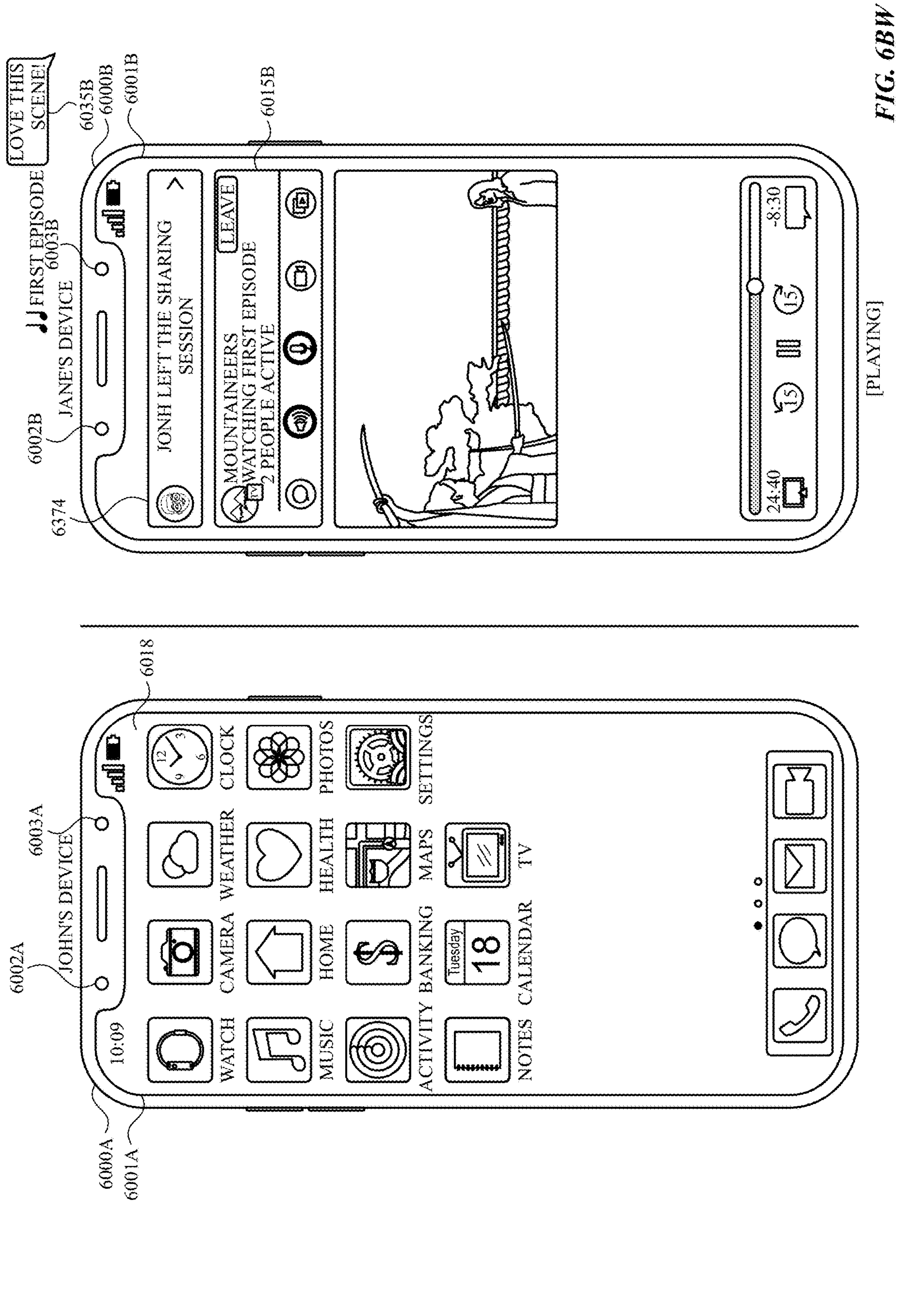
Figure 6B:
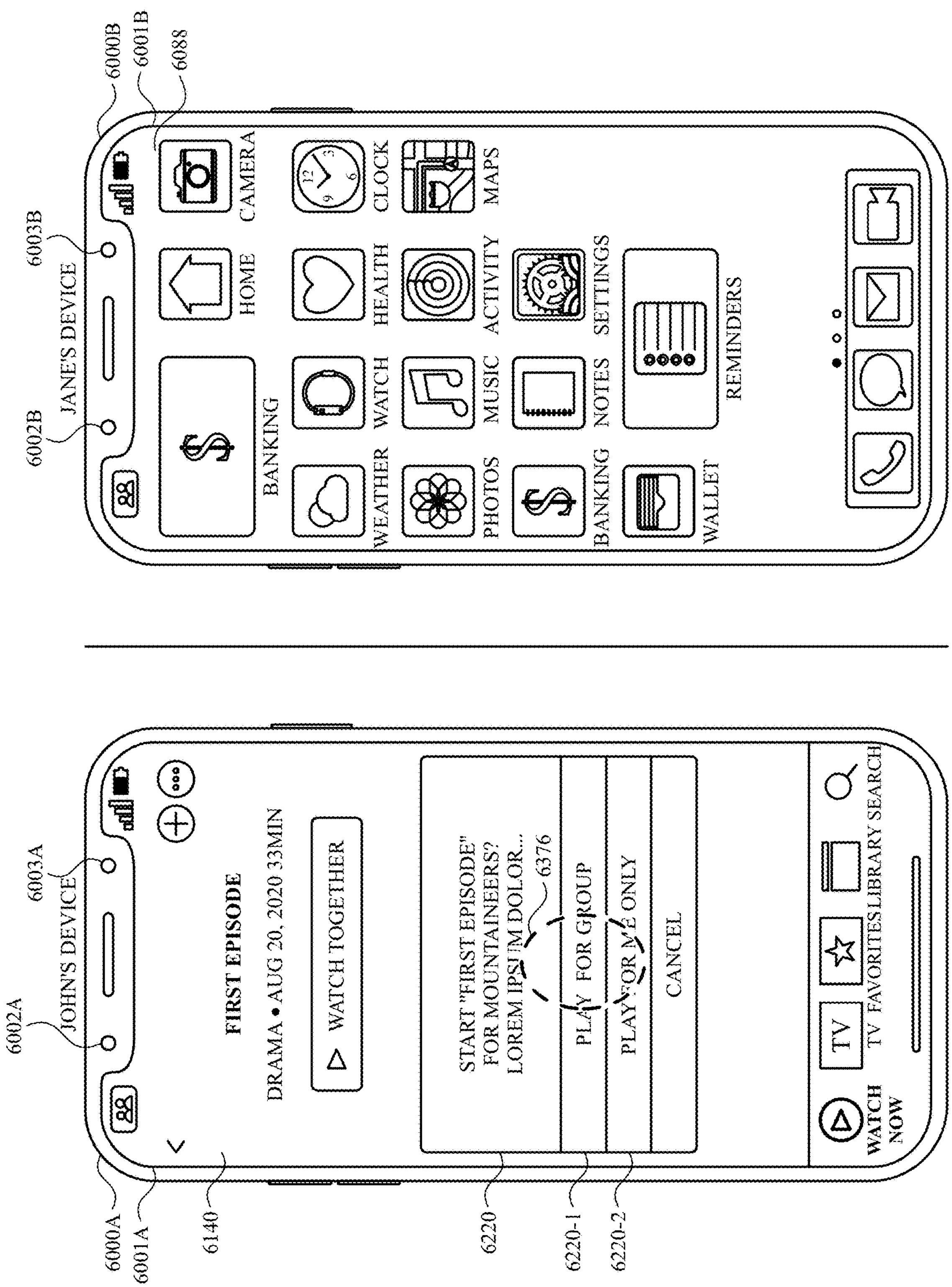
Figure 6B:
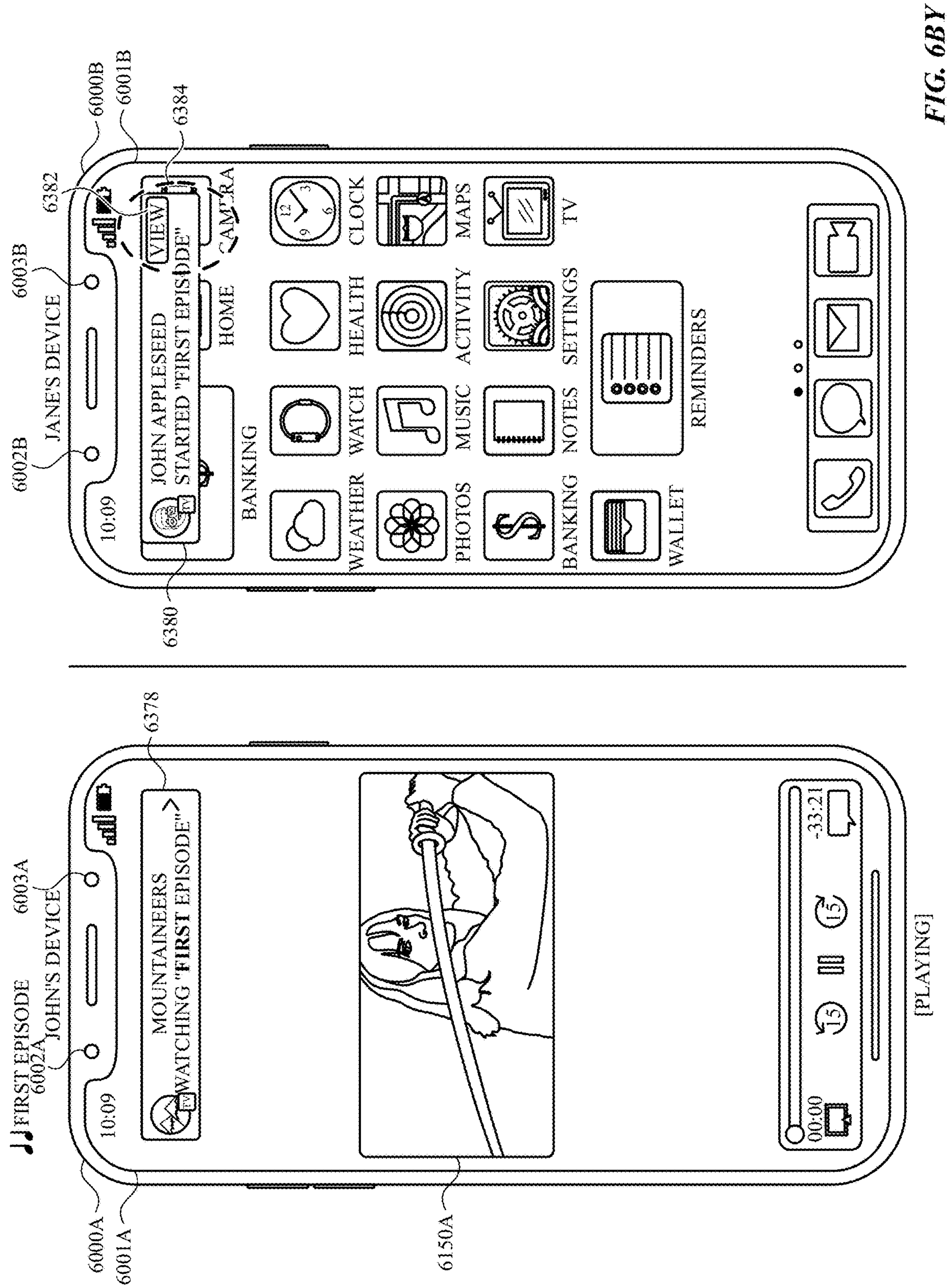
Figure 6B:
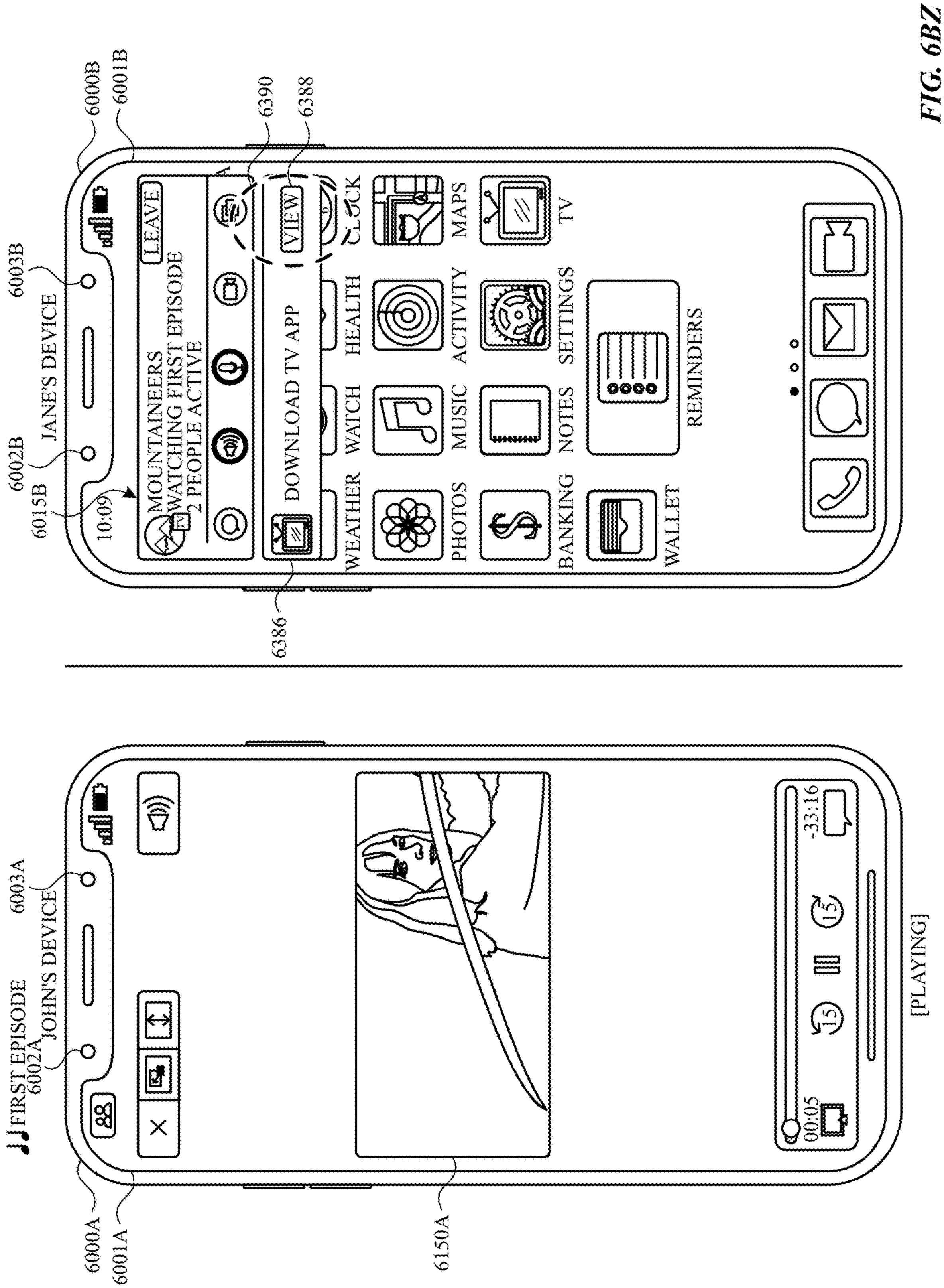
Figure 6C:
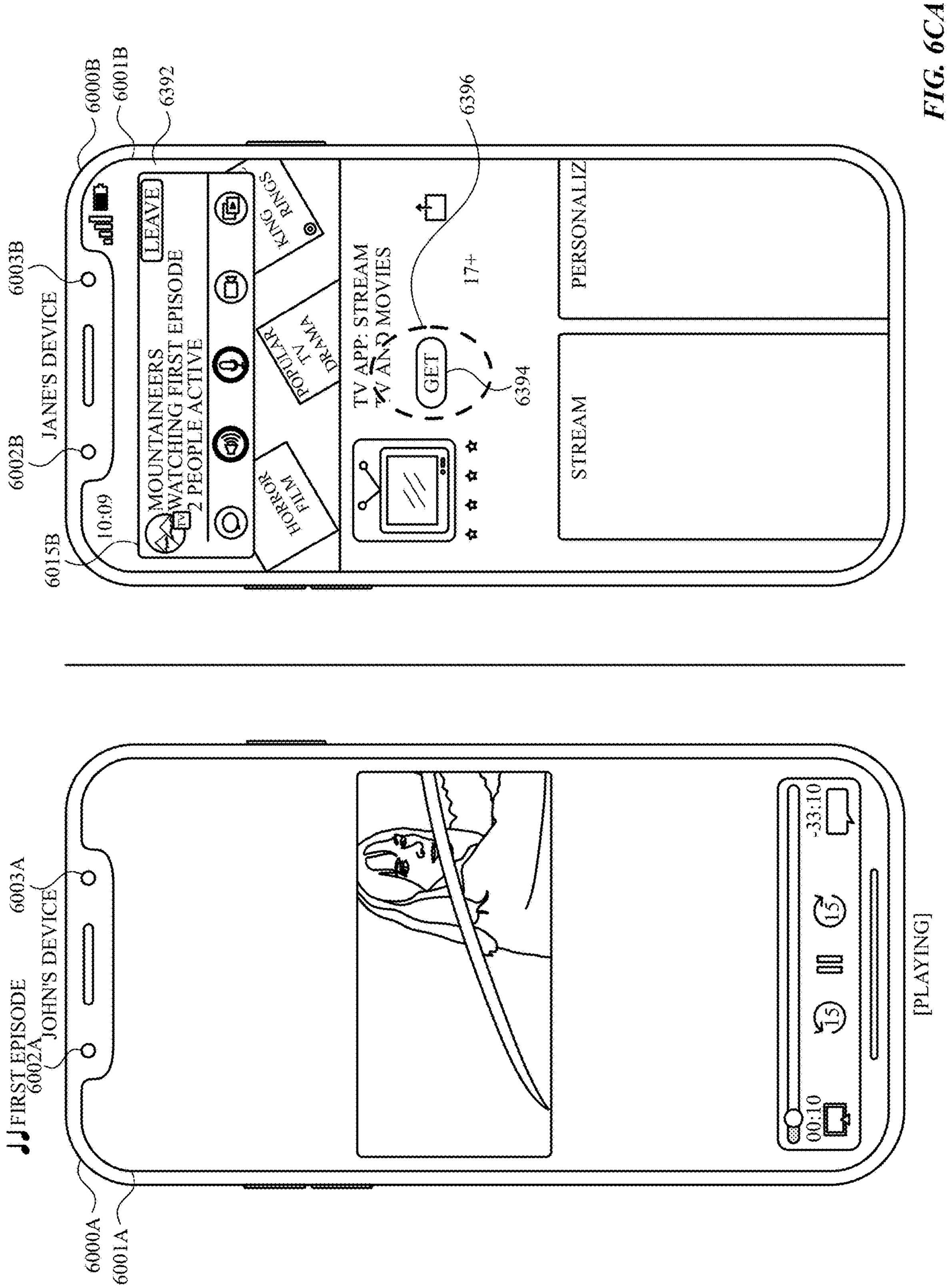
Figure 6C:
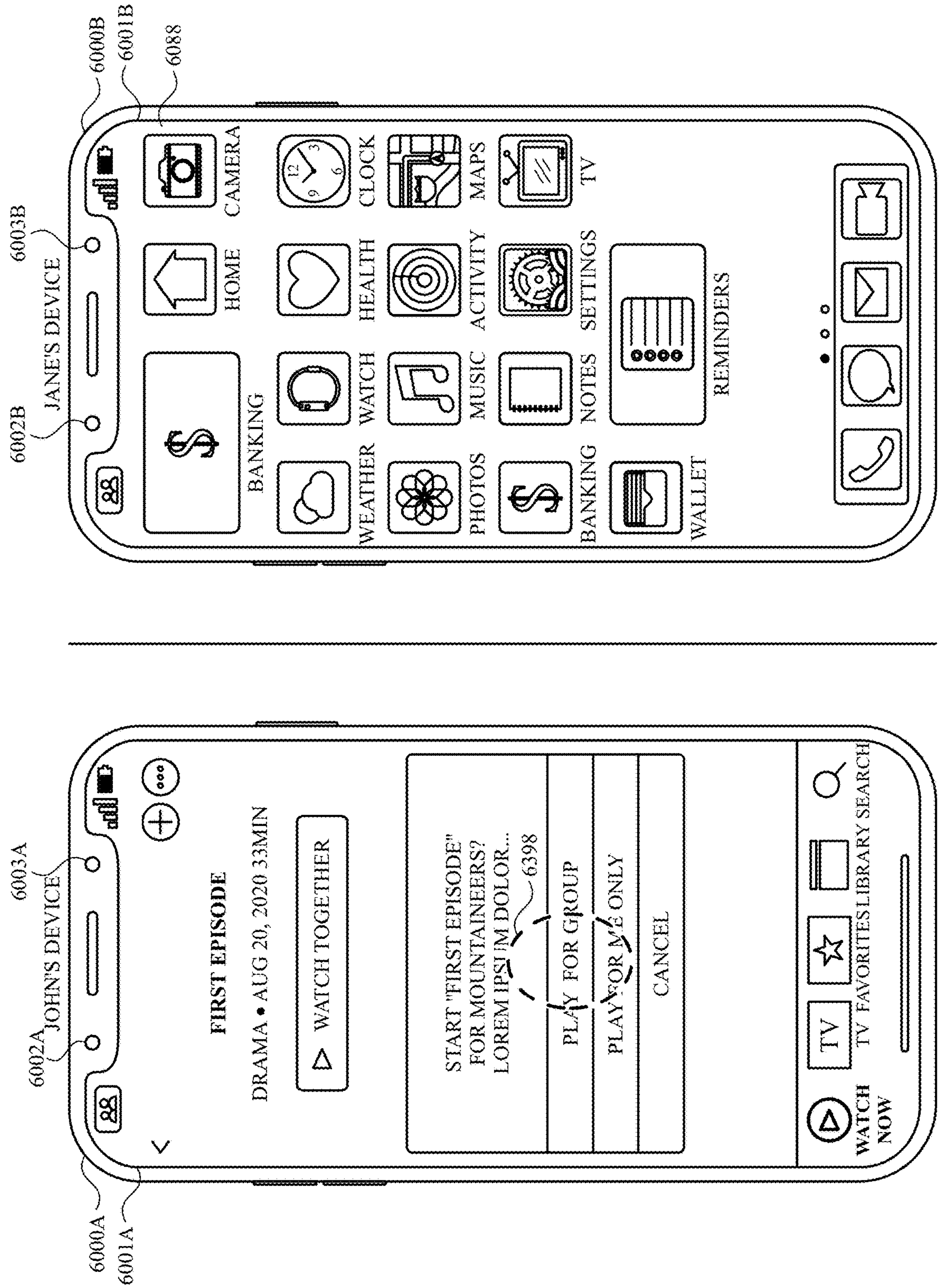
Figure 6C:
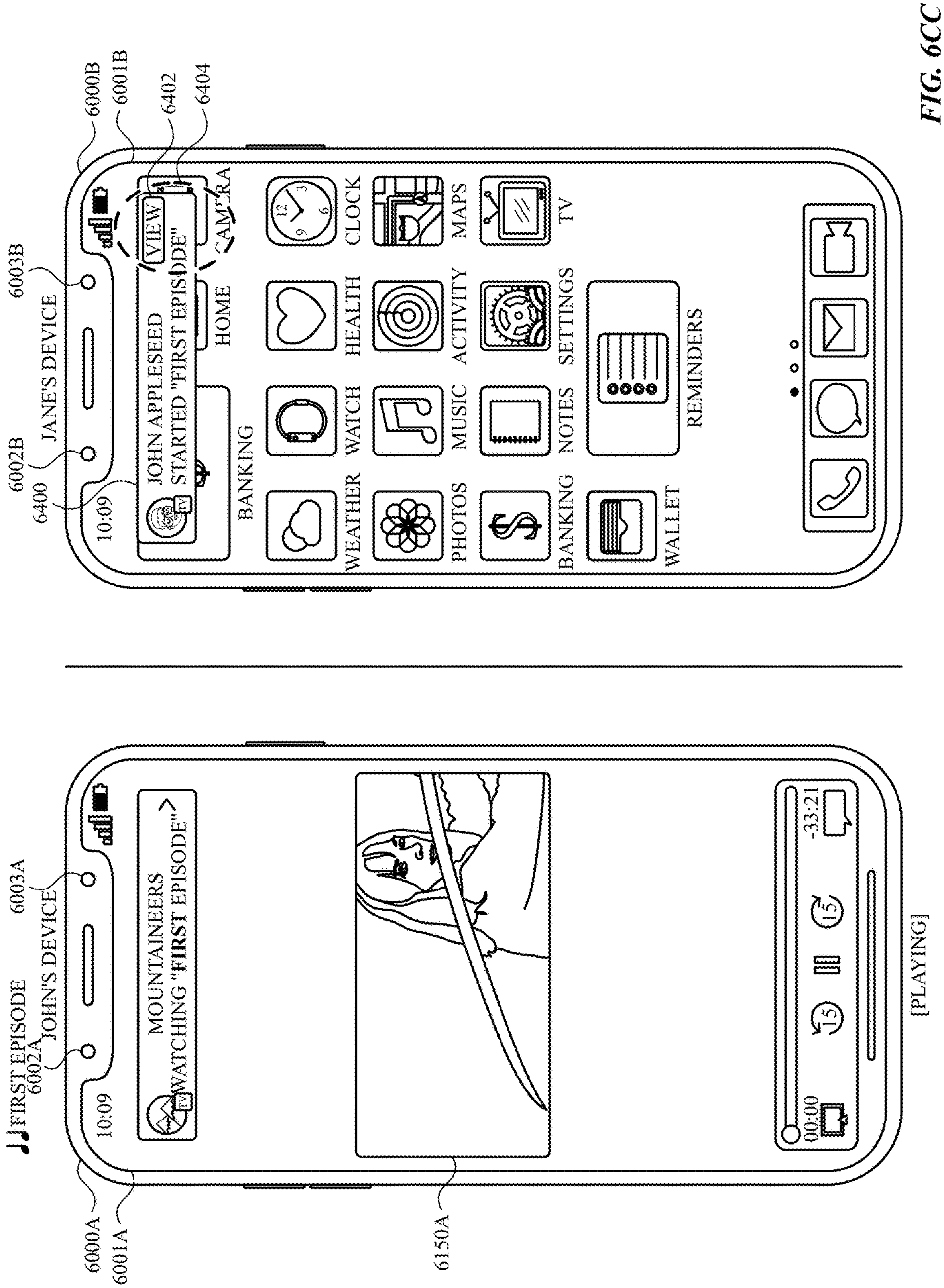
Figure 6C:
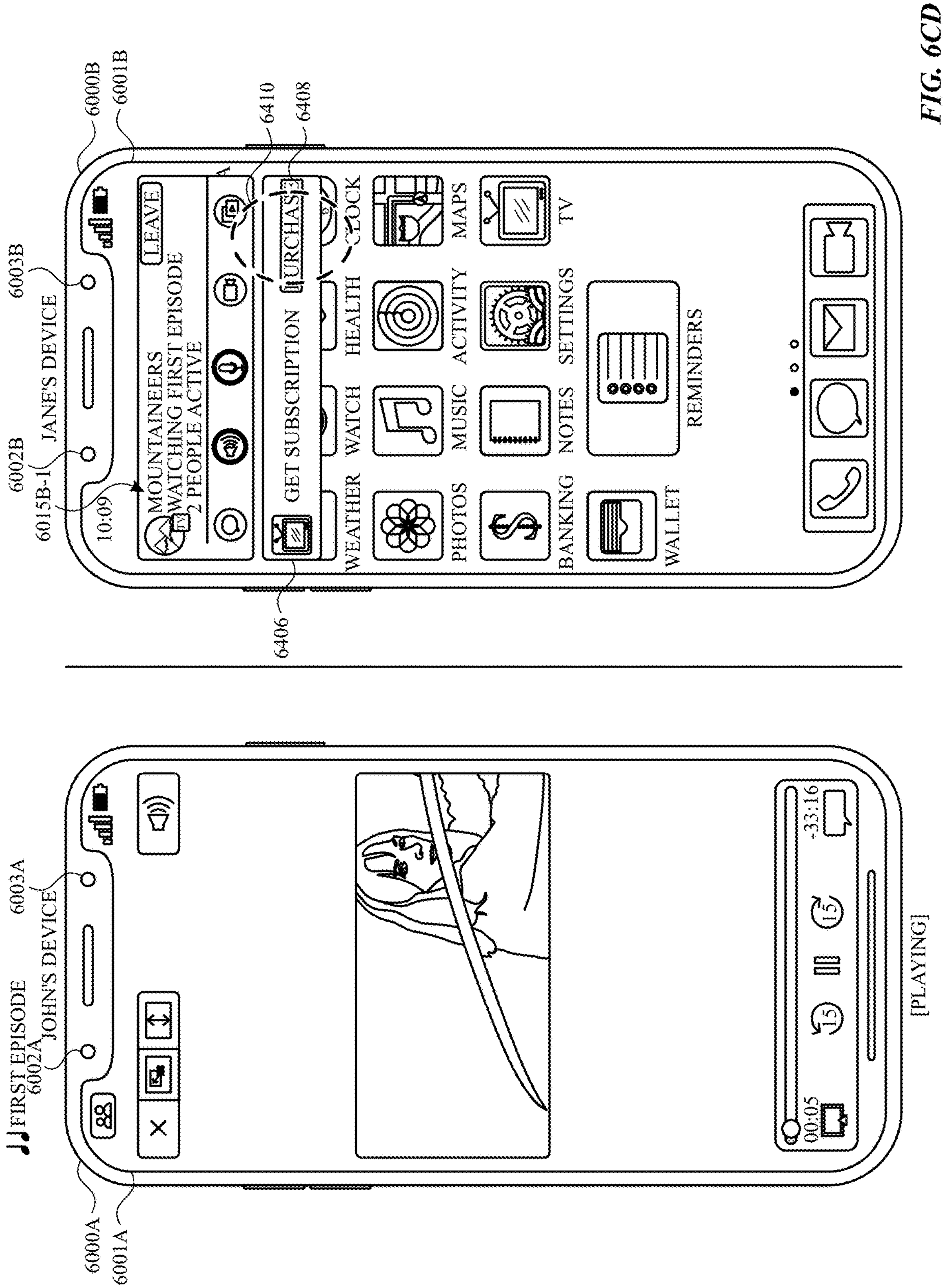
Figure 6C:
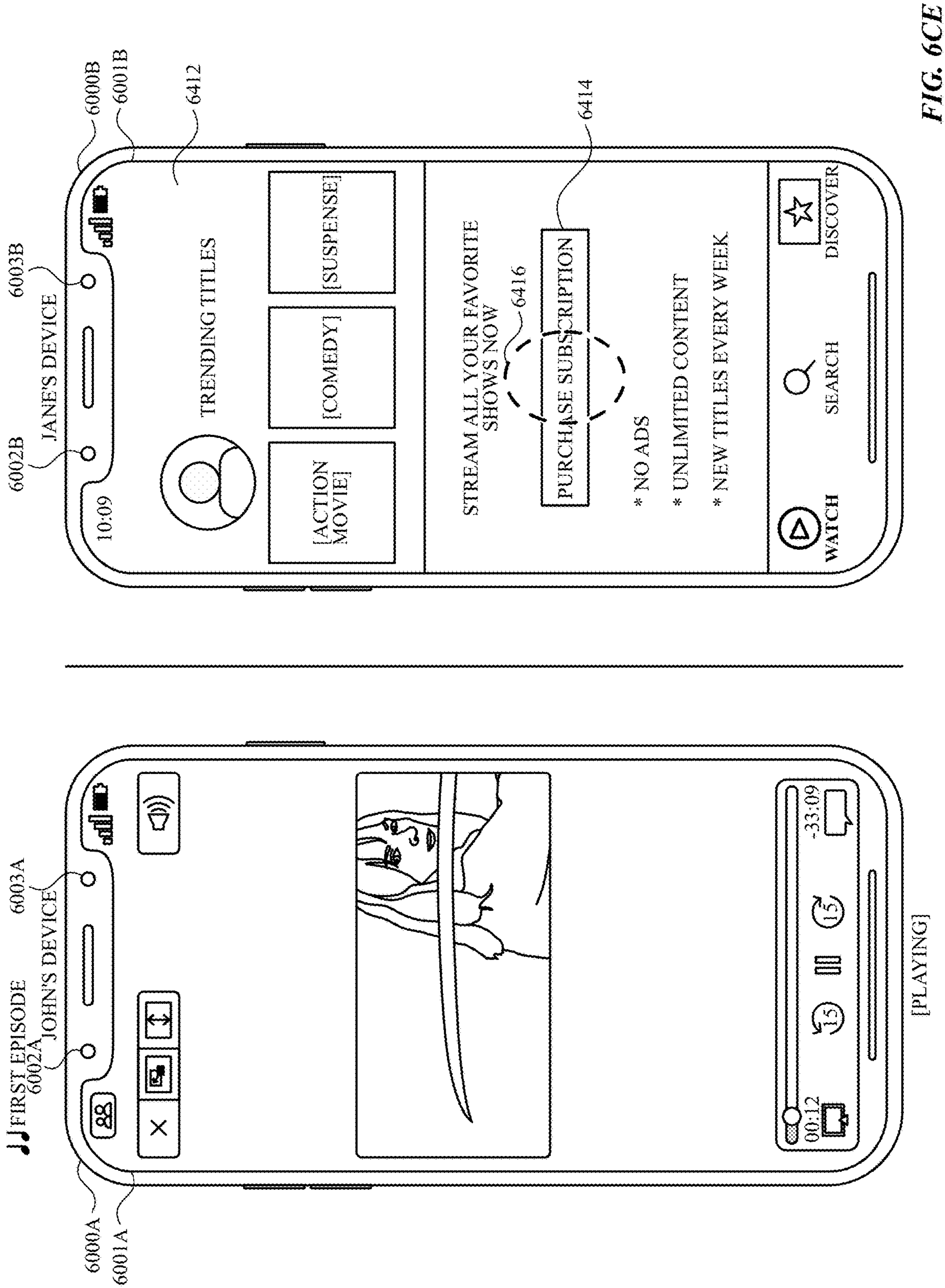
Figure 6C:
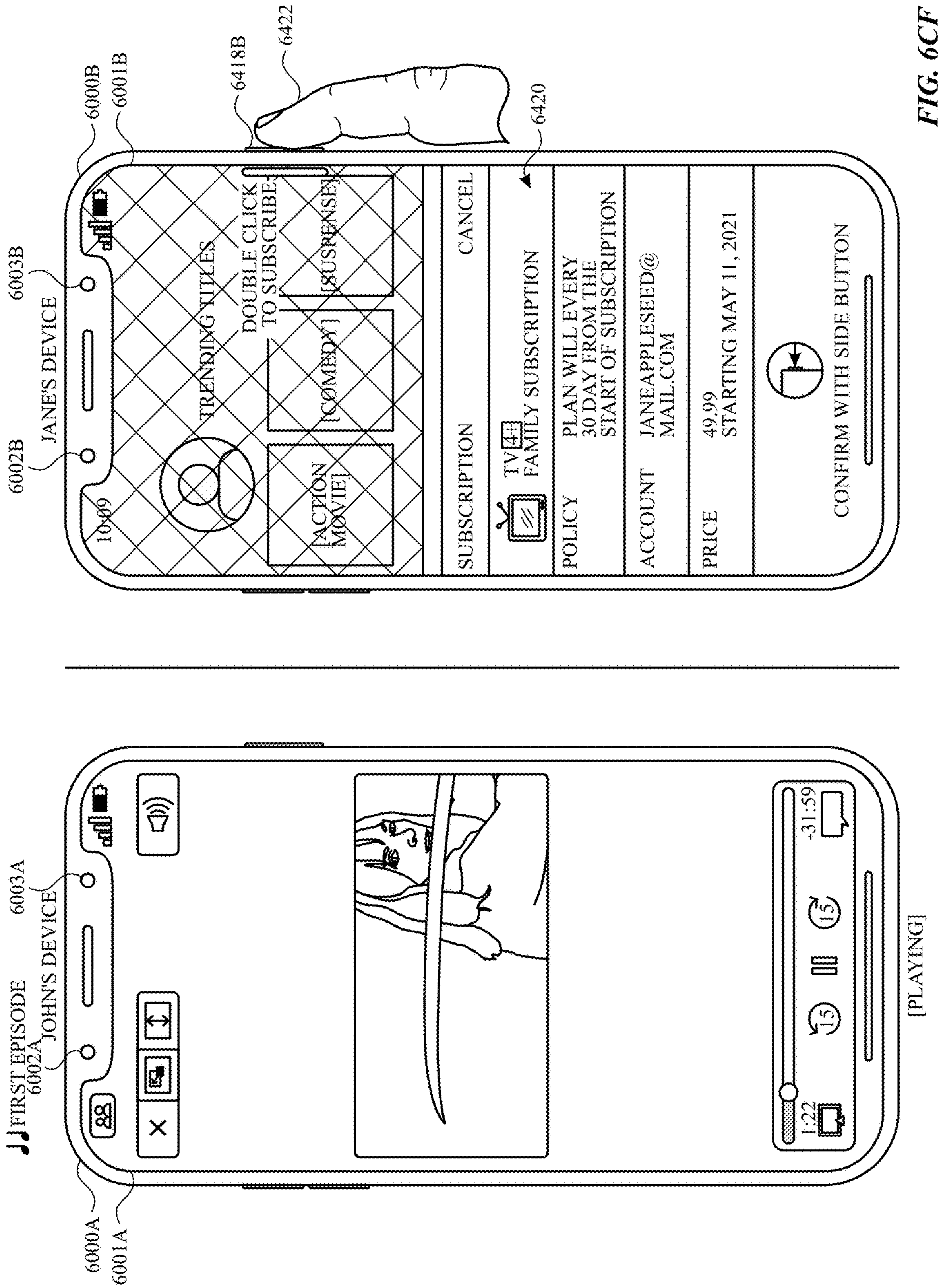
Figure 6C:
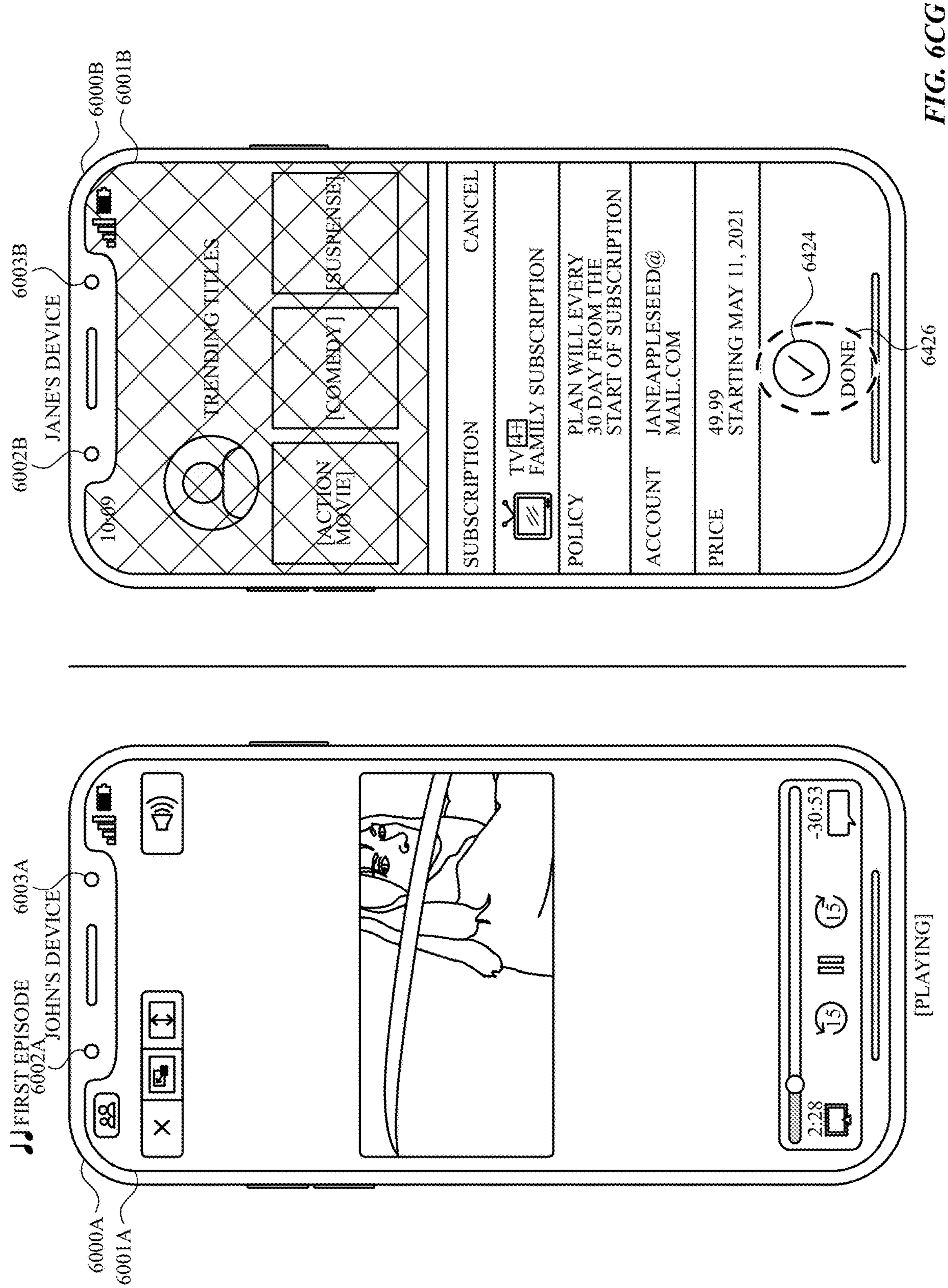
Figure 6C:
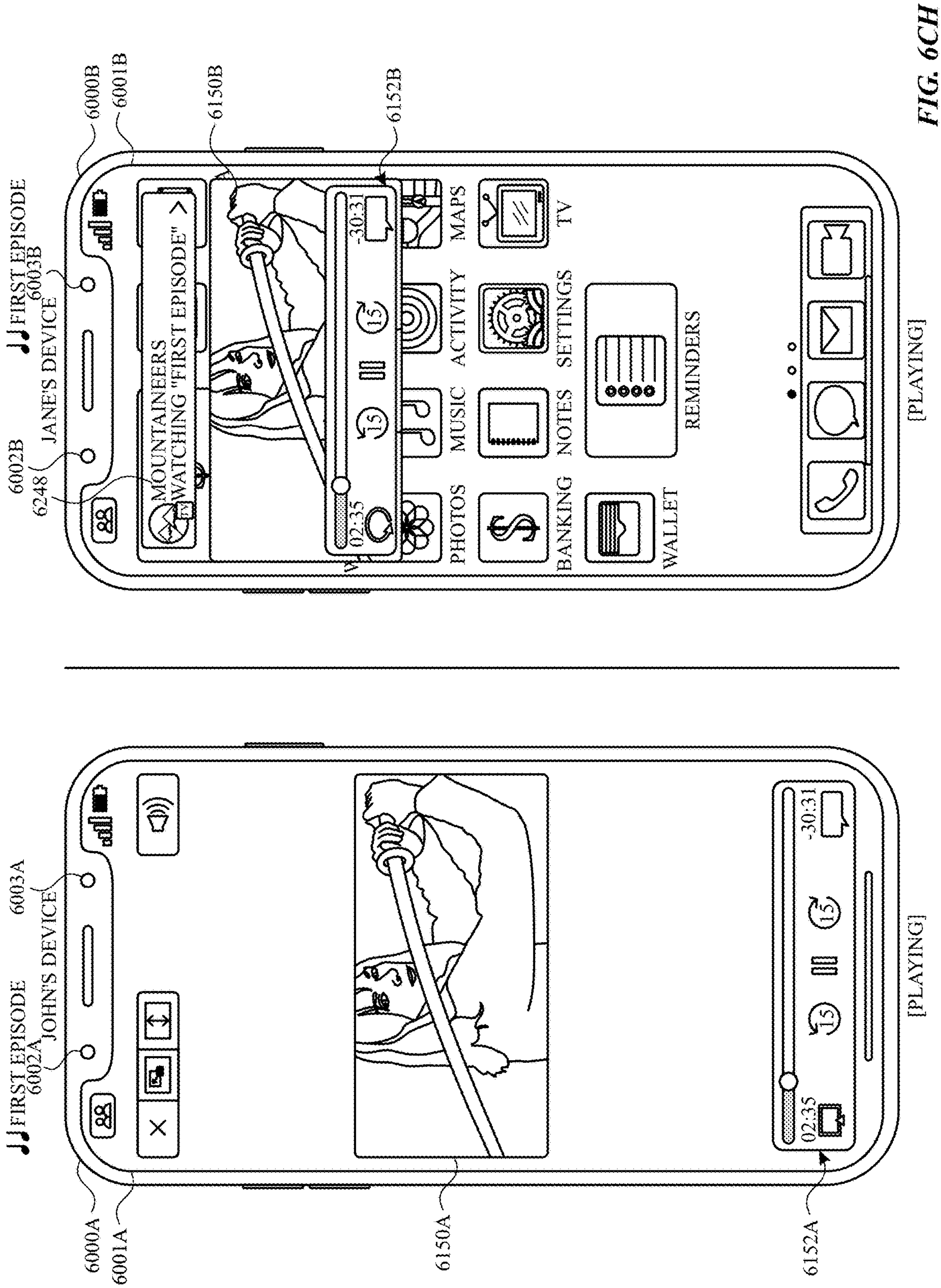
Figure 6C:
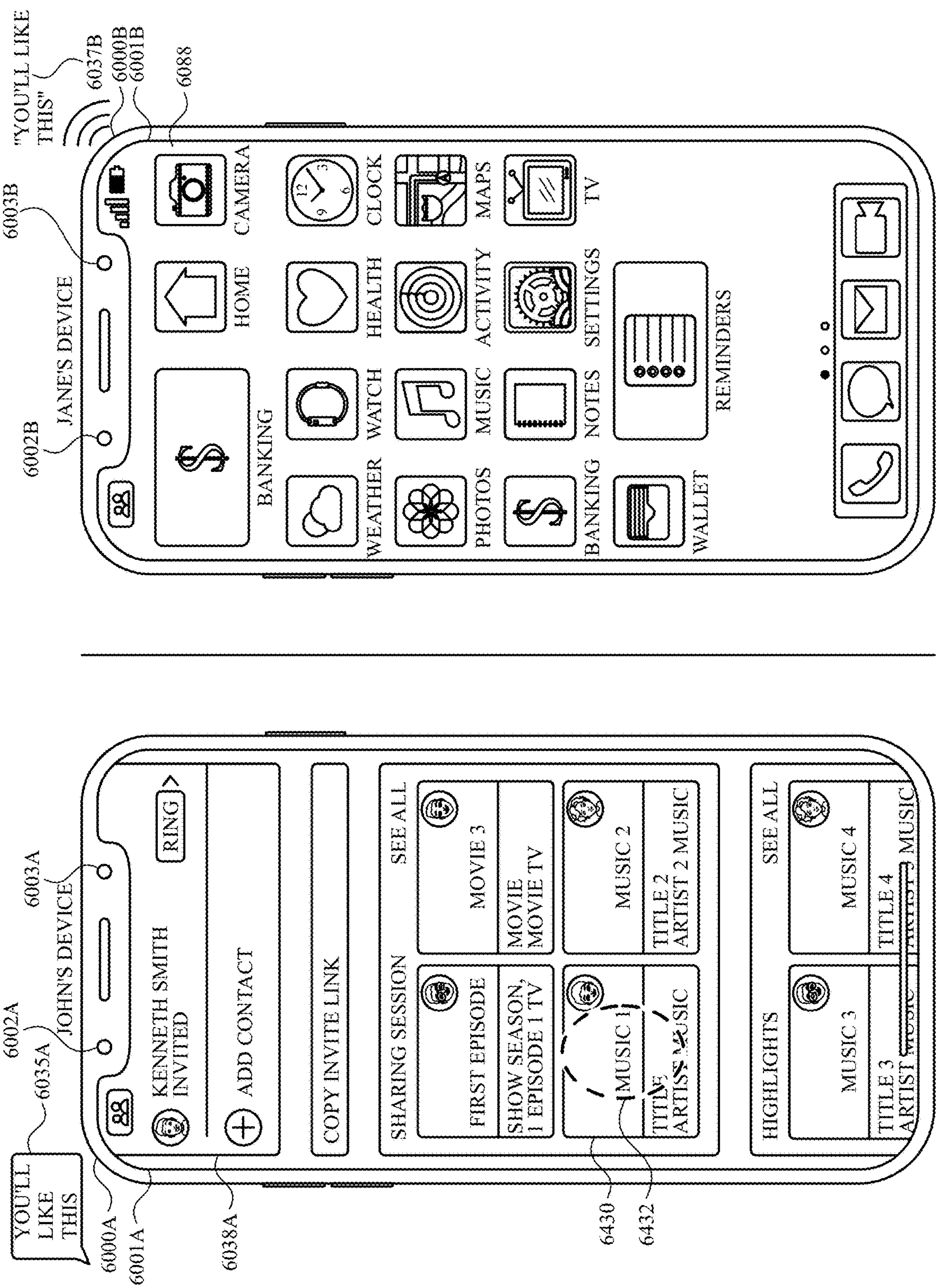
Figure 6C:
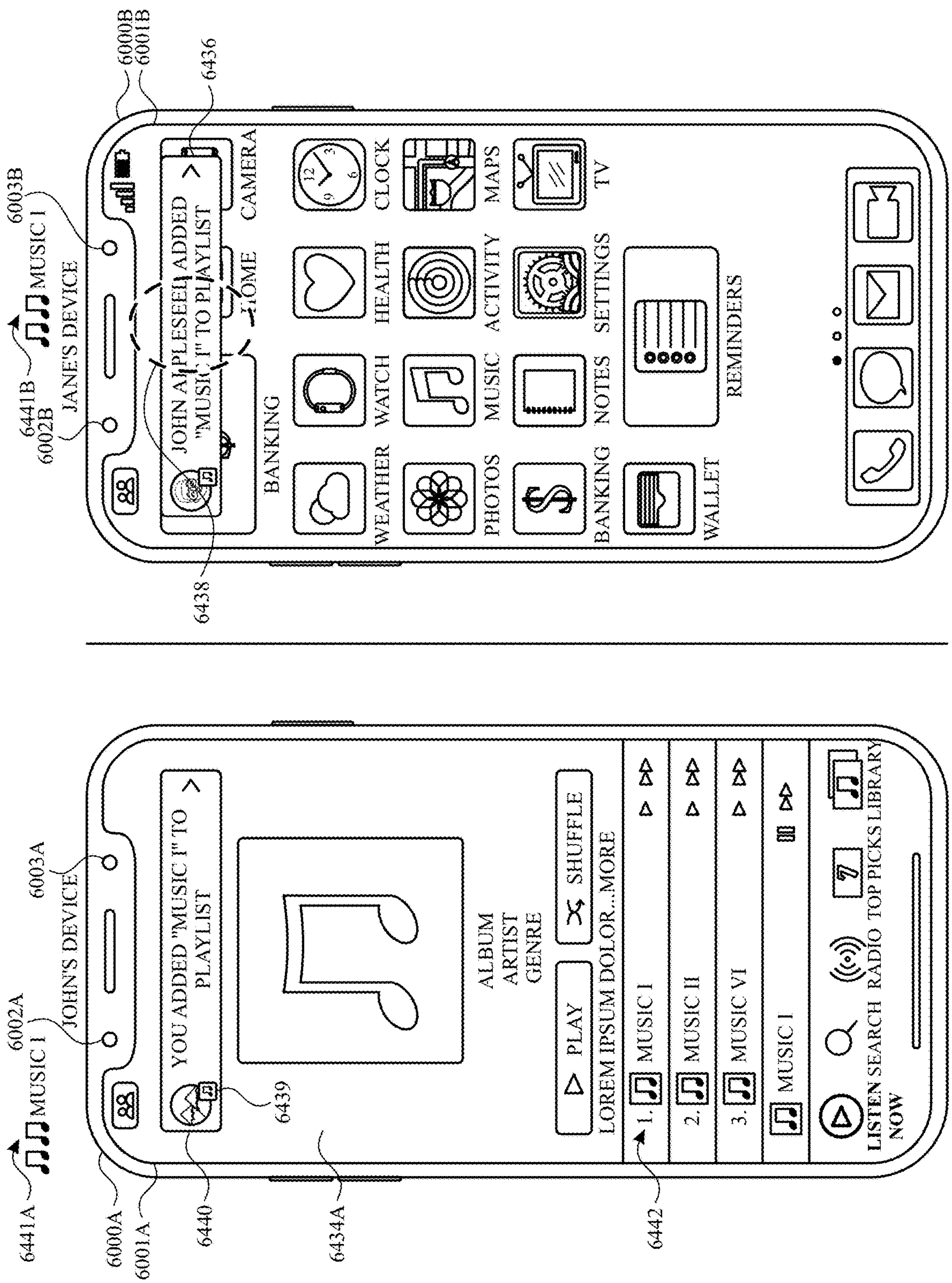
Figure 6C:
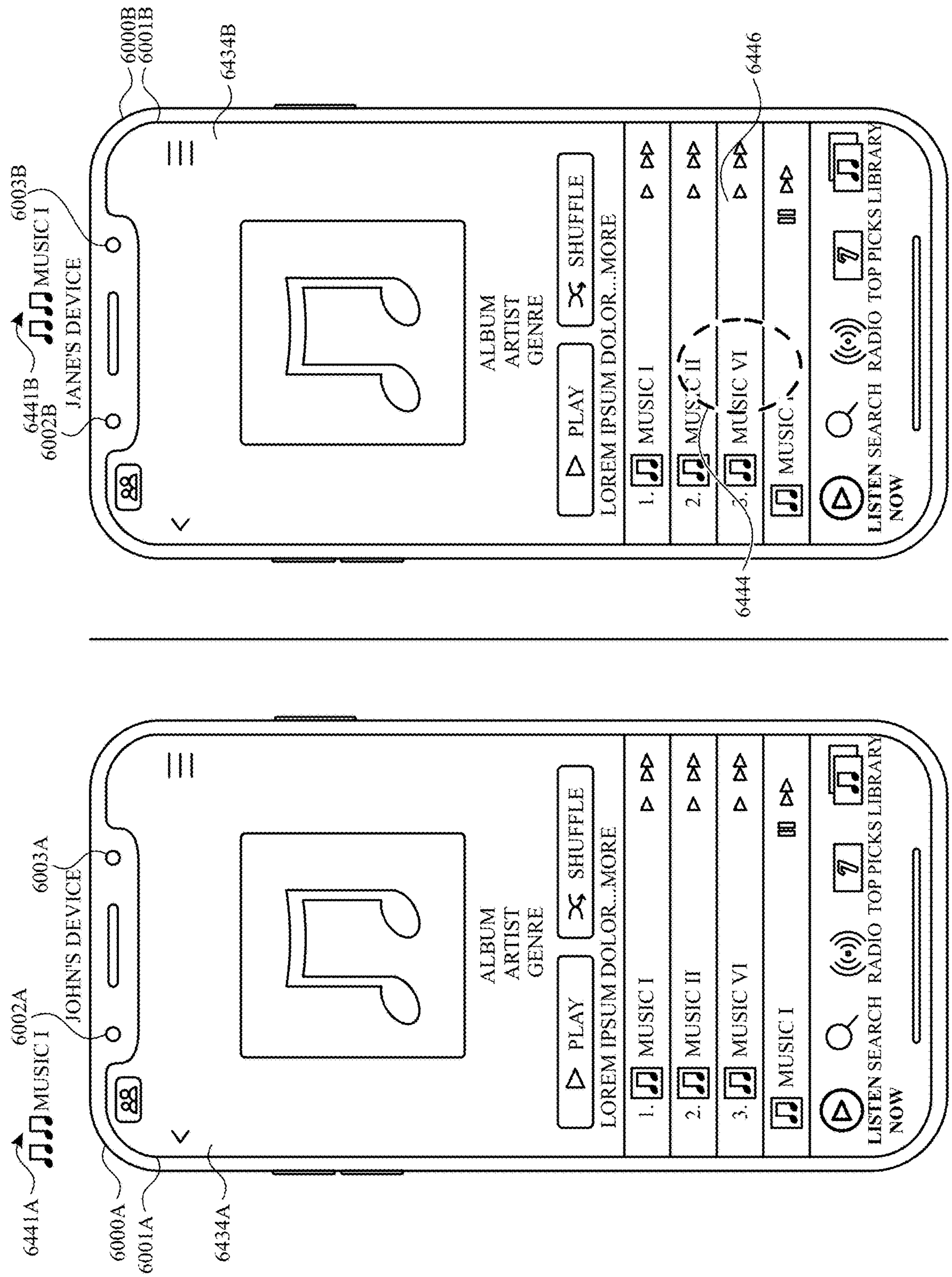
Figure 6C:
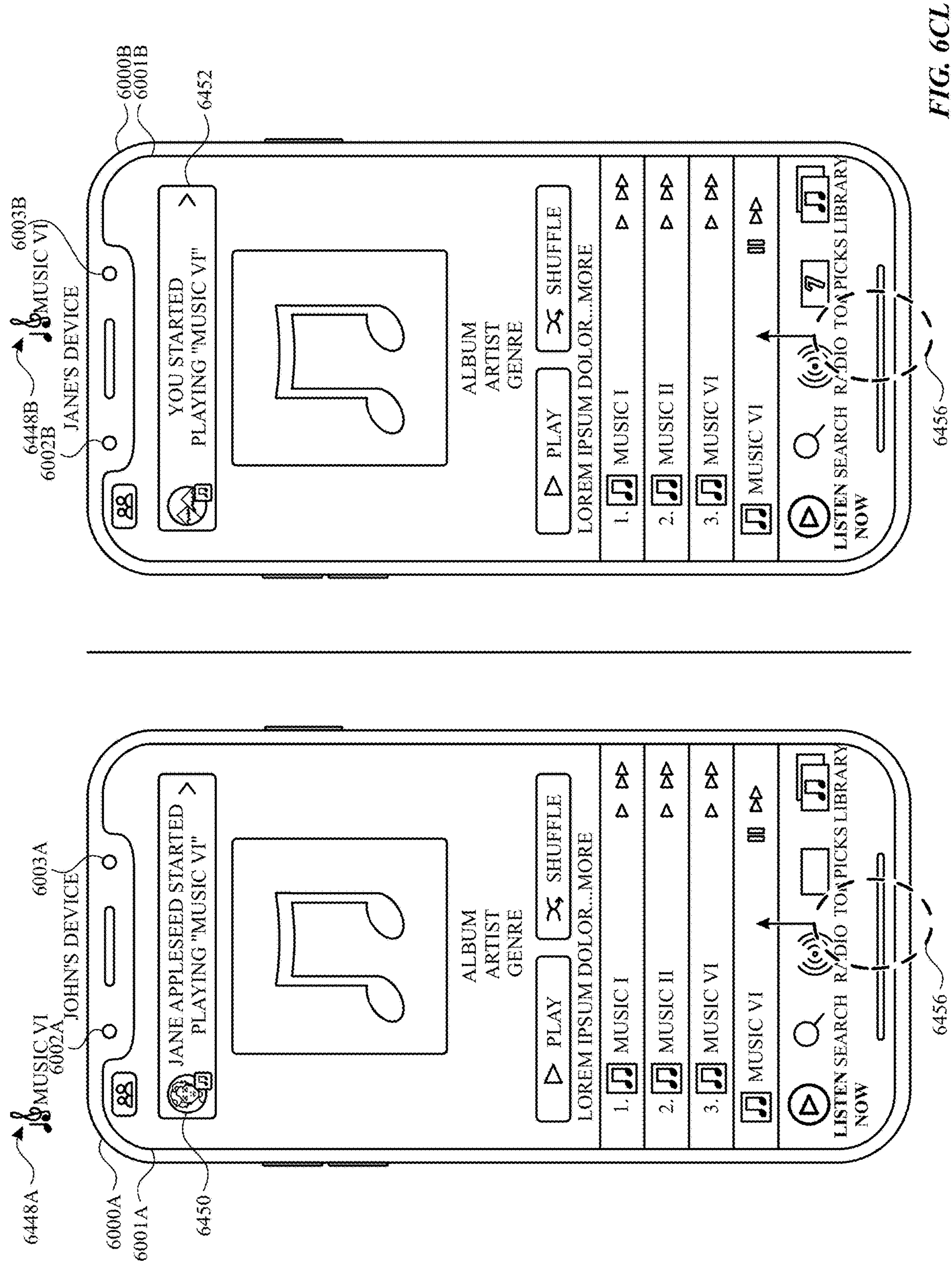
Figure 6C:
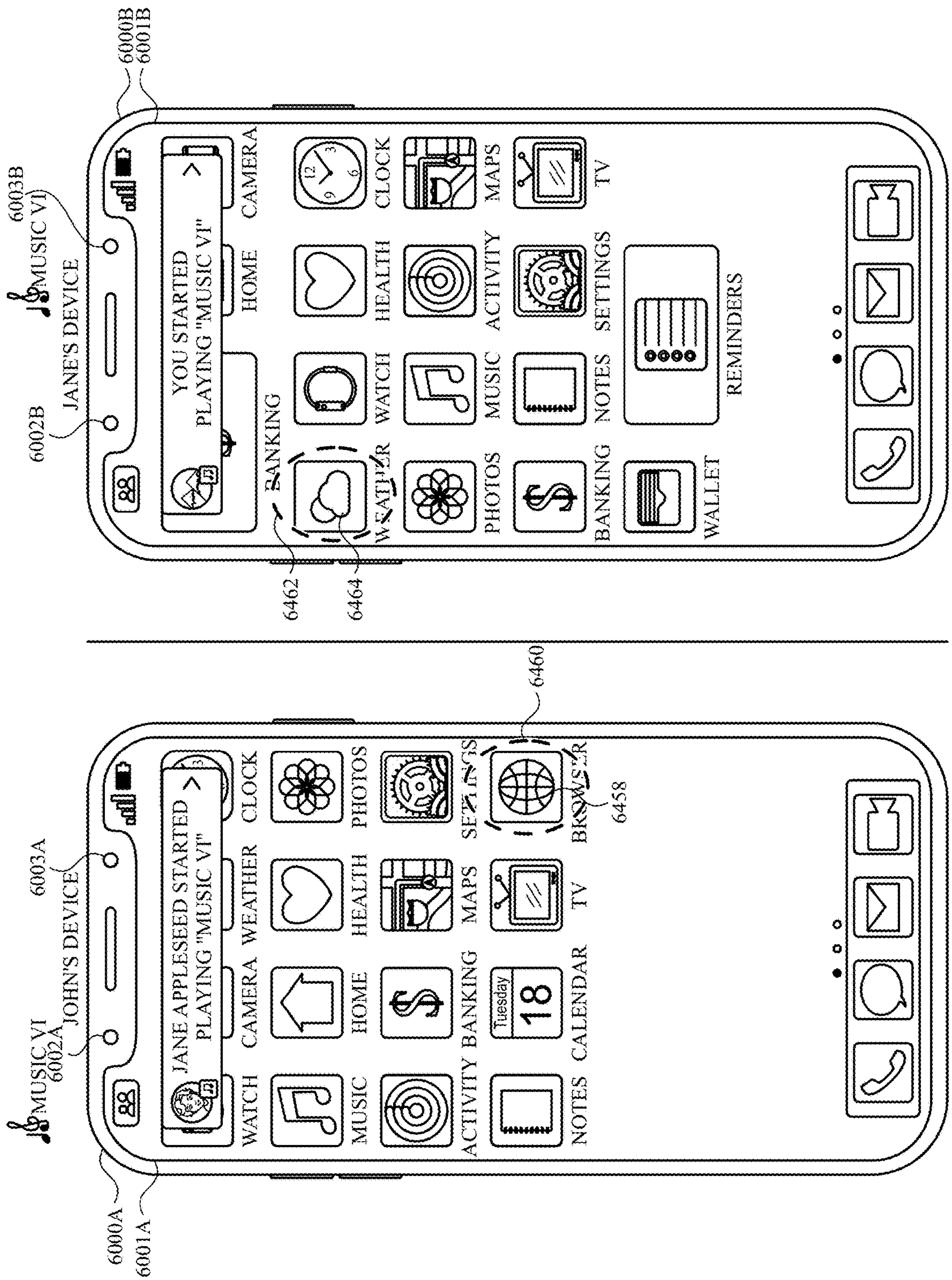
Figure 6C:
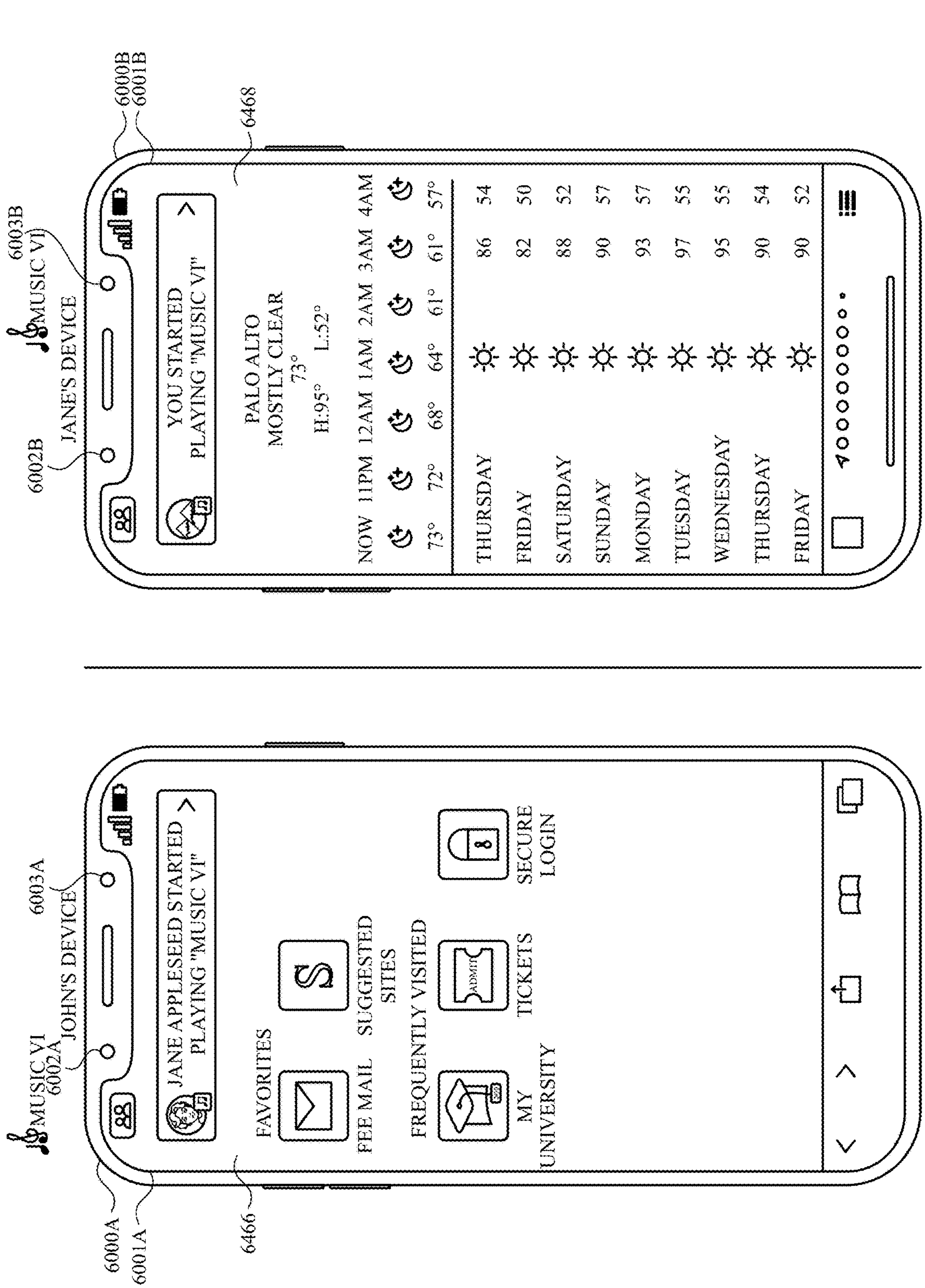
Figure 6C:
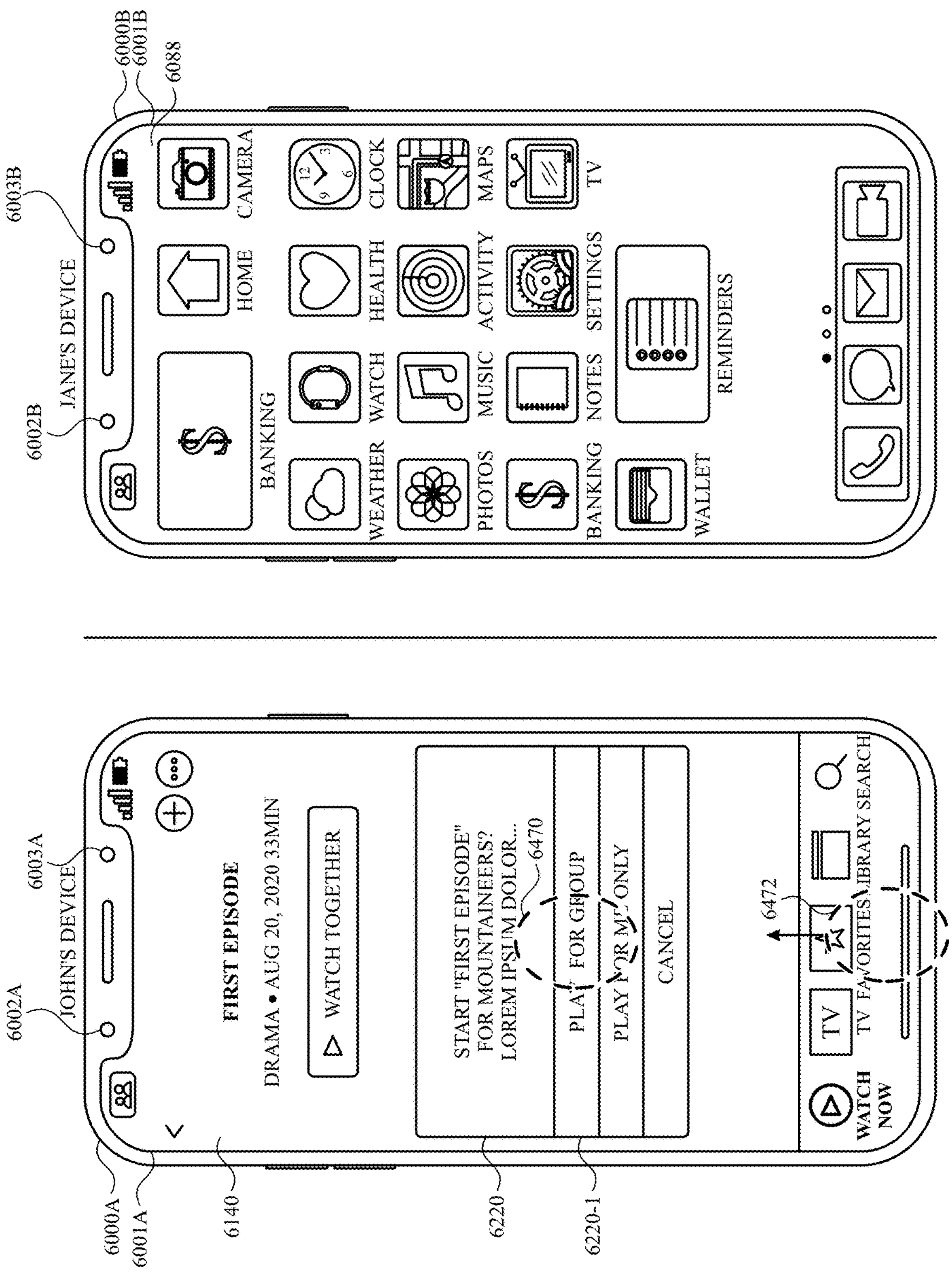
Figure 6C:
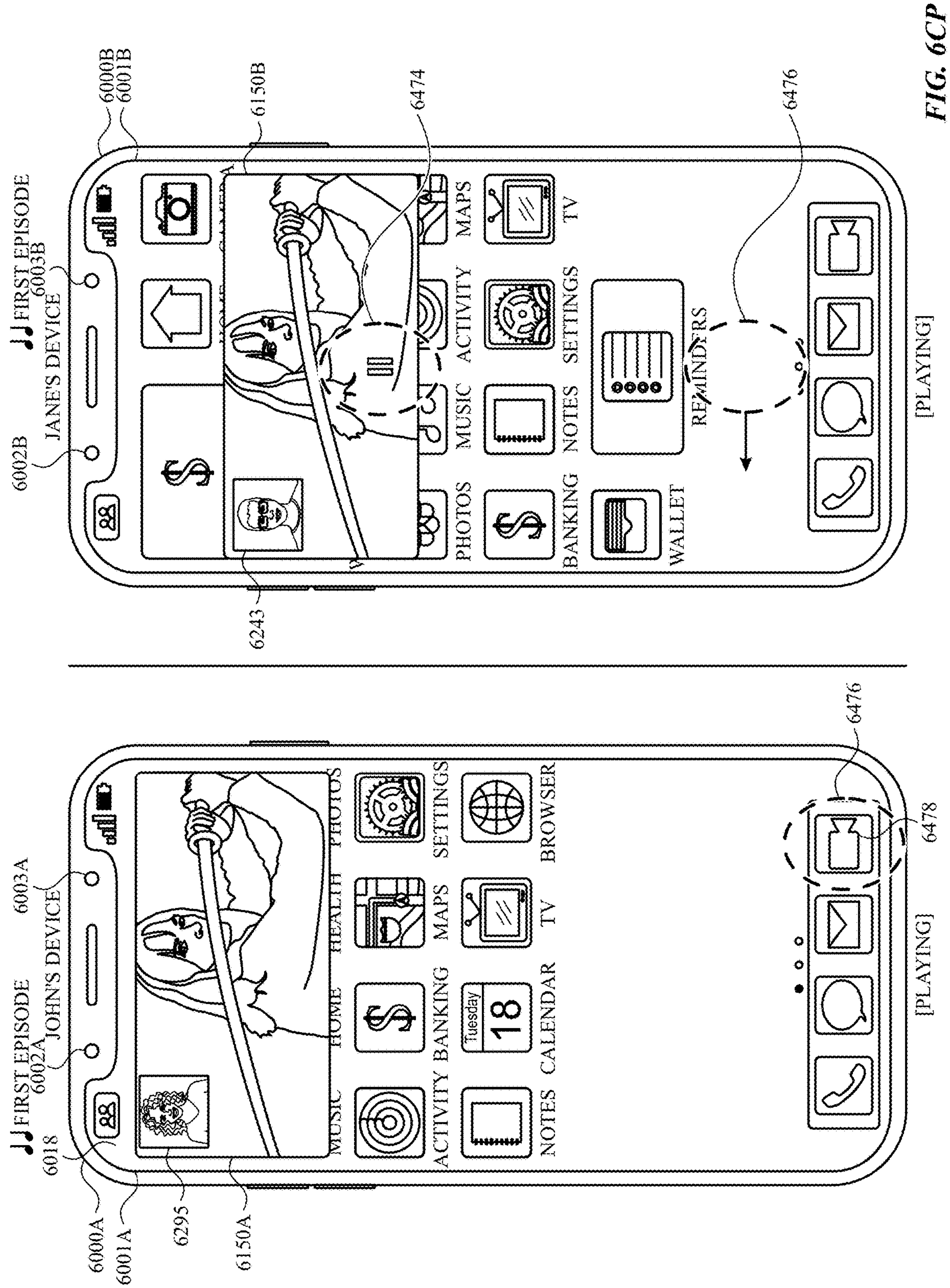
Figure 6C:
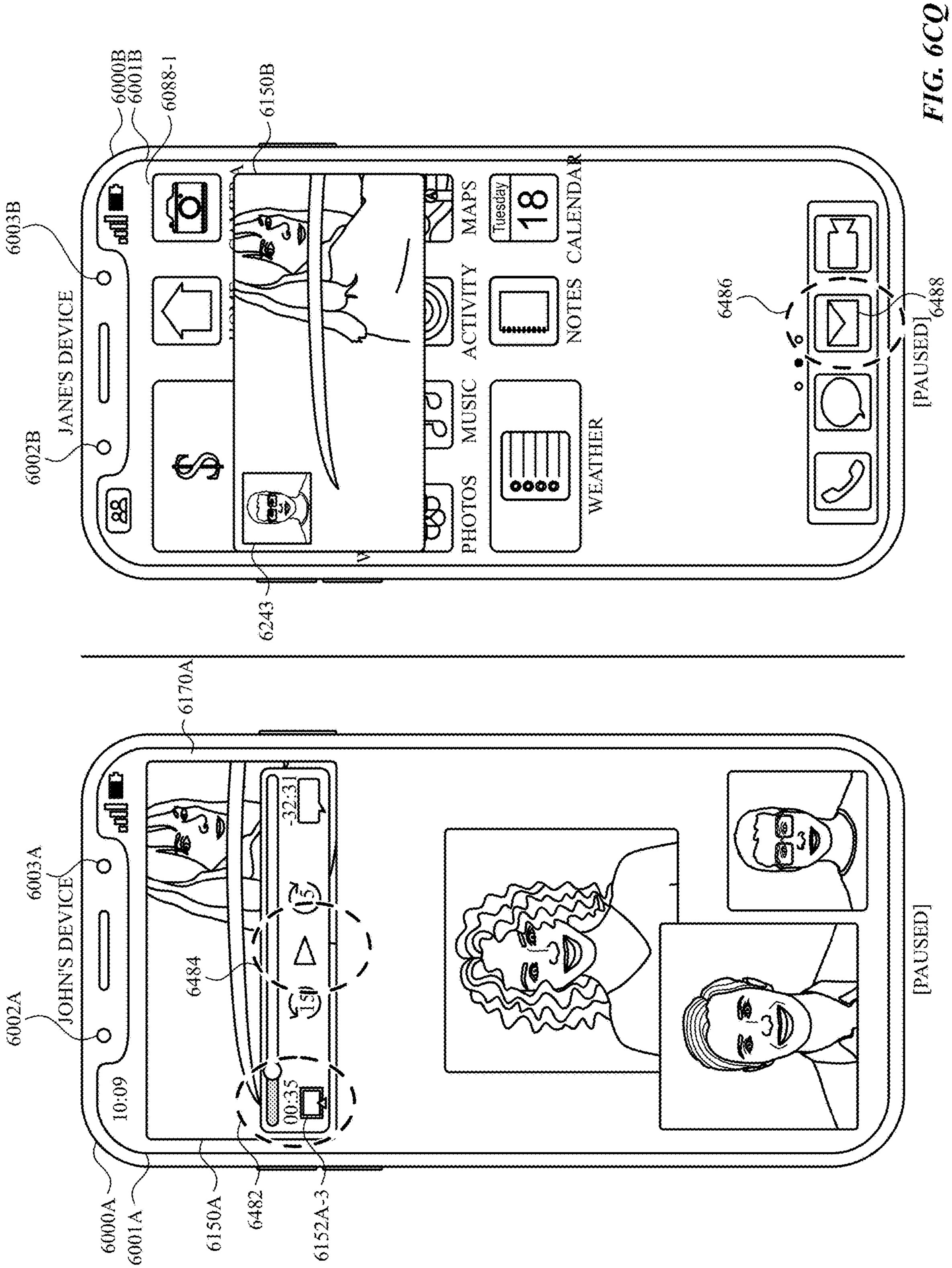
Figure 6C:
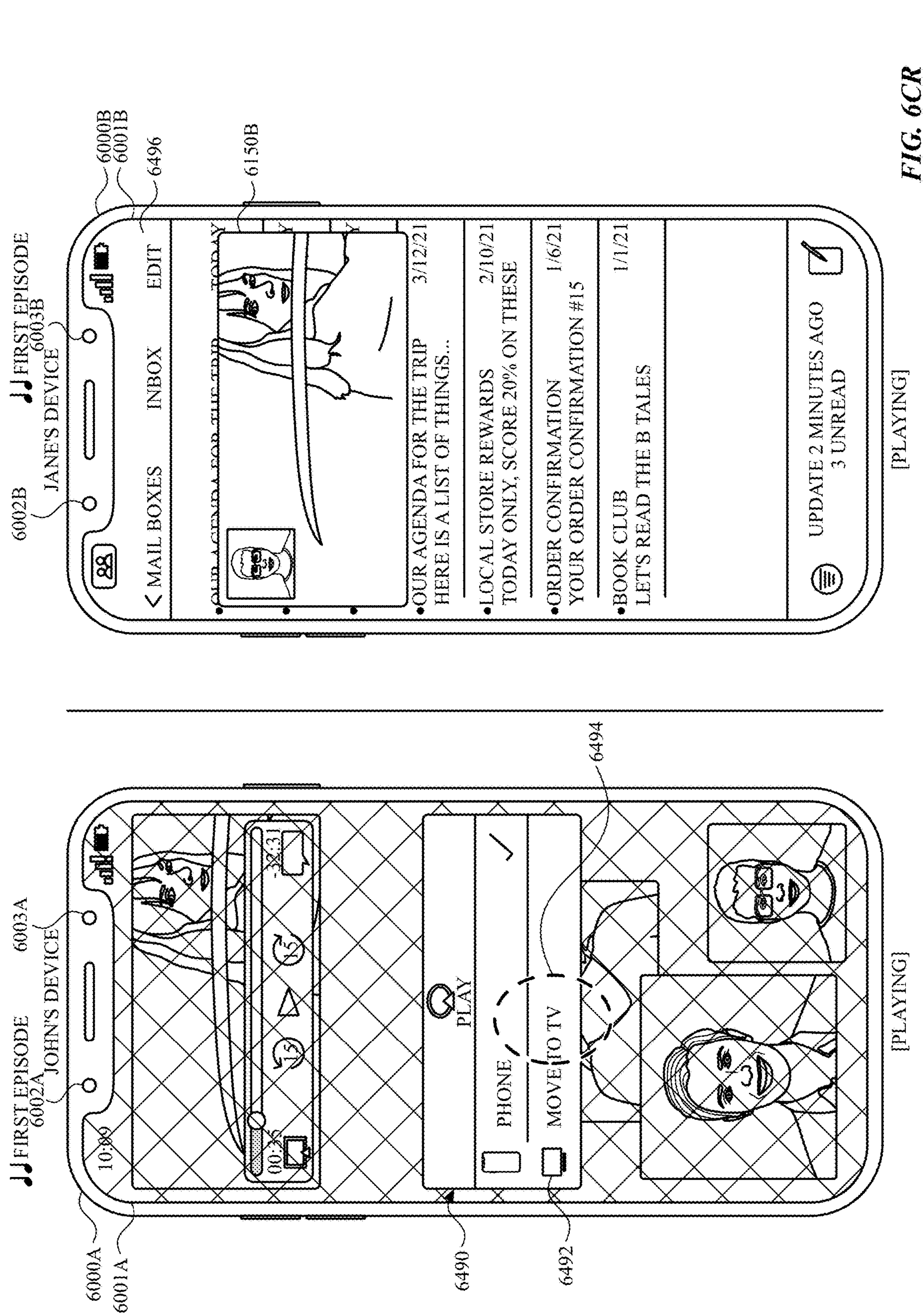
Figure 6C:
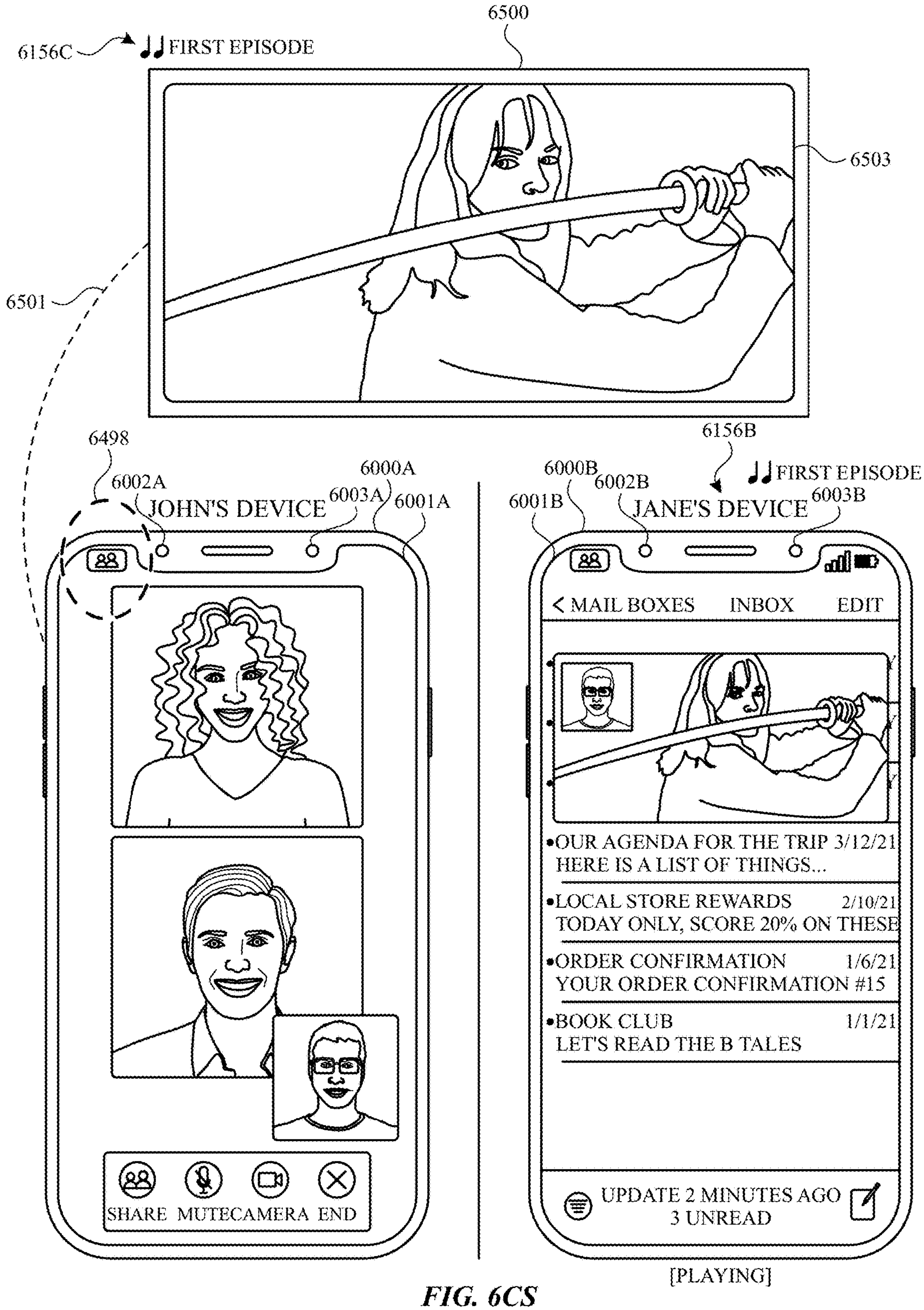
Figure 6C:
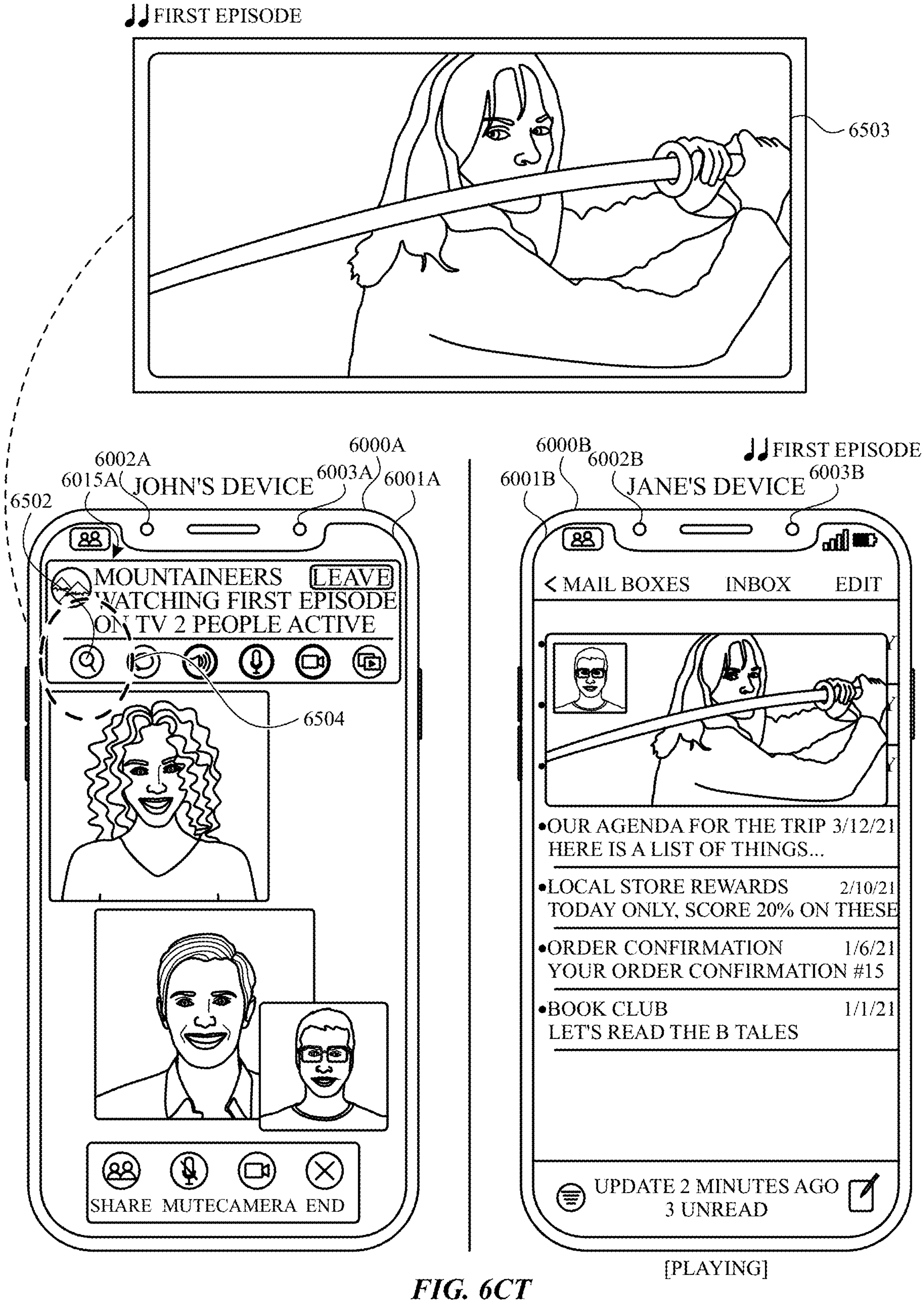
Figure 6C:
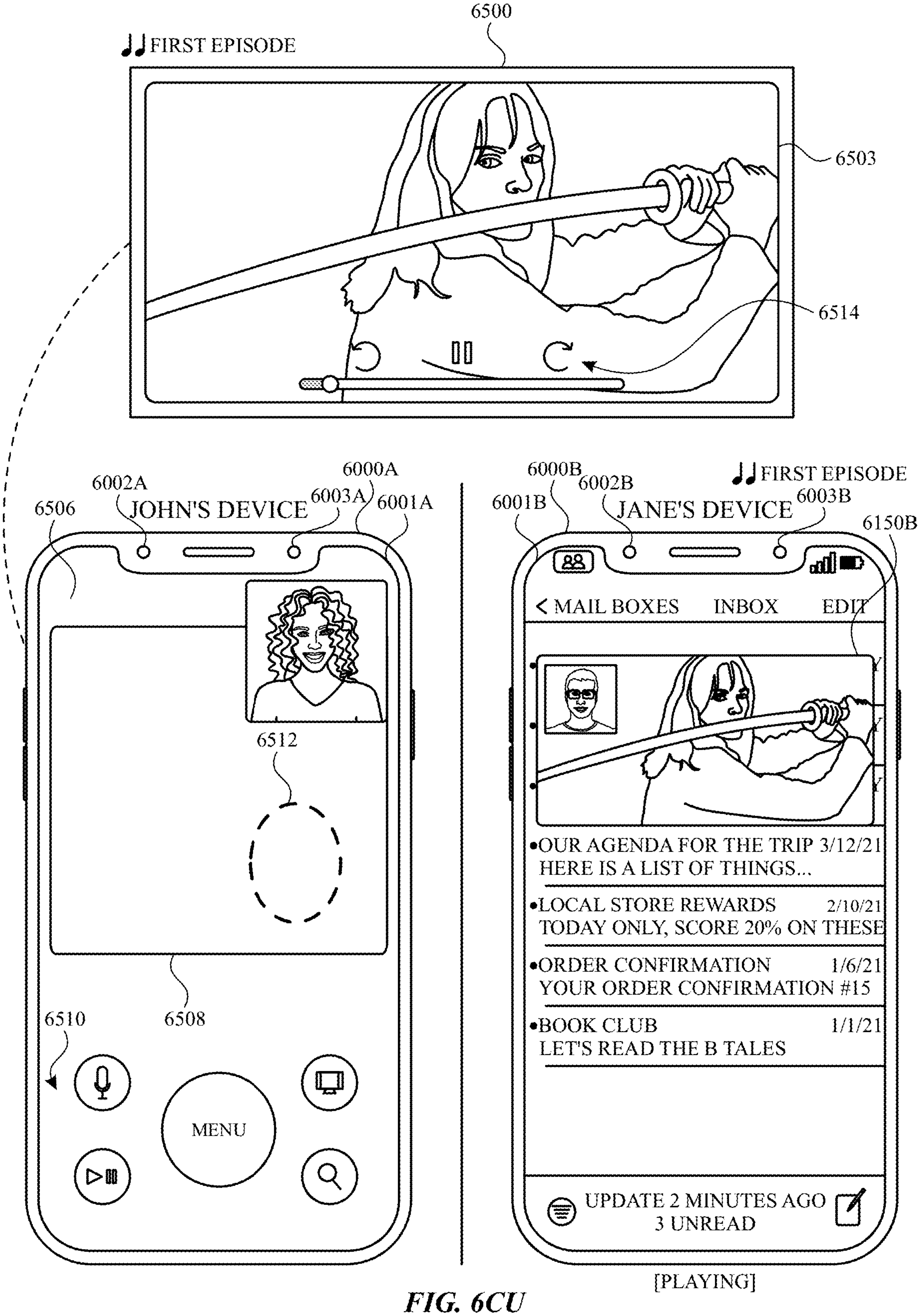
Figure 6C:
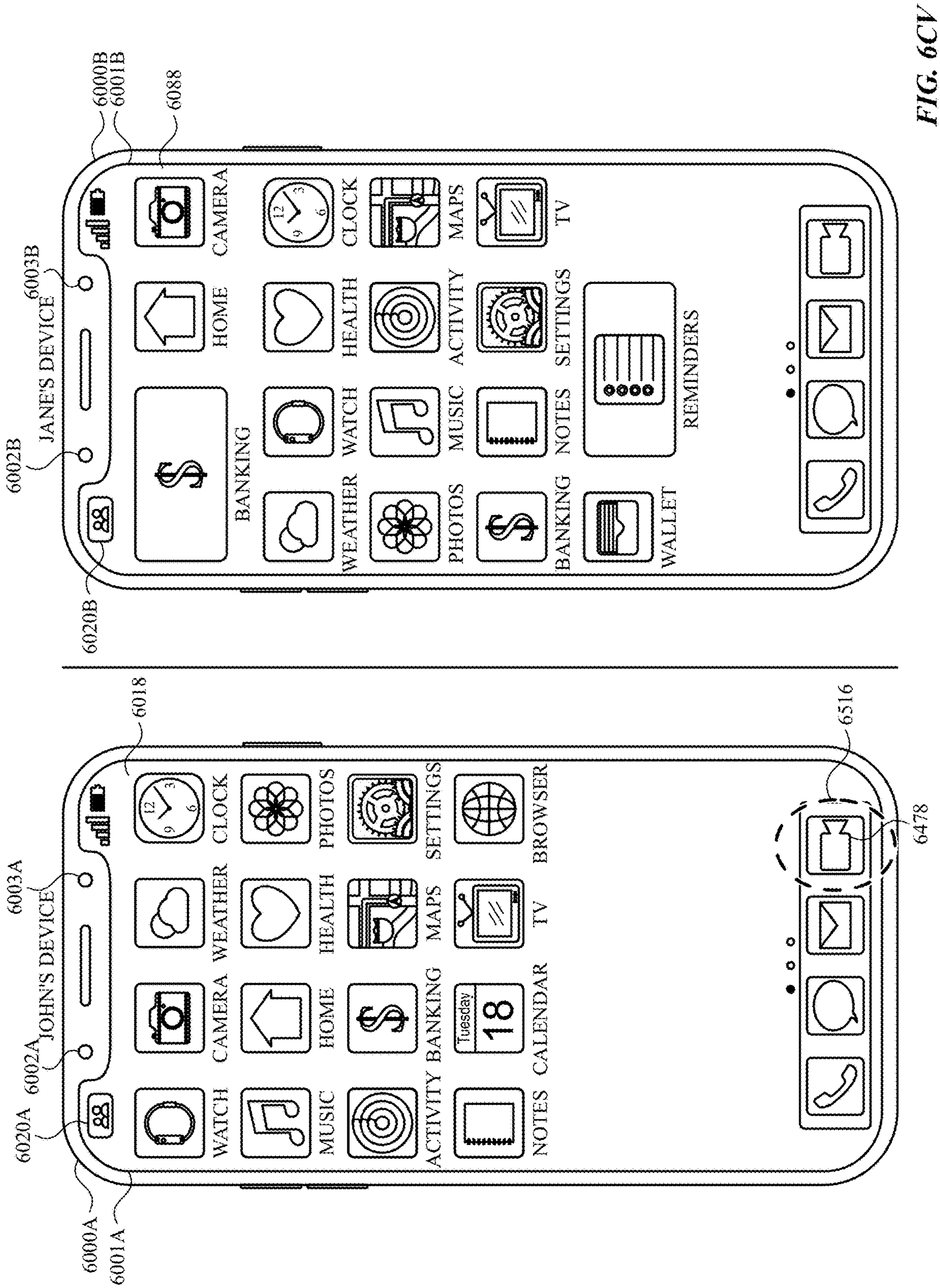
Figure 6C:
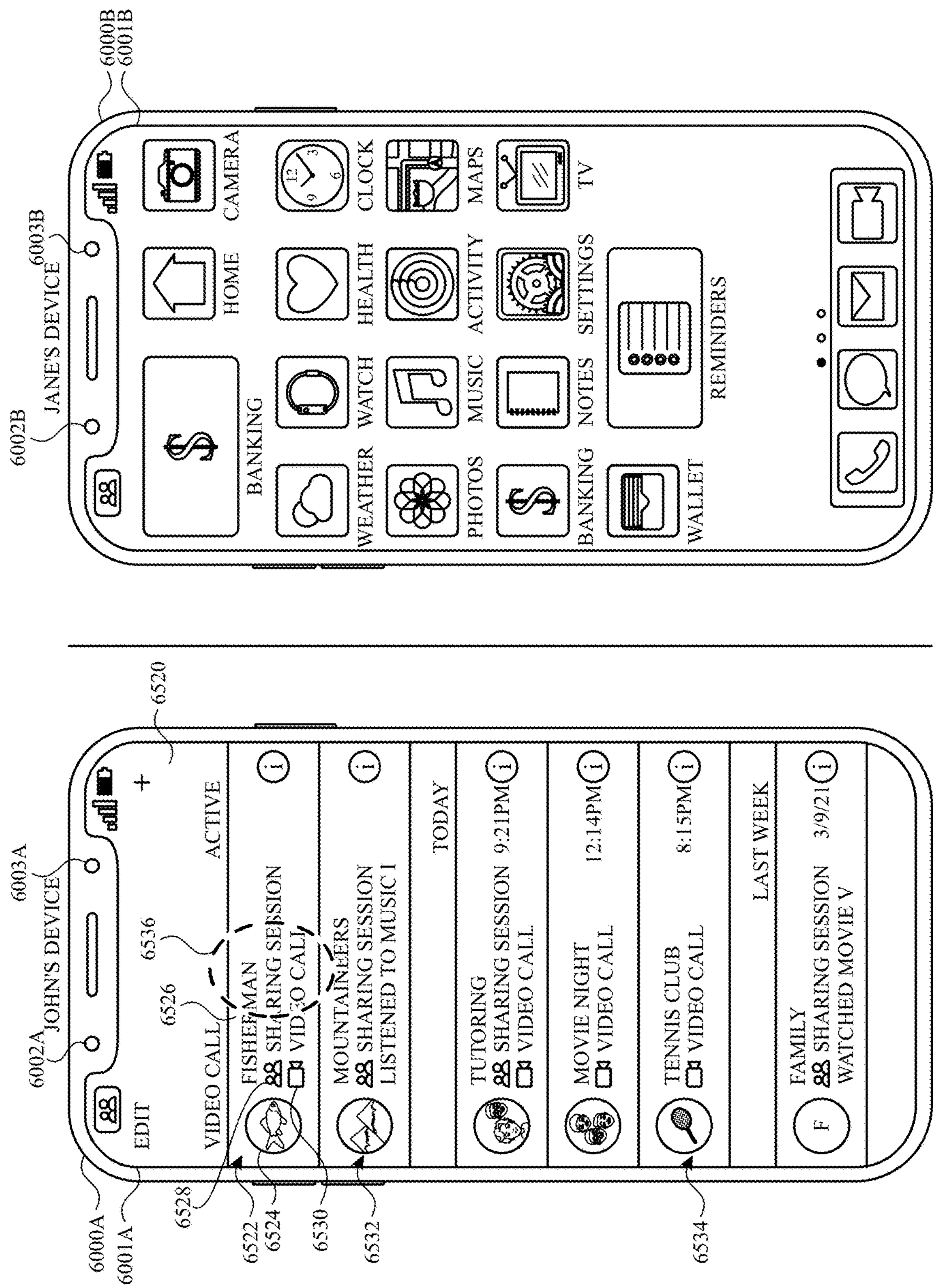
Figure 6C:
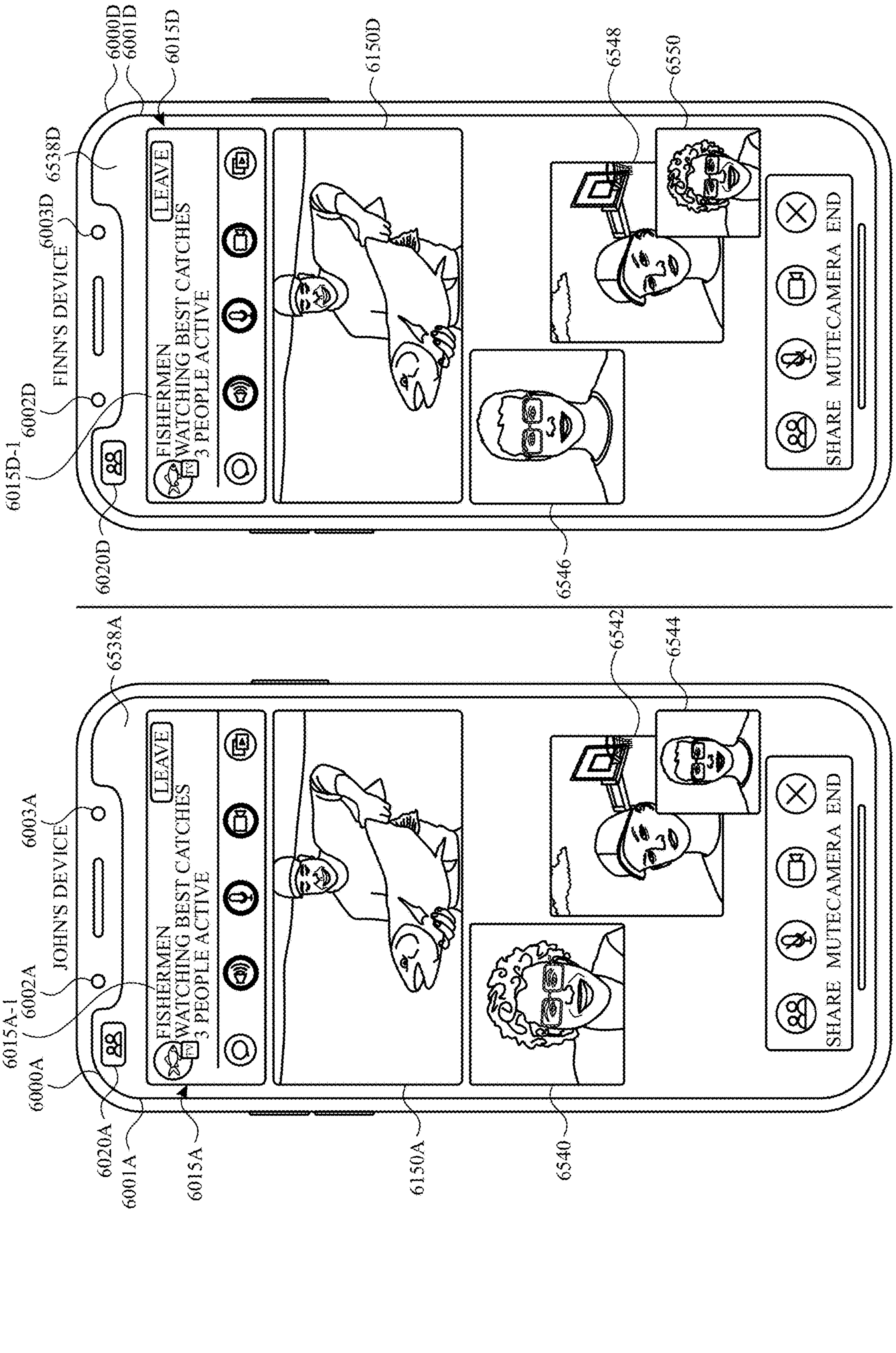
Figure 6C:
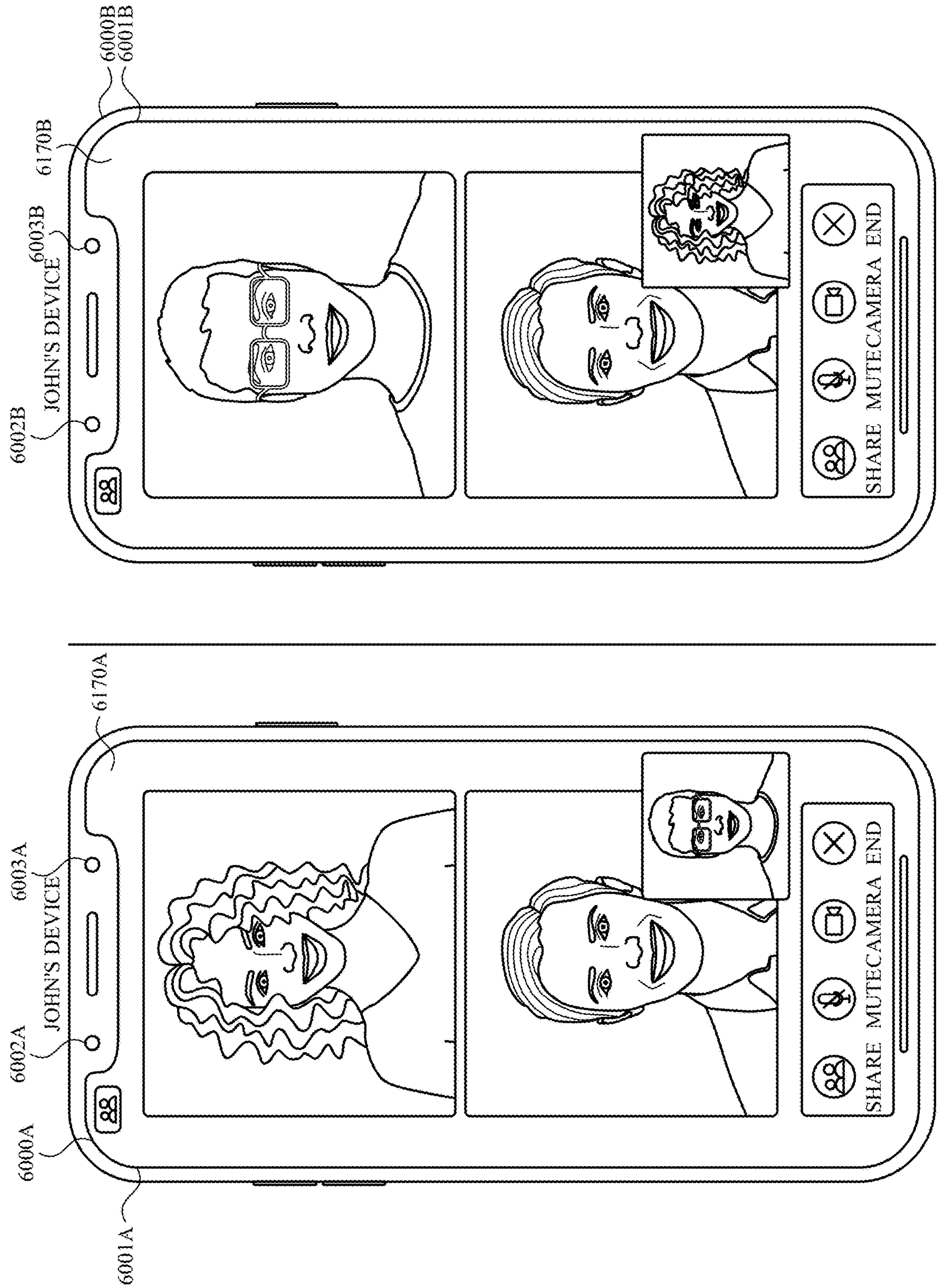
Figure 6C:
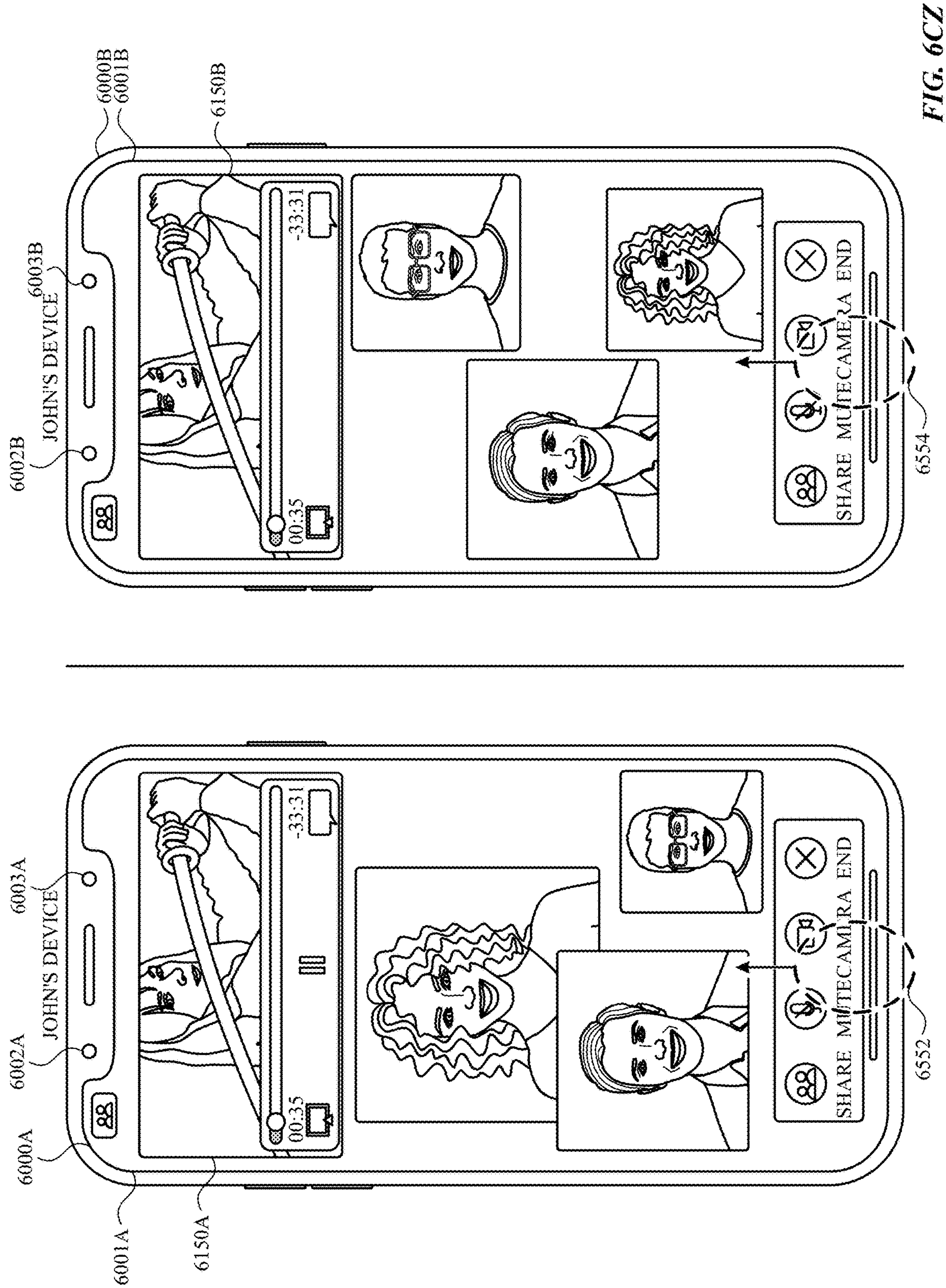
Figure 6D:
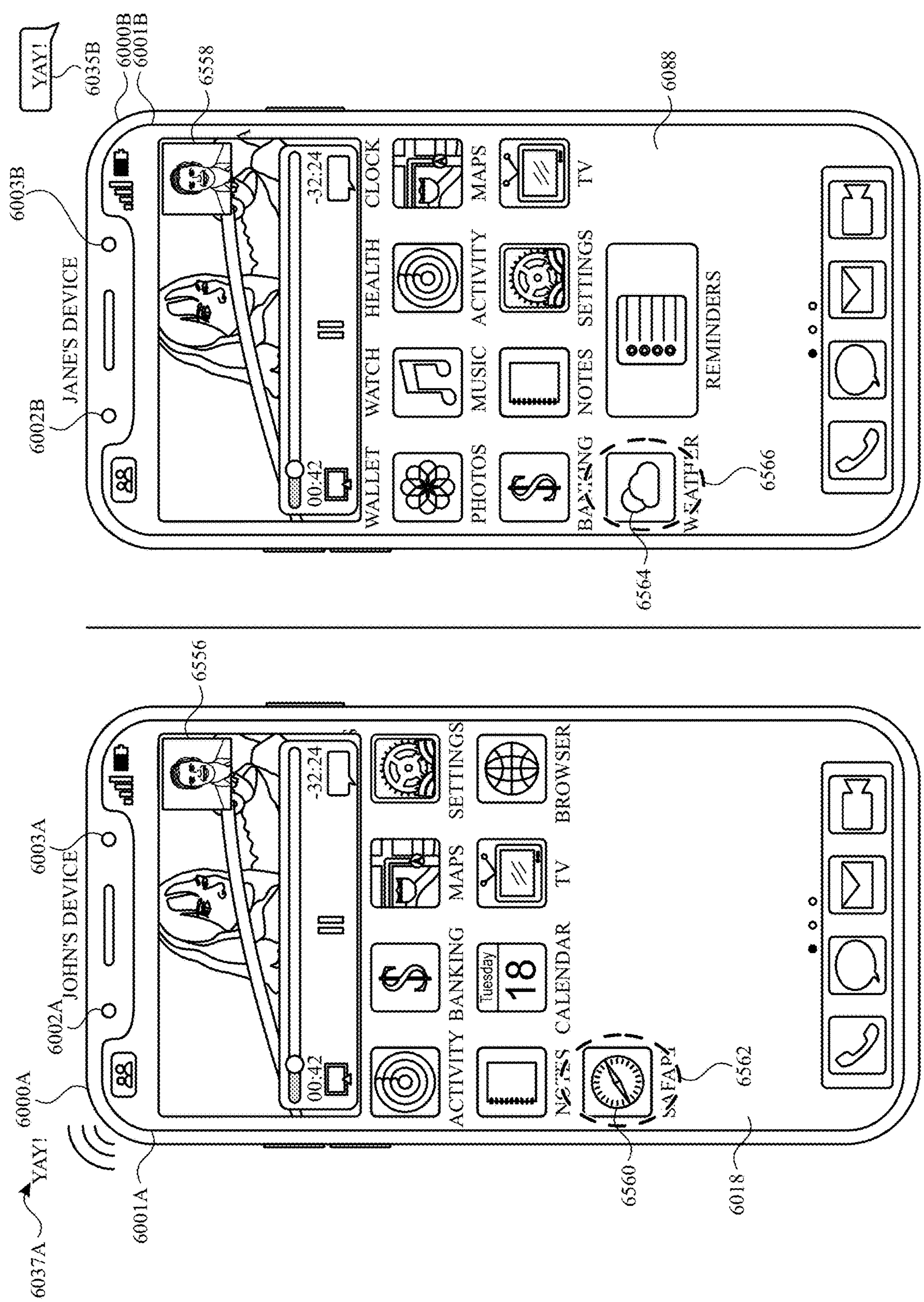
Figure 6D:
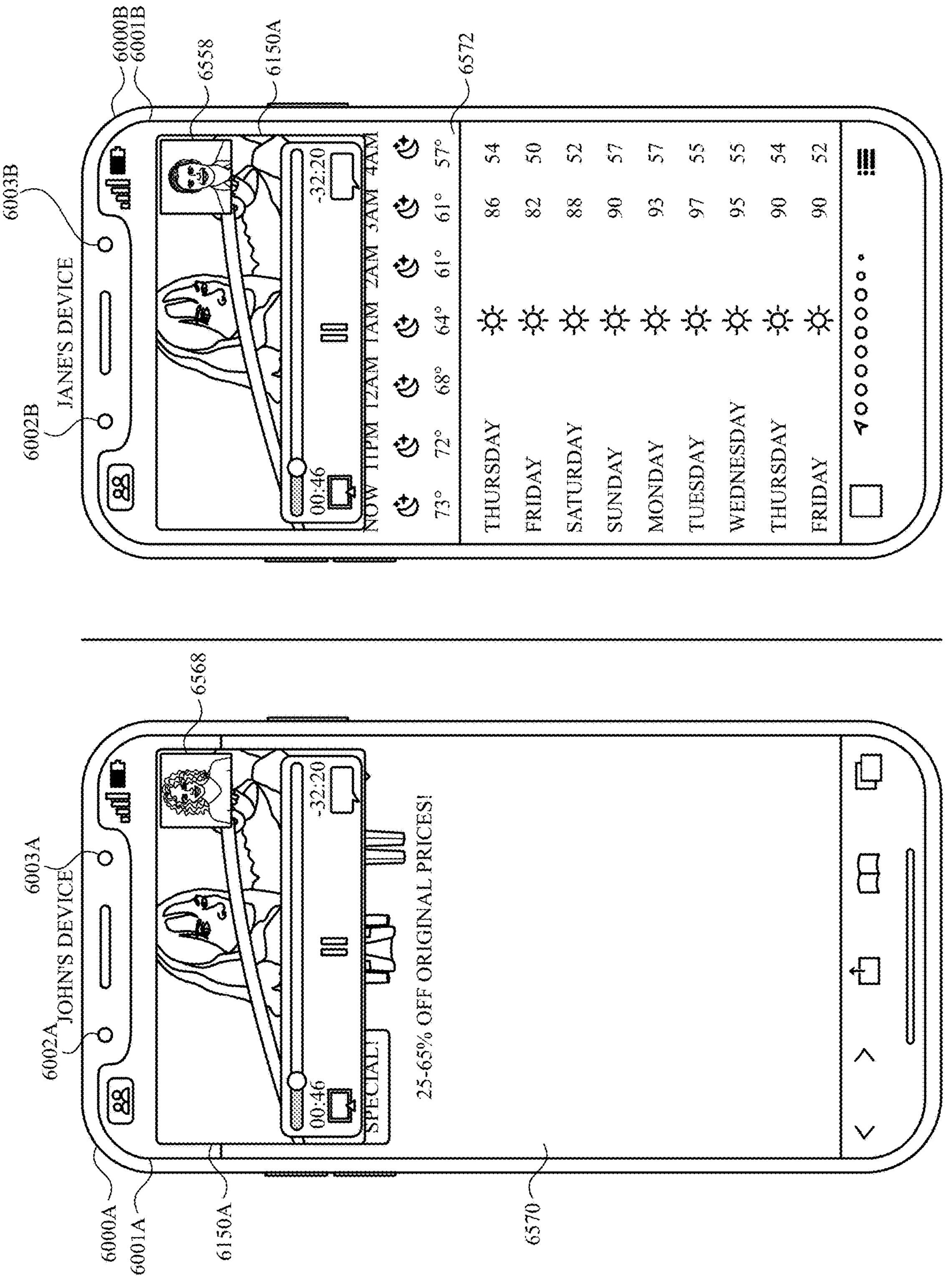
Figure 6D:
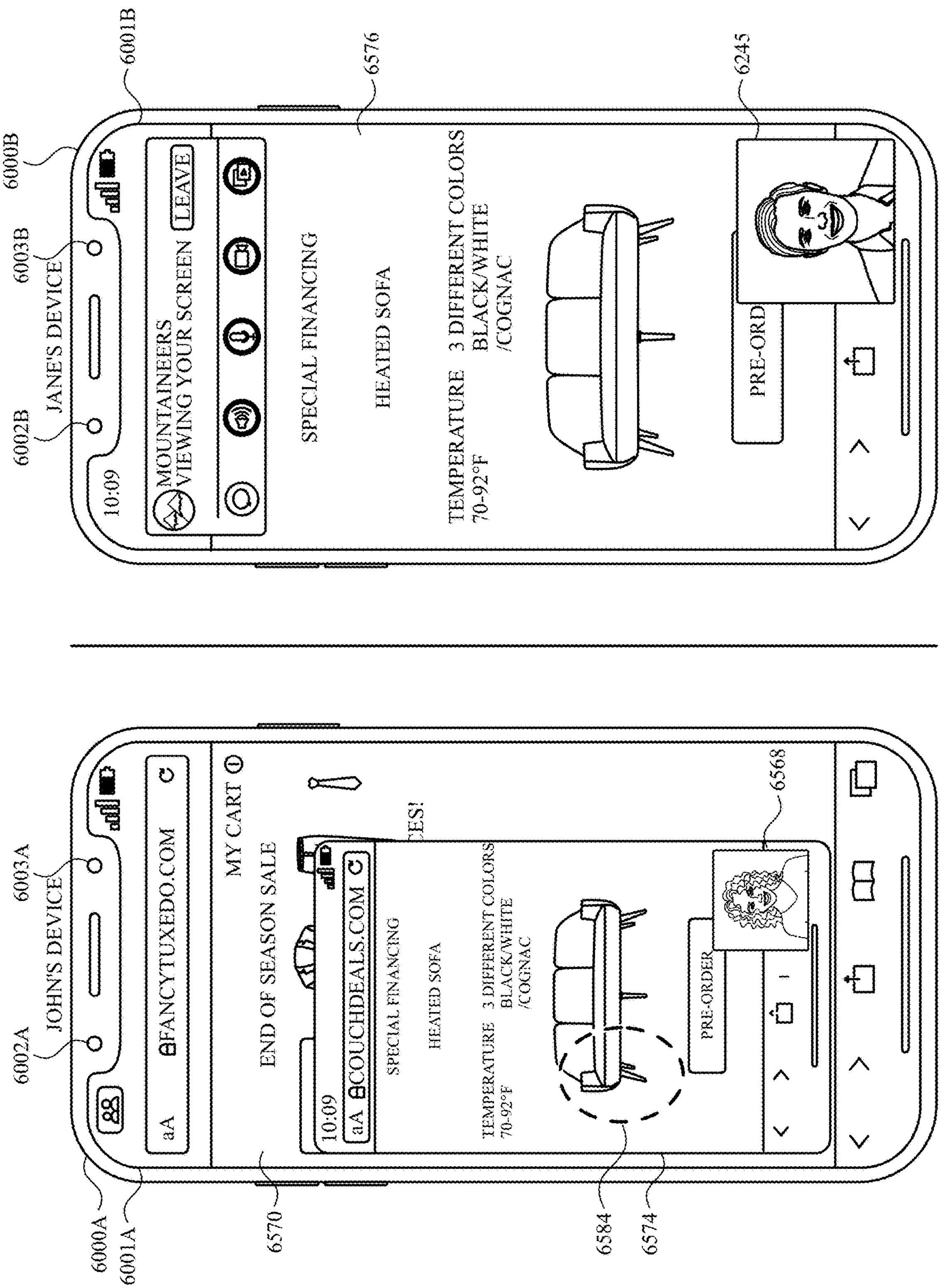
Figure 6D:
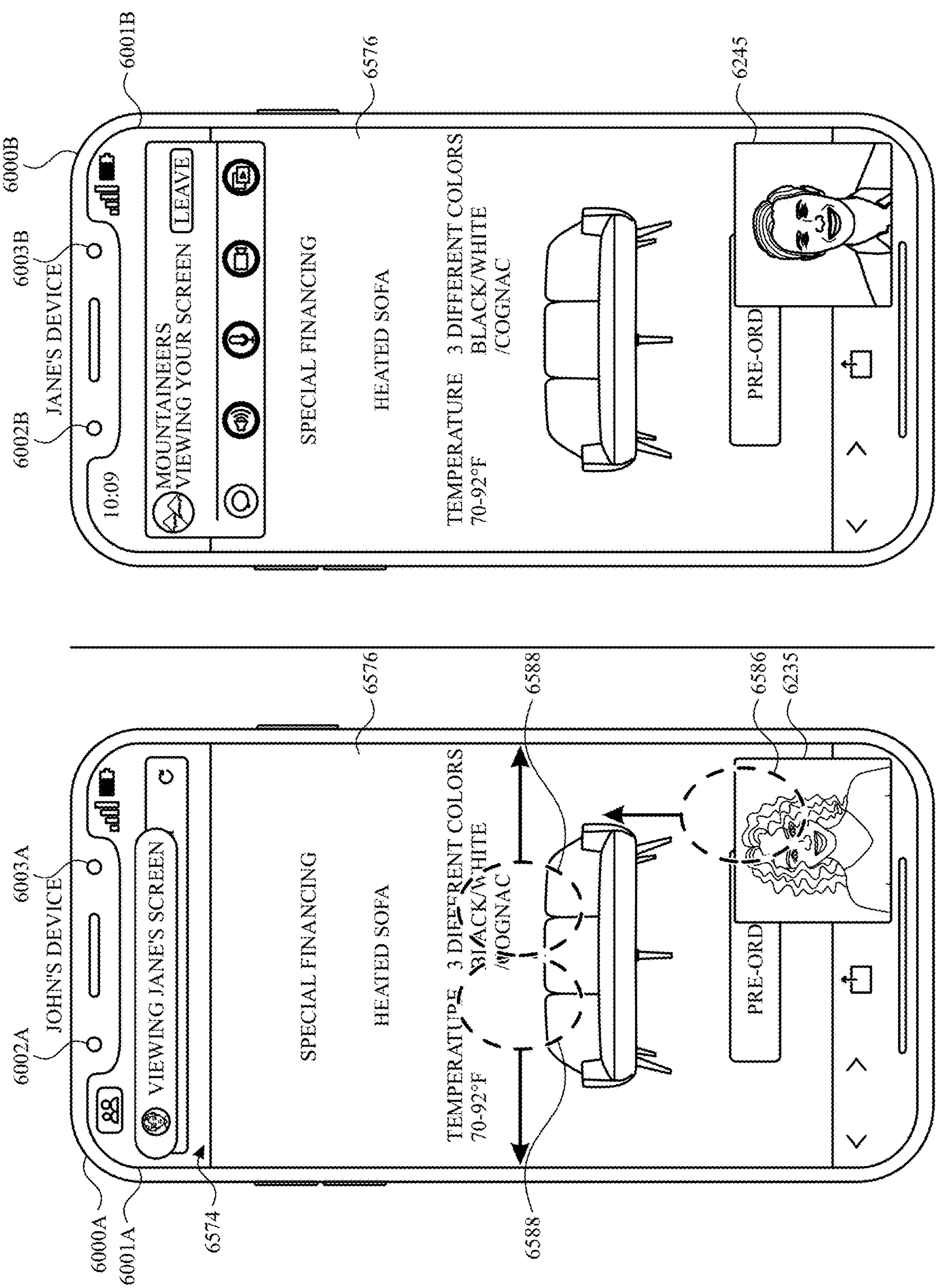
Figure 6D:
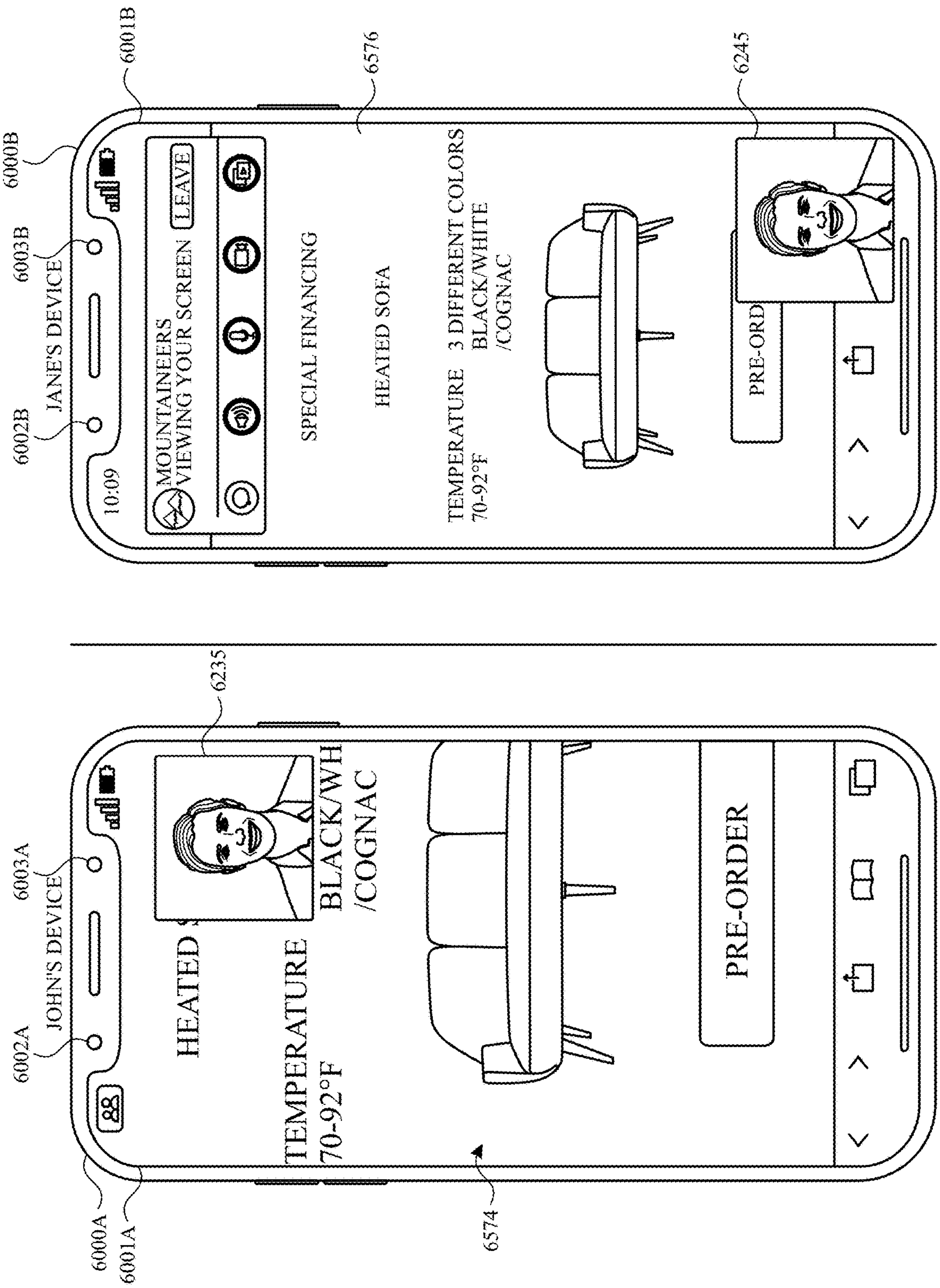
Figure 6D:
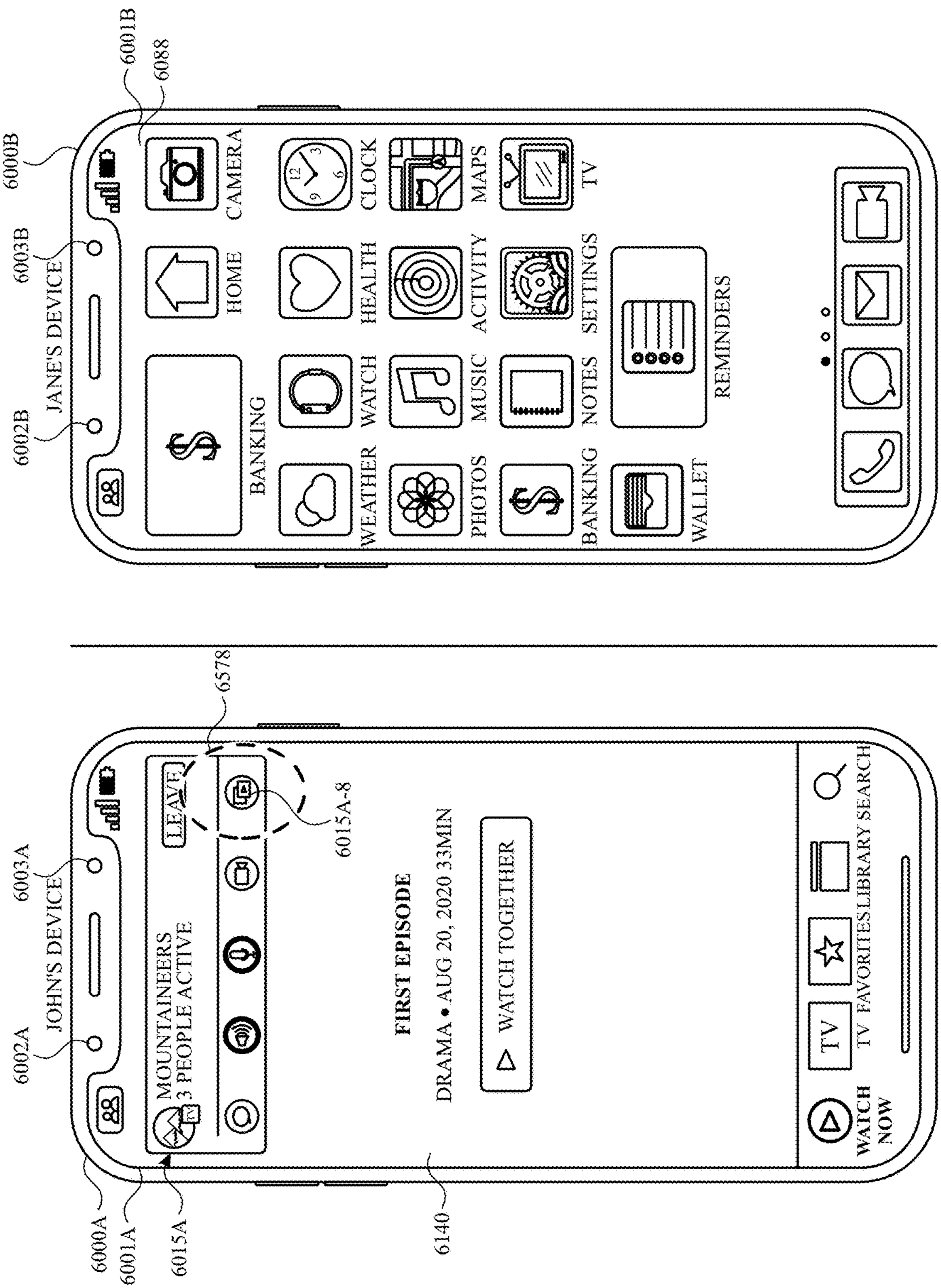
Figure 6D:
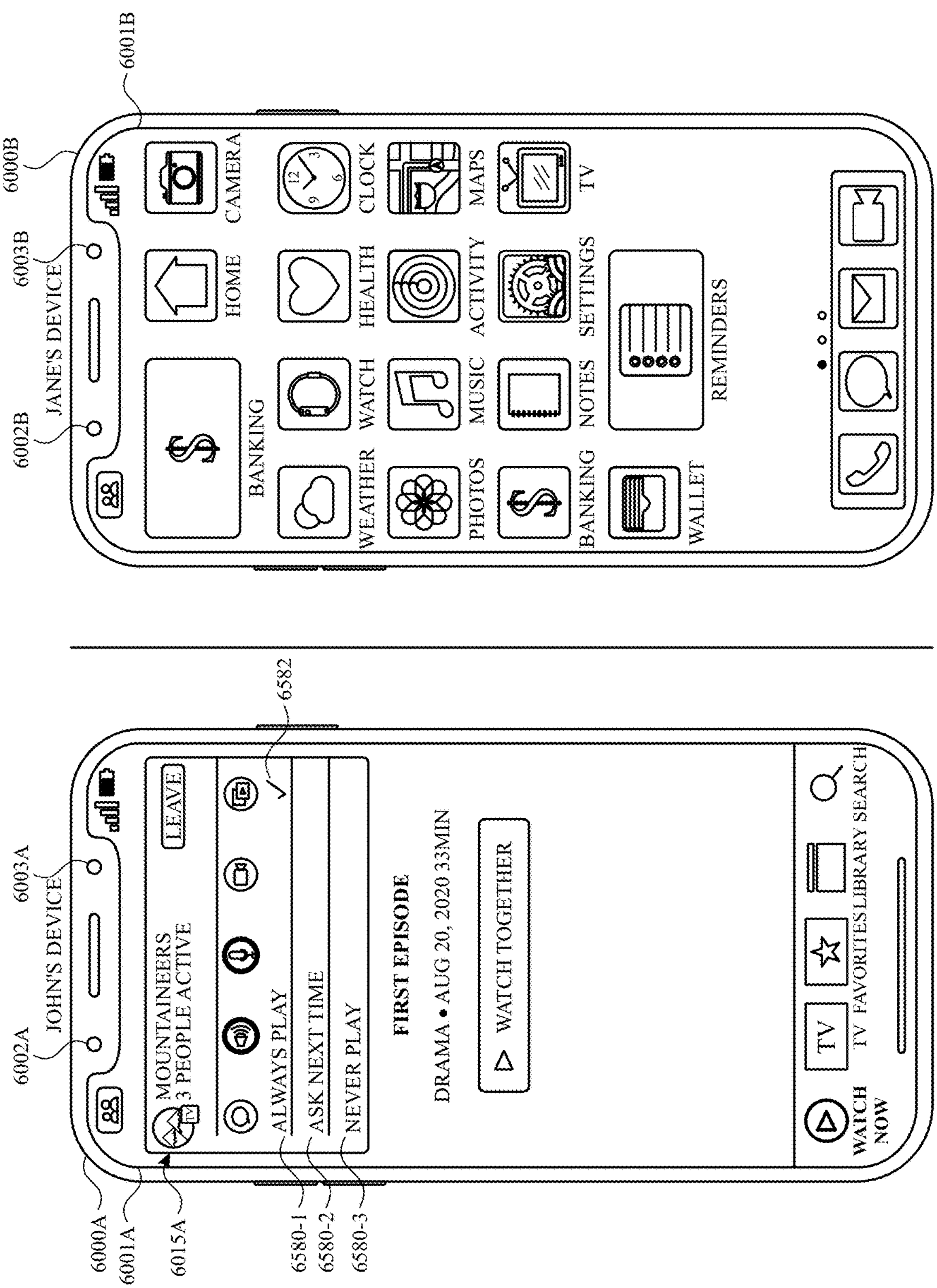
Figure 6D:
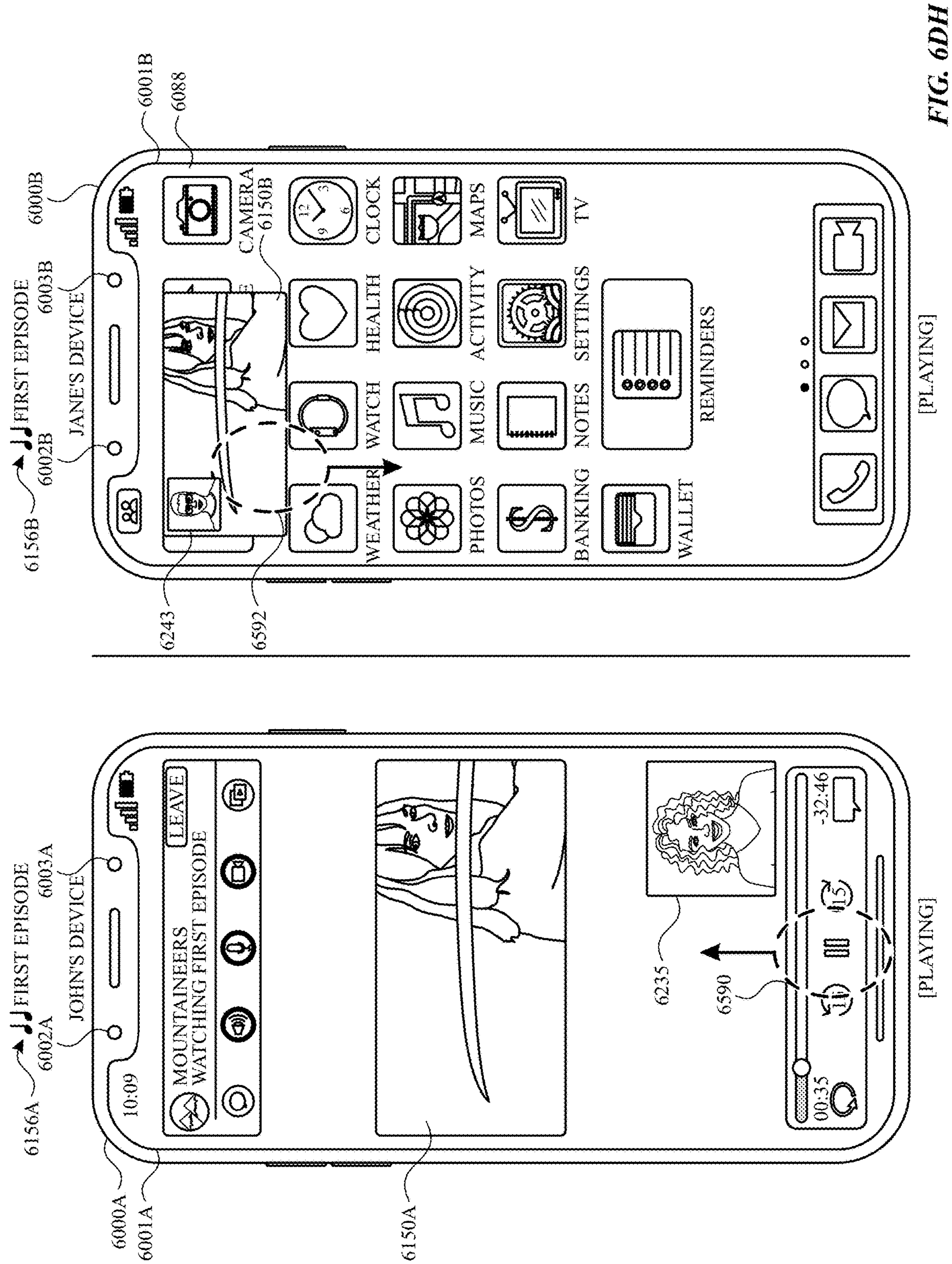
Figure 6D:
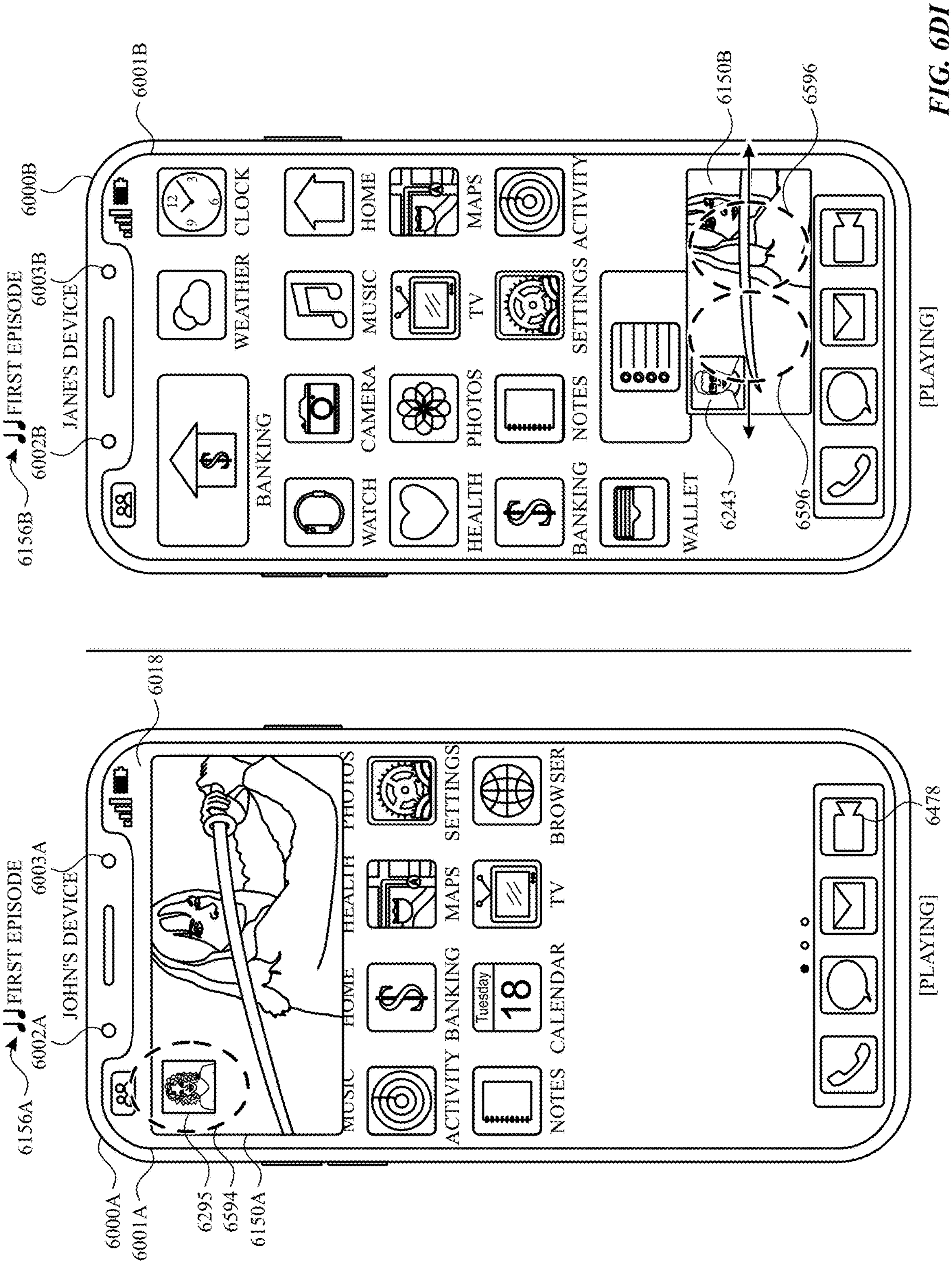
Figure 6D:
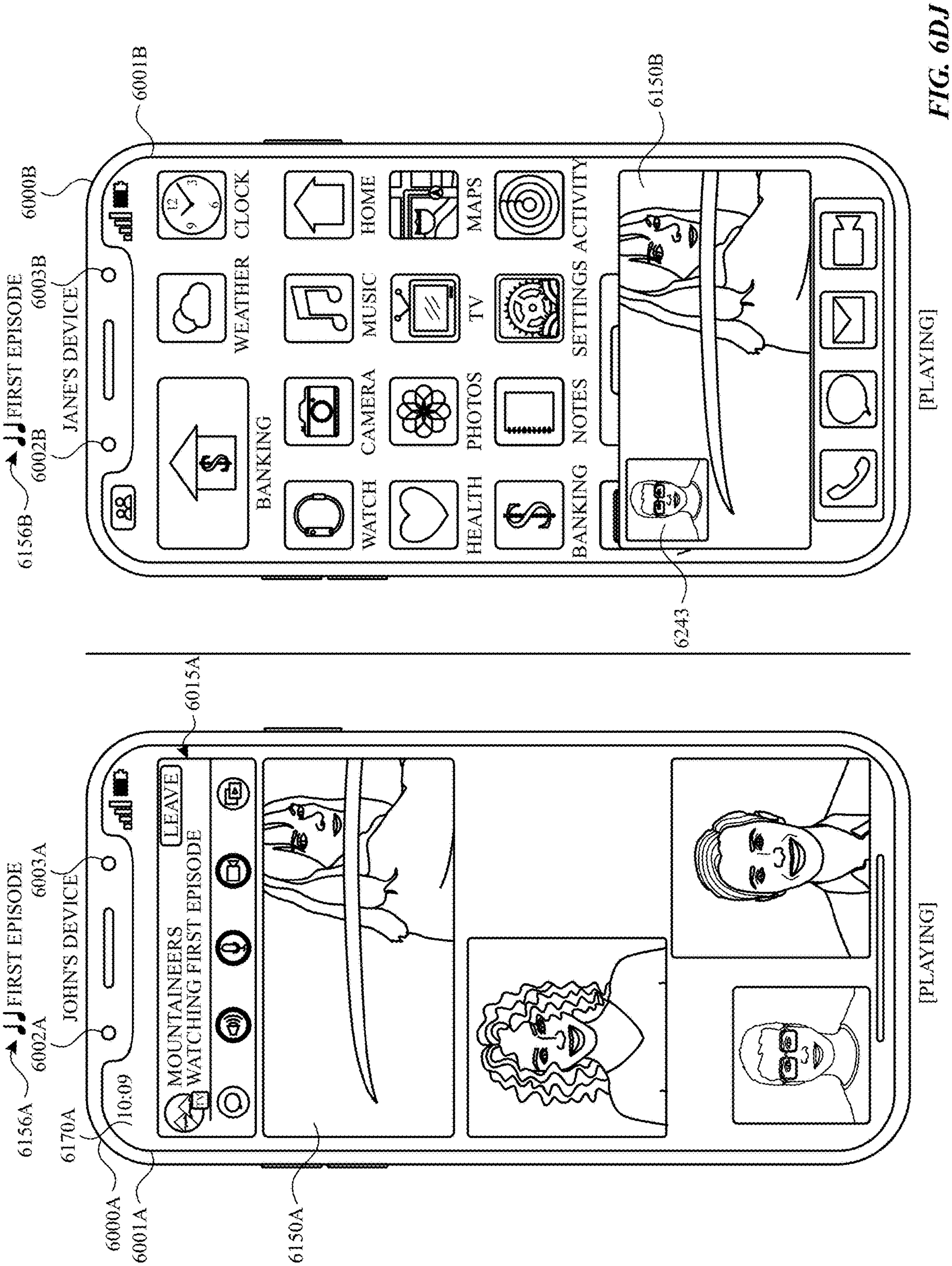
Figure 6D:
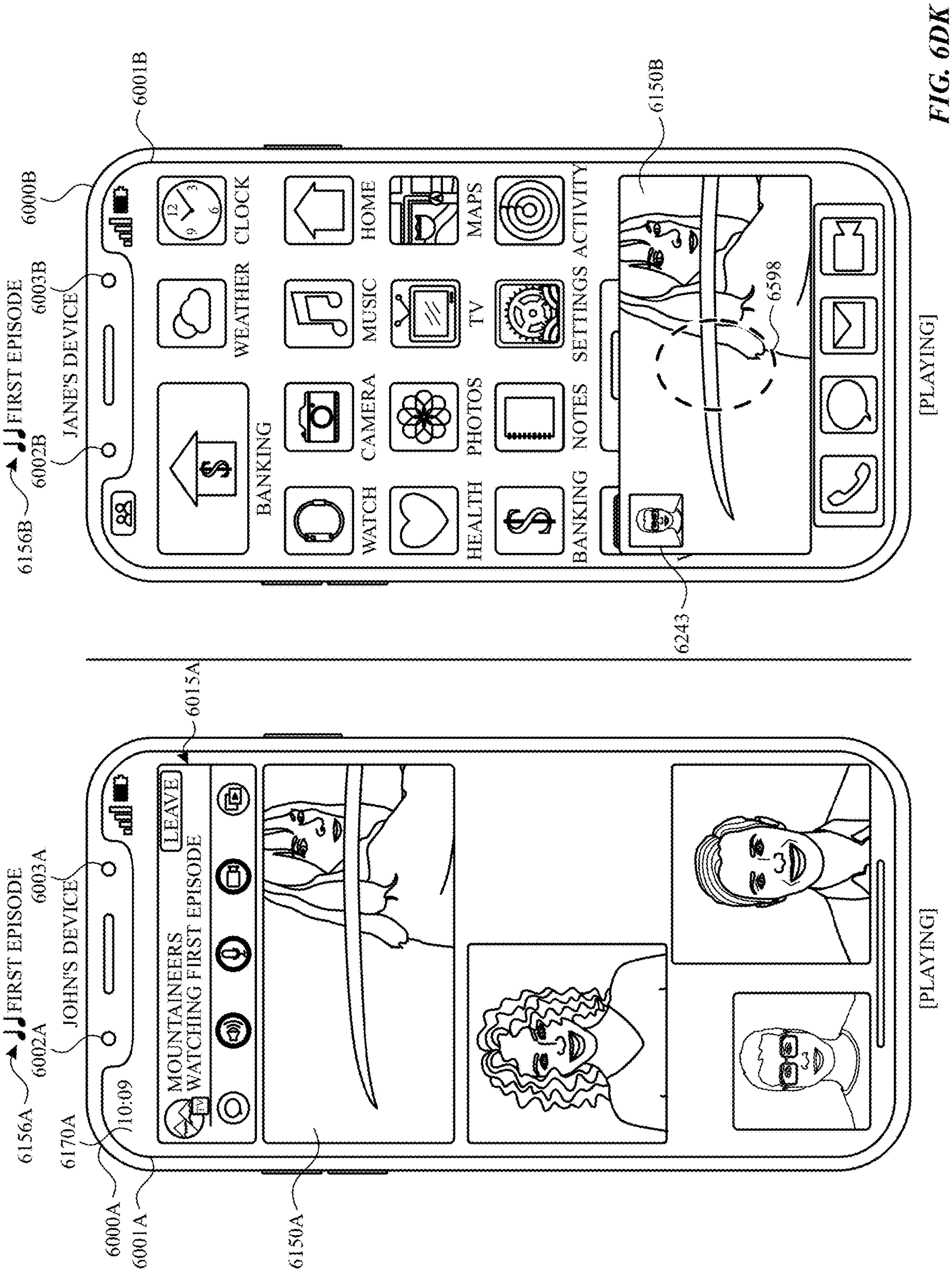
Figure 6D:
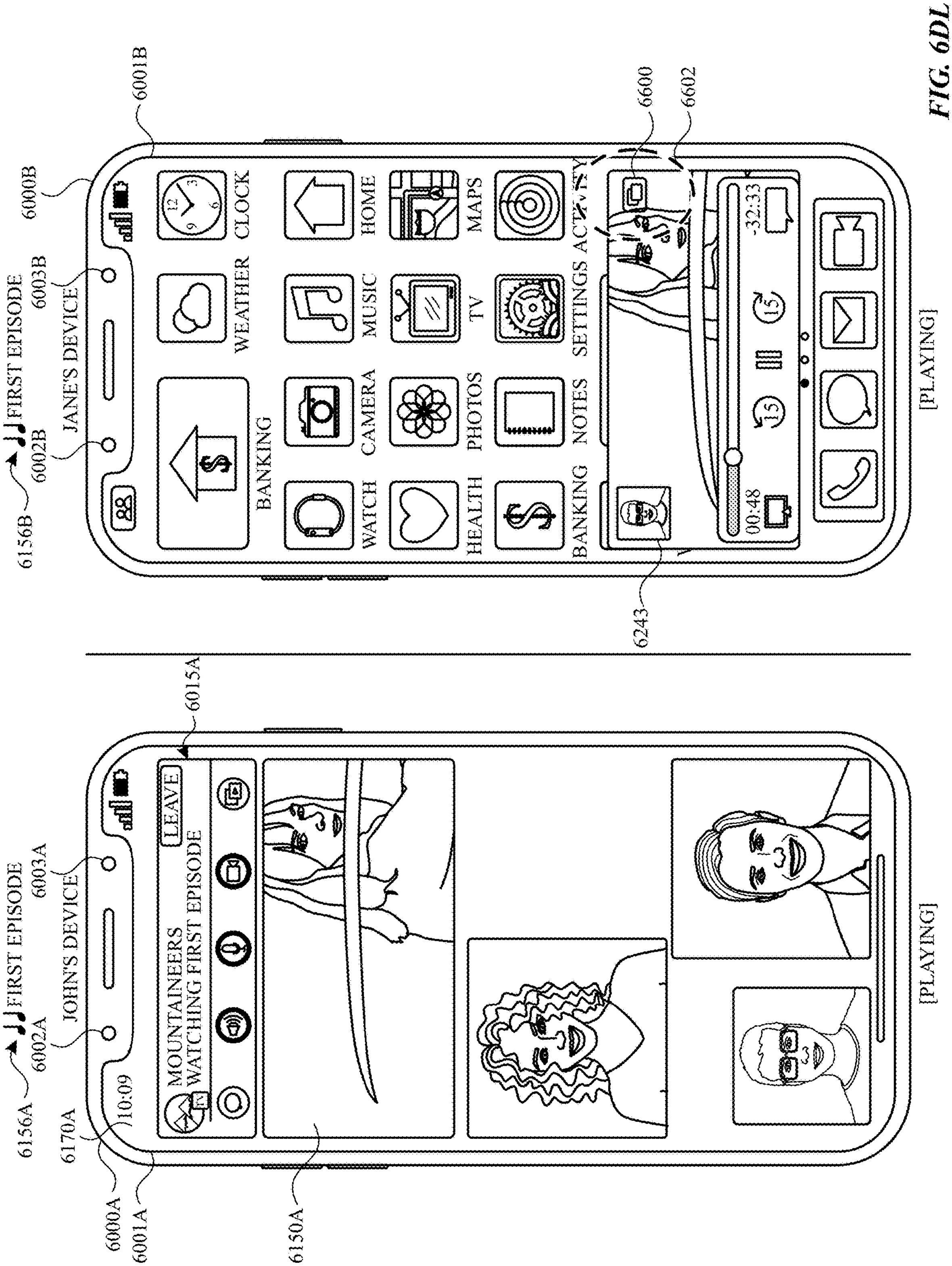
Figure 6D:
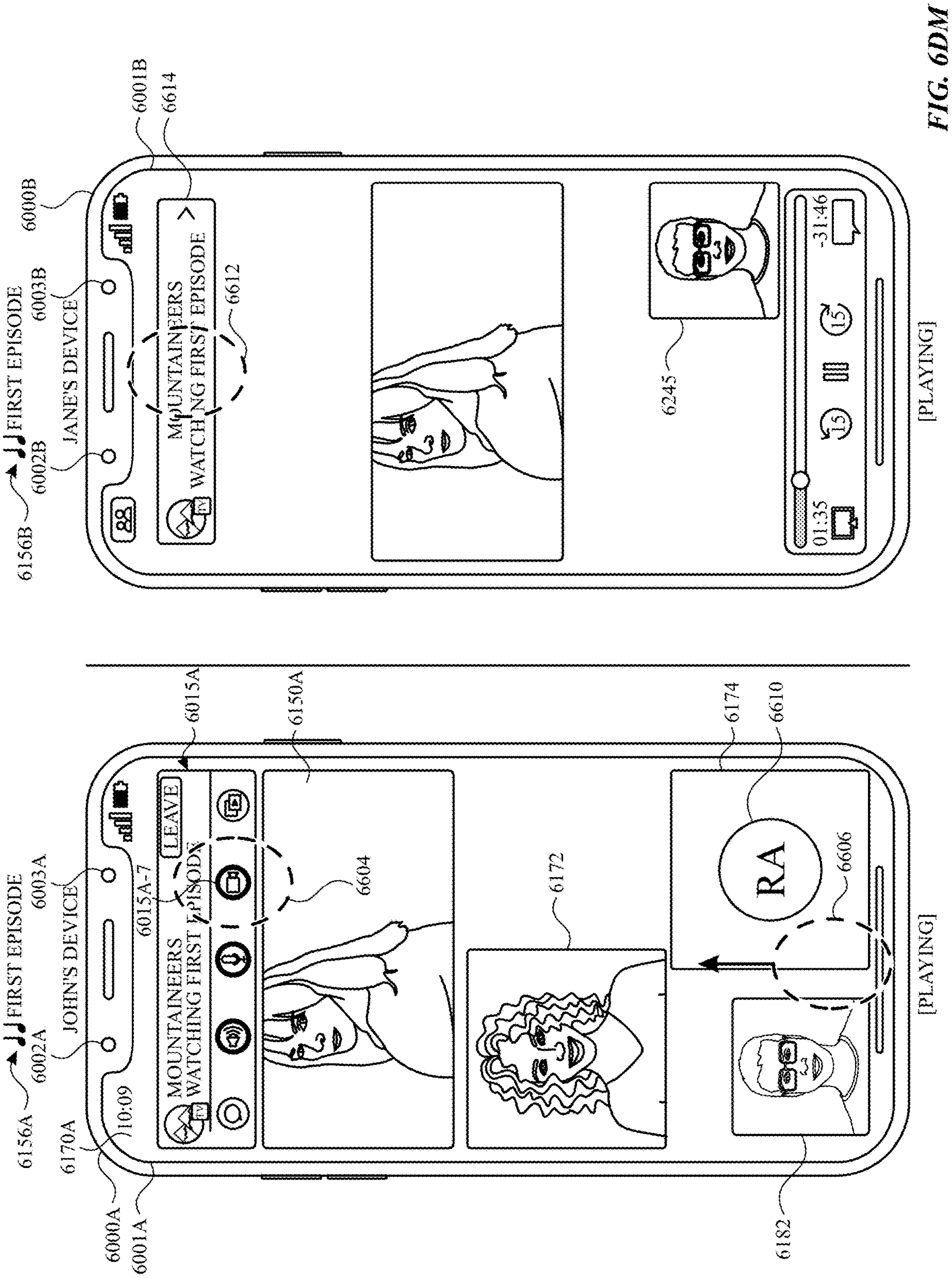
Figure 6D:
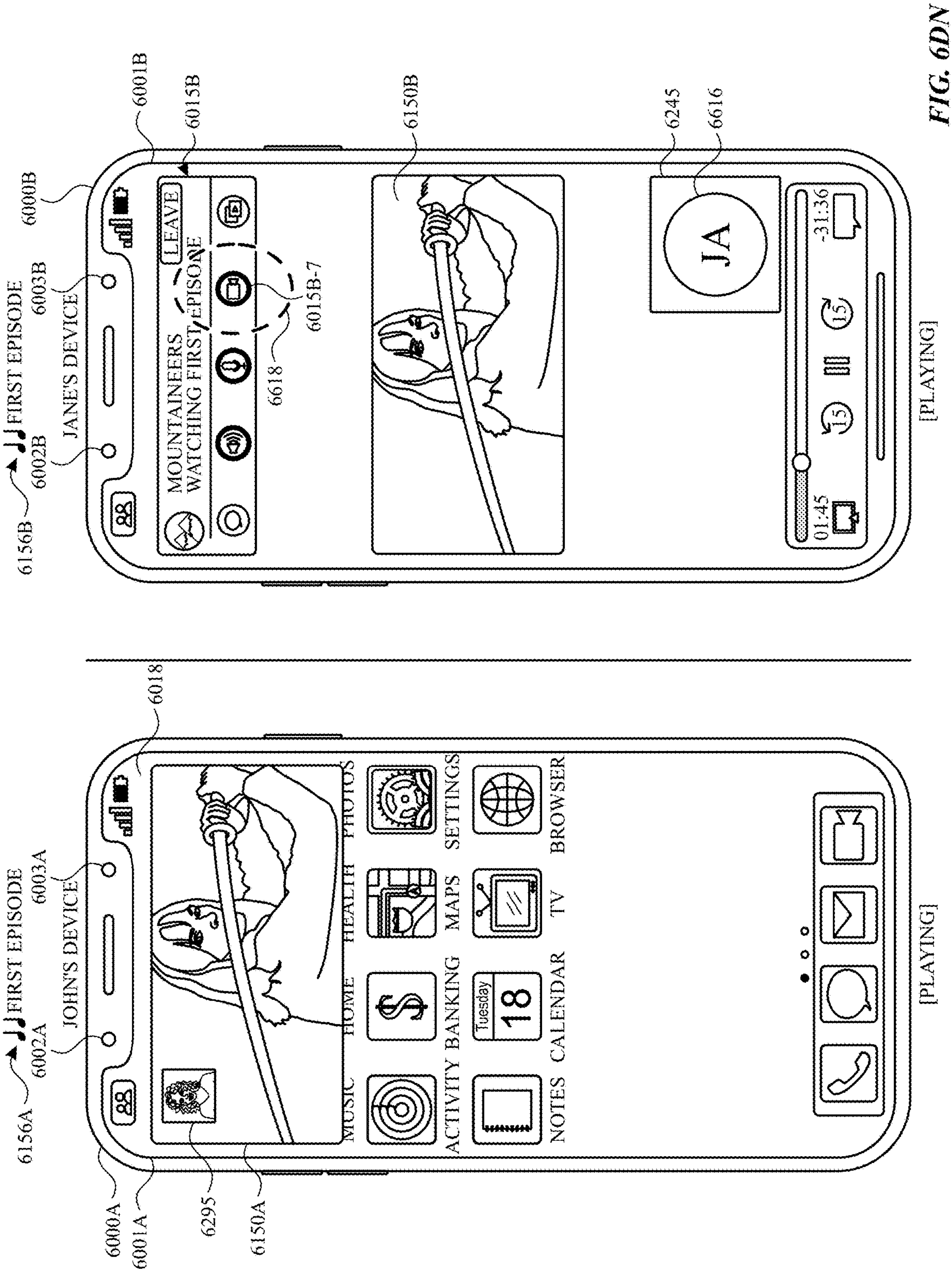
Figure 6D:
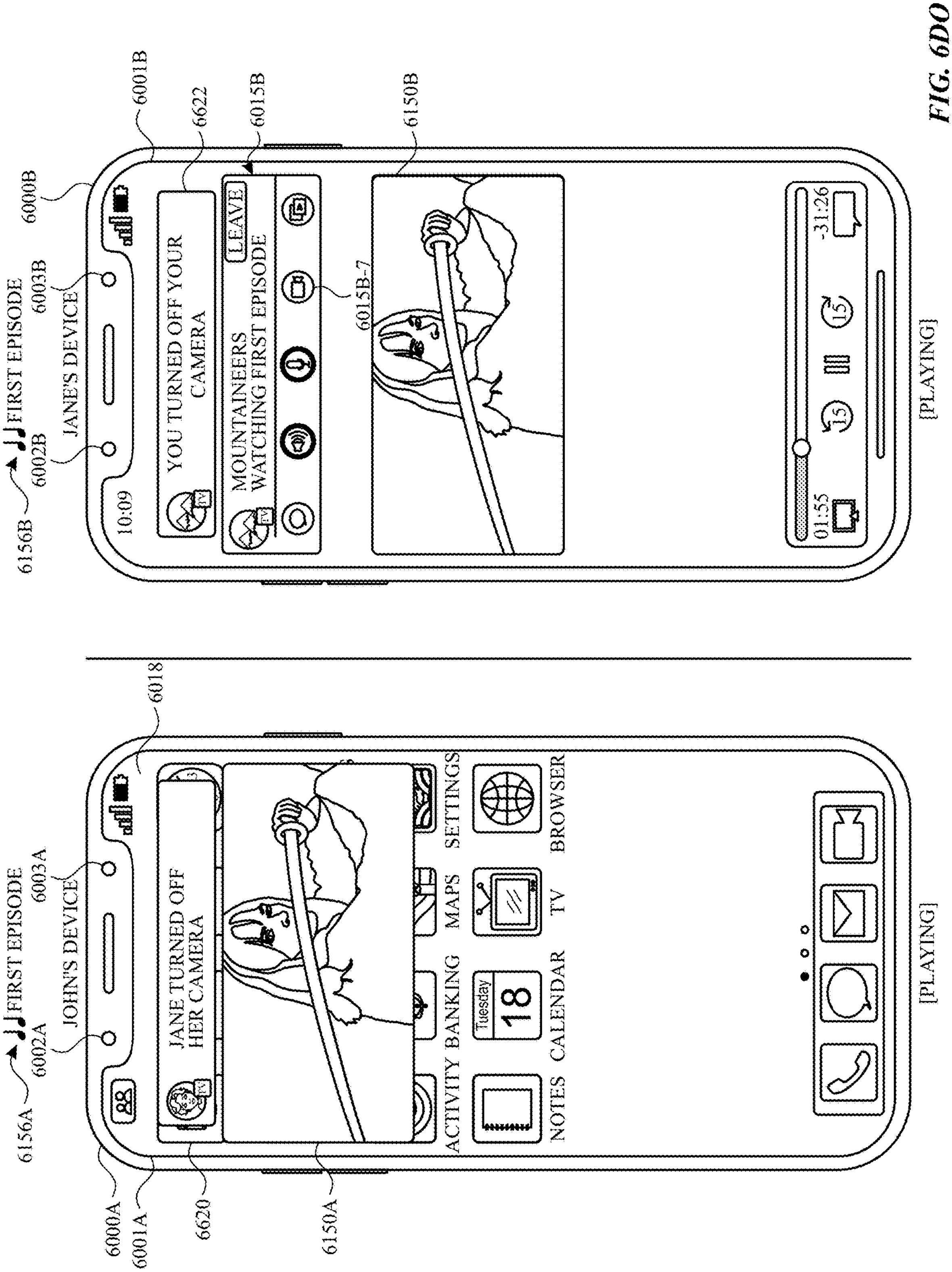
Figure 6D:
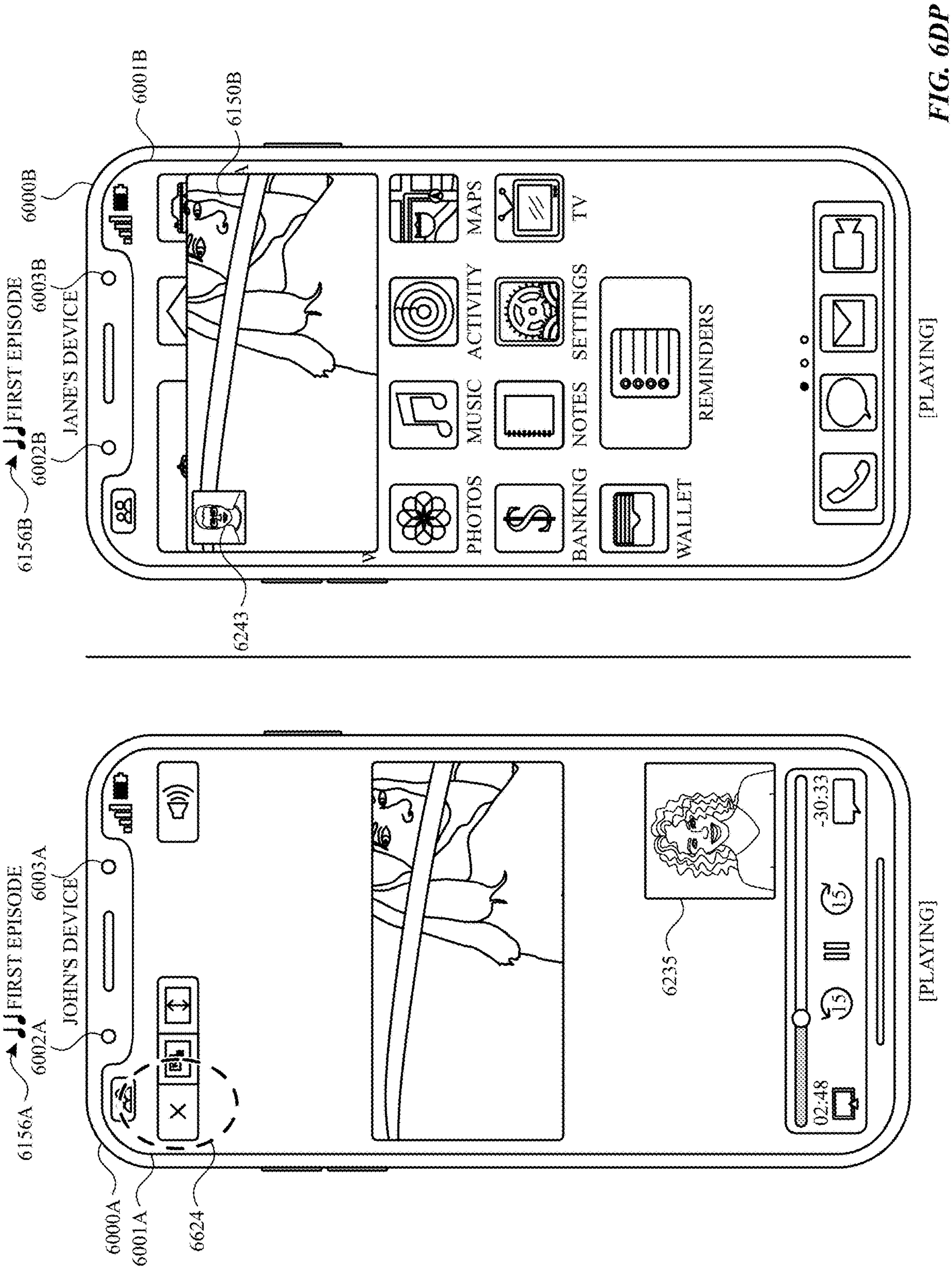
Figure 6D:
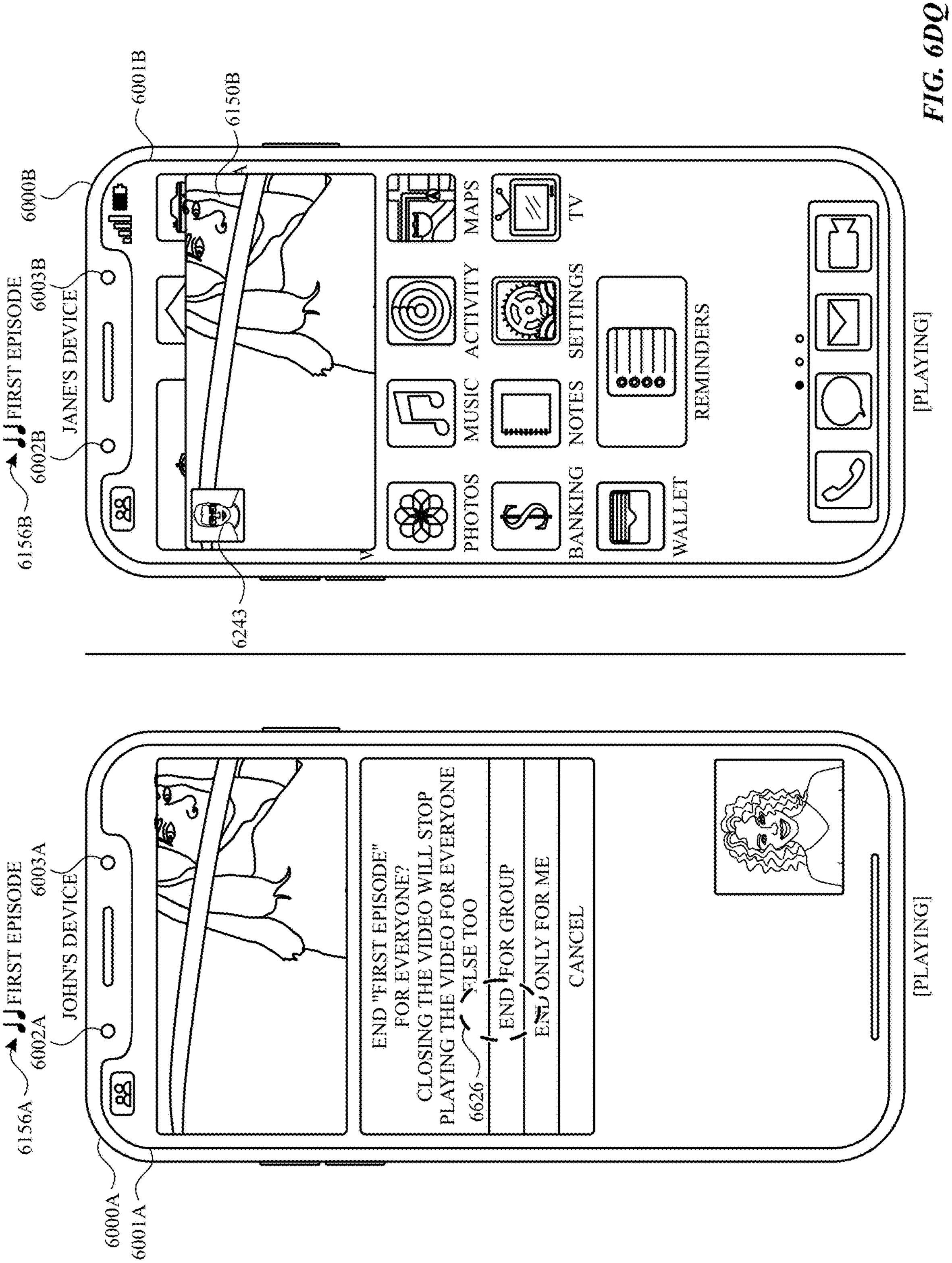
Figure 6D:
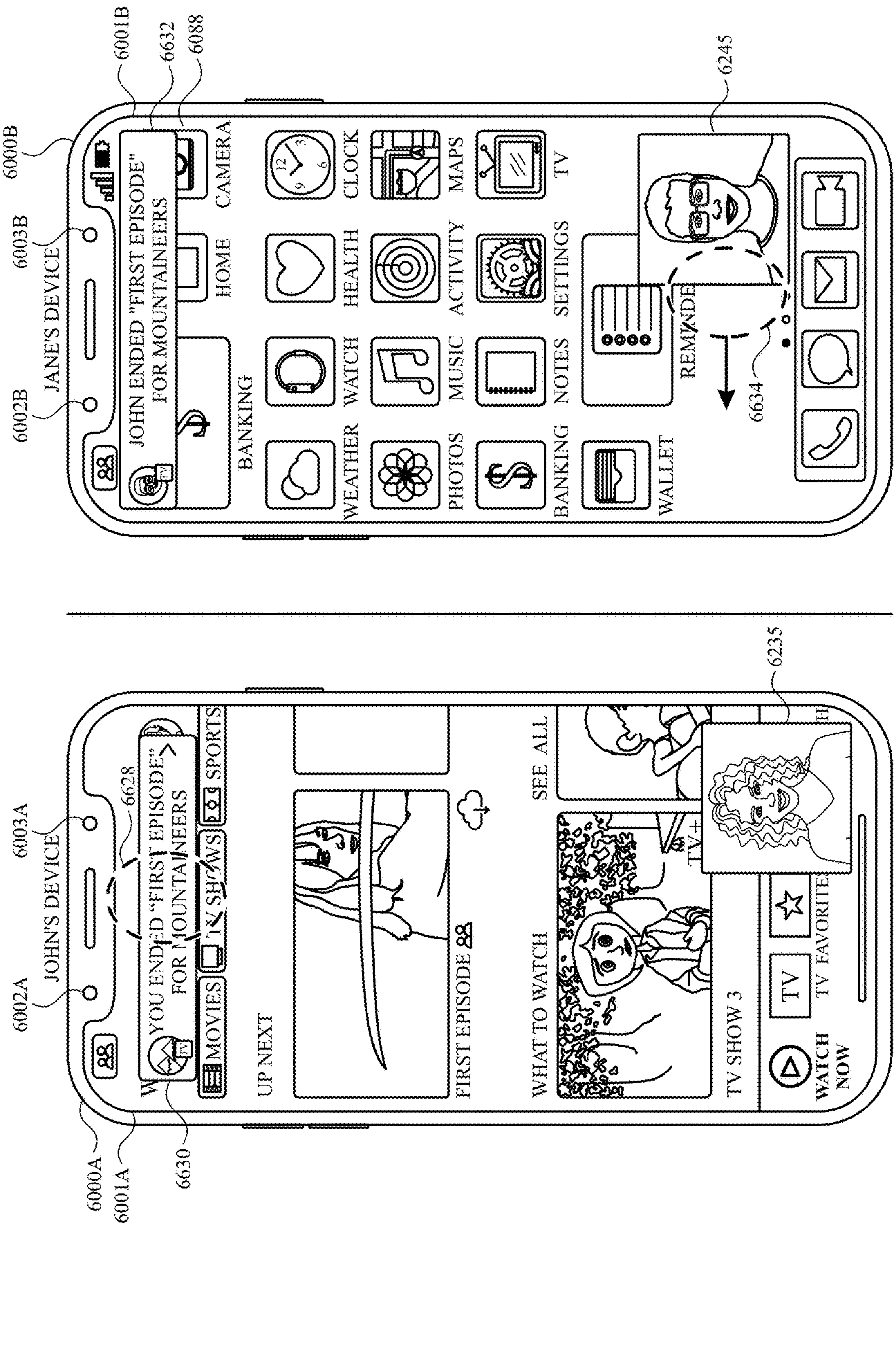
Figure 6D:
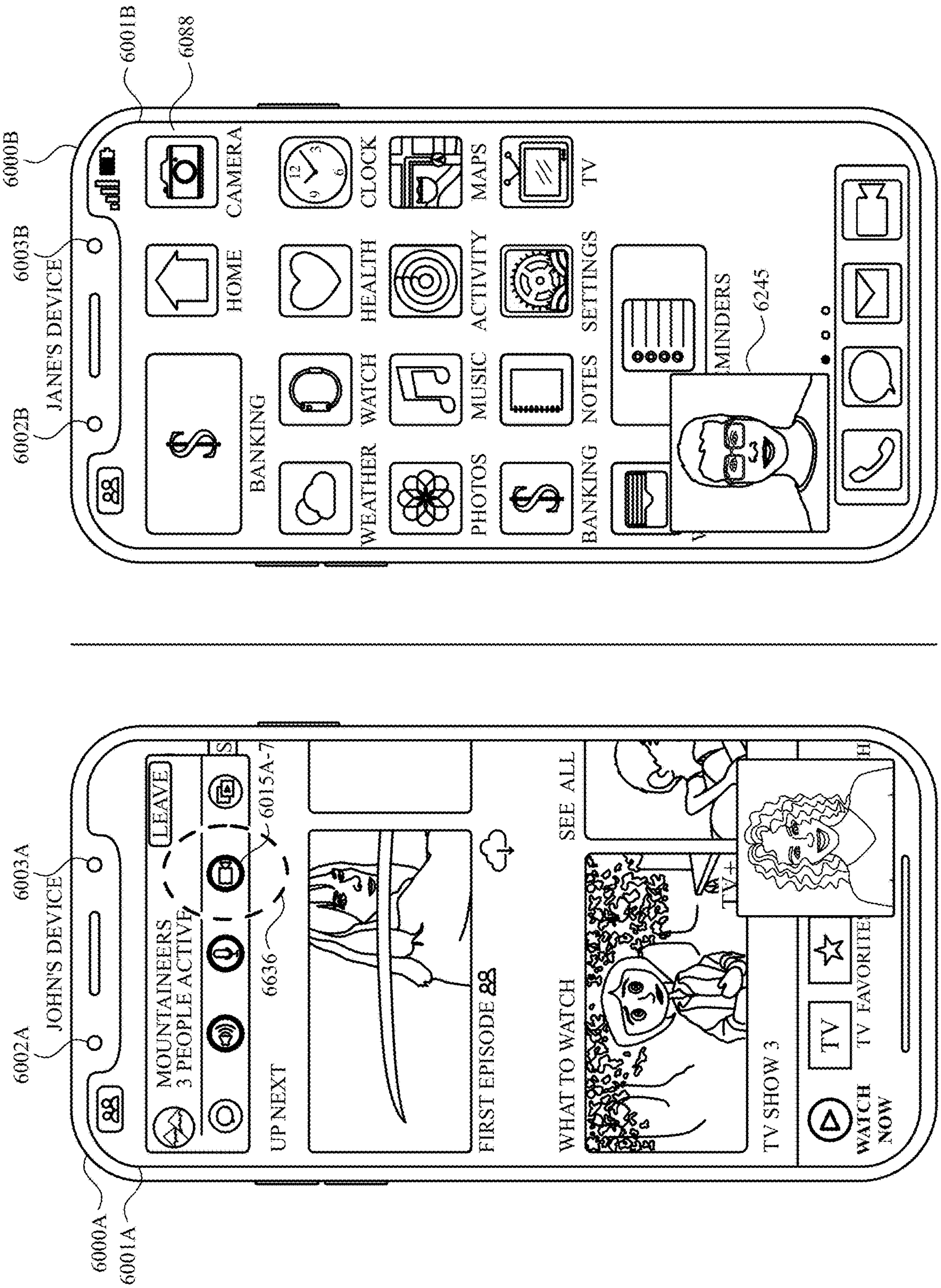
Figure 6D:
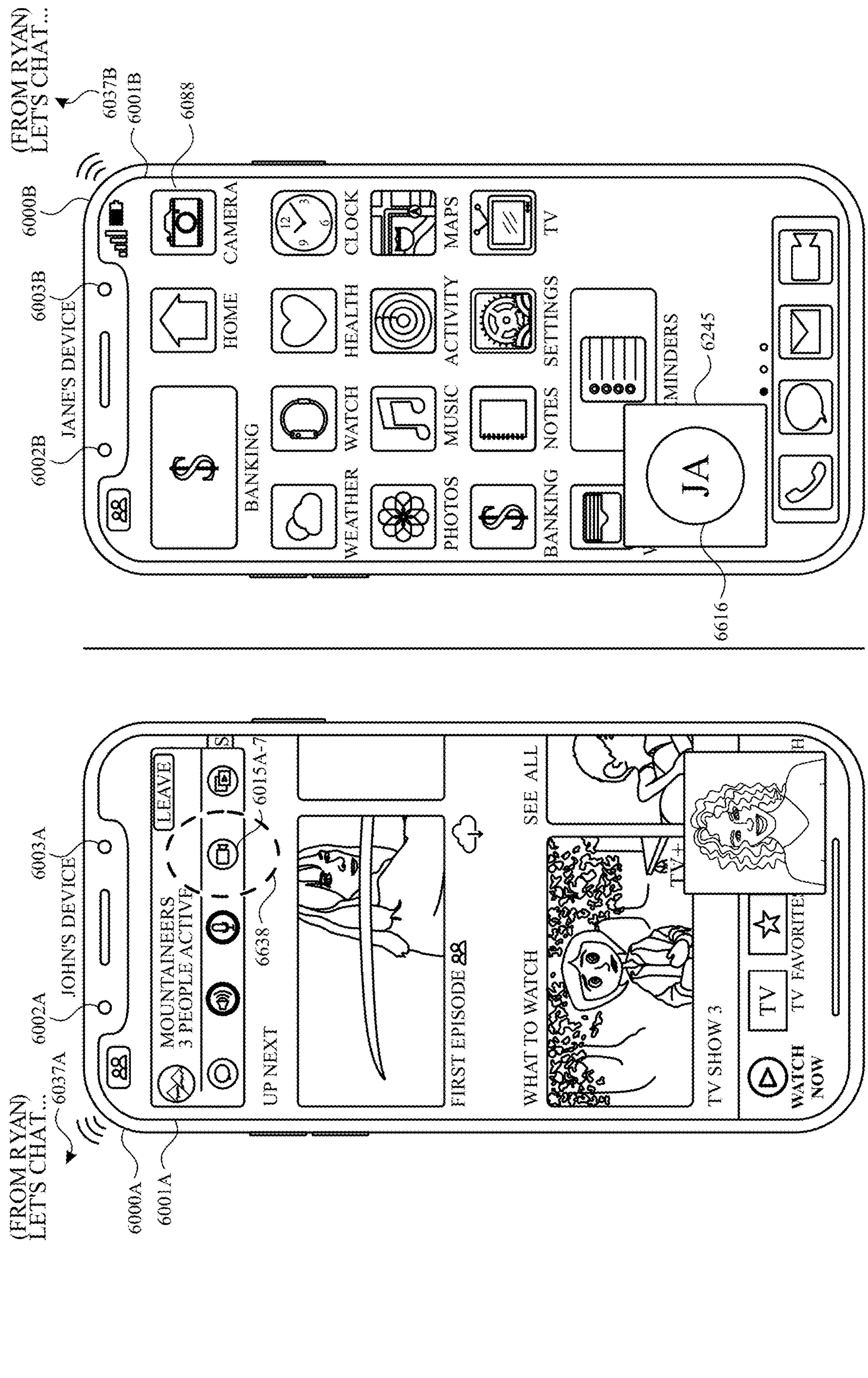
Figure 6D:
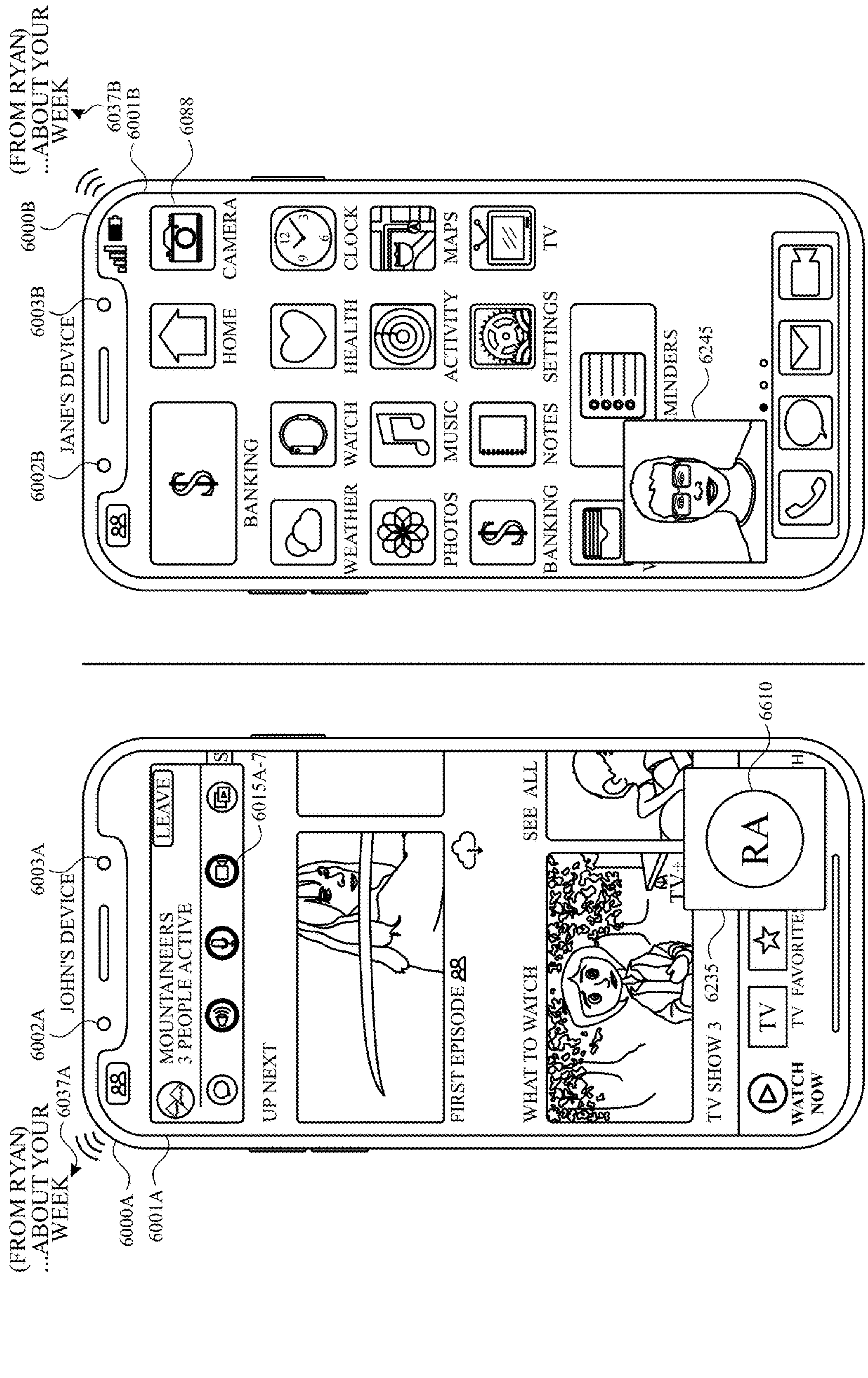
Figure 6D:
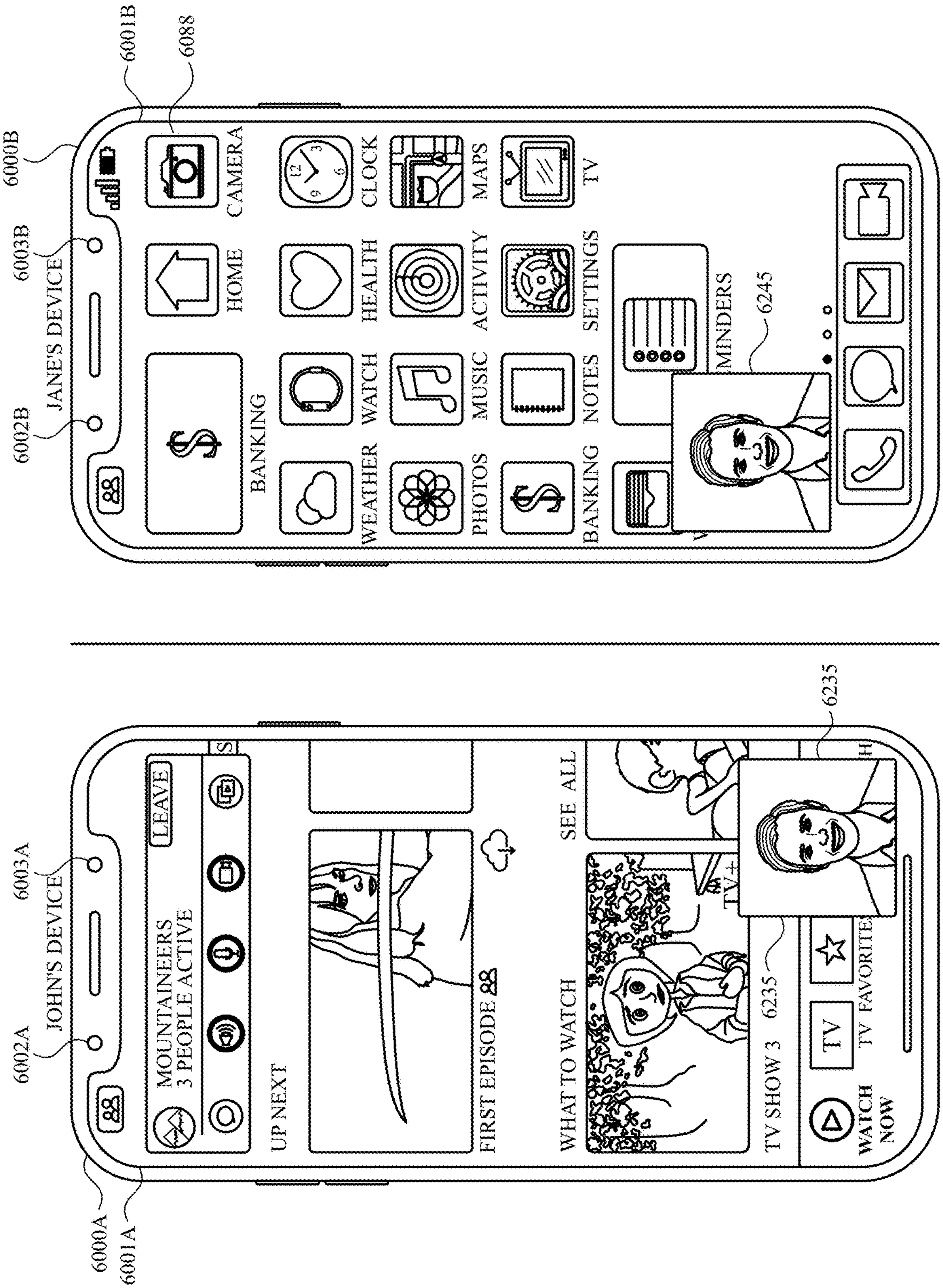
Figure 6D:
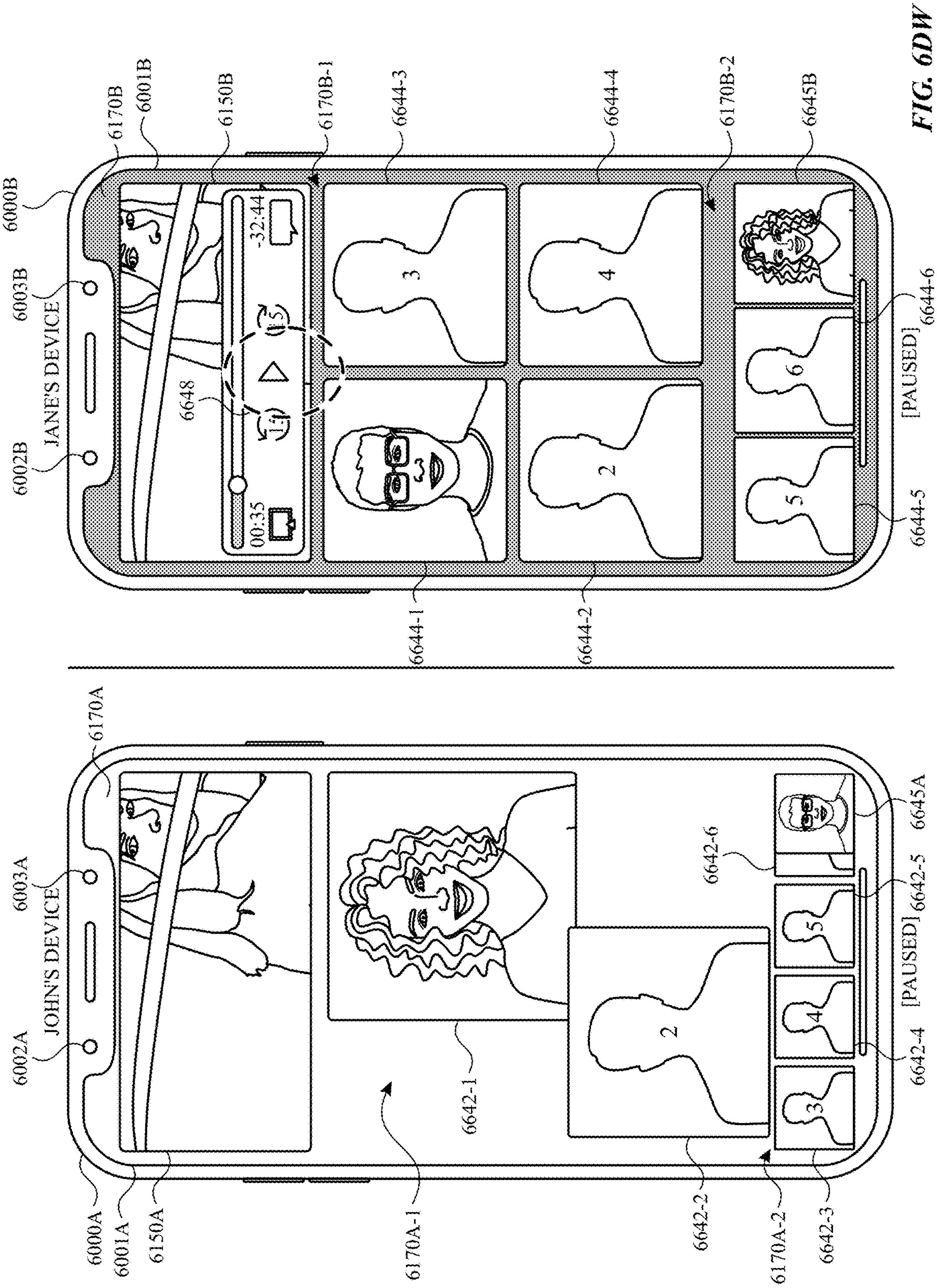
Figure 6D:
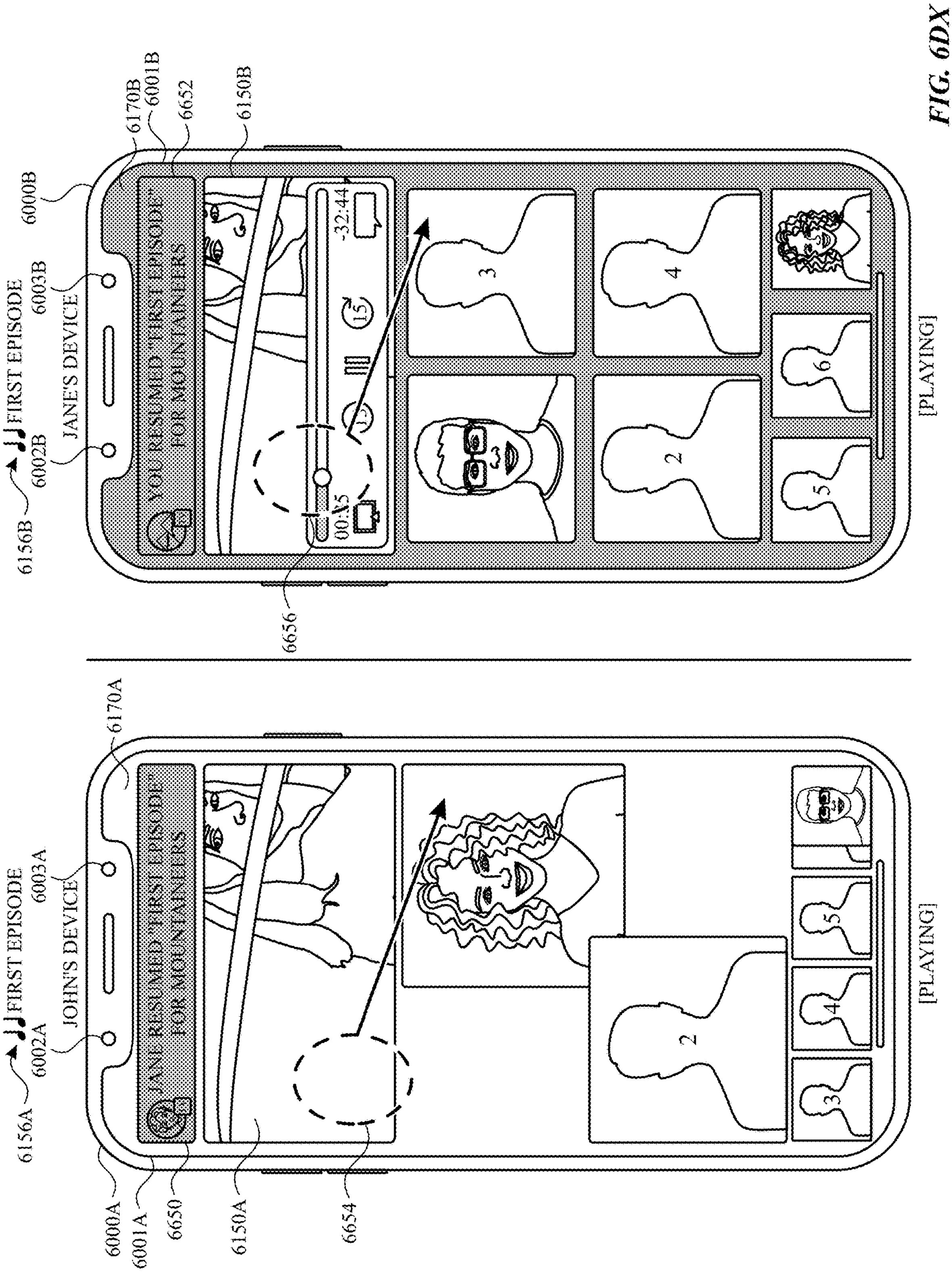
Figure 6D:
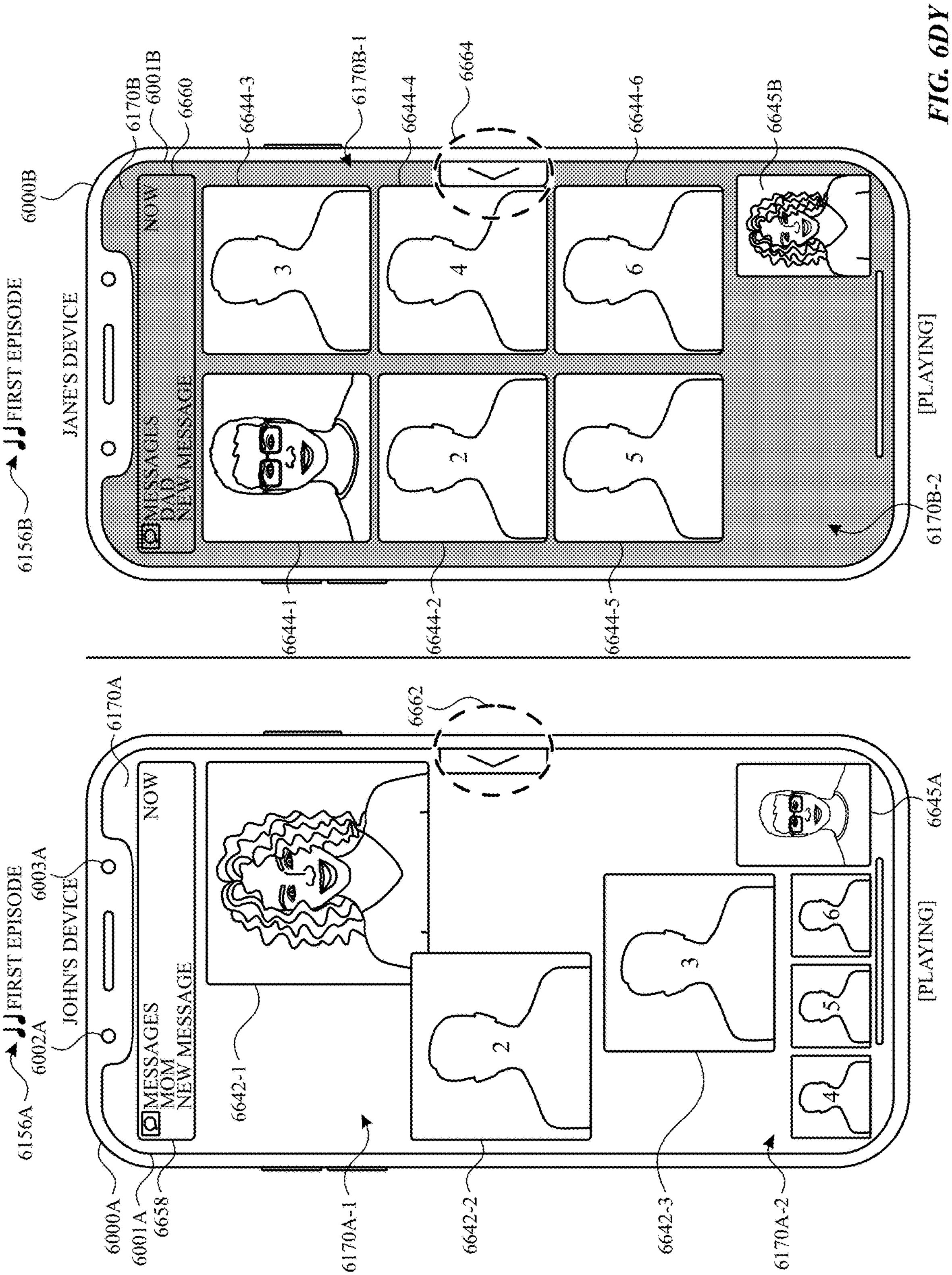
Figure 6D:
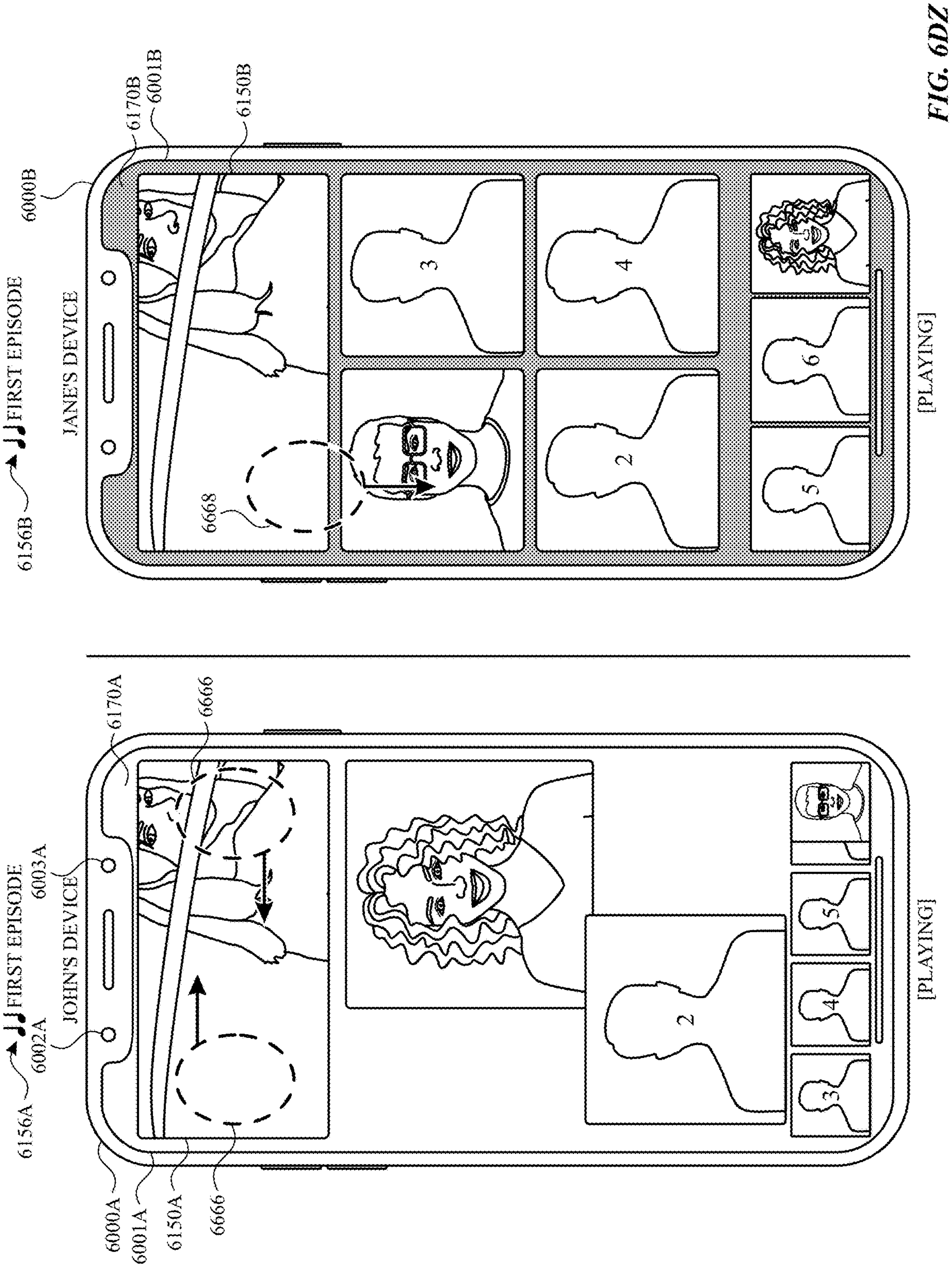
Figure 6E:
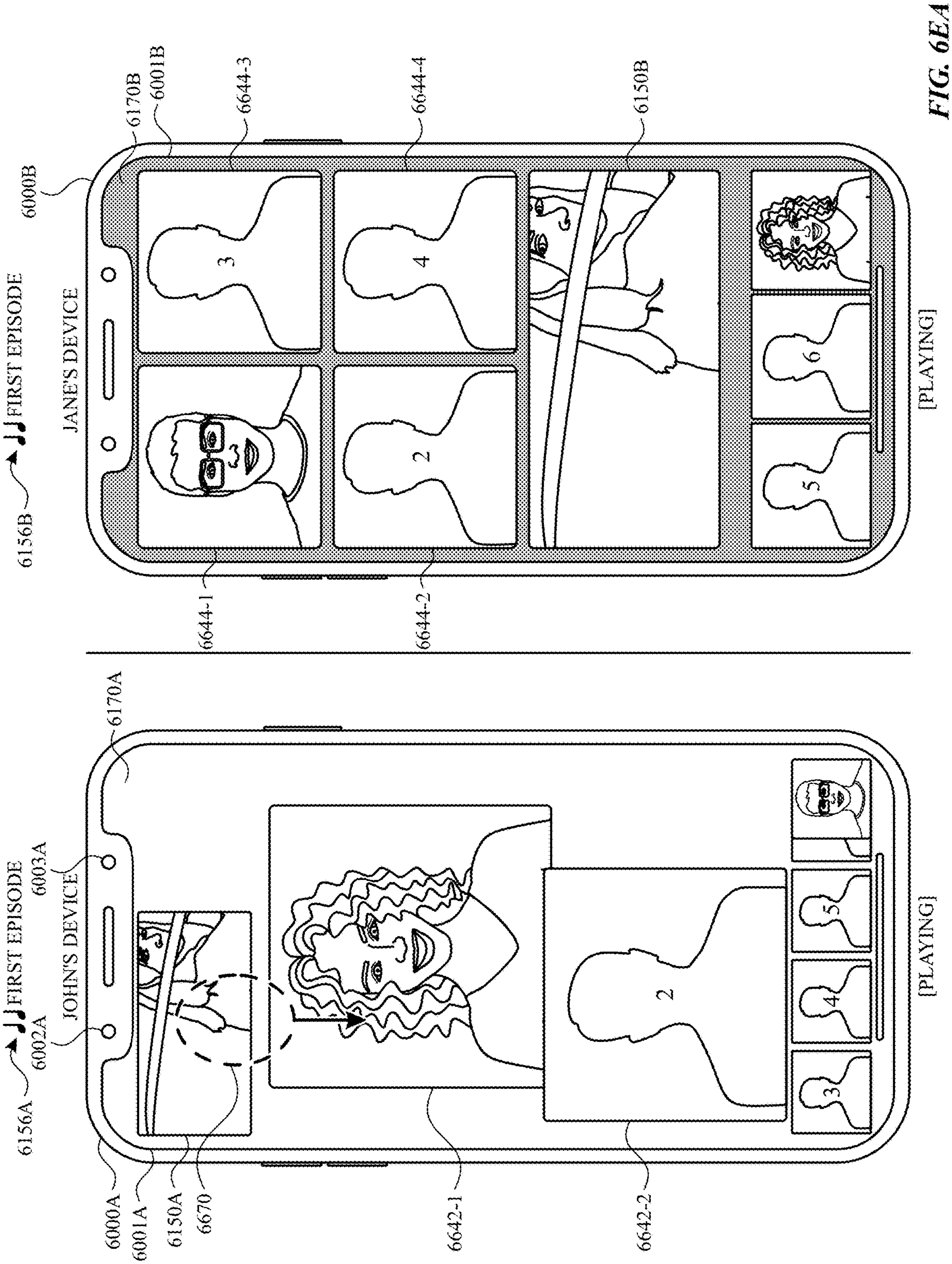
Figure 6E:
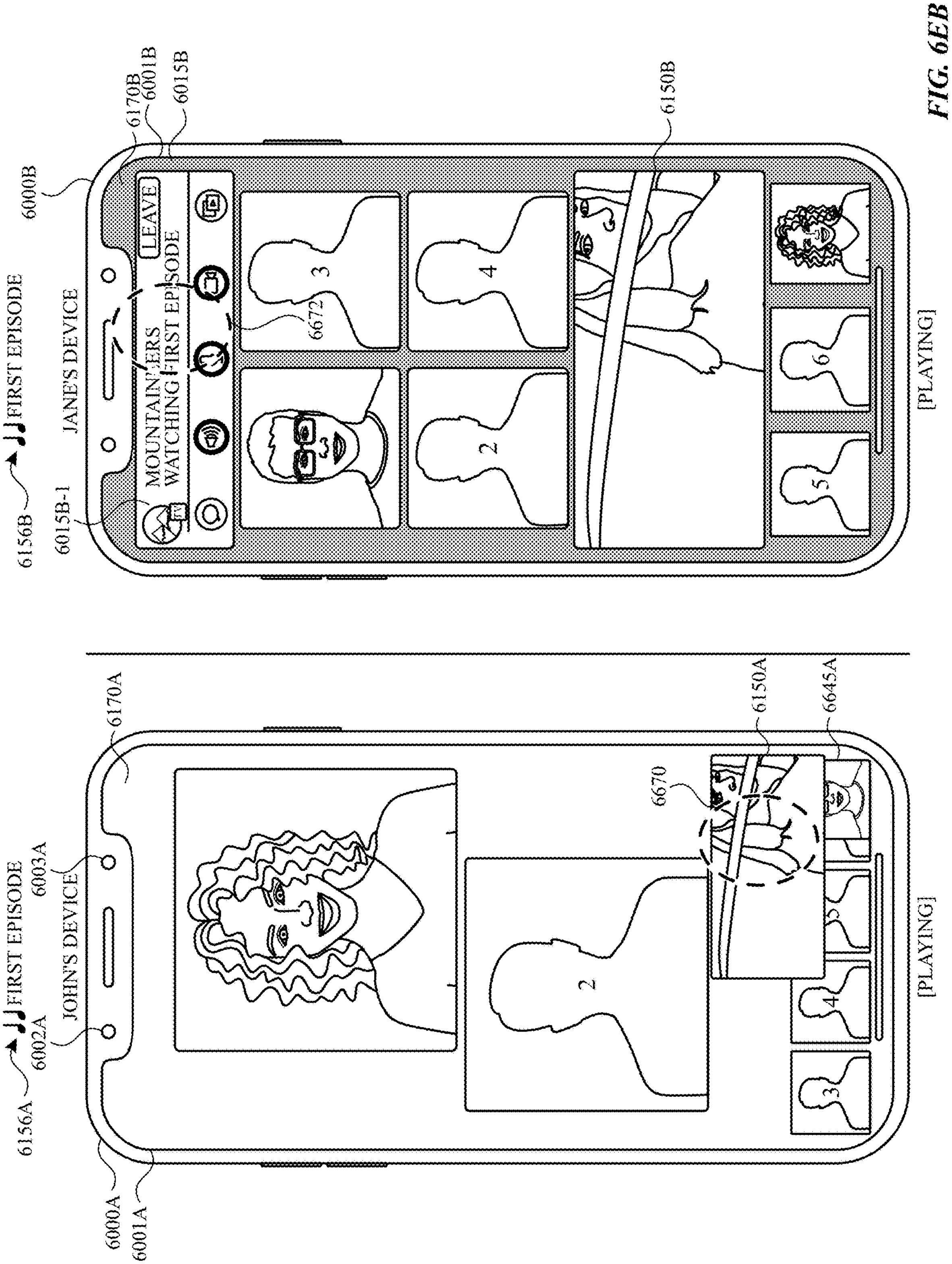
Figure 6E:
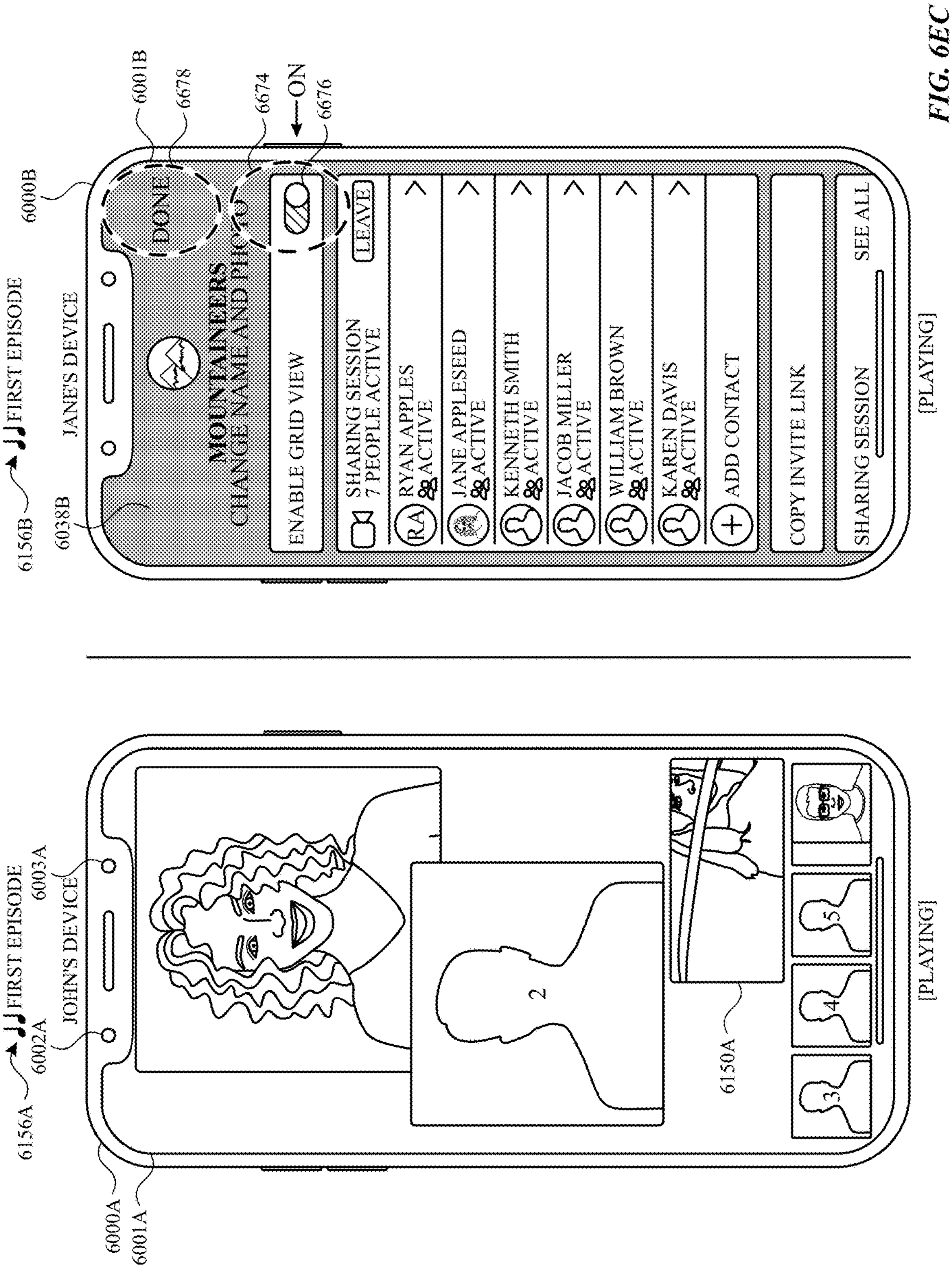
Figure 6E:
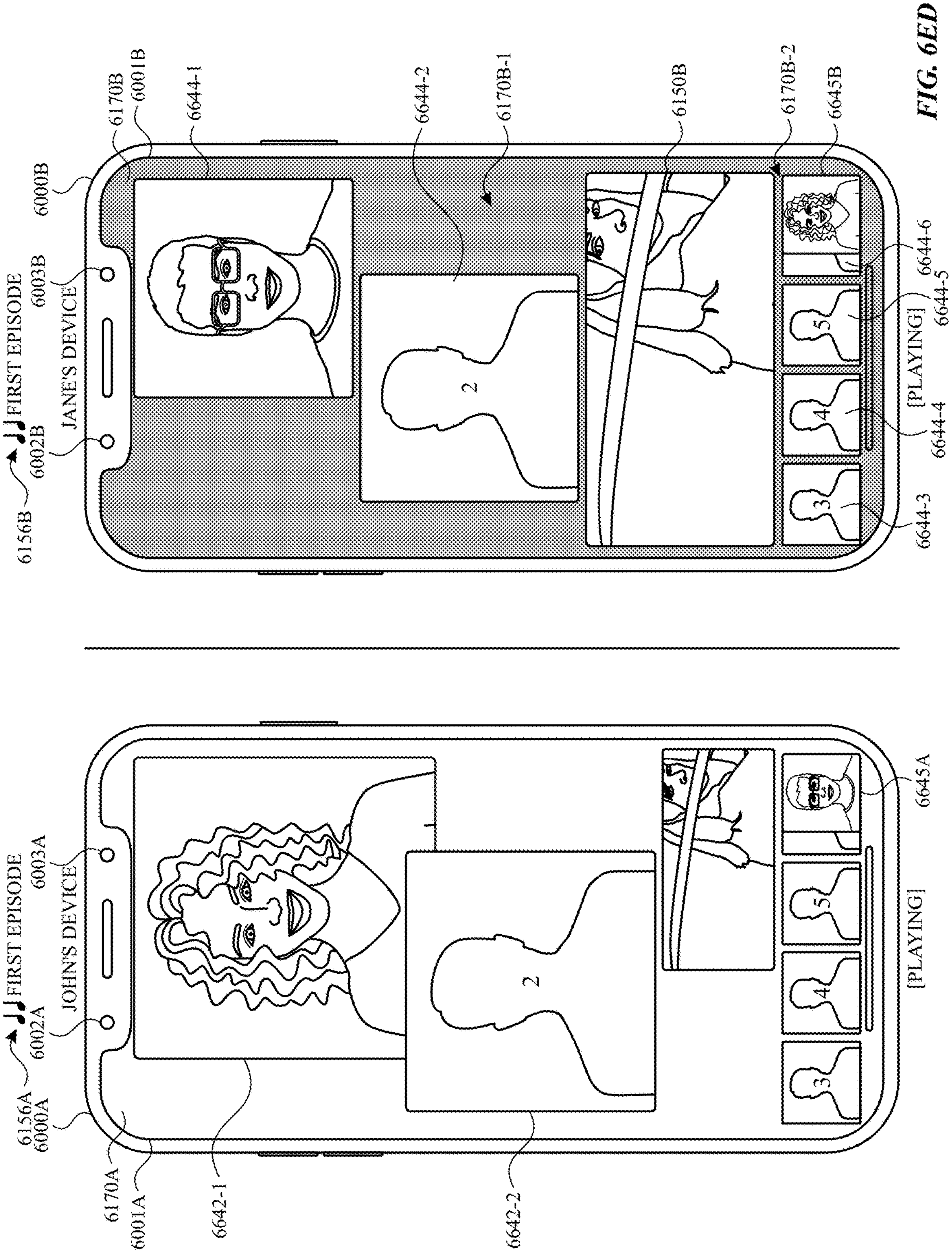
Figure 6E:
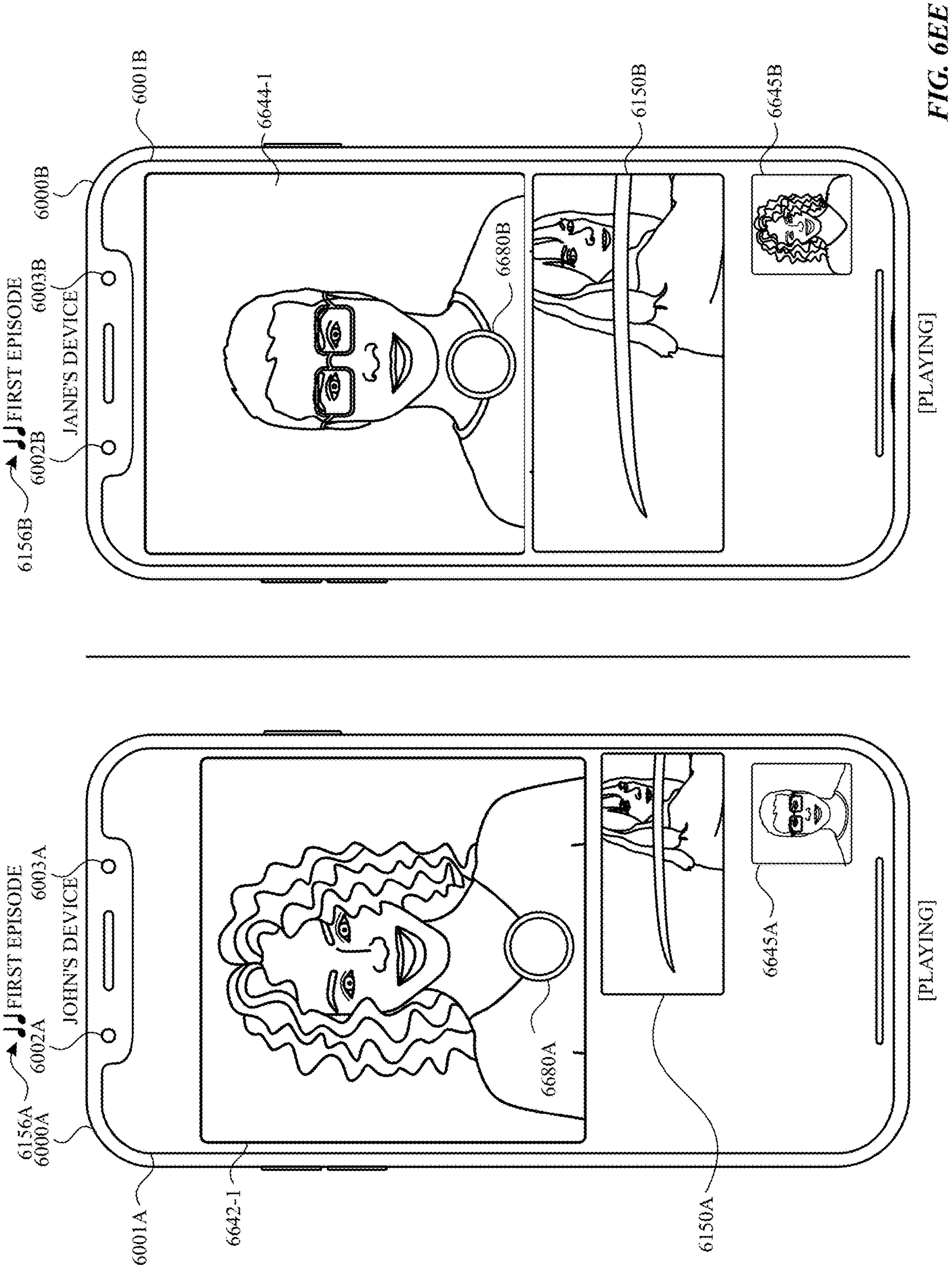
Figure 6E:
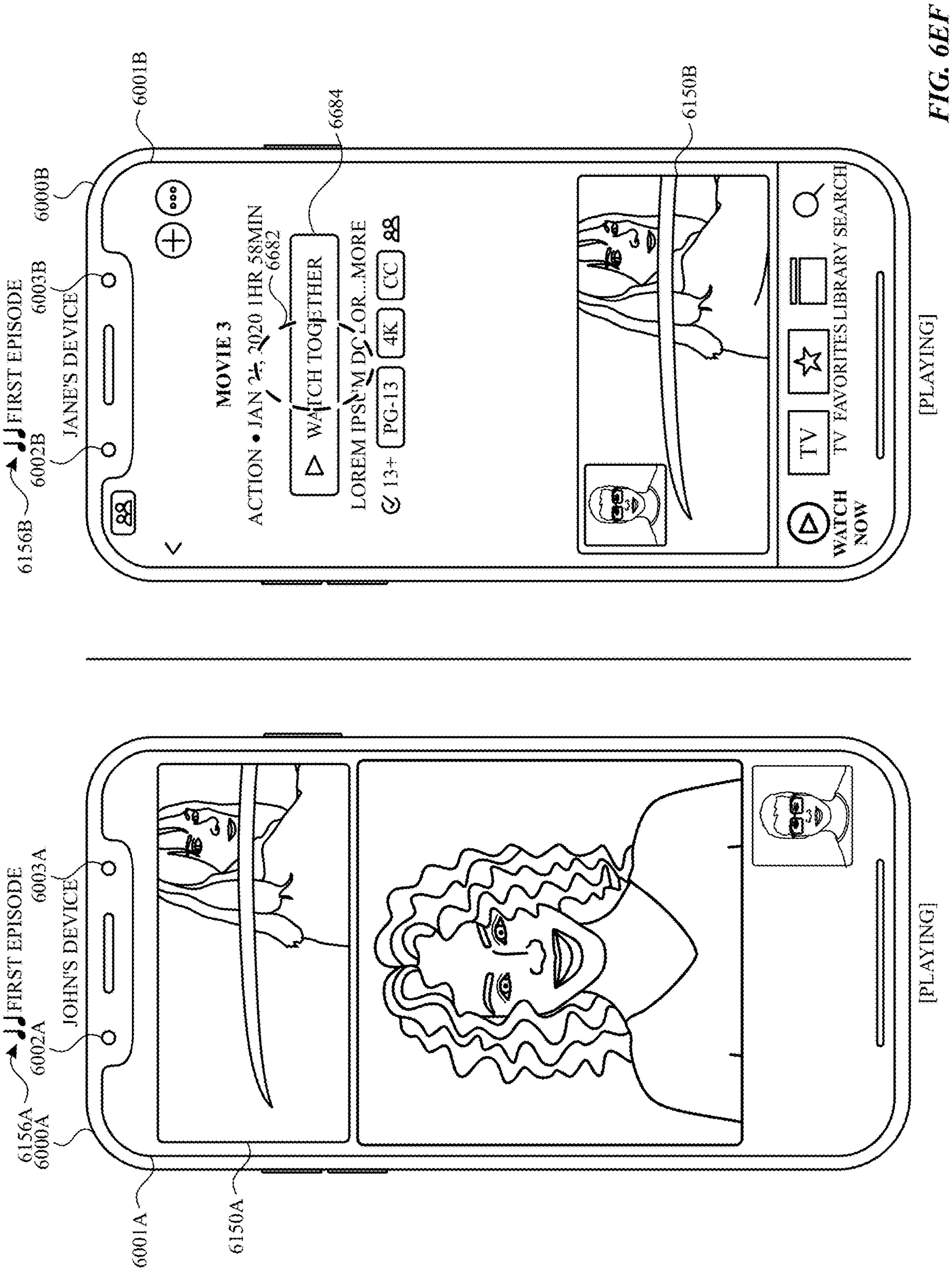
Figure 6E:
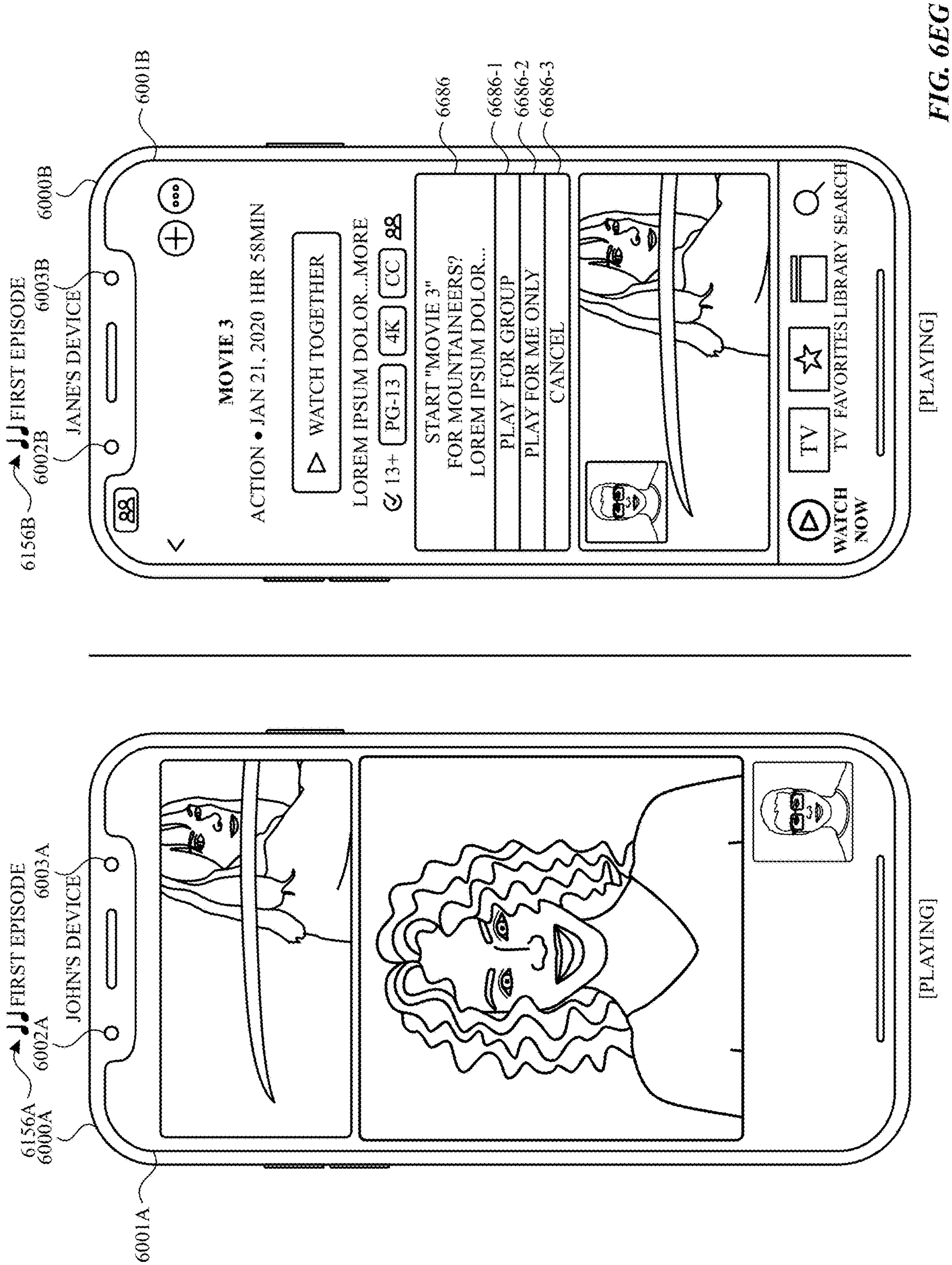
Figure 6E:
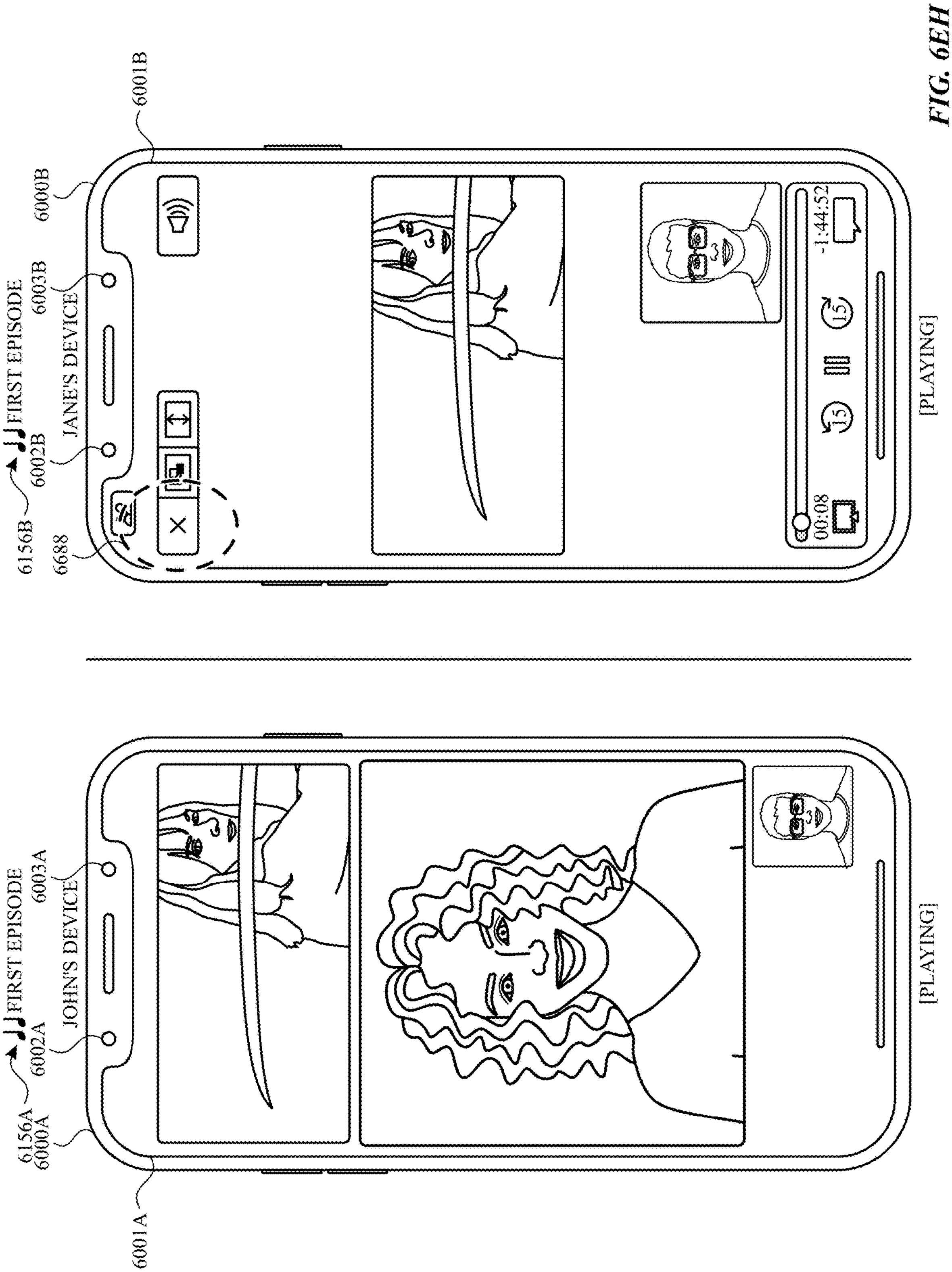
Figure 6E:
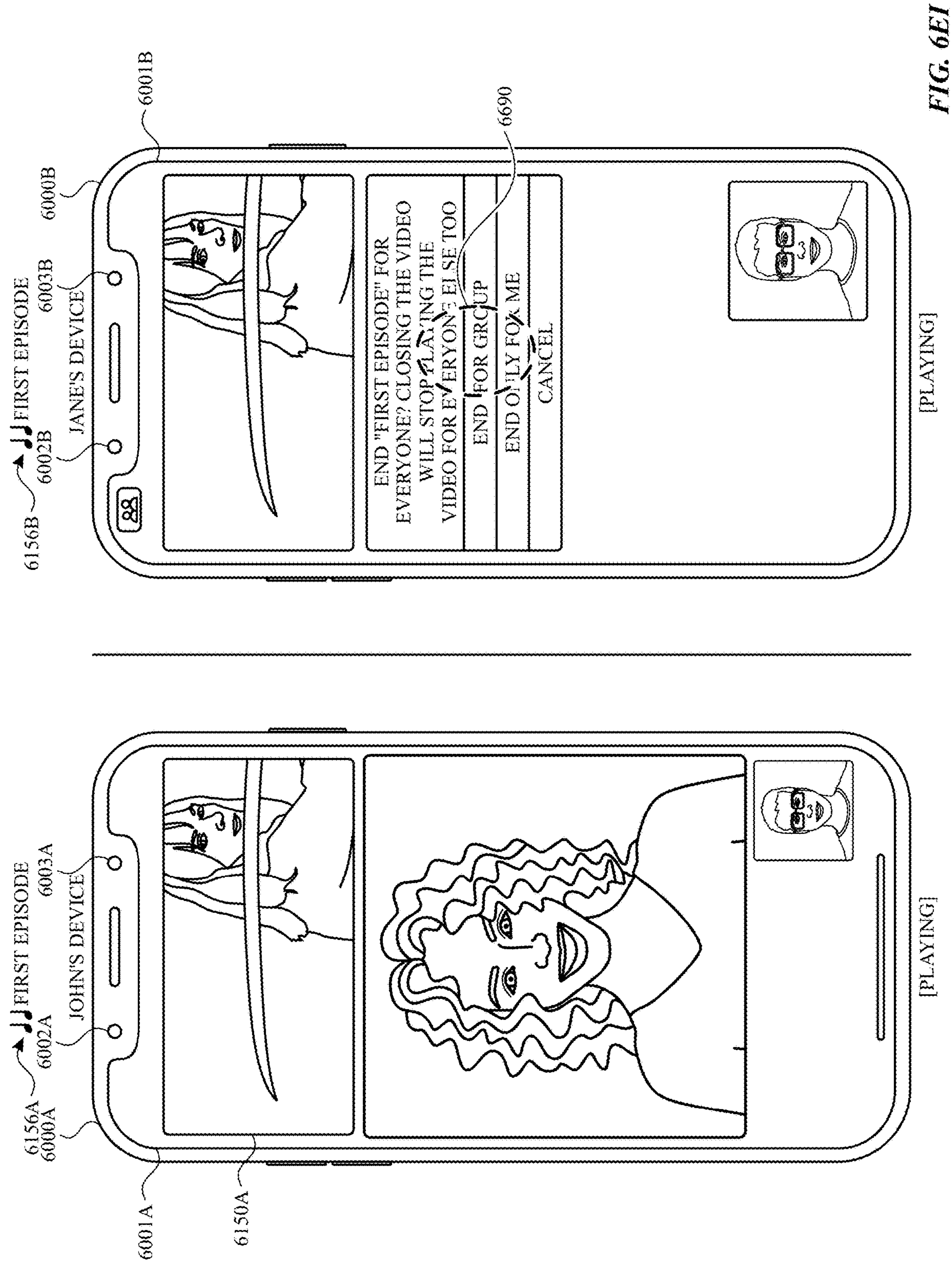
Figure 6E:
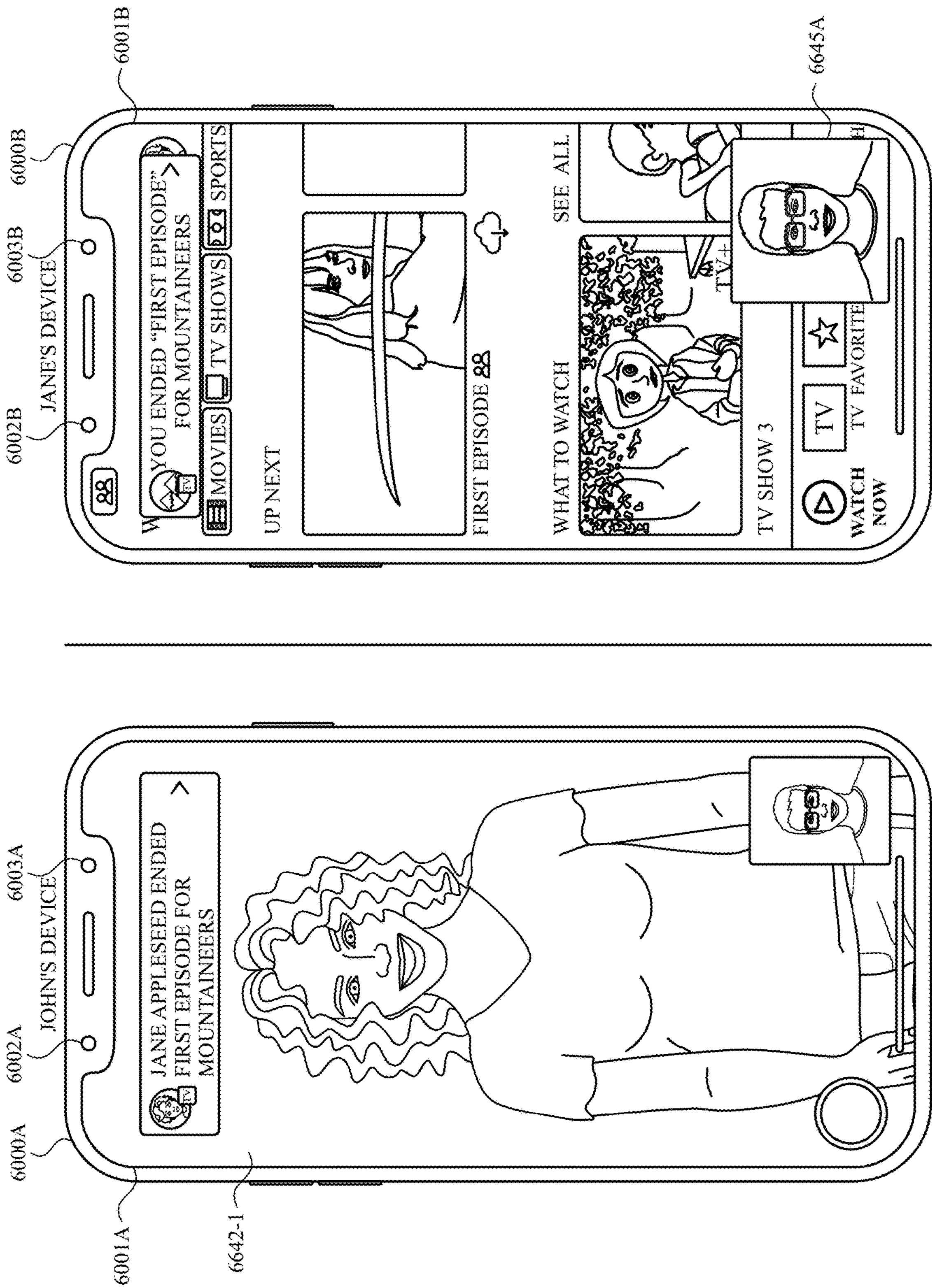
Figure 6E:
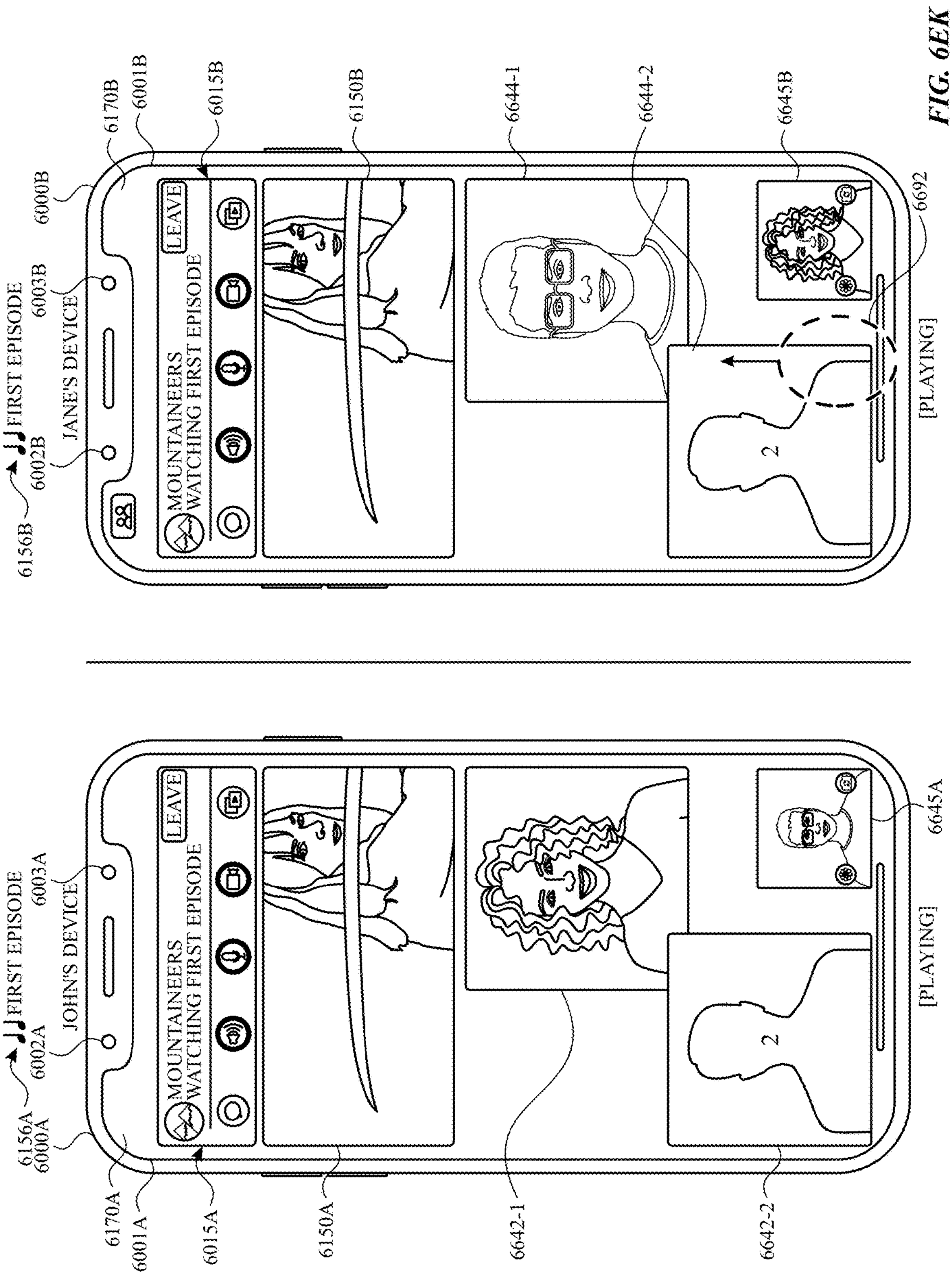
Figure 6E:
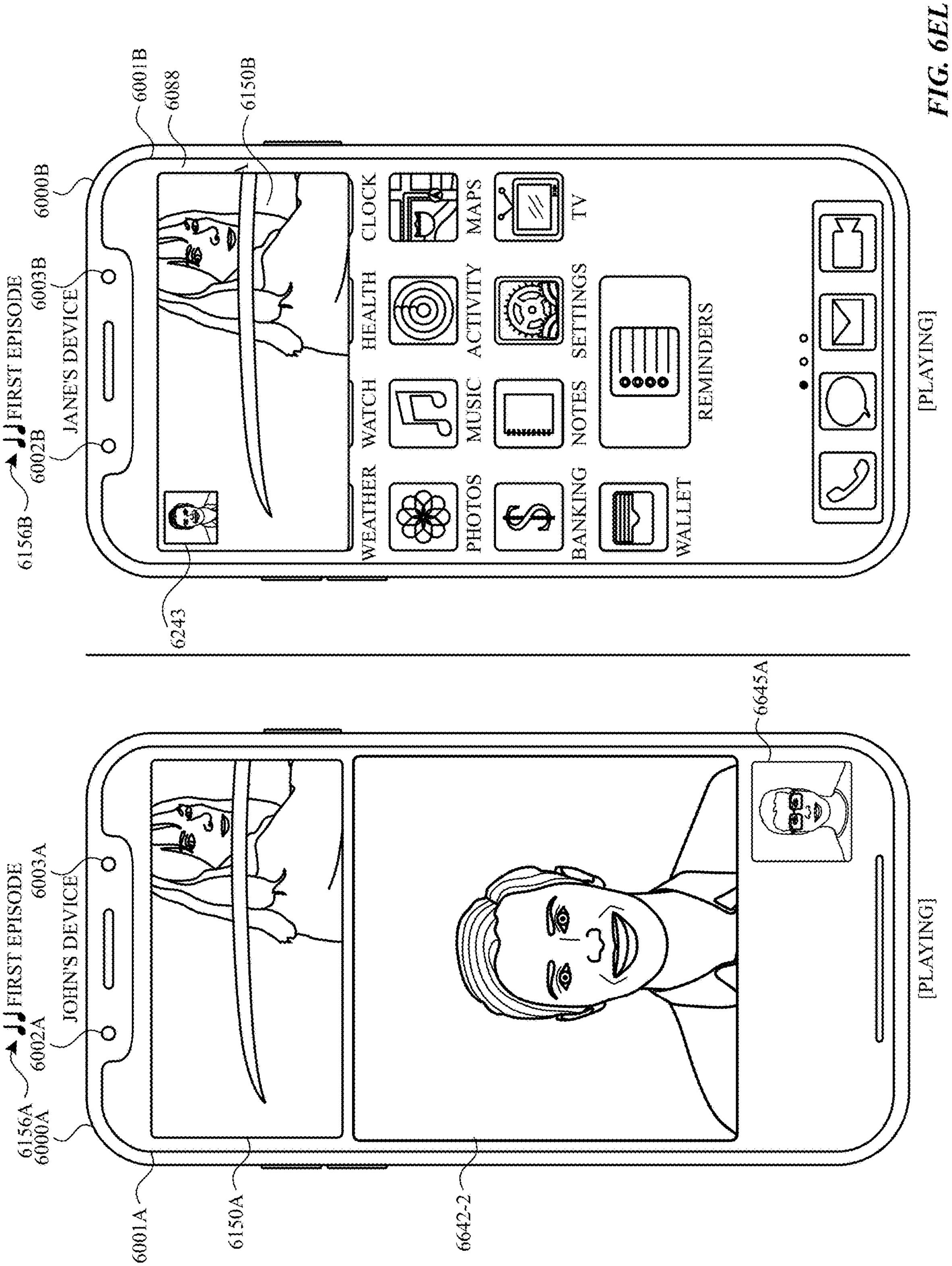
Figure 6E:
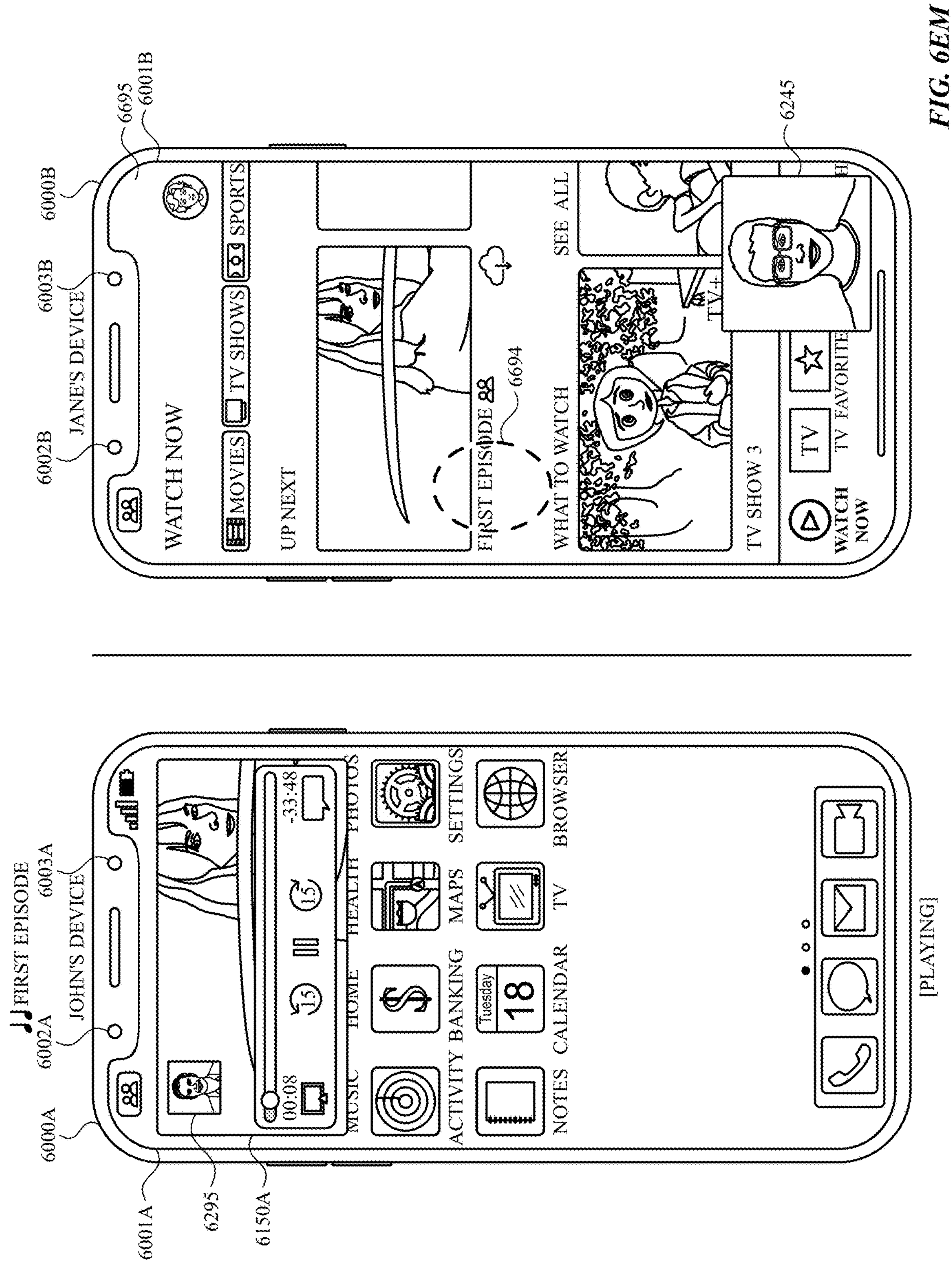
Figure 6E:
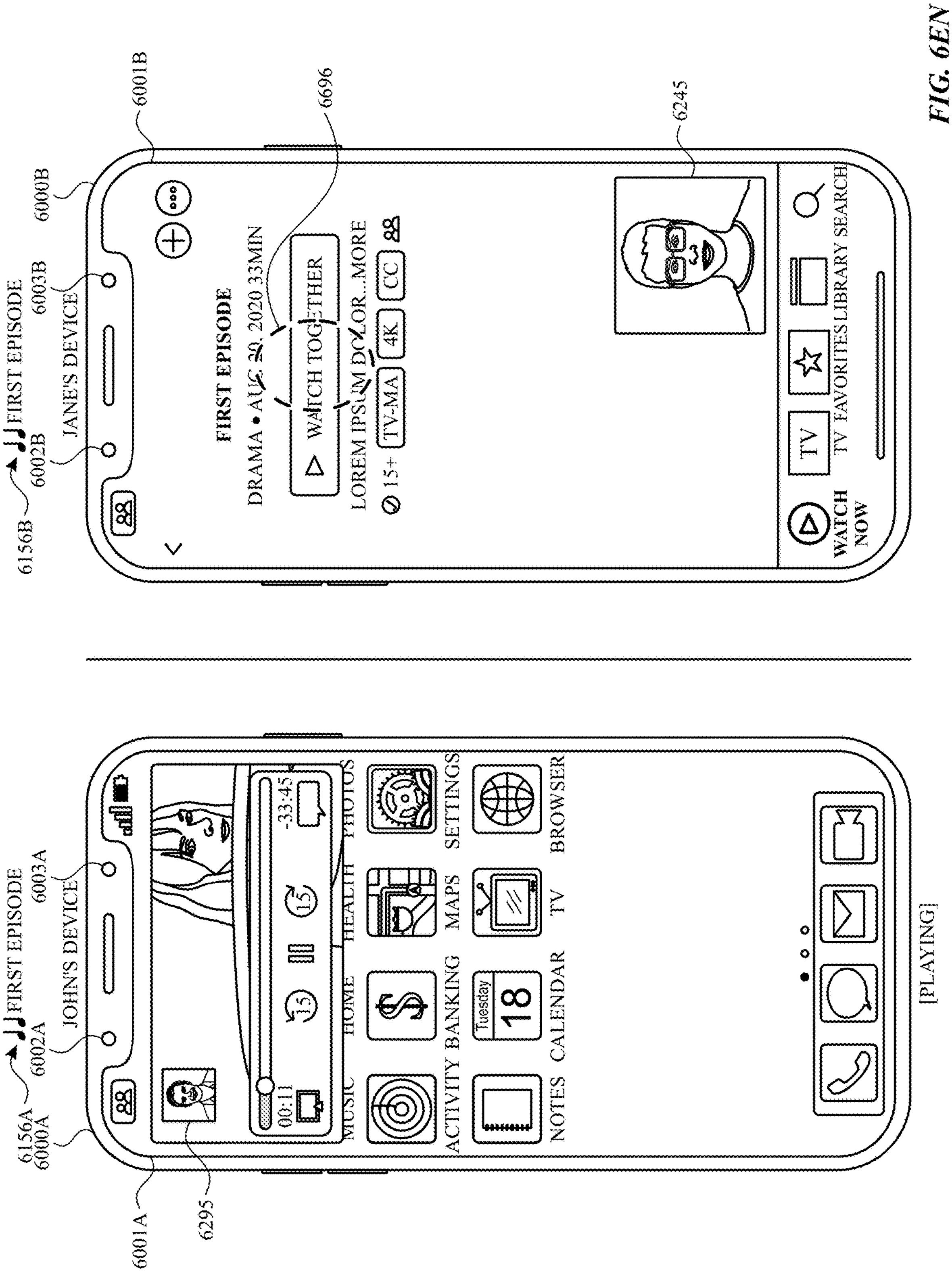
Figure 6E:
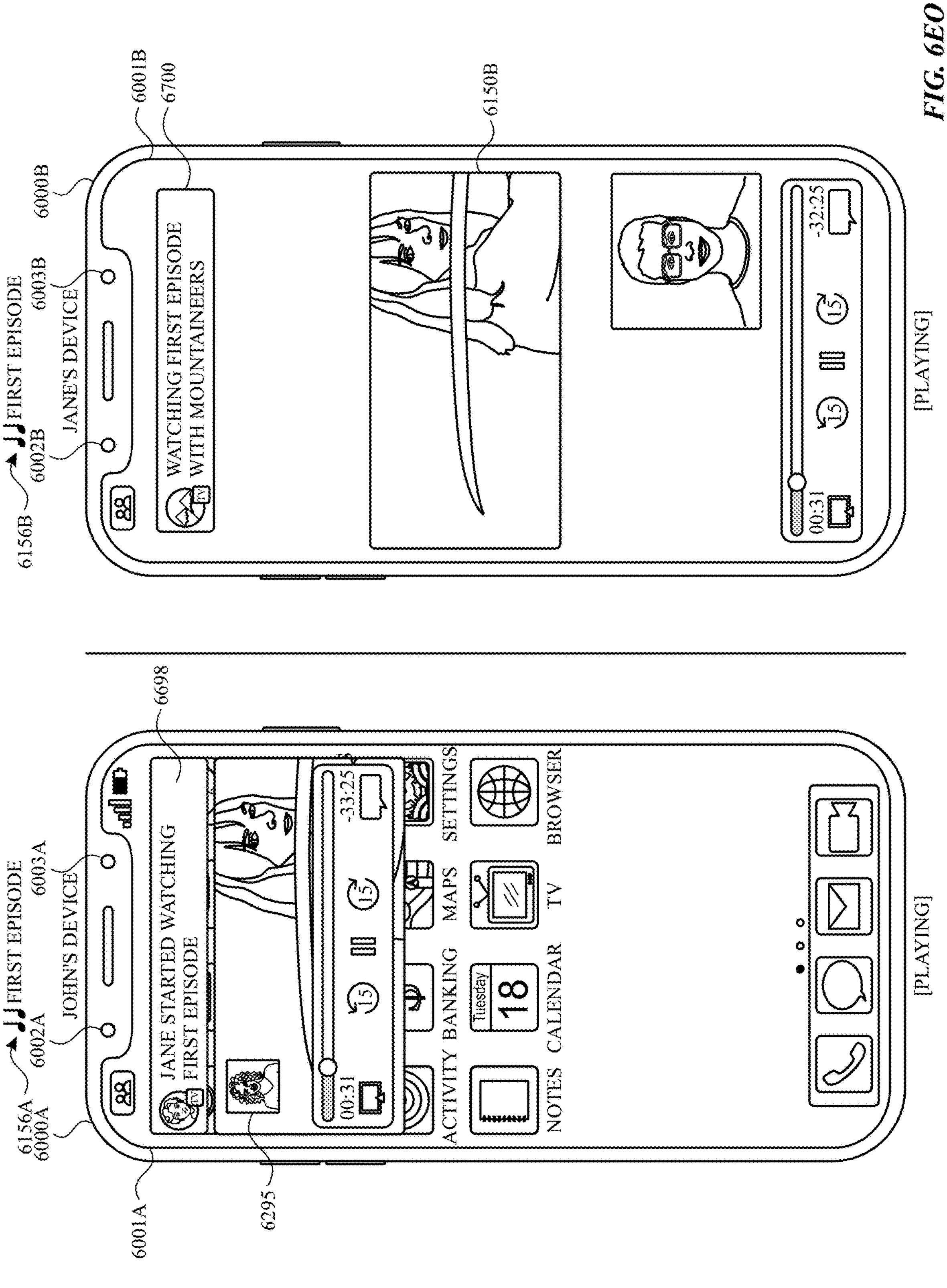
Figure 6E:
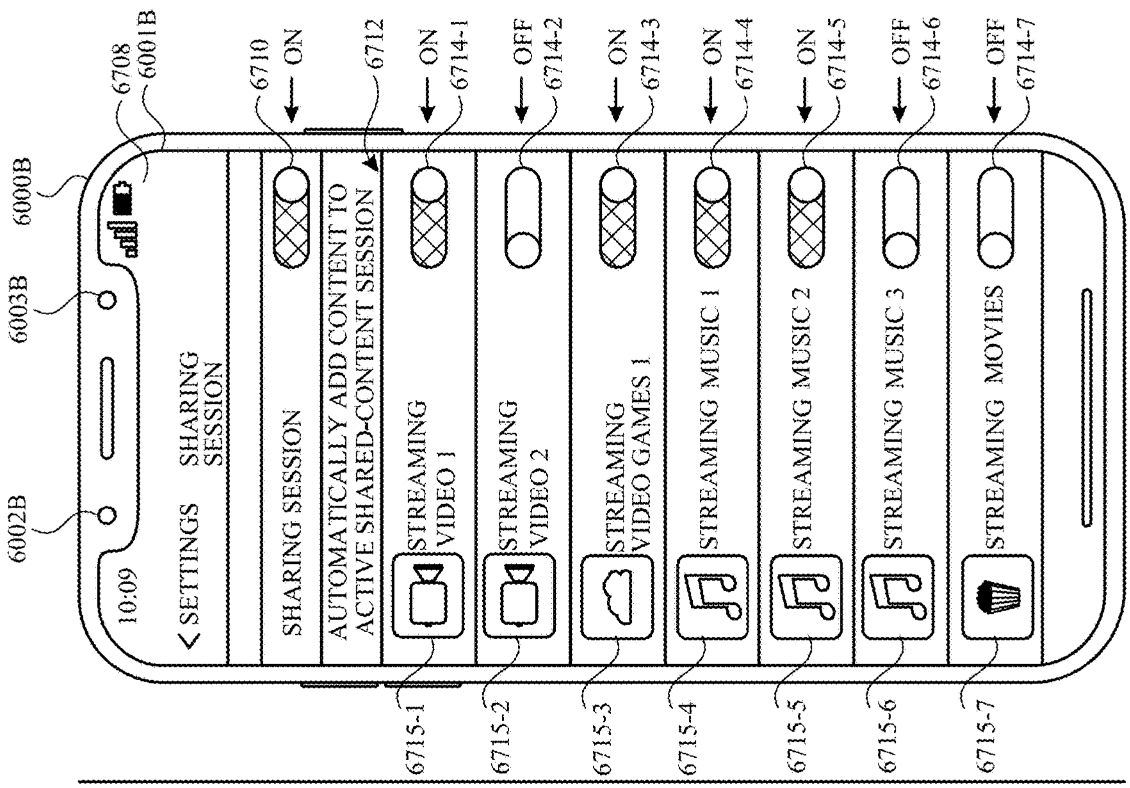
Figure 6E:
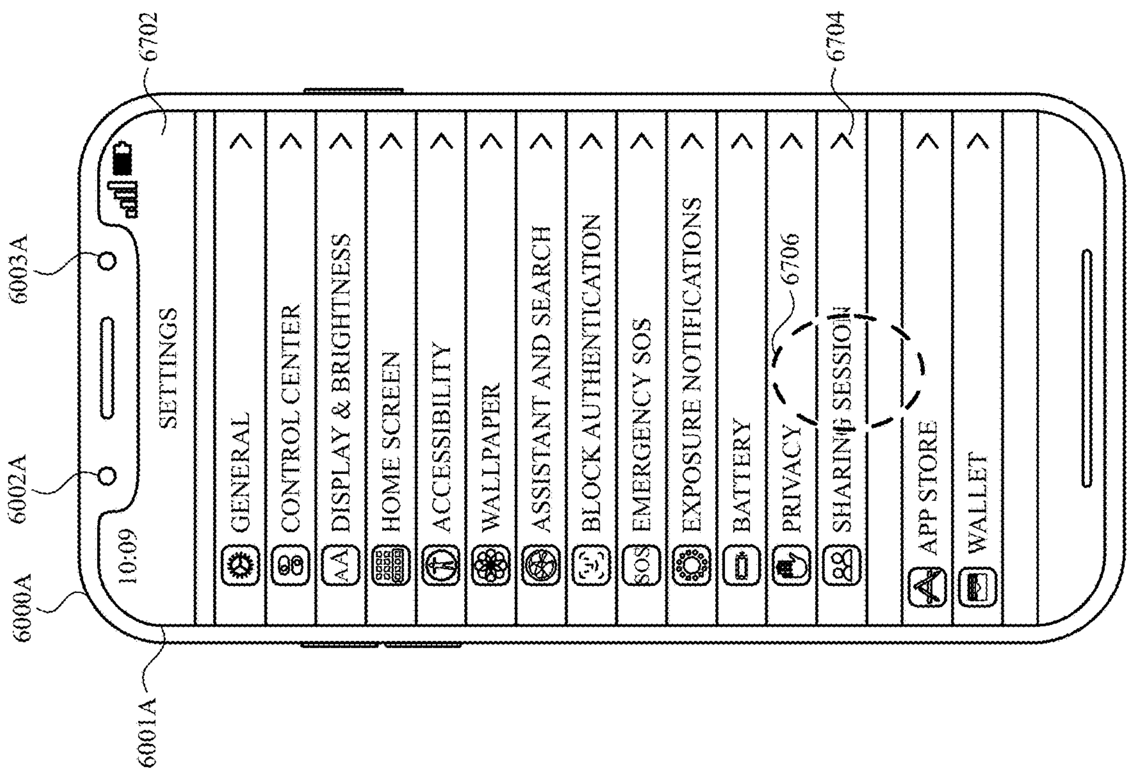

FIGS. 6Y-6DG illustrate various embodiments associated with sharing media in a shared-content session. In FIG. 6Y, John's device 6000A displays home screen 6018 while a shared-content session is not active. John's device 6000A detects input 6126 selecting TV app icon 6128 and, in response, displays TV app interface 6130 in FIG. 6Z. TV app interface 6130 includes media options 6134 and 6138 indicating media content such as shows or movies that can be watched on John's device 6000A. In some embodiments, glyph 6132 is displayed to indicate media content that is capable of being shared through a shared-content session—that is, the media content is capable of playing at John's device 6000A while the media content is concurrently played at other devices participating in the shared-content session, as discussed in greater detail below.

In FIG. 6Z, John's device 6000A detects input 6136 to select media option 6138, which is a TV show named "TV Show 3" that is capable of being played at John's device 6000A, but is not capable of being shared in a shared-content session. In some embodiments, a show may not be capable of being shared, for example, because an application that is used to play the media content does not support playback in a shared-content session or the content is restricted from being shared in a shared-content session.

In response to input 6136, John's device 6000A displays launch interface 6140 for launching playback of media content selected in the TV app interface 6130. As shown in FIG. 6AA, launch interface 6140 includes media identification 6142, such as the name of the show and, optionally, other details of the selected media content. Launch interface includes play option 6144, which includes text prompting the user to play the selected media content. Launch interface also includes icons or badges 6146 indicative of various aspects of the selected media content.

In FIG. 6AA, John's device 6000A detects input 6148 on play option 6144 and, in response, begins playback of "TV Show 3," as depicted in FIG. 6AB. When playback of "TV Show 3" begins, John's device displays media 6150A, playback controls 6152A, and chrome 6154. Media 6150A displays media content being played at John's device 6000A. Media 6150A can have a fixed position in an expanded or full-screen view (or using all of the screen outside of a portion of the screen designated for system status information and/or system controls), or displayed as a PiP that can be positioned over various user interfaces as discussed herein. In FIG. 6AB, media 6150A is displayed in an expanded state while John's device 6000A is in a portrait orientation. In some embodiments, however, if John's device 6000A is rotated to a landscape orientation while media 6150A is in the expanded view, media 6150A expands to a full-screen view or an enlarged view that is greater than the view depicted in FIG. 6AB. For the sake of simplicity, the displayed representation of the media is referred to hereinafter as media PiP 6150A, which can be used to refer to the media in the expanded view or PiP format, depending on context.

As shown in FIG. 6AB, media PiP 6150A is displaying content of "TV Show 3." Audio 6155A associated with "TV Show 3" is being output at John's device 6000A. Playback controls 6152A present information regarding playback of the content and various controls that are selectable to control playback of content displayed in media PiP 6150A. For example, tab 6152A-1 indicates a playback status relative to a duration of the media content and is selectable to scrub through the media content (e.g., moving a playback location of the media content commensurate with an input). Pause affordance 6152A-2 is selectable to pause playback of the media content, play affordance 6152A-4 is selectable to resume playback of the media content, and transfer option 6152A-3 is selectable to transfer playback from John's device 6000A to anther device such as TV 6500 depicted in FIG. 6CS. Chrome 6154 includes various options that are selectable to exit playback of the media content, to change a visual state of media PiP 6150A (e.g., undocking media PiP from the interface depicted in FIG. 6AA), change a displayed size or orientation of the media content, and adjust a playback volume of the media content. In some embodiments, John's device 6000A automatically dismisses chrome 6154 and playback controls 6152A after a predetermined amount of time.

In FIG. 6AC, John's device 6000A receives a video call from Jane's device as indicated by call banner 6158. When the video call is received, John's device automatically pauses playback of "TV Show 3" as shown in FIG. 6AC. In response to input 6160 on accept affordance 6162, John's device accepts the incoming call from Jane.

When the video call with Jane is ended a few minutes later (as indicated by clock 6106), John is able to resume playback of "TV Show 3," which has remained paused since the incoming video call was received, by selecting play affordance 6152A-4 via input 6164, as indicated in FIG. 6AD.

John's device 6000A is depicted in FIG. 6AE having resumed playback of "TV Show 3." John's device detects input 6166 on end option 6154-1, which is selectable to end playback of the media content. In response, John's device 6000A stops playback of "TV Show 3" and displays TV app interface 6130, as shown in FIG. 6AF.

FIGS. 6AG-6AI depict user interfaces of an embodiment in which John's device initiates a shared-content session with the Mountaineers group from a video conference interface. In FIG. 6AG, John's device displays messages interface 6004A and detects input 6168 on video conference option 6006-2. Jane's device 6000B is displaying home screen 6088. Neither John's nor Jane's devices 6000 are in a shared-content session. In response to input 6168, John's device initiates a video conference between members of the Mountaineers group. In some embodiments, when a video conference is ongoing, video conference option 6006-2 is selectable to display the video conference interface for the ongoing video conference.

FIG. 6AH depicts John's and Jane's devices 6000 in a video conference session with members of the Mountaineers group. John's device 6000A displays video conference interface 6170A with Jane's video feed in tile 6172, Ryan's video feed in tile 6174, camera preview 6182 (e.g., a video feed from John's camera 6002A), and controls 6180A. Controls 6180A include various control options that are selectable to control various aspects of the video conference such as enabling or disabling a camera or microphone and terminating the video conference. Controls 6180A also include sharing option 6180A-1, which is selectable to initiate a shared-content session with the members of the Mountaineers group. Jane's device 6000B displays video conference interface 6170B with John's video feed in tile 6176, Ryan's video feed in tile 6178 (similar to tile 6174 on John's device), camera preview 6184 (e.g., a video feed from Jane's camera 6002B), and controls 6180B. John's device 6000A detects input 6186 on sharing option 6180A-1 and, in response, initiates a shared-content session with the Mountaineers group.

As shown in FIG. 6AI, the shared-content session is now active between John, Jane, and Ryan, as indicated by the display of control regions 6015. Additionally, control region status regions 6015-1 on John's and Jane's devices 6000 indicate that three participants (Jane, John, and Ryan) are active in the shared-content session. When control region 6015 is displayed, John's and Jane's devices 6000 move and/or shrink the video feeds to accommodate display of control region 6015 without obstructing the respective video feeds with the control region. Control region options 6015-5, 6015-6, and 6015-7 are bolded to indicate, for each respective device, that the audio channel is active, the mic is not muted, and a video conference session is ongoing. John's device 6000A detects home gesture 6188, and Jane's device 6000B detects input 6190 on messages option 6015B-4.

In FIG. 6AJ, John's device displays home screen 6018, and Janes device displays messages interface 6004B, including dynamic graphic 6010B showing the shared-content session was initiated from John. Even though the shared-content session was not initiated from the messages application (John initiated the shared-content session from video conference interface 6170A), the dynamic graphic is added to message display region 6004B-3 of the messages interface. Accordingly, members of the Mountaineers group can quickly and conveniently access the dynamic graphic by displaying the messages interface. FIG. 6AJ depicts input 6190 on TV app icon 6128 and input 6194 on photos app icon 6192. Jane's device 6000B detects input 6196 on video conference option 6015B-7 to display video conference interface 6170B. In some embodiments, video PiP 6245 (or video PiP 6235) can be selected (e.g., via input 6197) to display video conference interface 6170B.

FIG. 6AK depicts John's device 6000A displaying photos interface 6198 in response to input 6196, and Jane's device 6000B displaying video conference interface 6170B in response to input 6196. In the embodiment depicted in FIG. 6AK, the photos app does not support sharing content through the shared-content session. Therefore, because John's device 6000A is currently in an ongoing shared-content session, the device displays banner 6200 notifying John that content in the photos app is not available for sharing (this banner is not displayed when photos interface 6198 is displayed and John's device is not in a shared-content session).

In response to detecting input 6204 on video 6202, John's device 6000A displays notification 6206 indicating that the selected content cannot be shared with the Mountaineers. In some embodiments, John can select "okay" to continue playing the video privately on John's device—that is, the content is played on John's device without the content being played at other devices in the shared-content session (if John's device was not in the shared-content session, the device would have played the content without displaying notification 6206). In some embodiments, content that cannot be played together in the shared-content session can be shared with participants in the shared-content session by sharing John's screen while the content is playing privately on John's device. In some embodiments, notification 6208 is displayed to inform the user that the content can be displayed for others using screen-sharing. In some embodiments, notification 6208 is selectable to initiate a screen-sharing session (e.g., optionally displaying control region 6015A), in order to share the selected content. As John's device plays the selected content, John's screen (and, optionally, audio) is transmitted to the participants of the shared-content session via screen-sharing. In some embodiments, content that is shared via screen-sharing has a reduced quality (e.g., video and/or audio quality) due to the compression of the audio and/or video data to accommodate for bandwidth constraints associated with sharing the content from the host device to the participating devices. On the other hand, when media content is shared such that each respective device separately accesses the media content (e.g., from a remote server), the devices are capable of playing back the content at a greater quality because the content is not being compressed for transmission like it is for screen-share content. Example embodiments of sharing media content in this higher-quality manner are described in greater detail below.

FIG. 6AM depicts John's device 6000A displaying TV app interface 6130 in response to input 6190. Because John's device is participating in a shared-content session, John's device displays notification 6210, inviting John to watch content from the TV app with the Mountaineers group. In some embodiments, notification 6210 is not displayed if John's device is not in a shared-content session, as demonstrated in FIG. 6Z, or if content in the app is not capable of being shared, as demonstrated in FIG. 6AK. Notification 6210 includes Mountaineers logo 6213 to indicate that the notification contains information that is relevant to the shared-content session with Mountaineers, and TV glyph 6212 to indicate that the information is relevant to the TV app that is used to select and/or play content for the shared-content session. In some embodiments, TV glyph 6212 (or other glyphs as determined by the relevant application) is displayed in control region 6015 (e.g., as shown in FIG. 6AS). In some embodiments, notification 6210 is temporarily displayed. In some embodiments, notifications that include information about what will happen when media is played using an application are displayed whenever control region 6015 is displayed (e.g., floating below control region 6015). Examples of such notifications include notification 6200 and notification 6210. In some embodiments, notification 6210 is displayed as a banner associated with an application that supports or enables the shared-content session. In some embodiments, other notifications are displayed as a part of this banner. In some embodiments, updated versions of the banner are referred to herein as different notifications.

In some embodiments, TV app interface 6130 recommends content for viewing based on subscriptions of participants of the Mountaineers group. For example, if several members of Mountaineers have a subscription to a particular content provider, content from that provider is recommended (e.g., under the "what to watch" section). In some embodiments, TV app interface 6130 recommends content that is capable of being shared in a shared-content session. For example, in FIG. 6AM, John's device 6000A demonstrates that "First Episode" is recommended for watching with the Mountaineers group. Media option 6214 corresponds to the "First Episode" TV show, which is shareable via the shared-content session, as indicated by glyph 6132. In FIG. 6AM, John speaks to the Mountaineers group, as indicated by audio input 6035A and output audio 6037B, and selects media option 6214, via input 6216, to select "First Episode" for playback for the Mountaineers group.

In FIG. 6AN, John's device 6000A displays launch interface 6140 with media identification 6142, play option 6144, and badges 6146 associated with the selected TV show, "First Episode." In some embodiments, the appearance of various elements displayed in a particular application change depending on whether or not the device displaying the application's interface is in a shared-content session. For example, in FIG. 6AN, play option 6144 is shown having text that says "watch together" to indicate that playing the media content will cause the media to be played for the group in a shared-content session. Additionally, badges 6146 include glyph 6132 to indicate that the selected media content ("First Episode") is capable of being played with the group via the shared-content session.

In FIG. 6AN, John's device 6000A detects input 6218 on play option 6144. Jane's device 6000B dismisses display of control region 6015B (e.g., after a predetermined amount of time), and the video feeds return to their original (e.g., default) sizes. In some embodiments, sharing pill 6020 is displayed in video conference interface 6170 when control region 6015 is dismissed. In response to input 6218, John's device 6000A displays prompt 6220 with options for John to indicate whether the media should be played for the participants of the group (e.g., option 6220-1), at John's device only (e.g., option 6220-2), or to cancel the play request (e.g., option 6220-3). In some embodiments, John's device 6000A starts playback of the show for the group in response to input 6218 (without displaying prompt 6220). In some embodiments, John's device 6000A remembers which option is selected (e.g., to play for the group or to play for John's device only), and automatically applies the selected option for future requests to play the media (e.g., without displaying prompt 6220). In some embodiments, the selected option is remembered on a per-application basis, such that the user is prompted (e.g., a first time playback is requested for the respective application) for each respective application. In some embodiments, the user is prompted in a single application, and the selected option is applied across all applications. In some embodiments, the selected option is remembered for the current shared-content session, and the user is prompted again in future shared-content sessions. In some embodiments, the selected option is remembered for future shared-content sessions. In some embodiments, John's device displays a notification that a selected option was remembered from a prior selection. In some embodiments, the notification that a selected option was remembered from a prior selection is displayed in lieu of prompt 6220 and, optionally, can be selected to display an option to change the selected option for the current playback request. In some embodiments, when option 6220-2 is selected, the next time a play request (e.g., input 6218) is received, prompt 6220 is displayed. In some embodiments, when option 6220-1 is selected, the next time a play request (e.g., input 6218) is received, prompt 6220 is not displayed.

FIG. 6AP depicts John's and Jane's devices 6000 in response to input 6222 on option 6220-2, "Play for Me Only." In this embodiment, John's device 6000A begins playing "First Episode" privately (not in the shared-content session). Because John elected to play "First Episode" on John's device 6000A only, "First Episode" is not added to the shared-content session for playback by Jane's and Ryan's devices. Therefore, John's device is shown playing "First Episode" in FIG. 6AP, while Jane's device 6000B continues to show video conference interface 6170B without playing "First Episode." John's device displays notification 6226 to notify John that "First Episode" is being played only for John's device, and not for other members of the Mountaineers group. Notification 6226 includes John's avatar 6225 to indicate that the content of the notification is relevant to John (as opposed to the Mountaineers group). John's device outputs audio 6156A for "First Episode" and plays the show in media PiP 6150A. While "First Episode" is being played, John's device 6000A remains in the shared-content session. Therefore, the audio channel remains active, and John's device outputs audio from Jane as indicated by audio output 6037A and audio input 6035B.

FIG. 6AQ depicts John's and Jane's devices 6000 in response to input 6224 on option 6220-1, "Play for Group." In this embodiment, "First Episode" is added to the shared-content session so that it can be played at the respective devices participating in the shared-content session. In contrast to screen-share content, where the content is transmitted from a host device (also referred to as a sharing device) to other participant devices, the media content is shared with the participant devices initiating a synchronized playback process that causes data that enables the participant devices to access and/or play (at a playback state that is synchronized among the participants) the content that was added to the shared-content session in a synchronized manner. Accordingly, the devices participating in the shared-content session initiate playback of "First Episode" at the respective devices by separately accessing the "First Episode" content from the TV app installed at the respective devices. In the embodiment depicted in FIG. 6AQ, the TV app is installed at Jane's device 6000B, and Jane has previously purchased or otherwise obtained any subscriptions that are required to view "First Episode." If, however, Jane's device did not have the required application or subscriptions, Jane's device 6000B prompts Jane to obtain the application and/or subscription, as discussed in greater detail below.

In some embodiments, when a video call or video conference session is active while content is being shared in the shared-content session, a representation of a participant of the video call is displayed concurrently with a representation of the shared content. For example, in FIG. 6AQ, John's and Jane's devices 6000 are video conferencing in a shared-content session with the Mountaineers. Accordingly, John's device displays video PiP 6235 concurrently with media PiP 6150A. Because Jane's device already shows the video feeds of remote participants in video conference interface 6170B, Jane's device does not display an additional representation of a remote participant of the video call. In some embodiments, the participant who is depicted in the video PiP is a remote participant who is currently most active or recently active in the shared-content session. In FIG. 6AQ, John's device 6000A displays the video feed of Jane in video PiP 6235 because Jane is the most active (or recently active) participant, based on her activity of speaking to the Mountaineers group in FIG. 6AP. In some embodiments, when a different remote participant becomes the most active or most recently active, the representation of the previously most active participant is replaced with a representation of the newly active participant. In some embodiments, the representation of the remote participant is an avatar, name, picture, or other identifying element. In some embodiments, when the media PiP is displayed docked in a full-screen or expanded display mode (e.g., as shown on John's device 6000A in FIG. 6AQ), the video PiP is displayed separate from the media PiP. In some embodiments, when the media PiP is displayed undocked (e.g., as a PiP overlaid on a separate user interface), the representation of the remote participant can be displayed in a smaller PiP that is overlaid on the media PiP, as discussed in greater detail below.

When content is added to the shared-content session, playback of the respective content is synchronized at the respective devices so that each device is separately outputting the content at a same playback state (e.g., playback time, playback location, playing state, and/or paused state). For example, in FIG. 6AQ, John's device 6000A and Jane's device 6000B are both playing "First Episode" in respective media PiPs 6150A and 6150B at an elapsed playback time of 0:02, and both devices are outputting audio 6156 for "First Episode." If Ryan's device also has the relevant app and subscriptions, Ryan's device is also playing "First Episode" at an elapsed playback time of 0:02.

In addition to starting playback of "First Episode," John's device 6000A displays notification 6288 in response to input 6224, informing John that he started playback of "First Episode" for the Mountaineers group. In some embodiments, notification 6288 can be selected to display control region 6015A.

In response to "First Episode" being added to the shared-content session, Jane's device 6000B initiates local playback of the show using the TV app installed at her device, including displaying media PiP 6150B, starting playback of "First Episode," and, optionally, displaying notification 6230 informing Jane that John started playing "First Episode" for the Mountaineers group. In some embodiments, when a notification (e.g., notification 6230) is displayed, the device shifts the location of the media PiP 6150 (and, optionally, other elements on the display such as the video feeds in FIG. 6AQ) to avoid overlapping media PiP 6150 with the notification (and the other elements on the display). In some embodiments, notification 6230 can be selected (e.g., via input 6232) to display control region 6015B, as depicted in FIG. 6AS. When media PiP 6150B is displayed concurrently with video conference interface 6070B, Jane's device 6000B moves and/or resizes tiles 6176 and 6178 and, optionally, camera preview 6184 to enable unobstructed display of media PiP 6150B along with the video feeds. In some embodiments, media PiP 6150B can be moved on the display, and the arrangements of the video feeds automatically resize and/or move as they are displaced by the movement of media PiP 6150B. In some embodiments, media PiP 6150B can be resized and/or docked to the side of the displayed interface. For example, in response to drag input 6234, Jane's device displays media PiP in a minimized and docked state 6150B-1, as depicted in FIG. 6AR. The minimized and docked media PiP can be moved on the display (e.g., up and down the vertical edge of the display) and/or undocked in response to input on the minimized and docked PiP, such as input 6236 in FIG. 6AR.

In some embodiments, John's device 6000A displays content playing in the interface shown in FIG. 6AQ, and dismisses playback controls 6152A after a predetermined amount of time without dismissing notification 6228 (e.g., a banner), as shown in FIG. 6AR.

As Jane and the rest of the Mountaineers group are separately watching "First Episode" at their respective devices, the shared-content session enables the members of the group to continue interacting with one another through various communication channels such as, for example, video conferencing, messaging, and speaking directly to each other over the audio channel associated with the shared-content session.

In FIG. 6AS, playback of "First Episode" continues at John's and Jane's devices 6000 (and at Ryan's device). After a predetermined amount of time, John's device 6000A dismisses notification 6288 to reveal chrome 6154. After an additional amount of time, John's device dismisses chrome 6154 and playback controls 6152, as shown in FIG. 6AT. In some embodiments, notification 6288 is displayed as a banner for an application that supports or enables the shared-content session. In some embodiments, this banner is persistently displayed, indicating that other users are watching the content, even after chrome 6154 and playback controls 6152 are dismissed.

Jane's device 6000B displays control region 6015B in response to input 6234. In order to accommodate display of control region 6015B, Jane's device moves media PiP 6150B downward on the screen and further resizes and/or moves the video feeds and, optionally, camera preview 6184, as shown in FIG. 6AS. Control region 6015B includes TV glyph 6212, indicating that the TV app is being used in the shared-content session (to playback "First Episode"). Jane speaks to the Mountaineers group as depicted by input audio 6035B and audio output 6037A. Jane's device 6000B detects input 6238 on messages option 6015B-4 and, in response, displays messages interface 6004B while continuing to display media PiP 6150B, as shown in FIG. 6AT. Messages interface 6004B includes dynamic graphic 6010B, which is updated to indicate that the Mountaineers group is watching "First Episode." Because Jane's device 6000B is no longer displaying video conference interface 6170B, Jane's device displays mini PiP 6243 overlaid on media PiP 6150B. Mini PiP 6243 is similar to video PiP 6235, except that it is smaller in size and displayed overlaid on media PiP 6150B. Because John is the most active (or recently active) remote participant, with respect to Jane's device 6000B, mini PiP 6243 includes a representation of John, namely, John's video feed from the ongoing video conference.

In FIG. 6AT, the devices are playing "First Episode" as shown in respective media PiPs 6150A and 6150B. John's device 6000A detects input 6240 on media PiP 6150A. Jane's device 6000B detects input 6242 on media PiP 6150B. In response to input 6240, John's device redisplays notification 6228 (e.g., the banner for the sharing application) and playback controls 6152A. In response to input 6242, Jane's device 6000B displays the interface depicted in FIG. 6AU, including playback controls 6152B and notification 6244 (similar to banner or notification 6228) indicating that the Mountaineers are watching "First Episode." In FIG. 6AU, Jane's device displays an expanded view (e.g., full-screen view (or using all of the screen outside of a portion of the screen designated for system status information and/or system controls)) of media PiP 6150B and, therefore, displays the representation of the most active (or recently active) remote participant in video PiP 6245 (similar to video PiP 6235).

When content is being shared in the shared-content session, each respective participant is capable of controlling playback of the shared content at their respective device, which, in turn, controls playback of the shared content at other devices participating in the shared-content session. For example, in FIG. 6AU, Jane pauses "First Episode" via input 6246 on pause affordance 6152B-2. In response to detecting input 6246, Jane's device 6000B pauses playback of "First Episode" on Jane's device 6000B, which causes playback of "First Episode" to pause on other devices in the shared-content session. FIG. 6AV shows that "First Episode" is paused at John's device 6000A and at Jane's device 6000B. Even though Jane's device 6000B did not start playing "First Episode" for the Mountaineers group, Jane's device 6000B (and other devices participating in the shared-content session) is capable of controlling playback of the shared content for other participants of the shared-content session.

As shown in FIG. 6AV, John's device 6000A displays notification 6248 informing John that Jane paused playback of "First Episode." Notification 6248 includes Jane's avatar 6254, indicating that Jane is the participant who changed the playback state, and TV glyph 6212 indicating that the change occurred with content shared using the TV app. In response to input 6252 on notification 6248, John's device 6000A displays control region 6015A, as shown in FIG. 6AW. Similarly, Jane's device 6000B pauses "First Episode" and displays notification 6250 informing Jane that she paused "First Episode" for the Mountaineers group. In some embodiments, tapping on notification 6250 causes Jane's device 6000B to display control region 6015B. In response to home input 6256, Jane's device displays home screen 6088 while continuing to display media PiP 6150B, as shown in FIG. 6AW. In some embodiments, a subsequent home input (e.g., a home input while Jane's device displays home screen 6088 and media PiP 6150B) causes Jane's device 6000B to hide media PiP 6150B.

In FIG. 6AW, John's device 6000A detects input 6258 and, in response, resumes playback of "First Episode" for the Mountaineers group, as shown in FIG. 6AX. John's device 6000A resumes playback of "First Episode" and displays notification 6260 (e.g., a banner) informing John that he resumed playback of "First Episode" for the Mountaineers group. Playback also resumes on Jane's device 6000B, and Jane's device displays notification 6262 informing Jane that John resumed playback of "First Episode." Jane's device detects input 6266 on notification 6262 and, in response, displays control region 6015B, as depicted in FIG. 6AY. When control region 6015B is displayed, the position of media PiP 6150B is moved on Jane's screen to enable unobstructed display of both the control region and the media PiP.

Jane's device 6000B dismisses control region 6015B and media PiP 6150B in response to home gesture 6268, and displays sharing pill 6020B, as shown in FIG. 6AZ. In some embodiments, control region 6015B is dismissed in response to home gesture 6268, and a subsequent home gesture is detected to dismiss media PiP 6150B. In some embodiments, media PiP 6150B is dismissed in response to home gesture 6268, and a subsequent home gesture is detected to dismiss control region 6015B.

In some embodiments, a PiP can be moved, resized, or otherwise manipulated. For example, in FIGS. 6AX-6AZ, John's device moves video PiP 6235 to a different location onscreen in response to input 6263, and minimizes or docks video PiP 6235 in response to gesture 6265. The minimized or docked state of video PiP 6235 can be selected to return to the displayed state shown, for example, in FIG. 6AY.

In FIG. 6BA, Ryan speaks to the Mountaineers group and pauses playback for the group. John's and Jane's devices 6000 pause playback of "First Episode" and display notifications 6270 and 6272, respectively, to indicate that Ryan paused "First Episode" for the Mountaineers group. The notifications include Ryan's avatar 6271. Because Ryan is now the most active (or recently active) remote participant with respect to John's device 6000A, John's device updates video PiP 6235 to display Ryan's video feed from the ongoing video conference session. Similarly, Jane's device updates mini PiP 6243 to include Ryan's video feed. In some embodiments, a PiP or mini PiP can be at least partially hidden behind a notification or banner. In some embodiments, a device moves the position of a mini PiP on the media PiP when a banner or notification is displayed, so that the mini PiP is not hidden behind the banner or notification.

In response to input 6274 on notification 6272, Jane's device displays media PiP 6150B in FIG. 6BB. When media PiP is displayed, Jane's device also displays notification 6276 indicating that three people are watching the shared content in the shared-content session with the Mountaineers group. Jane resumes playback of "First Episode" with input 6278. In some embodiments, notification 6276 is not displayed.

In FIG. 6BC, "First Episode" resumes at the devices participating in the shared-content session, and the devices display notifications (e.g., notification 6280 and notification 6282) indicating that Jane resumed "First Episode" for the Mountaineers group. It should be understood that Jane's device and John's device can be similar to other devices participating in the shared-content session, and actions performed at Jane's device and/or John's device are also capable of being performed at the other devices participating in the shared-content session, such as Ryan's device.

FIGS. 6BC-6BE show an embodiment in which John scrubs playback of "First Episode" for the Mountaineers group. In FIG. 6BC, John's device 6000A detects input 6284 on tab 6152A-1. Input 6284 is a touch-and-drag input for scrubbing "First Episode." As John drags tab 6152A-1, John's device pauses playback of "First Episode" for the Mountaineers group and scrubs through the show. Accordingly, "First Episode" is shown paused at Jane's device 6000B (and other devices participating in the shared-content session), and tab 6152-1 is moved on both John's and Jane's devices as John is scrubbing. John's device 6000A displays notification 6286 informing John that he is scrubbing or moving content for the Mountaineers group. Jane's device 6000B displays notification 6288, which is different from notification 6286 and informs Jane that John paused playback. In some embodiments, Jane's device displays a notification that John moved or is moving playback. In some embodiments, John's device displays a notification that John has paused playback for the Mountaineers. As John scrubs, images from "First Episode" are shown in media PiPs 6150 as John moves (e.g., forward and/or backward) through the content.

In FIG. 6BE, input 6284 is terminated and the devices resume playback of "First Episode." John's device 6000A displays notification 6290 informing John that he moved playback for the Mountaineers group. Jane's device 6000B displays notification 6292 indicating that John moved playback of the show. In some embodiments, Jane's device displays a notification that John resumed playback.

FIGS. 6BF-6BJ illustrate an embodiment in which John stops playback of the shared content to privately view content on John's device 6000A during the shared-content session. In FIG. 6BF, John's device 6000A is in a shared-content session watching "First Episode" with the Mountaineers group. John's device 6000A displays messages interface 6294, which is a message conversation with John's mom, while "First Episode" is playing in media PiP 6150A. John's device 6000A displays mini PiP 6295, which includes a representation of Jane (e.g., Jane's video feed). Jane's device 6000B is displaying home screen 6088 and playing "First Episode" in media PiP 6150B. John's device detects input 6298 on video 6296, which is a video that was sent to John from John's mom via messages interface 6294.

In response to input 6298, John's device 6000A stops playback of "First Episode" and begins to play video 6296 from Mom, including outputting audio 6302 from video 6296. Because video 6296 is not content that is capable of being shared in the shared-content session (e.g., the video is not available to members of the Mountaineers group because it is a video sent only to John's device 6000A), John's device starts playback of video 6296 only at John's device 6000A, while other participants of the shared-content session continue to watch "First Episode," as shown on Jane's device 6000B. John's device remains in (connected to) the shared-content session, as indicated by sharing pill 6020A. Accordingly, John's device is still able to communicate with the members of the Mountaineers group (e.g., via the audio channel and/or video conference interface). In some embodiments, John's device 6000A stops playback of shared content (optionally while remaining in the shared-content session) in response to other events such as, for example, receiving an incoming call. Because John is no longer watching content in the shared-content session, John becomes less active in the shared-content session than Ryan. Accordingly, Jane's device replaces John's video feed in mini PiP 6243 with Ryan's video feed.

When John's device 6000A begins playing video 6296, John's device displays notification 6300 indicating that the video is being played only for John and, as such, is not being shared with the Mountaineers group. Notification 6300 includes messages glyph 6304 indicating that the video is being played using the messages app.

In FIG. 6BH, John's device 6000A displays control region 6015A in response to input 6306 on sharing pill 6020A. In some embodiments, John's device displays prompt 6312 with control region 6015A to prompt John to resume watching the shared content with the Mountaineers group (and/or to serve as a reminder that the shared content is still ongoing in the shared-content session). In some embodiments, John's device 6000A resumes playing "First Episode" in response to input 6308 on control region status region 6015A-1, or in response to input 6310 on open affordance 6314, which is displayed with prompt 6312.

As previously noted, while John is privately viewing video 6296 on John's device 6000A, John's device remains connected to the shared-content session and is capable of communicating with the members of the Mountaineers group through the shared-content session. In FIG. 6BH, Jane speaks to the members of the Mountaineers group, and the corresponding audio is output at John's device 6000A, as indicated by audio input 6035B and output audio 6037A. In some embodiments, the output audio 6037A is generated while John's device is concurrently outputting audio 6302 from video 6296.

In FIG. 6BI, John's device 6000A finishes playing video 6296 and, in response, displays notification 6316 reminding John that the Mountaineers group is still watching "First Episode" in the shared-content session, and inviting John to resume watching "First Episode" with the Mountaineers group. John's device resumes playback of the shared content, "First Episode," in response to input 6318 on notification 6316, as depicted in FIG. 6BJ. In some embodiments, John's device 6000A automatically resumes playing the shared content when playback of the private content (e.g., video 6296) is finished.

When John's device 6000A resumes playback of the shared content in FIG. 6BJ, playback resumes for John's device at the same point in the show that is currently being output for the members of the Mountaineers group, rather than the time at which John stopped playing the shared content. In other words, while John's device was not playing "First Episode," the show continued to be played for the Mountaineers group and, instead of picking up where John left off with "First Episode," John's device resumes playing at the elapsed time in "First Episode" that is currently being viewed by the other members of the Mountaineers group. Because John has continued watching content in the shared-content session, John becomes more active or more recently active in the shared-content session than Ryan. Accordingly, Jane's device replaces Ryan's video feed in mini PiP 6243 with John's video feed.

FIGS. 6BK-6BU illustrate example embodiments in which Jane changes the content that is being shared with the Mountaineers group. In these embodiments, the Mountaineers group is not engaged in an ongoing video conference session. Accordingly, video PiP 6235 and mini PiP 6243 are not displayed by the respective devices. In FIG. 6BK, the Mountaineers group is currently watching "First Episode," as depicted at John's and Jane's devices 6000. Jane's device 6000B displays control region 6015B and media PiP 6150B in messages interface 6004B, along with dynamic graphic 6010B. Control region status region 6015B-1 and dynamic graphic 6010B indicate that the Mountaineers group is watching "First Episode." In response to detecting input 6322 at control region status region 6015B-1, Jane's device 6000B displays group card interface 6038B. In some embodiments, the group card interface is displayed in response to input on dynamic graphic 6010B (an input on information 6010B-2 in dynamic graphic 6010B, not on leave option 6010B-3, which is selectable to exit the shared-content session).

In FIG. 6BL, Jane's device 6000B displays group card interface 6038B while John's device continues to display playback of "First Episode" in media PiP 6150A. Group card interface 6038B includes status information 6040B (including a leave option that is selectable to leave the shared-content session), a listing of members 6042B of the Mountaineers group, add contact option 6044B that is selectable to add a contact to the Mountaineers group, and copy option 6050B, which is selectable to copy a link that can be used to invite someone to join the Mountaineers group. The listing of members 6042B includes the names of the other group members, along with status information for the respective members. Jane's device 6000B scrolls group card interface 6038B in response to input 6324, as shown in FIG. 6BM.

In FIG. 6BM, group card interface 6038 includes content history 6052B and preferred content 6054B. Content history 6052B includes tiles corresponding to content that has been shared in the Mountaineers group during current or past shared-content sessions. For example, tile 6330 corresponds to "First Episode," and includes playback progress indicator 6330-1 showing the latest playback progress for "First Episode." Tile 6330 also include indication 6056-1, which is John's avatar, indicating that John is the member who initiated playback of "First Episode." Jane's device 6000B detects input 6326 on tile 6328 corresponding to "Movie 3." In response to input 6328, Jane's device displays interface 6332 with controls 6338 and 6334 for starting playback of "Movie 3" in the shared-content session, which, in some embodiments, replaces playback of whatever is currently playing ("First Episode") with playback of "Movie 3" for the Mountaineers group.

In response to detecting input 6336 on control 6334, Jane's device 6000B begins playback of "Movie 3" for the Mountaineers group, as shown in FIG. 6BO. In FIG. 6BO, John's device 6000A replaces display of "First Episode" with display of "Movie 3" in media PiP 6150A, begins outputting audio 6340A for "Movie 3," and displays notification 6344 indicating that Jane started "Movie 3" for the Mountaineers group. Jane's device 6000B plays "Movie 3," which is displayed in media PiP 6150B positioned over group card interface 6038B. Jane's device 6000B also outputs audio 6340B for "Movie 3." In group card interface 6038B, the "Movie 3" tile 6328 has changed position with "First Episode" tile 6330. In some embodiments, tile 6328 includes a playback progress indicator for "Movie 3." In some embodiments, in response to initiating playback of "Movie 3," Jane's device displays an interface similar to that depicted on John's device in FIG. 6BO, including a notification that indicates that Jane started "Movie 3" for the Mountaineers group. In response to detecting drag input 6342 on media PiP 6150B, Jane's device 6000B displays media PiP in a docked state 6150B-1, as shown in FIG. 6BP.

In FIG. 6BQ, Jane's device 6000B is shown scrolled to the top of group card interface 6038B, revealing that Ryan's and John's status is now updated to indicate they are watching "Movie 3." Jane's device detects input 6346 on docked media PiP 6150B-1 and input 6348 on a done affordance. In response to inputs 6346 and 6348, Jane's device 6000B displays the interface depicted in FIG. 6BR, where media PiP 6150B is displayed in an undocked (e.g., expanded) state positioned over messages interface 6004B. Jane's device 6000B also displays control region 6015B with updated status region 6015B-1 indicating that the Mountaineers group is watching "Movie 3." Similarly, dynamic graphic 6010B is updated to indicate that the Mountaineers group is watching "Movie 3."

In FIG. 6BR, playback of "Movie 3" has continued for the Mountaineers group as depicted on John's and Jane's devices 6000. John's device 6000A detects input 6350, which is a request to end playback of "Movie 3." In response to input 6350, John's device displays prompt 6354, as shown in FIG. 6BS, prompting John to select option 6356 for ending playback for the entire group (the Mountaineers group), option 6358 for ending playback just for John's device, or option 6360 for cancelling the request to end playback. In some embodiments, John's device moves the displayed location of media PiP 6150A when prompt 6354 is displayed, as shown in FIG. 6BS. In response to input 6366 on cancel option 6360, John's device dismisses prompt 6354, and displays an interface similar to that shown in FIG. 6BR.

In FIG. 6BS, a message was sent via the messages app from a member of the Mountaineers group to the other members of the Mountaineers group. Accordingly, Jane's device 6000B updates message display region 6004B-3 to include the additional message 6352, which shifts the displayed position of messages and dynamic graphic 6010B in message display region 6004B-3.

FIG. 6BT illustrates John's and Jane's devices 6000 in response to John's device detecting input 6362 on option 6356 ("End for Group"). Specifically, John's device 6000A ends playback of "Movie 3" for the entire Mountaineers group, stops displaying media PiP 6150A, and displays TV app interface 6130 with notification 6368 (e.g., a banner for the shared-content session app) indicating that John ended "Movie 3" for the Mountaineers group. Jane's device 6000B stops playing "Movie 3," stops displaying media PiP 6150B, and displays notification 6370 indicating that John ended "Movie 3" for the Mountaineers group. In addition, Jane's device displays dynamic graphic 6010B having an updated appearance that indicates the current status of the shared-content session as being active with three people (and no longer sharing content).

FIG. 6BU illustrates John's and Jane's devices 6000 in response to John's device detecting input 6364 on option 6358 ("End for Me"). Specifically, John's device 6000A stops playing "Movie 3," stops displaying media PiP 6150B, and displays TV app interface 6130, as shown in FIG. 6BU. Jane's device 6000B (and other members in the Mountaineers group) continues to play "Movie 3," and updates dynamic graphic 6010B to show 2 people are now watching "Movie 3." In some embodiments, Jane's device displays a notification that John stopped watching "Movie 3."

FIGS. 6BV-6BW illustrate an embodiment in which John's device 6000A leaves a shared-content session while the Mountaineers group is watching "First Episode." In FIG. 6BV, the Mountaineers group is watching "First Episode" in a shared-content session with three active participants, as shown on John's and Jane's devices 6000. John's device 6000A detects input 6372 on leave option 6015A-9 and, in response, terminates the shared-content session at John's device, while the remaining members of the Mountaineers group continue watching "First Episode" in the shared-content session. As shown in FIG. 6BW, John's device 6000A is displaying home screen 6018, without a control region or sharing pill, indicating that the shared-content session is not active for John's device. Jane's device continues to play "First Episode," and control region status region 6015B-1 is updated to indicate that two people are now active in the shared-content session. Jane's device 6000B also displays notification 6374 indicating that John left the shared-content session. Input audio 6035B is received at Jane's device 6000B, but is not output at John's device 6000A because John is no longer in the shared-content session with Jane and other members of the Mountaineers group.

FIGS. 6BX-6CA illustrate an embodiment in which John initiates playback of media content in the shared-content session, but the media is not played at Jane's device until the proper app is installed. In FIG. 6BX, John's and Jane's devices 6000 are in a shared-content session when John's device 6000A detects input 6376 to play "First Episode" for the Mountaineers group. In FIG. 6BX, Jane's device 6000B is displaying home screen 6088, but Jane's device does not have the TV app downloaded.

In response to input 6376, John's device begins "First Episode" for the Mountaineers group, which begins to play on John's device 6000A as indicated by media PiP 6150A and notification 6378. Because the TV app that is used to play "First Episode" is not installed at Jane's device, Jane's device does not start playing "First Episode" and, instead, displays notification 6380 informing Jane that John started playing "First Episode" in the shared-content session. Notification 6380 includes view option 6382 which is selectable via input 6384 to display control region 6015B, as shown in FIG. 6BZ.

When control region 6015B is displayed, Jane's device 6000B also displays prompt 6386 prompting Jane to download the TV app that is required for viewing "First Episode." In response to input 6390 on view option 6388, Jane's device 6000B displays app store interface 6392, which is a specific location within the app store that displays an option 6394 that is selectable via input 6396 to download the TV app, as shown in FIG. 6CA. The app store has multiple apps that can be obtained, and a user can navigate from a landing page of the app store to different pages within the app store for obtaining various applications. As shown in FIG. 6CA, however, selecting view option 6388 specifically causes Jane's device 6000B to navigate directly to the interface for obtaining the specific app that is required for viewing "First Episode," without requiring the user to navigate the app store to find the required app. After Jane's device obtains the TV app in response to input 6396, Jane's device automatically launches the TV app and begins playing "First Episode" at the current playback time being viewed by the other members of the Mountaineers group.

FIGS. 6CB-6CH illustrate an embodiment in which John initiates playback of media content in a shared-content session, but the media is not played at Jane's device until the required subscriptions are purchased. In FIG. 6CB, John's and Jane's devices 6000 are in a shared-content session when John's device 6000A detects input 6398 to play "First Episode" for the Mountaineers group. In FIG. 6CB, Jane's device 6000B is displaying home screen 6088.

In response to input 6398, John's device begins "First Episode" for the Mountaineers group, which begins to play on John's device 6000A as indicated by media PiP 6150A and a notification in FIG. 6CC. In this embodiment, a subscription is required to view "First Episode." Because Jane's device does not have the required subscription (e.g., the subscription has not been purchased), Jane's device does not start playing "First Episode" and, instead, displays notification 6400 informing Jane that John started playing "First Episode" in the shared-content session. Notification 6400 includes view option 6402 which is selectable via input 6404 to display control region 6015B, as shown in FIG. 6CD.

When control region 6015B is displayed, Jane's device 6000B also displays prompt 6406 prompting Jane to purchase the subscription that is required for viewing "First Episode." In response to input 6410 on purchase option 6408, Jane's device 6000B displays subscription interface 6412, which includes an option 6414 that is selectable via input 6416 to purchase the subscription, as shown in FIG. 6CE. In response to input 6416, Jane's device 6000B displays payment transaction interface 6420, which enables Jane to complete the purchase of the subscription that is required for viewing "First Episode." In response to detecting input 6422 (e.g., a double-click input) on button 6418B, Jane's device 6000B completes the transaction (including any verification or authentication steps) for purchasing the subscription, as shown in FIG. 6CG. After detecting input 6426 on done affordance 6424, Jane's device 6000B launches the TV app and begins playing "First Episode" at the current playback time being viewed by the other members of the Mountaineers group.

FIGS. 6CI-6CN illustrate embodiments in which music is shared in a shared-content session with the Mountaineers group. FIG. 6CI depicts John's device 6000A displaying group card interface 6038A, while Jane's device 6000B is displaying home screen 6088. John selects Music 1 tile 6430 via input 6432 and, in response, John's device 6000A initiates playing Music 1 for the Mountaineers group, as shown in FIG. 6CJ. John's and Jane's devices 6000 begin playing "Music 1," as indicated by output audio 6441A and 6441B. John's device 6000A displays music interface 6434A with Music 1 added to playlist 6442 and being played, and displays notification 6440 (e.g., a banner from the shared-content session app) informing John that he added "Music 1" to a music playlist for the Mountaineers. Jane's device 6000B displays notification 6436 (e.g., a banner from the shared-content session app) informing Jane that John added "Music 1" to the playlist. In some embodiments, the notifications indicate that John started playing "Music 1" for the Mountaineers group. Notifications 6440 and 6436 include music glyph 6439 to indicate that the music app is associated with sharing the music (e.g., the music app is used to play the music for the shared-content session or the music was added to a playlist or queue in the music app). In some embodiments, when music is selected for the shared-content session, the music is added to a music queue. In some embodiments, when music is selected for the shared-content session, the music begins playing without adding the music to a queue. In some embodiments, when music is selected for the shared-content session, the music begins playing and replaces playback of content (e.g., music and/or media content) that is currently being output in the shared-content session.

Jane taps notification 6436 via input 6438 to display music interface 6434B, as shown in FIG. 6CK. Jane's device 6000B shows Music 1 is displayed in a playlist and that Music 1 is being played at Jane's device 6000B. Jane taps Music VI option 6443 via input 6444 to begin playing Music VI for the Mountaineers group, as shown in FIG. 6CL.

In FIG. 6CL, the Mountaineers group begins to play Music VI, as shown for John's and Jane's devices 6000. John's device 6000A begins outputting music audio 6448A, updates music interface 6434A to show that Music VI is playing, and displays notification 6450 informing John that Jane started playing Music VI. Similarly, Jane's device 6000B begins outputting music audio 6448B, updates music interface 6434B to show that Music VI is playing, and displays notification 6452 informing Jane that she started playing Music VI for the Mountaineers group.

In FIG. 6CM, John's and Jane's devices 6000 each navigate to respective home screens 6018 and 6088 in response to home gestures 6454 and 6456 (shown in FIG. 6CL) received at John's device 6000A and Jane's device 6000B, respectively. The devices 6000 continue to play Music VI as John taps browser app icon 6458 via input 6460, and Jane taps weather app icon 6464 via input 6462. Music continues to play while John's device 6000A displays browser interface 6466, and Jane's device 6000B displays weather interface 6468, as shown in FIG. 6CN.

FIGS. 6CO-6CU illustrate embodiments in which the Mountaineers group is in a shared-content session and an active video call is ongoing. John begins playing a show for the Mountaineers group and then moves display of the show from his phone to a TV. In FIG. 6CO, John selects option 6220-1, via input 6470, to play "First Episode" for the Mountaineers group, and swipes (input 6472) to display home screen 6018, as shown in FIG. 6CP. Jane's device 6000B is displaying home screen 6088.

In FIG. 6CP, "First Episode" begins playing for the Mountaineers group, as indicated by display of media PiPs 6150 at John's and Jane's devices 6000 and output of music for "First Episode." While displaying media PiP 6150B, Jane's device 6000B detects input 6476 to scroll pages on home screen 6088 and input 6474 to pause playback of "First Episode" for the Mountaineers group. John's device 6000A detects input 6476 on video conference app icon 6478 and, in response, displays video conference interface 6170A with media PiP 6150A overlaid on top, as shown in FIG. 6CQ. Because video conference interface 6170A is displayed on John's device 6000A, mini PiP 6295 is no longer displayed over media PiP 6150A.

In FIG. 6CQ, "First Episode" is paused for the Mountaineers group. John selects the play affordance via input 6484 to resume playing the show for the Mountaineers group, and selects transfer option 6152A-3 via input 6482. Jane's device transitions to home screen page two 6088-1 in response to input 6476 while continuing to display media PiP 6150B, and detects selection of mail app icon 6488 via input 6486.

In FIG. 6CR, "First Episode" is resumed for the Mountaineers group in response to input 6484. Jane's device 6000B displays mail interface 6496 in response to input 6486, and continues to display media PiP 6150B, showing "First Episode" has resumed playing. John's device 6000A displays transfer menu 6490 in response to input 6482. Transfer menu 6490 indicates devices that are capable of playing the shared content. John selects TV option 6492 via input 6494 to transfer playback of "First Episode" to TV 6500, as shown in FIG. 6CS.

In FIG. 6CS, TV 6500 is playing "First Episode" on display 6503, and is outputting audio 6156C for the show. In some embodiments, TV 6500 is in communication with John's device 6000A via data connection 6501. Because "First Episode" is now playing on TV 6500, John's device 6000A stops outputting the audio for "First Episode," stops displaying media PiP 6150A, and displays the video feeds in video conference interface 6170A having their initial, default sizes and arrangement. Jane's device 6000B (and the devices of other participating members of the Mountaineers group) continues to play "First Episode."

In FIG. 6CT, John's device 6000A displays control region 6015A in response to detecting input 6498 on sharing pill 6020A in FIG. 6CS. Because "First Episode" was transferred to TV 6500, control region 6015A is modified to include controller option 6502. John selects controller option 6502 via input 6504. In response, John's device 6000A display controller interface 6506 in FIG. 6CU.

Controller interface 6506 includes control pad 6508 and control options 6510 for controlling playback of content at TV 6500. Control pad 6508 can be interacted with (e.g., via touch inputs) to provide input for controlling display of content at TV 6500. For example, control pad 6508 can be used to navigate a cursor, select menu options, control playback of content, or provide other inputs for controlling content displayed at TV 6500. For example, in FIG. 6CU, input 6512 is used to cause display of playback controls 6514 at TV 6500.

In some embodiments, a device 6000 can switch between multiple different shared-content sessions that are active simultaneously. FIGS. 6CV-6CX illustrate an embodiment in which John's device 6000A is participating in two active shared-content sessions and switches from one of the active shared-content sessions to the other.

In FIG. 6CV, John's device 6000A is participating in an active shared-content session with the Mountaineers group. John selects video conference app icon 6478 via input 6516 and, in response, John's device 6000A displays video conference interface 6520 in FIG. 6CW. Video conference interface 6520 depicts a call log of current and past shared-content sessions and video conference sessions. Multiple items in the call log provide an indication of whether the corresponding call is a video call or a shared-content session, and includes additional information such as an identification of the participants of the respective call, a time and/or date of the call, and, in the case of a shared-content session, an indication of activity occurring in the shared-content session such, for example, an indication of content that was shared in the shared-content session and/or an indication that the group participated in a video call during the shared-content session. For example, item 6522 is an indication of an ongoing shared-content session with a group called "Fishermen." Item 6522 includes Fishermen logo 6524, Fishermen group name identifier 6526, call type indication 6528 indicating that the call is a shared-content session, and activity indication 6530 indicating that members of Fishermen group participated (or are currently participating) in a video call during the shared-content session. Similarly, item 6532 represents the ongoing active shared-content session with the Mountaineers group. Item 6534 is an example of a call (specifically, a video call) that occurred yesterday with the Tennis Club group.

John switches from the active shared-content session with the Mountaineers group to the active shared-content session with the Fishermen group via input 6536 on item 6522. In response to detecting input 6536, John's device switches from the shared-content session with the Mountaineers group to the shared-content session with the Fishermen group, as shown in FIG. 6CX. In FIG. 6CX, John's device 6000A is participating in the active shared-content session with Finn's device 6000D. John's device 6000A displays video conference interface 6538A, control region 6015A, sharing pill 6020A, media PiP 6150A, camera preview 6544, and video feeds 6540 and 6542 from participants of the shared-content session. Similarly, Finn's device 6000D displays video conference interface 6538D, control region 6015D, sharing pill 6020D, media PiP 6150D, camera preview 6550, and video feeds 6546 and 6548 from participants of the shared-content session.

FIGS. 6CY-6DE illustrate example embodiments in which a representation of a participant is displayed over a representation of content shared in a shared-content session. In FIG. 6CY, John's and Jane's devices 6000 are video conferencing in a shared-content session, as shown by video conference interfaces 6170A and 6170B. In FIG. 6CZ, Ryan begins playing a show for the Mountaineers group, as indicated by display of media PiPs 6150. John dismisses interface 6170A to display home screen 6018 via input 6552, and Jane dismisses interface 6170B to display home screen 6088 via input 6554.

In FIG. 6DA, the devices display their respective home screens and modify the appearance of the respective media PiPs 6150 to display an indication of a remote participant who is currently most active (or recently active) in the shared-content session. In FIG. 6DA, John's device 6000A displays indication 6556 (similar to mini PiP 6295) representing Ryan, who is the most active (or recently active) remote participant because he started playing the content displayed in media PiP 6150A. Similarly, Jane's device 6000B displays indication 6558 (similar to mini PiP 6243) representing Ryan, who is the most active (or recently active) remote participant because he started playing the content displayed in media PiP 6150B. In FIG. 6DA, indications 6556 and 6558 are the video call video feed from Ryan's device. In some embodiments, indication 6556/6558 is an avatar, name, picture, or other identifying element.

In FIG. 6DA, John selects browser app icon 6560 via input 6562, and Jane speaks to the Mountaineers group and selects weather app icon 6564 via input 6566. In response to input 6562, John's device 6000A displays browser interface 6570 while continuing to display media PiP 6150A. Because Jane spoke to the Mountaineers group, Jane is now the most active remote participant, with respect to John's device 6000A. Accordingly, John's device 6000A replaces Ryan's indication 6556 with indication 6568 of Jane (similar to mini PiP 6295).

In response to input 6566, Jane's device 6000B displays weather interface 6572 while continuing to display media PiP 6150B. Although Jane spoke to the Mountaineers group, Jane's activity is not activity of a remove participant with respect to Jane's device 6000B. Accordingly, Ryan remains the most active remote participant with respect to Jane's device 6000B. Therefore, Jane's device 6000B continues to display indication 6558 of Ryan with media PiP 6150B.

In some embodiments, the indication of an active remote participant is displayed during screen sharing. For example, FIGS. 6DC-6DE depict an embodiment where Jane is sharing her device's screen content 6576 for the Mountaineers group. John's device 6000A displays screen-share content 6574 (similar to screen-share window 6070), including indication 6568 of Jane, who is the most active (or recently active) remote participant with respect to John's device 6000A. Jane's device 6000B displays screen content 6576 (e.g., a browser) and video PiP 6245 showing the video feed of Ryan, who continues to be the most active remote participant with respect to Jane's device.

In FIG. 6DC, John selects screen-share content 6574 via input 6584. In response, John's device 6000A displays an expanded (e.g., full-screen or using all of the screen outside of a portion of the screen designated for system status information and/or system controls) view of screen-share content 6574, as shown in FIG. 6DD. When screen-share content 6574 becomes expanded, Jane's video feed is displayed in video PiP 6235. Video PiP 6235 can be moved as previously discussed. For example, in response to input 6586 (e.g., a drag gesture), video PiP 6235 is moved from the bottom right corner of display 6001A to the top right corner, as shown in FIG. 6DE. In FIG. 6DE, Ryan becomes the more active participant (e.g., due to moving in his displayed video feed). Accordingly, John's device 6000A replaces Jane's video feed in video PiP 6235 with Ryan's video feed.

In some embodiments, a user's view of shared content can be resized, adjusted, zoomed in, zoomed out, or otherwise manipulated. For example, in FIG. 6DD, John's device 6000A detects input 6588 (e.g., a de-pinch gesture) and, in response, expands or zooms the view of screen-share content 6574, as shown in FIG. 6DE. In some embodiments, the zoomed-in view of screen-share content 6574 can be panned (e.g., in response to a one- or two-finger drag gesture), further zoomed-in (e.g., in response to a de-pinch gesture), zoomed out (e.g., in response to a pinch gesture), or otherwise manipulated.

As mentioned above, in some embodiments, sharing option 6015-8 is selectable to display and, optionally, change a media playback setting associated with a respective application. An example of such an embodiment is depicted in FIGS. 6DF and 6DG. In FIG. 6DF, John's device 6000A is in a shared-content session with the Mountaineers group, and is displaying control region 6015A while displaying launch interface 6140 of the TV app. John selects sharing option 6015A-8 via input 6578. In response to input 6578, John's device 6000A displays a drop-down menu with media playback options for the TV app. Specifically, the drop-down menu includes "always play" option 6580-1, "ask next time" option 6580-2, and "never play" option 6580-3. These options correspond to media playback settings, for controlling whether John's device automatically plays media from the TV app with participants of a shared-content session, whenever John starts playback of media from the TV app. For example, "always play" option 6580-1 is currently selected, as indicated by checkmark 6582. Accordingly, when John selects media for playback in the TV app, John's device 6000A will automatically instruct participants of the shared-content session to launch playback of the respective media at the respective devices of the participants without displaying prompt 6220 (as shown in FIG. 6AO). If "ask next time" option 6580-2 is selected, John's device 6000A displays prompt 6220 when John selects media for playback in the TV app. If "never play" option 6580-3 is selected, John's device plays media content privately, optionally without displaying prompt 6220, when John selects media for playback in the TV app.

FIGS. 6DH-6DO illustrate various embodiments of participants of the shared-content session manipulating displayed content and enabling and/or disabling their respective video feeds. In FIG. 6DH, the Mountaineers group is watching "First Episode" in a shared-content session while the video feeds of the participants are enabled. John's device 6000A shows media PiP 6150A docked in an expanded display state with Jane's video feed in video PiP 6235. John's device 6000A detects input 6590 and, in response, displays home screen 6018 with media PiP 6150A having Jane's video feed displayed in mini PiP 6295, as shown in FIG. 6DI. Jane's device 6000B displays media PiP 6150B having a small displayed size with mini PiP 6243. Jane's device detects input 6592 and, in response, moves media PiP 6150B to the bottom of the display, as shown in FIG. 6DI.

In FIG. 6DI, John's device 6000A detects input 6594 on mini PiP 6295 and, in response, displays video conference interface 6170A, as shown in FIG. 6DJ. Jane's device 6000B detects resizing input 6596 (e.g., a de-pinch gesture) and, in response, increases the displayed size of media PiP 6150B, as shown in FIG. 6DJ. In some embodiments, when the size of media PiP 6150 changes, the displayed size of a mini PiP overlaying the media PiP also changes (e.g., by an amount proportional to the direction and/or magnitude of the resizing input). For example, in FIG. 6DJ, the size of mini PiP 6243 is increased with media PiP 6150B. In some embodiments, when the size of media PiP 6150 changes, the displayed size of a mini PiP overlaying the media PiP does not change. For example, in FIG. 6DK, the size of mini PiP 6243 is not increased with media PiP 6150B.

In FIG. 6DK, Jane's device 6000B detects input 6598 on media PiP 6150B and, in response, displays playback controls including expand affordance 6600, as shown in FIG. 6DL. Jane selects expand affordance 6600 via input 6602 and, in response, displays media PiP 6150B in the docked state shown in FIG. 6DM with video PiP 6245 showing John's video feed. In FIG. 6DM, Ryan has disabled his video feed as indicated by the display of Ryan's initials 6610 in tile 6174. John's device 6000A detects input 6604 on video option 6015A-7 and input 6606 and, in response, disables John's video feed (in response to input 6604) and displays home screen 6018 (in response to input 6606), as shown in FIG. 6DN. Jane's device 6000B detects input 6612 on notification 6614 and, in response, displays control region 6015B, as shown in FIG. 6DN.

In FIG. 6DN, video PiP 6245 shows John's initials 6616 because John's video feed is now disabled. Because Jane's video feed is still enabled, mini PiP 6295 continues to show Jane's video feed on John's device 6000A. Jane disables her video feed by selecting video option 6015B-7, via input 6618.

In some embodiments, when all participants have disabled their respective video feeds, device 6000 stops displaying a respective video PiP or mini PiP and displays a notification when the last video feed is disabled. For example, in FIG. 6DO, Jane is the last participant of the shared-content session to disable their video feed. John's device 6000A stops displaying mini PiP 6295 and displays notification 6620 indicating that Jane disabled her video feed. Similarly, Jane's device 6000B stops displaying video PiP 6245 and displays notification 6622 indicating that Jane disabled her video feed for the Mountaineers group. In some embodiments, after all video feeds are disabled, a notification is displayed when one of the participants enables (or re-enables) their video feed.

FIGS. 6DP-6DV illustrate various embodiments of participants viewing content in a shared-content session. In FIGS. 6DP and 6DQ, John and Jane are watching First Episode in a shared-content session with the Mountaineers group. John stops playback of First Episode for the Mountaineers group via inputs 6624 and 6626. Referring to FIG. 6DR, when playback is terminated, John's device 6000A displays notification 6630 indicating that John ended First Episode for the Mountaineers group, stops displaying media PiP 6150A, and continues to display video PiP 6235 with Jane's video feed. Jane's device 6000B displays notification 6632 indicating that John ended First Episode for the group, stops displaying media PiP 6150B with mini PiP 6243, and displays video PiP 6245 showing John's video feed. John selects notification 6630 via input 6628, and Jane drags video PiP 6245 across the screen via input 6634.

In FIG. 6DS, John's device 6000A displays control region 6015A in response to input 6628, and Jane's device 6000B displays video PiP 6245 having a changed location on the screen in response to input 6634. John selects video option 6015A-7 via input 6636 to disable the video feed from John's device 6000A.

In FIG. 6DT, both John and Ryan have disabled their respective video feeds. Jane's device stops displaying John's video feed and, instead, displays John's initials 6616 in video PiP 6245. Ryan speaks to the group as indicated by output audio 6037A and 6037B. John selects video option 6015A-7 via input 6638 to re-enable his video feed. In FIG. 6DU, Ryan continues to speak to the group, making him the most active (and most recently active) participant in the session. Accordingly, John's device 6000A displays Ryan's initials 6610 in video PiP 6235. In some embodiments, when a user has enabled their video feed, the video feed is displayed at other devices, even if that user is not the most active user in the session. For example, in FIG. 6DU, although Ryan is the most active (and most recently active) participant in the session, Jane's device 6000B displays John's video feed in video PiP 6245 because John has enabled his video feed. In some embodiments, the newly enabled video feed is temporarily displayed before redisplaying the video feed (or other representation (e.g., initials)) of the most active participant. In some embodiments, a video feed is given higher display priority than an alternative representation of a user (e.g., the user's initials). In such embodiments, the device continues to display the video feed of the less active participant, while the video feed of the most active participant is disabled. In FIG. 6DV, Ryan, who is the most active participant, has enabled his video feed, and devices 6000 display Ryan's video feed in respective video PiPs 6235 and 6245.

FIGS. 6DW-6EE illustrate various embodiments for displaying a video conference interface during a shared-content session. In FIG. 6DW, John's device 6000A is using a light color scheme and displays media PiP 6150A displayed over video conference interface 6170A with tiles 6642-1 to 6642-6 representing the video feeds of participants of the shared-content session who are also participating in the video conference, and camera preview 6645A representing the video feed from John's device 6000A. Some tiles are displayed in primary region 6170A-1 of video conference interface 6170A, and other tiles are displayed in roster region 6170A-2 of video conference interface 6170A. In some embodiments, camera preview 6645A is displayed positioned over the tiles in roster region 6170A-2. Jane's device 6000B is using a dark color scheme and displays media PiP 6150B displayed over video conference interface 6170B with tiles 6644-1 to 6642-6 representing the video feeds of participants of the shared-content session, and camera preview 6645B representing the video feed from Jane's device 6000B. Some tiles are displayed in primary region 6170B-1 of video conference interface 6170B, and other tiles are displayed in roster region 6170B-2 of video conference interface 6170B. In some embodiments, camera preview 6645B is displayed positioned over the tiles in roster region 6170B-2.

In some embodiments, tiles are generally displayed in primary region 6170-1, but can be displayed in roster region 6170-2 based on various criteria such as, for example, when there is not sufficient space for the respective tile(s) to be displayed in primary region 6170-1. In some embodiments, tiles are associated with a priority level for display, and tiles having a higher priority are displayed in the primary region, with the remaining tiles (or a subset of the remaining tiles) displayed in the roster region. In some embodiments, tiles having a higher priority are those that display a video feed of a more active (or more recently active) participant, tiles that are associated with participants who are sharing content or have recently shared content, participants who joined the video conference earlier in the call session, or tiles that have been selected (e.g., pinned) for display in the primary region. In some embodiments, a tile with a higher priority can be displayed in the roster region if there is not sufficient space to display the tile in the primary region. In some embodiments, tiles are moved from the primary region to the roster region (or vice versa) as the priority of those participants changes or as other conditions dictate. In some embodiments, not all tiles may be visible in the roster region. In such cases, the roster can be scrolled (e.g., via a swipe gesture on the roster region) to display additional tiles assigned to the roster region. In some embodiments, the videos feeds in the roster can be updated less frequently or at a slower rate than video feeds that are not in the roster (e.g., video feeds in primary region 6170-1).

John's device 6000A illustrates an embodiment where a grid view setting is disabled, and Jane's device 6000B illustrates an embodiment where the grid view setting is enabled. When the grid view setting is disabled, device 6000 displays video tiles in an overlapping or non-grid display arrangement, as shown by tiles 6642-1 and 6642-2 on John's device 6000A. When the grid view setting is enabled, device 6000 displays video tiles in a grid arrangement, as shown by tiles 6644-1 to 6644-4 on Jane's device 6000B.

In FIG. 6DW, John's and Jane's devices 6000 are displaying First Episode in a shared-content session with the Mountaineers group. The video feeds of the members of the Mountaineers group are represented in respective tiles 6642-1 to 6642-6 and 6644-1 to 6644-6. First Episode is currently paused, and Jane resumes playback of First Episode via input 6648. First Episode resumed playback as illustrated in FIG. 6DX.

When playback resumes, John's device 6000A displays notification 6650 indicating that Jane resumed First Episode for the Mountaineers group. In some embodiments, notifications associated with the shared-content session (e.g., notifications generated by an application that enables the shared-content session) are displayed having a respective color scheme, regardless of which color scheme is being used by a respective device. Accordingly, notification 6650 is displayed having a shaded color associated with the shared-content session, even though John's device is using a light color scheme. Similarly, Jane's device 6000B displays notification 6652 indicating that Jane resumed First Episode for the Mountaineers group. Notification 6652 is displayed having the shaded color associated with the shared-content session.

In FIG. 6DX, John's device detects input 6654, and Jane's device detects input 6656. In response, the devices minimize and dock respective media PiPs 6150A and 6150B, as shown in FIG. 6DY. When the media PiPs are minimized and docked, the respective devices adjust the displayed sizes and/or arrangements of the tiles in video conference interface 6170 based on the additional space available in the primary regions of the video conference interfaces. Specifically, John's device 6000A resizes and shifts the locations of tiles 6642-1 and 6642-2 within primary region 6170A-1 and moves (and resizes) tile 6642-3 from roster region 6170A-2 to primary region 6170A-1. Jane's device 6000B shifts tiles 6644-1 to 6644-4 in primary region 6170B-1 and moves tiles 6644-5 and 6644-6 from roster region 6170B-2 to primary region 6170B-1. In some embodiments, when shared content is not displayed, the device adjusts the displayed camera preview. For example, in FIG. 6DY, when media PiPs 6150A and 6150B are minimized and docked, John's device 6000A changes camera preview 6645A from a square shape to an elongated shape, and Jane's device 6000B changes camera preview 6645B from a square shape to an elongated shape.

In FIG. 6DY, John's device 6000A displays notification 6658, and Jane's device 6000B displays notification 6660. Notifications 6658 and 6660 are not associated with the shared-content session and, therefore, are displayed having a color that corresponds to the respective device's color scheme. Accordingly, notification 6658 is displayed having the light color, and notification 6660 is displayed having the dark color.

In response to inputs 6662 and 6664, devices 6000 expand media PiPs 6150 and rearrange the tiles displayed in video conference interfaces 6170A and 6170B in response to the expanded state of the media PiPs, as shown in FIG. 6DZ. John's device 6000A detects input 6666 (e.g., a pinch gesture) and, in response, resizes (e.g., shrinks) media PiP 6150A, as shown in FIG. 6EA. In FIG. 6DZ, Jane's device 6000B detects input 6668 (e.g., a drag gesture) and, in response, moves media PiP 6150B to the position shown in FIG. 6EA. When media PiP 6150 is moved on the screen, device 6000 rearranges the displayed tiles to accommodate the changed position of media PiP 6150. Accordingly, in FIG. 6EA, Jane's device 6000B has shifted tiles 6644-1 to 6644-4 to the top of primary region 6170B-1, and displayed media PiP 6150B below tiles 6644-2 and 6644-4 and above roster region 6170B-2.

In some embodiments, device 6000 moves camera preview 6645 and/or tiles in roster region 6170-2 to accommodate the placement of media PiP 6150. In some embodiments, device 6000 does not move camera preview 6645 and/or tiles in roster region 6170-2 to accommodate the placement of media PiP 6150. For example, in FIGS. 6EA and 6EB, John's device 6000A detects input 6670 (e.g., a drag gesture) moving media PiP 6150A from the top of video conference interface 6170 in FIG. 6EA, to the position over roster region 6170A-2 and camera preview 6645A shown in FIG. 6EB. John's device 6000A moves tiles 6642-1 and 6642-2 in primary region 6170A-1 to accommodate the movement of media PiP 6150A, but does not move camera preview 6645A or the tiles in roster region 6170A-2. Upon termination of input 6670 (e.g., a finger lift) device 6000A repositions media PiP 6150 at a location above roster region 6170A-2 and camera preview 6645A, as shown in FIG. 6EC.

Referring again to FIG. 6EB, Jane's device 6000B displays video conference interface 6170B with control region 6015B. When control region 6015B is displayed, tiles in primary region 6170B-1, tiles in roster region 6170B-2, camera preview 6645B, and/or media PiP 6150B are resized to accommodate display of control region 6015B. Jane selects control region status region 6015B-1 via input 6672. In response, Jane's device 6000B displays group card interface 6038B, as shown in FIG. 6EC. In some embodiments, group card interface 6038 includes an option to enable or disable the grid view arrangement. For example, in FIG. 6EC, Jane's device 6000B displays group card interface 6038B with grid view option 6676, shown in an enabled state. In some embodiments, grid view option 6676 is placed at a different location in group card interface 6038. For example, grid view option 6676 is displayed below the listing of participants (optionally included in a region with the copy invitation link) and, in some embodiments, is displayed after scrolling group card interface 6038 (e.g., when there is a large number of participants). In FIG. 6EC, Jane selects grid view option 6676 via input 6674 to disable the grid view arrangement, and returns to video conference interface 6170B via input 6678. In FIG. 6ED, Jane's device 6000B displays video conference interface 6170B with the grid view arrangement disabled. Accordingly, tiles 6644-1 and 6644-2 are displayed in a non-grid arrangement in primary region 6170B-1, and tiles 6644-3 and 6644-4 are moved to roster region 6170B-2 with tiles 6644-5 and 6644-6.

In FIG. 6EE, participants of the video conference have left the video conference session, leaving Jane and John as the only participants of the video conference. Because there are fewer participants (e.g., no other participants) in the video conference session, John's device 6000A expands the tile having Jane's video feed, tile 6642-1, to an enlarged view, and Jane's device 6000B expands the tile having John's video feed, tile 6644-1, to an enlarged view. In some embodiments, tiles 6642-1 and/or 6644-1 are expanded to a full-screen view or using all of the screen outside of a portion of the screen designated for system status information and/or system controls (e.g., when media PiP 6150 is not displayed in the user interface) and, optionally, the corresponding camera preview is displayed in an elongated shape (e.g., as shown in FIG. 6EJ). In some embodiments, if a media PiP is displayed near a top edge of the camera preview, and the camera preview is enlarged (e.g., elongated), the device shifts the position of the media PiP (e.g., upwards) to accommodate the enlarged camera preview. In some embodiments, device 6000 displays additional controls when a tile is selected or otherwise emphasized. For example, in FIG. 6EE, John's device 6000A displays capture affordance 6680A, which is selectable to capture an image of Jane from Jane's video feed in tile 6642-1. Similarly, Jane's device 6000B displays capture affordance 6680B, which is selectable to capture an image of John from John's video feed in tile 6644-1. In some embodiments, capture affordance 6680 is displayed when the tile is in a full-screen view, and is not displayed when the tile is not in a full-screen view.

FIGS. 6EF and 6EG illustrate an embodiment where Jane selects shareable content for playback in a shared-content session while the Mountaineers group is already playing content in the shared-content session. In FIG. 6EF, Jane selects, via input 6682, option 6684 for playing Movie 3 in the shared-content session. In response, Jane's device 6000B displays prompt 6686 (similar to prompt 6220) with option 6686-1 for Jane to start Movie 3 for the group, option 6686-2 to start Movie 3 on Jane's device only, and option 6686-3 to cancel the request to play Movie 3.

FIGS. 6EH-6EJ illustrate an embodiment where Jane stops playback of content being shared in the shared-content session. In FIGS. 6EH and 6EI, Jane ends playback of First Episode for the Mountaineers group via inputs 6688 and 6690. In response to ending playback of First Episode, John's device 6000A stops displaying media PiP 6150A and expands Jane's tile 6642-1 to an enlarged (e.g., full-screen) view (e.g., snapping to a full-screen view without the media PiP) and expands camera preview 6645A to an elongated shape, as shown in FIG. 6EJ. In some embodiments, John's device 6000A expands the tile with Jane's video feed (and, optionally, the camera preview) when media PiP 6150A is no longer displayed. In some embodiments (e.g., after video tile 6642-1 has been displayed concurrently with media PiP 6150A), John's device 6000A does not expand the tile with Jane's video feed (e.g., tile 6642-1) to avoid frequent shifts in the layout of the video tiles in the user interface.

FIGS. 6EK and 6EL illustrate an embodiment where Jane closes the video conference application while content is being shared in the shared-content session with the Mountaineers group. In FIG. 6EK, devices 6000 are displaying video conference interfaces 6170 while displaying shared content in media PiPs 6150. While the shared content continues to play, Jane closes the video conference application via input 6692. In response, Jane leaves the video conference session, but continues to play the shared content with the group (or, in some embodiments, continues to play the content at Jane's device, but with the content no longer being kept in sync with the playback of content in the Mountaineers group). In some embodiments, when Jane leaves the video conference session, Jane's device stops playing the shared content (e.g., stops displaying media PiP 6150B) and, optionally, leaves the shared-content session. Because Jane left the video conference session, John's device 6000A no longer displays Jane's tile (e.g., tile 6642-1) in FIG. 6EL and expands Ryan's tile, tile 6642-2, and camera preview 6645A, while continuing to display the shared content in media PiP 6150A. Jane's device 6000B displays home screen 6088 and continues to play the shared content in media PiP 6150B, which includes mini PiP 6243 with Ryan's video feed. In some embodiments, a video PiP or mini PiP (e.g., mini PiP 6243) is displayed with media PiP 6150 while the shared-content session is active, even if the content being played in media PiP 6150 is different from the content being played in the shared-content session.

FIGS. 6EM-6EO illustrate an embodiment where Jane accesses, from an interface that is not part of the shared-content session interface, content being shared in a shared-content session with the Mountaineers group. In FIGS. 6EM and 6EN, Jane is in a shared-content session with the Mountaineers group. The group is watching First Episode, but Jane is not currently watching First Episode with the group. Instead, Jane's device 6000B is displaying media application interface 6695, which is an interface of an application that is not part of the shared-content interface and can be used for playing media content (e.g., similar to interface 6130). While the Mountaineers group watches First Episode, Jane selects, via inputs 6694 and 6696, First Episode from the media application to watch with the Mountaineers group. In FIG. 6EO, Jane's device 6000B starts playing First Episode with the Mountaineers group. However, instead of starting First Episode from the beginning of the show or where Jane previously left off from watching the show, Jane's device starts First Episode at the same position (e.g., time or moment) of the show that is being watched by the Mountaineers group so that she is playing the content concurrently with the Mountaineers group. John's device 6000A displays Jane's video feed in mini PiP 6295 because Jane is the most recently active participant of the shared-content session and displays notification 6698 indicating that Jane started watching First Episode with the Mountaineers group. Jane's device 6000B displays notification 6700 indicating that Jane started watching First Episode with the Mountaineers group. In some embodiments, if First Episode is not being played by the Mountaineers group in the shared-content session (or if Jane is not in a shared-content session), input 6696 (optionally with additional inputs to start playback of the show) starts playback of First Episode from the beginning of the show or at a location in the show where Jane previously stopped watching. In some embodiments, if Jane initiates playback of shareable content that is different from the content that is being watched in the shared-content session with the Mountaineers group, Jane's device displays a prompt asking if Jane wants to play the content for the group or only herself (e.g., prompt 6686 as shown in FIG. 6EG). In some embodiments, if Jane initiates playback of content that cannot be shared in the shared-content session, Jane's device 6000B plays the content without adding the content to the shared-content session and without prompting Jane to share the content with the Mountaineers group.

FIGS. 6EP and 6EQ illustrate John's device displaying various settings interfaces for adjusting settings associated with shared-content sessions. In FIG. 6EP, John's device 6000A displays settings interface 6702 of a settings application. Settings interface 6702 includes option 6704 associated with various settings for shared-content sessions. Device 6000 detects input 6706 selecting option 6704 and, in response, displays shared-content session settings interface 6708, as shown in FIG. 6EQ. Shared-content session settings interface 6708 includes toggle 6710, which is selectable to enable/disable a global shared-content session setting. When toggle 6710 is disabled, John's device 6000A does not add content to a shared-content session (e.g., when selecting content for playback). In some embodiments, when toggle 6710 is disabled, John's device 6000A does not display various notifications associated with sharing content in a shared-content session. For example, notification 6210 is not displayed when media interface 6130 is displayed or the text on various play affordances such as play option 6144 does not indicate that content can or will be played in a shared-content session. In some embodiments, device 6000 continues to display other indications that content can be shared such as, for example, glyph 6132.

Shared-content session settings interface 6708 also includes application options 6712, which include toggles 6714-1 to 6714-7 that are selectable to control whether content associated with a respective application is automatically added to a shared-content session. In some embodiments, the respective applications include applications that are capable of streaming content (e.g., media content, music, videos, and/or video games). When a respective one of toggles 6714-1 to 6714-7 is enabled, shareable content accessed from the corresponding application is automatically added to a shared-content session. When a respective one of toggles 6714-1 to 6714-7 is disabled, shareable content accessed from the corresponding application is not automatically added to the shared-content session and, instead, the user is given an option to add the content to a shared-content session or to play the content without adding the content to the shared-content session (e.g., similar to prompt 6220 in FIG. 6AO, 6BX, 6CB, or 6CO, or prompt 6686 in FIG. 6EG). In FIG. 6EQ, toggle 6714-1 is on for Streaming Video 1 application 6715-1, so if the user plays shareable content in the Streaming Video 1 application during a shared-content session, the content will be automatically added to the shared-content session. Toggle 6714-2 is off for Streaming Video 2 application 6715-2, so if the user plays shareable content in the Streaming Video 2 application during a shared-content session, the content will not be automatically added to the shared-content session (and the user is optionally given an option to add the content to the shared-content session). Toggle 6714-3 is on for Streaming Video Games 1 application 6715-3, so if the user plays shareable content in the Streaming Video Games 1 application during a shared-content session, the content will be automatically added to the shared-content session. Toggle 6714-4 is on for Streaming Music 1 application 6715-4, so if the user plays shareable content in the Streaming Music 1 application during a shared-content session, the content will be automatically added to the shared-content session. Toggle 6714-5 is on for Streaming Music 2 application 6715-5, so if the user plays shareable content in the Streaming Music 2 application during a shared-content session, the content will be automatically added to the shared-content session. Toggle 6714-6 is off for Streaming Music 3 application 6715-6, so if the user plays shareable content in the Streaming Music 3 application during a shared-content session, the content will not be automatically added to the shared-content session (and the user is optionally given an option to add the content to the shared-content session). Toggle 6714-7 is off for Streaming Movies application 6715-7, so if the user plays shareable content in the Streaming Movies application during a shared-content session, the content will not be automatically added to the shared-content session (and the user is optionally given an option to add the content to the shared-content session). In some embodiments, when toggle 6710 is disabled, application toggles 6714 are also disabled, unselectable, hidden, or otherwise obscured, and the user is not prompted to add content to shared-content sessions (e.g., for all applications or for a plurality of different applications that are capable of sharing content in a shared-content session), is not able to see (e.g., view) content in shared-content sessions, and/or is not able to join shared-content sessions.

In some embodiments, settings for shared-content sessions are maintained for a corresponding application when the shared content is transitioned to a different device (e.g., TV 6500). For example, if TV application toggle 6714-3 is on, as shown in FIG. 6EQ, when shareable content is played on TV 6500 during a shared-content session, the content is automatically added to the shared-content session. However, if TV application toggle 6714-3 is off, when shareable content is played on TV 6500 during a shared-content session, the user is prompted to add the content to the shared-content session.

Figure 7:
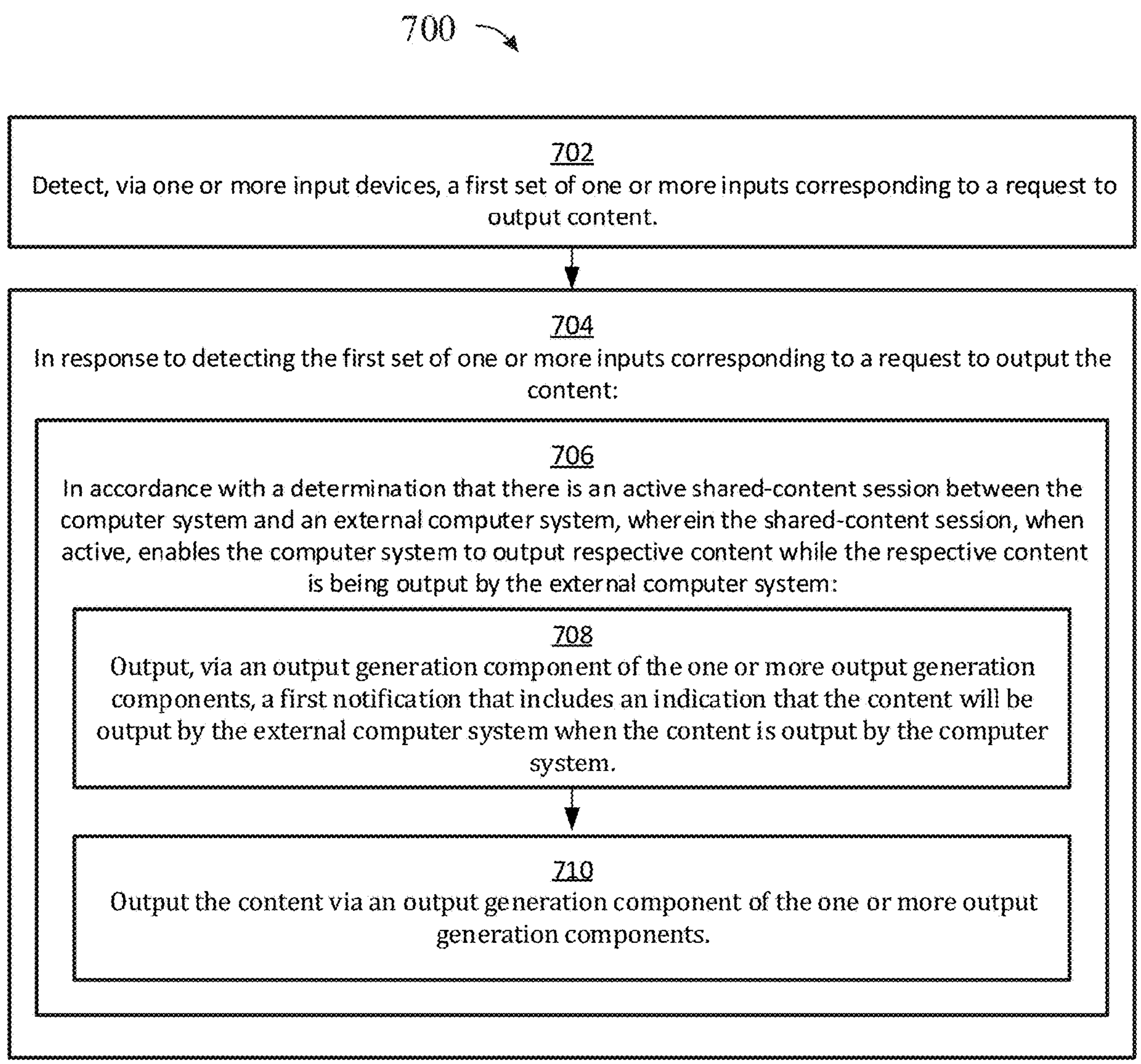
FIG. 7 depicts a flow diagram illustrating a method for managing a shared-content session, in accordance with some embodiments.

FIG. 7 is a flow diagram illustrating a method for outputting content and/or notifications associated with at shared-content session using a computer system (e.g., 6000A) in accordance with some embodiments. Method 700 is performed at a computer system (e.g., a smartphone, a tablet, and/or a desktop or laptop computer) that is in communication with one or more output generation components (e.g., 6001A) (e.g., a display controller, a touch-sensitive display system, a speaker, a bone conduction audio output device, a tactile output generator, a projector, and/or a holographic display) and one or more input devices (e.g., 6001A, 6002A, and/or 6003A) (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). Some operations in method 700 are, optionally, combined, the orders of some operations are, optionally, changed, and some operations are, optionally, omitted.

As described below, method 700 provides an intuitive way for outputting content and/or notifications associated with at shared-content session. The method reduces the cognitive burden on a user for outputting content and/or notifications associated with at shared-content session, thereby creating a more efficient human-machine interface. For battery-operated computing devices, enabling a user to outputting content and/or notifications associated with at shared-content session faster and more efficiently conserves power and increases the time between battery charges.

The computer system (e.g., 6000A and/or 6000B) detects (702), via the one or more input devices (e.g., 60001A and/or 60001B), a first set of one or more inputs (e.g., 6064, 6190, 6218, or 6224) corresponding to a request to output content (e.g., a request to view images, text, video content, audio (e.g., music) content, and/or the like) (e.g., a selection of a "play" affordance; a selection of an image; an input on an application icon (e.g., to launch or open the application); and/or a selection of a URL).

In response to detecting (704) the first set of one or more inputs corresponding to a request to output the content, in accordance with a determination (706) that there is an active shared-content session between the computer system (e.g., 6000A) and an external computer system (e.g., 6000B) (e.g., one or more external computer systems) (e.g., a computer system that is associated with (e.g., being operated by) a remote user (e.g., a user that is in a shared-content session with the user of the computer system)), wherein the shared-content session, when active, enables the computer system to output respective content (e.g., synchronized content (e.g., audio and/or video data for which output is synchronized at the computer system and the external computer system) and/or screen-share content (e.g., image data generated by a device (e.g., the computer system; the external computer system) that provides a real-time representation of an image or video content that is currently displayed at the device)) while the respective content is being output by the external computer system: the computer system (e.g., 6000A) outputs (708), via an output generation component of the one or more output generation components, a first notification (e.g., 6066, 6210, 6220, 6228) (e.g., a graphical notification (e.g., a banner), and/or an and audible notification (e.g., an alert) (optionally including, a haptic output and/or an audio output)) that includes an indication (e.g., text, a graphical indication, an audible indication) that the content will be output by the external computer system when the content is output by the computer system (e.g., the content will be output at the external computer system while the content is output at the computer system); and the computer system (e.g., 6000A) outputs (710) the content (e.g., 6150A) (at the computer system) via an output generation component of the one or more output generation components (e.g., displaying video/image data of the content on a display component of the computer system and/or outputting (e.g., playing) audio data of the content at a speaker component of the computer system). Outputting the first notification that includes an indication that the content will be output by the external computer system when the content is output by the computer system provides feedback to a user of the computer system that the selected content will be output by the external computer system when the content is output by the computer system. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, during the shared-content session, the respective content is concurrently output at both the computer system and the external computer system. In some embodiments, the respective content is screen-share content from the computer system (e.g., content displayed on the display of the computer system) that is transmitted to the external computer system so that both computer systems are concurrently outputting the screen-share content from the computer system. In some embodiments, the respective content is screen-share content from the external computer system (e.g., content displayed on the display of the external computer system) that is transmitted to the computer system so that both computer systems are concurrently outputting the screen-share content from the external computer system. In some embodiments, the respective content is synchronized content that is output at the computer system and the external computer system. In some embodiments, the computer system and the external computer system each separately access the respective content (e.g., a video; a movie; a TV show; a song) from a remote server and are synchronized in their respective output of the respective content such that the content is output (e.g., via an application local to the respective computer system) at both computer systems while each computer system separately accesses the respective content from the remote server(s). In some embodiments, the computer system and external computer system separately access the respective content (e.g., synchronized content) in response to a selection that is received at the computer system or at the external computer system for requesting output of the respective content.

In some embodiments, in response to detecting the first set of one or more inputs corresponding to a request to output the content: in accordance with the determination that there is an active shared-content session between the computer system (e.g., 6000A) and the external computer system (e.g., 6000B): the computer system (e.g., 6000A) provides (e.g., transmitting), to the external computer system, content information that enables the external computer system to output the content (e.g., FIG. 6AQ). In some embodiments, the computer system provides content information to the external computer system by transmitting the content information directly or indirectly (e.g., via a server) to the external computer system. In some embodiments, the content information includes metadata, audio data, video data, image data, a link (e.g., web link, URL) to a location (e.g., a remote server) where the content can be accessed, and/or information representing a portion or position (e.g., a timestamp) within the content (e.g., for synchronization).

In some embodiments, in response to detecting the first set of one or more inputs (e.g., 6148) corresponding to a request to output the content: in accordance with a determination that there is not an active shared-content session between the computer system and an external computer system (e.g., 6000B): the computer system outputs the content via the output generation component of the one or more output generation components (e.g., 6001A) without outputting the first notification (e.g., FIGS. 6AA and 6AB). Outputting the content without outputting the first notification provides feedback to a user of the computer system that the selected content will not be output by the external computer system when the content is output by the computer system. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while outputting the content via the output generation component of the one or more output generation components (e.g., 6001A): in accordance with a determination that there is an active shared-content session between the computer system (e.g., 6000A) and the external computer system (e.g., 6000B), the computer system synchronizes output (e.g., playback) of the content via the output generation component of the one or more output generation components (e.g., 6001A) with output of the content at the external computer system (e.g., FIGS. 6AU-6AX and 6BC-6BE). In some embodiments, output of content is synchronized by the computer system and/or the external computer system providing, receiving, and/or exchanging information about the output status (e.g., playing, paused, position or time of the portion of the content being output, playback rate) of the content at the computer system and/or the external computer system. In some embodiments, while there is an active shared-content session between the computer system and the external computer system, outputting the content via the output generation component of the one or more output generation components includes synchronizing output of the content via the output generation component of the one or more output generation components with output of the content at the external computer system.

In some embodiments, outputting the content via an output generation component of the one or more output generation components (e.g., 6001A) includes outputting (e.g., displaying) a user interface (e.g., 6150A) of an application of the computer system (e.g., 6000A) that outputs the content, the method further comprising: while there is an active shared-content session between the computer system and the external computer system (e.g., 6000B), the computer system (e.g., 6000A) outputs the content via an output generation component of the one or more output generation components (e.g., 6001A) without providing, to the external computer system, information that enables the external computer system to output the user interface of the application of the computer system that outputs the content (e.g., FIG. 6AQ) (e.g., without sharing, or adding to the shared-content session, the screen of the computer system (e.g., the screen displayed by the computer system, including the user interface of the application that outputs the content) or a portion thereof (e.g., an application window displayed by the computer system; just the user interface of the application that outputs the content)). Outputting the content without providing, to the external computer system, information that enables the external computer system to output the user interface of the application of the computer system that outputs the content conserves computational resources of the computer system. Conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, before detecting the first set of one or more inputs corresponding to a request to output content: the computer system (e.g., 6000A) displays, via an output generation component of the one or more output generation components (e.g., 6001A), a user interface of a media player application that includes a selectable play element (e.g., 6144) (e.g., an affordance, a button) that, when selected, initiates output of the content, including: in accordance with a determination that there is an active shared-content session between the computer system and an external computer system (e.g., 6000B), the computer system (e.g., 6000A) displays the selectable play element with a first appearance (e.g., 6144 in FIG. 6AN) (e.g., a button includes text such as "watch together," "watch with others," and/or "add to shared-content session" instead of "play," "go," "start," and/or a corresponding graphic (e.g., a right-pointing arrow or triangle)); and in accordance with a determination that there is not an active shared-content session between the computer system and an external computer system, the computer system (e.g., 6000A) displays the selectable play element with a second appearance (e.g., 6144 in FIG. 6AA) that is different from the first appearance (e.g., the button includes text such as "play," "go," "start," and/or a corresponding graphic (e.g., a right-pointing arrow or triangle) without text such as "watch together," "watch with others," and/or "add to shared-content session"). Displaying the selectable play element with a first or second appearance in accordance with a determination of whether or not there is an active shared-content session between the computer system and an external computer system provides feedback to a user of the computer system about whether the content will be output at the computer system or output at both the computer system and the external computer system. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the appearance of controls in a media player application are changed to indicate that played media will be shared in the shared-content session.

In some embodiments, before detecting the first set of one or more inputs corresponding to a request to output content: the computer system (e.g., 6000A) displays, via an output generation component of the one or more output generation components (e.g., 6001A), a user interface (e.g., 6130) of a media player application that includes a representation (e.g., 6138) of the content (e.g., an image and/or text representing a movie, episode, song, and/or podcast that can be played; a description of the content; rating and/or review information of the content; a 4K icon (e.g., badge) that is visually associated with (e.g., displayed on or adjacent to) the content; a DOLBY vision icon (e.g., badge) that is visually associated with the content), including: in accordance with a determination that the content can be (e.g., is capable of being; is configured to be) output by the external computer system (e.g., 6000B) when the content is output by the computer system (e.g., as part of an active shared-content session between the computer system and an external computer system; the content can be added to the shared-content session) (and, optionally, in accordance with a determination that there is an active shared-content session between the computer system and an external computer system), the computer system (e.g., 6000A) concurrently displays an identifier (e.g., 6132) (e.g., an icon, text, and/or badge) with the representation of the content; and in accordance with a determination that the content cannot be (e.g., is not capable of being; is not configured to be) output by the external computer system when the content is output by the computer system (e.g., as part of an active shared-content session between the computer system and the external computer system; the respective content cannot be added to the shared-content session), the computer system (e.g., 6000A) displays the representation of the content without outputting the identifier (e.g., FIG. 6Z and/or FIG. 6AA). Displaying the representation of the content with or without displaying the identifier provides feedback to a user of the computer system about whether the content will be output at the computer system or output at both the computer system and the external computer system. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, a user interface of a media player application (e.g., a user interface for accessing media for playback) includes multiple representations of content displayed concurrently. In some embodiments, the multiple representations of content include one or more representations of content that are capable of being added to the shared-content session, and one or more representations of content that are not capable of being added to the shared-content session, wherein the representations of content that are capable of being added to the shared-content session include respective identifiers indicating that the respective content is capable of being added to the shared-content session and the representations of content that are not capable of being added to the shared-content session do not include the identifier.

In some embodiments, while outputting the first notification (e.g., 6228 and/or 6248) that includes the indication that the content will be output by the external computer system (e.g., 6000B) when the content is output by the computer system, the computer system detects an input (e.g., 6252) selecting the first notification (e.g., a touch gesture (e.g., a tap, a press and hold) on the first notification; a selection input (e.g., button press) while the first notification is in focus; a voice command to select the first notification). In response to detecting the input selecting the first notification, the computer system (e.g., 6000A) displays a shared-content session object (e.g., 6015A, 6015B) that includes information (e.g., 6015A-1, 6015A-2, and/or 6015A-3) associated with the active shared-content session between the computer system and the external computer system (e.g., a representation (e.g., name, avatar) of participants in the shared-content session; a representation of a group of users associated with the shared-content session; a number of participants in the shared-content session; content in the shared-content session). Displaying a shared-content session object that includes information associated with the active shared-content session between the computer system and the external computer system in response to detecting the input selecting the first notification provides additional controls for controlling aspects of the content-sharing session without cluttering the user interface with additional displayed controls until an input is needed and avoids accidental inputs while the additional controls are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the shared-content session object includes one or more selectable options for controlling operations, parameters, and/or settings of the active shared-content session.

In some embodiments, the shared-content session object (e.g., 6015A or 6015B) includes one or more of: a selectable option for controlling an audio (e.g., microphone) setting of the active shared-content session (e.g., 6015A-6) (e.g., an audio on/off option), a selectable option for controlling a video (e.g., camera) setting of the active shared-content session (e.g., 6015A-7) (e.g., a video on/off option), or a selectable option for controlling a content-sharing (e.g., screen sharing) setting of the active shared-content session (e.g., 6015A-8) (e.g., a content-sharing on/off option). In some embodiments, the shared-content session object includes a messages affordance, a speaker affordance, an option to leave the active shared-content session, and/or an option to view (additional) information about the shared-content session (e.g., a group card), such as, e.g., users, user status, and/or content associated with the shared-content session.

In some embodiments, displaying the shared-content session object (e.g., 6015A or 6015B) includes displaying a sharing indicator (e.g., 6015A-8 or 6015B-8) (e.g., a selectable option for controlling a content-sharing (e.g., screen sharing) setting of the active shared-content session (e.g., a content-sharing on/off option), including: in accordance with a determination that the computer system (e.g., 6000A) is in a first sharing state with respect to the active shared-content session (e.g., a screen-sharing state), the computer system (e.g., 6000A) displays the sharing indicator with a first visual state (e.g., 6015B-8 in FIG. 6P) (e.g., a first appearance, filled in, a first color, bolded, highlighted, and/or outlined); and in accordance with a determination that the computer system is in a second sharing state with respect to the active shared-content session, different from the first sharing state with respect to the active shared-content session, the computer system (e.g., 6000A) displays the sharing indicator with a second visual state (e.g., 6015B-8 in FIG. 6N) different from the first visual state (e.g., a second appearance, not filled in, a second color different from the first color, not bolded, not highlighted, and/or not outlined). Displaying the sharing indicator with a first visual state in accordance with a determination that the computer system is in a first sharing state with respect to the active shared-content session, and displaying the sharing indicator with a second visual state in accordance with a determination that the computer system is in a second sharing state with respect to the active shared-content session, provides feedback to a user of the computer system about whether the computer system is in the first or second sharing state. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first sharing state and the second sharing state are respective screen-sharing states (e.g., the first sharing state and the second sharing state indicate a screen-sharing state of the computer system (e.g., 6000A) with respect to the shared-content session (e.g., whether or not a screen of the computer system is in or being shared with the shared-content session)). In some embodiments, the state (e.g., appearance) of the sharing indicator does not depend on a state of other types of content sharing (e.g., the sharing indicator has the same appearance when the computer system is sharing content other than a screen of the computer system as when the computer system is not sharing content).

In some embodiments, after displaying the shared-content session object (e.g., 6015A or 6015B) in response to detecting the input selecting the first notification: in response to detecting that display of the shared-content session object satisfies a set of one or more shared-content session object display criteria (e.g., the shared-content session object has been output for a predetermined amount of time (e.g., 1 second, 3 seconds, 5 seconds, 10 seconds)), the computer system (e.g., 6000A) ceases display of the shared-content session object. Ceasing display of the shared-content session object in response to detecting that display of the shared-content session object satisfies a set of one or more shared-content session object display criteria reduces computations performed by the computer system for displaying controls associated with the shared-content session object and avoids accidental inputs while the additional controls are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while outputting the content via an output generation component of the one or more output generation components (e.g., 6001A), the computer system (e.g., 6000A) displays, concurrently with the shared-content session object (e.g., 6015A or 6015B), selectable content controls (e.g., 6152A, 6152A-1, 6152A-2, 6152A-3, and/or 6152A-4) (e.g., video controls; controls provided by an application that outputs the content; a video chrome) for controlling output of the content (e.g., controls that are distinct from controls in the shared-content session object). The computer system (e.g., 6000A) ceases display of (e.g., hiding, minimizing) the shared-content session object (e.g., 6015A or 6015B) without ceasing (e.g., while maintaining) display of the selectable content controls (e.g., 6152A) (e.g., the shared-content session object is hidden before the selectable application control are hidden). Ceasing display of the shared-content session object without ceasing display of the selectable content controls provides additional controls for controlling aspects of the content without cluttering the user interface with additional displayed controls that are not needed for controlling the content and avoids accidental inputs while the additional controls are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 6000A) displays selectable content controls (e.g., 6152A) (e.g., video controls; controls provided by an application that outputs the content; a video chrome) for controlling output of the content (e.g., controls that are distinct from controls in the shared-content session object) and then ceases display of the selectable content controls (e.g., FIGS. 6AS-6AT) (e.g., in response to detecting respective criteria have been met (e.g., in response to detecting that a predetermined amount of time has elapsed without detecting a user input or in response to detecting a user input corresponding to a request to hide the selectable content controls)). The computer system (e.g., 6000A) ceases display of the shared-content session object (e.g., in response to detecting respective criteria have been met (e.g., in response to detecting that a predetermined amount of time has elapsed without detecting a user input or in response to detecting a user input corresponding to a request to hide the shared-content session object)). After ceasing display of the shared-content session object and the selectable content controls (e.g., while the shared-content session object and the selectable content controls are not displayed or are hidden), the computer system (e.g., 6000A) detects input (e.g., 6240) corresponding to a request to output (e.g., re-output, re-display, and/or unhide) the selectable content controls (e.g., detecting a tap or click input directed to the content while the content is playing or a gesture or other input directed to a region outside of the content). In response to detecting the input corresponding to a request to output the selectable content controls: displays the selectable content controls; and displays the shared-content session object (e.g., displaying the selectable controls concurrently with the shared-content session object). Displaying the selectable content controls and the shared-content session object in response to detecting the input corresponding to a request to output the selectable content controls provides additional controls for controlling aspects of the shared-content session without cluttering the user interface with additional displayed controls until an input is detected and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the shared-content session object is re-displayed in response to a request to re-display the selectable content controls. In some embodiments, the selectable content controls are not displayed (e.g., re-displayed) in response to a request to display the shared-content session object.

In some embodiments, in accordance with a determination that there is an active shared-content session between the computer system (e.g., 6000A) and an external computer system (e.g., 6000B), and that the active shared-content session includes video content (e.g., video content is being shared between the computer system and the external computer system in the active shared-content session), the computer system (e.g., 6000A) displays an indication (e.g., 6228) (e.g., a banner, a notification) that the video content is in the shared-content session (e.g., that the video content is being output by the external computer system as part of the shared-content session) without displaying one or more selectable video control objects for controlling the video content (e.g., 6000A in FIG. 6AR). Displaying an indication that the video content is in the shared-content session without displaying one or more selectable video control objects for controlling the video content in accordance with a determination that there is an active shared-content session between the computer system and an external computer system, and that the active shared-content session includes video content, provides feedback to a user of the computer system that the video content is being output at both the computer system and the external computer system. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system displays selectable video controls for controlling output of the video content that can be hidden, removed, and/or cease to be displayed in response to user input and/or a determination that a set of criteria (e.g., a time threshold) has been satisfied. In some such embodiments, the computer system continues to (or maintains) display of the indication that the video content is being output by the external computer system after the selectable video controls are hidden, removed, and/or cease to be displayed. In some embodiments, in accordance with a determination that a set of criteria is met (e.g., the shared-content session is disconnected or inactive and/or the video content is no longer in the shared-content session), the computer system ceases displaying the indication that the video content is in the shared-content session.

In some embodiments, the first set of one or more inputs corresponds to a request to output content includes selection of a play object (e.g., 6144, 6220-1, 6446) (e.g., a play button, an icon, an affordance) in a media application. In some embodiments, the first set of one or more inputs includes a touch gesture (e.g., a tap) on the play object in the media application or a selection input (e.g., a mouse click, a press of a button on a remote) while the play object is in focus (e.g., the play object is designated or a cursor is over the play object).

In some embodiments, the computer system (e.g., 6000A) detects an indication that a request (e.g., 6246, 6264, 6350, 6362, or 6364) to cease output of the content has occurred (e.g., a request (e.g., a user input) at the computer system; data indicating that a user of the external computer system (e.g., 6000B) has requested to cease output of the content). In response to detecting the indication that a request to cease output of the content has occurred, the computer system (e.g., 6000A) displays, via an output generation component of the one or more output generation components (e.g., 6001A), a second notification (e.g., 6248, 6250, 6368, or 6370) that includes an indication that output of the content has ceased. Displaying a second notification that includes an indication that output of the content has ceased in response to detecting the indication that a request to cease output of the content has occurred provides feedback to a user of the computer system about the playback state of the content. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, an indication that output of the content has ceased is displayed for all participants and/or computer systems connected to the active shared-content session.

In some embodiments, the computer system (e.g., 6000A) detects an input (e.g., 6194 or 6204) corresponding to a request to open (e.g., launch, bring to the foreground) an application. In response to detecting the input corresponding to a request to open the application: in accordance with a determination that the application is not capable of sharing content in the shared-content session between the computer system and the external computer system (e.g., 6000B) (e.g., the application does not support synchronized content in the shared-content session), the computer system (e.g., 6000A) outputs, via an output generation component of the one or more output generation components (e.g., 6001A), a third notification (e.g., 6206 or 6208) that includes an indication that a user interface of the application, as output by the computer system, will be output by the external computer system (e.g., the computer system will provide a notification that the application will be added to the shared-content session via screen sharing). Outputting a third notification that includes an indication that a user interface of the application, as output by the computer system, will be output by the external computer system in accordance with a determination that the application is not capable of sharing content in the shared-content session between the computer system and the external computer system provides feedback to a user of the computer system that the user interface of the computer system will be output by the external computer system. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, if an application does not have content sharing capabilities, the computer system displays a notification that a screen of the computer system will be shared (e.g., the application (or the content therein) will be included in the shared-content session by sharing the screen of the computer system in the shared-content session (e.g., as opposed to synchronized sharing of the content)).

In some embodiments, while the shared-content session between the computer system (e.g., 6000B) and the external computer system (e.g., 6000A) is active, wherein the shared-content session was initiated via the external computer system: after the external computer system disconnects from (e.g., leaves) the shared-content session (e.g., in response to input 6372 in FIG. 6BV), the computer system (e.g., 6000A) continues output of the content by the computer system (e.g., output continues on 6000B in FIG. 6BW). In some embodiments, after the user (or the external computer system associated with the user) that initiated the shared-content session disconnects from (e.g., leaves) the shared-content session, the shared-content session remains active. In some embodiments, content in the shared-content session continues to be shared with participants of the shared-content session (e.g., the content remains in the shared-content session) even if a user (or a computer system associated with the user) that initiated the shared-content session leaves the shared-content session.

In some embodiments, while the shared-content session between the computer system (e.g., 6000A or 6000B) and the external computer system (e.g., 6000B or 6000A) is active: the computer system outputs second content (e.g., screen-share content of 6000B in FIG. 6P or video content 6150A in FIG. 6BV) via an output generation component of the one or more output generation components (e.g., 6001A) while the second content is output by the external computer system, wherein the second content was added to the shared-content session by the external computer system (or, in some embodiments, wherein the second content was added to the shared-content session by the computer system); and after the external computer system disconnects from the shared-content session (e.g., via input 6114 in FIG. 6V or via input 6372 in FIG. 6BV) (e.g., in response to receiving an indication that the external computer system disconnects from the shared-content session): in accordance with a determination that the second content includes a first type of content (e.g., video and/or audio content; content that does not include screen-share content of the external computer system), the computer system (e.g., 6000A) continues output of the second content by the computer system (e.g., output of video continues on 6000B in FIG. 6BW after 6000A leaves in FIG. 6BV); and in accordance with a determination that the second content includes a second type of content (e.g., a user interface output by the external computer system; screen-share content of the external computer system), the computer system (e.g., 6000A) ceases output of the second content by the computer system (e.g., FIG. 6W) (e.g., the screen (or a portion thereof) of the external computer system ceases to be shared). In some embodiments, the second content is added to the shared-content session by the computer system, and the method includes: after the computer system disconnects from the shared-content session, one or more of the external computer systems continue output of the second content if the second content includes a third type of content (e.g., video and/or audio content; content that does not include screen-share content of the computer system), and one or more of the external computer systems cease output of the second content if the second content includes a fourth type of content (e.g., a user interface output by the computer system; screen-share content of the computer system).

In some embodiments, while outputting third content (e.g., 6150A in FIG. 6AB, FIG. 6AY, or FIG. 6BF) by the computer system, the computer system detects a first event (e.g., video call in FIG. 6AC, input 6268 in FIG. 6AY, or input 6298 in FIG. 6BF) (e.g., removing earphones or earbuds, receiving a phone call, locking the computer system, launching a camera, quitting a host application, and/or playing media in an application that cannot be added to the shared-content session (e.g., the content and/or the application are not supported by or do not support the shared-content session)). In response to detecting the first event: in accordance with a determination that there is an active shared-content session between the computer system that includes the third content and an external computer system, the computer system continues output of the third content by the computer system (e.g., 6000B in FIG. 6AZ); and in accordance with a determination that there is not an active shared-content session between the computer system that includes the third content and an external computer system, the computer system ceases (e.g., stopping or pausing) output of the third content by the computer system (e.g., 6000A in FIG. 6AC or content 6150A in FIG. 6BG). In some embodiments, the method includes, in response to detecting the first event: in accordance with a determination the third content is being output at the computer system and is not included in the shared-content session (e.g., the third content is content that is being played at the computer system, but is not being shared in the shared-content session), ceasing (e.g., stopping or pausing) output of the third content by the computer system.

In some embodiments, after detecting the first event and ceasing output of the third content, the computer system (e.g., 6000A) detects an input (e.g., 6164 or 6318) corresponding to a request to output (e.g., resume playback of) the third content. In response to detecting the input corresponding to a request to output (e.g., resume output of) the third content: in accordance with a determination that the shared-content session between the computer system and the external computer system (e.g., 6000B) has remained active since detecting the first event, the computer system (e.g., 6000A) outputs the third content based on an elapsed time from when the first event was detected (e.g., FIG. 6BJ) (e.g., resume playing the third content at the position or time that the content would have been if output of the third content had not been ceased); and in accordance with a determination that the shared-content session between the computer system and an external computer system has not remained active since detecting the first event, the computer system (e.g., 6000A) outputs the third content by the computer system beginning at a position of the content corresponding to when the event was detected (e.g., FIG. 6AE) (e.g., resume playing the third content at the position or time that the third content was at when the event was detected or output of the third content ceased).

In some embodiments, while outputting fourth content (e.g., 6150A in FIG. 6AB, FIG. 6AY, or FIG. 6BF) by the computer system, the computer system detects a second event (e.g., video call in FIG. 6AC, input 6246, input 6264, input 6298). In response to detecting the second event: in accordance with a determination that the second event is a first type of event (e.g., pause playback, scrubbing timeline, ending/stopping the media content, and/or quitting playback app), the computer system ceases output of the fourth content (e.g., 6000A in FIG. 6AC or content 6150A in FIG. 6BG) (In some embodiments, the computer system ceases output of the fourth content independent of whether or not there is an active shared-content session between the computer system and an external computer system (e.g., 6000B)); and in accordance with a determination that the second event is a second type of event (e.g., removing earphones or earbuds, receiving a phone call, locking the computer system, launching a camera, quitting a host application, and/or playing media in an application that cannot be added to the shared-content session (e.g., the content and/or the application are not supported by or do not support the shared-content session)) that is different from the first type of event: in accordance with a determination that there is an active shared-content session between the computer system and an external computer system, the computer system (e.g., 6000A) continues output of the fourth content (e.g., 6000B in FIG. 6AZ); and in accordance with a determination that there is not an active shared-content session between the computer system and an external computer system, the computer system (e.g., 6000A) ceases output of the fourth content (e.g., 6000A in FIG. 6AC or content 6150A in FIG. 6BG).

In some embodiments, the computer system (e.g., 6000A) displays (e.g., in an upper corner of a display) a shared-content session indicator (e.g., 6020A in FIG. 6BG) (e.g., an icon, an affordance, and/or a persistent graphical representation) that indicates that the computer system is connected to the shared-content session. In some embodiments, the computer system detects, via the one or more input devices (e.g., 6001A), an input (e.g., 6306) corresponding to selection of the shared-content session indicator. In response to detecting the input corresponding to selection of the shared-content session indicator, the computer system concurrently displays: a second shared-content session object (e.g., 6015A) that includes information associated with the shared-content session and/or one or more selectable options that, when selected, cause the computer system to perform a respective function associated with the shared-content session; and a notification (e.g., 6312) (e.g., in the second shared-content session object or below the second shared content session object; a persistent notification) that includes an indication of a participant and/or content in the shared-content session. Concurrently displaying the shared-content session object and the notification provides the user concurrently with both information and/or options for functions associated with the shared-content as well as an indication of a participant and/or content in the shared-content session, which provides additional control options and contextually relevant information without cluttering the user interface.

In some embodiments, the computer system (e.g., 6000) receives (e.g., detects) an indication of a third event (e.g., an event that meets criteria for outputting a notification); and in response to receiving the indication of the third event, displays a notification of the third event, including: in accordance with a determination that the notification of the third event (or the third event itself) is associated with the shared-content session, the notification of the third event includes a first color (e.g., notification 6650 and/or notification 6652) (and, optionally, not a second color); and in accordance with a determination that the notification of the third event (or the third event itself) is not associated with the shared-content session (e.g., notification 6658), the notification of the third event includes a second color (and, optionally, not the first color), wherein the second color is different from the first color. Selectively displaying the notification of the third event with a first color or a different second color depending on whether the notification is associated with the shared-content session automatically, quickly, and efficiently indicates to the user the context of the notification with respect to the shared-content session, which performs an operation when a set of conditions has been met without requiring further user input and provides improved visual feedback to the user. In some embodiments, the first color and the second color are alternative background colors of the notification of the third event.

In some embodiments, the computer system (e.g., 6000) receives (e.g., detects) an indication of a fourth event (e.g., an event that meets criteria for outputting a notification); and in response to receiving the indication of the fourth event, displays a notification of the fourth event, including: in accordance with a determination that the notification of the fourth event (or the fourth event itself) is associated with the content-sharing session and the computer system is in a first display mode (e.g., a light display mode and/or a daytime display mode), the notification (e.g., notification 6650) includes a third color (and, optionally, not a fourth color); and in accordance with a determination that the notification of the fourth event (or the fourth event) is not associated with the content-sharing session and the computer system is in the first display mode, the notification (e.g., notification 6658) of the fourth event includes a fourth color (and, optionally, not the third color), wherein the fourth color is different from the third color. Selectively displaying the notification of the fourth event with a third color or a different fourth color based on the computer system being in a first display mode and depending on whether the notification is associated with the shared-content session automatically, quickly, and efficiently indicates to the user the context of the notification with respect to the shared-content session, which performs an operation when a set of conditions has been met without requiring further user input and provides improved visual feedback to the user. In some embodiments, a display mode of the computer system determines a common appearance or scheme for displaying user interfaces and/or user interface objects. In some embodiments, the third color and the fourth color are alternative background colors of the notification of the fourth event.

In some embodiments, displaying the notification of the fourth event includes: in accordance with a determination that the notification of the fourth event (or the fourth event itself) is not associated with the content-sharing session and the computer system is in a second display mode (e.g., a dark display mode and/or a nighttime display mode) that is different from the first display mode, the notification of the fourth event (e.g., notification 6660) includes the third color (and, optionally, not the fourth color). Selectively displaying the notification of the fourth event with the third color or the fourth color depending on the display mode of the computer system automatically, quickly, and efficiently indicates to the user the context of the notification with respect to the display mode of the computer system, which performs an operation when a set of conditions has been met without requiring further user input and provides improved visual feedback to the user. In some embodiments, in accordance with a determination that the notification of the fourth event (or the fourth event itself) is associated with the content-sharing session and the computer system is in the second display mode, the notification of the fourth event includes the third color. In some embodiments, notifications associated with the content-sharing session always include the third color (e.g., regardless of the display mode). In some embodiments, the first display mode and/or the second display mode are set based on a time of day or set based on user activation of a mode control setting.

Note that details of the processes described above with respect to method 700 (e.g., FIG. 7) are also applicable in an analogous manner to the methods described below. For example, methods 800, 900, 1000, 1100, 1200, 1300, 1500, 1600, 1700 and/or 1800 optionally include one or more of the characteristics of the various methods described above with reference to method 700. For brevity, these details are not repeated.

Figure 8:
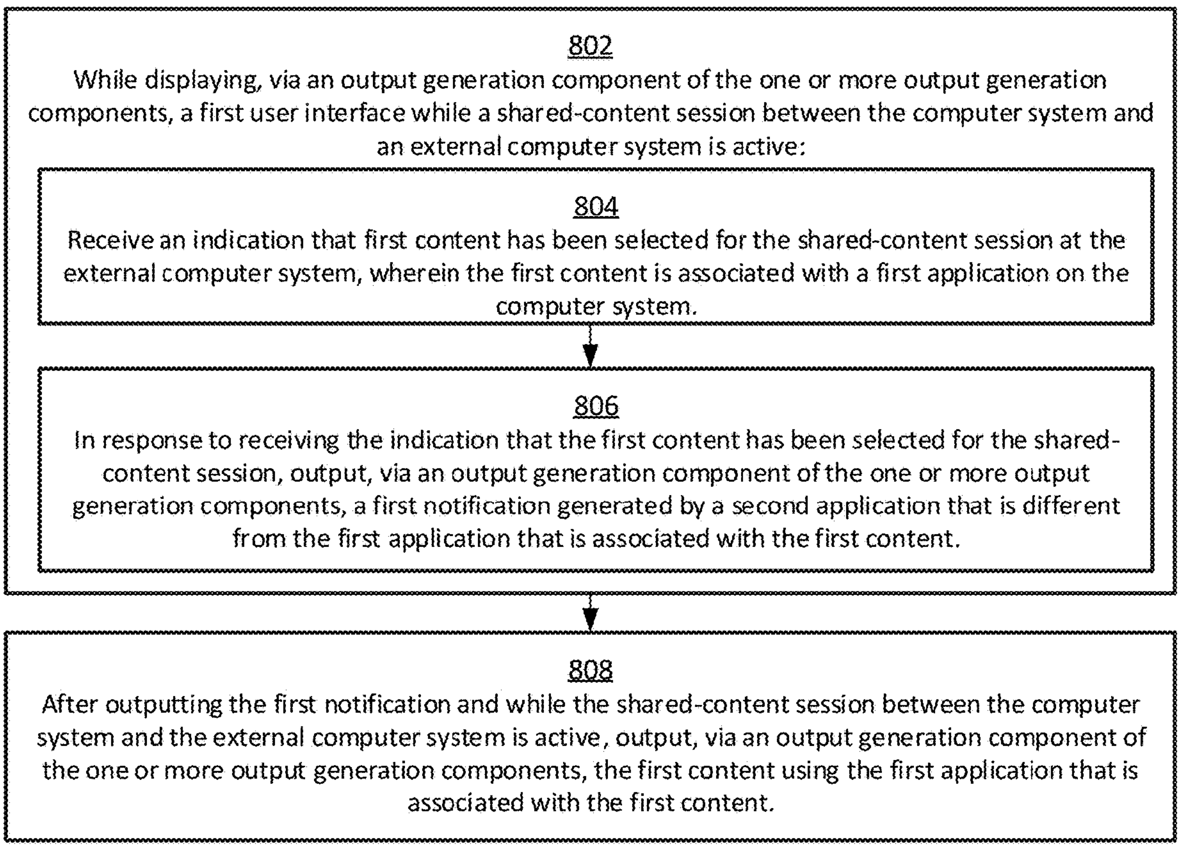
FIG. 8 depicts a flow diagram illustrating a method for managing a shared-content session, in accordance with some embodiments.

FIG. 8 is a flow diagram illustrating a method for outputting a notification associated with shared-content session using a computer system (e.g., 6000A and/or 6000B) in accordance with some embodiments. Method 800 is performed at a computer system (e.g., 6000A and/or 6000B) (e.g., a smartphone, a tablet, a desktop or laptop computer) that is in communication with one or more output generation components (e.g., 6001A and/or 6001B) (e.g., a display controller, a touch-sensitive display system, a speaker, a bone conduction audio output device, a tactile output generator, a projector, and/or a holographic display) and one or more input devices (e.g., 6001A, 6002A, 6003A, 6001B, 6002B, and/or 6003B) (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). Some operations in method 800 are, optionally, combined, the orders of some operations are, optionally, changed, and some operations are, optionally, omitted.

As described below, method 800 provides an intuitive way for outputting a notification associated with shared-content session. The method reduces the cognitive burden on a user for participating in a shared-content session, thereby creating a more efficient human-machine interface. For battery-operated computing devices, enabling a user to participate in a shared-content session faster and more efficiently conserves power and increases the time between battery charges.

While displaying (802), via an output generation component of the one or more output generation components, a first user interface (e.g., 6004A, 6004B, 6018, 6088, 6170A, 6170B, 6434, 6466, or 6468) (e.g., a system user interface (e.g., a "home" screen); a user interface for a first application operating at the computer system (e.g., a web browser application; and/or a music application)) while a shared-content session between the computer system and an external computer system (e.g., that is being operated by a first user (e.g., a user that is in a shared-content session with the user of the computer system)) (e.g., one or more external computer systems each associated with a user (e.g., user account)) is active (e.g., the computer system is enabled to output respective content (e.g., audio and/or video) while the respective content is being output (e.g., concurrently) by the external computer system), the computer system receives (804) an indication (e.g., data) that first content (e.g., synchronized content and/or screen-share content) has been selected (e.g., 6064, 6224, 6376, 6398, 6432, 6444, or 6470) for the shared-content session at the external computer system (e.g., the selection was made at the external computer system), wherein the first content is associated with a first application (e.g., represented by 6128, 6130, 6434A, or 6434B) on the computer system (e.g., a web browser application; a music application; a movie application; and/or a video application).

In response to receiving the indication that the first content has been selected (e.g., 6064, 6224, 6376, 6398, 6432, 6444, or 6470) for the shared-content session, the computer system outputs (806), via an output generation component of the one or more output generation components, a first notification (e.g., 6072, 6230, 6380, 6400, 6436, or 6450) (e.g., a notification indicating that content sharing has started; and/or a banner or an alert (optionally including, a haptic output and/or an audio output) (in some embodiments, the notification is selectable to display information associated with the shared-content session and/or one or more selectable shared-content session function options that, when selected, cause the computer system to perform a respective function associated with the shared-content session) generated by a second application (e.g., an application for enabling the shared-content session; a system-level application at the computer system) that is different from the first application that is associated with the first content. Outputting a first notification generated by a second application that is different from the first application that is associated that is associated with the first content, in response to receiving the indication that the first content has been selected for the shared-content session, provides feedback to a user of the computer system that the first content has been selected for the shared-content session, provides additional controls for controlling aspects of the shared-content session without cluttering the user interface with additional displayed controls until an input is detected, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

After outputting the first notification and while the shared-content session between the computer system and the external computer system is active, the computer system outputs (808), via an output generation component of the one or more output generation components, the first content (e.g., 6070, 6150A, or 6150B) using the first application that is associated with the first content (e.g., displaying image data of the first content and/or outputting audio data of the first content at the computer system using the first application).

In some embodiments, the first user interface is a system user interface (e.g., 6018 or 6088) (e.g., user interface 400; a home screen; a user interface that is provided and/or controlled by an operating system of the computer system; and/or a displayed user interface that includes user interface objects corresponding to respective applications, and when a user interface object is activated, the computer system displays the respective application corresponding to the activated user interface object).

In some embodiments, the first user interface is a user interface (e.g., 6004A, 6004B, 6170A, or 6170B) of a third application that is different from the first application that is associated with the first content (and, optionally, different from the second application that generates the first notification). In some embodiments, the computer system outputs the first content in a new application interface (e.g., a new window; a picture-in-picture window) (e.g., by opening a new window or launching an application) other than the first user interface that is already displayed.

In some embodiments, outputting the first content using the first application that is associated with the first content includes displaying the first content in a second user interface (e.g., 6070, 6150A, or 6150B) (e.g., an application window, a picture-in-picture (PiP) window, a video application interface, a web browser interface, a music application interface, and/or a user interface that is different from the first user interface (e.g., the first user interface is a home screen or a first application window, and the second user interface is a window (e.g., a PiP window) including the first content that is separate from the first application window and/or is overlaid on the home screen or a window of another application)). In some embodiments, the first notification (e.g., 6072, 6230, 6380, 6400, 6436, or 6450) generated by the second application includes a representation (e.g., "First Episode" or "Movie 3") of the first content that is displayed in the second user interface (e.g., text describing the first content; an image, icon, thumbnail, and/or other graphical representation of the first content (e.g., a representative image of a video and/or an album cover)). Outputting the first notification including a representation of the first content that is displayed in the second user interface provides feedback to a user of the computer system by providing a preview of the first content, and reduces inputs at the computer system by providing a preview of the first content without requiring the user to navigate to the second user interface to view the first content. Providing improved feedback and reducing input at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first notification is displayed without displaying the representation of the first content. For example, the notification informs a user of the computer system that content (e.g., the first content) has been added to the shared-content session, without displaying the content that was added to the shared-content session.

In some embodiments, while displaying the first content in the second user interface, the computer system displays a third user interface (e.g., 6004A, 6004B, 6018, 6088, 6170A, 6170B, 6434, 6466, or 6468) (e.g., an application window) that is different from the first user interface and the second user interface, wherein the second user interface is at least partially behind (e.g., covered by; overlapped by) the third user interface. Displaying the third user interface while displaying the first content in the second user interface, wherein the second user interface is at least partially behind the third user interface provides feedback to a user of the computer system by providing a preview of the first content without interrupting the user's view of the third user interface, and reduces inputs at the computer system by providing a preview of the first content while continuing to view the third content without requiring the user to navigate to the second user interface to view the first content and without requiring the user to navigate away from the first content to view the third user interface. Providing improved feedback and reducing input at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system displays, in the second user interface, a first indication (e.g., 6100 or 6230) (e.g., a name, initial(s), video representation, and/or an avatar) of a participant of the shared-content session that selected the first content for the shared-content session. Displaying, in the second user interface, the first indication of a participant of the shared-content session that selected the first content for the shared-content session provides feedback to a user of the computer system informing the user who selected the first content for the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system detects a first input (e.g., 6092) directed to the second user interface (e.g., a user input directed to a location corresponding to the second user interface; a tap on, click on, hover over, and/or gaze at the second user interface). In some embodiments, displaying the first indication (e.g., 6100-1) of the participant of the shared-content session that selected the first content for the shared-content session in the second user interface occurs in response to detecting the first input directed to the second user interface (e.g., a user can tap, click on, hover over, and/or gaze at the second user interface to display (or, optionally, hide) the indication of the participant that added the first content to the shared-content session). In some embodiments, if the first indication is displayed in the second user interface, the computer system ceases to display (e.g., hides) the first indication in response to detecting an input directed to the second user interface.

In some embodiments, while displaying the first content in the second user interface, and while the second user interface occupies a first amount of available display area (e.g., a predetermined amount of a display area), the computer system detects a second input (e.g., 6092, 6104, or 6242) directed to the second user interface (e.g., selection of an expand-window option (e.g., icon, affordance, and/or button) or a full-screen option). In some embodiments, in response to detecting the second input directed to the second user interface, the computer system initiates a process to display the first content in an expanded display mode (e.g., 6000A in FIG. 6T or 6000B in FIG. 6AU) (e.g., a full-screen mode), including increasing a size of the first content in the available display area (e.g., expanding the second user interface to occupy a full screen; automatically (e.g., without further input) displaying the first content in full-screen mode). Initiating a process to display the first content in an expanded display mode in response to detecting the second input directed to the second user interface provides feedback to a user of the computer system by changing (e.g., enlarging) a displayed size of the first content, provides additional controls for changing the displayed size of the first content without cluttering the user interface with additional displayed controls until an input is detected, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, when content is displayed in an expanded display mode (e.g., a full-screen mode), the content itself does not occupy the entire display or screen. For example, in the expanded display mode, the content can be displayed in a user interface that occupies an entire display or screen, where the user interface includes the content as well as other features such as, e.g., controls, a dock, and/or borders.

In some embodiments, the process to display the first content in an expanded display mode includes displaying (e.g., in the second user interface; overlaid on the first content) a selectable expand option (e.g., 6100-2) (e.g., icon, button, and/or affordance) without displaying the first content in the expanded display mode (e.g., while maintaining a current size of the second user interface; while continuing to display the second user interface at a size that occupies less than a full screen). In some embodiments, the process to display the first content in an expanded display mode includes detecting an input (e.g., 6104) corresponding to selection of the expand option. In some embodiments, the process to display the first content in an expanded display mode includes, in response to detecting the input corresponding to selection of the expand option, displaying the first content in the expanded display mode (e.g., 6000A in FIG. 6T) (e.g., displaying the first content in a window that occupies a full screen of one or more screens displayed by the one or more output generation components).

In some embodiments, while displaying the first content in the expanded display mode (e.g., 6000A in FIG. 6T), the computer system displays (e.g., in the second user interface) a second indication (e.g., 6100-1 in FIG. 6U) (e.g., a name, initial(s), video representation, and/or an avatar) of a participant of the shared-content session that selected the first content for the shared-content session. Displaying a second indication of a participant of the shared-content session that selected the first content for the shared-content session while displaying the first content in the expanded display mode provides feedback to a user of the computer system by informing the user who added the first content to the shared-content session, provides additional controls for displaying the second indication without cluttering the user interface with additional displayed controls until an input is detected, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while displaying the first content in the expanded display mode, the computer system displays (e.g., in an upper corner of a display) a first shared-content session indicator (e.g., 6020A, 6020B, or 6021B) (e.g., an icon, an affordance, and/or a persistent graphical representation) that indicates that the computer system is connected to the shared-content session. Displaying a first shared-content session indicator while displaying the first content in the expanded display mode provides feedback to a user of the computer system indicating that the computer system is connected to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first shared-content session indicator is displayed prior to displaying the first content in the expanded display mode and remains displayed while the first content is displayed in the expanded display mode or as the computer system transitions to displaying the first content in the expanded display mode. In some embodiments, the first shared-content session indicator can be selected to display a shared-content session object that includes information associated with the shared-content session and/or one or more selectable shared-content session function options that, when selected, cause the computer system to perform a respective function associated with the shared-content session.

In some embodiments, while displaying the first content in the expanded display mode, the computer system displays a selectable reduce size option (e.g., 6100-3) that, when selected, causes the first content to cease being displayed in the expanded display mode (e.g., and, optionally, to display the first content in a window that occupies less than the expanded size (e.g., a full screen)). Displaying a selectable reduce size option while displaying the first content in the expanded display mode provides feedback to a user of the computer system that the computer system is displaying the first-content from the shared-content session, provides additional controls for causing the first content to cease being displayed in the expanded display mode without cluttering the user interface with additional displayed controls until an input is detected, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the reduce size option is selectively displayed or hidden in response to detecting input. For example, the reduce size option can be displayed in response to detecting an input on a window displaying the first content, a cursor hovering over the first content, and/or a gaze directed to the first content. For example, the reduce size option can cease being displayed (e.g., hidden) in response to detecting an input on a window displaying the first content and/or a cursor and/or gaze being moved away from the first content (e.g., from over or directed to the first content to not over or not directed to the first content).

In some embodiments, the computer system displays (e.g., while displaying the first content in expanded display mode) an indication (e.g., 6077A or 6077B) (e.g., an icon, button, and/or or affordance) of a location at which the computer system is responsive to a respective input gesture (e.g., 6256) (e.g., a home gesture; a swipe gesture) to display a system user interface (e.g., 6018 or 6088) (e.g., user interface 400; a home screen; a user interface that is provided and/or controlled by an operating system of the computer system; and/or a displayed user interface that includes user interface objects corresponding to respective applications, and when a user interface object is activated, the computer system displays the respective application corresponding to the activated user interface object). Displaying an indication of a location at which the computer system is responsive to a respective input gesture to display a system user interface provides feedback to a user of the computer system that the computer system of a location on an input device that is configured to receive an input for displaying a system user interface. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while displaying the first content (e.g., in the expanded display mode), the computer system displays one or more graphical user-interface objects (e.g., 6106, 6077A, 6077B, or 6118) (e.g., a status bar that includes, for example, a battery level indicator, a privacy indicator, and/or a signal strength indicator; and/or a selectable home option) of the first user interface, including displaying a portion (e.g., 6021B') of the first content that overlaps the one or more graphical user-interface objects of the first user interface (e.g., displaying a portion of the first content that is underneath the one or more graphical user-interface objects with a reduced resolution and/or visibility (e.g., compared to a portion of the first content that does not overlap the one or more graphical user interface objects). Displaying a portion of the first content that overlaps the one or more graphical user-interface objects of the first user interface while displaying the first content provides feedback to a user of the computer system that the computer system is displaying the first content from the shared-content session, while still displaying the one or more graphical user-interface objects of the first user interface. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, portion(s) of the first content that are displayed underneath the one or more graphical user-interface objects of the first user interface are blurred, faded, and/or de-emphasized in order to emphasize the one or more graphical user-interface objects of the first user interface and to indicate that the one or more graphical user-interface objects of the first user interface are not part of the first content (e.g., the shared content).

In some embodiments, while displaying the first content in the expanded display mode, the computer system displays one or more shared-content session indicators (e.g., 6015A, 6015B, 6020A, or 6020B) that include information about the shared-content session (e.g., a first indication (e.g., a name, initial(s), video representation, and/or an avatar) of a participant of the shared-content session that selected the first content for the shared-content session and/or a graphical indicator (e.g., an icon, button, and/or affordance) that indicates that the computer system is connected to a shared-content session (e.g., that is only displayed when the computer system is connected to an active shared-content session)). In some embodiments, while displaying the first content in the expanded display mode, in accordance with a determination that timeout criteria are met (e.g., a predetermined time has passed since the computer system began displaying the first content in the expanded display mode), the computer system ceases display of the one or more shared-content session indicators. Ceasing display of the one or more shared-content session indicators in accordance with a determination that timeout criteria are met reduces inputs at the computer system by automatically ceasing display of the one or more shared-content session indicators without requiring additional user input. Reducing inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while displaying the first content in the expanded display mode (e.g., while the first user interface is hidden), the computer system displays a privacy indicator (e.g., 6118) that is displayed when (e.g., displayed only when) the computer system is recording media (e.g., via a camera and/or microphone) that is being added to (e.g., shared with) the shared-content session. Displaying a privacy indicator when the computer system is recording media that is being added to the shared-content session provides feedback to a user of the computer system that a media recording device is active. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system displays the privacy indicator in accordance with a determination that the computer system is recording media that is, optionally, being added to the shared-content session (and, optionally, that the first content is being displayed in the expanded display mode). In some embodiments, the privacy indicator remains displayed when all other elements of the first user interface of the computer system are hidden (e.g., by the first content being displayed in the expanded display mode). In some embodiments, the computer system continues to display the privacy indicator for a predetermined amount of time after a media recording device (e.g., camera and/or microphone) has turned off or becomes inactive. In some embodiments, the computer system displays the privacy indicator when the first content is not in the expanded display mode.

In some embodiments, while displaying the first content in the expanded display mode, the computer system detects an input (e.g., 6256) (e.g., an activation of a "home" button, a swipe up gesture, and/or a swipe up gesture that begins at a bottom edge of a display) corresponding to a request to display a system user interface (e.g., 6018 or 6088) of the computer system (e.g., a home screen). In some embodiments, in response to detecting the input corresponding to a request to display the system user interface of the computer system, the computer system ceases display of the first content in the expanded display mode and displays the first content in the second user interface in a state that occupies less than a full screen (e.g., 6000B in FIG. 6AW) (e.g., and displaying at least a portion of a user interface different from the second user interface (e.g., a home screen and/or a user interface for an application that is different from an application used to display the first content in the second user interface)).

In some embodiments, in response to detecting the input corresponding to a request to display a system user interface of the computer system, the computer system displays the first content in a window (e.g., a PiP window) that has the same size and/or location as a window in which the first content was displayed prior to entering the full-screen mode.

In some embodiments, while outputting the first content in the second user interface (e.g., and not in expanded display mode), the computer system detects an input (e.g., 6234) corresponding to a request to hide the second user interface (e.g., a swipe or flick gesture on the second user interface; a swipe up gesture from the bottom of a display; and/or an input corresponding to a request to display a home screen). In some embodiments, in response to detecting the input corresponding to a request to hide the second user interface, the computer system ceases displaying at least a portion of the second user interface (e.g., 6000B in FIG. 6AR) (e.g., optionally while continuing to display (e.g., at an edge region of the display) at least a portion of the second user interface or a representation of the second user interface (e.g., a graphical element that is selectable to redisplay at least a portion of the second user interface)). In some embodiments, in response to detecting the input corresponding to a request to hide the second user interface, the computer system also re-displays at least a portion of a display area that was previously occupied by at least a portion of the second user interface. In some embodiments, the computer system continues to output audio of the first content after ceasing display of the second user interface. In some embodiments, in response to detecting the input corresponding to a request to hide the second user interface, the computer system ceases display of the second user interface and displays an indication that the second user interface is hidden.

In some embodiments, while outputting the first content in the second user interface (e.g., 6070), the computer system detects an input (e.g., 6082) corresponding to a request to move the second user interface (e.g., a drag gesture that begins on the second user interface, a click and hold or a press and hold input followed by movement of the input while the click or press is maintained). In some embodiments, in response to detecting the input corresponding to a request to move the second user interface, the computer system moves the second user interface (e.g., while continuing to output the first content in the second user interface). In some embodiments, moving the second user interface includes relocating and/or translating the second user interface from a first displayed location to a second displayed location and, optionally, without changing a size of the second user interface. In some embodiments, while outputting the first content in the second user interface, the computer system detects an input corresponding to a request to resize the second user interface (e.g., a pinch or de-pinch gesture and/or a drag on a corner region of the second user interface). In some embodiments, in response to detecting the input corresponding to a request to resize the second user interface, the computer system resizes the second user interface (e.g., expands/reduces a displayed size of the second user interface).

In some embodiments, the first notification includes a third indication (e.g., name, initials, and/or avatar) of a participant of the shared-content session that selected the first content for (e.g., added the first content to) the shared-content session. Outputting the first notification including a third indication of a participant of the shared-content session that selected the first content for the shared-content session provides feedback to a user of the computer system that the participant selected the first content for the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, outputting the first content includes, in accordance with a determination that outputting the first content does not include displaying a visual representation of the first content (e.g., the first content is music, a song, and/or other audio content that does not include video), navigating to (e.g., displaying and/or bringing to the foreground) the first application (and, optionally, displaying a shared-content session object that includes information associated with the shared-content session and/or one or more selectable shared-content session function options that, when selected, cause the computer system to perform a respective function associated with the shared-content session). Navigating to the first application in accordance with a determination that outputting the first content does not include displaying a visual representation of the first content reduces input at the computer system by automatically navigating to the first content without requiring additional user input. Performing an operation when a set of conditions is met without requiring additional user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, outputting the first content includes, in accordance with a determination that outputting the first content includes displaying the visual representation of the first content (e.g., 6000B in FIG. 6AQ) (e.g., the first content includes an image and/or video), displaying a first shared-content session object (e.g., 6015A, 6015B, or 6230) that includes information (e.g., 6015A-1, 6015A-2, 6015A-3, 6015B-1, 6015B-2, and/or 6015B-3) associated with the shared-content session and/or one or more selectable shared-content session function options (e.g., 6015A-1, 6015A-4, 6015A-5, 6015A-6, 6015A-7, 6015A-8, 6015B-1, 6015B-4, 6015B-5, 6015B-6, 6015B-7, and/or 6015B-8) that, when selected, cause the computer system to perform a respective function associated with the shared-content session without navigating to (e.g., displaying and/or bringing to the foreground) the first application. Displaying the first shared-content session object in accordance with a determination that outputting the first content includes displaying the visual representation of the first content provides additional controls for causing the computer system to perform a respective function associated with the shared-content session without navigating to the first application without cluttering the user interface with additional displayed controls until an input is detected, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system displays the visual representation of the first content without navigating to the first application or displaying the shared-content session object.

In some embodiments, the computer system receives an indication (e.g., data) that the first content has been removed from the shared-content session (e.g., via input 6116 or 6362) (e.g., the first content is no longer being shared). In some embodiments, in response to receiving the indication that the first content has been removed from the shared-content session, the computer system outputs a content-removed notification (e.g., 6120 or 6370) that includes an indication (e.g., text) that the first content has been removed from the shared-content session (e.g., "Participant X has stopped sharing Content A"). Outputting a content-removed notification in response to receiving the indication that the first content has been removed from the shared-content session provides feedback to a user of the computer system that the first content has been removed from the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system detects an input corresponding to selection of the content-removed notification. In some embodiments, in response to detecting the input corresponding to selection of the content-removed notification, the computer system displays one or more representations of status (e.g., 6038A, 6038B, 6042A, and/or 6042B) (e.g., joined, invited, and/or inactive) of users associated with the shared-content session with respect to the shared-content session. Displaying one or more representations of status of users associated with the shared-content session with to the shared-content session in response to detecting the input corresponding to selection of the content-removed notification provides feedback to a user of the computer system about the status of users associated with the shared-content session with respect to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system receives an indication (e.g., data) that the first content has been ended (e.g., that a participant of the shared-content session has stopped the first content and/or initiated playback of different content in place of the first content). In some embodiments, in response to receiving the indication that the first content has been ended, the computer system displays a content-ended notification (e.g., 6120 or 6370) that includes an indication (e.g., text, initials, and/or avatar) of a participant of the shared-content session that caused the first content to end (and, optionally, an indication of the first content and/or the action that was taken with respect to the first content) (e.g., "Participant X ended Content A"). Displaying a content-ended notification in response to receiving the indication that the first content has been ended provides feedback to a user of the computer system about a participant of the shared-content session that caused the first content to end. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system receives an indication (e.g., data) that the first content has ended (e.g., that an end of the first content has been reached; and/or that a participant of the shared-content session has stopped the first content or initiated playback of different content in place of the first content). In some embodiments, in response to receiving the indication that the first content has ended, the computer system displays an end-of-content notification (e.g., 6120 or 6370) that includes an indication (e.g., text) that the first content has ended and ceases output of the first content (e.g., 6000A in FIG. 6W or 6000B in FIG. 6BT) (e.g., stop playback of the first content and/or close a window or application that was outputting the first content). Ceasing output of the first content and displaying an end-of-content notification in response to receiving the indication that the first content has ended provides feedback to a user of the computer system that the first content has ended and reduces input at the computer system by automatically ending the first content without requiring additional user input. Providing improved feedback and reducing inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system receives a request to display a respective portion of a user interface (e.g., 6004A or 6004B) of a messaging application that includes a plurality of messages (e.g., 6004A-1 or 6004B-1) between users associated with the shared-content session. In some embodiments, in response to receiving the request to display the respective portion of the user interface of the messaging application, the computer system: displays a user interface (e.g., 6004A or 6004B) of the messaging application, the user interface of the messaging application including (e.g., in a conversation region of the user interface of the messaging application) the plurality of messages (e.g., 6004A-1 or 6004B-1) between users associated with the shared-content session (e.g., users that have been invited to the shared-content session; a group of users in a message conversation); and in accordance with a determination that the shared-content session is available (e.g., the shared-content session is active; the shared-content session can be initiated), displays a shared-content session notification (e.g., 6010A, 6010B, and/or 6024) (e.g., a message that the shared-content session is available) in the user interface of the messaging application (e.g., in the conversation region of the user interface of the messaging application) that includes information associated with the shared-content session (e.g., a representation (e.g., name, initial(s), video representation, and/or avatar) of a user that initiated the shared-content session, a number of participants in the shared-content session, representation(s) of participants in the shared-content session, and/or content in the shared-content session). Displaying a shared-content session notification in the user interface of the messaging application in accordance with a determination that the shared-content session is available provides feedback to a user of the computer system that the shared-content session is available and provides information associated with the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, displaying the first content includes, in accordance with a determination that a video chat is ongoing with one or more participants in the shared-content session, concurrently displaying the first content (e.g., 6150B in FIG. 6AQ) along with a video representation (e.g., 6176, 6178, and/or 6184) of one or more other participants in the shared-content session (e.g., a video representation that is displayed separately from the first content (and can, optionally, be positioned and resized separately from the first content) or a video representation that is inset in the first content). Concurrently displaying the first content along with a video representation of one or more other participants in the shared-content session reduces inputs at the computer system by automatically displaying the first content concurrently with the video representation of one or more other participants so that the user of the computer system can interact with the one or more other participants via the video chat while also viewing the first content without requiring additional user input to navigate between user interfaces. Reducing inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in accordance with a determination that a video chat is not ongoing with one or more participants in the shared-content session, displaying the first content without displaying video representation of other participants in the shared-content session. In some embodiments, multiple representations of other participants are displayed concurrently with the first content.

In some embodiments, outputting the first notification includes displaying the first notification (e.g., displaying a banner and/or pop-up notification). In some embodiments, in accordance with a determination that dismiss-notification criteria has been met (e.g., the first notification has been displayed for a predetermined amount of time (e.g., 1 second, 2 seconds, 3 seconds, 5 seconds), the computer system ceases display of the first notification (e.g., automatically dismisses the first notification without user input). Ceasing display of the first notification in accordance with a determination that dismiss-notification criteria has been met reduces input at the computer system by automatically ceasing display of the first notification without requiring additional user input. Reducing input at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system detects a first input (e.g., 6232) corresponding to selection of the first notification (e.g., 6230). In some embodiments, in response to detecting the first input corresponding to selection of the first notification, the computer system displays a second shared-content session object (e.g., 6015A or 6015B) that includes one or more selectable options (e.g., 6015A-1, 6015A-4, 6015A-5, 6015A-6, 6015A-7, 6015A-8, 6015B-1, 6015B-4, 6015B-5, 6015B-6, 6015B-7, and/or 6015B-8) (e.g., controls for the shared-content session) that, when selected, cause the computer system to perform a respective function associated with the shared-content session (and that, optionally, includes information associated with the shared-content session). Displaying the second shared-content session object in response to detecting the first input corresponding to selection of the first notification provides additional controls for performing a respective function associated with the shared-content session without cluttering the user interface with additional displayed controls until the first input corresponding to selection of the first notification is detected, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the one or more selectable options include, e.g., audio on/off, video on/off, shared-content session on/off, and/or a link to a user interface that displays status of users of the shared-content session (e.g., a group status card)).

In some embodiments, in conjunction with displaying the second shared-content session object (e.g., 6015A or 6015B), the computer system moves a display (e.g., 6015A or 6150B) (e.g., a displayed location) of the first content (e.g., FIG. 6AS) (e.g., moving an application window that is displaying the first content and/or moving the second user interface). Moving a display of the first content in conjunction with displaying the second shared-content session object reduces inputs at the computer system by automatically moving the display of the first content to accommodate display of the second shared-content session object without requiring further user input. Reducing inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in response to detecting selection of the first notification, the computer system moves the display of the first content to avoid overlap with display of the shared-content session object.

In some embodiments, output of the first content on the computer system is synchronized with output of the first content on the external computer system (e.g., FIGS. 6AQ-6BU) (e.g., the first content is synchronized content; data identifying the first content, a position of the first content, and/or actions that control output of the first content (e.g., stop, play, pause, fast forward, rewind, and/or skip track) is exchanged via the shared-content session without transmitting the actual first content)).

In some embodiments, while outputting the first content, the computer system detects, via the one or more input devices, an input (e.g., 6246, 6278, 6336, or 6362) (e.g., activation of a media control button) corresponding to a request to change (e.g., stop, start, pause, rewind, and/or fast forward) output (e.g., playback) of the first content (e.g., content that was not added to the shared-content session by the user of the computer system). In some embodiments, in response to detecting the input corresponding to the request to change output of the first content, the computer system outputs (e.g., changing the output of) the first content (e.g., at the computer system) in accordance with the request to change output of the first content.

In some embodiments, the request at the computer system to change the output of the first content, causes the output of the first content to change at the external computer system in accordance with the request to change the output of the first content. In this way, output of content that has been selected for the shared-content session at the external computer system can be controlled by input at the computer system, and the input can affect output at both the computer system and the external computer system. Similarly, output of content that has been selected for the shared-content session at the external computer system can be controlled by input at a different, external computer system, and the input can affect output at the computer system, the external computer system, and the different external computer system.

In some embodiments, the computer system detects (e.g., before outputting the first content using the first application that is associated with the first content) an input (e.g., 6384 and/or 6390) corresponding to a request to output the first content. In some embodiments, in response to detecting the input corresponding to a request to output the first content, the computer system, in accordance with a determination that the first application is not available (e.g., not downloaded, not stored, and/or not installed) on the computer system (e.g., and, optionally, that the device does not include any application that is capable of providing access to the first content), displays a user interface (e.g., 6392) of a second application (e.g., an app store application) that provides a capability (e.g., 6394) to download the first application (or another application that is capable of providing access to the first content). Displaying a user interface of a second application that provides a capability to download the first application in accordance with a determination that the first application is not available in response to detecting the input corresponding to a request to output the first content reduces inputs at the computer system by automatically displaying the user interface of the second application that provides a capability to download the first application without requiring additional user input. Reducing inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system displays, in the user interface of the second application, a selectable download option (e.g., 6394) (e.g., an icon, button, and/or affordance) that, when selected, causes the computer system to initiate downloading (e.g., installation) of the first application (or another application that is capable of providing access to the first content). Displaying, in the user interface of the second application, a selectable download option provides additional controls for causing the computer system to initiate downloading of the first application without cluttering the user interface with additional displayed controls until an input is detected, and avoids accidental inputs while the additional control options are not displayed. Providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first notification includes a selectable move-session option (e.g., 6492 or 6502) (e.g., an icon, button, and/or affordance) that, when selected, causes output of a portion of content corresponding to the shared-content session (e.g., the shared-content session and/or audio or video representing one or more participants in a real-time communication session (e.g., a video chat)) via an output device (e.g., 6500) (e.g., a control device, a set-top device, and/or a receiver) that is in communication with a second computer system (e.g., a monitor, a television, a screen, and/or a display generation component) (and, optionally, disconnects the computer system from the communication session). Outputting the first notification including a selectable move-session option provides additional controls for causing output of a portion of content corresponding to the shared-content session via an output device that is in communication with a second computer system without cluttering the user interface with additional displayed controls until an input is detected, and avoids accidental inputs while the additional control options are not displayed. Providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, selecting the move-session option causes the computer system to transfer or move (e.g., via a wireless communication protocol) the communication session from the computer system to the second computer system (e.g., by way of an output device that is in communication with the second computer system). In some embodiments, causing output of a portion of content corresponding to the shared-content session via the output device that is in communication with the second computer system includes adding the output device and/or the second computer system to the shared-content session.

In some embodiments, the computer system displays a real-time communication interface (e.g., 6170A or 6170B) of a real-time communication session between a plurality of users, where the real-time communication interface includes one or more representations (e.g., 6176, 6178, and/or 6184) (e.g., video feeds, and/or avatars) of a set of the users (e.g., participants) of the real-time communication session, where the one or more representations occupy a first display location. In some embodiments, outputting the first content includes displaying the first content (e.g., 6150B) at a second display location that does not include the first display location (e.g., 6000B in FIG. 6AQ). Displaying the first content at the second display location that does not include the first display location reduces inputs at the computer system by automatically arranging the location of the first content to avoid the location(s) occupied by the one or more representations of a set of the users of the real-time communication session without requiring additional user input. Reducing inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first content is displayed concurrently with the one or more representations of the set of the users of the real-time communication session such that the first content does not overlap the one or more representations of the set of users of the real-time communication session. In some embodiments, the computer system moves (e.g., within the real-time communication interface) the one or more representations of the set of users of the real-time communication session to avoid (e.g., make space for) the display of the first content and/or the shared-content session object.

In some embodiments, outputting the first notification includes displaying the first notification such that the first notification is overlaid on (e.g., on top of, in front of, and/or in the foreground relative to) one or more graphical objects of the first user interface.

In some embodiments, the computer system detects a second input corresponding to selection of the first notification. In some embodiments, in response to detecting the second input corresponding to selection of the first notification, the computer system displays the first content in a foreground relative to the first user interface (e.g., the first content is moved from behind one or more graphical objects to in front of the one or more graphical objects).

In some embodiments, in response to receiving the indication that the first content has been selected for the shared-content session (e.g., in FIG. 14AA, discussed below), the computer system visually emphasizes (e.g., visually distinguishing, highlighting, animating, and/or initially displaying) a graphical element (e.g., 14248) corresponding to the first application (e.g., a selectable icon that, when selected, launches, opens, and/or brings to the foreground the first application). Visually emphasizing the graphical element corresponding to the first application in response to receiving the indication that the first content has been selected for the shared-content session provides feedback to a user of the computer system that the first content is associated with the first application and, in some embodiments, indicates that the first application is being launched and/or used to output the first content. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the graphical element corresponding to the first application is displayed in, added to, and/or displayed adjacent to an application dock (e.g., a region of a display that includes a plurality of application icons for launching respective applications). In some embodiments, in response to receiving the indication that the first content has been selected for the shared-content session, the computer system displays an animation of the graphical element corresponding to the first application, e.g., bouncing in the application dock.

In some embodiments, the first content includes one or more window controls of a user interface (e.g., 14126 in FIG. 14I, discussed below) (e.g., an application window) displayed by the external computer system (e.g., screen-share content), the one or more window controls corresponding to display options (e.g., close window, minimize window, and/or maximize window) for the user interface displayed by the external computer system (e.g., 14000A). In some embodiments, outputting, via an output generation component of the one or more output generation components, the first content using the first application that is associated with the first content includes displaying a representation of the one or more window controls in a disabled state (e.g., 14128) (e.g., the one or more window controls are not selectable via the one or more input devices in communication with the computer system; the one or more window controls are greyed out, translucent, and/or have a different visual appearance than as displayed by the external computer system). Displaying the representation of the one or more window controls in a disabled state provides feedback to a user of the computer system that the first content is associated with the shared-content session and that the one or more window controls are not selectable using the computer system. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the user interface displayed by the external computer system includes a graphical shared-content-session-status indicator that indicates the status of the external computer system with respect to the shared-content system (e.g., that the external computer system is connected to the shared-content session) and/or the status of the user interface of the external computer system with respect to the shared-content session (e.g., whether or not the user interface is in the shared-content session (e.g., being shared with other participants of the shared-content session)). In some embodiments, the shared-content-session-status indicator is not included in the first content and/or is not displayed by the computer system, e.g., even though the user interface of the external computer system is in the shared-content session.

In some embodiments, the computer system outputs, via an output generation component of the one or more output generation components, the first content using the first application that is associated with the first content in accordance with a determination that the computer system (or a user associated with the computer system) is entitled to the first content (e.g., 6000B in FIG. 6AQ) (and, optionally, in response to receiving the indication that the first content has been selected for the shared-content session) (e.g., the computer system has access to an account and/or subscription that is required to access the first content). In some embodiments, in response to receiving the indication that the first content has been selected for the shared-content session, and in accordance with a determination that the computer system (or a user associated with the computer system) is not entitled to the first content (e.g., the computer system does not have access to an account and/or valid subscription that is required to access the first content; and/or the user is not signed-in to the account), the computer system outputs an entitlement-required notification (e.g., 6406 and/or 6408) (e.g., a graphical object (e.g., an icon, button, and/or affordance) that includes a description of an application and/or subscription that is required to access the first content). Outputting the entitlement-required notification provides feedback to a user of the computer system that the computer system currently is not entitled to output the first content. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system detects, via the one or more input devices, an input (e.g., 6410) corresponding to selection of the entitlement-required notification (e.g., 6406 and/or 6408). In some embodiments, in response to detecting the input corresponding to selection of the entitlement-required notification, the computer system displays a selectable obtain-entitlement option (e.g., 6408 or 6414) (e.g., icon, button, and/or affordance) that, when selected, initiates a process (e.g., as shown in FIGS. 6CE-6CG) to obtain (e.g., purchase, rent, and/or download) an entitlement (e.g., an application, a subscription, and/or access to the first content via purchase or rental) that enables access to the first content. Displaying a selectable obtain-entitlement option in response to detecting the input corresponding to selection of the entitlement-required notification provides additional controls for obtaining an entitlement that enables access to the first content without cluttering the user interface with additional displayed controls until an input is detected, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the process to obtain the entitlement includes displaying a website or application that provides the capability for a user to select an entitlement, input payment information, start a free trial, and/or complete purchase of the entitlement.

In some embodiments, in accordance with a determination that the first content has been selected for the shared-content session using a first entitlement, the obtain-entitlement option (e.g., 6408 or 6414), when selected, initiates a process to obtain the first entitlement. In some embodiments, in accordance with a determination that the first content has been selected for the shared-content session using a second entitlement that is different from the first entitlement, the obtain-entitlement option (e.g., 6408 or 6414), when selected, initiates a process to obtain the second entitlement. In some embodiments, the particular entitlement obtained via the obtain-entitlement option is determined based on which entitlement is used to initiate playback of the first content in the shared-content session. For example, if a first entitlement is used to initiate playback of the first content, then the obtain-entitlement option is selectable to obtain the first entitlement, and if a second entitlement is used to initiate playback of the first content, then the obtain-entitlement option is selectable to obtain the second entitlement.

In some embodiments, the computer system detects a set of one or more inputs (e.g., 6410, 6416, 6422, and/or 6426) that result in obtaining (e.g., purchasing) the entitlement, where the one or more inputs include an input corresponding to selection of the obtain-entitlement option (e.g., 6408 or 6414). In some embodiments, the computer system displays information associated with obtaining the entitlement such as a cost (e.g., purchase price) of the entitlement, a duration of the entitlement, user agreement(s), and/or promotional content. In some embodiments, the set of one or more inputs include inputs corresponding to initiating a purchase, verifying an identity of the user (e.g., using a biometric verification, user identification, passcode, and/or password), and/or activation of a hardware input element such as a button (e.g., 204 and/or 206) and/or input mechanism (e.g., 506 and/or 508). In some embodiments, in response to detecting the set of one or more inputs that result in obtaining the entitlement, the computer system outputs the first content (e.g., displays 6150B in FIG. 6CH) according to a status (e.g., time 2:35) of the first content with respect to the shared-content session (e.g., begin playing the first content at a position or time within the first content at which external computer systems connected to the shared-content session are playing the first content; and/or begin playing the first content based on the status or progress of playback in the shared-content session).

In some embodiments, in response to receiving the indication that the first content has been selected for the shared-content session, and in accordance with a determination that the computer system does not have an entitlement that was used to select the first content for the shared-content session at the external computer system, the computer system foregoes output of the first content (e.g., 6000B in FIG. 6CC).

In some embodiments, if a participant of the shared-content session does not have an entitlement that matches the entitlement that the user who started sharing the first content used to select the first content for the shared-content session, then the first content is not played for that participant.

In some embodiments, outputting the first content includes outputting the first content in a fifth user interface (e.g., the second user interface, an application window, and/or a PiP widow) while the fifth user interface is in a first display state (e.g., size, location, minimized, maximized, docked, expanded display state, and/or full screen). In some embodiments, while the fifth user interface is in the first display state, the computer system detects a request (e.g., 6082, 6104, 6234, 6236, 6242, 6342, or 6346) to change the display state of the fifth user interface. In some embodiments, in response to detecting the request to change the display state of the fifth user interface, the computer system changes the display state of the fifth user interface to a second display state, different from the first display state (e.g., changing a size and/or location of the fifth user interface), according to the request to change the display state of the fifth user interface. In some embodiments, while the fifth user interface is in the second display state, the computer system receives an indication (e.g., data) that second content, different from the first content, has been selected for the shared-content session at a second external computer system. In some embodiments, in response to receiving the indication that second content has been selected for the shared-content session, the computer system outputs the second content in the second display state (e.g., replacing displayed content in the fifth user interface with the second content; ceasing displaying the fifth user interface and displaying the second content in a sixth user interface that has the same size and/or location as the fifth user interface). Outputting the second content in the second displayed state reduces inputs at the computer system by automatically displaying content at a location that was previously selected by a user without having to prompt the user for the displayed location or requiring the user to move the content to the location. Reducing inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system receives an indication (e.g., data) that a first event (e.g., a user has joined the shared-content session, a participant has left the shared-content session, and/or a user has requested a change in output of content in the shared-content session (e.g., play, pause, stop, fast forward, rewind, skip track, and/or change content)) that meets first notification criteria (e.g., the action is a type of action for which a notification is to be displayed, unless other criteria are met) has occurred in the shared-content session (e.g., a participant leaves the shared-content session in FIG. 6R). In some embodiments, after receiving the indication that the first event that meets the first notification criteria has occurred in the shared-content session, the computer system receives an indication (e.g., data) that a second event that meets the first notification criteria has occurred in the shared-content session (e.g., 6000A detects audio "Wow!" while microphone is muted in FIG. 6R). In some embodiments, after (e.g., in response to) receiving the indication that the second event that meets the first notification criteria has occurred in the shared-content session: in accordance with a determination that notification-suppression criteria (e.g., the indication of the second event is received before a notification of the first event is output; the indication of the second event is received within a predetermined amount of time of receiving the indication of the first event; and/or the second event is determined to have a higher notification priority than the first event; or any combination thereof) are met, where the notification-suppression criteria include a criterion that is met when the indication that the second event has occurred is received before notification of the first event is output, the computer system outputs a notification (e.g., 6098) of the second event without outputting a notification (e.g., 6086) of the first event (e.g., do not output a notification of the first action; and/or suppress the notification of the first action); and in accordance with a determination that the notification-suppression criteria are not met, the computer system outputs the notification of the first event and outputting the notification of the second event. Outputting the notification of the second event with or without the notification of the first event in accordance with a determination of whether or not the notification-suppression criteria is met reduces the computational workload of the computer system and improves user feedback by eliminating display of the notification of the first event if the notification-suppression criteria is met (e.g., when the first notification becomes irrelevant before it is displayed). Reducing computational workload of the computer system and providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system receives an indication that a third event (e.g., a user has joined the shared-content session, a participant has left the shared-content session) that meets second notification criteria (e.g., the action is a type of event for which a notification is to be displayed, unless other criteria are met) has occurred in the shared-content session. In some embodiments, the computer system receives an indication that a fourth event that meets the second notification criteria has occurred in the shared-content session (e.g., after receiving the indication that the third event that meets the notification criteria has occurred in the shared-content session). In some embodiments, after (e.g., in response to) receiving the indication that the fourth event that meets the second notification criteria has occurred in the shared-content session: in accordance with a determination that notification-aggregation criteria (e.g., the indication of the fourth event is received before a notification of the third event is output; the indication of the fourth event is received within a predetermined amount of time of receiving the indication of the third event; the third event is determined to be the same type of event (e.g., joining the shared-content session, leaving the shared-content session, and/or changing connection status with respect to the shared content session) as the fourth event; or any combination thereof) are met, where the notification-aggregation criteria including a criterion that is met if the third event and the fourth event are determined to be of a same type of event, the computer system outputs a first notification (e.g., 6028 in FIG. 6G) (e.g., a combined or aggregated notification; a single notification that includes information about the third event and the fourth event; and/or without outputting a notification of the third event and a separate notification of the fourth event); and in accordance with a determination that the notification-aggregation criteria are not met, the computer system outputs a second notification (e.g., 6028 in FIG. 6F) (e.g., a notification of the third action) that is different from the first notification and outputs a third notification (e.g., 6086) (e.g., a notification of the fourth action, a separate notification) that is different from the first notification and the second notification. Outputting the first notification in accordance with a determination that the notification-aggregation criteria are met, and outputting the second notification and the third notification in accordance with a determination that the notification-aggregation criteria are not met reduces the computational workload of the computer system and improves user feedback by aggregating notifications, thereby eliminating excessive display of notifications when the notification-aggregation criteria are met (e.g., when the third event and fourth event are a same type of event). Reducing computational workload of the computer system and providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system ceases output of the first content via an output generation component of the one or more output generation components. In some embodiments, the computer system ceases output of the first content in response to a request to output selected content that is different from content in the shared-content session, such as, e.g., content that is selected to be output by the computer system but not selected for the shared-content session (e.g., private and/or non-shared content that is only to be displayed by the local computer system). In some embodiments, the request to output the selected content does not include a request to add the selected content to the shared-content session. In some embodiments, after ceasing output of the first content via an output generation component of the one or more output generation components and while the first content is in the shared-content session (e.g., the computer system has stopped playback of the first content, but the first content is still being shared in the shared-content session), and in accordance with (e.g., in response to) a determination that shared-content-reminder criteria is met (e.g., output of content (e.g., private content) that was selected for output by the computer system but not for the shared-content session has ended; and/or a condition or event that caused the computer system to cease output of the first content has ended), the computer system outputs a shared-content-reminder notification (e.g., 6015A-1, 6312, and/or 6314) that indicates that the first content is in the shared-content session (e.g., that output of the first content is available via the shared-content session). Outputting a shared-content-reminder notification in accordance with a determination that shared-content-reminder criteria is met provides feedback indicating that the first content is in the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in accordance with a determination that the shared-content-reminder criteria is not met, the computer system forgoes output of the shared-content-reminder notification that the first content is in the shared-content session (e.g., the computer system waits to output the shared-content-reminder notification until the shared-content-reminder criteria is met).

In some embodiments, the computer system detects a third input corresponding to selection of the first notification. In some embodiments, in response to detecting the third input corresponding to selection of the first notification, the computer system displays a third shared-content session object (e.g., 6015A or 6015B) that includes information (e.g., 6015A-1, 6015A-2, 6015A-3, 6015B-1, 6015B-2, and/or 6015B-3) associated with the shared-content session and/or one or more selectable shared-content session function options (e.g., 6015A-1, 6015A-4, 6015A-5, 6015A-6, 6015A-7, 6015A-8, 6015B-1, 6015B-4, 6015B-5, 6015B-6, 6015B-7, and/or 6015B-8) that, when selected, cause the computer system to perform a respective function associated with the shared-content session. In some embodiments, while displaying the third shared-content session object, the computer system: receives an indication that a fifth event (e.g., a user has joined the shared-content session, a participant has left the shared-content session) that meets third notification criteria (e.g., the event is a type of event for which a notification is to be displayed, unless other criteria are met) has occurred in the shared-content session; and in response to receiving the indication that the fifth event has occurred: in accordance with a determination that the fifth event meets event-notification criteria (e.g., the fifth event is determined to have a priority that satisfies a priority threshold, where different event have different priorities with respect to outputting a notification of the event), outputs a fourth notification that includes information about the fifth event; and in accordance with a determination that the fifth event does not meet the action-notification criteria, foregoes output of the fourth notification that includes information about the fifth event. In some embodiments, the computer system ceases display of the third shared-content session object. In some embodiments, the computer system ceases display of the third shared-content session object in accordance with (e.g., in response to) a determination that the third shared-content session object has been displayed for a predetermined amount of time (e.g., 1 second, 2 seconds, 3 seconds, 4 seconds, 5 seconds) (e.g., the third shared-content session object is dismissed (e.g., automatically, without user input) after being displayed for a predetermined amount of time without being interacted with by a user). In some embodiments, after ceasing display of the third shared-content session object, the computer system outputs a fifth notification, wherein the fifth notification includes information about an event that occurred while displaying the third shared-content session object. Outputting the fifth notification after ceasing display of the third shared-content session object provides feedback by displaying information about an event that occurred while displaying the third shared-content session object. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in accordance with a determination that a first action that occurred while displaying the third shared-content session object has a higher notification priority than a second action that occurred while displaying the third shared-content session object, the fifth notification includes information about the first action that occurred while displaying the third shared-content session object without including information about the second action that occurred while displaying the third shared-content session object; and in accordance with a determination that the second action that occurred while displaying the third shared-content session object has a higher notification priority than the first action that occurred while displaying the third shared-content session object, the fifth notification includes information about the second action that occurred while displaying the third shared-content session object without including information about the first action that occurred while displaying the third shared-content session object (e.g., after ceasing display of the third shared-content session object, the computer system displays a notification with information corresponding to the action that occurred while displaying the third shared-content session object that has the highest priority relative to the actions that occurred while displaying the third shared-content session object).

In some embodiments, the first notification includes a link associated with an application (e.g., a particular part of an application, a playlist user interface, and/or a particular piece of content in an application) on the computer system, where the link is provided by the external computer system (e.g., selection of the notification causes the computer system to output or navigate to the portion of the application). In some embodiments, the computer system receives an input corresponding to a selection of the link. In some embodiments, in response to receiving the input corresponding to a selection of the link: in accordance with a determination that the link corresponds to a first portion of the application (e.g., first displayed content of the application), the computer system displays the first portion of the application (e.g., navigating to the first portion of the application); and in accordance with a determination that the link corresponds to a second portion of the application different from the first portion of the application (e.g., second displayed content of the application), the computer system displays the second portion of the application (e.g., navigating to the second portion of the application). Displaying the first portion of the application in accordance with a determination that the link corresponds to a first portion of the application, and displaying the second portion of the application in accordance with a determination that the link corresponds to a second portion of the application, reduces inputs at the computer system by providing a link that can be selected to navigate to different portions of the application without requiring additional user input to navigate to the different portions of the application on the computer system. Reducing inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while (e.g., in accordance with a determination that) the shared-content session includes screen-share content (e.g., as shown in FIGS. 6DC-6DE) (e.g., a screen and/or application interface that is being displayed by a computer system connected to the shared-content session), the computer system (e.g., 6000A) displays, via the one or more output generation components (e.g., 6001A), a visual indication (e.g., 6568 or 6235) of a participant of the shared-content session that added the screen-share content to the shared-content session (e.g., that is sharing the screen-share content). Displaying the visual indication of the participant that added the screen-share content to the shared-content session automatically, quickly, and efficiently provides contextually-relevant information to the user, which provides improved visual feedback to the user. In some embodiments, the computer system displays the visual indication of the participant corresponding to the screen-share content in a user interface (e.g., window, a PiP, a user interface that is in an expanded (e.g., full-screen)) state that displays the screen-share content. In some embodiments, the visual indication of the participant that added the screen-share content is changed (e.g., updated and/or replaced) in response to a change in the participant that added the screen-share content to the shared-content session (e.g., if a different participant adds different content to the shared-content session). In some embodiments, in response to the participant removing the screen-share content from the shared-content session, the computer system ceases to display (e.g., removes) the visual indication of the participant.

Note that details of the processes described above with respect to method 800 (e.g., FIG. 8) are also applicable in an analogous manner to the methods described below and above. For example, methods 700, 900, 1000, 1100, 1200, 1300, 1500, 1600, 1700 and/or 1800 optionally include one or more of the characteristics of the various methods described above with reference to method 800. For brevity, these details are not repeated.

Figure 9:
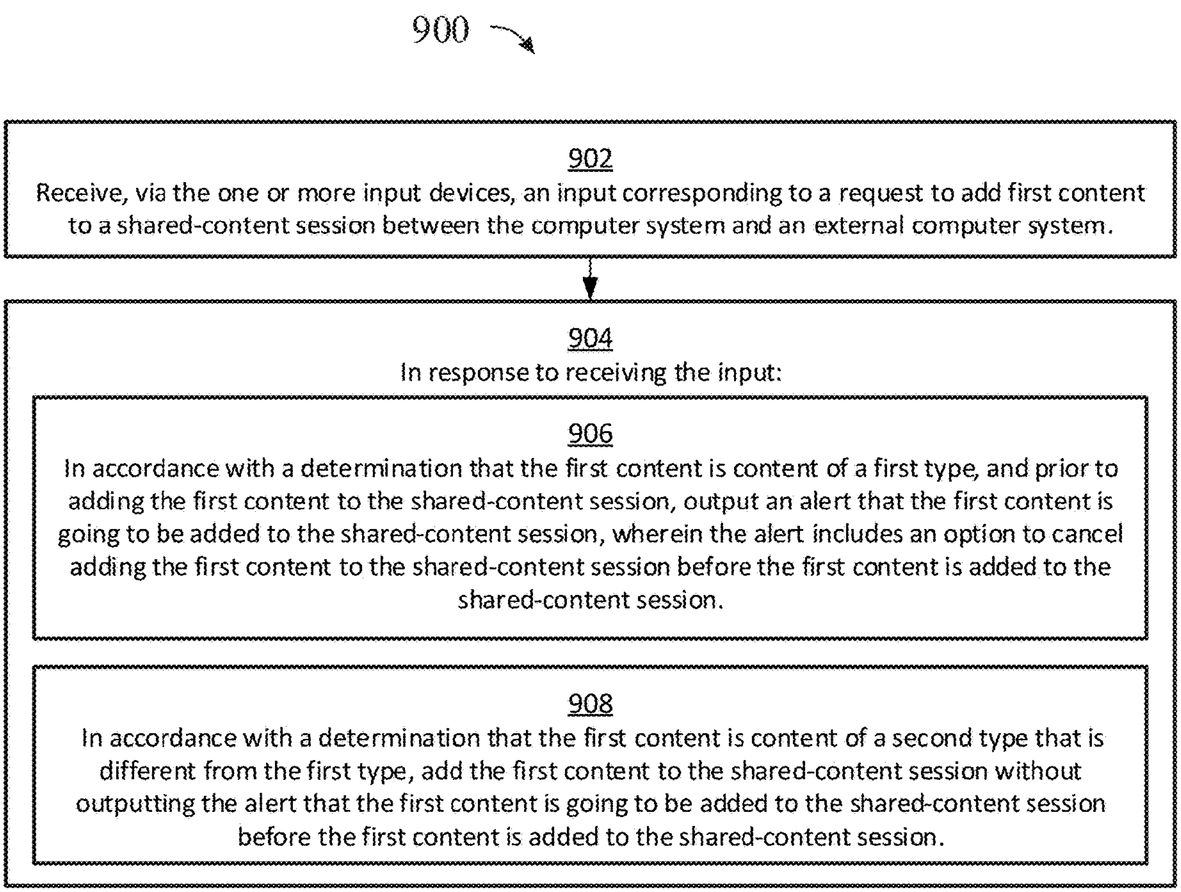
FIG. 9 depicts a flow diagram illustrating a method for managing a shared-content session, in accordance with some embodiments.

FIG. 9 is a flow diagram illustrating a method for adding content to a shared-content session using a computer system (e.g., 6000A and/or 6000B) in accordance with some embodiments. Method 900 is performed at a computer system (e.g., 6000A and/or 6000B) (e.g., a smartphone, a tablet, a desktop or laptop computer) that is in communication with one or more output generation components (e.g., 6001A or 6001B) (e.g., a display controller, a touch-sensitive display system, a speaker, a bone conduction audio output device, a tactile output generator, a projector, and/or a holographic display) and one or more input devices (e.g., 6001A, 6002A, 6003A, 6001B, 6002B, and/or 6003B) (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). Some operations in method 900 are, optionally, combined, the orders of some operations are, optionally, changed, and some operations are, optionally, omitted.

As described below, method 900 provides an intuitive way for adding content to a shared-content session. The method reduces the cognitive burden on a user for adding content to a shared-content session, thereby creating a more efficient human-machine interface. For battery-operated computing devices, enabling a user to add content to a shared-content session faster and more efficiently conserves power and increases the time between battery charges.

The computer system (e.g., 6000B) receives (902), via the one or more input devices (e.g., 6001B, 6002B, and/or 6003B), an input (e.g., 6064, 6218, 6224, 6336, 6376, or 6444) (e.g., a selection of a screen sharing affordance; or a selection of a play affordance) corresponding to a request to add first content (e.g., content displayed at the computer system) (e.g., screen-share content) to a shared-content session between the computer system (e.g., 6000B) and an external computer system (e.g., 6000A) (e.g., one or more external computer systems).

In response to receiving (904) the input: in accordance with a determination (906) that the first content is content of a first type (e.g., 6060, 6088, or 6102) (e.g., content that includes personal information; content that is shared from the computer system; and/or screen-share content), and prior to adding the first content to the shared-content session, the computer system (e.g., 6000B) outputs an alert (e.g., 6066) (e.g., an audible alert and/or a displayed alert) that the first content is going to be added to the shared-content session, wherein the alert includes an option (e.g., 6066) (e.g., an option that is selectable (e.g., by an audio or touch input); and/or a selectable graphical object (e.g., an affordance that includes a countdown)) to cancel adding the first content to the shared-content session before the first content is added to the shared-content session. Outputting an alert that the first content is going to be added to the shared-content session, wherein the alert includes an option to cancel adding the first content to the shared-content session before the first content is added to the shared-content session, provides feedback to a user of the computer system that the first content is being added to the shared-content session, provides additional controls for cancelling adding the first content to the shared-content session without cluttering the user interface with additional displayed controls until the input is received, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In accordance with a determination (908) that the first content is content of a second type that is different from the first type (e.g., content that does not include personal information; content for synchronized output; and/or media content), the computer system (e.g., 6000B) adds the first content to the shared-content session without outputting the alert that the first content is going to be added to the shared-content session before the first content is added to the shared-content session (e.g., FIG. 6AQ, FIG. 6BO, FIG. 6BY, or FIG. 6CL).

In some embodiments, content of the first type includes personal information (e.g., a user's screen, a user's email address, a message from a user, a user's photo(s), and/or a user's name), and content of the second type does not include personal information. In some embodiments, the first content is determined to be content of the first type in accordance with a determination that the first content includes personal information. In some embodiments, the first content is determined to be content of the second type (e.g., not content of the first type) in accordance with a determination that the first content does not include personal information.

In some embodiments, content of the first type includes content (e.g., 6060, 6088, or 6102) that is shared from the computer system (e.g., 6000A or 6000B) (e.g., the computer system shares (e.g., transmits) actual audio and/or image (e.g., video) data of the content; screen-share content), content of the second type includes content (e.g., 6138 or 6446) that is synchronized between the computer system (e.g., 6000A or 6000B) and the external computer system (e.g., 6000B or 6000A) (e.g., not screen-share content), and content of the second type is not shared from the computer system (e.g., the computer system does not share (e.g., transmit) actual audio and/or image (e.g., video) data of the content; the computer system can share a representation of the content (but not the actual content) and/or data to facilitate synchronized output between the computer system and the external computer system).

In some embodiments, content of the first type includes (e.g., is) a graphical representation (e.g., 6070) of content (e.g., 6060, 6088, or 6102) displayed on a screen of the computer system (e.g., 6000B) (e.g., screen-share content), and wherein content of the second type includes (e.g., is) media content (e.g., 6138 or 6446) (and, optionally, does not include a screen of the computer system and/or is provided by a content server that is different from the computer system).

In some embodiments, the alert that the first content is going to be added to the shared-content session includes a countdown indicator (e.g., 6066) that progresses through a plurality of states to indicate an amount of time until content is shared in the shared-content session (e.g., a displayed numeric countdown (e.g., "5, 4, 3, 2, 1" or "3, 2, 1")). Outputting the alert with a countdown indicator that progresses through a plurality of states to indicate an amount of time until content is shared in the shared-content session provides feedback to a user of the computer system of the timing for when the first content is being added to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the input corresponding to the request to add first content to the shared-content session between the computer system (e.g., 6000B) and the external computer system (e.g., 6000A) includes selection of a sharing initiation option (e.g., 6015A-8 or 6015B-8) (e.g., affordance, icon, button). In some embodiments, outputting the alert that the first content is going to be added to the shared-content session includes ceasing output of the sharing initiation option and displaying the countdown indicator (e.g., FIGS. 6N and 6O) (e.g., replacing the sharing initiation option with the countdown indicator; displaying the countdown indicator at the previous location of the sharing initiation option). Ceasing output of the sharing indication option and displaying the countdown indicator provides feedback to a user of the computer system about the timing for when the first content is being added to the shared-content session, provides additional controls for cancelling adding the first content to the shared-content session without cluttering the user interface with additional displayed controls until the input is received, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, adding the first content to the shared-content session without the computer system outputting the alert that the first content is going to be added to the shared-content session before the first content is added to the shared-content session includes the computer system adding the first content (e.g., 6138 or 6446) to the shared-content session without outputting the countdown indicator (e.g., without displaying 6066).

In some embodiments, the computer system (e.g., 6000A or 6000B) displays (e.g., prior to and/or while receiving the input corresponding to a request to add first content to a shared-content session between the computer system and an external computer system) a selectable navigation option (e.g., 6272, 6314, or 6316) to navigate to the first content (e.g., in response to detecting an input selecting the option to navigate to the first content, the computer system outputs the first content (e.g., displays the first content; opens the first content (or a window or application that includes the first content); and/or brings the first content (or a window that includes the first content) to the foreground)). Displaying a selectable navigation option to navigate to the first content provides additional controls for displaying content without cluttering the user interface with additional displayed controls until an input is received, and avoids accidental inputs while the additional control options are not displayed. Providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 6000B) displays (e.g., prior to and/or while receiving the input corresponding to a request to add first content to a shared-content session between the computer system and an external computer system) a selectable leave option (e.g., 6015A-9) to leave (e.g., exit, disconnect from, and/or cease participation in) the shared-content session (e.g., in response to detecting an input selecting the leave option to leave the shared-content session, the computer system leaves the shared-content session). Displaying a selectable option to leave the shared-content session provides additional controls for exiting the shared-content session without cluttering the user interface with additional displayed controls until an input is received, and avoids accidental inputs while the additional control options are not displayed. Providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 6000B) initiates connection to (e.g., joining or initiating) the shared-content session, where initiating the connection to the shared-content session includes opening (e.g., automatically, without further input) an audio channel that adds audio detected by the one or more input devices (e.g., 6001B, 6002B, and/or 6003B) (e.g., a microphone) to the shared-content session between the computer system and the external computer system (e.g., 6015A-6 is emphasized in FIG. 6C) (e.g., the computer system opens the audio channel by default when the computer system connects to (e.g., initiates and/or joins) the shared-content session). Opening an audio channel that adds audio detected by the one or more input devices to the shared-content session when initiating connection to the shared-content session reduces the number of inputs at the computer system, by reducing inputs to open the audio channel. Reducing the number of inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 6000B) displays a selectable sharing option (e.g., 6015A-8, 6015B-8, 6180A-1, or 6180B-1) to add content to the shared-content session (e.g., an icon, button, and/or affordance that, when selected, initiates a process for adding content to the shared-content session) while the computer system (e.g., 6000B) is connected to a real-time communication session (e.g., 6170A or 6170B (e.g., a phone call, a video communication session). Displaying a selectable sharing option to add content to the shared-content session while the computer system is connected to a real-time communication session provides additional controls for adding content to the shared-content session without cluttering the user interface with additional displayed controls until an input is received, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, in response to detecting selection of the sharing option, the computer system adds (e.g., automatically, without further user input) content to the shared-content session and/or displays an interface that provides content options to add to the shared-content session.

In some embodiments, in accordance with a determination that the computer system (e.g., 6000B) is sharing content of the first type (e.g., 6060, 6088, or 6102) (e.g., screen sharing) with the shared-content session (and, optionally, in accordance with a determination that the shared-content session object (e.g., 6015) is not being displayed (e.g., is minimized or hidden)), the computer system (e.g., 6000B) displays (e.g., in a corner of a display, in an upper left corner of a display) a first shared-content session indicator (e.g., 6021B) (e.g., a persistent indicator) that indicates that the computer system (e.g., 6000B) is sharing content of the first type with the shared-content session. Displaying a first shared-content session indicator provides feedback to a user of the computer system that the computer system is sharing content of the first type with the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system can selectively display and/or hide (e.g., minimize, cease display of, output in a background) a shared-content session object that includes information associated with the shared-content session and/or selectable options for managing and/or performing functions associated with the shared-content session.

In some embodiments, the first shared-content session indicator (e.g., 6021B) is output at a first location. In some embodiments, in accordance with a determination that the computer system (e.g., 6000B) is connected to the shared-content session and is not sharing content of the first type with the shared-content session (and, optionally, in accordance with a determination that the shared-content session object is not being displayed (e.g., is minimized or hidden)), the computer system (e.g., 6000B) displays, at the first location, a second shared-content session indicator (e.g., 6020A or 6020B) (e.g., a persistent indicator), different from the first shared-content session indicator (e.g., the second shared-content session indicator has a different appearance, color, shape, and/or icon than the first shared-content session indicator), that indicates that the computer system (e.g., 6000B) is connected to the shared-content session (e.g., but is not sharing content of the first type). Displaying, at the first location, a second shared-content session indicator in accordance with a determination that the computer system is connected to the shared-content session and is not sharing content of the first type with the shared-content session provides feedback to a user of the computer system that the computer system is connected to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first shared-content session indicator (e.g., 6021B) has a first appearance (e.g., color, icon, shape, and/or text) and the second shared-content session indicator (e.g., 6020A or 6020B) has a second appearance that is different from the first appearance. Displaying the first shared-content session indicator having a first appearance and the second shared-content indicator having a second appearance different from the first appearance provides feedback to a user of the computer system about the type of content that is being shared in the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first appearance of the first shared-content session indicator (e.g., 6021B) includes a first color (e.g., red; the first appearance does not include a second color (e.g., blue or yellow)) and the second appearance of the second shared-content session indicator (e.g., 6020A or 6020B) includes a second color different from the first color (e.g., blue or yellow; the second appearance does not include the first color). Displaying the first shared-content session indicator having a first color and the second shared-content indicator having a second color different from the first color provides feedback to a user of the computer system about the type of content that is being shared in the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 6000B) detects an input (e.g., 6032 or 6062) corresponding to selection of the first shared-content session indicator. In response to detecting the input corresponding to selection of the first shared-content session indicator, the computer system (e.g., 6000B) displays a shared-content session object (e.g., 6015A or 6015B) that includes information (e.g., 6015A-1, 6015B-1, 6015A-2, and/or 6015A-3) associated with the shared-content session (e.g., participant names, group name, number of participants, participant status, and/or content in the shared-content session) and/or one or more selectable shared-content session function options (e.g., 6015A-1, 6015B-1, 6015A-4, 6015B-4, 6015A-5, 6015B-5, 6015A-6, 6015B-6, 6015A-7, 6015B-7, 6015A-8, 6015B-8, 6015A-9, and/or 6015B-9) that, when selected, cause the computer system (e.g., 6000B) to perform a respective function associated with the shared-content session (e.g., add content (e.g., audio/video content and/or screen-share content) to the shared-content session, turn audio (e.g., microphone) on/off, turn video (e.g., camera) on/off, initiate message conversation with users associated with the shared-content session, and/or initiate a real-time (e.g., audio and/or video) communication session with users associated with the shared-content session). Displaying, in response to detecting the input corresponding to the selection of the first shared-content session indicator, a shared-content session object that includes information associated with the shared-content session and/or one or more selectable shared-content session function options that, when selected, cause the computer system to perform a respective function associated with the shared-content session provides additional controls for performing a respective function associated with the shared-content session without cluttering the user interface with additional displayed controls until an input is received, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 6000B) displays a shared-content session object (e.g., 6015A or 6015B) that includes information (e.g., 6015A-1, 6015B-1, 6015A-2, and/or 6015A-3) associated with the shared-content session and/or one or more selectable shared-content session function options (e.g., 6015A-1, 6015B-1, 6015A-4, 6015B-4, 6015A-5, 6015B-5, 6015A-6, 6015B-6, 6015A-7, 6015B-7, 6015A-8, 6015B-8, 6015A-9, and/or 6015B-9) that, when selected, cause the computer system (e.g., 6000B) to perform a respective function associated with the shared-content session. While outputting a shared-content session object, the computer system (e.g., 6000B) detects an input (e.g., 6014, 6078, 6188, or 6268) (e.g., a press of a home button, a swipe up gesture (e.g., from a location at the bottom of a display), a request to display a home interface) corresponding to a request to output a user interface (e.g., 6018 or 6088) provided by an operating system of the computer system (e.g., 6000B) (e.g., a home screen, a user interface (e.g., user interface 400) that includes user interface objects corresponding to respective applications, and when a user interface object corresponding to a respective application is activated, the computer system displays the respective application corresponding to the activated user interface object). In response to detecting the input corresponding to the request to output the user interface provided by the operating system of the computer system (e.g., 6000B), the computer system (e.g., 6000B) ceases output of (e.g., minimizing, hiding) the shared-content session object (e.g., and outputting the user interface provided by the operating system of the computer system and, optionally, displaying the first or second shared-content session indicator).

In some embodiments (e.g., while the computer system is connected to the shared-content session), the computer system (e.g., 6000B) displays a shared-content session object (e.g., 6015A or 6015B) that includes information (e.g., 6015A-1, 6015B-1, 6015A-2, and/or 6015A-3) associated with the shared-content session (e.g., and, optionally, one or more selectable shared-content session function options that, when selected, cause the computer system to perform a respective function associated with the shared-content session). In some embodiments, the information associated with the shared-content session includes a content indicator (e.g., 6015A-1 or 6015B-1 in FIGS. 6P, 6Q, 6AS, and 6AW) (e.g., a graphical indicator) that is based on content in the shared-content session (e.g., content being shared by the computer system and/or content being shared by an external computer system connected to the shared-content session). Displaying a shared-content session object that includes information associated with the shared-content session, the information associated with the shared-content session including a content indicator that is based on content in the shared-content session provides feedback to a user of the computer system about the content that is being shared in the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, in accordance with a determination that first content is being shared in the shared-content session, the shared-content session object includes a first content indicator (e.g., with a first appearance); and in accordance with a determination that second content, different from the first content, is being shared in the shared-content session, the shared-content session object includes a second content indicator that is different from the first content indicator (or the first content indicator with a second appearance that is different from the first appearance).

In some embodiments (e.g., while the computer system is connected to the shared-content session), the computer system (e.g., 6000B) displays a shared-content session object (e.g., 6015A or 6015B) that includes information (e.g., 6015A-1, 6015B-1, 6015A-2, and/or 6015A-3) associated with the shared-content session (e.g., and, optionally, one or more selectable shared-content session function options that, when selected, cause the computer system to perform a respective function associated with the shared-content session), where the information associated with the shared-content session includes a participant indicator (e.g., 6015A-1 or 6015B-1 in FIGS. 6P and 6Q) (e.g., a graphical indication) that is based on a participant that added (e.g., is sharing) content in the shared-content session (e.g., the participant indicator includes a name of a participant, one or more initials of a participant, and/or an avatar representation of the participant). Displaying a shared-content session object that includes information associated with the shared-content session, the information associated with the shared-content session including a participant indicator that is based on a participant that added content in the shared-content session provides feedback to a user of the computer system about who is adding content to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, in accordance with a determination that a first participant is sharing content in the shared-content session, the shared-content session object includes a first participant indicator (e.g., with a first appearance; that indicates the first participant); and in accordance with a determination that a second participant, different from the first participant, is sharing content in the shared-content session, the shared-content session object includes a second participant indicator (e.g., that indicates the second participant) that is different from the first participant indicator (or the first participant indicator with a second appearance that is different from the first appearance).

In some embodiments (e.g., while the computer system is connected to the shared-content session), the computer system (e.g., 6000B) displays a shared-content session object (e.g., 6015A or 6015B) that includes information (e.g., 6015A-1, 6015B-1, 6015A-2, and/or 6015A-3) associated with the shared-content session (e.g., and, optionally, one or more selectable shared-content session function options that, when selected, cause the computer system to perform a respective function associated with the shared-content session), where the information associated with the shared-content session includes an application indicator (e.g., 6212) (e.g., a graphical indication) that is based on an application associated with content in the shared-content session (e.g., the application indicator includes an icon of the application that is sharing content in the shared-content session). Displaying a shared-content session object that includes information associated with the shared-content session, the information associated with the shared-content session including an application indicator that is based on an application associated with content in the shared-content session provides feedback to a user of the computer system about an application that is used to share content in the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, an icon of the application in the application indicator is overlaid on a representation (e.g., avatar) of a group of users associated with the shared-content session. In some embodiments, in accordance with a determination that a first application is associated with content in the shared-content session, the shared-content session object includes a first application indicator (e.g., with a first appearance; that indicates the first application); and in accordance with a determination that a second application, different from the first application, is associated with content in the shared-content session, the shared-content session object includes a second application indicator (e.g., that indicates the second application) that is different from the first application indicator (or the first application indicator with a second appearance that is different from the first appearance).

In some embodiments (e.g., while the computer system is connected to the shared-content session), the computer system (e.g., 6000B) displays a shared-content session object (e.g., 6015A or 6015B) that includes one or more selectable shared-content session function options (e.g., 6015A-1, 6015B-1, 6015A-4, 6015B-4, 6015A-5, 6015B-5, 6015A-6, 6015B-6, 6015A-7, 6015B-7, 6015A-8, 6015B-8, 6015A-9, and/or 6015B-9) that, when selected, cause the computer system (e.g., 6000B) to perform a respective function associated with the shared-content session (e.g., and, optionally, information associated with the shared-content session), the one or more shared-content session function options including a first shared-content session function option (e.g., 6015A-1 or 6015B-1). The computer system (e.g., 6000B) detects an input (e.g., 6036) corresponding to selection of the first shared-content session function option. In response to detecting the input corresponding to selection of the first shared-content session function option, the computer system (e.g., 6000B) displays a user status interface (e.g., 6038A 6040A, and/or 6042A) (e.g., or a user-interface object; a group card) that includes a status (e.g., 6046), with respect to the shared-content session (e.g., active, inactive, joined, not joined, sharing, and/or not sharing), of one or more users associated with the shared-content session. Displaying a user status interface that includes a status, with respect to the shared-content session, of one or more users associated with the shared-content session provides feedback to a user of the computer system about the status of one or more users associated with the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 6000B) displays a user interface (e.g., 6004A or 6004B) of a messaging application. In some embodiments, the user interface of the messaging application includes a plurality of messages (e.g., 6004A-1 or 6004B-1) between users associated with the shared-content session (e.g., in a conversation region (e.g., 6004A-3 or 6004B-3) of the user interface of the messaging application). In accordance with a determination that the shared-content session is available (e.g., the shared-content session is active; the shared-content session can be initiated), the computer system (e.g., 6000B) displays a visual indication (e.g., 6010A, 6010B, or 6024) (e.g., a message that the shared-content session is available) in the user interface of the messaging application (e.g., in the conversation region of the user interface of the messaging application) that includes information associated with the shared-content session (e.g., a representation (e.g., name, initial(s), and/or avatar) of a user that initiated the shared-content session, a number of participants in the shared-content session, representation(s) of participants in the shared-content session, and/or content in the shared-content session). Displaying a visual indication in the user interface of the messaging application that includes information associated with the shared-content session, in accordance with a determination that the shared-content session is available, provides feedback to a user of the computer system of the information associated with the shared-content session, provides additional controls for joining the shared-content session without cluttering the user interface with additional displayed controls until an input is received, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the visual indication includes a selectable option (e.g., a link, affordance, and/or button) that, when selected, causes the computer system to activate and/or join the shared-content session.

In some embodiments, the computer system (e.g., 6000B) displays a selectable camera option (e.g., 6015A-7, 6015B-7, 14015A-7, or 14045B-7) (e.g., in the shared-content session object). The computer system (e.g., 6000B) detects an input corresponding to selection of the selectable camera option. In response to detecting the input corresponding to selection of the selectable camera option, the computer system (e.g., 6000B) displays one or more selectable camera setting options (e.g., 14068) that, when selected, cause the computer system (e.g., 6000B) to operate a camera according to the selected camera setting option (e.g., causing the computer system to output a visual representation of a field-of-view of one or more cameras). Displaying one or more selectable camera setting options in response to detecting the input corresponding to selection of the selectable camera option provides additional controls for causing the computer system to operate a camera according to the selected camera setting option without cluttering the user interface with additional displayed controls until an input is received, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the camera setting options include one or more of "camera on," "camera off," and/or one or more options to select a particular camera (e.g., a front-facing camera, a rear-facing camera). In some embodiments, one or more of the camera setting options can be selected to output a visual representation of a field-of-view of particular camera (e.g., a front-facing camera, and/or a rear-facing camera). In some embodiments, one or more of the camera setting options can be selected to apply a visual effect to a representation of a field-of-view of one or more cameras, and/or to enable/disable a setting for adjusting a field-of-view of one or more cameras.

In some embodiments, the computer system (e.g., 6000B; 14000) displays a selectable microphone option (e.g., 6015A-6 or 6015B-6; 14045A-6 or 14045B-6 displayed by device 14000A or 14000B) (e.g., in shared-content session object). The computer system (e.g., 6000B) detects an input (e.g., 14046) corresponding to selection of the selectable microphone option. In response to detecting the input corresponding to selection of the selectable microphone option, the computer system displays one or more selectable microphone setting options (e.g., 14064) that, when selected, cause the computer system to operate a microphone according to the selected microphone setting option (e.g., outputting audio corresponding to audio recorded by one or more microphones) (e.g., enabling or disabling a microphone). Displaying one or more selectable microphone setting options in response to detecting the input corresponding to selection of the selectable microphone option provides additional controls for causing the computer system to operate a microphone according to the selected microphone setting option without cluttering the user interface with additional displayed controls until an input is received, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 6000B) displays a user interface (e.g., 6004A, 6004B, 6170A, or 6170B) of a communication application that provides a protocol to communicate with an external computer system (e.g., 6000A) (e.g., a messaging application, an audio and/or video communication application). While displaying the user interface of the communication application (e.g., during an ongoing real-time (e.g., audio and/or video) communication session; in a user interface of a messaging application that includes a plurality of messages between participants of a messaging conversation; in a user interface in which one or more participants have been selected), the computer system (e.g., 6000B) detects an input (e.g., 6008 or 6186) corresponding to a request to initiate a new shared-content session. In some embodiments, the input corresponding to the request to initiate a new shared-content session includes selection of a shared-content session option (e.g., 6006-3, 6180A-1, or 6081B-1) (e.g., an icon, affordance, and/or button) provided by (e.g., displayed in) the communication application. In response to detecting the input corresponding to the request to initiate a new shared-content session, the computer system (e.g., 6000B) initiates the new shared-content session (e.g., FIG. 6C or 6AI) (e.g., creating a new shared-content session, activating a new shared-content session, and/or generating a link for a new shared-content session). In some embodiments, in response to detecting the input corresponding to the request to initiate a new shared-content session, the computer system displays an interface for selecting one or more users (or a predefined group of users) to invite to join the new shared-content session. In some embodiments, in response to detecting the input corresponding to the request to initiate a new shared-content session, the computer system automatically (e.g., without further user input) initiates a new shared-content session associated with users that are associated with the displayed user interface of the communication application. For example, if a user is in an interface of an ongoing communication session (e.g., a message conversation or a real-time communication session) that includes the user and one or more other users, selecting the shared-content session option initiates a new shared-content session for the user and the one or more other users of the communication session.

Note that details of the processes described above with respect to method 900 (e.g., FIG. 9) are also applicable in an analogous manner to the methods described below and above. For example, methods 700, 800, 1000, 1100, 1200, 1300, 1500, 1600, 1700 and/or 1800 optionally include one or more of the characteristics of the various methods described above with reference to method 900. For example, microphone and/or camera controls are also depicted in FIGS. 14A-14AG, which are discussed in greater detail below with respect to methods 1500 and 1600. For brevity, these details are not repeated.

Figure 10:
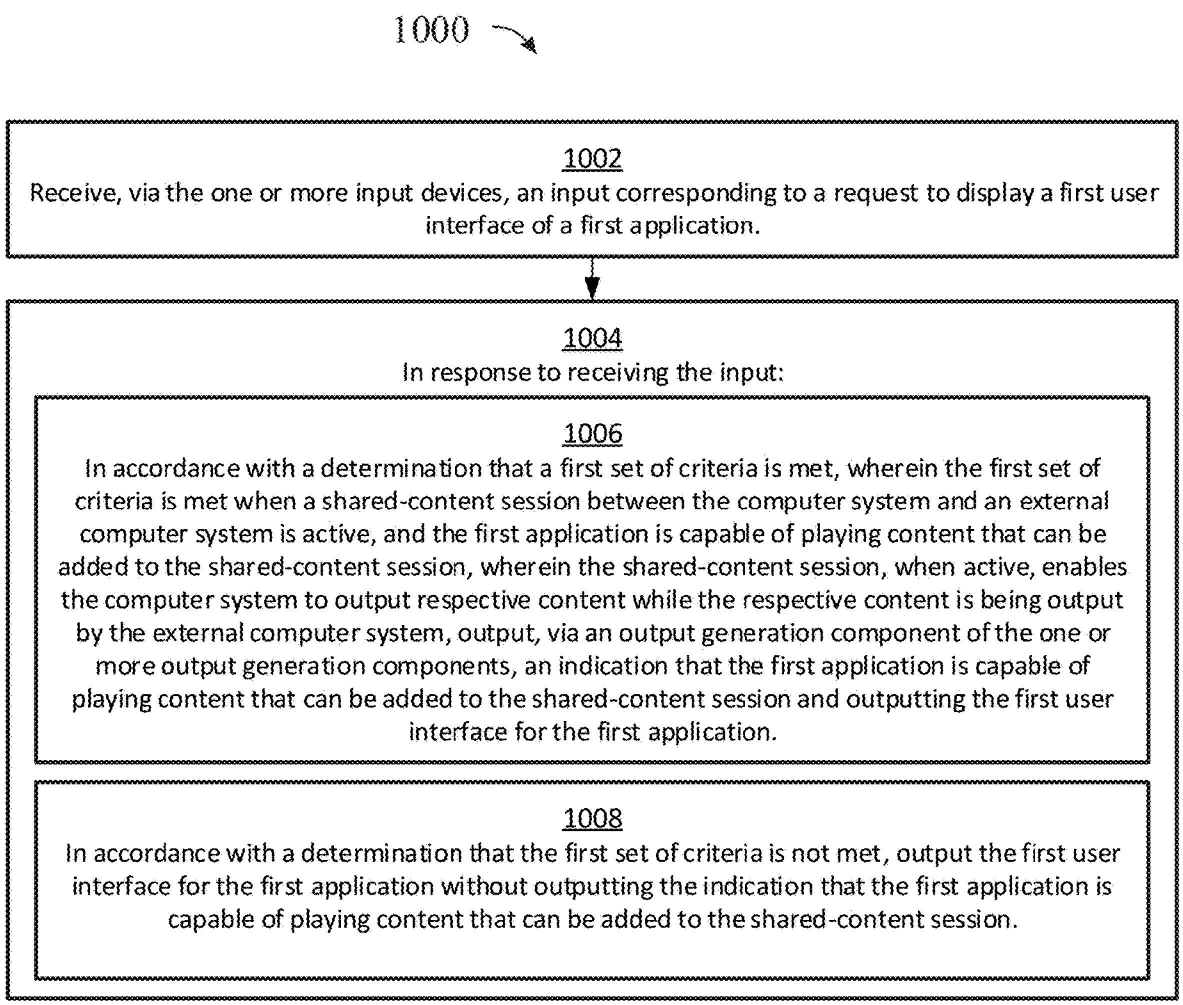
FIG. 10 depicts a flow diagram illustrating a method for managing a shared-content session, in accordance with some embodiments.

FIG. 10 is a flow diagram illustrating a method for providing user interfaces in a shared-content session using a computer system (e.g., 6000A) in accordance with some embodiments. Method 1000 is performed at a computer system (e.g., 6000A) (e.g., a smartphone, a tablet, a desktop or laptop computer) that is in communication with one or more output generation components (e.g., 6001A) (e.g., a display controller, a touch-sensitive display system, a speaker, a bone conduction audio output device, a tactile output generator, a projector, and/or a holographic display) and one or more input devices (e.g., 6001A, 6002A, and/or 6003A) (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). Some operations in method 1000 are, optionally, combined, the orders of some operations are, optionally, changed, and some operations are, optionally, omitted.

As described below, method 1000 provides an intuitive way for providing user interfaces in a shared-content session. The method reduces the cognitive burden on a user for accessing user interfaces in a shared-content session, thereby creating a more efficient human-machine interface. For battery-operated computing devices, enabling a user to access user interfaces in a shared-content session faster and more efficiently conserves power and increases the time between battery charges.

The computer system (e.g., 6000A) receives (1002), via the one or more input devices (e.g., 6001A, 6002A, and/or 6003A), an input (e.g., 6126, 6136, 6190, 6194, or 6216) (e.g., a selection of an application icon) corresponding to a request to display a first user interface (e.g., 6198, 6130, or 6140) of a first application (e.g., the application corresponding to 6128 or 6192) (e.g., a request to open/launch an application (e.g., at one or more external computer systems)).

In response to receiving (1004) the input: in accordance with a determination that a first set of criteria is met, wherein the first set of criteria is met when a shared-content session between the computer system (e.g., 6000A) and an external computer system (e.g., 6000B) (e.g., one or more external computer systems) is active, and the first application is capable of playing content that can be added to the shared-content session (e.g., FIG. 6AM) (In some embodiments, the content is capable of being added to the shared-content session because the content is separately available (e.g., via a subscription service) to the computer system and the external computer system. In some embodiments, some content that is capable of being played by the first application is not capable of being added to the shared-content session. For example, in some embodiments, content that is locally stored at the computer system is capable of being played by the first application, but is not capable of being added to the shared-content session because the locally stored content is not accessible to the external computer system.), wherein the shared-content session, when active, enables the computer system (e.g., 6000A) to output respective content (e.g., synchronized content and/or screen-share content) while the respective content is being output by the external computer system (e.g., 6000B) (e.g., a computer system that is associated with (e.g., being operated by) a remote user (e.g., a user that is in a shared-content session with the user of the computer system)), the computer system (e.g., 6000A) outputs (1006), via an output generation component of the one or more output generation components (e.g., 6001A), an indication (e.g., 6210, 6132, or 6144 (or the appearance of 6144)) (e.g., text; a graphical indication; a notification; and/or an audible alert) that the first application is capable of playing content that can be added to the shared-content session and outputs the first user interface (e.g., 6198, 6130 (as shown in FIG. 6AM), or 6140 (as shown in FIG. 6AN)) for the first application; and in accordance with a determination that the first set of criteria is not met (e.g., the shared-content session is not active and/or the first application is not capable of playing content that can be added to the shared-content session), the computer system (e.g., 6000A) outputs (1008) the first user interface (e.g., 6130 (as shown in FIG. 6Z), 6140 (as shown in FIG. 6AA), or 6198) for the first application without outputting the indication that the first application is capable of playing content that can be added to the shared-content session. Outputting the first user interface for the first application with or without an indication that the first application is capable of playing content that can be added to the shared-content session in accordance with a determination of whether or not the first set of criteria is met provides feedback to a user of the computer system of whether or not the first application is capable of playing content that can be added to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the indication that the first application is capable of playing content that can be added to the shared-content session includes a graphical object (e.g., 6132, 6210) (e.g., a notification, a banner) that is overlaid on the user interface for the first application (e.g., and that is not output when the first set of criteria is not met) (e.g., and that, optionally, is not part of the user interface for the first application). Outputting the indication that the first application is capable of playing content that can be added to the shared-content session including a graphical object that is overlaid on the user interface for the first application provides feedback to a user of the computer system that the first application is capable of playing content that can be added to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the indication that the first application is capable of playing content that can be added to the shared-content session includes an appearance of a selectable playback option (e.g., the appearance of 6144 as shown in FIG. 6AN) (e.g., an icon, an affordance, a button, and/or a play button; an option in the user interface for the application; and/or a selectable object in a notification or banner that is displayed by the computer system (e.g., a notification or banner that is associated with an application for facilitating the shared-content session; a notification or banner that is generated by an operating system of the computer system)) that, when selected, initiates playback of media associated with the playback option. Outputting the indication that the first application is capable of playing content that can be added to the shared-content session including an appearance of a selectable playback option that, when selected, initiates playback of media associated with the playback option provides feedback to a user of the computer system that the first application is capable of playing content that can be added to the shared-content session and that playing the content will add the content to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, in accordance with a determination that the first set of criteria is met, the playback option is output with a first appearance; and in accordance with a determination that the first set of criteria is not met, the playback option is output with a second appearance that is different from the first appearance. In some embodiments, in accordance with a determination that the first set of criteria is met, playback option includes text that describes that the first application is capable of playing content that can be added to the shared-content session.

In some embodiments, the indication that the first application is capable of playing content that can be added to the shared-content session is included (e.g., embedded) in the user interface for the first application (e.g., 6132). Outputting the indication that the first application is capable of playing content that can be added to the shared-content session included in the user interface for the first application provides feedback to a user of the computer system that the first application is capable of playing content that can be added to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 6000A) displays, concurrently with the indication that the first application is capable of playing content that can be added to the shared-content session, a description (e.g., 6142 and/or 6146) (e.g., text, symbol, and/or badge) of first media (e.g., one or more media items, videos, songs, movies, and/or episodes of a show) capable of being played by the first application that can be added to the shared-content session. Displaying a description of first media capable of being played by the application that can be added to the shared-content session concurrently with the indication that the first application is capable of playing content that can be added to the shared-content session provides feedback to a user of the computer system that the first media is capable of being added to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while the computer system (e.g., 6000A) (e.g., and the external computer system) is outputting (e.g., concurrently outputting) second media in the shared-content session, the computer system (e.g., 6000A) receives (e.g., detecting) an indication that a request (e.g., 6246, 6258, 6278, 6284, 6336, 6362, 6364, or 6444) to change output of the second media has occurred (e.g., a user of an external computer system has made a request to pause, play, fast forward, and/or rewind the media, or has made a request to output different (e.g., next, previous) media)); in some embodiments, the computer system receives an indication that a request to change output of the first media has occurred by receiving instruction(s) or command(s) to change output of the first media. In response to detecting that a request to change output of the second media has occurred, the computer system (e.g., 6000A) outputs an output change notification (e.g., 6248, 6250, 6260, 6262, 6270, 6272, 6280, 6282, 6286, 6288, 6290, 6292, 6344, 6368, 6370, 6450, or 6452) of the request to change output of the second media (e.g., a notification with an appearance (e.g., text) that is based on the request to change output of the second media; and/or a notification that indicates an action (e.g., fast forward, rewind) associated with the request). Outputting an output change notification of the request to change output of the second media in response to detecting that a request to change output of the second media has occurred provides feedback to a user of the computer system that the request to change output of the second media was received at the computer system. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the request (e.g., 6258, 6264, or 6284) to change output of the second media is made by a participant of the shared-content session that selected the second media to be output during the shared-content session (or a participant that added the second media to the shared-content session).

In some embodiments, the request (e.g., 6246 or 6334) to change output of the second media is made by a participant of the shared-content session other than a participant of the shared-content session that selected the second media to be output during the shared-content session (or a participant that added the second media to the shared-content session).

In some embodiments, the computer system (e.g., 6000A) receives an indication that media has been added (e.g., via input 6432) to a queue (e.g., 6442) of media (e.g., a song list, a playlist, a queue of movies, episodes, and/or songs) that are to be added to the shared-content session (e.g., added sequentially to the shared-content session). In response to receiving the indication that media has been added to a queue of media that are to be added to the shared-content session, the computer system (e.g., 6000A) outputs a media-added notification (e.g., 6440 or 6436) (e.g., displaying a notification and/or outputting an audible notification) that media has been added to a queue of media that are to be added to the shared-content session. Outputting a media-added notification that media has been added to a queue of media that are to be added to the shared-content session in response to receiving the indication that media has been added to a queue of media provides feedback to a user of the computer system that media has been added to the queue of media that are to be added to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 6000A) receives an indication that an action has been taken (e.g., via input 6246, 6258, 6278, 6284, 6336, 6362, 6364, and/or 6444) with respect to media in the shared-content session (e.g., a request to change media output (e.g., playback) and/or a request to change a media queue). In response to receiving the indication that an action has been taken with respect to media in the shared-content session, the computer system (e.g., 6000A) displays a media action notification (e.g., 6248, 6250, 6260, 6262, 6270, 6272, 6280, 6282, 6286, 6288, 6290, 6292, 6344, 6368, 6370, 6450, or 6452) (e.g., based on the action). In some embodiments, the computer system (e.g., 6000A) detects an input (e.g., 6274 or 6438) corresponding to selection of the media action notification. In response to detecting the input corresponding to selection of the media action notification: in accordance with a determination that the media action notification is a notification of a first type (e.g., 6272) (e.g., a notification of a request to change playback of the media), the computer system (e.g., 6000A) initiates a first action (e.g., display content as shown on 6000B in FIG. 6BB) (e.g., display, and optionally bring to the foreground, an application that is playing the media in the shared-content session); and in accordance with a determination that the media action notification is a notification of a second type (e.g., 6436) (e.g., a notification of a request to change (e.g., add media to or remove media from) a queue of media that are to be added to the shared-content session) that is different from the first type, the computer system (e.g., 6000A) initiates a second action (e.g., display 6434B) (e.g., display the queue of media) different from the first action. Initiating the first or second action in accordance with a determination that the media action notification is a notification of the first or second type provides additional controls for initiating the first or second action without cluttering the user interface with additional displayed controls until an input is received, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, in accordance with a determination that a user interface for an application corresponding to (e.g., an application for displaying or outputting) the media in the shared-content session is not currently displayed, displaying the user interface for the application corresponding to the media in the shared-content session in response to detecting the input corresponding to selection of the media action notification.

In some embodiments, the notification of the first type corresponds to a notification (e.g., 6272) of a request to change output (e.g., playback) of the media in the shared-content session (e.g., the action that was taken with respect to media of the shared-content session that triggered the notification was a request to change output of the media of the shared-content session), and the first action includes outputting (e.g., display content as shown on 6000B in FIG. 6BB) the media in the shared-content session.

In some embodiments, the notification of the second type corresponds to a notification (e.g., 6436) of a request to change a queue of media to be added to the shared-content session (e.g., the action that was taken with respect to media of the shared-content session that triggered the notification was a request to change a queue of media to be added to the shared-content session), and the second action includes displaying the queue (e.g., 6434B) of media to be added to the shared-content session.

In some embodiments, in response to detecting the input (e.g., 6252) corresponding to selection of the media action notification (e.g., 6248): in accordance with a determination that the computer system (e.g., 6000A) is displaying the media in the shared-content session in a full screen mode (e.g., as shown on 6000A in FIG. 6AV) (e.g., an expanded display mode and/or a mode in which content is displayed in a region that occupies an entirety of a display screen or an entirety of a display screen except for one or more pre-defined regions of the display screen that display, e.g., system controls such as a status bar or dock), the computer system (e.g., 6000A) displays a shared-content session object (e.g., 6015A or 6015B) overlaid on the media in the shared-content session (e.g., as shown on 6000A in FIG. 6AW), where the shared-content session object includes information (e.g., 6015A-1, 6015B-1, 6015A-2, and/or 6015A-3) associated with the shared-content session and/or one or more selectable shared-content session function options (e.g., 6015A-1, 6015B-1, 6015A-4, 6015B-4, 6015A-5, 6015B-5, 6015A-6, 6015B-6, 6015A-7, 6015B-7, 6015A-8, 6015B-8, 6015A-9, and/or 6015B-9) that, when selected, cause the computer system (e.g., 6000A) to perform a respective function associated with the shared-content session. Displaying the shared-content session object overlaid on the media in the shared-content session in accordance with a determination that the computer system is displaying the media in the shared-content session in a full screen mode provides additional controls for controlling one or more aspects of the shared-content session without cluttering the user interface with additional displayed controls until an input is received, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in response to detecting the input (e.g., 6266) corresponding to selection of the media action notification (e.g., 6262): in accordance with a determination that the computer system (e.g., 6000A) is not outputting the media of the shared-content session in a full screen mode (e.g., as shown on 6000B in FIG. 6AX) (e.g., the computer system is outputting the media of the shared-content session in a picture-in-picture mode and/or the computer system is not outputting the media of the shared-content session in an expanded mode), the computer system (e.g., 6000A) moves (e.g., shifts or translates) the display of the media in the shared-content session (e.g., as shown on 6000B in FIG. 6AY) (e.g., to reveal a user-interactive object that includes one or more selectable options that, when selected, cause the computer system to perform a respective function associated with the shared-content session). Moving the display of the media in the shared-content session in accordance with a determination that the computer system is not outputting the media of the shared-content session in a full screen mode provides additional controls for controlling one or more aspects of the shared-content session without cluttering the user interface with additional displayed controls until an input is received, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 6000A) detects an input (e.g., 6218 or 6224) corresponding to a request to play first content of the first application that can be added to the shared-content session (e.g., selection of a play button, selection of a content item). In response to detecting the input corresponding to the request to play the first content of the first application that can be added to the shared-content session, the computer system (e.g., 6000A) plays the first content in the first application and adds the first content to the shared-content session without sharing a screen of the computer system (e.g., 6000A) in the shared-content session (e.g., as shown in FIG. 6AQ).

In some embodiments, the computer system (e.g., 6000A) detects an input (e.g., 6224 or 6298) corresponding to a request to play second content of the first application. In response to detecting the input corresponding to the request to play the second content of the first application: in accordance with a determination that the second content of the first application can be added to the shared-content session, playing the second content in the first application and adding the second content of the first application to the shared-content session (e.g., as shown in FIG. 6AQ); and in accordance with a determination that the second content of the first application cannot be added to the shared-content session, the computer system (e.g., 6000A) plays the second content in the first application and forgoes adding the second content of the first application to the shared-content session (e.g., as shown on 6000A in FIG. 6BG).

In some embodiments, the computer system (e.g., 6000A) initiates (e.g., via input 6008 or 6026) connection to (e.g., joining and/or starting) the shared-content session, including opening (e.g., automatically, without further input) an audio channel (e.g., represented by 6015A-6 and/or 6015B-6 being emphasized) that adds audio detected by the one or more input devices (e.g., 6001A, 6002A, and/or 6003A) (e.g., a microphone) to the shared-content session between the computer system (e.g., 6000A) and the external computer system (e.g., 6000B) (e.g., the computer system opens the audio channel by default when the computer system connects to (e.g., initiates and/or joins) the shared-content session). Opening an audio channel that adds audio detected by the one or more input devices to the shared-content session when initiating connection to the shared-content session reduces the number of inputs at the computer system, by reducing inputs to open the audio channel. Reducing the number of inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 6000A) displays a user interface (e.g., 6004A, 6004B, 6170A, or 6170B) of a communication application that provides a protocol to communicate with an external computer system (e.g., 6000B) (e.g., a messaging application, a video communication application). While displaying the user interface of the communication application (e.g., during an ongoing real-time (e.g., audio and/or video) communication session; in a user interface of a messaging application that includes a plurality of messages between participants of a messaging conversation; in a user interface in which one or more participants have been selected), the computer system (e.g., 6000A) detects an input (e.g., 6008 or 6186) corresponding to a request to initiate a new shared-content session. In some embodiments, the input corresponding to the request to initiate a new shared-content session includes selection of a shared-content session option (e.g., 6006-3, 6180A-1, or 6081B-1) (e.g., an icon, affordance, and/or button) provided by (e.g., displayed in) the communication application. In response to detecting the input corresponding to the request to initiate a new shared-content session, the computer system (e.g., 6000A) initiates the new shared-content session (e.g., FIG. 6C or 6AI) (e.g., creating a new shared-content session, activating a new shared-content session, and/or generating a link for a new shared-content session). In some embodiments, in response to detecting the input corresponding to the request to initiate a new shared-content session, the computer system displays an interface for selecting one or more users (or a predefined group of users) to invite to join the new shared-content session. In some embodiments, in response to detecting the input corresponding to the request to initiate a new shared-content session, the computer system automatically (e.g., without further user input) initiates a new shared-content session associated with users that are associated with the displayed user interface of the communication application. For example, if a user is in an interface of an ongoing communication session (e.g., a message conversation or a real-time communication session) that includes the user and one or more other users, selecting the shared-content session option initiates a new shared-content session for the user and the one or more other users of the communication session.

In some embodiments, in response to receiving the input (e.g., 6190 or 6216) corresponding to a request to display the first user interface of the first application and in accordance with a determination that the first set of criteria is met, the computer system (e.g., 6000A) concurrently displays a glyph (e.g., 6132) and a representation (e.g., 6214 or 6142) of content (e.g., media) that can be played by the first application and added to the shared-content session. Concurrently displaying a glyph and a representation of content that can be played by the first application and added to the shared-content session in response to receiving the input corresponding to a request to display the first interface of the first application and in accordance with a determination that the first set of criteria is met provides feedback to a user of the computer system that the content is capable of being added to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the glyph is displayed on or near the representation of respective content (e.g., to indicate that the respective content can be added to the shared-content session). In some embodiments, the glyph is displayed for content that can be added to the shared-content session but which a user is not currently entitled to play (e.g., because the user has not rented, purchased, or subscribed to a service that provides the content).

In some embodiments, while outputting the first user interface of the first application, the computer system (e.g., 6000A) detects an input (e.g., 6204) corresponding to a request to play third content. In response to detecting the input corresponding to the request to play the third content: in accordance with a determination that the third content is not available to be added to the shared-content session (and, optionally, in accordance with a determination that the computer system is connected to a shared-content session), the computer system (e.g., 6000A) outputs (e.g., displaying) a notification (e.g., 6206) (e.g., an error notification, a banner, a pop-up notification, an audible notification, and/or a tactile notification) indicating that the third content is not available to be added to the shared-content session (e.g., and, optionally, outputting the respective content). Outputting a notification indicating that the third content is not available to be added to the shared-content session in accordance with a determination that the third content is not available to be added to the shared-content session provides feedback to a user of the computer system that the third content is not available to be added to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, in response to detecting the input corresponding to the request to play the third content and in accordance with a determination that the computer system is not connected to a shared-content session, outputting (e.g., displaying, playing) the third content without outputting the notification indicating that the third content is not available to be added to the shared-content session.

In some embodiments, in accordance with a determination that the computer system (e.g., 6000A) (or a user of the computer system) and one or more external computer systems (e.g., 6000B) associated with the shared-content session (or users associated with the shared-content session (e.g., participants of the shared-content system)) are entitled to (e.g., can access, have purchased, have rented, and/or have access to a subscription that provides access to) fourth content (e.g., in the first application), the computer system (e.g., 6000A) displays (e.g., in the first user interface of the first application) a recommended content indicator (e.g., 6132) (e.g., that is visually associated with a representation of the fourth content) that indicates that the computer system (e.g., 6000A) and one or more external computer systems (e.g., 6000B) associated with the shared-content session are entitled to the fourth content.

In some embodiments, the computer system (e.g., 6000A) detects a request (e.g., 6218) to output fifth content (e.g., in the first application). In response to detecting the request to output (e.g., display, play) the fifth content: in accordance with a determination that the computer system (e.g., 6000A) is connected to an active shared-content session, the computer system (e.g., 6000A) outputs a set of selectable play options (e.g., 6220) (e.g., a prompt) that includes a first selectable play option (e.g., 6220-2) that, when selected, plays the fifth content on the computer system (e.g., 6000A) without adding the fifth content to the shared-content session and a second selectable play option (e.g., 6220-1) that, when selected, plays the fifth content on the computer system (e.g., 6000A) and adds the fifth content to the shared-content session. Outputting a set of selectable play options that includes the first selectable play option and the second selectable play option provides additional controls for playing content on the computer system with or without adding the content to the shared-content session without cluttering the user interface with additional displayed controls until an input is received, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, in response to the request to output the fifth content and in accordance with a determination that the computer system is not connected to an active shared-content session, the computer system forgoes output of the set of selectable play options.

In some embodiments, the computer system (e.g., 6000A) detects a first option selection input (e.g., 6222 or 6224) corresponding to selection of one of the first selectable play option (e.g., 6220-2) and the second selectable play option (e.g., 6220-1). In response to detecting the first option selection input, the computer system (e.g., 6000A) plays the fifth content (e.g., either with or without adding the fifth content to the shared-content session based on whether the first selectable play option or the second selectable play option were selected). After playing the fifth content, the computer system (e.g., 6000A) detects a request to output sixth content (e.g., after detecting the first option selection input). In response to detecting the request to output (e.g., display, play) the sixth content: in accordance with a determination that a first set of play criteria is satisfied, where the first set of play criteria includes a criterion that is satisfied when the first option selection input (e.g., 6222 or 6224) includes selection of the first selectable play option (e.g., 6220-2), the computer system plays the sixth content on the computer system (e.g., 6000A) without adding the sixth content to the shared-content session; and in accordance with a determination that a second set of play criteria is satisfied, where the second set of play criteria includes a criterion that is satisfied when the first option selection input includes selection of the second selectable play option (e.g., 6220-1), the computer system plays the sixth content on the computer system (e.g., 6000A) and adds the sixth content to the shared-content session. Playing the sixth content on the computer system with or without adding the sixth content to the shared-content session in accordance with a determination of whether the first or second set of play criteria is satisfied reduces the number of inputs at the computer system by eliminating the need to solicit additional input from the user about whether or not to add the sixth content to the shared-content session. Reducing the number of inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system remembers or stores the play option selected by the first option selection input and applies it to subsequent requests to output content (e.g., the response to the request to output the sixth content is based on the play option selected previously for the fifth content).

In some embodiments, the first set of play criteria includes a criterion that is satisfied if the request to output the sixth content corresponds to a request to output the sixth content in the first application (e.g., represented by 6128), and the second set of play criteria includes a criterion that is satisfied if the request to output sixth content corresponds to a request to output the sixth content in the first application (e.g., represented by 6128). In some embodiments, in accordance with a determination that the request to output sixth content corresponds to a request to output the sixth content in a second application that is different from the first application, the computer system outputs (e.g., displays) a prompt (e.g., a set of selectable play options that includes a first selectable play option to play the sixth content on the computer system without adding the sixth content to the shared-content session and a second selectable play option to play the sixth content on the computer system and add the sixth content to the shared-content session). In some embodiments, the computer system remembers or stores a play option selected in a particular application and applies it to subsequent requests to output content in the same application, but not for requests to play content in other applications (e.g., the response to the request to output the sixth content is based on the play option selected previously for the fifth content if the sixth content is requested to be played in the same application as the fifth content).

In some embodiments, the first set of play criteria includes a criterion that is satisfied if the request to output the sixth content occurs in the same shared-content session (e.g., a shared-content session that has not been concurrently disconnected for all participants (e.g., computer systems) of the shared-content session; a shared-content session that has maintained at least one connected participant since being initiated; and/or a shared-content session that has not been ended for all participants) as the request to output the fifth content, and the second set of play criteria includes a criterion that is satisfied if the request to output the sixth content occurs in the same shared-content session as the request to output the fifth content. In some embodiments, a shared-content session persists until all participants of the shared-content session are concurrently disconnected from the shared-content session (e.g., the shared-content session terminates when there are no participants). In some embodiments, a participant of the shared-content session can leave and rejoin the same shared-content session (e.g., as long as the shared-content session has maintained at least one participant in the session). In some embodiments, a shared-content session is considered a new session when the shared-content session is initiated for a group of potential participants and a previously-initiated shared-content session is not ongoing for the same group of potential participants. In some embodiments, in accordance with a determination that the request to output the sixth content does not occur in the same shared-content session as the request to output the fifth content, the computer system outputs (e.g., displays) a prompt (e.g., a set of selectable play options that includes a first selectable play option to play the sixth content on the computer system without adding the sixth content to the shared-content session and a second selectable play option to play the sixth content on the computer system and add the sixth content to the shared-content session). In some embodiments, the computer system remembers or stores a play option selected in a particular shared-content session and applies it to subsequent requests to output content in the same shared-content session, but not for requests to play content in other shared-content session (e.g., the response to the request to output the sixth content is based on the play option selected previously for the fifth content if the sixth content is requested to be played in the same shared-content session as the fifth content).

In some embodiments, the request to output the sixth content corresponds to a request to output the sixth content in a second application (e.g., a single application; a plurality of applications; or all applications) that is different from the first application (e.g., the option selected for playing the fifth content in the first application is applied to requests to play content in other applications (e.g., one or more applications; all applications); the first set of play criteria and the second set of play criteria do not depend on the application in which the sixth content is requested to be played). In some embodiments, the computer system remembers or stores a play option selected in a particular application and applies it to subsequent requests to output content for all applications (e.g., the response to the request to output the sixth content is based on the play option selected previously for the fifth content regardless of the application associated with the sixth content).

In some embodiments, the request to output the sixth content occurs in a different shared-content session from the request to output the fifth content (e.g., the option selected for playing the fifth content in the first application is applied to requests to play content in other shared-content sessions; the first set of play criteria and the second set of play criteria do not depend on the shared-content session in which the sixth content is requested to be add or played). In some embodiments, the computer system remembers or stores a play option selected in a particular shared-content session and applies it to subsequent requests to output content for all shared-content sessions (e.g., the response to the request to output the sixth content is based on the play option selected previously for the fifth content regardless of the shared-content session in which the request to output the sixth content occurred). In some embodiments, after detecting the first option selection input, the computer system detects a request to launch a third application (e.g., the first application, an application different from the first application); and in response to detecting the request to launch the third application, launching the third application and displaying (e.g., in the third application) a play setting indicator (e.g., a notification) that indicates that a play option selected by the first option selection input will be applied in response to a request to output content in the third application. Launching the third application and displaying the play setting indicator provides feedback to a user of the computer system that a play option selected by the first option selection input will be applied in response to a request to output content in the third application. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 6000A) detects a second option selection input corresponding to selection of an option of the set of selectable play options (e.g., 6220) (e.g., the first selectable play option, a "play for me" option, and/or a "cancel" option). After detecting the second option selection input, the computer system (e.g., 6000A) detects a request to output seventh content (e.g., after detecting the second option selection input). In response to detecting the request to output (e.g., display, play) the seventh content: in accordance with a determination that the second option selection input corresponds to selection of an option (e.g., 6220-2) not to add the fifth content to the shared-content session, the computer system (e.g., 6000A) outputs the set of selectable play options (e.g., 6220). In some embodiments, in response to detecting the request to output the seventh content, and in accordance with a determination that the second option selection input corresponds to an option to add the fifth content to the shared-content session, the computer system forgoes outputting the set of selectable play options (e.g., the computer system adds the seventh content to the shared-content session without displaying the set of selectable play options).

In some embodiments, the computer system (e.g., 6000A) detects a third option selection input corresponding to selection of an option of the set of selectable play options (e.g., 6220). After detecting the third option selection input, the computer system (e.g., 6000A) detects a request to output eighth content (e.g., after detecting the third option selection input). In response to detecting the request to output (e.g., display, play) the eighth content: in accordance with a determination that the third option selection input corresponds to an option (e.g., 6220-1) to add the fifth content to the shared-content session (e.g., the second selectable play option), the computer system (e.g., 6000A) forgoes outputting the set of selectable play options (e.g., 6220). Forgoing outputting the set of selectable play options in accordance with a determination that the third option selection input corresponds to an option to add the fifth content to the shared-content session reduces the number of inputs at the computer system by eliminating the need to solicit input from the user for selecting the set of selectable play options. Reducing the number of inputs at the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the device adds the eighth content to the shared-content session without outputting the set of selectable play options.

In some embodiments, outputting an indication that the first application is capable of playing content that can be added to the shared-content session includes outputting an indication (e.g., a notification) of whether the content will be added to the shared-content session (e.g., as discussed above with respect to FIG. 6AO). Outputting an indication of whether the content will be added to the shared-content session provides feedback to a user of the computer system of whether the content will be added to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while the computer system (e.g., 6000A) (e.g., and the external computer system) is outputting (e.g., concurrently outputting) third media that is in the shared-content session, the computer system (e.g., 6000A) receives (e.g., detecting) an indication that a request (e.g., 6284) to move to a different position (e.g., elapsed playback time) of the third media has occurred (e.g., a user of the computer system or an external computer system has made a request to move to a different position in the third media (e.g., by scrubbing, selecting, and/or moving an interactive object (e.g., a scrubber bar))). In response to detecting that a request to move to a different position of the third media has occurred: in accordance with a determination that the request to move to a different position of the third media occurred at the computer system (e.g., 6000A), the computer system displays a first media-change notification (e.g., 6286) (e.g., a notification that the position of the third media has moved; in some embodiments, the first media-change notification is output upon completion (e.g., liftoff) of the request to move to the different position of the third media.) (e.g., while a different media-change notification (e.g., a notification that a user of the computer system changed a playback state of the third media (e.g., the third media has been paused, resumed, and/or moved)) is output at the external computer system); and in accordance with a determination that the request to move to a different position of the third media occurred at an external computer system (e.g., 6000B), the computer system (e.g., 6000A) displays a second media-change notification (e.g., 6288) that is different from the first media-change notification (e.g., a notification that indicates that the third media has been paused, resumed, and/or moved) (e.g., while a different media-change notification (e.g., a notification that the position of the third media has moved) is output at the external computer system). Displaying the first media-change notification or the second media-change notification in accordance with a determination of whether the request to move to a different position of the third media occurred at the computer system or at an external computer system provides feedback to a user of the computer system about whether the request to move to a different position of the third media occurred at the computer system or at an external computer system.

Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while the computer system (e.g., 6000B) (e.g., and the external computer system) is outputting (e.g., concurrently outputting) fourth media that is in the shared-content session, the computer system (e.g., 6000B) receives (e.g., detecting) an indication that a request (e.g., 6284) to move to a different position of the fourth media has occurred (e.g., a user of the computer system or an external computer system has made a request to move to a different position in the fourth media (e.g., by scrubbing, selecting, and/or moving an interactive object (e.g., a scrubber bar)). In response to receiving the indication (e.g., detecting) that a request to move to a different position of the fourth media has occurred, the computer system (e.g., 6000B) pauses output of the fourth media (e.g., output is paused at 6000B in FIG. 6BD). In some embodiments, in response to an input at the computer system corresponding to a request to move to a different position of the fourth media, output of the fourth media is paused at one or more (e.g., all other) computer systems (e.g., external computer systems) connected to the shared-content session). In some embodiments, in response to an input at an external computer system corresponding to a request to move to a different position of the fourth media, output of the fourth media is paused at the computer system (and, optionally, other external computer systems connected to the shared-content session).

In some embodiments, while the computer system (e.g., 6000A) is connected to the shared-content session, the computer system (e.g., 6000A) detects an input (e.g., 6350) corresponding to a request to disconnect the computer system (e.g., 6000A) from the shared-content session. In response to detecting the input corresponding to a request to disconnect the computer system (e.g., 6000A) from the shared-content session, the computer system (e.g., 6000A) displays a set of disconnect options (e.g., 6356, 6358, and 6360) including a first selectable disconnect option (e.g., 6358) that, when selected, causes the computer system (e.g., 6000A) to disconnect from the shared-content session without ending the shared-content session and a second selectable disconnect option (e.g., 6356) that, when selected, ends the shared-content session (e.g., causes all computer systems to disconnect from the shared-content session). Displaying a set of disconnect options including a first selectable disconnect option and a second selectable disconnect option in response to detecting the input corresponding to a request to disconnect the computer system from the shared-content session provides additional controls for disconnecting from the shared-content session without cluttering the user interface with additional displayed controls until an input is received, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while ninth content is in the shared-content session, the computer system (e.g., 6000A) detects an input (e.g., 6326) corresponding to a request to add tenth content (e.g., new content, content different from the ninth content) to the shared-content session (e.g., to share the tenth content via the shared-content session). In response to detecting the input (e.g., 6326) corresponding to a request to add the tenth content to the shared-content session, the computer system (e.g., 6000A) outputs a set of add-content options (e.g., 6334 and 6336) including a first selectable add-content option (e.g., 6334) that, when selected, causes the tenth content to replace the ninth content in the shared-content session and a second selectable add-content option (e.g., 6336) that, when selected, cancels the request to add the tenth content to the shared-content session. Outputting a set of add-content options including the first selectable add-content option and the second selectable add-content option provides additional controls for adding content to the shared-content session without cluttering the user interface with additional displayed controls until an input is received, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the set of add-content options includes a third selectable add-content option that, when selected, causes the tenth content to be added to a media queue. In some embodiments, the computer system outputs the set of add-content options when either the computer system or an external computer system (e.g., regardless of what computer system or participant) initiated sharing of the ninth content (e.g., added the ninth content to the shared-content session).

In some embodiments, while the computer system (e.g., 6000A) is connected to the shared-content session, the computer system (e.g., 6000A) detects an input (e.g., 6190 or 6194) corresponding to a request to open a fourth application. In response to detecting the input corresponding to a request to open the fourth application (and, optionally, in accordance with a determination that a shared-content session is active), the computer system (e.g., 6000A) outputs (e.g., displaying, initiating output of) a shared-content session indicator (e.g., 6200, 6210, or 6132) (e.g., a notification, a banner, and/or a pop-up window) that indicates that the shared-content session is active (e.g., that was not being output prior to detecting the input corresponding to the request to open the application). Outputting a shared-content session indicator in response to detecting the input corresponding to a request to open the fourth application provides feedback to a user of the computer system that the shared-content session is active. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system outputs the indication whether or not the application is capable of and/or configured to add content to the shared-content session. In some embodiments, the computer system outputs the indication whether or not the computer system receives (or has received) a request to add content to the shared-content session.

In some embodiments, the shared-content session indicator includes (e.g., is) a notification (e.g., 6200) that content accessible via the fourth application (e.g., content provided by the fourth application) is not available to be added to the shared-content session (or is not available to be added to the shared-content as synchronized content even though it could be added as part of a screen sharing operation) (e.g., a message stating that content is not available to be added to the shared-content session). Outputting the shared-content session indicator including a notification that content accessible via the fourth application is not available to be added to the shared-content session provides feedback to a user of the computer system that the content is not available to be added to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the shared-content session indicator includes a notification that content output by the fourth application is not available to be added to the shared-content session in accordance with a determination that content output by the fourth application is not available to be added to the shared-content session (e.g., sharable content is not available).

In some embodiments, the shared-content session indicator includes (e.g., is) a notification (e.g., 6210) that content accessible via the fourth application (e.g., content provided by the fourth application) is available to be added to the shared-content session (e.g., a message stating that content is available to be added to the shared-content session). Outputting the shared-content session indicator including a notification that content accessible via the fourth application is available to be added to the shared-content session provides feedback to a user of the computer system that the content is available to be added to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the shared-content session indicator includes the notification when some of the content accessible via the fourth application is available to be added to the shared-content session and some of the content accessible via the fourth application is not available to be added to the shared-content session. In some embodiments, the notification indicates that content is available to be added to the shared-content session, but that the content is not currently being shared with the shared-content session (e.g., sharing is currently disabled). In some embodiments, the shared-content session indicator includes a notification that content output by the fourth application is available to be added to the shared-content session in accordance with a determination that content output by the fourth application is available to be added to the shared-content session (e.g., sharable content is available).

In some embodiments, the shared-content session indicator includes (e.g., is) a notification (e.g., 6210 or 6132) that content accessible via the fourth application (e.g., content provided by the fourth application) will be added to the shared-content session if the content is played in the fourth application while the shared-content session is active (e.g., a message stating that content will be added to the shared-content session). Outputting the shared-content session indicator including a notification that content accessible via the fourth application will be added to the shared-content session if the content is played in the fourth application while the shared-content session is active provides feedback to a user of the computer system that the content will be added to the shared-content session if the content is played in the fourth application while the shared-content session is active. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the shared-content session indicator includes a notification that content output by the fourth application will be added to the shared-content session in accordance with a determination that content output by the fourth application will be added to the shared-content session (e.g., sharable content is available and sharing is enabled).

In some embodiments, the computer system (e.g., 6000B) receives a request (e.g., 6682 or 6696) to output eleventh content at the computer system (e.g., while the computer system is not outputting content that is currently in the shared-content session but while there is an ongoing shared-content session that the computer system is participating in); and in response to receiving the request to output the eleventh content: in accordance with a determination that the computer system is participating in a shared-content session in which the eleventh content is currently in the shared-content session (e.g., the eleventh content is synchronized content (e.g., 6150A in FIG. 6EN) that was playing when a user stopped watching/listening to the synchronized content or is content that the participants of the shared-content session have started watching/listening to), the computer system outputs (e.g., plays back or resumes playback of) the eleventh content at a location (e.g., time location) in the eleventh content (e.g., the synchronized location) at which the external computer system is concurrently outputting the eleventh content (e.g., displaying media PiP 6150B in FIG. 6EO); and in accordance with a determination that the computer system is participating in a shared-content session that includes twelfth content that is different from the eleventh content (e.g., as shown in FIG. 6EF), the computer system initiates a process to replace the twelfth content with the eleventh content (e.g., displaying prompt 6686 in FIG. 6EG) (and, optionally, for adding the eleventh content to the shared-content session). Selectively outputting the eleventh content at a location corresponding to the output of the eleventh content at an external computer system and initiating a process to replace twelfth content with the eleventh content based on whether the eleventh content or the twelfth content is currently in the shared-content session provides a contextually-relevant response to the request to output the eleventh content and provides the user with an efficient method for a user to choose whether or not to add the eleventh content to the shared-content session when it is not already in the shared-content session, which provides improved visual feedback to the user and performs an operation when a set of conditions has been met without requiring further user input.

In some embodiments, in response to receiving the request to output the eleventh content and in accordance with a determination that the computer system is not participating in a shared-content session, the computer system outputs (e.g., plays back or resumes playback of) the eleventh content at a different location (e.g., time location) in the eleventh content (e.g., the synchronized location) (e.g., a beginning of the content or a location at which a user of the computer system most recently stopped watching the content). In some embodiments, the process for outputting the eleventh content includes displaying one or more selectable options (e.g., 6686-1, 6686-2, and/or 6686-3) that, when selected, causes the computer system to output the eleventh content without adding the eleventh content to the shared-content session or to output the eleventh content and add the eleventh content to the shared-content session.

In some embodiments, while content in the shared-content session is not being output by the computer system (e.g., 6000A) (e.g., content is being shared in the shared-content system but the user of computer system is not watching the shared content (e.g., has closed the content) and is, optionally, still participating in some parts of the shared-content session such as a voice and/or video chat associated with the shared-content session): the computer system detects an input (e.g., 6306) corresponding to a request to display information and/or controls of the shared-content session (e.g., 6015A); and in response to detecting the input corresponding to a request to display information and/or controls of the shared-content session, concurrently displays: a second shared-content session object (e.g., 6015A) that includes information associated with the shared-content session and/or one or more selectable options that, when selected, cause the computer system to perform a respective function associated with the shared-content session; and a notification (e.g., 6312) (e.g., in the shared-content session object or below the shared content session object; a persistent notification) that includes an indication of the content in the shared-content session that is not being output by the computer system. Concurrently displaying the shared-content session object and the notification that includes an indication of the content in the shared-content session that is not being output by the computer system in response to detecting the input corresponding to a request to display information and/or controls of the shared-content session automatically and efficiently informs or reminds the user of content in the shared-content session that is available to output, which provides improved visual feedback to the user.

In some embodiments, in response to detecting input (e.g., 6310) corresponding to selection of the notification (e.g., 6312), the computer system (e.g., 6000A) outputs the content that is in the shared-content session but was not being output by the computer system (e.g., 6150A in FIG. 6BJ), or displays a user interface (e.g., a pop-up menu) (e.g., 6220 or 6686) that includes a play option (e.g., 6220-1, 6620-2, 6686-1, or 6686-2) that, when selected, causes the computer system to output the content. In some embodiments, in accordance with a determination that the second shared-content session object (e.g., 6015A) is displayed and that there is content in the shared-content session that is not being output by the computer system, the computer system displays (e.g., in the second shared-content session object) a notification (e.g., 6312) that there is content in the shared-content session that is not being output by the computer system, where the notification includes an indication of what content is in the shared-content session. In some embodiments, in response to a request (e.g., 6306) to display the second shared-content session object and in accordance with a determination that there is content in the shared-content session that is not being output by the computer system, the computer system displays (e.g., in the second shared-content session object) the notification (e.g., 6312).

Note that details of the processes described above with respect to method 1000 (e.g., FIG. 10) are also applicable in an analogous manner to the methods described below and above. For example, methods 700, 800, 900, 1100, 1200, 1300, 1500, 1600, 1700 and/or 1800 optionally include one or more of the characteristics of the various methods described above with reference to method 1000. For brevity, these details are not repeated.

Figure 11:
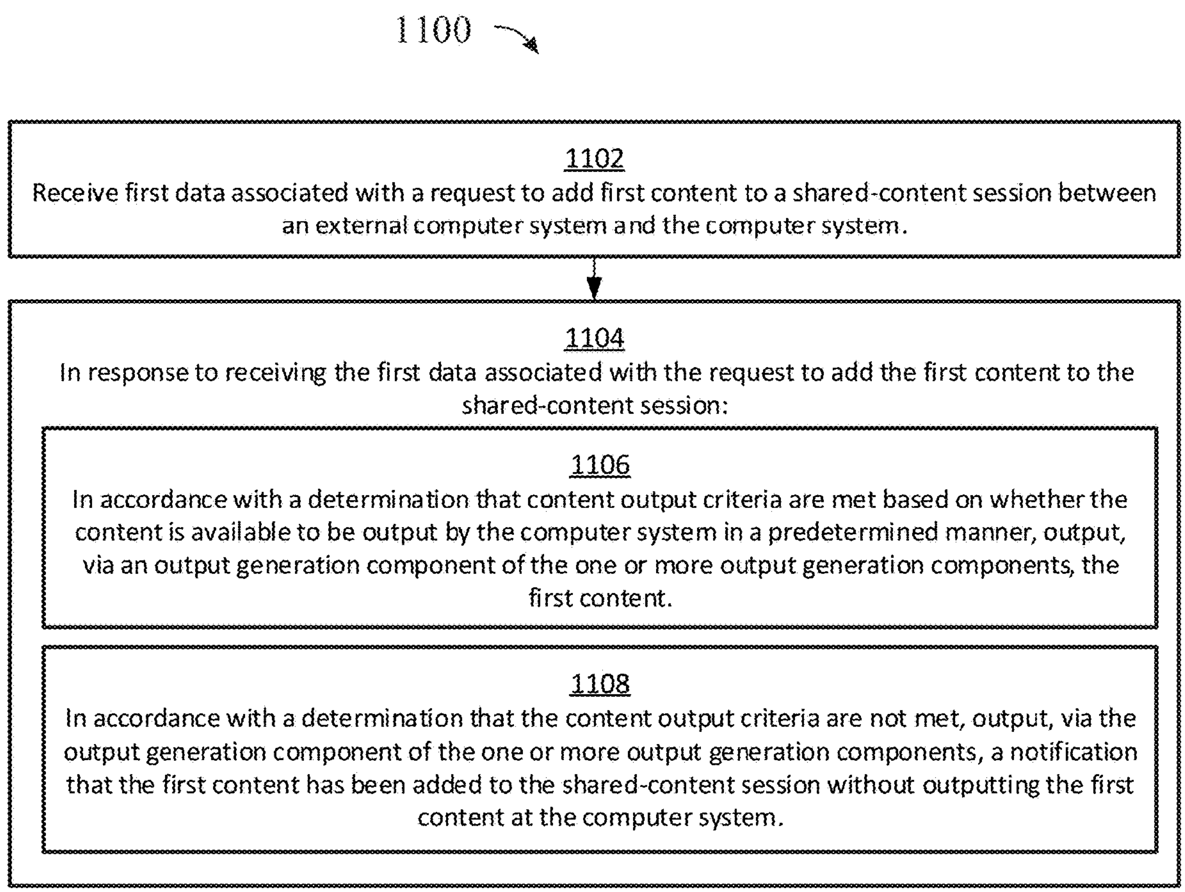
FIG. 11 depicts a flow diagram illustrating a method for managing a shared-content session, in accordance with some embodiments.

FIG. 11 is a flow diagram illustrating a method for outputting content in a shared-content session using a computer system (e.g., 6000A and/or 6000B) in accordance with some embodiments. Method 1100 is performed at a computer system (e.g., a smartphone, a tablet, a desktop or laptop computer) that is in communication with one or more output generation components (e.g., 6001A and/or 6001B) (e.g., a display controller, a touch-sensitive display system, a speaker, a bone conduction audio output device, a tactile output generator, a projector, and/or a holographic display) and one or more input devices (e.g., 6001A, 6002A, 6003A, 6001B, 6002B, and/or 6003B) (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). Some operations in method 1100 are, optionally, combined, the orders of some operations are, optionally, changed, and some operations are, optionally, omitted.

As described below, method 1100 provides an intuitive way for outputting content in a shared-content session. The method reduces the cognitive burden on a user for outputting content in a shared-content session, thereby creating a more efficient human-machine interface. For battery-operated computing devices, enabling a user to output content in a shared-content session faster and more efficiently conserves power and increases the time between battery charges.

The computer system (e.g., 6000B) receives (1102) (in some embodiments, while displaying, via an output generation component of the one or more output generation components, a first user interface (e.g., a system user interface (e.g., a "home" screen); a user interface for a first application operating at the computer system (e.g., a web browser application; a music application))) (in some embodiments, while a shared-content session between the computer system and an external computer system is active) first data associated with a request (e.g., 6224, 6376 or 6398) (e.g., initiated by the external computer system) to add first content (e.g., "First Episode") (e.g., synchronized content and/or screen-share content) to a shared-content session between an external computer system (e.g., 6000A) and the computer system (e.g., 6000B).

In response to receiving (1104) the first data associated with the request to add the first content to the shared-content session: in accordance with a determination that content output criteria are met based on whether the content is available to be output by the computer system (e.g., 6000B) in a predetermined manner (e.g., a set of one or more criteria that must be met in order to output the first content at the computer system (e.g., an application is available (e.g., downloaded/installed) at the computer system to output the first content; a user account associated with the computer system has a valid content subscription to output the first content; an application for outputting the first content is capable of being output in a shared-content session (e.g., the application supports a PiP display format, or a PiP display format is enabled for the application); and/or the first content is supported by a specific type of content sharing (e.g., media sharing; screen sharing) provided by the shared-content session), the computer system (e.g., 6000B) outputs (1106), via an output generation component of the one or more output generation components (e.g., 6001B), the first content (e.g., as shown on 6000B in FIG. 6AQ) (e.g., while the first content is being output (e.g., played, displayed) at the external computer system); and in accordance with a determination that the content output criteria are not met, the computer system (e.g., 6000B) outputs (1108), via the output generation component of the one or more output generation components (e.g., 6001B), a notification (e.g., 6380 or 6400) that the first content has been added to the shared-content session without outputting the first content at the computer system (e.g., 6000B) (e.g., while the first content is being output (e.g., played, displayed) at the external computer system). Displaying a notification that the first content has been added to the shared-content session without outputting the first content at the computer system in accordance with a determination that the content output criteria are not met provides feedback to a user of the computer system about the first content has been added to the shared-content session when the content output criteria are not met. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 6000B) outputting the first content includes the computer system (e.g., 6000B) outputting the first content in a window (e.g., 6150B) that is overlaid on a portion of a user interface (e.g., 6170B) that is concurrently output by an output generation component of the one or more output generation components (e.g., 6001B). In some embodiments, the first content is output in the foreground (e.g., in front of all other currently output content (e.g., other windows or user interfaces)).

In some embodiments, the content output criteria are based on whether (e.g., are met if the sufficient conditions are met including a necessary condition that specifies that) an application that is able to output the content (e.g., an application associated with or required to output the first content) is available on (e.g., currently stored on, currently downloaded to) the computer system (e.g., FIGS. 6BX-6CA). In some embodiments, the content output criteria are not met if the application is not available on the computer system. In some embodiments, the content output criteria are not met if the application is available on the computer system, but the user is not signed-in to the application and/or the user's subscription is not current or valid.

In some embodiments, the content output criteria are based on whether (e.g., are met if the sufficient conditions are met including a necessary condition that specifies that) the computer system (e.g., 6000B) can access (e.g., is logged into) a subscription service that provides access to (e.g., required to output, allows access to) the first content (e.g., FIGS. 6CB-6CH). In some embodiments, a subscription is required to output the first content and the content output criteria are not met if the computer system does not have access to the subscription service (e.g., the user is not signed-in to the application and/or the user's subscription is not current or valid).

In some embodiments, the content output criteria are based on whether (e.g., are met if the sufficient conditions are met including a necessary condition that specifies that) an application that is used to output the first content is configured to output the first content in the predetermined manner (e.g., in a picture-in-picture window). In some embodiments, the content output criteria are not met if the user is not signed-in to the application and/or the user's subscription is not current or valid.

In some embodiments, the content output criteria are based on a type of content sharing (e.g., a manner in which content is to be shared, screen sharing, audio sharing, video sharing, music sharing, and/or synchronized content sharing). In some embodiments, the content output criteria are met if the first content is requested to be added to the shared-content session according to a first type of content sharing (e.g., screen sharing). In some embodiments, the content output criteria are not met if the first content is requested to be added to the shared-content session according to a second type of content sharing (e.g., synchronized content sharing) that is different from the first type of content sharing.

In some embodiments, outputting the first content includes outputting the first content at a first quality (e.g., resolution, update rate, and/or data rate) when (e.g., in accordance with a determination that) the first content is added to the shared-content session according to a first type of content sharing (e.g., screen sharing), and outputting the first content at a second quality (e.g., lower quality than the first quality, higher quality than the first quality) that is different from the first quality when (e.g., in accordance with a determination that) the first content is added to the shared-content session according to a second type of content sharing (e.g., media (e.g., video, audio, and/or music) sharing, and/or synchronized content sharing). Outputting the first content at a first or second quality when the first content is added to the shared-content session according to a first or second type of content sharing conserves computational resources by conserving bandwidth and decreasing the amount of data that is processed for display and/or transmission at a higher quality. Conserving computational resources enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 6000B) displays information (e.g., 6386 or 6406) about the content output criteria (e.g., information that indicates to a user what is required to meet the content output criteria, such as, e.g., an application that can output the content or a subscription that allows access to the content). Displaying information about the content output criteria provides feedback to a user of the computer system about the criteria for outputting the first content when it is added to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system displays information about the content output criteria in accordance with a determination that the content output criteria is not met and/or in response to receiving the first data associated with the request to add the first content to the shared-content session.

In some embodiments, the information about the content output criteria includes a selectable download option that, when selected, the computer system (e.g., 6000B) initiates a process (e.g., FIGS. 6BY-6CA) to download an application that is configured to (e.g., that is required to) output the first content. Displaying the information about the content output criteria including a selectable download option provides feedback to a user of the computer system about the criteria for outputting the first content when it is added to the shared-content session, provides additional control options for initiating a process to download an application that is configured to output the first content without cluttering the user interface with additional displayed controls until an input is received, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the information about the content output criteria includes a selectable subscription option that, when selected, the computer system (e.g., 6000B) initiates a process (e.g., FIGS. 6CC-6CG) to obtain (e.g., start, pay for) a subscription (e.g., to an application, program, and/or service) that provides access to the first content. Displaying the information about the content output criteria including a selectable subscription option provides feedback to a user of the computer system about the criteria for outputting the first content when it is added to the shared-content session, provides additional control options for initiating a process to obtain a subscription that provides access to the first content without cluttering the user interface with additional displayed controls until an input is received, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the subscription option is provided (e.g., displayed) in an application associated with the first content (e.g., an application associated with the subscription that provides access to the first content).

In some embodiments, the computer system (e.g., 6000B) detects an input (e.g., 6384 or 6404) (e.g., a tap gesture on the notification, and/or a press of a button or other activation command while the notification is in focus) corresponding to selection of the notification (e.g., 6380 or 6400) that the first content has been added to the shared-content session. In response to the computer system (e.g., 6000B) detecting the input corresponding to selection of the notification that the first content has been added to the shared-content session, the computer system (e.g., 6000B) displays a user interface (e.g., 6392 and/or 6412) (e.g., an application store interface) that provides a capability to obtain (e.g., download) an application that is configured to output the first content. Displaying a user interface that provides a capability to obtain an application that is configured to output the first content in response to detecting the input corresponding to selection of the notification that the first content has been added to the shared-content session provides additional control options for obtaining an application that is configured to output the first content without cluttering the user interface with additional displayed controls until the input corresponding to selection of the notification that the first content has been added to the shared-content session is detected, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 6000B) displaying the user interface that provides a capability to obtain an application for outputting the first content includes the computer system (e.g., 6000B) displaying a selectable download option (e.g., 6388 and/or 6394) that, when selected, the computer system (e.g., 6000B) initiates a process for downloading the application that is configured to output the first content. Displaying the user interface that provides a capability to obtain an application for outputting the first content including a selectable download option that, when selected, initiates a process for downloading the application that is configured to output the first content information about the content output criteria including a selectable download option provides additional control options for initiating a process for downloading the application that is configured to output the first content without cluttering the user interface with additional displayed controls until an input is received and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while the shared-content session is active and after ceasing output (e.g., by the output generation component of the one or more output generation components) of the first content (e.g., via input 6114, 6298, 6350, 6362, 6364, or 6372) (e.g., after the computer system stops outputting the content or leaves the shared-content session), the computer system (e.g., 6000B) detects a request (e.g., 6310) to rejoin the shared-content session (e.g., re-initiate output of the first content; re-join the shared-content session and output the first content). In response to the computer system (e.g., 6000B) detecting the request (e.g., 6026) to rejoin the shared-content session, the computer system (e.g., 6000B) outputs the first content. In some embodiments, a user is required to manually re-initiate output of the first content or re-join the shared-content session.

In some embodiments, the request to output the first content includes selection of an output content option (e.g., 6015A-1 or 6015B-1) (e.g., an icon, button, and/or affordance) included in a shared-content session object (e.g., 6015A or 6015B) that includes information (e.g., 6015A-1, 6015B-1, 6015A-2, and/or 6015A-3) associated with the shared-content session and/or one or more selectable shared-content session function options (e.g., 6015A-1, 6015B-1, 6015A-4, 6015B-4, 6015A-5, 6015B-5, 6015A-6, 6015B-6, 6015A-7, 6015B-7, 6015A-8, 6015B-8, 6015A-9, and/or 6015B-9) that, when selected, cause the computer system (e.g., 6000B) to perform a respective function associated with the shared-content session. In some embodiments, the shared-content session object includes a selectable join option that, when selected, causes the computer system to connect to the shared-content session.

In some embodiments, the computer system (e.g., 6000B) ceases output of the first content (e.g., automatically, without user input) in response to receiving an incoming call (e.g., FIG. 6AC) (e.g., a phone call, a video call). Ceasing output of the first content in response to receiving an incoming call conserves computational resources of the computer system by automatically ceasing output of the first content without requiring additional input from the user and ceasing output of the first content when the incoming call is received. Conserving computational resources of the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, while the shared-content session is active and the computer system is outputting the first content, the computer system receives an incoming call and, in response, ceases output of the first content (e.g., while, optionally, remaining connected to the shared-content session). In some embodiments, the computer system leaves the shared-content session in response to receiving an incoming call.

In some embodiments, the computer system (e.g., 6000B) ceases output of the first content (e.g., automatically, without user input) in response to the computer system (e.g., 6000B) detecting (e.g., by the computer system) a request (e.g., 6298) (or, optionally, accepting a request) to output content (e.g., 6296) that cannot be added to the shared-content session (e.g., content that cannot be shared, and/or content that is not supported by and/or compatible with the shared-content session). Ceasing output of the first content in response to detecting a request to output content that cannot be added to the shared-content session conserves computational resources of the computer system by automatically ceasing output of the first content without requiring additional input from the user and ceasing output of the first content when the request is received. Conserving computational resources of the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, while the shared-content session is active and the computer system is outputting the first content, the computer system detects or accepts a request to output content that cannot be added to the shared-content session and, in response, ceases output of the first content (e.g., while, optionally, maintaining connected to the shared-content session). In some embodiments, the computer system leaves the shared-content session automatically in response to detecting and/or accepting a request to output content that cannot be added to the shared-content session.

In some embodiments, while the computer system (e.g., 6000A) outputs the first content, the computer system (e.g., 6000A) detects a request (e.g., 6298) to play second content (e.g., 6296) that cannot be added to the shared-content session. In response to the computer system (e.g., 6000A) detecting the request to play the second content, the computer system (e.g., 6000B) initiates a process for playing the second content. After the computer system (e.g., 6000B) plays at least a portion of the second content, the computer system (e.g., 6000B) ceases to play the second content (e.g., in response to a request to cease playing the second content or as a result of an end of the second content being reached). After (e.g., in conjunction with or in response to) the computer system (e.g., 6000B) ceases to play the second content, in accordance with a determination that the shared-content session is ongoing, the computer system (e.g., 6000B) displays a selectable output content notification (e.g., 6312 and/or 6314) that, when selected, initiates a process to output (e.g., re-initiate output of, resume playback of) respective content that is currently playing in the shared-content session (e.g., the first content or third content if the shared-content session has switched to playing the third content). Displaying a selectable output content notification after ceasing to display the second content, in accordance with a determination that shared-content session is ongoing provides feedback to the user of the computer system that the shared-content session is continuing, provides additional control options for initiating a process to output respective content that is currently playing in the shared-content session without cluttering the user interface with additional displayed controls until after ceasing to play the second content, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, when playback of unsupported media is complete, the computer system displays a notification that can be selected to re-initiate output of the content and/or re-join the shared-content session.

In some embodiments, after (e.g., in conjunction with or in response to) the computer system (e.g., 6000B) ceases to play the second content, in accordance with a determination that the shared-content session is no longer ongoing, the computer system (e.g., 6000B) forgoes displaying the selectable output content notification that, when selected, initiates a process to output (e.g., re-initiate output of, resume playback of) respective content that is currently playing in the shared-content session (e.g., the first content or third content if the shared-content session has switched to playing the third content). In some embodiments, when playback of unsupported media is complete, the computer system displays a notification that can be selected to re-initiate output of the content and/or re-join the shared-content session Note that details of the processes described above with respect to method 1100 (e.g., FIG. 11) are also applicable in an analogous manner to the methods described below and above. For example, methods 700, 800, 900, 1000, 1200, 1300, 1500, 1600, 1700, and/or 1800 optionally include one or more of the characteristics of the various methods described above with reference to method 1100. For brevity, these details are not repeated.

Figure 12:
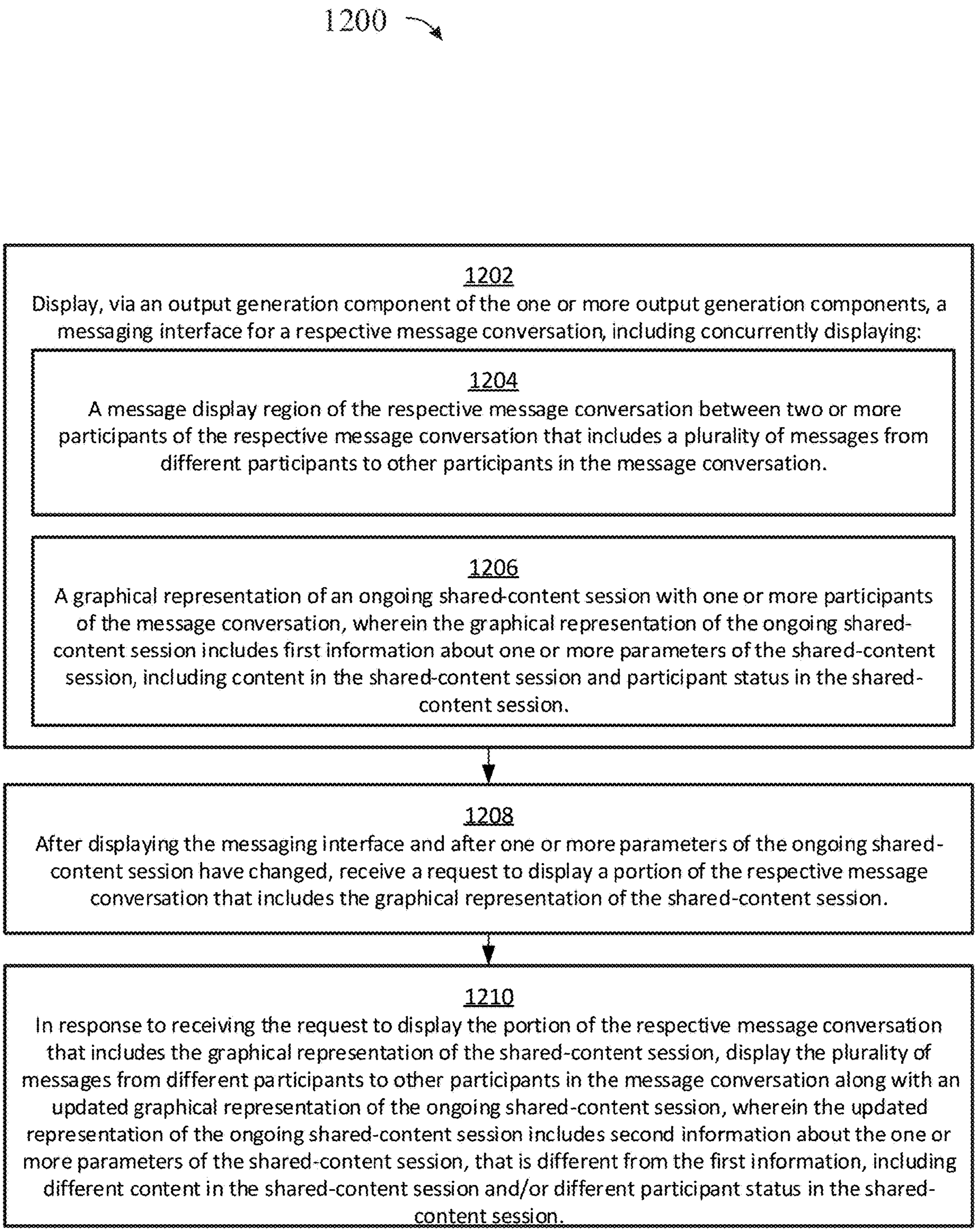
FIG. 12 depicts a flow diagram illustrating a method for managing a shared-content session, in accordance with some embodiments.

FIG. 12 is a flow diagram illustrating a method for integrating a shared-content session with a messaging interface using a computer system (e.g., 6000B) in accordance with some embodiments. Method 1200 is performed at a computer system (e.g., a smartphone, a tablet, a desktop or laptop computer) that is in communication with one or more output generation components (e.g., 6001B) (e.g., a display controller, a touch-sensitive display system, a speaker, a bone conduction audio output device, a tactile output generator, a projector, and/or a holographic display) and one or more input devices (e.g., 6001B, 6002B, and/or 6003B) (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). Some operations in method 1200 are, optionally, combined, the orders of some operations are, optionally, changed, and some operations are, optionally, omitted.

As described below, method 1200 provides an intuitive way for integrating a shared-content session with a messaging interface. The method reduces the cognitive burden on a user for using a messaging interface in conjunction with a shared-content session, thereby creating a more efficient human-machine interface. For battery-operated computing devices, enabling a user to participant in a shared-content session with a messaging interface faster and more efficiently conserves power and increases the time between battery charges.

The computer system (e.g., 6000B) displays (1202), via an output generation component of the one or more output generation components (e.g., 6001B), a messaging interface (e.g., 6004A or 6004B) for a respective message conversation (e.g., 6004A-1 and/or 6004B-1) (e.g., a user interface of a messaging application), including concurrently displaying: a message display region (e.g., 6004A-3 or 6004B-3) (1204) (e.g., a text message display region) of the respective message conversation between two or more participants (e.g., 6004A-2) of the respective message conversation that includes a plurality of messages (e.g., 6004A-1 or 6004B-1) from different participants to other participants in the message conversation (In some embodiments, the message display region includes one or more messages from a user associated with the computer system and/or one or more messages from one or more participants of the message conversation other than the user associated with the computer system.); and a graphical representation (e.g., 6010A or 6010B) of an ongoing shared-content session (1206) with one or more participants of the message conversation (e.g., with the electronic devices of the participants of the message conversation), wherein the graphical representation of the ongoing shared-content session includes first information about one or more parameters of the shared-content session, including content (e.g., information about the content (e.g., the title of the content, and/or playback status of the content)) (in some embodiments, the content is synchronized content and/or screen-share content) in the shared-content session and participant status (e.g., a number of participants, names of participants, status of participants, identifier, and/or activity level of participants) in the shared-content session.

After the computer system (e.g., 6000B) displays the messaging interface and after one or more parameters of the ongoing shared-content session have changed (e.g., a participant has left or joined the shared-content session; different content has been shared or output in connection with the shared-content session; and/or a playback status of the content has changed), the computer system (e.g., 6000B) receives (1208) a request (e.g., 6034) to display a portion of the respective message conversation that includes the graphical representation of the shared-content session.

In response to the computer system (e.g., 6000B) receiving the request to display the portion of the respective message conversation that includes the graphical representation of the shared-content session, the computer system (e.g., 6000B) displays (1210) the plurality of messages from different participants to other participants in the message conversation along with an updated graphical representation of the ongoing shared-content session, wherein the updated representation of the ongoing shared-content session includes second information about the one or more parameters of the shared-content session, that is different from the first information, including different content in the shared-content session (e.g., information about the different content (e.g., the title of the different content, and/or playback status of the different content)) and/or different participant status (e.g., a number, identifier, and/or activity level of participants) in the shared-content session (e.g., 6010A and 6010B in FIG. 6H and FIG. 6I as compared to FIG. 6C and FIG. 6D). Displaying the plurality of messages from different participants to other participants in the message conversation along with an updated graphical representation of the ongoing shared-content session provides feedback to a user of the computer system about the second information about the one or more parameters of the shared-content session, that is different from the first information, including different content in the shared-content session and/or different participant status in the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 6000B) displays a selectable join option (e.g., 6010B-1 and/or 6024-1) (e.g., an icon, affordance, and/or button) that, when selected, initiates a process to join the ongoing shared-content session (e.g., a process for the computer system to join or connect to the ongoing shared-content session). Displaying a selectable join option provides feedback to a user of the computer system about the state of the ongoing shared-content session, provides additional control options for initiating a process to join the ongoing shared-content session without cluttering the user interface with additional displayed controls until an input is received, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the join option is displayed in the messaging interface, in the message display region of the respective message conversation, or in a message in the respective message conversation. In some embodiments, the graphical representation of the ongoing shared-content session includes (e.g., is) the join option. In some embodiments, the computer system detects an input corresponding to selection of the join option and, in response, initiates the process to join the ongoing shared-content session. In some embodiments, the computer system displays the join option after the computer system has disconnected from (e.g., left) the shared-content session.

In some embodiments, displaying the join option includes displaying the join option (e.g., 6010B-1) in the message display region (e.g., 6004A-3 and/or 6004B-3) of the respective message conversation (E.G., FIG. 6D). In some embodiments, displaying the join option occurs in response to receiving an indication that a participant of the respective message conversation (e.g., an external participant, a participant associated with an external computer system) initiated the shared-content session (e.g., in response to 6008). Displaying the join option in the message display region of the respective message conversation in response to receiving an indication that a participant of the respective message conversation initiated the shared-content session provides feedback to a user of the computer system about the state of the ongoing shared-content session, provides additional control options for initiating a process to join the ongoing shared-content session without cluttering the user interface with additional displayed controls until the indication that a participant of the respective message conversation initiated the shared-content session is received, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, displaying the join option occurs in accordance with a determination that a participant of the respective message conversation other than the participant associated with the computer system (e.g., a remote participant, a participant associated with an external or remote computer system) initiated the shared-content session. In some embodiments, the join option is selectable to initiate a process for joining the shared-content session (e.g., a user of the computer system or external computer system can select the join option to join a shared-content session that they have been invited to join).

In some embodiments, in accordance with a determination that the shared-content session is initiated by the computer system (e.g., 6000A), the computer system (e.g., 6000A) forgoes displaying the join option (e.g., 6010A does not include join option 6010B-1) (e.g., displaying the messaging interface without the join option (in some embodiments, displaying a "leave" option instead of the "join" option, wherein the leave option is selectable to disconnect the computer system from the shared-content session)). Forgoing displaying the join option in accordance with a determination that the shared-content session is initiated by the computer system reduces the computational workload of the computer system by forgoing displaying the join option and avoiding accidental inputs while join option is not displayed. Reducing the computational workload of the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in accordance with a determination that the ongoing shared-content session between the computer system (e.g., 6000B) and one or more external computer systems (e.g., 6000A) is active (e.g., the computer system is connected to, joined, and/or participating in the shared-content session), the computer system (e.g., 6000B) forgoes displaying the join option (e.g., 6010B in FIG. 6F does not include join option 6010B-1) (e.g., displaying the messaging interface without the join option (in some embodiments, displaying a "leave" option instead of the "join" option, wherein the leave option is selectable to disconnect the computer system from the shared-content session). Forgoing displaying the join option in accordance with a determination that the ongoing shared-content session between the computer system and one or more external computer systems is active reduces the computational workload of the computer system by forgoing displaying the join option and avoiding accidental inputs while join option is not displayed. Reducing the computational workload of the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while the computer system (e.g., 6000A and/or 6000B) displays the messaging interface for the respective message conversation, the computer system (e.g., 6000A and/or 6000B) displays one or more selectable communication options (e.g., 6015A-7 and/or 6015B-7) that, when selected, initiate a process to start a respective real-time communication session (e.g., a real-time audio communication session, a real-time video communication session, a real-time audio/video communication session). Displaying the one or more selectable communication options provides additional control options for initiating a process to start a respective real-time communication session without cluttering the user interface with additional displayed controls until an input is received, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, in response to detecting selection of the one or more selectable communication options, the computer system initiates (e.g., automatically, without further user input) the respective real-time communication session.

In some embodiments, while the computer system (e.g., 6000A and/or 6000B) displays the messaging interface for the respective message conversation, the computer system (e.g., 6000A and/or 6000B) displays one or more selectable status options (e.g., 6015A-1 and/or 6015B-1) that, when selected (e.g., via input 6036 in FIG. 6 I), causes the computer system (e.g., 6000B) to display status information (e.g., 6038 and/or 6042A) of the two or more participants of the respective message conversation (e.g., the status of the participants of the respective message conversation with respect to the shared-content session). Displaying the one or more selectable status options provides additional control options for causing the computer system to display status information of the two or more participants of the respective message conversation without cluttering the user interface with additional displayed controls until an input is received, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, displaying the graphical representation of the ongoing shared-content session includes displaying the graphical representation (e.g., 6010A and/or 6010B) of the ongoing shared-content session in the message display region (e.g., 6004A-3 and/or 6004B-3) when (e.g., in accordance with a determination that) the shared-content session is initiated from the messaging interface (e.g., 6004A and/or 6004B) or when (e.g., in accordance with a determination that) the shared-content session is not initiated from the messaging interface. Displaying the graphical representation of the ongoing shared-content session in the message display region when the shared-content session is initiated from the messaging interface or when the shared-content session is not initiated from the messaging interface provides feedback to a user of the computer system about the state of the ongoing shared-content session and indicates that the shared-content session is associated with the participants of the message conversation. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the graphical representation of the ongoing shared-content session is displayed in the message display region whether or not the shared-content session was initiated from the messaging interface.

In some embodiments, the respective message conversation includes a plurality of messages (e.g., 6004A-1 and/or 6004B-1) that occurred before initiation of the shared-content session. In some embodiments, the plurality of messages that occurred before initiation of the shared-content session are displayed in the message display region above the graphical representation of the shared-content session.

In some embodiments, the respective message conversation includes a plurality of messages (e.g., 6352) that occurred after initiation of the shared-content session. In some embodiments, the plurality of messages that occurred after initiation of the shared-content session are displayed in the message display region below the graphical representation of the shared-content session.

In some embodiments, the graphical representation (e.g., 6010A, 6010B, and/or 6024) of the shared-content session includes a description (e.g., "Watching First Episode" in FIG. 6BK) of activity in the shared-content session (e.g., a user has been invited to, joined, and/or left the shared-content session; content has been shared (added to the shared-content session); and/or content has stopped being shared (removed from the shared-content session)). Displaying the graphical representation of the ongoing shared-content session including a description of activity in the shared-content session provides feedback to a user of the computer system about the state of the ongoing shared-content session and activity occurring in connection with the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, after the computer system (e.g., 6000B) displays the graphical representation (e.g., 6010A, 6010B, and/or 6024) of the shared-content session including a description of a first activity in the shared-content session (e.g., participants of the shared-content session have a first status (e.g., participating in the shared-content session), are watching first video content, outputting first audio content (e.g., media and/or voice communication audio), and/or displaying first screen-share content), the computer system (e.g., 6000B) detects a second activity in the shared-content session different from the first activity (e.g., participants of the shared-content session have a second status, are watching second video content, outputting second audio content (e.g., media and/or voice communication audio), and/or displaying second screen-share content). In some embodiments, after the computer system (e.g., 6000B) detects (e.g., in response to detecting) the second activity in the shared-content session, the computer system (e.g., 6000B) displays the graphical representation of the shared-content session including a description (e.g., "Watching Movie 3" in FIG. 6BR) of the second activity in the shared-content session that is different from the description of the first activity in the shared-content session (e.g., updating the description of activity included in the graphical representation of the shared-content session based on a change in activity in the shared-content session). Displaying the graphical representation of the ongoing shared-content session including a description of the second activity in the shared-content session provides feedback to a user of the computer system about changes in activity in the ongoing shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the graphical representation (e.g., 6010A, 6010B, and/or 6024) of the shared-content session includes a number of participants of the shared-content session (e.g., a number of invited participants (e.g., that have been invited but not joined), and/or a number of active participants (e.g., participants that have joined and are in the shared-content session)). Displaying the graphical representation of the ongoing shared-content session including a number of participants of the shared-content session provides feedback to a user of the computer system about the state of the ongoing shared-content session and the number of participants of the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, after the computer system (e.g., 6000B) displays the graphical representation (e.g., 6010A, 6010B, and/or 6024) of the shared-content session including a first number of participants of the shared-content session, the computer system (e.g., 6000B) detects a change in the number of participants of the shared-content session (e.g., one or more participants of the shared-content session have joined and/or left the shared-content session such that the cumulative number of participants has changed). In some embodiments, after the computer system (e.g., 6000B) detects (e.g., in response to detecting) the change in the number of participants of the shared-content session, the computer system (e.g., 6000B) displays the graphical representation of the shared-content session including a second number of participants of the shared-content session that is different from the first number of participants of the shared-content session (e.g., see 6010A and 6010B in FIGS. 6D and 6F-6L) (e.g., updating the number of participants included in the graphical representation of the shared-content session based on a change in the number of participants in the shared-content session). Displaying the graphical representation of the ongoing shared-content session including a second number of participants of the shared-content session provides feedback to a user of the computer system about changes in the number of participants of the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 6000B) receives an indication of a change in a status of a participant in the shared-content session (e.g., a user had joined or left the shared-content session). In some embodiments in response to receiving the indication of the change in the status of the participant in the shared-content session, the computer system (e.g., 6000B) updates the participant status in the graphical representation (e.g., 6010A, 6010B, and/or 6024) of the ongoing shared-content session (e.g., see 6010A and 6010B in FIGS. 6D and 6F-6L) (e.g., to reflect a different number of participants, and/or to add or remove a representation of a participant). Updating the participant status in the graphical representation of the ongoing shared-content session in response to receiving the indication of the change in the status of the participant in the shared-content session provides feedback to a user of the computer system about the state of the ongoing shared-content session and the current status of participants in the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

Note that details of the processes described above with respect to method 1200 (e.g., FIG. 9) are also applicable in an analogous manner to the methods described below and above. For example, methods 700, 800, 900, 1000, 1100, 1300, 1500, 1600, 1700, and/or 1800 optionally include one or more of the characteristics of the various methods described above with reference to method 1200. For brevity, these details are not repeated.

Figure 13:
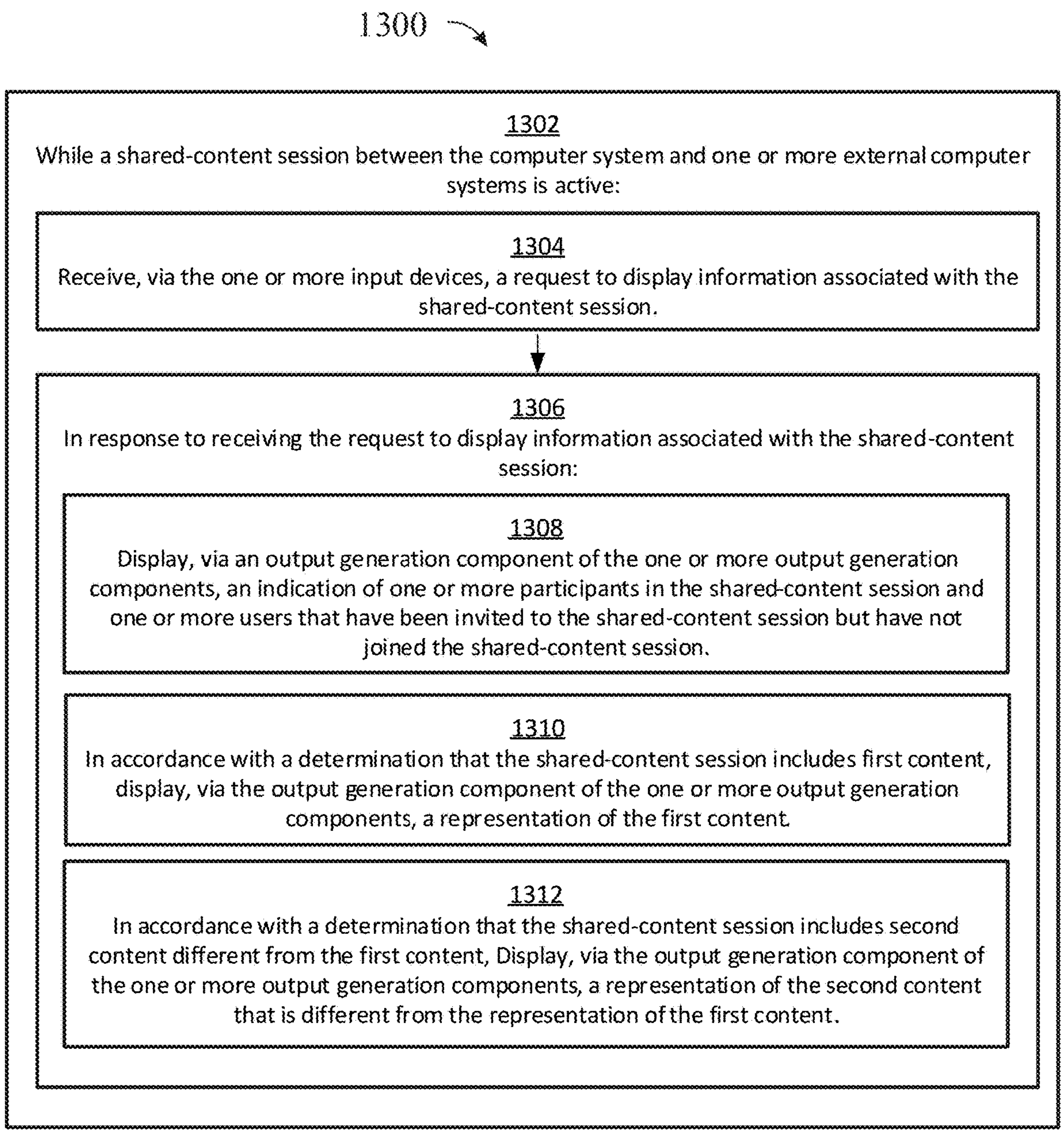
FIG. 13 depicts a flow diagram illustrating a method for managing a shared-content session, in accordance with some embodiments.
Figure 14A:
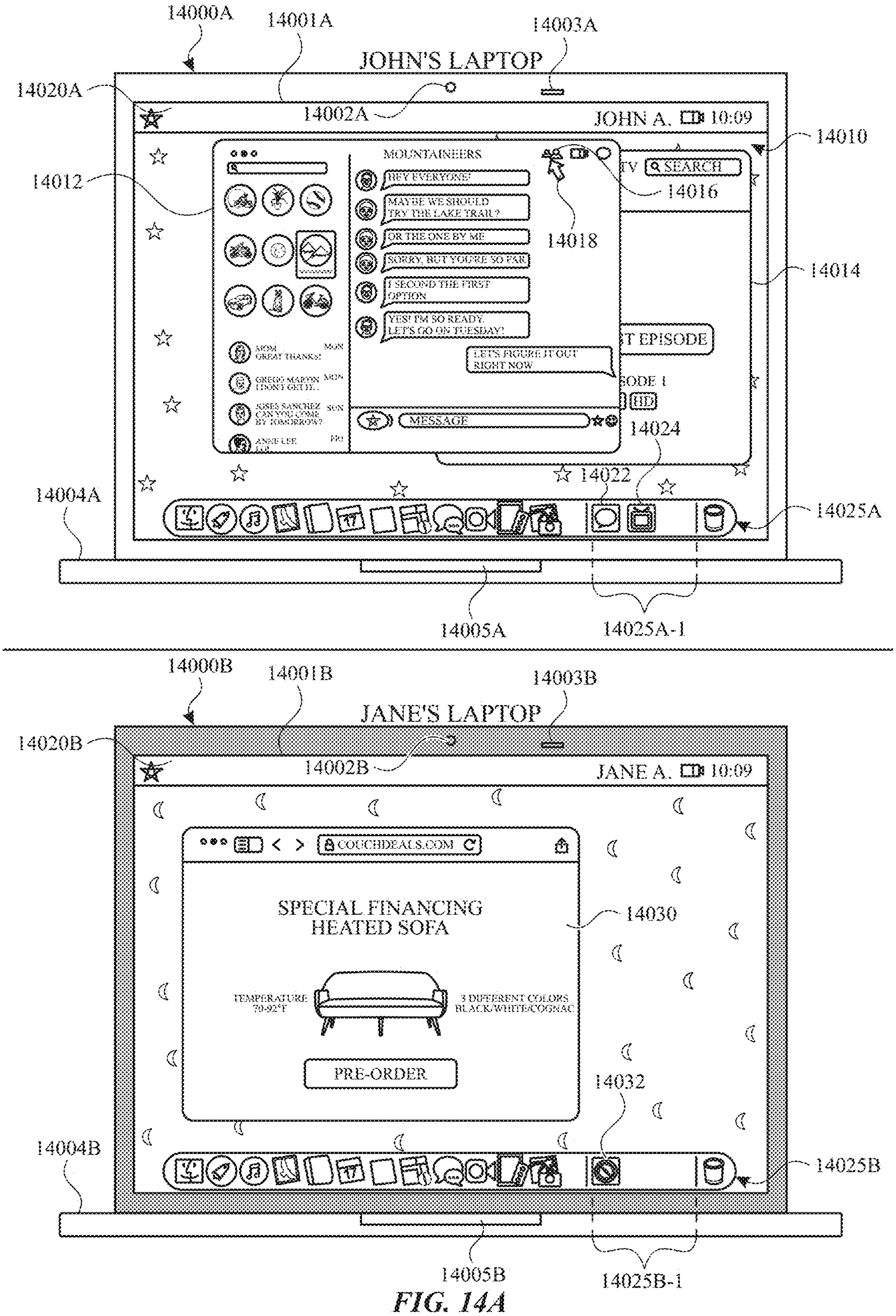
FIGS. 14A-14AG illustrate exemplary user interfaces for managing a shared-content session, in accordance with some embodiments.

FIG. 13 is a flow diagram illustrating a method for displaying information associated with a shared-content session using a computer system (e.g., 6000A and/or 6000B) in accordance with some embodiments. Method 1300 is performed at a computer system (e.g., 6000A and/or 6000B) (e.g., a smartphone, a tablet, a desktop or laptop computer) that is in communication with one or more output generation components (e.g., 6001A and/or 6001B) (e.g., a display controller, a touch-sensitive display system, a speaker, a bone conduction audio output device, a tactile output generator, a projector, and/or a holographic display) and one or more input devices (e.g., 6001A, 6002A, 6003A, 6001B, 6002B, and/or 6003B) (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). Some operations in method 1300 are, optionally, combined, the orders of some operations are, optionally, changed, and some operations are, optionally, omitted.

As described below, method 1300 provides an intuitive way for displaying information associated with a shared-content session. The method reduces the cognitive burden on a user for displaying information associated with a shared-content session, thereby creating a more efficient human-machine interface. For battery-operated computing devices, enabling a user to displaying information associated with a shared-content session faster and more efficiently conserves power and increases the time between battery charges.

While a shared-content session (1302) between the computer system (e.g., 6000A or 6000B) and one or more external computer systems (e.g., 6000B or 6000A) is active: the computer system (e.g., 6000A or 6000B) receives (1304), via the one or more input devices (e.g., 6001A, 6002A, 6003A, 6001B, 6002B, and/or 6003B), a request (e.g., 6036 or 6322) to display information associated with the shared-content session (e.g., an input on an indication of an ongoing shared-content session; an input on a representation of shared content). In response to receiving (1306) the request to display information associated with the shared-content session: the computer system (e.g., 6000B) displays (1308), via an output generation component of the one or more output generation components (e.g., 6001B), an indication (e.g., 6042A or 6042B) (e.g., text; a graphical indication) of one or more participants (e.g., "Ryan Apples" in FIG. 6J) in the shared-content session and one or more users that have been invited to the shared-content session but have not joined the shared-content session (e.g., "Kenneth Smith" in FIG. 6J) (e.g., a listing of users (e.g., user account identifiers (e.g., names)) associated with the one or more external computer systems active in the shared-content session or invited to join the shared-content session); (In some embodiments, the indication of participants includes an indication of the user of the computer system.).

In accordance with a determination that the shared-content session includes first content (e.g., synchronized content and/or screen-share content), the computer system (e.g., 6000B) displays (1310) (e.g., concurrently displaying), via the output generation component of the one or more output generation components (e.g., 6001B), a representation (e.g., 6330) of the first content (e.g., the first content is displayed (e.g., simultaneously) at the computer system and the external computer systems associated with the participants of the shared-content session).

In accordance with a determination that the shared-content session includes second content different from the first content (e.g., content for synchronized output) (e.g., screen-share content), the computer system (e.g., 6000B) displays (1312) (e.g., concurrently displaying), via the output generation component of the one or more output generation components (e.g., 6001B), a representation (e.g., 6328) of the second content that is different from the representation of the first content (e.g., the second content is displayed (e.g., concurrently) at the computer system and the external computer systems associated with the participants of the shared-content session). Displaying the indication of one or more participants in the shared-content session and one or more users that have been invited to the shared-content session but have not joined the shared-content session, and displaying the representation of the first content or the representation of the second content in accordance with a determination that the shared-content session includes the first or second content, provides feedback to a user of the computer system about the status of participants of the shared-content session and the content that is added to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the one or more users that have been invited to the shared-content session but have not joined the shared-content session (and the one or more participants in the shared-content session) are participants of a group messaging conversation (e.g., 6004) that occurred before the shared-content session was active. In some embodiments, the group messaging conversation continues to occur while and/or after the shared-content session is active. In some embodiments, the shared-content session is activated by a request by one of the participants of the group messaging conversation to invite the participants of the messaging conversation as a group.

In some embodiments, the one or more users that have been invited to the shared-content session but have not joined the shared-content session (and the one or more participants in the shared-content session) are participants of a prior shared-content session (e.g., the shared-content session in FIG. 6C) that occurred before the shared-content session (e.g., the shared-content session in FIG. 6BK) (e.g., the current shared-content session) was active (e.g., a shared-content session that was active and then, optionally, deactivated prior to activation of the current shared-content session). In some embodiments, the group messaging conversation continues to occur while and/or after the shared-content session is active. In some embodiments, the shared-content session is activated by a request by one of the participants of the group messaging conversation to invite the participants of the messaging conversation as a group.

In some embodiments, in response to receiving the request to display information associated with the shared-content session, the computer system (e.g., 6000A) displays a status (e.g., 6046 in FIG. 6J) (e.g., joined, invited, active, inactive, muted, audio muted, video muted, online, offline, and/or away) of one or more users relative to the shared-content session, including a first status (e.g., "Active") of a first user (e.g., "Ryan Apples") relative to the shared-content session and a second status (e.g., "Invited") of a second user (e.g., "Kenneth Smith") with respect to the shared-content session, where the second user is different from the first user. Displaying the status of one or more users with respect to the shared-content session provides feedback to a user of the computer system about the status of participants of the shared-content session with respect to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the status of the one or more users is included in the indication of the one or more participants in the shared-content session and the one or more users that have been invited to the shared-content session but have not joined the shared-content session.

In some embodiments, in response to receiving the request to display information associated with the shared-content session, the computer system (e.g., 6000B) displays (e.g., FIG. 6BL) a status (e.g., "Watching First Episode") (e.g., watching, listening, playing, and/or paused) of content in the shared-content session with respect to one or more users (e.g., User A is watching Content X; and/or User B is listening to Content Y), including displaying a first status of content with respect to a first user (e.g., "Ryan Apples") and a second status of content with respect to a second user ("John Appleseed"), different from the first user. Displaying the status of content in the shared-content session with respect to one or more users provides feedback to a user of the computer system about the status of content in the shared-content session with respect to one or more users participating in the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the status of content in the shared-content session is included in the indication of the one or more participants in the shared-content session and the one or more users that have been invited to the shared-content session but have not joined the shared-content session.

In some embodiments, in response to receiving the request to display information associated with the shared-content session, the computer system (e.g., 6000B) displays a selectable group messaging object (e.g., 6015A-4 or 6015B-4) that, when selected, causes the computer system (e.g., 6000B) to provide (e.g., display) a messaging interface (e.g., 6004A or 6004B) of a group message conversation that includes users associated with the shared-content session (e.g., users that have joined or been invited to the shared-content session). Displaying a selectable group messaging object in response to receiving the request to display information associated with the shared-content session provides additional control options for causing the computer system to provide a messaging interface of a group message conversation that includes users associated with the shared-content session without cluttering the user interface with additional displayed controls until the request is received, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the group message conversation exists while the shared-content session is active or inactive. In some embodiments, the messaging interface includes a plurality of messages between the participants of the group message conversation (e.g., in a message region of the messaging interface).

In some embodiments, in response to receiving the request to display information associated with the shared-content session, the computer system (e.g., 6000A or 6000B) displays a selectable leave option (e.g., 6040-1) that, when selected, causes the computer system (e.g., 6000A or 6000B) to leave (e.g., disconnect from, end) the shared-content session. Displaying a selectable leave object in response to receiving the request to display information associated with the shared-content session provides additional control options for causing the computer system to leave the shared-content session without cluttering the user interface with additional displayed controls until the request is received, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, when the computer system leaves the shared-content session, the computer system is no longer in communication with the one or more external computer systems via the shared-content session. In some embodiments, when the computer system leaves the shared-content session, the shared-content session remains active between two or more of the external computer systems (e.g., two or more of the external computer systems remain in communication via the shared-content session).

In some embodiments, in response to receiving the request to display information associated with the shared-content session, the computer system (e.g., 6000A) displays an indication (e.g., 6038A-1) (e.g., a name, a group name, a photo, and/or a photo that represents a group (e.g., multiple users)) of an identity of users (e.g., a group of users) that are associated with the shared-content session (e.g., as a group). Displaying an indication of an identity of users that are associated with the shared-content session in response to receiving the request to display information associated with the shared-content session provides feedback to a user of the computer system about the identity of users associated with the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the identity of the users (e.g., the group) that are associated with the shared-content session exists (e.g., remains stored; is available in an application, such as, e.g., an application that stores information of contactable users (e.g., a contacts application), a messaging application, a video chat application, and/or a phone application) after the shared-content session is no longer active.

In some embodiments, in response to receiving the request to display information associated with the shared-content session, the computer system (e.g., 6000B) displays an add-participant option (e.g., 6044A or 6044B) that, when selected, initiates a process to invite (or, optionally add) a user to the shared-content session (e.g., to add or invite to a group of users associated with the shared-content session). Displaying an add-participant option in response to receiving the request to display information associated with the shared-content session provides additional control options for initiating a process to invite a user to the shared-content session without cluttering the user interface with additional displayed controls until the request is received, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the process to add a user to the shared-content session includes displaying an interface (e.g., including a list of users) that provides the ability to search for, find, and/or select a user.

In some embodiments, in response to receiving the request to display information associated with the shared-content session, the computer system (e.g., 6000A) displays a selectable reminder option (e.g., 6048) that, when selected, causes one or more external computer systems (e.g., 6000B) associated with one or more of the one or more users that have been invited to the shared-content session but have not joined the shared-content session to output a reminder (e.g., display a notification or alert, output a visible, tactile, audio, and/or haptic output) to join the shared-content session. Displaying a selectable reminder option in response to receiving the request to display information associated with the shared-content session provides additional control options for causing one or more external computer systems associated with one or more of the one or more users that have been invited to the shared-content session but have not joined the shared-content session to output a reminder to join the shared-content session without cluttering the user interface with additional displayed controls until the request is received, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in response to receiving the request to display information associated with the shared-content session, the computer system (e.g., 6000A or 6000B) displays a selectable copy-invite option (e.g., 6050A or 6050B) that, when selected, copies a link to the shared-content session. Displaying a selectable copy-invite option in response to receiving the request to display information associated with the shared-content session provides additional control options for copying a link to the shared-content session without cluttering the user interface with additional displayed controls until the request is received, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system pastes the copied link (e.g., in response to receiving an input corresponding to a request to insert the copied link into a displayed field (e.g., a message compose field) of a communication interface (e.g., a messaging application, an email application)). In some embodiments, the computer system transmits the copied link (e.g., via a messaging application; via an email application) to a computer system associated with an account of a user to invite and/or allow the computer system associated with the account of the user to join the shared-content session.

In some embodiments, in response to receiving the request to display information associated with the shared-content session, the computer system (e.g., 6000B) displays one or more representations (e.g., 6052A or 6052B) of content that was previously in (and/or, optionally, was previously added to and is currently in) the shared-content session. Displaying one or more representations of content that was previously in the shared-content session in response to receiving the request to display information associated with the shared-content session provides feedback to a user of the computer system about content that was previously in the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system displays a history of some or all of the content in shared-content session(s) with this group of participants.

In some embodiments, in response to receiving the request to display information associated with the shared-content session, the computer system (e.g., 6000B) displays one or more indications (e.g., 6056) (e.g., names, initials, pictures, and/or avatar representations) of users that added (e.g., initiated sharing of) the content that was previously output during (and/or, optionally, was previously added to and is currently in) a respective shared-content session (e.g., a current shared-content session or a prior shared-content session) that included the participants in the shared-content session. Displaying one or more indications of users that added the content that was previously output during a respective shared-content session that included the participants in the shared-content session, in response to receiving the request to display information associated with the shared-content session, provides feedback to a user of the computer system about the users who added the content that was previously output during a shared-content session that included the participants in the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the computer system displays an indication of a user that initiated sharing of a (e.g., each) content that was previously in (and/or, optionally, was previously added to and is currently in) the shared-content session.

In some embodiments, in response to receiving the request to display information associated with the shared-content session, the computer system (e.g., 6000B) displays an indication (e.g., 6330-1) of a state (e.g., playback progress, paused, stopped, playing, and/or current position or time) of content (e.g., content currently being output) in the shared-content session. Displaying an indication of a state of content in the shared-content session in response to receiving the request to display information associated with the shared-content session provides feedback to a user of the computer system about the progress of the content in the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments (e.g., embodiments depicted in FIGS. 14A-14AG), the request to display information associated with the shared-content session includes selection of a selectable option (e.g., 14040A or 14040B) in a status bar (e.g., 14020A or 14020B) on a desktop user interface.

In some embodiments, in response to receiving the request to display information associated with the shared-content session, the computer system (e.g., 6000B or 6000A) displays a selectable play-for-everyone option (or a selectable play-for-group option 6220-1) that, when selected, selects (e.g., changes) a parameter of the shared-content session that determines, at least in part, whether selected content is added to the shared-content session (e.g., play for group is enabled or disabled). Displaying a selectable play-for-everyone (or play-for-group) option in response to receiving the request to display information associated with the shared-content session provides additional control options for selecting a parameter of the shared-content session that determines, at least in part, whether selected content is added to the shared-content session without cluttering the user interface with additional displayed controls until the request is received, and avoids accidental inputs while the additional control options are not displayed. Providing additional control options without cluttering the user interface with additional displayed controls and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in response to the computer system (e.g., 6000A or 6000B) receiving the request to display information associated with the shared-content session, the indication (e.g., 6038A, 6038B, 6042A, and/or 6042B) of the one or more participants in the shared-content session and one or more users that have been invited to the shared-content session but have not joined the shared-content session is concurrently displayed (e.g., FIG. 6BO) with content (e.g., 6150B) in the shared-content session (e.g., the first content, the second content). Displaying the indication of the one or more participants in the shared-content session and one or more users that have been invited to the shared-content session but have not joined the shared-content session concurrently with content in the shared-content session provides feedback to a user of the computer system about participants of the shared-content session and the content that is in the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 6000B) displays, via an output generation component (e.g., 6001B) of the one or more output generation components (and, optionally, in response to receiving the request to display information associated with the shared-content session), a selectable display mode option (e.g., 6676) (e.g., an icon, affordance, button, or toggle switch) that, when selected, sets (e.g., changes) a layout (e.g., a grid layout or a layout in which representations of participants are staggered and/or overlapping) in which representations (e.g., 6644-1 to 6644-6) of participants of a video communication session (e.g., a video communication session between the participants of the shared-content session) are displayed in a user interface of a video communication application. Displaying the selectable display mode option for setting a layout in which representations of the participants of a video communication session are displayed in the user interface of the video communication application provides an efficient method for a user to select and set a layout, which provides additional control options without cluttering the user interface with additional displayed controls.

In some embodiments, the display mode option (e.g., 6676) is displayed concurrently with the indication of one or more participants in the shared-content session, the one or more users that have been invited to the shared-content session but have not joined the shared-content session, the representation of the first content, and/or the representation of the second content (e.g., as shown in FIG. 6EC). In some embodiments, the display mode option sets the layout for the video communication application (e.g., 6170) (e.g., the selected layout is applied to other (e.g., subsequent) video communication sessions performed using the video communication application; the selected layout is persistent). In some embodiments, the display mode option sets the layout for the current video communication session (e.g., the video communication session that is active at the time the display mode option is selected, but not for subsequent video communication sessions). In some embodiments, the display mode option sets the layout for only the participant associated with the computer system or, alternatively, for one or more remote participants associated with external computer systems connected to the video communication session (e.g., all participants of the video communication session).

Note that details of the processes described above with respect to method 1300 (e.g., FIG. 13) are also applicable in an analogous manner to the methods described below and above. For example, methods 700, 800, 900, 1000, 1100, 1200, 1500, 1600, 1700, and/or 1800 optionally include one or more of the characteristics of the various methods described above with reference to method 1300. For brevity, these details are not repeated.

FIGS. 14A-14AG illustrate exemplary user interfaces for managing shared-content sessions, in accordance with some embodiments. The user interfaces in these figures are used to illustrate the processes described below, including the processes in FIGS. 15-16. In some embodiments, the user interfaces in FIGS. 14A-14AG can be used to illustrate the processes described above with respect to FIGS. 7-13.

FIG. 14A illustrates exemplary devices for participating in shared-content sessions, in accordance with some embodiments. Specifically, these devices include John's device 14000A (e.g., a laptop) and Jane's device 14000B (e.g., a laptop), which are shown adjacent to one another in the figures to illustrate concurrent states of the respective devices, including the user interfaces and inputs at the respective devices. John's device 14000A includes display 14001A, one or more cameras 14002A, one or more microphones 14003A (also referred to as mic 14003A), keyboard 14004A, and trackpad 14005A. Jane's device 14000B includes display 14001B, one or more cameras 14002B, one or more microphones 14003B (also referred to as mic 14003B), keyboard 14004B, and trackpad 14005B. John's device 14000A is similar to Jane's device 14000B. As in the description above, reference numbers can include the letter "A" to refer to elements of John's device, can include the letter "B" to refer to elements of Jane's device, or can include no letter to refer to elements of either or both devices. In some embodiments, device 14000 includes one or more features of devices 100, 300, 500, and/or 6000.

In some embodiments, some of the elements depicted in the figures are shown having different sizes for the sake of clarity and, therefore, may not be shown to-scale.

In the embodiments provided herein, John's device 14000A can be described as performing a set of functions associated with the shared-content session, and Jane's device 14000B can be described as performing a different set of functions associated with the shared-content session. These descriptions are not intended to limit the functions performed by the respective devices, but rather, are provided to illustrate various aspects and embodiments of a shared-content session. Thus, unless specified otherwise, the functions that are described as being performed by John's device 14000A are similarly capable of being performed by Jane's device 14000B and the devices of other participants in the shared-content session. Similarly, the functions that are described as being performed by Jane's device 14000B are similarly capable of being performed by John's device 14000A and the devices of other participants in the shared-content session, unless specified otherwise.

Unless noted otherwise, devices 14000 are capable of participating in shared-content sessions, including sharing screen-share and/or synchronized content, in a manner analogous to that described above with respect to FIGS. 6A-6DE. For the sake of brevity, various operations or features described above with respect to participating in a shared-content session are not repeated below. For example, various notifications (e.g., 6028, 6072, 6086, 6098, 6120, 6124, 6200, 6210, 6226, 6228, 6230, 6244, 6248, 6250, 6260, 6262, 6270, 6272, 6276, 6280, 6282, 6286, 6288, 6290, 6292, 6300, 6312, 6316, 6320, 6344, 6368, 6370, 6374, 6378, 6380, 6386, 6400, 6406, 6428, 6440, 6436, 6450, and/or 6452) that can be displayed during shared-content sessions may not be illustrated in FIGS. 14A-14AG. Additionally, some of the applications and displayed elements discussed with respect to FIGS. 14A-14AG are similar to applications and displayed elements discussed with respect to FIGS. 6A-6DE. For example, the control regions (e.g., 14045) and pills (e.g., 14040 and/or 14104) discussed with respect to FIGS. 14A-14AG are similar to the control regions (e.g., 6015) and pills (e.g., 6020 and/or 6021) discussed with respect to FIGS. 6A-6DE.

FIGS. 14A-14D illustrate example embodiments in which John initiates a shared-content session for members of the Mountaineers group.

In FIG. 14A, John's device 14000A and Jane's device 14000B are not in a shared-content session. John's device 14000A displays desktop 14010 with messages window 14012, TV app window 14014, status bar 14020A, and dock 14025A. Dock 14025A includes dynamic region 14025A-1 in which app icons are displayed to indicate applications that are open and/or in use on John's device 14000A. In FIG. 14A, messages app icon 14022 and TV app icon 14024 are displayed in dynamic region 14025A-1, because these applications are currently open (as indicated, for example, by the display of messages window 14012 and TV app window 14014).

Messages window 14012 depicts a messages conversation with members of the Mountaineers group, and includes shared-content session affordance 14016, which is selectable to initiate a shared-content session with the Mountaineers group. John selects shared-content session affordance 14016 via input 14018 (e.g., a mouse click).

Jane's device 14000B displays a desktop with browser window 14030, status bar 14020B, and dock 14025B with dynamic region 14025B-1. In FIG. 14A, browser app icon 14032 is displayed in dynamic region 14025B-1 because the browser application is currently open, as indicated by the display of browser window 14030.

In response to John's selection of the shared-content session affordance 14016, a shared-content session is initiated for the Mountaineers group. In the embodiment depicted in FIG. 14B, the shared-content session is enabled via a sharing app, which is launched in response to input 14018. Accordingly, John's device 14000A displays sharing app icon 14052 in dynamic region 14025A-1 of the dock.

In FIG. 14B, John's device 14000A displays sharing pill 14040A in status bar 14020A, indicating John's device 14000A is participating in a shared-content session. Message window 14012 is updated to display dynamic graphic 14034 (similar to dynamic graphic 6010), which has been communicated to the Mountaineers group via the messaging app and provides dynamic information about the shared-content session, including a current status indicating that three people are invited to join the shared-content session. Additionally, John's device 14000A displays shared-content session control region 14045A (similar to control region 6015), which includes control region status region 14045A-1 and various options that are selectable to control operations, parameters, and/or settings of the shared-content session. Status region 14045A-1 presents information associated with the shared-content session, and currently indicates that three people are invited to join the shared-content session. Control region 14045A also includes a messages option, mic option 14045A-6, camera option 14045A-7, and sharing option 14045A-8. Mic option 14045A-6 is selectable to display controls for selecting a microphone device to be used for the shared-content session and, in some embodiments, to enable or disable an audio channel for the shared-content session. Camera option 14045A-7 is selectable to display controls for selecting a camera device to be used for the shared-content session and, in some embodiments, to initiate a video conference session with the participants of the shared-content session. Sharing option 14045A-8 is selectable to display controls for sharing content with participants of the shared-content session. In some embodiments, sharing pill 14040A has a highlighted appearance (as shown in FIG. 14B) when control region 14045A is displayed.

In FIG. 14B, Jane's device 14000B displays messages notification 14054 inviting Jane to join the shared-content session with the Mountaineers group. Notification 14054 includes join option 14056, which is selectable to join the shared-content session. In FIG. 14B, Jane selects join option 14056 via input 14058 (e.g., a mouse click) to join the shared-content session.

Figure 14C:
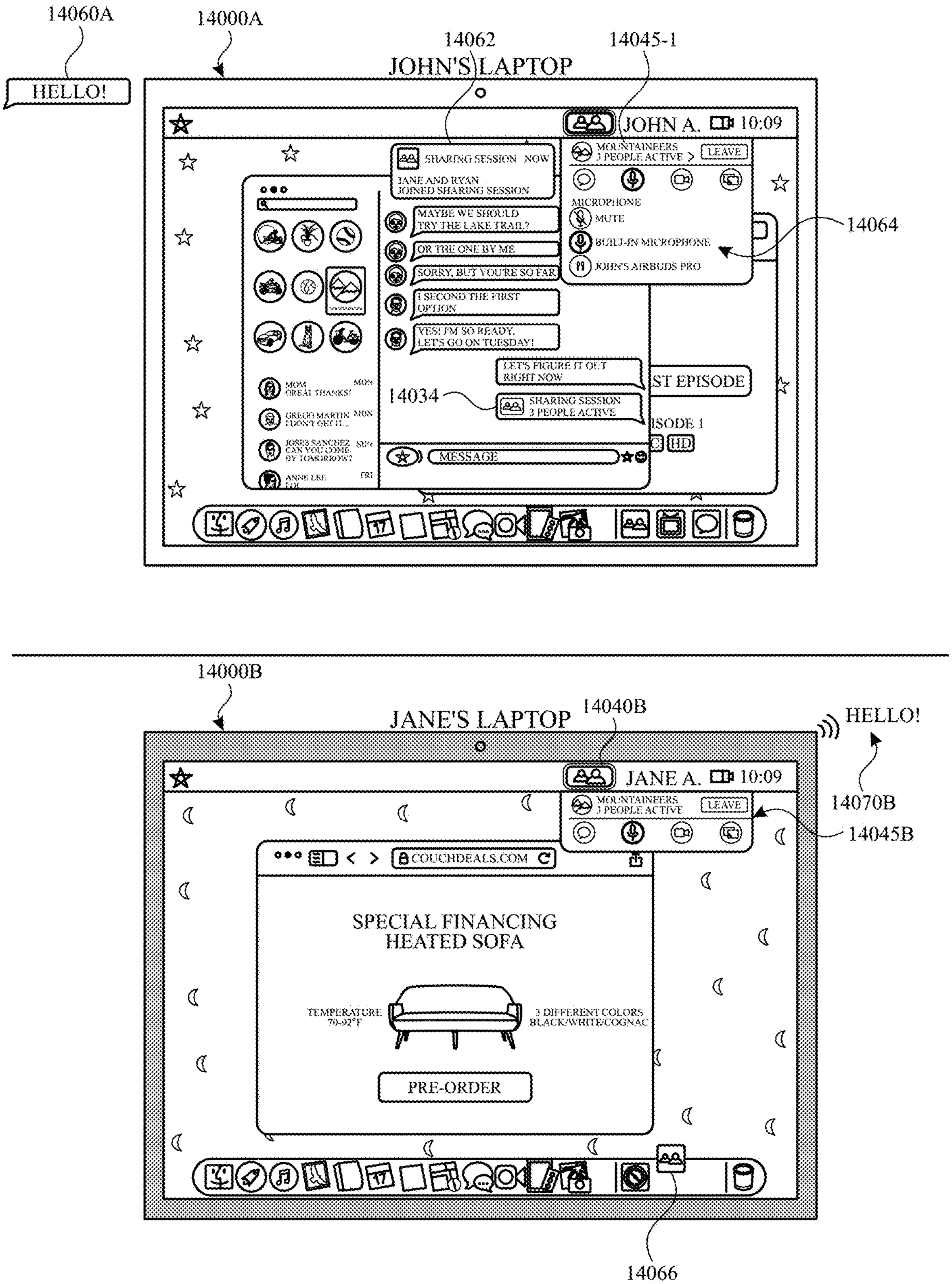

FIG. 14C depicts John's device 14000A after Jane and Ryan joined the shared-content session, and in response to input 14046 (e.g., click input) on mic option 14045A-6 in FIG. 14B. In response to Jane and Ryan joining the shared-content session, John's device displays notification 14062 informing John that Jane and Ryan joined the shared-content session, and updates control region status region 14045A-1 and dynamic graphic 14034 to indicate that three people are active in the shared-content session. In response to input 14046, John's device displays options 14064, which are selectable to choose a microphone source for the shared-content session.

In FIG. 14C, John speaks to Jane and Ryan via the audio channel that is active for the shared-content session, as indicated by input audio 14060A. Jane's device outputs the audio from John, as indicated by output audio 14070B. Jane's device 14000B is now participating in the shared-content session and, as such, displays sharing pill 14040B and control region 14045B. The sharing application is launched at Jane's device, as indicated by sharing app icon 14066 displayed having a temporary animated (e.g., jumping) appearance in dynamic region 14025B-1 of the dock.

In FIG. 14D, Jane speaks to the Mountaineers group as indicated by input audio 14060B at Jane's device 14000B and output audio 14070A at John's device. John's device displays options 14068 in response to input 14048 (e.g., click input) on camera option 14045A-7 in FIG. 14B.

Options 14068 are selectable to choose a camera source for the shared-content session. On Jane's device, control region 14045B was automatically dismissed after a predetermined amount of time. Jane selects sharing pill 14040B via input 14072 (e.g., click input), to redisplay control region 14045B, as shown in FIG. 14E.

FIGS. 14E-14J illustrate example embodiments in which John shares his screen with members of the Mountaineers group.

Figure 14E:
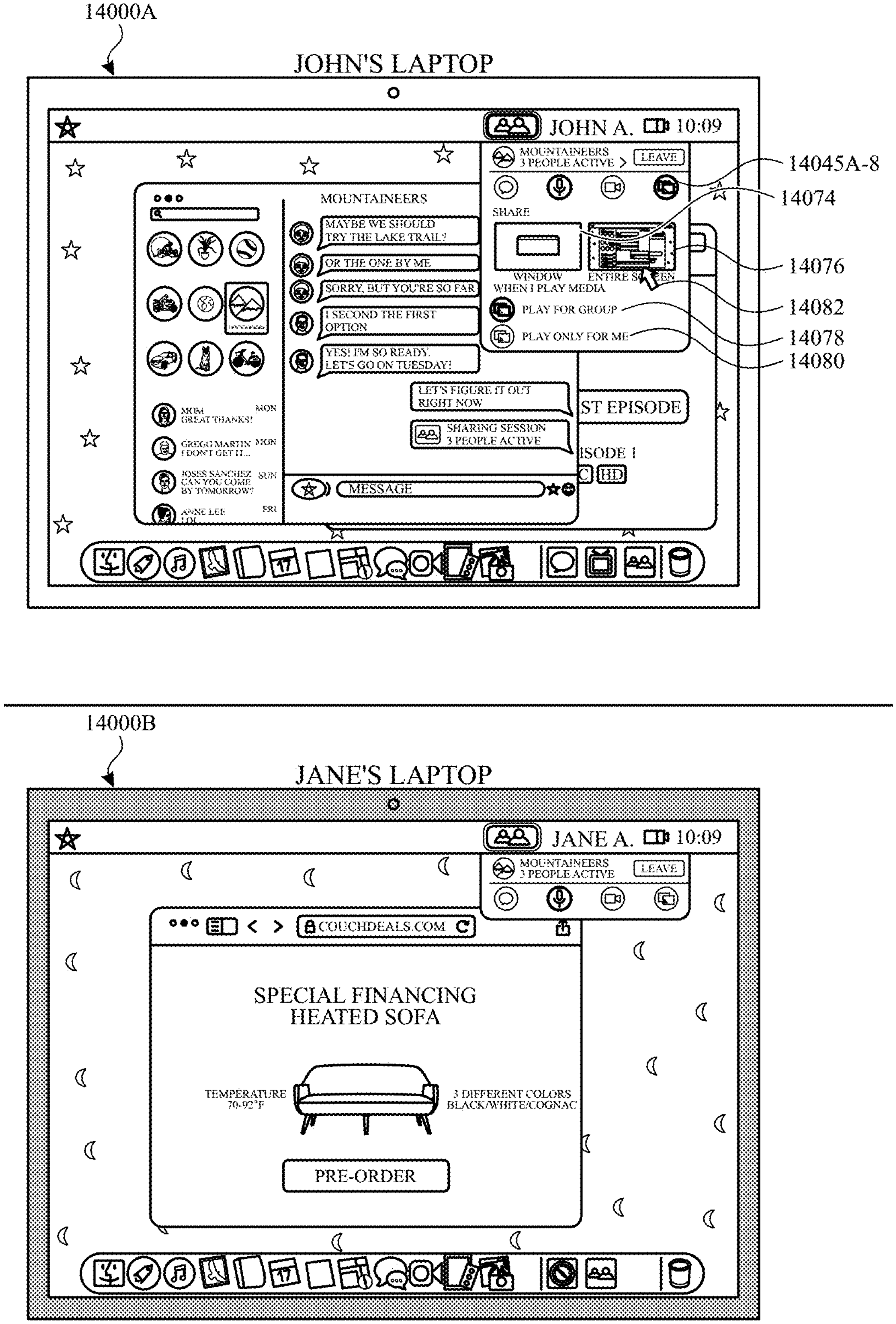

FIG. 14E illustrates John's device 14000A in response to input 14050 (e.g., click input) on sharing option 14045A-8. When sharing option 14045A-8 is selected, control region 14045A expands to display additional controls for sharing content in the shared-content session. Window option 14074 can be selected to share the content of a specific window with participants of the shared-content session. In some embodiments, window option 14074 has an appearance that depicts a generic application window. In some embodiments, window option 14074 has an appearance that depicts one of the application windows that is currently displayed at John's device 14000A. Screen option 14076 can be selected to share the content of a display screen or desktop with participants of the shared-content session. In some embodiments, screen option 14076 has an appearance that depicts a generic desktop. In some embodiments, such as that shown in FIG. 14E, screen option 14076 has an appearance that depicts a representation of the current desktop on John's device.

As shown in FIG. 14E, media playback controls 14078 and 14080 are displayed in control region 14045A when sharing option 14045A-8 is selected. Media playback controls are selectable to control whether media content (e.g., music, movies, TV shows, videos) is shared with the participants of the shared-content session when the media content is played at John's device 14000A during a shared-content session. When media playback control 14078 is selected or enabled, media played at John's device 14000A during the shared-content session is shared with participants of the shared-content session (e.g., by instructing the participating devices to separately access the respective media content (e.g., from a remote server and/or using an application local to the respective device) for playback at the respective participating devices). When media playback control 14080 is selected or enabled, media played at John's device 14000A during the sharing is not shared with participants of the shared-content session (e.g., the content is played privately at John's device 14000A).

Figure 14F:
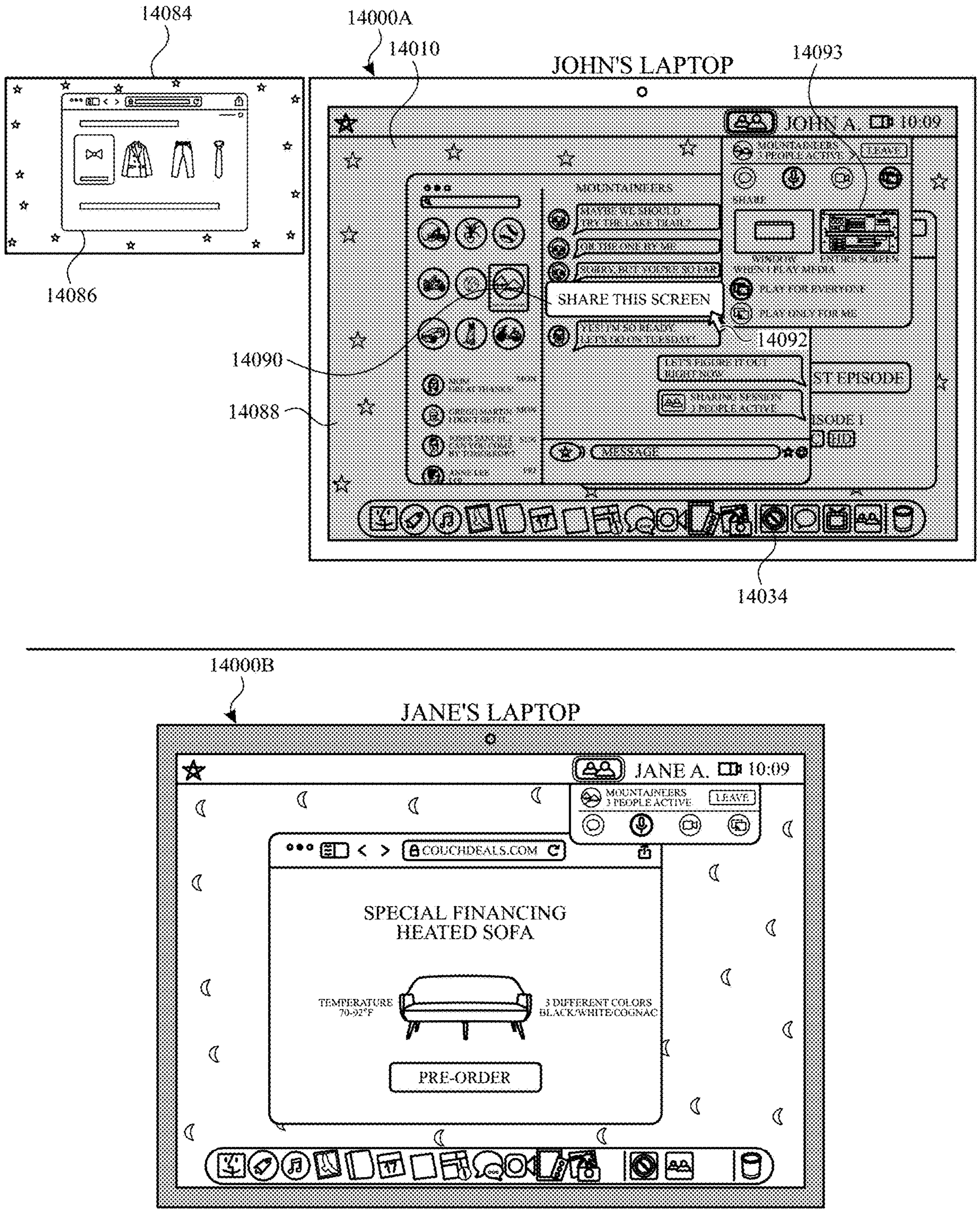

In FIG. 14E, John selects screen option 14076 via input 14082 (e.g., a click input) to begin a process for sharing screen content in the shared-content session, as shown in FIG. 14F.

In FIG. 14F, John's device 14000A is connected to monitor 14084, which is currently displaying browser window 14086. Accordingly, John is able to select from two screens to share with the Mountaineers group: the screen of John's laptop (e.g., device 14000A) or the screen of monitor 14084. Because the browser application is open to display browser window 14086, browser app icon 14094 is displayed in dynamic region 14025A-1 of dock 14025A.

Figure 14G:
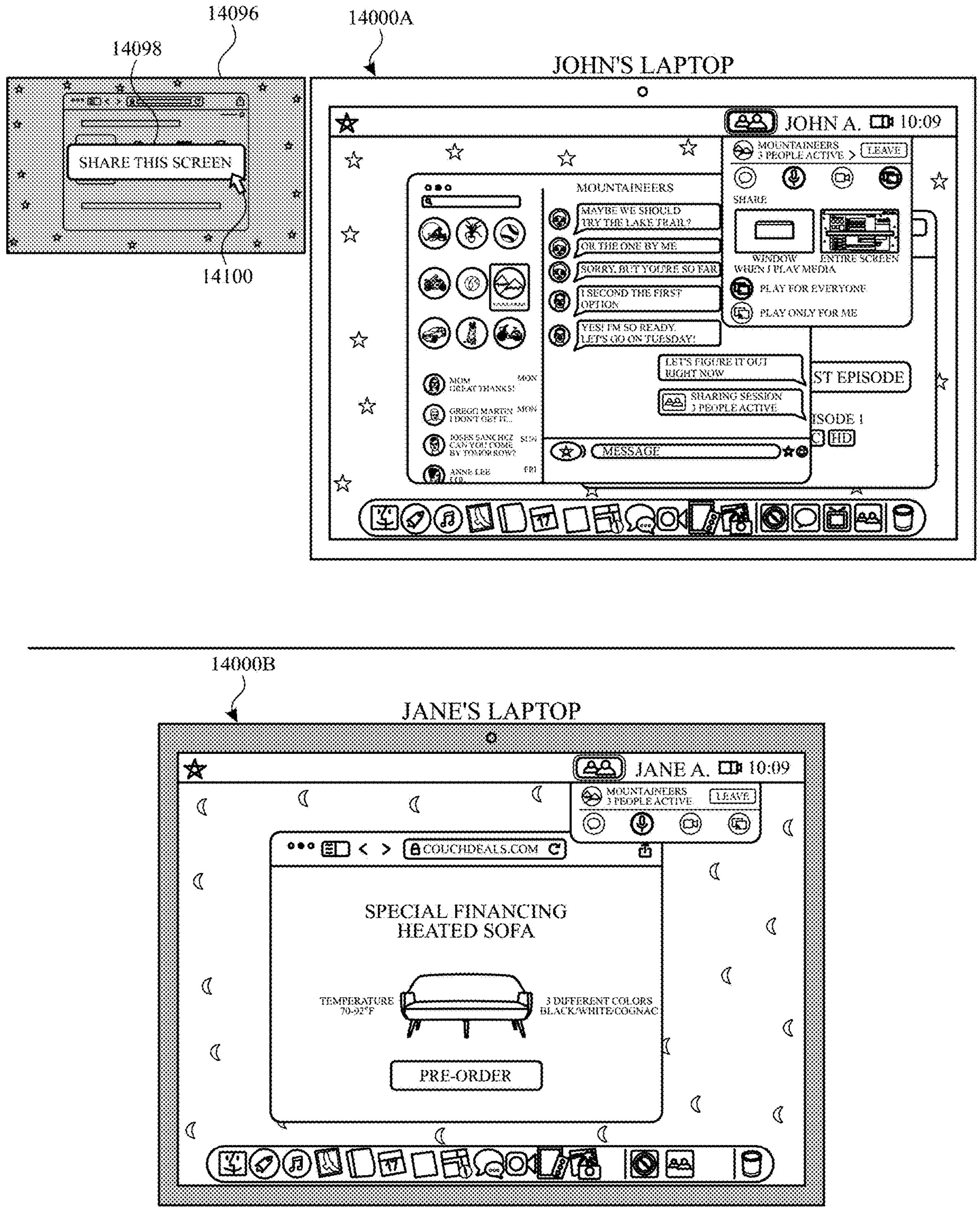

In FIG. 14F, John's device 14000A displays prompt 14093 over screen option 14076, prompting John to choose which screen to share. To select a screen for sharing, John hovers the cursor over a screen, which causes John's device 14000A to highlight the screen and display an affordance for selecting the screen for sharing. For example, in FIG. 14F, John hovers cursor 14092 over desktop 14010 (which corresponds to the screen on John's laptop), and John's device 14000A displays highlighting 14088 and share affordance 14090. Selecting share affordance 14090 selects desktop 14010 for sharing. Similarly, FIG. 14G depicts John hovering cursor 14100 over the screen of monitor 14084, and John's device 14000A displays highlighting 14096 and share affordance 14098. Selecting share affordance 14098 selects the screen of monitor 14084 for sharing. In FIGS. 14F and 14G, Jane's device 14000B continues to display browser window 14030 and control region 14045B.

Figure 14H:
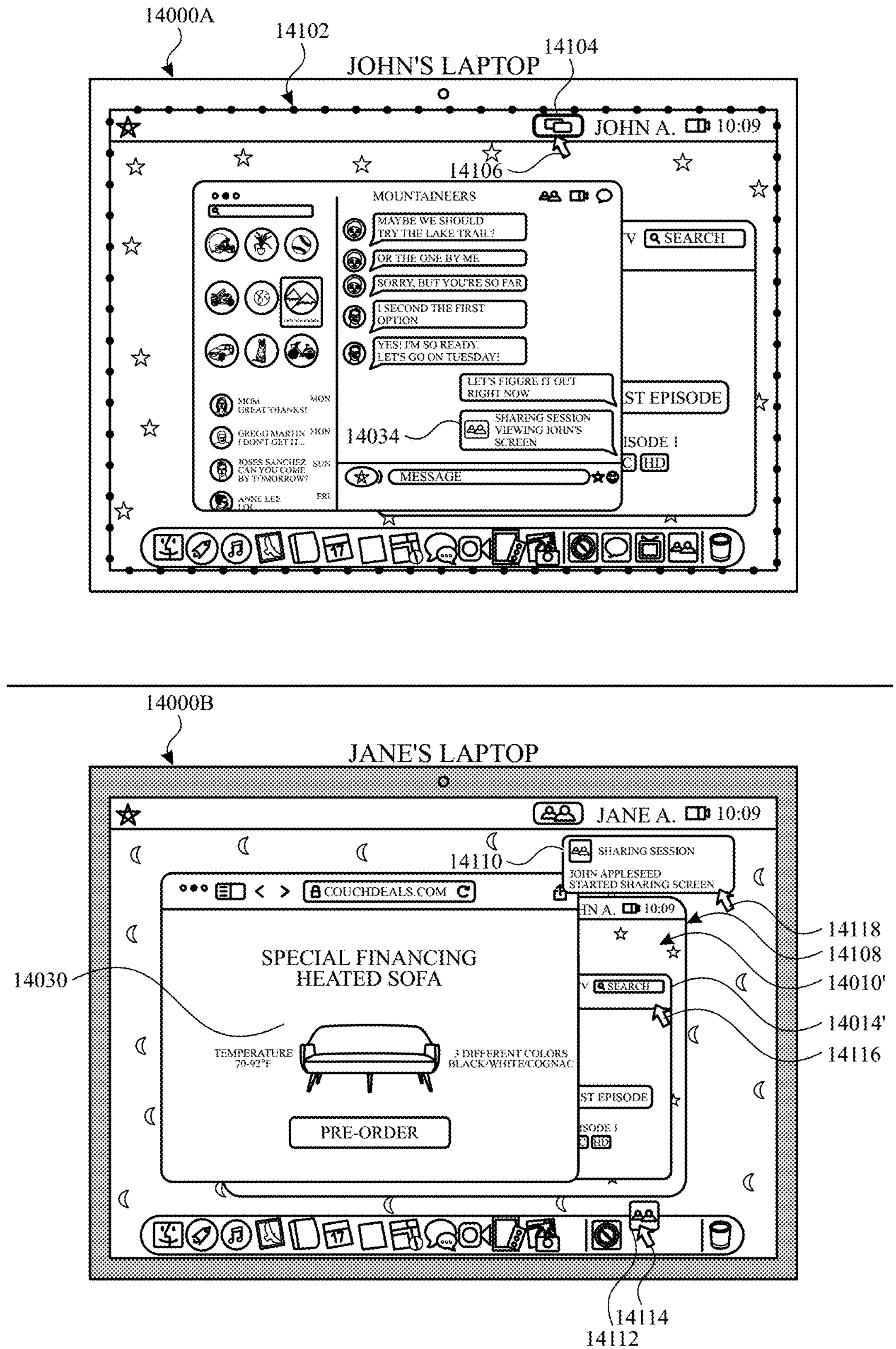

FIG. 14H depicts John's and Jane's devices 14000 in response to John selecting (e.g., via clicking with cursor 14092) share affordance 14090 in FIG. 14F. In this embodiment, John has selected the screen of his laptop (e.g., desktop 14010) to be shared with the Mountaineers group. In response to the selection of share affordance 14090, John's device 14000A begins transmitting the contents of desktop 14010 to the members of the Mountaineers group. In some embodiments, John's device 14000A displays a countdown prior to sharing the selected screen. In some embodiments, the countdown is displayed over desktop 14010. In some embodiments, the countdown is displayed replacing prompt 14093. In some embodiments, the countdown is selectable to cancel the request to share the screen content.

When the screen sharing starts, content located on John's desktop, such as messages window 14012 and TV app window 14014, is shared with the members of the Mountaineers group. In some embodiments, some items that are displayed over John's desktop are, optionally, not included in the screen sharing. For example, while control region 14045A is displayed over desktop 14010 in some instances, it is not shared as a part of the contents of John's screen. In some embodiments, status bar 14020A is not included in the shared content. In some embodiments, dock 14025A is not included in the shared content. In some embodiments, ancillary user interface objects such as popovers, menus, system messages, and the like are not included in the shared content.

In FIG. 14H, John's device 14000A updates dynamic graphic 14034 to indicate the Mountaineers group is viewing John's screen in the shared-content session and displays screen-sharing pill 14104 as an indication to John that the content of his screen is being shared via the shared-content session. John selects screen-sharing pill 14104 via input 14106 to display control region 14045A, as shown in FIG. 14I.

Dotted box 14102 is depicted in the figures, including in FIG. 14H, to represent the boundaries of the content that is selected for sharing in the shared-content session. In FIG. 14H, dotted box 14102 corresponds to John's desktop 14010, which is being shared with the Mountaineers group. Dotted box 14102 is not displayed on John's device 14000A, but rather, is depicted in the figures as a visual aid to clarify the boundaries of the content that is selected for sharing.

When John's screen is shared with the Mountaineers group, participant devices of the shared-content session begin displaying a real time representation of John's shared screen. For example, in FIG. 14H, Jane's device 14000B displays screen-share window 14108, which includes representation 14010' of John's desktop that is being shared in the shared-content session, including representation 14014' of John's TV app window 14014 and representation 14012' of John's messages window 14012. In the embodiment depicted in FIG. 14H, screen-share window 14108 is displayed in the background on Jane's device 14000B (behind browser window 14030), allowing Jane to continue interacting with browser window 14030 or whatever else she may be viewing on her screen. In addition to displaying screen-share window 14108, Jane's device indicates, in some embodiments, that content has been shared by, for example, displaying notification 14110 and/or animating sharing app icon 14112. Notification 14110 informs Jane that John started sharing his screen in the shared-content session with the Mountaineers group. In some embodiments, Jane's device 14000B brings screen-share window 14108 to the foreground in response to input 14116 (e.g., a click input) on screen-share window 14108, input 14118 (e.g., a click input) on notification 14110, or input 14114 (e.g., a click input) on sharing app icon 14112.

Figure 14I:
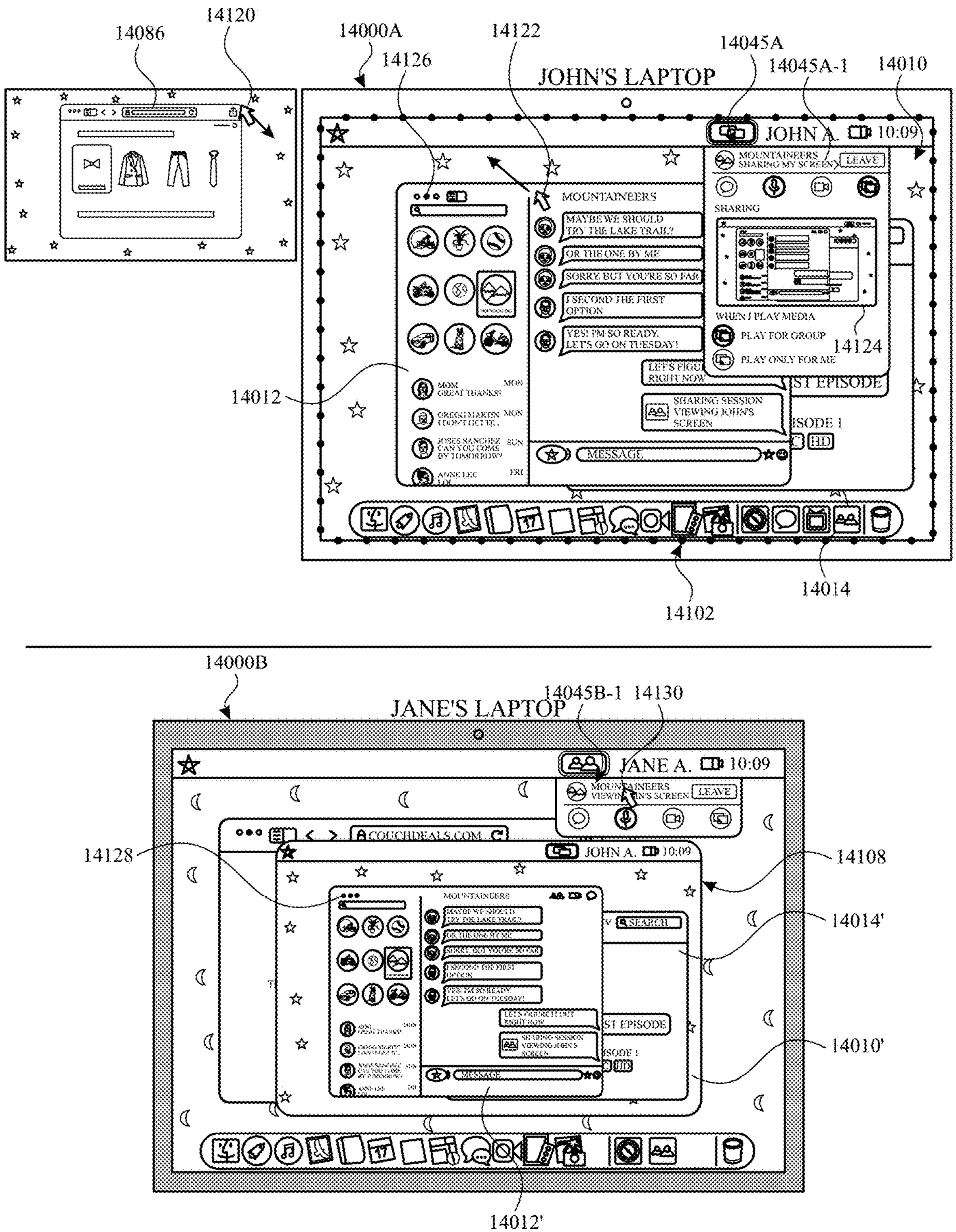

In FIG. 14I, John's device 14000A displays control region 14045A in response to input 14106. Control region 14045A includes an updated status region 14045A-1, indicating that the Mountaineers group is viewing John's screen. Additionally, control region 14045A is updated to include sharing preview 14124, which includes a real time depiction of the content being shared from John's device (e.g., John's screen). In FIG. 14I, John drags messages window 14012 to monitor 14084 via click-and-drag input 14122, and drags browser window 14086 from monitor 14084 to desktop 14010 via click-and-drag input 14120.

In FIG. 14I, Jane's device 14000B displays screen-share window 14108 in the foreground in response to any of inputs 14116, 14118, and 14114. Although the shared content is a real time representation of the content depicted on John's screen, in some embodiments, visual changes are made to emphasize to a user that the content being displayed (at a recipient device) is shared content, and not content from the user's device. For example, as shown in FIG. 14I, the windows on John's device include window controls 14126, which are selectable to adjust a displayed state (e.g., closed, maximized, minimized, reduced) of a corresponding window (e.g., messages window 14012). However, Jane's device 14000B displays the window controls having a greyed out appearance 14128 in screen-share window 14108. This provides an indication to Jane that the window is not adjustable because she is viewing a window that is displayed in John's shared screen.

In FIG. 14I, Jane selects control region status region 14045B-1 via input 14130 (e.g., a click input). In response, Jane's device 14000B displays listing 14142, which includes a list of Mountaineer members with an indication of whether the respective member is participating in the shared-content session, as well as an option to add additional contacts to the group, as shown in FIG. 14J.

Figure 14J:
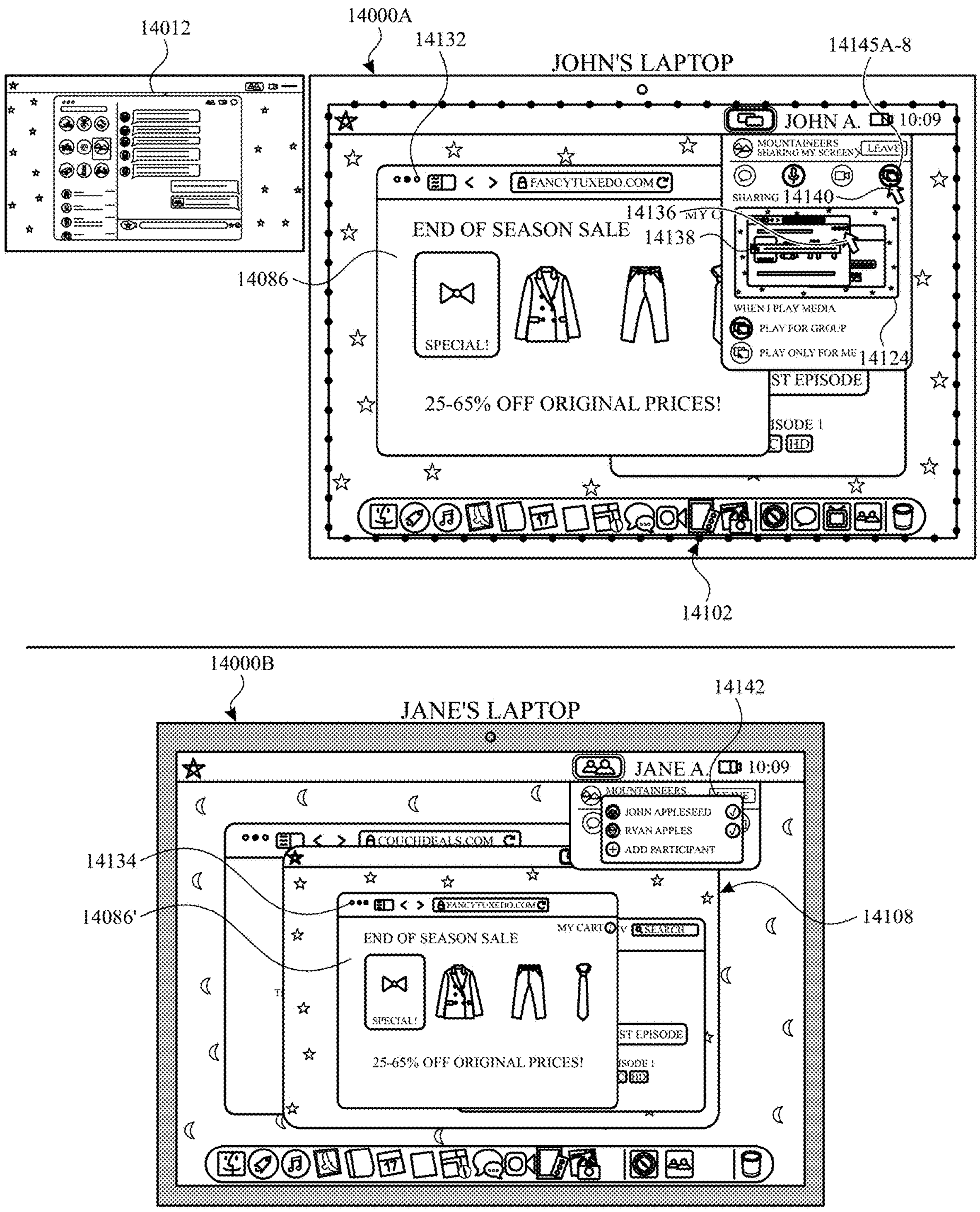

FIG. 14J depicts John's and Jane's devices 14000 after John has moved messages window 14012 and browser window 14086. Accordingly, browser window 14086 is displayed on John's desktop 14010, and messages window 14012 is displayed on monitor 14084. Sharing preview 14124 and screen-share window 14108 are updated in real time to depict the on-screen changes displayed on John's desktop 14010. Browser window 14086 includes window controls 14132, which are shown in a greyed out appearance 14134 on representation 14086' of browser window 14086 in screen-share window 14108 on Jane's device 14000B.

John can change the screen being shared using sharing preview 14124. For example, when John hovers cursor 14136 over sharing preview 14124, John's device 14000A displays change-shared-screen affordance 14138. If John selects affordance 14138, John's device 14000A prompts John to select a screen for display, similar to the embodiments discussed above with respect to FIGS. 14F and 14G. In some embodiments, John's device prompts John to select a screen for display in response to selecting (e.g., clicking) sharing preview 14124.

In FIG. 14J, John stops sharing his screen by selecting sharing option 14045A-8 via input 14140 (e.g., a click input). Accordingly, Jane's device 14000B stops displaying screen-share window 14108, as shown in FIG. 14K.

FIGS. 14K-14U illustrate example embodiments in which John shares a window with members of the Mountaineers group.

Figure 14K:
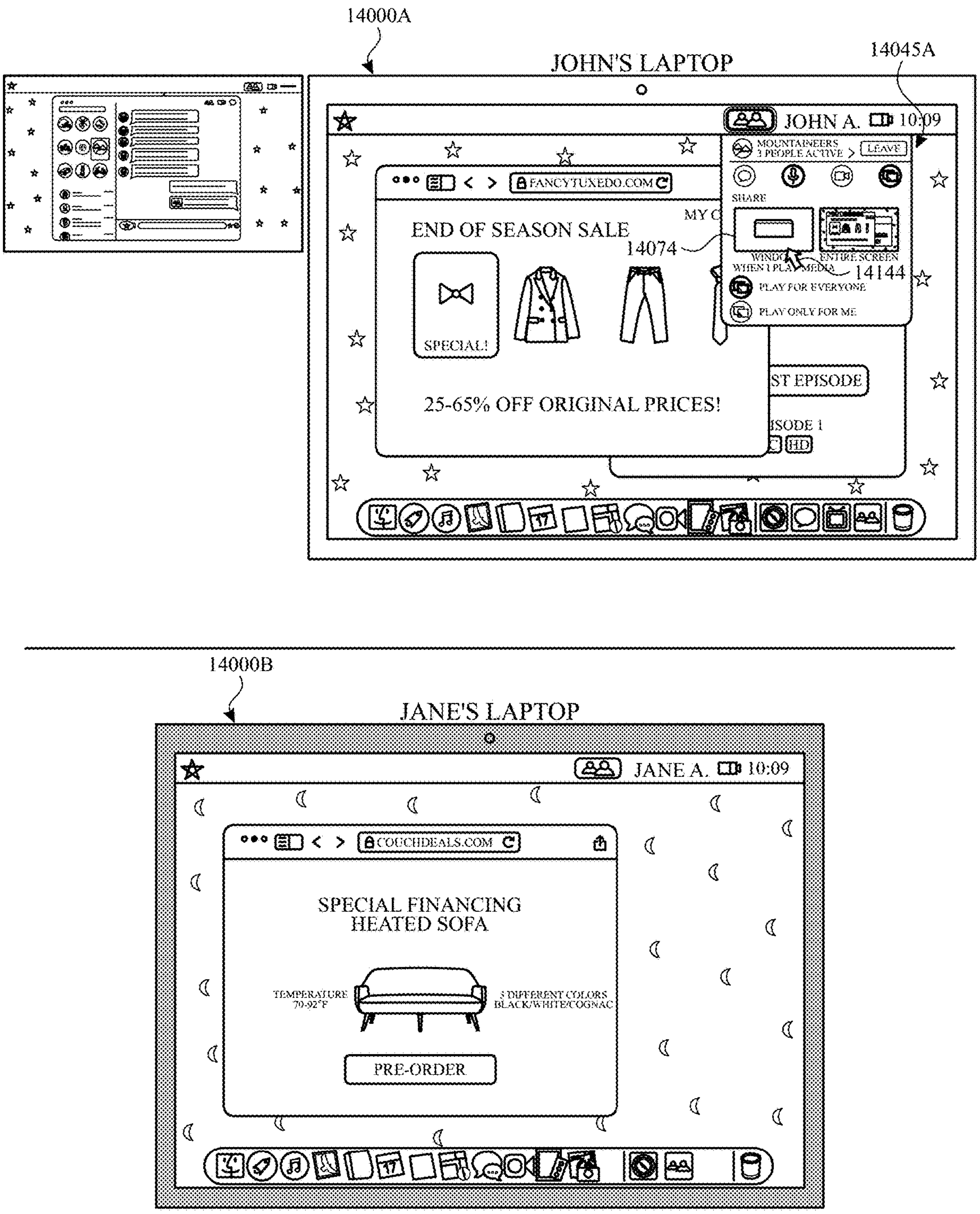
Figure 14L:
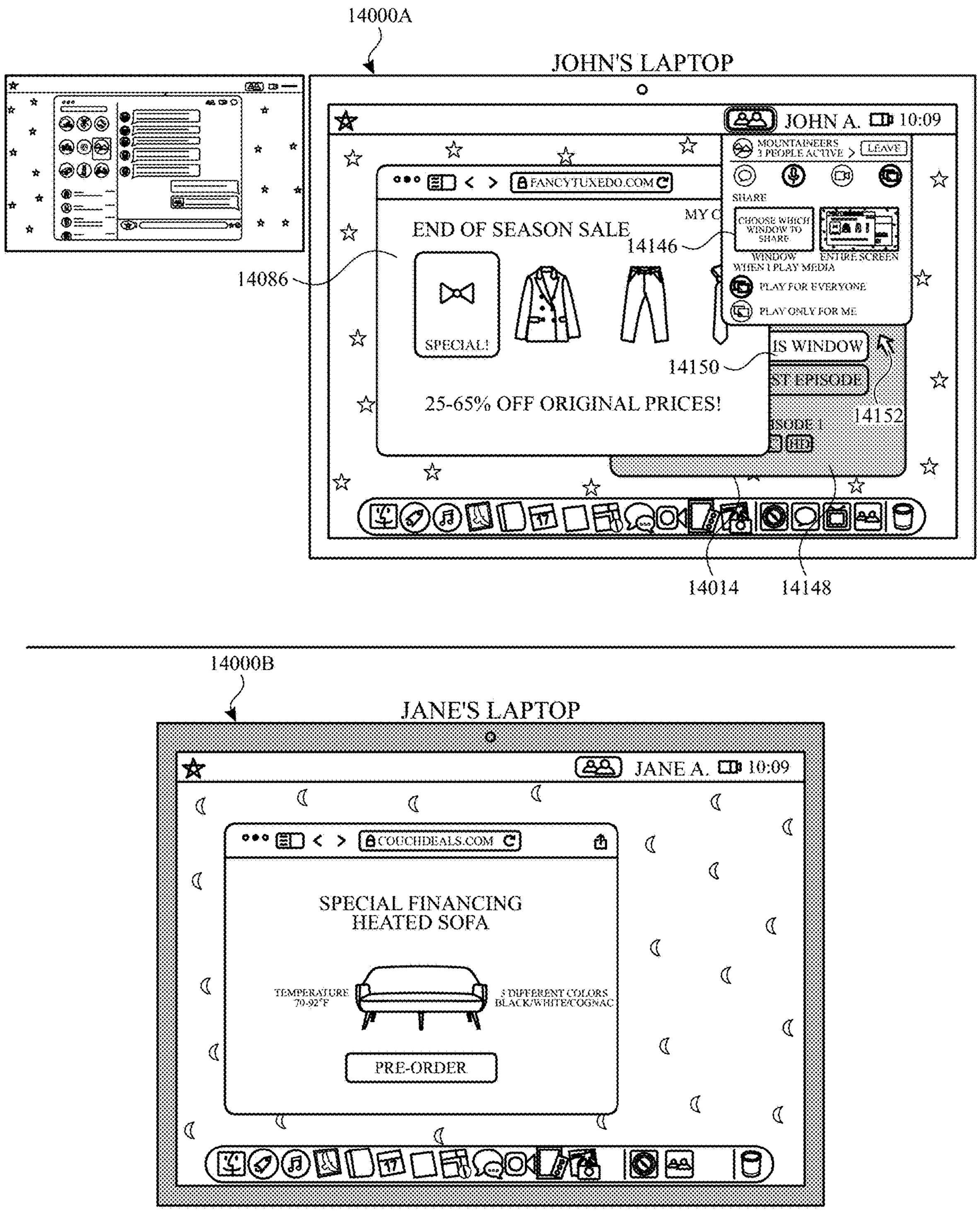

In FIG. 14K, control region 14045A displays window option 14074 and screen option 14076, as previously discussed with respect to FIG. 14E. John selects window option 14074 via input 14144 (e.g., a click input) to begin a process for sharing a window in the shared-content session, as shown in FIG. 14L. In some embodiments, John's device 14000A displays the embodiment depicted in FIG. 14K in response to detecting input 14140 in FIG. 14J.

In response to input 14144, John's device 14000A displays prompt 14146 prompting John to choose which window to share for the shared-content session. In FIG. 14L, John's device is displaying three windows (two at the laptop and one at monitor 14084), any of which can be shared in the shared-content session. To select a window for sharing, John hovers the cursor over a window, which causes John's device 14000A to highlight the window and display an affordance for selecting the window for sharing. For example, in FIG. 14L, John hovers cursor 14152 over TV app window 14014, and John's device 14000A displays highlighting 14148 and share affordance 14150. Selecting highlighted window 14014 brings the window to the foreground so that sharing affordance 14150 can be selected.

Figure 14M:
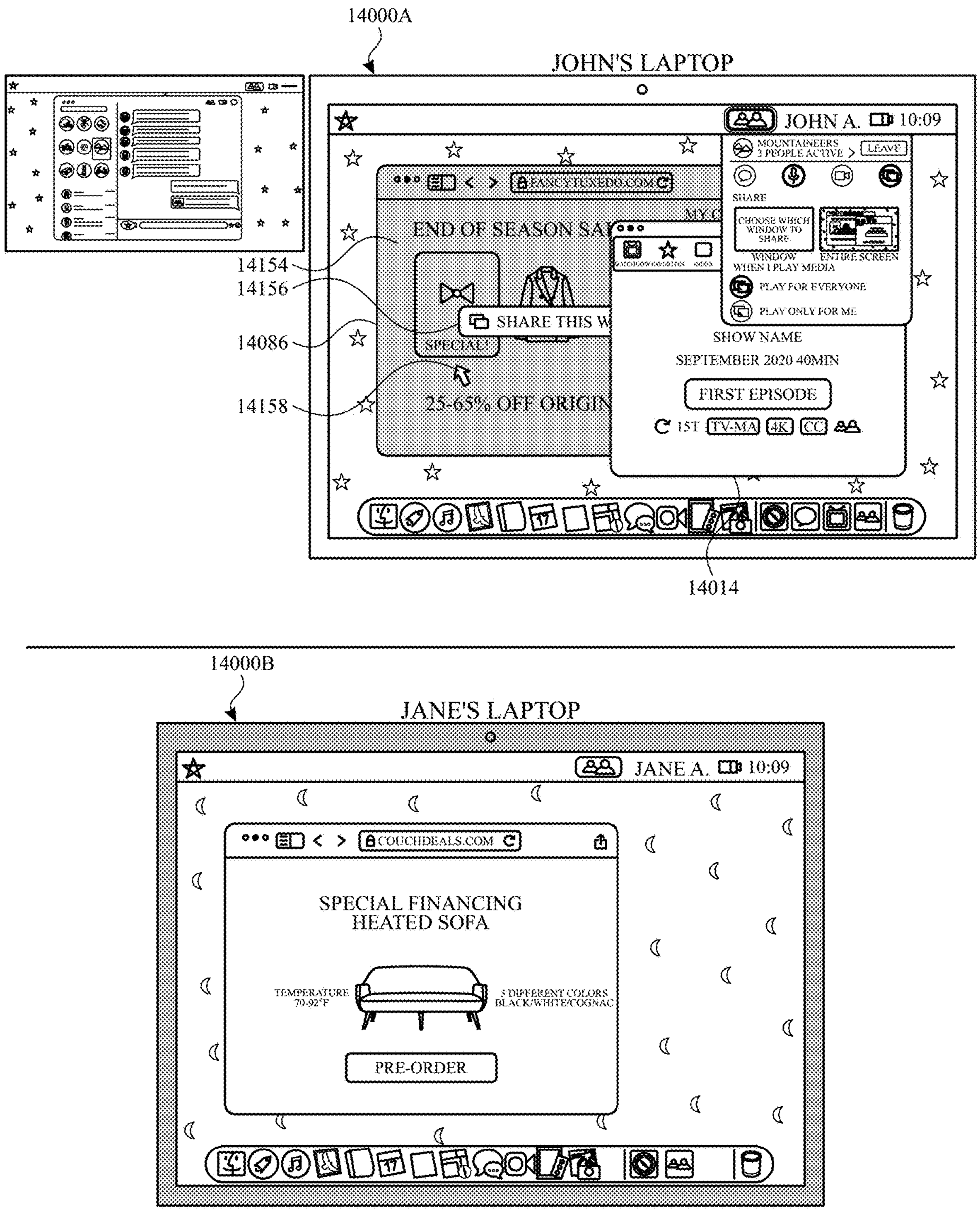
Figure 14N:
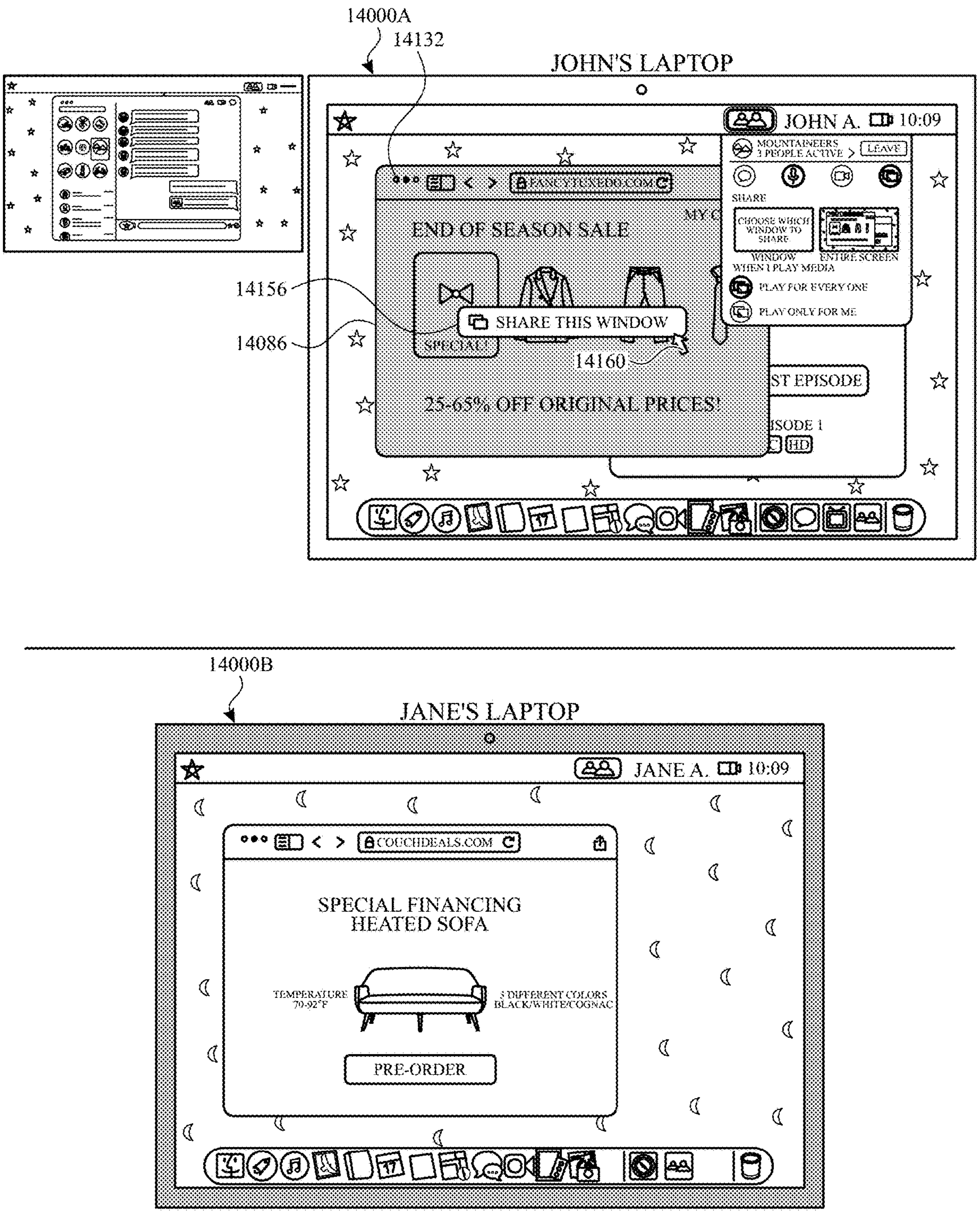

FIG. 14M shows John's device 14000A displaying TV app window 14014 in the foreground after clicking highlighted window 14014 in FIG. 14L, and moving cursor 14158 to hover over browser window 14086, which is now positioned behind TV app window 14014. Again, while hovering over browser window 14086, John's device 14000A displays highlighting 14154 and share affordance 14156 over the window. John clicks on highlighted window 14086 via cursor 14158 to bring the highlighted window to the foreground, as shown in FIG. 14N. John then selects share affordance 14156 via input 14160 (e.g., a click input) to start sharing browser window 14086 with the Mountaineers group, as shown in FIG. 14O.

Figure 14O:
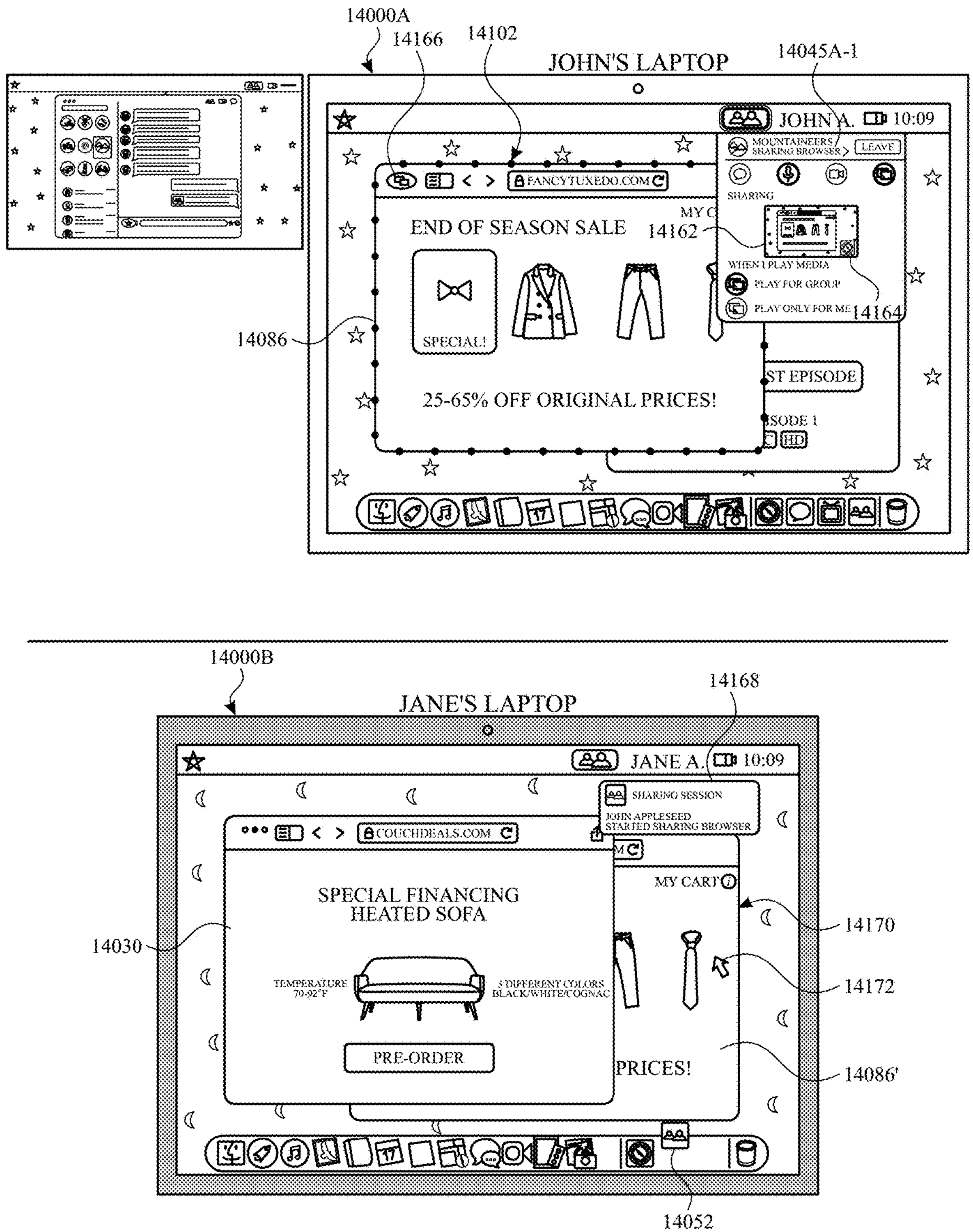

In FIG. 14O, John's device 14000A is sharing browser window 14086 with the Mountaineers group. Accordingly, control region 14045A is updated to indicate that John is sharing his browser as noted in control region status region 14045A-1 and preview 14162, which displays a real time representation of the window being shared. Control region 14045A also includes icon 14164 indicating that the shared window is from the browser app.

When a specific window is not being shared, the window is displayed with window controls, such as window controls 14132 shown on browser window 14086 in FIG. 14N. However, when the window is being shared, John's device 14000A changes the appearance of the shared window by replacing window controls 14132 with sharing-status affordance 14166. Sharing-status affordance 14166 is selectable to display additional controls for the shared-content session, as discussed in greater detail below, and serves as a visual reminder to John that the corresponding window is being shared in a shared-content session.

Jane's device 14000B displays notification 14168, animated sharing app icon 14052, and shared-content window 14170. Notification 14168 informs Jane that John started sharing his browser in the shared-content session. Jane's device 14000B displays shared-content window 14170 in the background, behind Jane's browser window 14030. Shared-content window 14170 is similar to screen-share window 14108, except that shared-content window 14170 displays the shared content of a single window, rather than the shared content of a screen. In FIG. 14O, shared-content window 14170 displays representation 14086' of browser window 14086. Jane selects shared-content window 14170 via input 14172 (e.g., a click input) to bring shared-content window 14170 to the foreground, as shown in FIG. 14P.

Jane's device 14000B shows shared-content window 14170 in the foreground in response to input 14172. Shared-content window 14170 depicts representation 14086' of browser window 14086. However, in the representation depicted in shared-content window 14170, sharing-status affordance is shown having a greyed out appearance 14176, indicating to Jane that she is viewing a window that is being shared with her device, and not a window that she is sharing with other participants in the shared-content session (in other words, indicating that Jane's device 14000B is receiving the shared window, not sharing the window).

FIGS. 14P-14W illustrate example embodiments in which the shared content is manipulated (e.g., resized and/or moved) by the sharing device (e.g., John's device 14000A) and/or the receiving device (e.g., Jane's device 14000B). In the embodiments depicted in FIGS. 14P-14W, the shared content is an application window. However, some aspects of the embodiments depicted in these figures are applicable when the shared content is a screen. For example, manipulation of the shared content at the recipient device (including display of chrome as discussed below) is applicable to embodiments in which the shared content received at the device is an application window and embodiments in which the shared content received at the device is a shared screen.

Figure 14P:
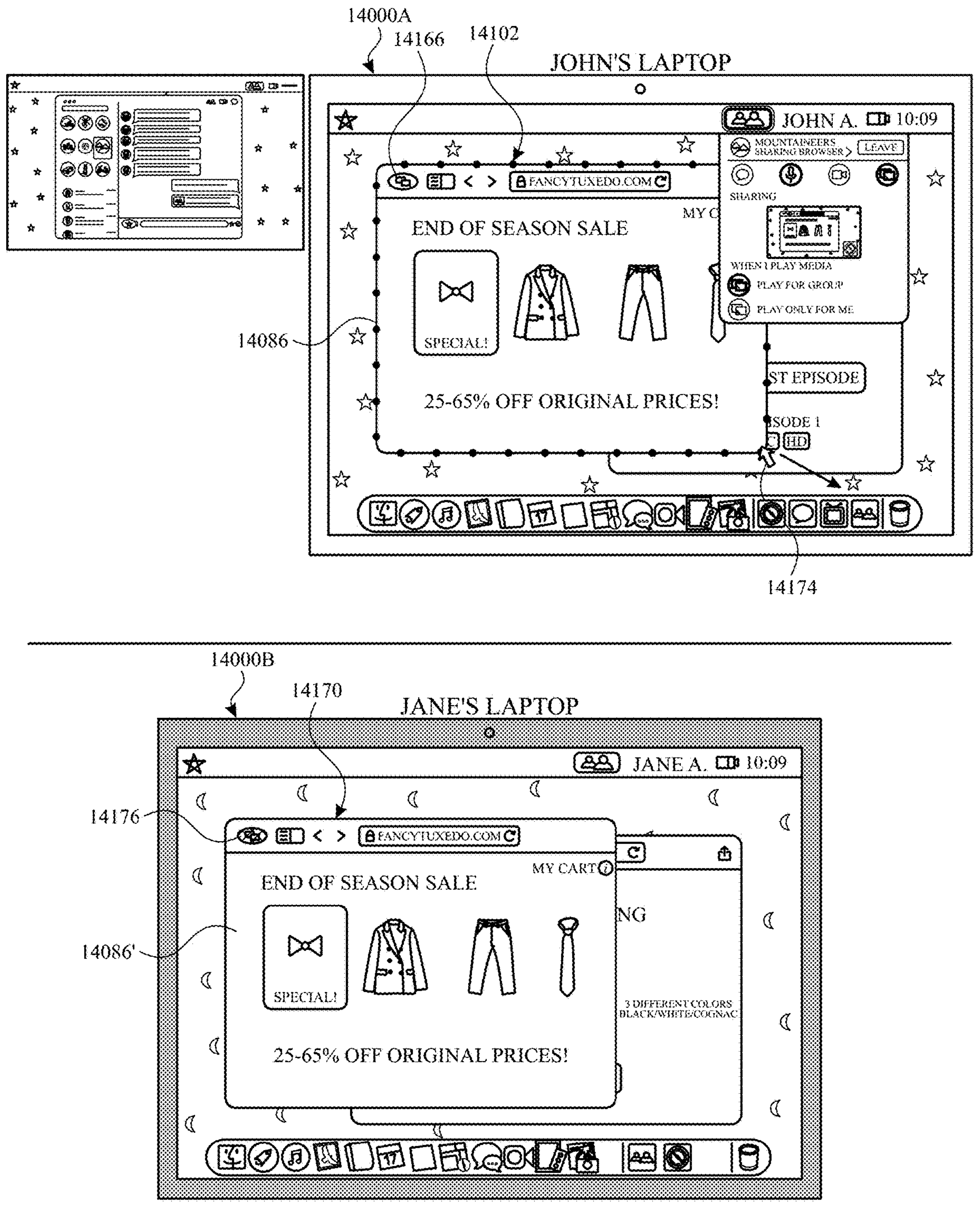

In FIG. 14P, John resizes (enlarges) browser window 14086 via input 14174 (e.g., a click-and-drag input).

Figure 14Q:
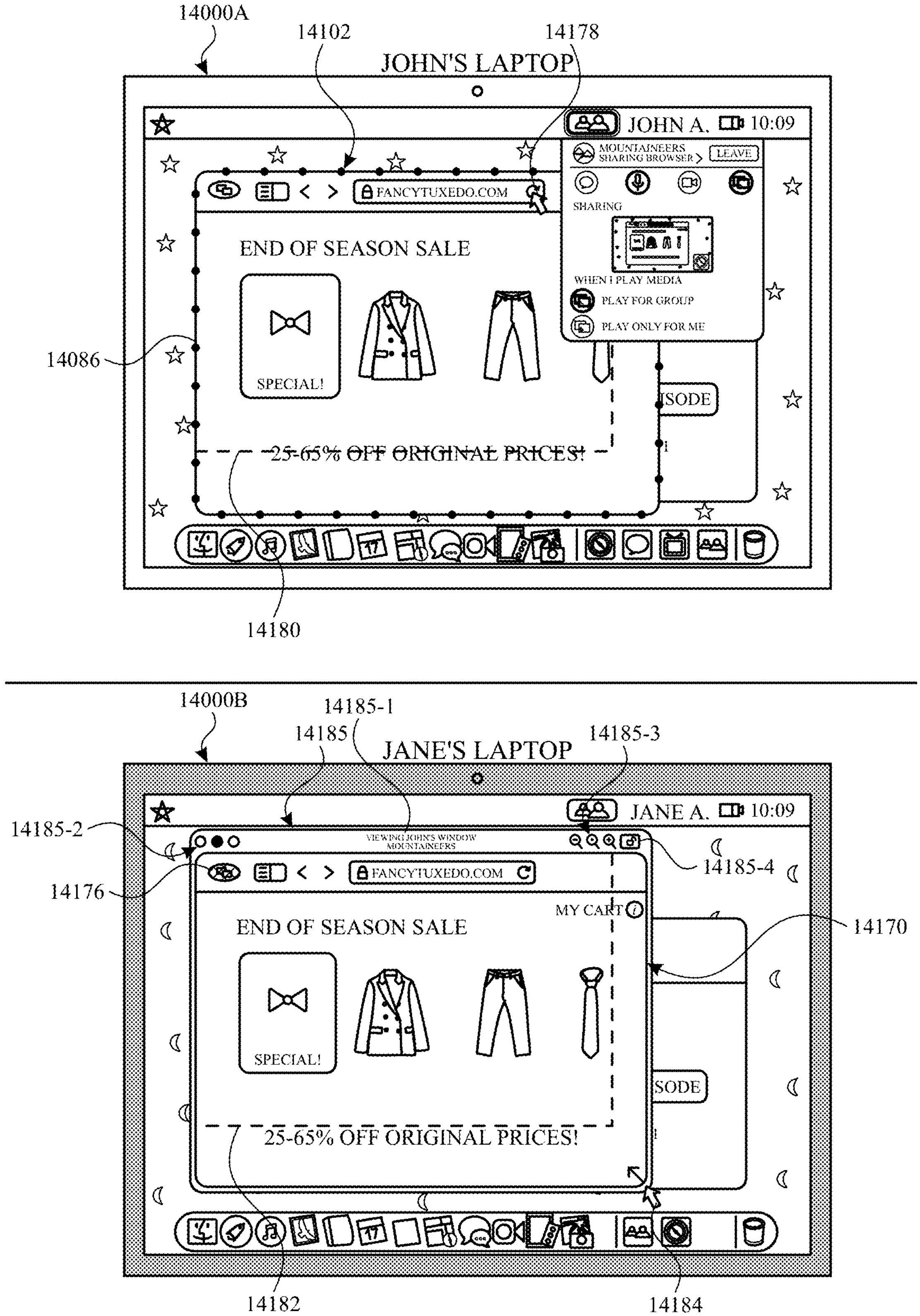

FIG. 14Q depicts browser window 14086 and shared-content window 14170 having enlarged sizes in response to John resizing browser window 14086 in FIG. 14P. In some embodiments, when a device is receiving shared content, the displayed representation of the shared content is capable of automatically resizing in response to a resizing of the shared content at the sharing device. For example, in FIGS. 14P and 14Q, John's device 14000A resizes shared browser window 14086, and Jane's device 14000B automatically resizes shared-content window 14170 based on the changed size of browser window 14086. In FIG. 14P, dashed lines 14180 represent the displayed size of browser window 14086 before it was enlarged, and dashed line 14182 represent the displayed size of shared-content window 14170 before it was enlarged. Dashed lines 14180 and 14182, and similar dashed lines described below, are not displayed on the respective devices 14000, but rather, are depicted in the figures as a visual aid to illustrate the changed sizes of the displayed windows.

In some embodiments, Jane's device 14000B displays additional information and controls for manipulating display of shared-content window 14170. The information and controls are displayed as a part of chrome 14185, which is displayed, in some embodiments, adjacent to shared-content window 14170 as shown in FIG. 14Q. Information 14185-1 provides additional context regarding the shared content. For example, in FIG. 14Q, information 14185-1 indicates that Jane's device is viewing John's window with the Mountaineers group. Chrome 14185 also includes window controls 14185-2, which can be selected to adjust a displayed state of shared-content window 14170. For example, window controls 14185-2 can be selected to close, minimize, enlarge, and/or reduce the size of shared-content window 14170. Chrome includes zoom controls 14185-3, which are selectable to adjust a displayed zoom level of the content depicted in shared-content window 14170. Chrome also includes size-lock affordance 14185-4, which is selectable to enable or disable automatic resizing of shared-content window 14170 in response to resizing of the window at the sharing device. In FIG. 14Q, size-lock affordance is shown in a disabled, or unlocked, state meaning that Jane's device 14000B automatically resizes shared-content window 14170 in response to a corresponding resize of the shared window (e.g., browser window 14086) at John's device 14000A.

In some embodiments, Jane's device 14000B does not display chrome 14185 unless certain conditions are met such as, for example, an input is detected at shared-content window 14170 or shared-content window 14170 is selected, within a particular size range, needs to be resized, or other relevant criteria are met. In FIG. 14Q, Jane's device 14000B displays chrome 14185, for example, because Jane's cursor is positioned at the corner of shared-content window 14170.

In FIG. 14Q, Jane slightly resizes shared-content window 14170 via input 14184 (e.g., a click-and-drag input). In some embodiments, resizing shared-content window 14170 automatically enables, or locks, size-lock affordance 14185-4, as discussed in greater detail below.

Figure 14R:
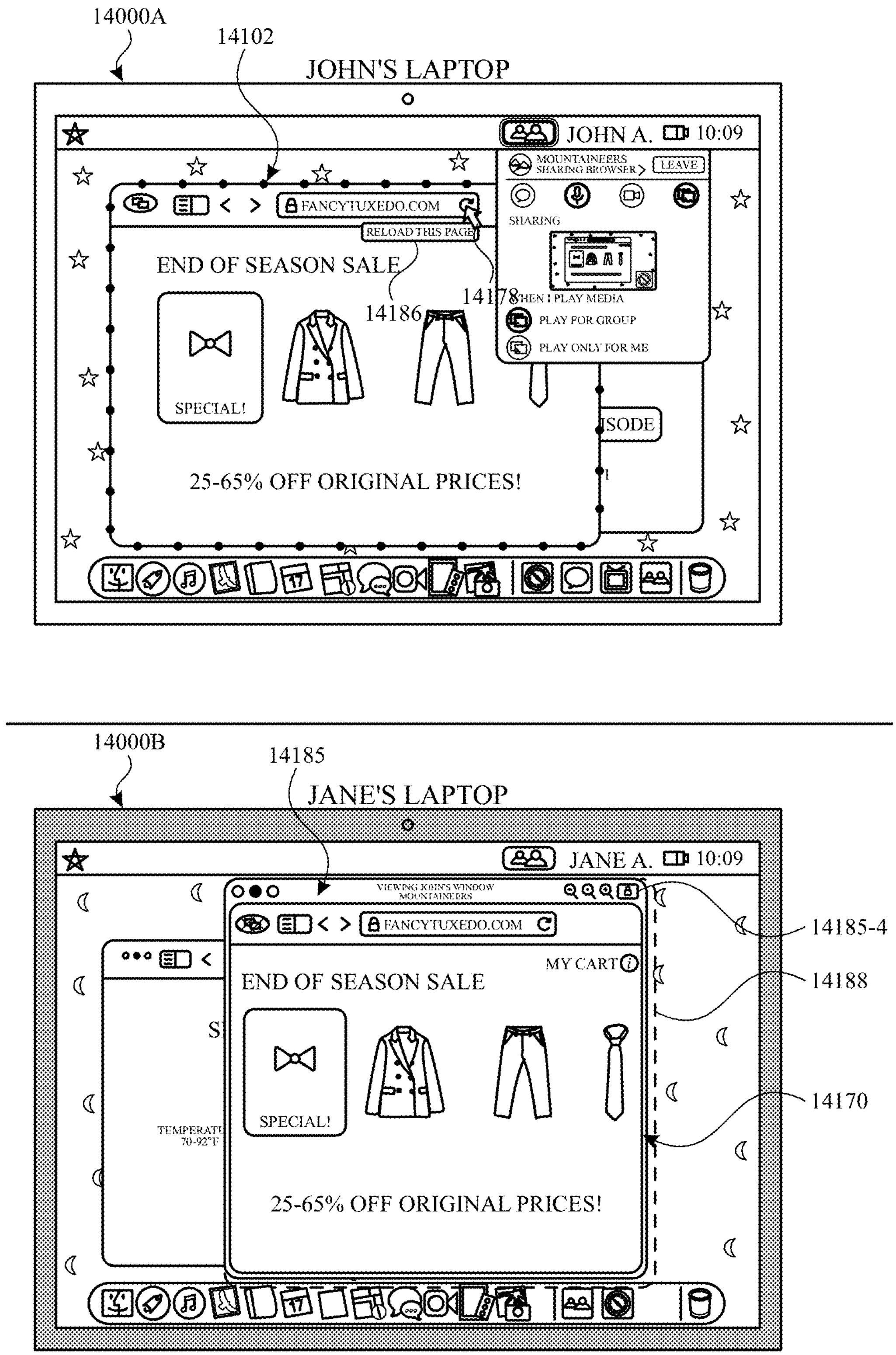

As shown in FIG. 14Q, after John resizes browser window 14086, cursor 14178 is positioned hovering over a refresh affordance in the browser window 14086, and remains positioned over the refresh affordance for at least an amount of time to cause John's device 14000A to display popover 14186, as shown in FIG. 14R. Although John's device is sharing browser window 14086 with the members of the Mountaineers group, ancillary user interface objects, such as popover 14186, are not included in the shared content. Accordingly, a representation of popover 14186 is not displayed in shared-content window 14170, as shown in FIG. 14R.

In FIG. 14R, shared-content window 14170 and, by association, chrome 14185 are reduced in size in response to input 14184 in FIG. 14Q, as indicated by dashed lines 14188. Additionally, size-lock affordance 14185-4 is enabled, or locked, as shown in FIG. 14R. Accordingly, if John resizes browser window 14086, Jane's device 14000B will not resize shared-content window 14170 in response.

Figure 14S:
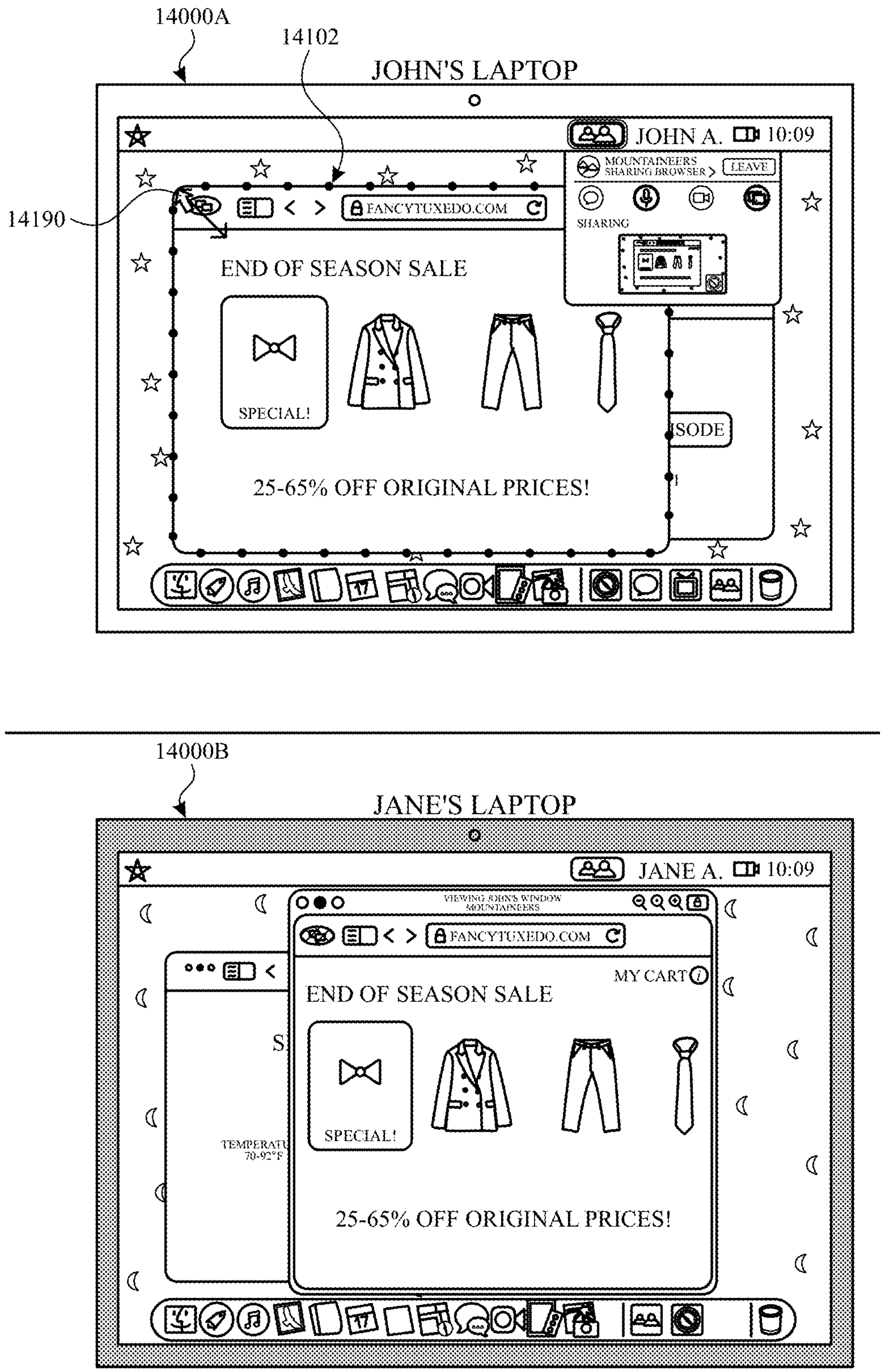
Figure 14T:
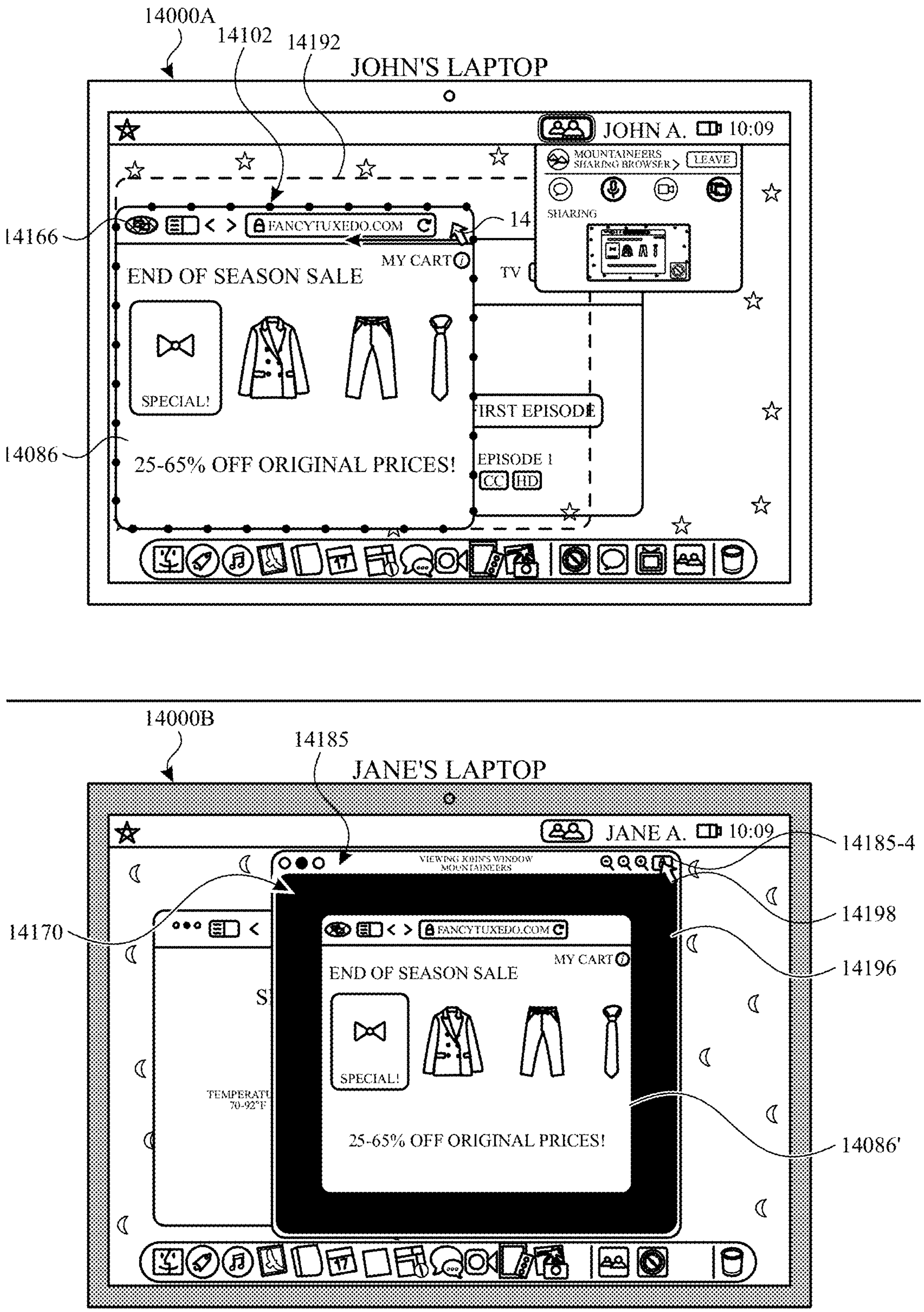

For example, in FIG. 14S, John resizes (e.g., reduces) browser window 14086 via input 14190 (e.g., a click-and-drag input). In FIG. 14T, John's device 14000A reduces the size of browser window 14086, as indicated by dashed lines 14192. However, Jane's device 14000B does not adjust the size of shared-content window 14170. Although Jane's device does not adjust the size of shared-content window 14170, it does scale the size of representation 14086' in accordance with the reduced size of browser window 14086 at John's device 14000A. In some embodiments, when the representation of the shared content is scaled down, Jane's device displays filler content 14196 (e.g., black bars) to fill at least a portion of shared-content window 14170 that is not occupied by the shared content caused by scaling down the representation of the shared content. In some embodiments, when size-lock affordance 14185-4 is enabled, Jane's device does not scale the representation of the shared content or adjust the size of shared-content window 14170 in response to a change in the size of the shared content at the sharing device.

In FIG. 14T, John shifts browser window 14086 partly off-screen via input 14194 (e.g., a click-and-drag input). In this embodiment, monitor 14084 is turned off or otherwise not available. Thus, as browser window 14086 moves off-screen, John's device 14000A shifts the position of sharing-status affordance 14166 on browser window 14086, to keep sharing-status affordance 14166 onscreen, as shown in FIG. 14U. In FIG. 14U, Jane's device 14000B displays representation 14086' of browser window 14086 in its entirety (including displaying greyed-out sharing-status affordance 14176 at its default location), even though browser window 14086 is partly off-screen, and thus, not fully displayed at John's device. In some embodiments, Jane's device 14000B displays representation 14086' of browser window 14086 in its entirety while displaying greyed-out sharing-status affordance 14176 at the shifted position on representation 14086' of browser window 14086. In some embodiments, Jane's device displays representation 14086' of browser window 14086 as it appears at John's device 14000A: partly visible with greyed-out sharing-state affordance 14176 at the shifted position.

In FIG. 14U, size-lock affordance 14185-4 is unlocked in response to input 14198 (e.g., a click input) in FIG. 14T. When size-lock affordance 14185-4 is unlocked, Jane's device 14000B automatically resizes shared-content window 14170 to fit the displayed size of representation 14086' of browser window 14086, as indicated by dashed lines 14200 in FIG. 14U.

Figure 14W:
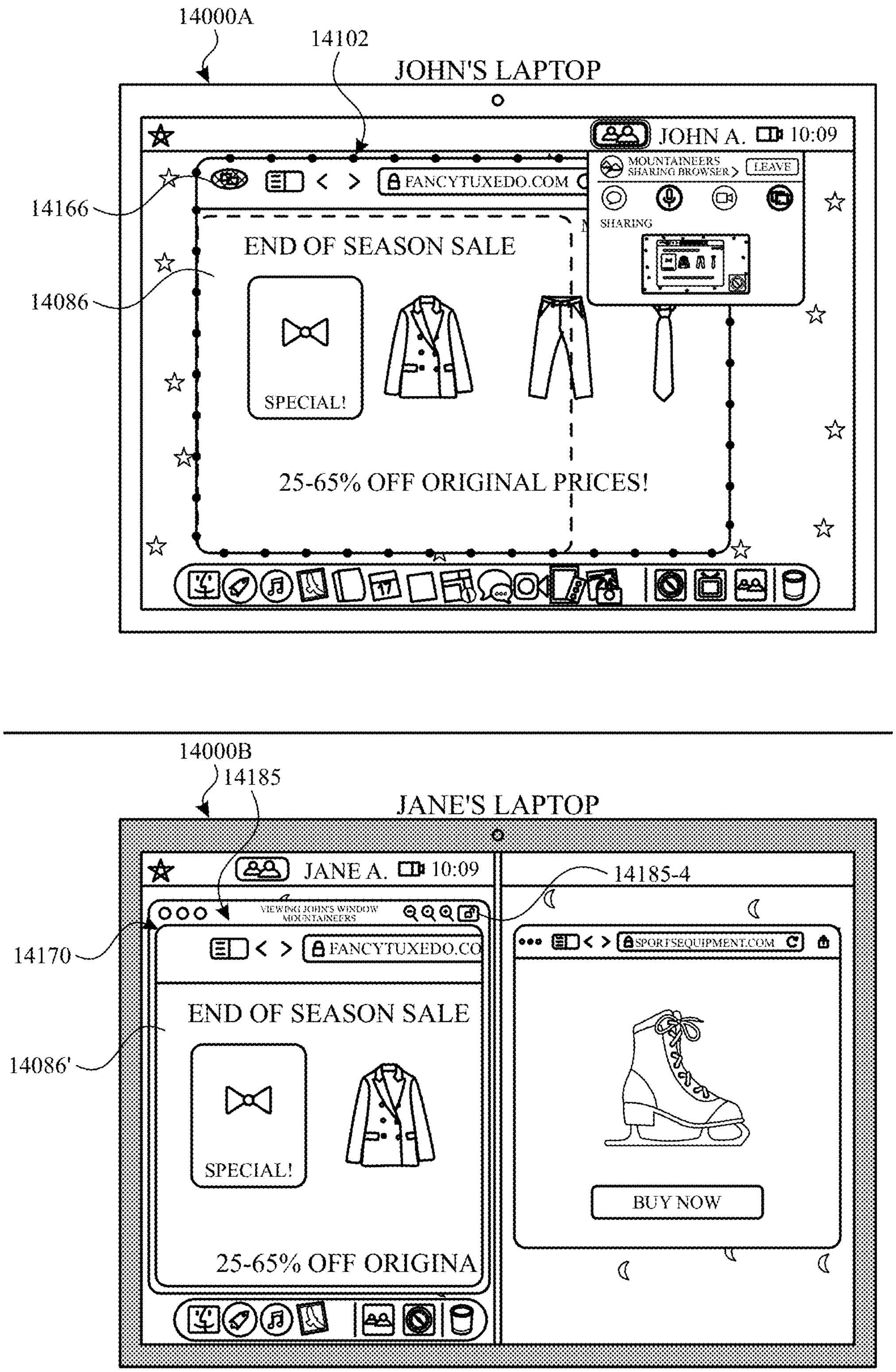

FIGS. 14V-14W illustrate an example embodiment in which Jane's device 14000B displays chrome 14185 in response to John resizing browser window beyond an available display region at Jane's device 14000B.

In FIG. 14V, John enlarges browser window 14086 via input 14202. Jane's device 14000B has a split-screen view in which content in region 14206 or region 14208 cannot be displayed across border 14204. Jane's device 14000B displays shared-content window 14170 in region 14208.

In FIG. 14W, John's device 14000A displays browser window 14086 enlarged to occupy a portion of John's display that is larger than region 14208 on Jane's device 14000B. Accordingly, Jane's device 14000B enlarges shared-content window 14170 until it occupies region 14208, and scales representation 14086' of browser window 14086 based on the change in size to browser window 14086. Because Jane's device 14000B is unable to resize shared-content window 14170 to match the proportions of browser window 14086, Jane's device displays chrome 14185, thereby providing controls (e.g., zoom controls 14185-3) for Jane to adjust (e.g., scale) the representation 14086' of browser window 14086.

Figure 14X:
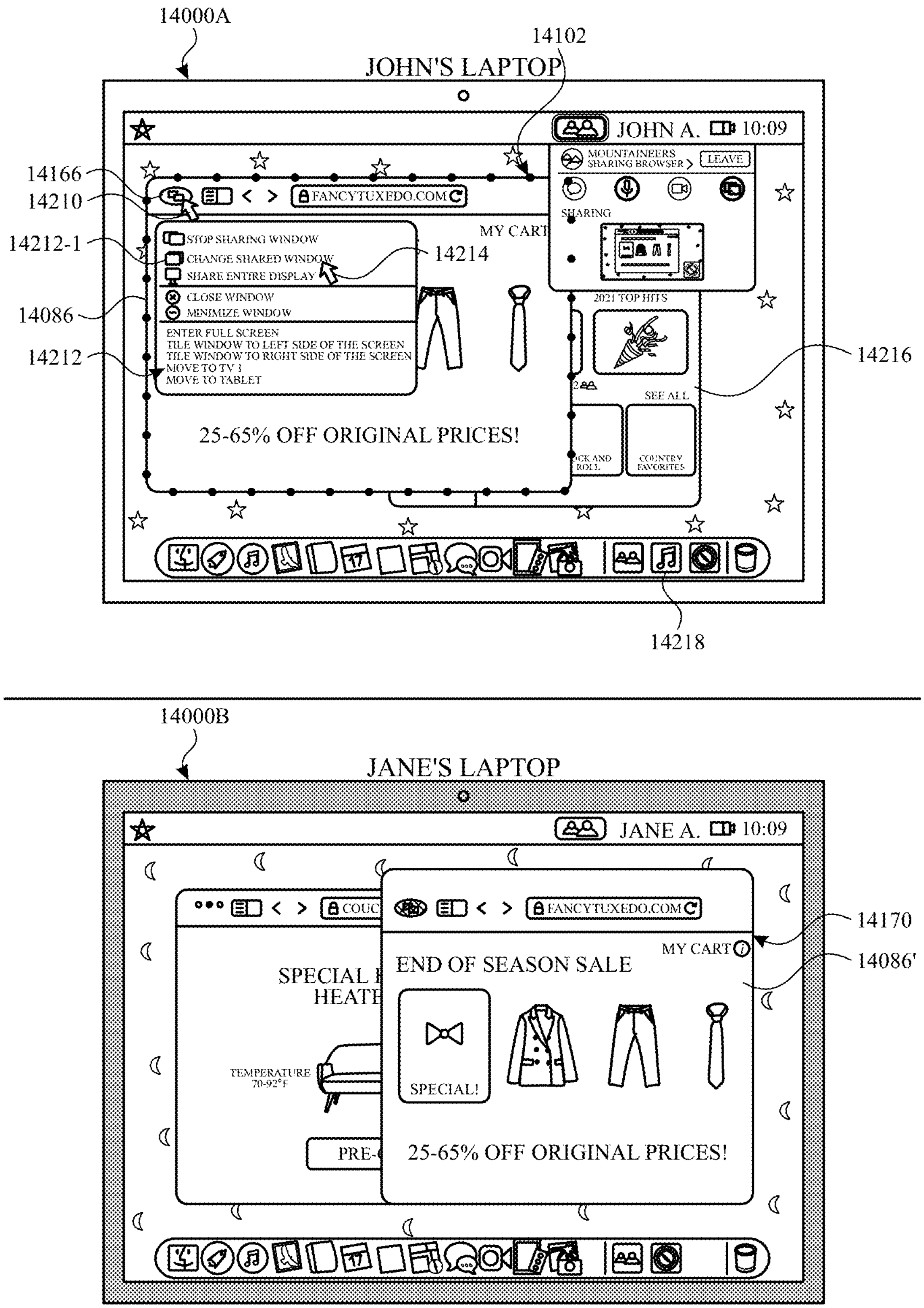
Figure 14Y:
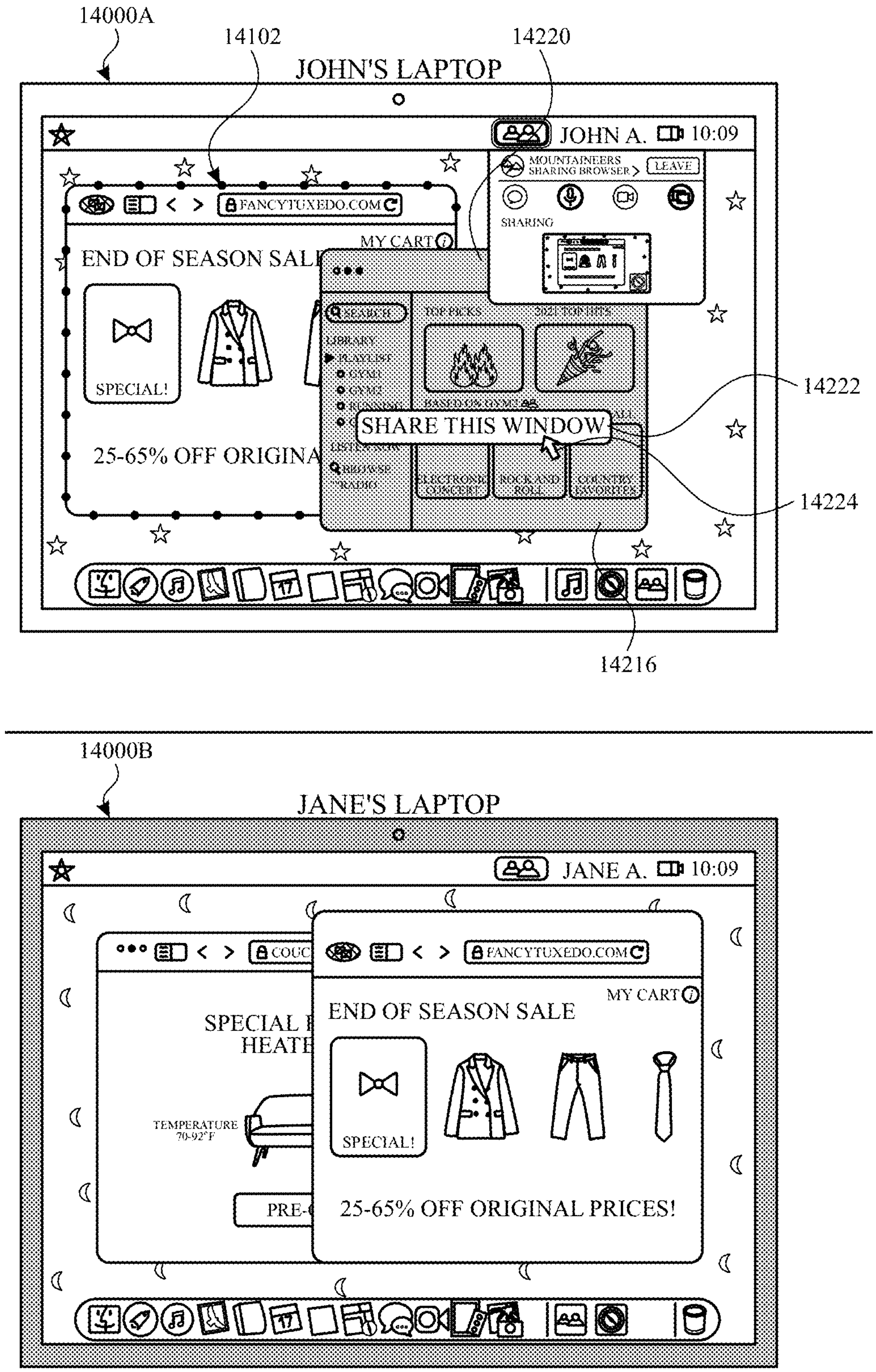
Figure 14Z:
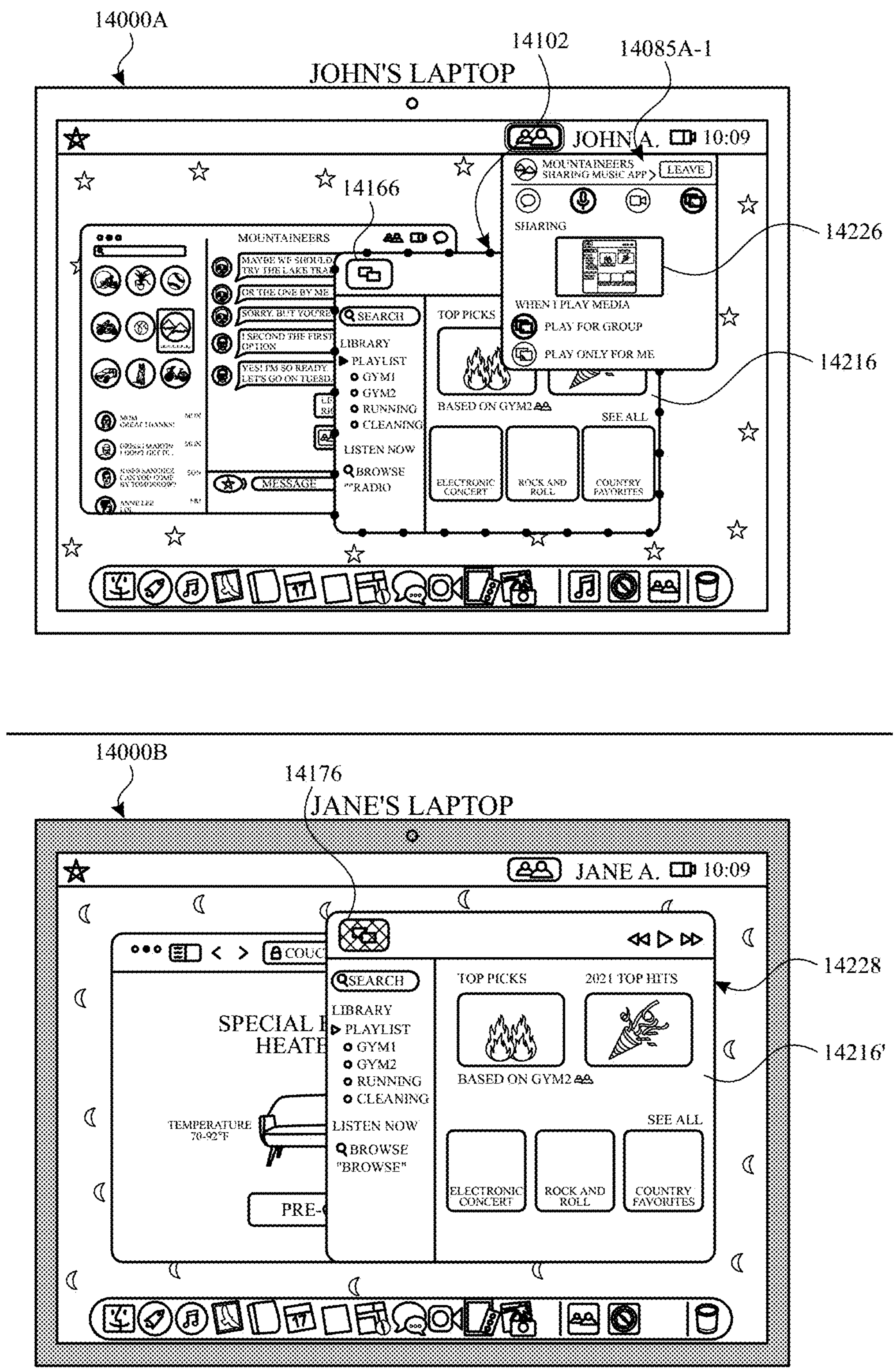
Figure 14A:
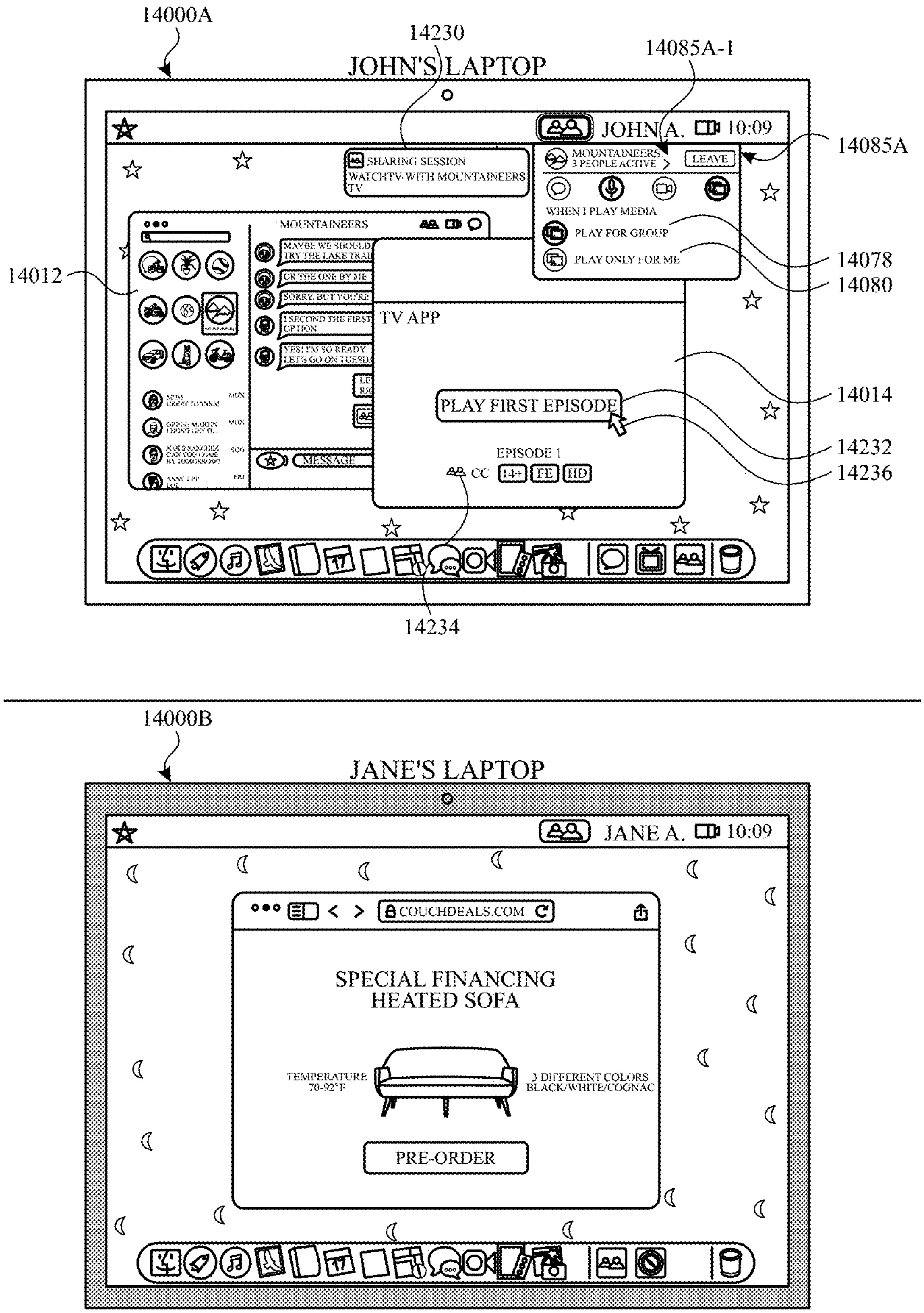
Figure 14A:
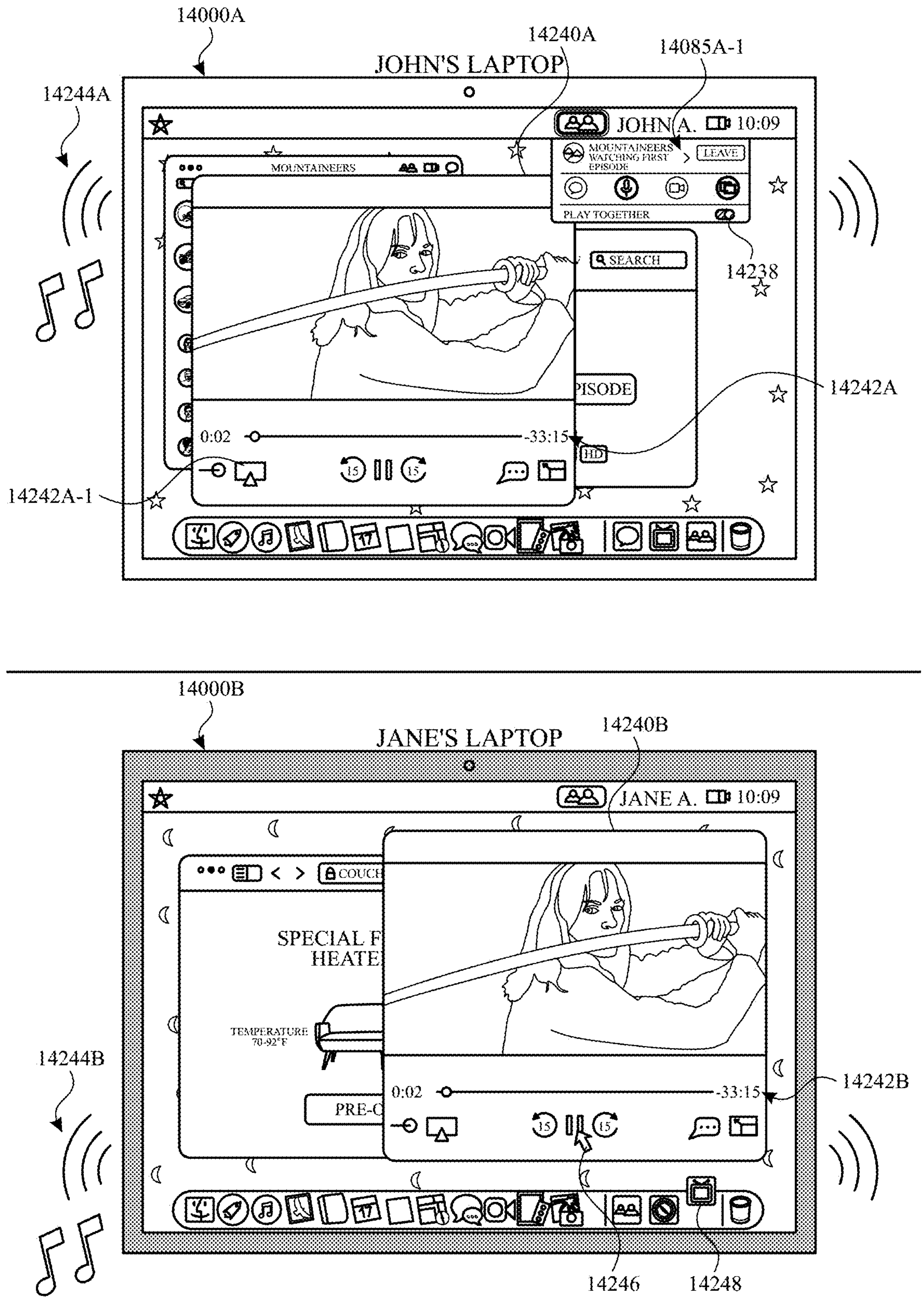
Figure 14A:
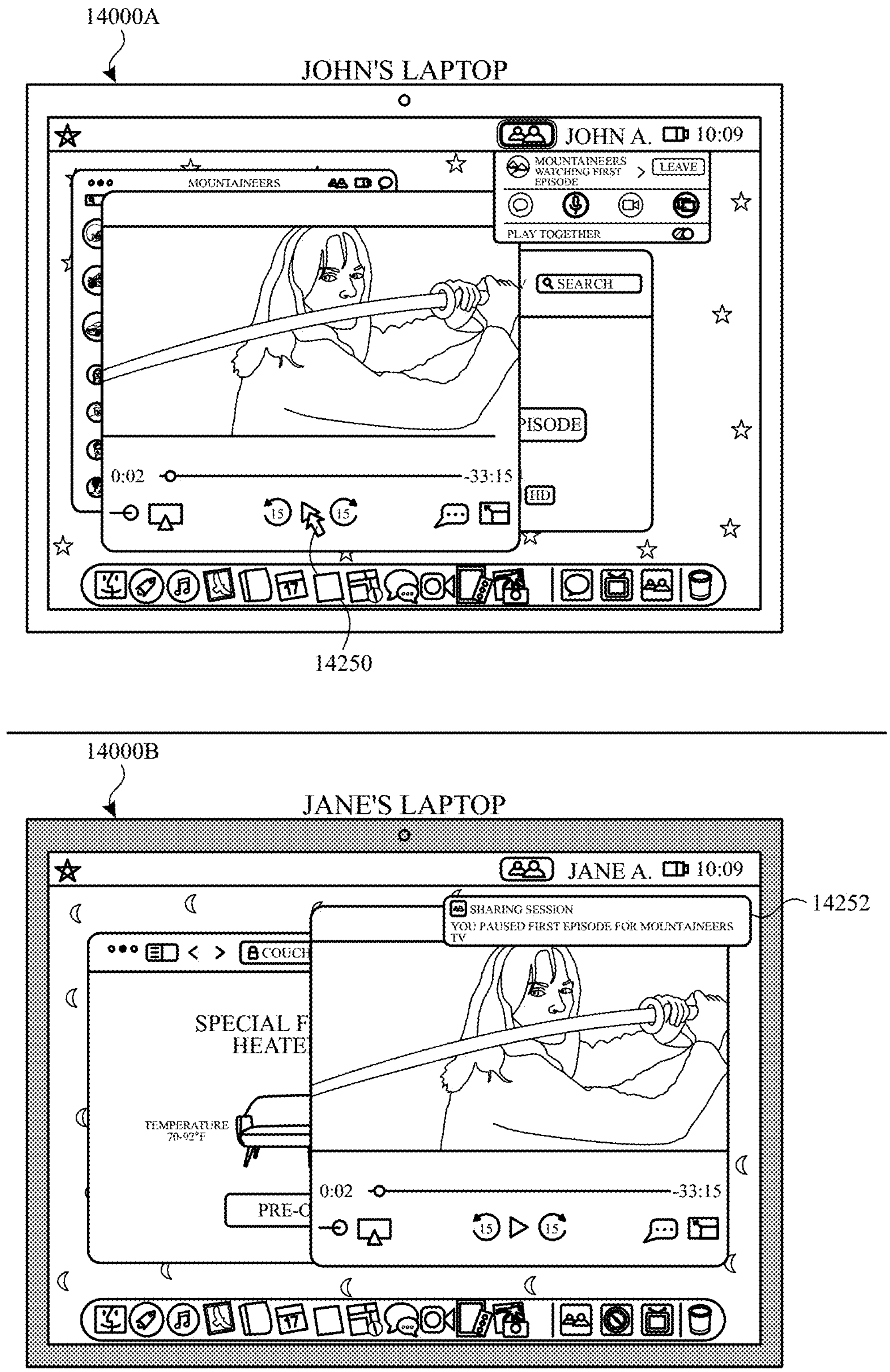
Figure 14A:
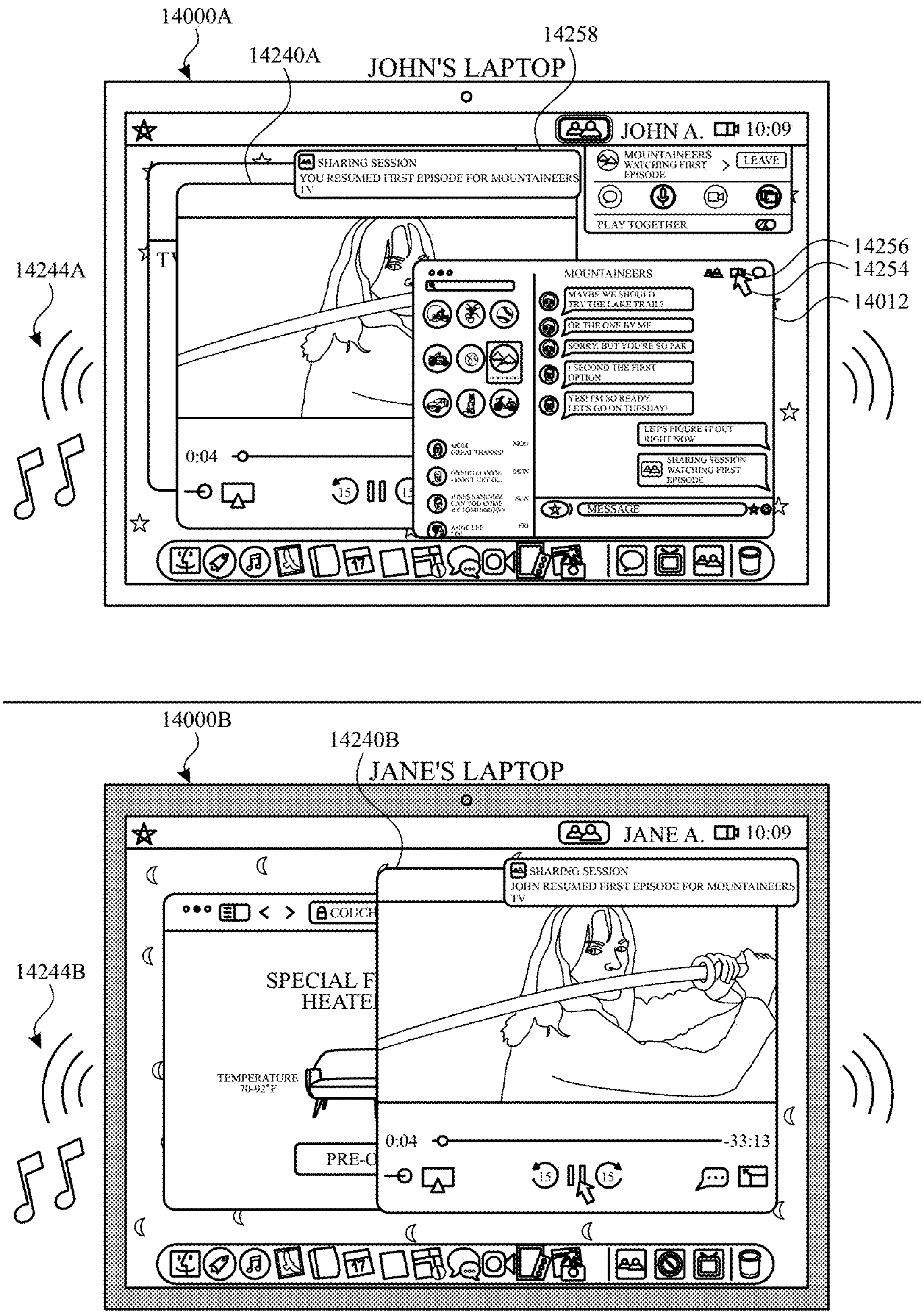
Figure 14A:
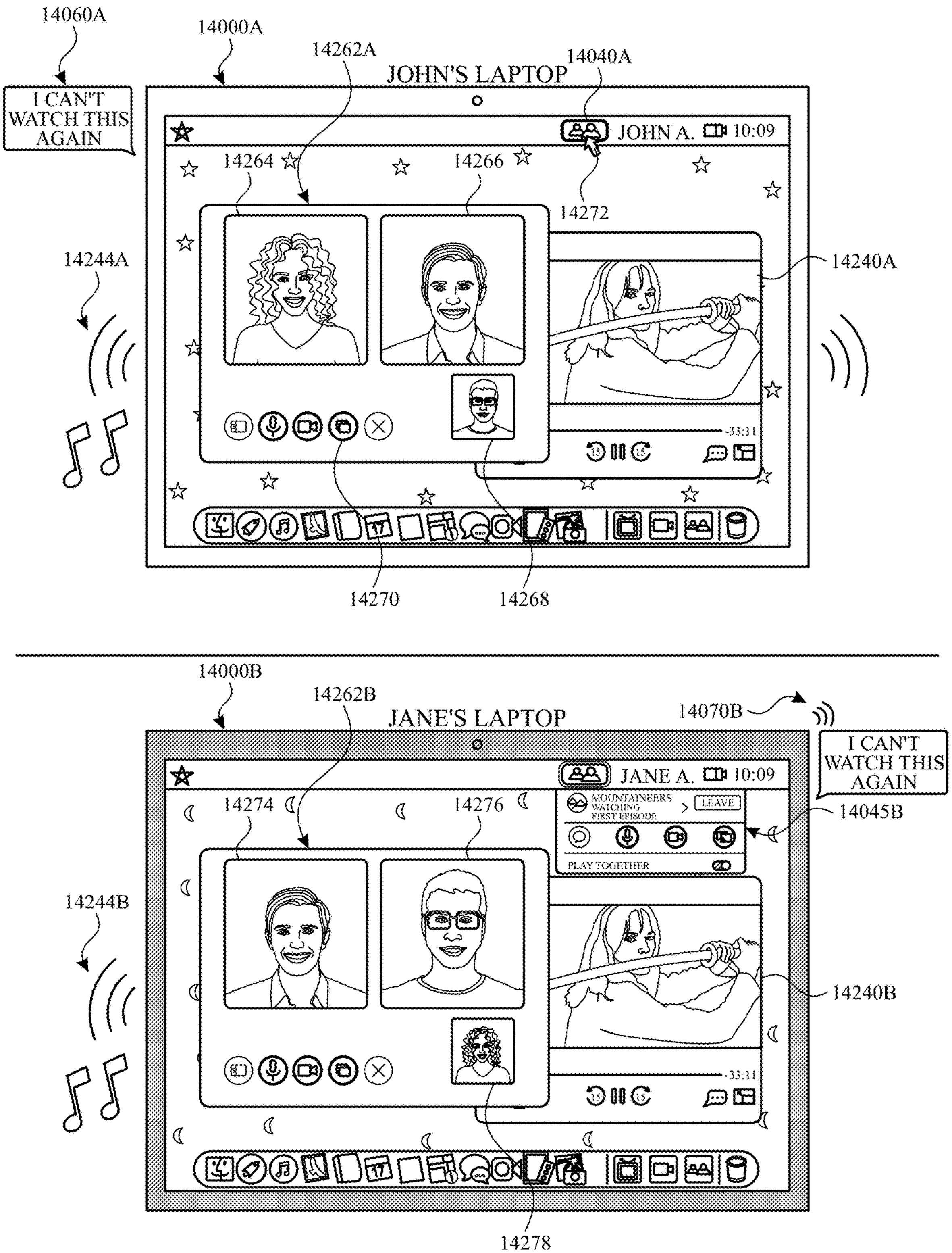
Figure 14A:
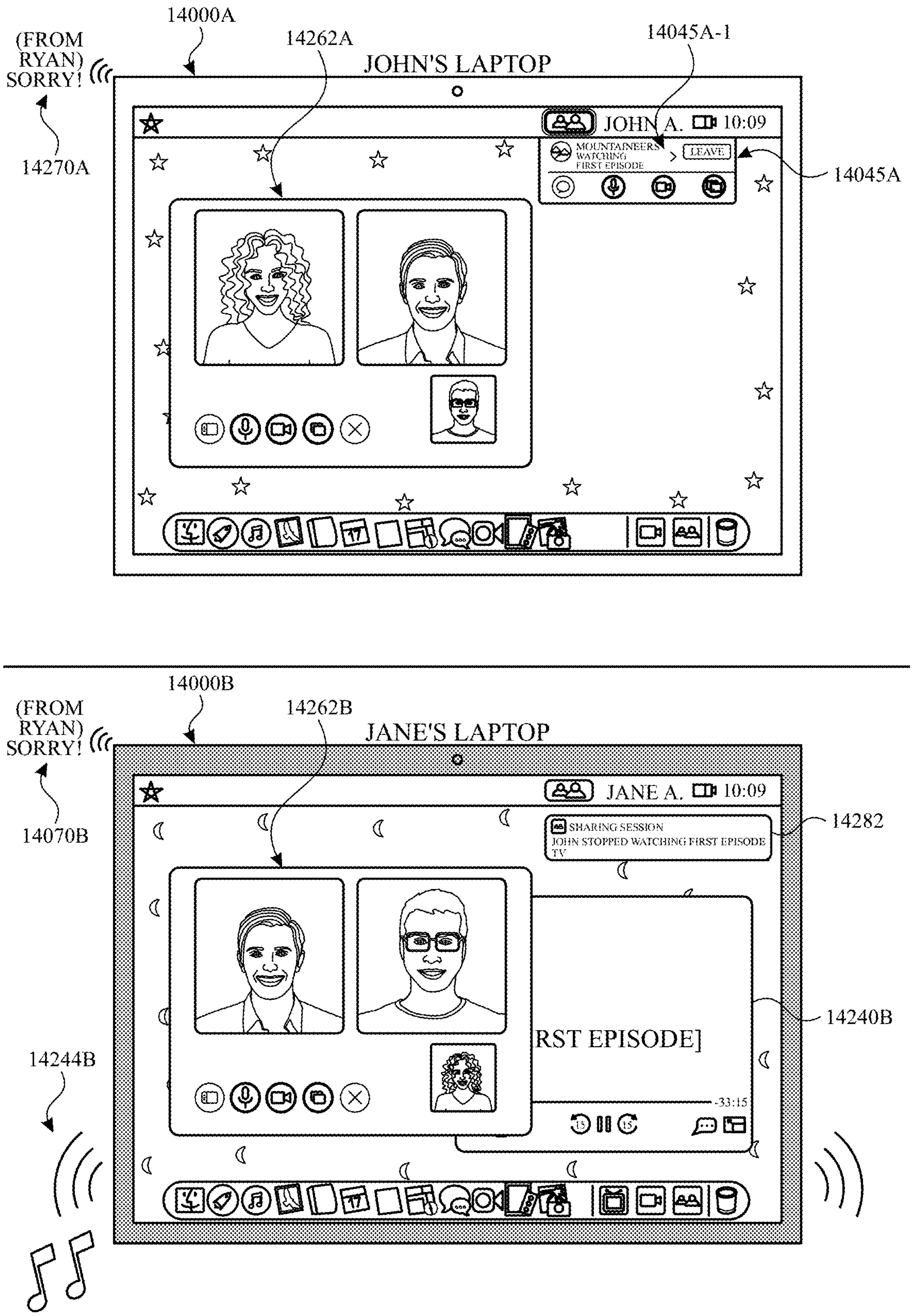

FIGS. 14X-14Z illustrate an embodiment in which John begins sharing a different window, using sharing-status affordance 14166.

In FIG. 14X, John's device 14000A displays browser window 14086 and music app window 14216. Because the music app is open, music app icon 14218 is displayed in dynamic region 14025A-1 of the dock. John's device is currently sharing browser window 14086 and displays menu 14212 in response to input 14210 on sharing-status affordance 14166. Menu 14212 includes various options for controlling aspects of the shared-content session including, for example, stopping the shared-content session, changing a shared window, sharing an entire display screen, closing the shared window, minimizing the shared window, entering or exiting a full-screen mode, moving the shared window, and transferring the window to a different device. In FIG. 14X John selects, via input 14214, option 14212-1 for changing a shared window.

In FIG. 14Y, John's device 14000A enters a window selection mode similar to that discussed above with respect to FIGS. 14L-14N. John selects music app window 14216 to bring it to the foreground, as shown in FIG. 14Y. John's device displays highlight 14220 and share affordance 14222. John selects music app window 14216 for sharing by selecting share affordance 14222 via input 14224. John's device 14000A then begins sharing music app window 14216 with the Mountaineers group as shown in FIG. 14Z. Jane's device 14000B displays content-sharing window 14228 (similar to content-sharing window 14170), which includes representation 14216' of music app window 14216.

FIGS. 14AA-14AG illustrate example embodiments in which John shares media content with the Mountaineers group in a shared-content session.

In FIG. 14AA, John's device 14000A is displaying messages window 14012 and TV app window 14014. TV app window 14014 is in the foreground, and John's device displays notification 14230 informing John that he can watch content with the Mountaineers group via the shared-content session. TV app window includes play affordance 14232, which is selectable to begin playing "First Episode." "First Episode" is capable of being added for playback in the shared-content session, as indicated by glyph 14234. Media playback option 14078 is currently enabled. Therefore, selecting media (e.g., "First Episode") for playback at John's device causes the participant devices of the shared-content session to also play the selected media at their respective devices, and to synchronize the playback with the other participants of the shared-content session.

In FIG. 14AA, John selects play affordance 14232 via input 14236 to begin playing "First Episode."

In FIG. 14AB, John's device displays media window 14240A for playing "First Episode." Media window 14240A includes playback controls 14242A and media transfer option 14242A-1, which is selectable to cause the media to be played at a different device, such as a TV. John's device outputs audio 14244A for "First Episode" and displays control region 14045A indicating the Mountaineers group is watching "First Episode." Media playback options 14078 and 14080 are replaced by "Play Together" toggle 14238, which is selectable to stop playback of media in the shared-content session.

In response to John starting playback of "First Episode" for the Mountaineers group, Jane's device 14000B launches TV app (as indicated by animated TV app icon 14248), displays media window 14240B, and begins playing "First Episode" at Jane's device. Jane's device is shown outputting audio 14244B for "First Episode." Jane pauses playback for the Mountaineers group via input 14246.

In FIG. 14AC, "First Episode" is paused at John's and Jane's devices 14000. Jane's device displays notification 14252 indicating that Jane paused "First Episode" for the Mountaineers group. In some embodiments, John's device optionally displays a similar notification. John resumes playback of "First Episode" via input 14250.

In FIG. 14AD, while playback of "First Episode" resumes, John's device 14000A displays messages window 14012. John's device also displays notification 14258 indicating that John resumed the show for the Mountaineers group. Notification 14260 is similar and displayed at Jane's device 14000B.

John selects video conference affordance 14256 via input 14254 to initiate a video conference with the Mountaineers group while they are watching "First Episode."

In FIG. 14AE, John's device 14000A displays video conference window 14262A showing video feeds 14264 and 14266 for Jane and Ryan, respectively, and camera preview 14268. Video conference window 14262A also includes various controls, including shared-content session control 14270, which is selectable to initiate or terminate a shared-content session with the Mountaineers group from the video conference app.

Similarly, Jane's device 14000B displays video conference window 14262B showing video feeds 14274 and 14276 for John and Ryan, respectively, and camera preview 14278. Jane, John, and Ryan are able to interact with each other via the video conference app while sharing content together via the shared-content session. John speaks to the group as indicated by input audio 14060A and output audio 14070B.

In FIG. 14AF, John deselects "Play Together" toggle 14238, via input 14280, to stop playing "First Episode" at John's device 14000A, while playback continues for the remaining members of the Mountaineers group.

As shown in FIG. 14AG, the shared-content session continues between John's device 14000A and the Mountaineers group, even though John's device is no longer playing "First Episode" with the other members of the Mountaineers group. Jane's device displays notification 14282 indicating that John stopped watching "First Episode." On John's device, control region status region 14045A-1 indicates that the Mountaineers group is watching "First Episode," even though John's device is not playing the show. In some embodiments, control region status region 14045A-1 can be selected to resume playback of "First Episode" with the Mountaineers group, at the same playback time as the other members of the Mountaineers group.

FIG. 15 is a flow diagram illustrating a method for adding content to a shared-content session using a computer system (e.g., 14000A) in accordance with some embodiments. Method 1500 is performed at a computer system (e.g., 14000A and/or 14000B) (e.g., a smartphone, a tablet, a desktop or laptop computer) that is in communication with one or more output generation components (e.g., 14001A and/or 14001B) (e.g., a display controller, a touch-sensitive display system, a speaker, a bone conduction audio output device, a tactile output generator, a projector, and/or a holographic display) and one or more input devices (e.g., 14001A, 14002A, 14003A, 14004A, 14005A, 14001B, 14002B, 14003B, 14004B, and/or 14005B) (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). Some operations in method 1500 are, optionally, combined, the orders of some operations are, optionally, changed, and some operations are, optionally, omitted.

As described below, method 1500 provides an intuitive way for adding content to a shared-content session. The method reduces the cognitive burden on a user for adding content to a shared-content session, thereby creating a more efficient human-machine interface. For battery-operated computing devices, enabling a user to add content to a shared-content session faster and more efficiently conserves power and increases the time between battery charges.

While a shared-content session between the computer system (e.g., 14000A) and one or more external computer systems (e.g., 14000B) is active and while a plurality of application interface regions (e.g., 14012 and/or 14014) (e.g., application windows) are concurrently displayed in a user interface (e.g., 14010) (1502), including at least a portion of a first application interface region (e.g., 14012 or 14014) (e.g., a first application window) and at least a portion of a second application interface region (e.g., 14012 or 14014) (e.g., a second application window), wherein the shared-content session, when active, enables the computer system (e.g., 14000A) to output respective content (e.g., synchronized content and/or screen-share content) while the respective content is being output by the one or more external computer systems (e.g., 14000B), the computer system (e.g., 14000A) receives (1504), via the one or more input devices (e.g., 14001A, 14002A, 14003A, 14004A, and/or 14005A), a set of one or more inputs (e.g., 14144 or selection of 14074) (e.g., a selection of a sharing affordance) corresponding to a request to add an application interface (e.g., content displayed at the computer system (e.g., an application window of an application operating at the computer system)) (e.g., screen-share content) to the shared-content session (e.g., the set of one or more inputs includes an input that corresponds to a request to add an application interface to the shared-content session).

In response to receiving a first input in the set of one or more inputs (and prior to adding a displayed application interface to the shared-content session), the computer system (e.g., 14000A) displays (1506), at a location in the user interface that is visually associated with (e.g., displayed adjacent to; displayed grouped together with) the first application interface region, a first graphical interface object (e.g., 14150 or 14156) (e.g., a sharing affordance that is associated with the first application window) that is selectable to add the first application interface region to the shared-content session without adding the second application interface region to the shared-content session, wherein the first graphical interface object is not visually associated with the second application interface region (e.g., the first graphical interface object is not displayed adjacent to and/or grouped together with the second application interface region). Displaying the first graphical interface object at a location in the user interface that is visually associated with the first application interface region in response to receiving a first input in the set of one or more inputs provides additional controls for adding content to the shared-content session without cluttering the user interface with additional displayed controls until an input is detected, provides feedback to a user of the computer system that the additional displayed controls are for controlling an aspect of the first application interface region, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, displaying the first graphical interface object (e.g., 14150 or 14156) includes displaying at least a portion of the first graphical interface object at a location on the first application interface region (e.g., a location that was displayed prior to receiving the set of one or more inputs corresponding to a request to add an application interface to the shared-content session) (e.g., the sharing affordance is displayed overlaid on the first application window). Displaying at least a portion of the first graphical interface object at a location on the first application interface region provides additional controls for adding content to the shared-content session without cluttering the user interface with additional displayed controls until an input is detected, provides feedback to a user of the computer system that the additional displayed controls are for controlling an aspect of the first application interface region, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 14000A) receives, via the one or more input devices (e.g., 14001A, 14002A, 14003A, 14004A, and/or 14005A), an input (e.g., 14152 or 14158) (e.g., a hover input; and/or hovering a cursor). In some embodiments, in response to receiving the input: in accordance with a determination that the input is directed to the first application interface region (e.g., 14014 or 14086) (e.g., the cursor is hovering over the first application window), the computer system (e.g., 14000A) displays the first application interface region (e.g., 14014) having a visual effect (e.g., highlighting, shading, bolding, outlining, and/or other emphasizing effect) while the computer system (e.g., 14000A) displays the second application interface region (e.g., 14086) without the visual effect. In some embodiments, in response to receiving the input: in accordance with a determination that the input is directed to the second application interface region (e.g., the cursor is hovering over the second application window), the computer system (e.g., 14000A) displays the second application interface region (e.g., 14086) having the visual effect while the computer system (e.g., 14000A) displays the first application interface region (e.g., 14014) without the visual effect. Displaying the first or second application interface region having the visual effect provides feedback to a user of the computer system that the first or second application interface region is capable of being selected for being added to the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the computer system (e.g., 14000A) receives, via the one or more input devices (e.g., 14001A, 14002A, 14003A, 14004A, and/or 14005A), an input (e.g., 14152 or 14158) corresponding to a selection of the first application interface region or the second application interface region (e.g., clicking on the first application window or the second application window). In some embodiments, in response to receiving the input corresponding to a selection of the first application interface region or the second application interface region: in accordance with a determination that the input is a selection of the first application interface region while the first application interface region has a first appearance (e.g., partially displayed and/or displayed in the background) corresponding to a first arrangement of the first application interface region and the second application interface region (e.g., 14000A in FIG. 14L) (e.g., the first application window is arranged behind the second application window), the computer system (e.g., 14000A) displays the first application interface region having a second appearance (e.g., fully displayed and/or displayed in the foreground) corresponding to a second arrangement of the first application interface region and the second application interface region different from the first arrangement (e.g., 14000A in FIG. 14M) (e.g., the first application window is arranged in front of the second application window). In some embodiments, in response to receiving the input corresponding to a selection of the first application interface region or the second application interface region: in accordance with a determination that the input is a selection of the second application interface region while the second application interface region has a third appearance (e.g., partially displayed and/or displayed in the background) corresponding to the second arrangement of the first application interface region and the second application interface region (e.g., the second application window is arranged behind the first application window), the computer system (e.g., 14000A) displays the second application interface region having a fourth appearance (e.g., fully displayed and/or displayed in the foreground) corresponding to the first arrangement of the first application interface region and the second application interface region (e.g., the second application window is arranged in front of the first application window).

In some embodiments, displaying the first application interface region having the second appearance in accordance with a determination that the input is a selection of the first application interface region includes displaying the first application interface region having the second appearance without adding the first application interface region to the shared-content session (e.g., 14000A in FIG. 14M) (e.g., the first application window is displayed in the foreground without adding the first application window to the shared-content session). In some embodiments, displaying the second application interface region having the fourth appearance in accordance with a determination that the input is a selection of the second application interface region includes displaying the second application interface region having the fourth appearance without adding the second application interface region to the shared-content session (e.g., 14000A in FIG. 14N) (e.g., the second application window is displayed in the foreground without adding the second application window to the shared-content session). Displaying the first application interface region having the second appearance without adding the first application interface region to the shared-content session, and displaying the second application interface region having the fourth appearance without adding the second application interface region to the shared-content session, allows a user of the computer system to quickly and easily view content before deciding to share it others and reduces the number of inputs at the computer system that would otherwise be required to navigate to the content, and avoids accidental sharing of the content in the shared-content session, thereby avoiding additional computations to be performed by the computer system. Reducing the number of inputs and computations performed by the computer system enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, displaying the first graphical interface object (e.g., the sharing affordance that is associated with the first application window) is performed in accordance with a determination that the first application interface region is in a foreground region of the user interface (e.g., 14086 in FIG. 14N) (e.g., is the window with a current input focus in the user interface). Displaying the first graphical interface object when the first application interface region is in a foreground region of the user interface provides additional controls for adding content to the shared-content session without cluttering the user interface with additional displayed controls until an input is detected, provides feedback to a user of the computer system that the additional displayed controls are for controlling an aspect of the first application interface region and/or the second application interface region, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, sharing affordances are not displayed on other windows that are not in the foreground region of the user interface, even if those windows are currently visible.

In some embodiments, in response to receiving the first input in the set of one or more inputs, the computer system (e.g., 14000A) displays, at a location in the user interface that is visually associated with the second application interface region (e.g., 14086), a third graphical interface object (e.g., 14156) (e.g., a sharing affordance that is associated with the second application window) that is associated with adding the second application interface region to the shared-content session (e.g., without adding the first application interface region to the shared-content session), wherein the third graphical interface object is displayed concurrently with the first graphical interface object (e.g., 14150) and is not visually associated with the first application interface region (e.g., 14014) (e.g., the third graphical interface object is displayed concurrently with the first graphical interface object and is not displayed adjacent to and/or grouped together with the first application interface region). Displaying the second application interface region having the third graphical interface object that is associated with adding the second application interface region to the shared-content session provides additional controls for adding content to the shared-content session without cluttering the user interface with additional displayed controls until an input is detected, provides feedback to a user of the computer system that the additional displayed controls are for controlling an aspect of the first application interface region and/or the second application interface region, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, sharing affordances are displayed for multiple windows concurrently. In some embodiments, a sharing affordance is selectable when the corresponding window is not in the foreground (e.g., is positioned at least partially behind one or more other windows). In some embodiments, a sharing affordance is selectable when the corresponding window is in the foreground.

In some embodiments, while the shared-content session between the computer system (e.g., 14000A) and one or more external computer systems (e.g., 14000B) is active, the computer system (e.g., 14000A) receives, via the one or more input devices (e.g., 14001A, 14002A, 14003A, 14004A, and/or 14005A), an input (e.g., 14160) directed to the first graphical interface object (e.g., 14156) (e.g., a sharing affordance that is associated with the first application window). In response to receiving the input directed to the first graphical interface object, the computer system (e.g., 14000A) adds the first application interface region to the shared-content session without adding the second application interface region to the shared-content session (e.g., causing the first application interface region to be displayed concurrently at the one or more external computer systems while the first application interface region is displayed at the computer system). Adding the first application interface region to the shared-content session without adding the second application interface region to the shared-content session in response to receiving the input directed to the first graphical interface object improves privacy by avoiding accidentally adding content to the shared-content session.

In some embodiments, in response to receiving a second input in the set of one or more inputs (e.g., a selection of a share affordance in a shared-content session object), and prior to displaying the first graphical interface object, the computer system (e.g., 14000A) concurrently displays: a first sharing option (e.g., 14076) that is selectable to add the user interface (e.g., 14010) that includes the plurality of application interface regions to the shared-content session (e.g., a share screen option), and a second sharing option (e.g., 14074) that is selectable to initiate a process for adding the first application interface region (e.g., 14014) or the second application interface region (e.g., 14012 or 14086) to the shared-content session (e.g., a share window option). Concurrently displaying the first sharing option that is selectable to add the user interface that includes the plurality of application interface regions to the shared-content session and the second sharing option that is selectable to initiate a process for adding the first application interface region or the second application interface region to the shared-content session provides additional controls for adding content to the shared-content session without cluttering the user interface with additional displayed controls until an input is detected, provides feedback to a user of the computer system that the additional displayed controls are for sharing the plurality of application interface regions, first application interface region, and/or the second application interface region, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, in response to receiving a selection of the first sharing option (e.g., 14074) or the second sharing option (e.g., 14076) (In some embodiments, and prior to displaying the first graphical interface object) (In some embodiments, and in lieu of displaying the first graphical interface object), the computer system (e.g., 14000A) displays a graphical representation of a countdown until content from the computer system (e.g., 14000A) is added to the shared-content session (e.g., a countdown of an amount of time (e.g., 5 seconds, 4 seconds, 3 seconds, 2 seconds) until the respective content (e.g., the user interface that includes the plurality of application interface regions; the first application interface region or the second application interface region) is added to the shared-content session) (In some embodiments, before the countdown is complete, the graphical representation of the countdown is selectable to terminate the process for adding the content to the shared-content session). Displaying the graphical representation of a countdown in response to receiving a selection of the first sharing option or the second sharing option provides feedback to a user of the computer system that the relevant content is about to be shared in the shared-content session, and provides additional controls for terminating the process for adding content to the shared-content session without cluttering the user interface with additional displayed controls until the countdown begins. Providing improved feedback and providing additional controls without cluttering the user interface enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while the shared-content session between the computer system (e.g., 14000A) and one or more external computer systems (e.g., 14000B) is active and the first application interface region (e.g., 14086) is in the shared-content session (e.g., the first application window is concurrently displayed at the one or more external computer systems while the first application window is being displayed at the computer system), the computer system (e.g., 14000A) displays the first application interface region including a sharing status affordance (e.g., 14166) that is selectable to display one or more options for performing a respective function associated with the shared-content session (e.g., stop sharing the application window, change the shared application window, and/or share the entire UI (displayed screen)). Displaying the first application interface region including a sharing status affordance that is selectable to display one or more options for performing a respective function associated with the shared-content session provides additional controls for managing the display of content being shared in the shared-content session without cluttering the user interface with additional displayed controls until an input is detected, provides feedback to a user of the computer system that the first application interface region is being shared, and avoids accidental inputs associated with controls that are displayed when the sharing status affordance is not displayed (e.g., minimizing/maximizing/closing the window). Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, at least a portion of the sharing status affordance is displayed at a location in the first application interface region that includes a first set of one or more controls (e.g., 14132) (e.g., close window control, minimize window control, and/or maximize window control) that are selectable for changing display of the first application interface region when the first application interface region is not added to the shared-content session. In some embodiments, when the first application interface region is not added to the shared-content session, the first application interface region includes the first set of one or more controls, and when the first application interface region is added to the shared-content session, the first set of one or more controls are replaced with the sharing status affordance. Displaying the sharing status affordance at a location in the first application interface region that includes a first set of one or more controls that are selectable for changing display of the first application interface region when the first application interface region is not added to the shared-content session provides additional controls for managing the display of content being shared in the shared-content session without cluttering the user interface with additional displayed controls until an input is detected, provides feedback to a user of the computer system that the first application interface region is being shared, and avoids accidental inputs associated with controls that are displayed when the sharing status affordance is not displayed (e.g., minimizing/maximizing/closing the window). Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while the computer system (e.g., 14000A) displays the first application interface region including the sharing status affordance, the computer system (e.g., 14000A) receives a selection (e.g., 14210) of the sharing status affordance (e.g., 14166). In response to receiving the selection of the sharing status affordance, the computer system (e.g., 14000A) displays one or more options (e.g., 14212 and/or 14212-1) for performing a respective function (e.g., stop sharing the application window, change the shared application window, and/or share the entire UI (displayed screen)) associated with the shared-content session (and/or one or more options for changing display of the first application interface region, for example options that correspond to functions of the first set of one or more controls, such as close the application window, minimize the application window, maximize the application window, enter a full screen mode, move the application window to a location on the screen, and/or move display of the application window to a different device). Displaying one or more options for performing a respective function associated with the shared-content session in response to receiving the selection of the sharing status affordance provides additional controls for managing the display of content being shared in the shared-content session without cluttering the user interface with additional displayed controls until an input is detected, provides feedback to a user of the computer system that the first application interface region is being shared, and avoids accidental inputs associated with controls that are displayed when the sharing status affordance is not displayed (e.g., minimizing/maximizing/closing the window). Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while the computer system (e.g., 14000A) displays the first application interface region (e.g., 14086) including the sharing status affordance (e.g., 14166), wherein the sharing status affordance is displayed at a first location (e.g., location of 14166 in FIG. 14S) (e.g., located in the top left corner of the first application window) in the first application interface region and the first application interface is displayed at a first location in the user interface (e.g., location of 14086 in FIG. 14S), the computer system (e.g., 14000A) receives a set of one or more inputs (e.g., 14190 and/or 14194) corresponding to a request to move a displayed location of the first application interface region. In some embodiments, in response to receiving the set of one or more inputs corresponding to the request to move the displayed location of the first application interface region, the computer system (e.g., 14000A) moves at least a portion of the first application interface region to a second location in the user interface (e.g., location of 14086 in FIG. 14T or 14U), including: in accordance with a determination that moving at least a portion of the first application interface region to the second location in the user interface causes the first location in the first application interface region to remain positioned within the user interface (e.g., 14000A in FIG. 14T) (e.g., the first location in the first application window is not moved off-screen), the computer system (e.g., 14000A) displays the sharing status affordance at the first location in the first application interface region while at least a portion of the first application interface region is displayed at the second location in the user interface (e.g., moving the first application window to the second location while continuing to display the sharing status affordance at the first location in the first application window). In some embodiments, in response to receiving the set of one or more inputs corresponding to the request to move the displayed location of the first application interface region, the computer system (e.g., 14000A) moves at least a portion of the first application interface region to a second location in the user interface, including: in accordance with a determination that moving at least a portion of the first application interface region to the second location in the user interface causes the first location in the first application interface region to be moved outside of the user interface (e.g., 14000A in FIG. 14U) (e.g., the first location in the first application window is moved off-screen), the computer system (e.g., 14000A) displays the sharing status affordance at a second location in the first application interface region (e.g., location of 14166 in FIG. 14U) (e.g., different (e.g., shifted, offset) from the first location in the first application interface region) while at least a portion of the first application interface region is displayed at the second location in the user interface (e.g., when the first application window is moved to the second location, the displayed location of the sharing status affordance is shifted so that the sharing status affordance remains displayed in the first application window even though the original location of the sharing status affordance is no longer displayed). Displaying the sharing status affordance at a second location in the first application interface region while at least a portion of the first application interface region is displayed at the second location in the user interface allows the user to manipulate the displayed arrangement of content on the user interface while providing additional controls for managing the display of content being shared in the shared-content session without cluttering the user interface with additional displayed controls until an input is detected. Providing additional control options without cluttering the user interface with additional displayed controls, and allowing the user to manipulate the arrangement of displayed content, enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while the shared-content session between the computer system (e.g., 14000A) and one or more external computer systems (e.g., 14000B) is active and the first application interface region is added to the shared-content session, the computer system (e.g., 14000A) displays a shared-content session object (e.g., 14045A-1) that includes a representation (e.g., 14162) of the first application interface region (e.g., a duplicate or preview of the shared first application window). Displaying a shared-content session object that includes a representation of the first application interface region while the shared-content session between the computer system and one or more external computer systems is active and the first application interface region is added to the shared-content session provides a privacy benefit to a user of the computer system by providing feedback to the user about the content that is being output in the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the shared-content session object includes information associated with the shared-content session and/or one or more selectable shared-content session function options that, when selected, cause the computer system to perform a respective function associated with the shared-content session.

In some embodiments, the shared-content session object (e.g., 14045A) is persistently displayed over any of the plurality of application interface regions (e.g., 14014 and/or 14086) displayed in the user interface (e.g., 14010) (e.g., the shared-content session object is always displayed on top of application windows, even if the application windows are moved to the foreground). Persistently displaying the shared-content session object over any of the plurality of application interface regions displayed in the user interface reduces the number of inputs at the computer system by quickly and easily providing additional controls for managing functions associated with the shared-content session and provides feedback to a user of the computer system that the shared-content session is active. Providing improved feedback and reducing the number of inputs for providing additional control options enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, displaying the shared-content session object that includes the representation of the first application interface region includes displaying a representation (e.g., 14166 or 14176) of a sharing status affordance that is displayed in the first application interface region (e.g., the representation of the shared first application window includes a representation of the sharing status affordance). Displaying the representation of a sharing status affordance that is displayed in the first application interface region provides feedback to a user of the computer system that the shared-content session is active and that the first application interface region is being shared in the shared-content session. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, displaying the shared-content session object (e.g., 14045A or 14085A) includes displaying a first option (e.g., 14078) (e.g., a "play for group" affordance (e.g., similar to the "play for group" option 6220-1 that is discussed with respect to FIG. 6AO)) that is selectable to enable a mode in which media content (e.g., audio and/or video content) that is compatible with being added to the shared-content session while the shared-content session is active is automatically added to the shared-content session when the media content is selected for output at the computer system (e.g., 14000A). Displaying a first option that is selectable to enable a mode in which media content that is compatible with being added to the shared-content session while the shared-content session is active is automatically added to the shared-content session provides additional controls for managing content shared during the shared-content session without cluttering the user interface with additional displayed controls until an input is detected, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, displaying the shared-content session object (e.g., 14045A or 14085A) includes displaying a second option (e.g., 14080) (e.g., a "play only for me" affordance) that is selectable to enable a mode in which media content (e.g., audio and/or video content) that is selected for output at the computer system (e.g., 14000A) while the shared-content session is active is not automatically added to the shared-content session. Displaying a second option that is selectable to enable a mode in which media content that is selected for output at the computer system while the shared-content session is active is not automatically added to the shared-content session provides additional controls for managing content shared during the shared-content session without cluttering the user interface with additional displayed controls until an input is detected, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, displaying the shared-content session object (e.g., 14045A or 14085A) includes displaying a third option (e.g., 14238) (e.g., a "play together" toggle) that is selectable to disable output (e.g., display, playback) of media at the computer system (e.g., 14000A) during the shared-content session (e.g., without removing the media from the shared-content session; while also terminating output of the media at the one or more external computer systems). In some embodiments, while the shared-content session between the computer system (e.g., 14000A) and one or more external computer systems (e.g., 14000B) is active, and first media content (e.g., 14240A) is being output at the computer system (e.g., 14000A) while the first media content (e.g., 14240B) is being output by the one or more external computer systems (e.g., 14000B), the computer system (e.g., 14000A) detects a selection (e.g., 14280) of the third option. In response to detecting selection of the third option, the computer system (e.g., 14000A) terminates output of the first media content at the computer system (e.g., 14000A) while the shared-content session remains active (e.g., and the first media content continues to be output by the one or more external computer systems or also terminating output of the first media content at the one or more external computer systems). Terminating output of the first media content at the computer system while the shared-content session remains active enhances the user experience of the computer system by allowing a user of the computer system to quickly terminate playback of media content without also terminating the shared-content session, thereby allowing the user to enjoy other features of the shared-content session. Displaying the third option that is selectable to disable output of media at the computer system during the shared-content session provides additional controls for managing content shared during the shared-content session without cluttering the user interface with additional displayed controls until an input is detected, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the third option can be selected after terminating output of the first media content at the computer system (e.g., in response to the computer system closing an application used to output the first media content) to resume output of the first media content at the computer system while the shared-content session remains active and the first media content continues to be output by the one or more external computer systems. In some embodiments, when the output of the first media content resumes, the first media content is output having an elapsed time from when the computer system terminated output of the first media content (e.g., the first media playback does not resume at the point at which the computer system terminated its output, but instead resumes at the time that is currently output at the one or more external computer systems).

In some embodiments, the set of one or more inputs corresponding to a request to add an application interface to the shared-content session includes a selection of a sharing affordance that is displayed in a video conferencing application interface (e.g., during an ongoing video conference that includes video representations of one or more other participants in the video conference). In some embodiments, the shared-content session includes participants from the video conference (e.g., the participants in the video conference are invited to or automatically added to the video conference).

Note that details of the processes described above with respect to method 1500 (e.g., FIG. 15) are also applicable in an analogous manner to the methods described below and above. For example, methods 700, 800, 900, 1000, 1100, 1200, 1300, 1600, 1700, and/or 1800 optionally include one or more of the characteristics of the various methods described above with reference to method 1500. For brevity, these details are not repeated.

FIG. 16 is a flow diagram illustrating a method for displaying a representation of content in a shared-content session using a computer system (e.g., 14000B) in accordance with some embodiments. Method 1600 is performed at a computer system (e.g., 14000B) (e.g., a smartphone, a tablet, a desktop or laptop computer) that is in communication with one or more output generation components (e.g., a display controller, a touch-sensitive display system, a speaker, a bone conduction audio output device, a tactile output generator, a projector, and/or a holographic display) and one or more input devices (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). Some operations in method 1600 are, optionally, combined, the orders of some operations are, optionally, changed, and some operations are, optionally, omitted.

As described below, method 1600 provides an intuitive way for displaying a representation of content in a shared-content session. The method reduces the cognitive burden on a user for displaying a representation of content in a shared-content session, thereby creating a more efficient human-machine interface. For battery-operated computing devices, enabling a user to participate in a shared-content session faster and more efficiently conserves power and increases the time between battery charges.

While a shared-content session between the computer system (e.g., 14000B) and one or more external computer systems (e.g., 14000A) is active (1602), wherein the shared-content session, when active, enables the computer system (e.g., 14000B) to output respective content (e.g., synchronized content and/or screen-share content) while the respective content is being output by the one or more external computer systems (e.g., 14000A), the computer system (e.g., 14000B) receives (1604) data representing first content (e.g., 14010, 14012, 14014, or 14086) (e.g., synchronized content and/or screen-share content, or shared content) that has been selected (e.g., 14082, 14092, 14100, 14144, and/or 14160) for the shared-content session at the external computer system (e.g., 14000A) (e.g., the selection was made at the external computer system). In response to receiving the data representing the first content that has been selected for the shared-content session, the computer system (e.g., 14000B) displays (1606), via an output generation component of the one or more output generation components, a display region (e.g., 14108 or 14170) that includes a representation (e.g., 14010', 14086', or 14014') of the first content (e.g., an application window that includes the first content), including: in accordance with a determination that a first set of criteria is not met (e.g., the application window is currently selected; the application window is not within a size range; the application window is not a window from a multi-window operating system (e.g., the window is an application UI of a mobile device operating system or a shared desktop); and/or input is directed to the application window), displaying (1608) the representation of the first content with a first set of one or more controls (e.g., 14185-2, 14185-3, and/or 14185-4) for controlling a visual appearance of the display region (e.g., resizing controls, zoom controls, and/or size lock controls), wherein the first set of one or more controls is visually associated with (e.g., displayed adjacent to; and/or displayed grouped together with) the representation of the first content; and in accordance with a determination that the first set of criteria is met (e.g., the application window is not currently selected; the application window is within a size range; the application window is a window from a multi-window operating system (e.g., not an application UI of a mobile device operating system or a shared desktop); and/or input is not directed to the application window), displaying (1610) the representation of the first content without the first set of one or more controls for controlling the visual appearance of the display region (e.g., 14000B in FIG. 14H). Displaying the representation of the first content with the first set of one or more controls for controlling a visual appearance of the display region in accordance with a determination that the first set of criteria is not met, wherein the first set of one or more controls is visually associated with the representation of the first content, and displaying the representation of the first content without the first set of one or more controls for controlling the visual appearance of the display region in accordance with a determination that the first set of criteria is met provides additional controls for controlling the visual appearance of the display region during the shared-content session without cluttering the user interface with additional displayed controls until the first set of criteria is not met, thereby providing additional space for displaying content of other user interface regions, provides feedback to a user of the computer system that the additional displayed controls are for controlling an aspect of the display region that includes the representation of the first content, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first set of criteria includes a criterion that is met when the representation (e.g., 14010', 14086', or 14014') of the first content (e.g., 14010, 14086, or 14014) is in an unselected state (e.g., the representation of the first content is not currently selected) (e.g., the first set of one or more controls is not displayed if the representation of the first content is unselected at the computer system). Displaying the representation of the first content without the first set of one or more controls for controlling a visual appearance of the display region in accordance with a determination that the representation of the first content is in an unselected state provides additional controls for controlling the visual appearance of the display region during the shared-content session without cluttering the user interface with additional displayed controls until the representation of the first content is no longer in an unselected state, provides feedback to a user of the computer system that the additional displayed controls are for controlling an aspect of the display region that includes the representation of the first content, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the representation of the first content is selected at the computer system by an input (e.g., clicking with a mouse, hovering with a cursor, tapping (e.g., on a touch-sensitive display), touching, looking, gazing, and/or focusing) directed to the representation of the first content.

In some embodiments, the first set of criteria includes a criterion that is met when a size of the representation (e.g., 14010', 14086', or 14014') of the first content is within a predetermined range of sizes (e.g., the first set of one or more controls is not displayed if the representation of the first content is within a predetermined range of sizes). Displaying the representation of the first content without the first set of one or more controls for controlling a visual appearance of the display region in accordance with a determination that the size of the representation of the first content is within a predetermined range of sizes provides additional controls for controlling the visual appearance of the display region during the shared-content session without cluttering the user interface with additional displayed controls until the size of the representation of the first content is no longer within the predetermined range of sizes, provides feedback to a user of the computer system that the additional displayed controls are for controlling an aspect of the display region that includes the representation of the first content, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the predetermined range of sizes is based on the aspect ratio of the first content that is being output at the external computer system (e.g., the aspect ratio or one or more dimensions of the representation of the first content is the same as (or within a threshold amount of the aspect ratio or one or more dimensions of) the representation of the first content that is being output at the external computer system).

In some embodiments, the first set of criteria includes a criterion that is met when the representation (e.g., 14010', 14086', or 14014') of the first content is an application window of an operating system that supports display of a plurality of application windows associated with a respective application (e.g., the first set of one or more controls is displayed if the representation of the first content is an application of a mobile operating system or a displayed interface of shared desktop application). Displaying the representation of the first content without the first set of one or more controls for controlling a visual appearance of the display region in accordance with a determination that the representation of the first content is an application window of an operating system that supports display of a plurality of application windows associated with a respective application provides additional controls for controlling the visual appearance of the display region during the shared-content session without cluttering the user interface with additional displayed controls until the first set of criteria is not met, provides feedback to a user of the computer system that the additional displayed controls are for controlling an aspect of the display region that includes the representation of the first content, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the first set of criteria includes a criterion that is met when the representation of the first content is not an application window of an operating system that supports display of a plurality of application windows associated with a respective application (e.g., the first set of one or more controls is not displayed if the representation of the first content is an application of a mobile operating system or a displayed interface of shared desktop application).

In some embodiments, the first set of criteria includes a criterion that is met when the computer system (e.g., 14000B) does not detect an input (e.g., an input at the computer system (e.g., clicking with a mouse that is in communication with the computer system, hovering with a cursor, tapping (e.g., on a touch-sensitive display that is in communication with the computer system), touching, looking, gazing, and/or focusing) directed to the representation of the first content (e.g., the first set of one or more controls is not displayed when the computer system does not detect an input at the computer system that is directed to the representation of the first content). Displaying the representation of the first content without the first set of one or more controls for controlling a visual appearance of the display region in accordance with a determination that the computer system does not detect an input directed to the representation of the first content provides additional controls for controlling the visual appearance of the display region during the shared-content session without cluttering the user interface with additional displayed controls until an input directed to the representation of the first content is detected, provides feedback to a user of the computer system that the additional displayed controls are for controlling an aspect of the display region that includes the representation of the first content, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, while the representation of the first content is displayed at a first size without the first set of one or more controls for controlling the visual appearance of the display region (e.g., 14170 in FIG. 14P), the computer system (e.g., 14000B) receives data indicating a change in a size (e.g., via input 14184 or 14190) of the representation of the first content from the first size to a second size (e.g., data indicating that the external computer system changed a size of the first content). In some embodiments, in response to receiving the data indicating the change in the size of the representation of the first content, and in accordance with a determination that the second size of the representation of the first content meets second criteria (e.g., the second size exceeds a maximum size of the display region), the computer system (e.g., 14000B) displays the first set of one or more controls (e.g., 14185-2, 14185-3, and/or 14185-4) (in some embodiments, including adjusting the size of the representation of the first content) (in some embodiments, without adjusting the size of the representation of the first content) at a location in the display region (e.g., 14170) that is visually associated with the representation (e.g., 14086') of the first content (e.g., a location in the display region that is adjacent the representation of the first content). Displaying the first set of one or more controls at a location in the display region that is visually associated with the representation of the first content in response to receiving the data indicating the change in the size of the representation of the first content and in accordance with a determination that the second size of the representation of the first content meets second criteria provides additional controls for controlling the visual appearance of the display region during the shared-content session without cluttering the user interface with additional displayed controls until the second size of the representation of the first content meets the second criteria, provides feedback to a user of the computer system that the additional displayed controls are for controlling an aspect of the display region that includes the representation of the first content, and avoids accidental inputs while the additional control options are not displayed. Providing improved feedback, providing additional control options without cluttering the user interface with additional displayed controls, and avoiding accidental inputs enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, in response to receiving the data indicating the change in the size of the representation of the first content, and in accordance with a determination that the second size of the representation of the first content does not meet second criteria (e.g., the second size does not exceed a maximum size of the display region), forgoing displaying the first set of one or more controls (in some embodiments, including adjusting the size of the representation of the first content) (in some embodiments, without adjusting the size of the representation of the first content) at a location in the display region that is visually associated with the representation of the first content (e.g., a location in the display region that is adjacent the representation of the first content).

In some embodiments, displaying the representation (e.g., 14086') of the first content includes displaying the representation of the first content without displaying a representation of a second set of one or more controls (e.g., 14185-2) (e.g., controls for changing a displayed size of an application window (e.g., minimize window, maximize window, and/or reduce window) (e.g., different from the first set of one or more controls) having an enabled state (e.g., the second set of controls are greyed out, struck through, indicated to be hidden, or otherwise indicated to be unavailable). Displaying the representation of the first content without displaying a representation of a second set of one or more controls having an enabled state provides feedback to a user of the computer system that the representation of the first content is being shared with the computer system and is not a representation of content available at the computer system. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the first set of one or more controls (e.g., 14185-2, 14185-3, and/or 14185-4) includes one or more controls (e.g., 14185-2) (e.g., minimize window, maximize window, and/or reduce window) that are selectable to adjust a displayed size of the display region.

In some embodiments, the first set of one or more controls (e.g., 14185-2, 14185-3, and/or 14185-4) includes one or more controls (e.g., 14185-3) (e.g., zoom in, zoom out, zoom to fit, and/or zoom to actual size) that are selectable to adjust a zoom level of the representation of the first content.

In some embodiments, the first set of one or more controls (e.g., 14185-2, 14185-3, and/or 14185-4) includes a size-lock control (e.g., 14185-4) (e.g., a size-lock affordance) that, when selected, prevents the display region from changing size in response to input from a user who is sharing the content in the display region (e.g., in response to receiving data indicating a change in a size of the first content at the external computer system).

In some embodiments, displaying the representation (e.g., 14086') of the first content with the first set of one or more controls (e.g., 14185-2, 14185-3, and/or 14185-4) includes displaying a graphical object (e.g., 14185) (e.g., a frame; an application window chrome) adjacent to (and/or connected to) the display region (e.g., 14170) (in some embodiments, overlaid (at least partially) on a portion on the display region), wherein the graphical object includes the first set of one or more controls for controlling a visual appearance of the display region. Displaying a graphical object adjacent to the display region, wherein the graphical object includes the first set of one or more controls for controlling a visual appearance of the display region, provides feedback to a user of the computer system that the first set of one or more controls are selectable for controlling an aspect of the display region that includes the representation of the first content. Providing improved feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, in addition to the first set of one or more controls, the graphical object includes additional content associated with the display region. For example, the graphical object can include text describing the content displayed in the display region, a search bar, additional controls, and/or a frame that visually associates the content of the graphical object with the display region. In some embodiments, display of the graphical object is associated with the display region such that the graphical object is not displayed when the display region is not displayed, and is optionally (e.g., conditionally) displayed when the display region is displayed.

In some embodiments, while the display region (e.g., 14170) that includes the representation of the first content occupies an amount of displayed space (e.g., the display region is a first displayed size) and the representation of the first content is a third size, the computer system (e.g., 14000B) receives data indicating a change in a size (e.g., via 14174) of the first content at the external computer system (e.g., 14000A) (e.g., data indicating that the external computer system changed a size of the first content). In some embodiments, in response to receiving the data indicating the change in the size of the first content at the external computer system (e.g., 14000A), the computer system (e.g., 14000B) changes the size of the representation of the first content from the third size to a fourth size different from the third size (e.g., increasing/decreasing the displayed size of the representation of the first content based on the change in size of the first content at the external computer system), including: in accordance with a determination that an automatic resizing feature (e.g., represented by 14185-4) is enabled (e.g., the size lock control is disabled), the computer system (e.g., 14000B) adjusts the amount of displayed space occupied by the display region (e.g., 14170) (e.g., increasing/decreasing the displayed size of the display region with the increased/decreased size of the representation of the first content). In some embodiments, in response to receiving the data indicating the change in the size of the first content at the external computer system (e.g., 14000A), the computer system (e.g., 14000B) changes the size of the representation of the first content from the third size to a fourth size different from the third size (e.g., increasing/decreasing the displayed size of the representation of the first content based on the change in size of the first content at the external computer system), including: in accordance with a determination that the automatic resizing feature (e.g., represented by 14185-4) is disabled (e.g., the size lock control is enabled), forgoing adjusting the amount of displayed space occupied by the display region (e.g., maintaining the displayed size of the display region while the representation of the first content is increase/decreased in size (e.g., scaled)). Selectively adjusting the amount of displayed space occupied by the display region depending on whether the automatic resizing feature is enabled or disabled provides controls for a user of the computer system for determining whether or not the display region automatically resizes and reduces the number of inputs at the computer system by automatically adjusting or maintaining the displayed space occupied by the display region without requiring further input from a user of the computer system. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

In some embodiments, the automatic resizing feature is disabled in response to a selection of a size-lock affordance (e.g., 14185-4) (e.g., a size-lock control that is selectable to enable and/or disable the feature for automatically adjusting the size of the display region in response to a change in size of the first content at the external computer system automatic resizing feature).

In some embodiments, the automatic resizing feature is disabled in response to an input (e.g., 14184) (e.g., at the computer system) that corresponds to a request to resize the display region that is received before receiving the data indicating the change in size of the first content at the external computer system (e.g., 14000A). In some embodiments, the automatic resizing feature is enabled in response to a selection (e.g., 14198) of an unlock affordance (e.g., a size lock/unlock control that is selectable to enable and/or disable the feature for automatically adjusting the size of the display region in response to a change in size of the first content at the external computer system). In some embodiments, the unlock affordance is used to disable the automatic resizing feature. In some embodiments, the unlock affordance is different from an affordance (e.g., a lock affordance) that is used to disable the automatic resizing feature.

In some embodiments, while the display region that includes the representation of the first content is displayed having a fifth size and the representation of the first content is displayed having a sixth size (e.g., while the automatic resizing feature is disabled), the computer system (e.g., 14000B) receives a request (e.g., 14198) to enable the automatic resizing feature (e.g., a deselection of the size lock affordance). In response to receiving the request to enable the automatic resizing feature, the computer system (e.g., 14000B) changes the size of the display region from the fifth size to a predetermined size that is based on the sixth size of the representation of the first content (e.g., 14000B in FIG. 14T to 14U) (e.g., the display region is resized to an optimum fit with respect to the representation of the first content) (e.g., while continuing to maintain the fifth size of the representation of the first content). Changing the size of the display region from the fifth size to a predetermined size that is based on the sixth size of the representation of the first content in response to receiving the request to enable the automatic resizing feature reduces the number of inputs at the computer system by automatically changing the size of the display region to an optimal size without requiring further input from a user of the computer system. Performing an operation when a set of conditions has been met without requiring further user input enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently. In some embodiments, the automatic resizing feature is enabled in response to receiving the request to enable the automatic resizing feature.

In some embodiments, changing the size of the representation (e.g., 14086') of the first content from the third size to the fourth size includes displaying the representation of the first content at a location that was previously occupied by displayed content (e.g., 14030) (e.g., other application windows, desktop user interface, home screen user interface) that was not included in the display region (e.g., 14170) before changing the size of the representation of the first content from the third size to the fourth size (e.g., changing (e.g., increasing) the size of the representation of the first content includes hiding portions of other displayed content with at least a portion of the representation of the first content).

In some embodiments, changing the size of the representation (e.g., 14086') of the first content from the third size to the fourth size includes displaying content (e.g., 14030) other than the representation of the first content (e.g., other application windows, desktop user interface, home screen user interface) at a location that was previously included in the display region (e.g., 14170) before changing the size of the representation of the first content from the third size to the fourth size (e.g., changing (e.g., decreasing) the size of the representation of the first content includes revealing portions of other displayed content).

In some embodiments, displaying the representation (e.g., 14086') of the first content includes displaying the representation of the first content without displaying a type of graphical object (e.g., 14045A) (e.g., ancillary user interface objects associated with the first content such as menus, popovers, error messages, and/or print screens) that is displayed with the first content (e.g., 14086) at the external computer system (e.g., 14000A). Displaying the representation of the first content without displaying the type of graphical object that is displayed with the first content at the external computer system provides privacy benefits to a user of the external computer system by preventing accidental sharing of content, and enhances the visibility of the shared content for a user of the computer system and reduces the number of computations performed at the computer system by eliminating the display of extraneous user interface elements at the computer system. Reducing the number of computations at the computer system preserves computational resources of the computer system, enhances the operability of the computer system, and makes the user-system interface more efficient (e.g., by helping the user to provide proper inputs and reducing user mistakes when operating/interacting with the computer system) which, additionally, reduces power usage and improves battery life of the computer system by enabling the user to use the system more quickly and efficiently.

Note that details of the processes described above with respect to method 1600 (e.g., FIG. 16) are also applicable in an analogous manner to the methods described below and above. For example, method 700, 800, 900, 1000, 1100, 1200, 1300, 1500, 1700, and/or 1800 optionally includes one or more of the characteristics of the various methods described above with reference to method 1600. For brevity, these details are not repeated.

Figure 17:
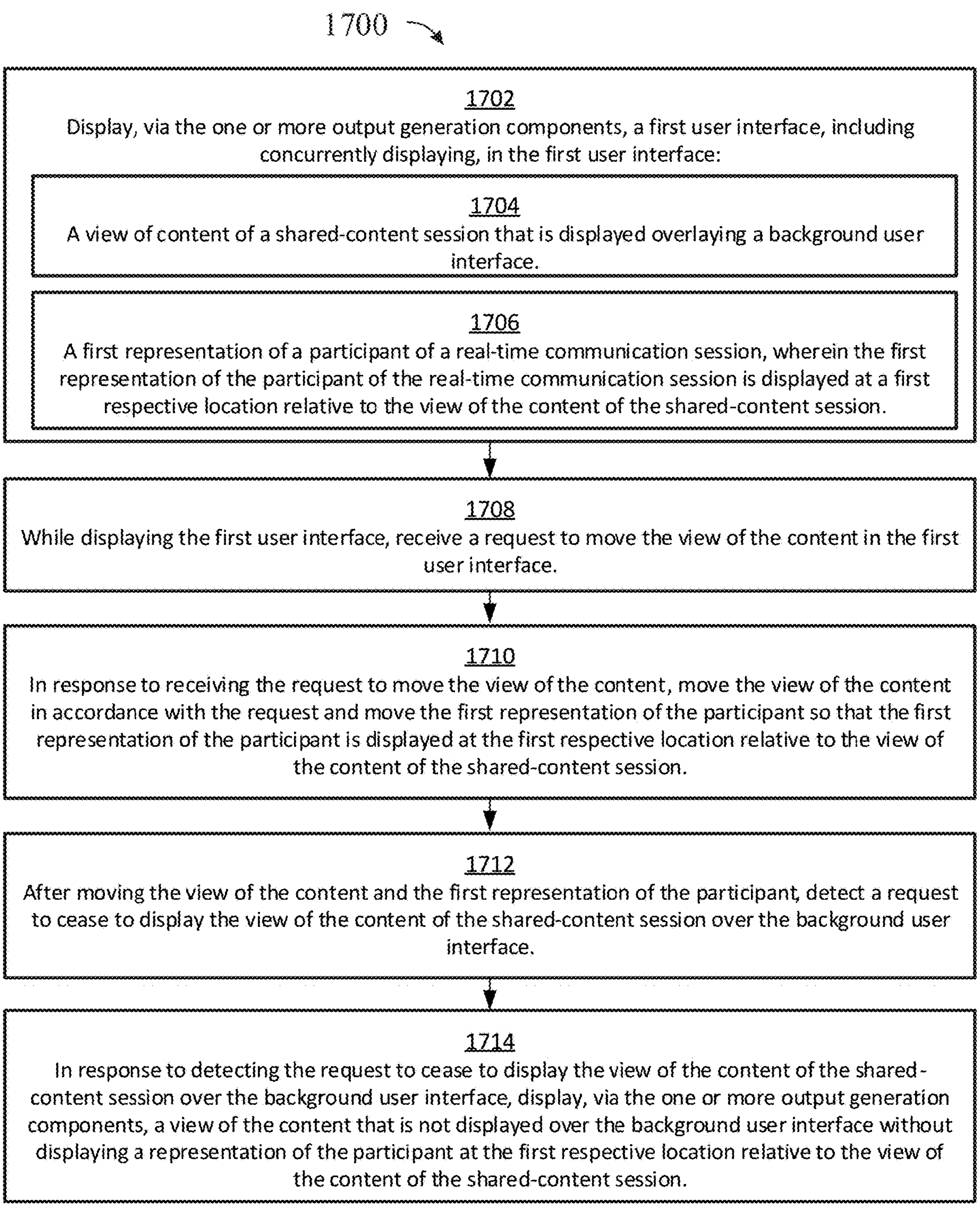
FIG. 17 depicts a flow diagram illustrating a method for managing a shared-content session, in accordance with some embodiments.

FIG. 17 is a flow diagram illustrating a method for managing a shared-content session using a computer system (e.g., 6000) in accordance with some embodiments. Method 1700 is performed at a computer system (e.g., 6000) (e.g., a smartphone, a tablet, a desktop or laptop computer) that is in communication with one or more output generation components (e.g., 6001) (e.g., a display controller, a touch-sensitive display system, a speaker, a bone conduction audio output device, a tactile output generator, a projector, and/or a holographic display) and one or more input devices (e.g., 6001, 6002, and/or 6003) (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). Some operations in method 1700 are, optionally, combined, the orders of some operations are, optionally, changed, and some operations are, optionally, omitted.

As described below, method 1700 provides an intuitive way for managing a shared-content session. The method reduces the cognitive burden on a user for managing a shared-content session, thereby creating a more efficient human-machine interface. For battery-operated computing devices, enabling a user to manage a shared-content session faster and more efficiently conserves power and increases the time between battery charges.

The computer system (e.g., 6000) displays (1702), via the one or more output generation components (e.g., 6001) (and while the computer system is connected to a real-time communication session), a first user interface (e.g., 6088) (e.g., an application window, a picture-in-picture (PiP) window, a video application interface, a web browser interface, a music application interface), including concurrently displaying, in the first user interface: a view (e.g., 6150B) (1704) of content (e.g., video content) of a shared-content session (e.g., content in an active shared-content session) that is displayed overlaying a background user interface (e.g., 6088 and/or the application icons on 6088); and a first representation (e.g., 6243) (1706) (e.g., a graphical object, a tile, a video feed, an avatar, and/or an identifier (e.g., name or initials)) of a participant (e.g., a most-active participant or most recently active participant) of a real-time (e.g., audio and/or video) communication session (e.g., an active real-time communication session to which the computer system is connected), wherein the first representation of the participant of the real-time communication session is displayed at a first respective location (e.g., top-left corner of 6150B) (e.g., a fixed location) relative to the view of the content of the shared-content session.

In some embodiments, the first user interface is overlaid on a home screen (e.g., 6018 or 6088) and/or another user interface (e.g., one or more windows of one or more other applications). In some embodiments, the representation of the participant (e.g., 6295 or 6243) of the real-time communication session is overlaid on the view of the content of the shared-content session (e.g., 6150A or 6150B). In some embodiments, the user interface and/or the view of the content can be moved (e.g., as shown in FIGS. 6DH-6DJ), and the representation of the participant of the real-time communication session remains fixed relative to the view of the content while the user interface and/or the view of the content is moved. In some embodiments, the representation of the participant of the real-time communication session cannot be moved, e.g., via user input, relative to the view of the content of the shared-content session. Concurrently displaying, in the first user interface, the view of content of the shared-content session and the first representation of the participant of the real-time communication session allows the user to view the content of the shared-content session while maintaining context of an ongoing real-time communication session without requiring display of a user interface of a real-time communication application, which provides improved visual feedback without cluttering the user interface.

While the computer system (e.g., 6000) displays the first user interface, the computer system (e.g., 6000) receives (1708) a request (e.g., 6592) (e.g., an input) to move the view of the content in the first user interface.

In response to receiving the request to move the view of the content, the computer system (e.g., 6000) moves (1710) the view of the content in accordance with the request (e.g., in accordance with a direction and/or magnitude specified by the input) and moves the first representation of the participant so that the first representation of the participant is displayed at the first respective location relative to the view of the content of the shared-content session (e.g., movement of 6150B and 6243 in FIGS. 6DH-6DI). Moving the view of the content and the first representation of the participant so that the first representation of the participant is displayed at the first respective location relative to the view of the content of the shared-content session indicates to a user that there is a relationship between the content and the first representation of the participant of the real-time communication session while other content (e.g., the background user interface) is displayed (e.g., the participant of the real-time communication session is also a participant of the shared-content session and can view the content, but cannot view the background user interface), which provides improved visual feedback.

After moving the view of the content and the first representation of the participant, the computer system (e.g., 6000) detects (1712) a request (e.g., 6602) to cease to display the view of the content of the shared-content session over the background user interface (while the computer system is connected to the real-time communication session).

In response to detecting the request to cease to display the view of the content of the shared-content session over the background user interface, the computer system (e.g., 6000) displays (1714), via the one or more output generation components (e.g., 6001), a view of the content (e.g., 6150B in FIG. 6DM) that is not displayed over the background user interface without displaying a representation (e.g., 6243) of the participant at the first respective location relative to the view of the content of the shared-content session. Displaying the view of the content that is not displayed over the background user interface without displaying a representation of the participant at the first respective location relative to the view of the content of the shared-content session indicates that the first representation of the participant is not constrained to the first respective location relative to the view of the content of the shared-content session, which provides improved visual feedback.

In some embodiments, while displaying the view of the content that is not displayed overlaying the background user interface (e.g., 6150A in FIG. 6AX), the representation (e.g., 6235) of the participant of the real-time communication session can be moved (e.g., via user input) to a different location relative to the view of the content of the shared-content session (e.g., as shown in FIGS. 6AX-6AZ). In some embodiments, detecting the request to cease to display the view of the content of the shared-content session overlaying the background user interface includes detecting a request (e.g., 6602) to expand the view of the content of the shared-content session, and in response to detecting the request to expand the view of the content of the shared-content session, the computer system displays an updated view (e.g., an expanded view or a full-screen view) of the content of the shared-content session (e.g., 6150B in FIG. 6DM). In some embodiments, the updated view of the content of the shared-content session is displayed concurrently with the representation of the participant of the real-time communication session at a location that is not fixed relative to the view of the content of the shared-content session.

In some embodiments, in response to detecting the request to cease to display the view of the content of the shared-content session over the background user interface, the computer system (e.g., 6000) displays, via the one or more output generation components (e.g., 6001) (and, optionally, concurrently with the view of the content that is not displayed over the background user interface), a second representation (e.g., 6245) of the participant at a second respective location (e.g., below-right) relative to the view of the content (e.g., 6150B in FIG. 6DM) of the shared-content session and/or at a first size. In some embodiments, the second respective location relative to the view of the content of the shared-content session is different from the first respective location relative to the view of the content of the shared-content session. In some embodiments, the first size (e.g., the size of 6245 in FIG. 6DM) is different from a size (e.g., the size of 6243 in FIGS. 6DH-6DL) of the first representation of the participant displayed at the first respective location relative to the view of the content of the shared-content session. Displaying the second representation of the participant at a different respective location relative to the view of the content of the shared-content session and/or at a different size allows the user to view the content of the shared-content session while maintaining context of (e.g., without interrupting) an ongoing real-time communication session without requiring display of a user interface of a real-time communication application, which provides improved visual feedback without cluttering the user interface.

In some embodiments, the background user interface is a system user interface (e.g., 400 or 6088) (e.g., a home screen; a desktop user interface; user interface 400; a user interface that is provided and/or controlled by an operating system of the computer system; and/or a displayed user interface that includes user interface objects corresponding to respective applications, and when a user interface object is activated, the computer system displays the respective application corresponding to the activated user interface object). Concurrently displaying the view of content of the shared-content session, overlaid on a system user interface, and the first representation of the participant of the real-time communication session allows the user to perform operations provided by the system user interface (e.g., launching applications and/or navigating menus) while viewing the content and maintaining context of the real-time communication session without having to navigate out of a user interface dedicated solely to the real-time communication session (e.g., a video communication application) or the content of the shared-content session, which reduces the number of inputs needed to perform an operation.

In some embodiments, the background user interface is an application user interface (e.g., 6004B in FIG. 6AT) (e.g., an application window). In some embodiments, the application user interface includes content and/or one or more selectable objects. Concurrently displaying the view of content of the shared-content session, overlaid on an application user interface, and the first representation of the participant of the real-time communication session allows the user to perform operations provided by the application user interface (e.g., web browsing or sending a text message) while viewing the content and maintaining context of the real-time communication session without having to navigate out of a user interface dedicated solely to the real-time communication session (e.g., a video communication application) or the content of the shared-content session, which reduces the number of inputs needed to perform an operation.

In some embodiments, while concurrently displaying, in the first user interface, the view of the content of the shared-content session overlaid on the background user interface and the first representation of the participant at the first respective location relative to the view of the content of the shared-content session, the computer system (e.g., 6000) detects a request (e.g., 6486) to change the background user interface from a first background user interface (e.g., 6088-1) to a second background user interface (e.g., 6496) (e.g., a different application or home screen) different from the first background user interface. In response to detecting the request to change the background user interface from the first background user interface to the second background user interface, the computer system concurrently displays: the view of the content of the shared-content session overlaid on the second background user interface (e.g., 6150B in FIG. 6CR); and the first representation of the participant, wherein the first representation of the participant is displayed at the first respective location relative to the view of the content of the shared-content session (e.g., 6243 in FIG. 6CR). Concurrently displaying the view of the content of the shared-content session, overlaid on the second background user interface, and the first representation of the participant at the first respective location relative to the view of the content of the shared-content session in response to detecting the request to change the background user interface allows the user to navigate to, e.g., different applications and/or portions of a home screen while maintaining display of the content and the first representation of the participant without having to navigate out of a user interface dedicated solely to the real-time communication session or the content of the shared-content session, which reduces the number of inputs needed to perform an operation.

In some embodiments, when the background user interface is switched (e.g., as shown on device 6000B in FIGS. 6CP-6CR) (e.g., to a different application or home screen), the computer system (e.g., 6000) maintains display of the first representation of the participant (e.g., 6243) at the first respective location relative to the view (e.g., 6150B) of the content of the shared-content session. In some embodiments, the view of the content of the shared-content session is maintained at the same location or moved based on the second background user interface (e.g., to avoid elements of the second background user interface such as, e.g., a keyboard or a self-view in a video chat session user interface or a toolbar or other important controls of an application such as the send button in a messages application).

In some embodiments, while displaying the view of the content of the shared-content session overlaying the background user interface (e.g., 6150B in FIG. 6CP), the computer system (e.g., 6000) detects a request (e.g., 6476) to perform an operation in the background user interface. In some embodiments, the request to perform an operation in the background user interface includes, e.g., selecting a selectable object to perform an operation, scrolling through content, navigating a home screen (e.g., navigating through pages of a home screen), sending a message, and/or reorganizing icons (e.g., application icons, application widgets, and/or folders). In some embodiments, in response to detecting the request to perform an operation in the background user interface, the computer system (e.g., 6000) performs the operation in the background user interface while maintaining display of the view of the content of the shared-content session overlaying the background user interface (e.g., displaying interface 6088-1 in FIG. 6CQ) (e.g., and while continuing to update the shared content and/or representation of the participant over time). Performing the operation in the background user interface while maintaining display of the view of the content of the shared-content session overlaying the background user interface allows the user to perform operations provided by the background user interface while maintaining display of the content and the first representation of the participant without having to navigate out of a user interface dedicated solely to the real-time communication session or the content of the shared-content session, which reduces the number of inputs needed to perform an operation.

In some embodiments, the request (e.g., 6594) to cease to display the view (e.g., 6150A in FIG. 6DI) of the content of the shared-content session over (e.g., overlaid on) the background user interface (e.g., 6018) includes (e.g., is) a request to display a first user interface (e.g., 6170A) of (e.g., open, launch, and/or bring to the foreground a user interface of) a video communication application (e.g., that provides the real-time communication session). Displaying a view of the content in response to a request to display a user interface of the video communication session (e.g., that provides the real-time communication session) allows the user to continue to view the content of the shared-content session while providing additional functionality with respect to the real-time communication session provided by the video communication application, which enables the ability to concurrently perform multiple tasks (e.g., view the content and participate in the real-time communication session), provides improved visual feedback, and reduces the number of inputs needed to perform an operation. In some embodiments, in response to detecting the request to display a user interface of the video communication application, the computer system displays a user interface of the video communication application concurrently with the view of the content.

In some embodiments, while displaying the first user interface (e.g., 6170A) of the video communication application, the computer system (e.g., 6000) displays, in the first user interface of the video communication application, a plurality of representations (e.g., 6172 and 6174) of participants in the real-time communication session. Displaying a plurality of representations of participants in the real-time communication session in the first user interface of the video communication application provides additional context with respect to the real-time communication session while maintaining display of the content of the shared-content session, which provides improved visual feedback.

In some embodiments, the request to cease to display the view of the content of the shared-content session over the background user interface (e.g., 6570) includes (e.g., is) a request (e.g., 6584 in FIG. 6DC) to display the content (e.g., 6574) in an expanded display mode (e.g., 6574 in FIG. 6DD) (e.g., a full-screen mode or substantially full-screen mode where computer system status information continues to be displayed). Displaying a view of the content that is not displayed over the background user interface without displaying a representation of the participant at the first respective location relative to the view of the content of the shared-content session in response to detecting a request to display the content in an expanded display mode provides the user with an enhanced (e.g., larger) view of the content of the shared-content session, which provides improved visual feedback. In some embodiments, in response to detecting the request to display the content in an expanded display mode, the computer system displays the content in the expanded display mode (e.g., expands the view of the content).

In some embodiments, in response to detecting the request (e.g., 6584) to display the content in an expanded display mode: the computer system (e.g., 6000) displays the content (e.g., 6574) in a second user interface that is in an expanded display mode (e.g., 6574 in FIG. 6DD) (e.g., the content occupies all or a portion of a window that is displayed in an expanded mode). In some embodiments, in response to detecting the request to display the content in an expanded display mode: the computer system (e.g., 6000) displays, concurrently with the content in the second user interface that is in the expanded display mode, a third representation (e.g., 6235 in FIG. 6DD) (e.g., a representation that is larger than the first representation) of the participant of the real-time communication session overlaid on the second user interface (e.g., 6574 in FIG. 6DD) (e.g., overlaid on a full-screen view of the content and/or a full-screen window of an application that displays the content (e.g., in a blank space of the window when the computer system is physically in a portrait orientation and the content is displayed in a landscape orientation)). Displaying the third representation of the participant of the real-time communication session overlaid on the second user interface that is in the expanded display mode provides the user with an enhanced view of the content of the shared-content session while concurrently maintaining context of the real-time communication session, which provides improved visual feedback.

In some embodiments, while displaying the third representation (e.g., 6235 in FIG. 6DD) of the participant of the real-time communication session at a first location (e.g., bottom right corner in FIG. 6DD) over the second user interface, the computer system (e.g., 6000) receives a request (e.g., 6586) to move the third representation of the participant (e.g., in the second user interface). In some embodiments, the request to move the third representation of the participant includes a tap and drag gesture on the third representation of the participant. In response to receiving the request to move the third representation of the participant, the computer system (e.g., 6000) displays the third representation (e.g., 6235) of the participant of the real-time communication session at a second location (e.g., top right corner in FIG. 6DE) over the second user interface, wherein the second location is different from the first location (e.g., moving the third representation from the first location to the second location). Optionally, the third representation of the participant is moved in the second user interface while maintaining the content at a same location in the second user interface. Displaying the third representation of the participant at a different location over the second user interface in response to receiving the request to move the third representation of the participant allows a user to position the third representation at a desired location, which provides enhanced user customization and improved visual feedback.

In some embodiments, while displaying the third representation of the participant of the real-time communication session over the second user interface (e.g., 6235 in FIG. 6DD), the computer system (e.g., 6000) receives an indication of a change in activity level of a second participant of the real-time communication session. In some embodiments, in response to receiving the indication of a change in activity level of a second participant of the real-time communication session, the computer system (e.g., 6000) displays a representation (e.g., 6235 in FIG. 6DE) of the second participant of the real-time communication session (e.g., replacing the first representation of the participant with the representation of the second participant (at the same location and/or size as the representation of the participant); or changing the first representation of the participant from including a representation of a first participant to including a representation of the second participant (e.g., changing the video feed and/or avatar included in the first representation)). Displaying the representation of the second participant of the real-time communication session in response to receiving the indication of a change in activity level of a second participant of the real-time communication session provides relevant context for the real-time communication session by indicating that the second participant is, e.g., speaking and/or moving, which provides improved visual feedback.

In some embodiments, while displaying, in the first user interface (e.g., 6088), the view of the content of the shared-content session overlaid on the background user interface (e.g., 6150B in FIG. 6BB) and the first representation (e.g., 6243) of the participant of the real-time communication session at the first respective location relative to the view of the content of the shared-content session: the computer system (e.g., 6000) receives an indication of a change in activity level of a third participant of the real-time communication session. In some embodiments, while displaying, in the first user interface, the view of the content of the shared-content session overlaid on the background user interface and the first representation of the participant of the real-time communication session at the first respective location relative to the view of the content of the shared-content session: in response to receiving the indication of a change in activity level of the third participant of the real-time communication session, the computer system (e.g., 6000) displays a representation of the third participant (e.g., 6243 in FIG. 6BC) of the real-time communication session at the first respective location relative to the view of the content of the shared-content session overlaid on the background user interface (e.g., replacing the first representation of the participant with the representation of the third participant (at the same location and/or size as the first representation of the participant); or changing the first representation of the participant from including a representation of a first participant to including a representation of the third participant (e.g., changing the video feed and/or avatar included in the representation)). Displaying a representation of the third participant of the real-time communication session at the first respective location relative to the view of the content of the shared-content session overlaid on the background user interface in response to receiving the indication of a change in activity level of the third participant of the real-time communication session provides context regarding the real-time communication session while displaying the content of the shared-content session, which provides improved visual feedback.

In some embodiments, while displaying, in the first user interface (e.g., 6018 in FIG. 6DN), the view (e.g., 6150A) of the content of the shared-content session overlaid on the background user interface (e.g., 6018), and the first representation (e.g., 6295) of the participant of the real-time communication session at the first respective location (e.g., top left corner) relative to the view of the content of the shared-content session, the computer system (e.g., 6000) receives a first indication (e.g., due to input 6618) that no participant (or device associated with a participant) of the real-time communication session is providing (e.g., transmitting) video to the real-time communication session (e.g., the real-time communication session does not include video from any of the participants; or all participants have their respective outgoing video feeds disabled or muted). In some embodiments, in response to receiving the first indication that no participant of the real-time communication session is providing video to the real-time communication session, the computer system (e.g., 6000) ceases to display (e.g., in FIG. 6DO) the first representation (e.g., 6295) of the participant of the real-time communication session. Ceasing to display the first representation of the participant of the real-time communication session in response to receiving the first indication that no participant of the real-time communication session is providing video to the real-time communication session reduces clutter on the user interface when no participant of the real-time communication session is providing video to the real-time communication session, which provides improved visual feedback. In some embodiments, in response to receiving the first indication that no participant of the real-time communication session is providing video to the real-time communication session, the computer system displays content that was obscured by the first representation.

In some embodiments, while displaying, in the first user interface, the view (e.g., 6150A or 6150B in FIG. 6DQ) of the content of the shared-content session overlaid on the background user interface (and the first representation of the participant of the real-time communication session at the first respective location relative to the view of the content of the shared-content session), the computer system (e.g., 6000) receives an indication (e.g., due to input 6626) that the content has been removed from the shared-content session (e.g., that the content has stopped being shared or is no longer being shared; or that the content is no longer in the shared-content session). In some embodiments, in response to receiving the indication that the content has been removed from the shared-content session: the computer system (e.g., 6000) ceases to display the view of the content (e.g., FIG. 6DR). In some embodiments, in response to receiving the indication that the content has been removed from the shared-content session: the computer system (e.g., 6000) displays, in the first user interface, a fourth representation (e.g., 6235 or 6245) of the participant of the real-time communication session that is displayed overlaying the background user interface. Ceasing to display the view of the content and displaying a fourth representation of the participant of the real-time communication session that is displayed overlaying the background user interface in response to receiving the indication that the content has been removed from the shared-content session indicates that the content has been removed from the shared-content session while continuing to provide the user with a view of the content after the content has been removed from the shared-content session, which provides improved visual feedback.

In some embodiments, the computer system (e.g., 6000) receives a request (e.g., 6634) to move the fourth representation (e.g., 6245) of the participant of the real-time communication session in the first user interface. In some embodiments, in response to receiving the request to move the fourth representation of the participant of the real-time communication session, the computer system (e.g., 6000) moves the fourth representation of the participant of the real-time communication session in accordance with the request to move the fourth representation of the participant of the real-time communication session (e.g., from the position of 6245 in FIG. 6DR to the position of 6245 in FIG. 6DS) (e.g., moving the fourth representation in a direction and/or with a magnitude that is based on a direction and/or magnitude of an input corresponding to the request). Moving the fourth representation of the participant of the real-time communication session in accordance with the request to move the fourth representation of the participant of the real-time communication session in response to receiving the request to move the fourth representation of the participant of the real-time communication session allows the user to customize the position of the fourth representation of the participant of the real-time communication session, which provides improved visual feedback and reduces the number of inputs needed to perform an operation.

In some embodiments, while displaying, in the first user interface, the fourth representation (e.g., 6245 in FIG. 6DN) of the participant of the real-time communication session, the computer system (e.g., 6000) receives a second indication (e.g., due to input 6618) that no participant (or device associated with a participant) of the real-time communication session is providing (e.g., transmitting) video to the real-time communication session (e.g., the real-time communication session does not include video from any of the participants; all participants have their respective outgoing video feeds disabled or muted). In some embodiments, in response to receiving the second indication that no participant of the real-time communication session is providing video to the real-time communication session, the computer system (e.g., 6000) ceases to display the fourth representation of the participant of the real-time communication session (e.g., 6245 is not displayed in FIG. 6DO). Ceasing to display the fourth representation of the participant of the real-time communication session in response to receiving the second indication that no participant of the real-time communication session is providing video to the real-time communication session reduces clutter on the user interface when no participant of the real-time communication session is providing video to the real-time communication session, which provides improved visual feedback.

In some embodiments, after ceasing to display the fourth representation of the participant of the real-time communication session (and, optionally, while no representations of participants of the real-time communication session are displayed in the first user interface): the computer system (e.g., 6000) receives an indication (e.g., video feed turned on via input 6638) that a participant (or device associated with a participant) of the real-time communication session is providing (e.g., transmitting) video to the real-time communication session (e.g., the real-time communication session includes video from at least one of the participants; one or more participants have enabled or unmuted their respective outgoing video feed; or a participant has started sharing video).

In some embodiments, after ceasing to display the fourth representation of the participant of the real-time communication session (and, optionally, while no representations of participants of the real-time communication session are displayed in the first user interface): in response to receiving the indication that a participant of the real-time communication session is providing video to the real-time communication session, the computer system (e.g., 6000) displays (e.g., re-displaying) a fifth representation (e.g., the second representation) of a participant of the real-time communication session (e.g., 6245 in FIG. 6DU). Displaying the fifth representation of a participant of the real-time communication session in response to receiving the indication that a participant of the real-time communication session is providing video to the real-time communication session provides feedback to the user that a participant of the real-time communication session is providing video to the real-time communication session, which provides improved visual feedback. In some embodiments, the fifth representation of a participant of the real-time communication session is displayed at the same location at which the fourth representation was displayed. In some embodiments, the fifth representation changes over time (e.g., to display live video from a participant and/or to display representations of different participants based on activity level).

In some embodiments, the fifth representation of a participant of the real-time communication session includes (e.g., at least initially) a representation of a participant (e.g., 6245 in FIG. 6DU) that caused the indication (e.g., input 6638) that a participant of the real-time communication session is providing video to the real-time communication session to be displayed (e.g., the participant that started sharing, providing, or transmitting video when no other participant was sharing video).

In some embodiments, the fifth representation includes a representation of the participant (e.g., 6245 in FIG. 6DU) that started providing video with the real-time communication session even if the participant that started providing video is not a most active participant of the real-time communication session (e.g., another participant has a higher activity level; and/or another participant is talking more and/or has talked more recently than the participant that started providing video). Displaying a representation of the participant that caused the indication that a participant of the real-time communication session is providing video to the real-time communication session to be displayed provides improved visual feedback to the user that video of a participant of the real-time communication session is available to the user.

In some embodiments, the computer system (e.g., 6000) detects, via the one or more input devices (e.g., 6001, 6002, and/or 6003), an input (e.g., 6594 in FIG. 6DI) (e.g., a tap) corresponding to selection of the first representation (e.g., 6295) of the participant of the real-time communication session. In some embodiments, in response to detecting the input corresponding to selection of the first representation of the participant of the real-time communication session, the computer system (e.g., 6000) displays a second user interface (e.g., 6170A as shown in FIG. 6DJ) of (e.g., open, launch, and/or bring to the foreground a user interface of) a video communication application for the real-time communication session. Displaying the second user interface of a video communication application for the real-time communication session in response to detecting the input corresponding to selection of the first representation of the participant of the real-time communication session provides a quick and convenient method of opening a video communication application for the real-time communication session without requiring a user to separately locate and/or navigate to an application icon for opening the video communication application, which reduces the number of inputs needed to perform an operation. In some embodiments, the user interface of the video communication application displays a plurality of representations of participants of the real-time communication session.

In some embodiments, while displaying, in the first user interface, the view of the content of the shared-content session overlaid on the background user interface and the first representation of the participant of the real-time communication session at the first respective location relative to the view of the content of the shared-content session, the computer system (e.g., 6000) detects, via the one or more input devices (e.g., 6001, 6002, and/or 6003), an input. In some embodiments, in response to detecting the input: in accordance with a determination that the input is directed to the view of the content (e.g., the input is 6584 in FIG. 6DC, 6596 in FIG. 6DI, or 6598 in FIG. 6DK) (and, optionally, not the first representation of the participant), the computer system (e.g., 6000) performs an operation associated with the view of the content (e.g., FIG. 6DD, 6DJ, or 6DL, respectively). In some embodiments, in response to detecting the input: in accordance with a determination that the input is directed to the first representation of the participant (e.g., the input is 6594 in FIG. 6DI) (and, optionally, not the view of the content), the computer system (e.g., 6000) displays a third user interface (e.g., 6170A in FIG. 6DJ) of (e.g., open, launch, and/or bring to the foreground a user interface of) a video communication application for the real-time communication session. Selectively performing an operation associated with the view of the content and displaying the third user interface of a video communication application for the real-time communication session based on whether the input is directed to the view of the content or the first representation, respectively, provides a quick and convenient method of performing an operation associated with the view of the content or opening a video communication application, which performs an operation when a set of conditions has been met without requiring further user input. In some embodiments, the operation associated with the view of the content includes (e.g., is) displaying a user interface element for managing the view of the content (e.g., an expand option, playback controls, a border or chrome).

In some embodiments, while displaying the first user interface, the computer system (e.g., 6000) receives a first request (e.g., 6596 in FIG. 6DI) to change (e.g., increase or decrease) a size of the view (e.g., 6150B) of the content in the first user interface (e.g., to increase or decrease the size of a window that displays the content). In some embodiments, in response to receiving the first request to change the size of the view of the content: the computer system (e.g., 6000) changes the size of the view of the content in accordance with the request to change the size of the view of the content (e.g., the size of 6150B is increased from FIG. 6DI to FIG. 6DJ). In some embodiments, in response to receiving the first request to change the size of the view of the content: the computer system (e.g., 6000) changes a size of the first representation of the participant (e.g., the size of 6243 is increased from FIG. 6DI to FIG. 6DJ) (e.g., in a manner proportional to the change in size of the view of the content). Changing the size of the view of the content in accordance with the request to change the size of the view of the content and changing the size of the first representation of the participant in response to receiving the first request to change the size of the view of the content maintains consistency between the view of the content and the first representation avoids the need for separate inputs to change the size of the view of the content and a size of the first representation, which reduces the number of inputs needed to perform an operation.

In some embodiments, while displaying the first user interface, the computer system (e.g., 6000) receives a second request (e.g., 6596 in FIG. 6DI) to change (e.g., increase or decrease) a size of the view (e.g., 6150B) of the content in the first user interface (e.g., to increase or decrease the size of a window that displays the content). In response to receiving the second request to change the size of the view of the content, the computer system (e.g., 6000) changes the size of the view of the content in accordance with the request to change the size of the view of the content (e.g., the size of 6150B is increased from FIG. 6DI to FIG. 6DK) without changing a size of the first representation of the participant (e.g., the size of 6243 remains the same from FIG. 6DI to FIG. 6DK). Changing the size of the view of the content without changing the size of the first representation of the participant in response to receiving the second request to change the size of the view of the content gives the user greater control over the size of the view of the content relative to the size of the first representation, which provides improved visual feedback.

Note that details of the processes described above with respect to method 1700 (e.g., FIG. 17) are also applicable in an analogous manner to the methods described above/below. For example, method 700, 800, 900, 1000, 1100, 1200, 1300, 1500, 1600, and/or 1800 optionally includes one or more of the characteristics of the various methods described above with reference to method 1700. For brevity, these details are not repeated.

Figure 18:
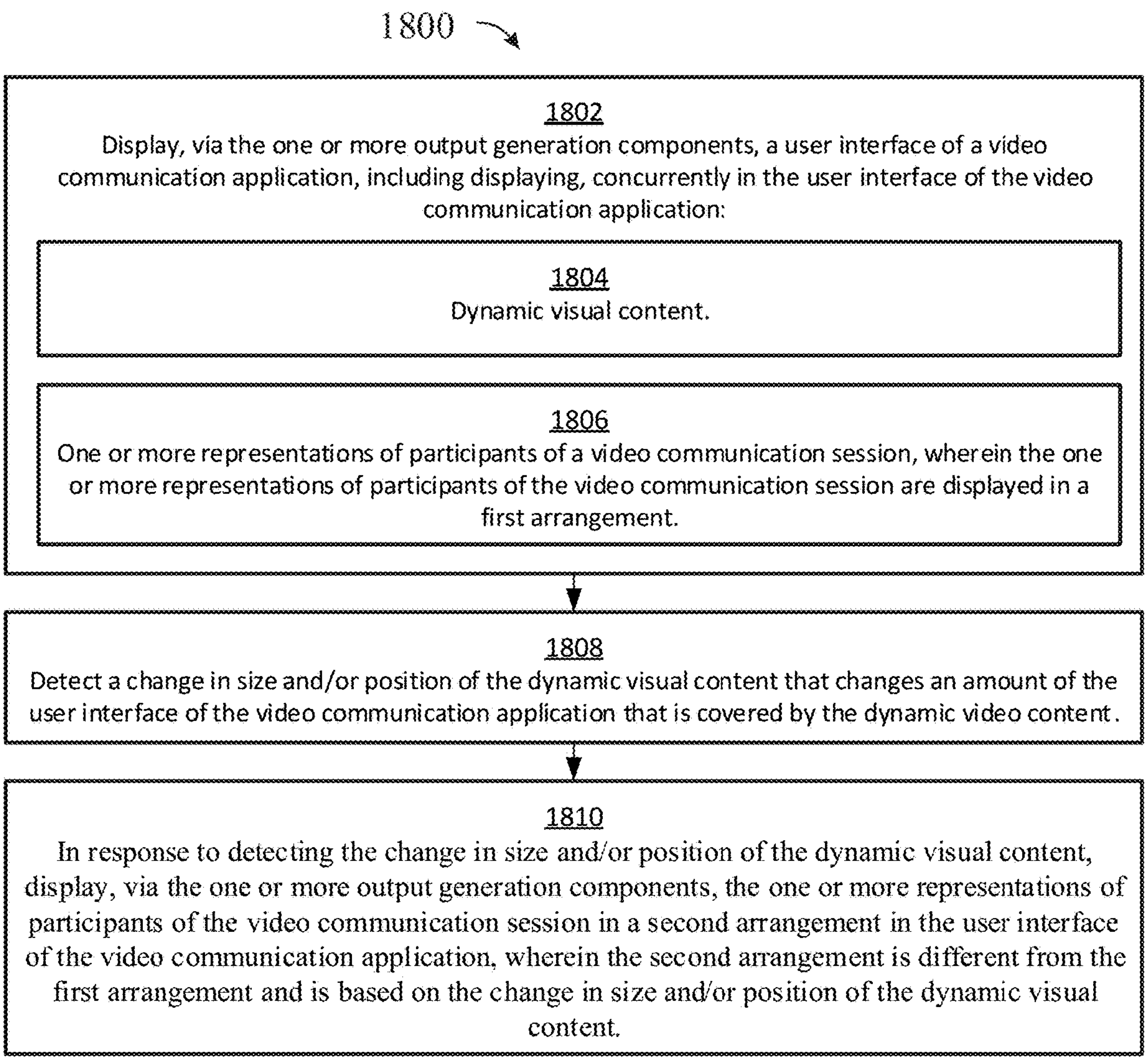
FIG. 18 depicts a flow diagram illustrating a method for managing a shared-content session, in accordance with some embodiments.

FIG. 18 is a flow diagram illustrating a method for managing a shared-content session using a computer system (e.g., 6000) in accordance with some embodiments. Method 1800 is performed at a computer system (e.g., 6000) (e.g., a smartphone, a tablet, a desktop or laptop computer) that is in communication with one or more output generation components (e.g., 6001) (e.g., a display controller, a touch-sensitive display system, a speaker, a bone conduction audio output device, a tactile output generator, a projector, and/or a holographic display) and one or more input devices (e.g., 6001, 6002, and/or 6003) (e.g., a touch-sensitive surface, a keyboard, mouse, trackpad, one or more optical sensors for detecting gestures, one or more capacitive sensors for detecting hover inputs, and/or accelerometer/gyroscope/inertial measurement units). Some operations in method 1800 are, optionally, combined, the orders of some operations are, optionally, changed, and some operations are, optionally, omitted.

As described below, method 1800 provides an intuitive way for managing a shared-content session. The method reduces the cognitive burden on a user for managing a shared-content session, thereby creating a more efficient human-machine interface. For battery-operated computing devices, enabling a user to manage a shared-content session faster and more efficiently conserves power and increases the time between battery charges.

The computer system (e.g., 6000) displays (1802), via the one or more output generation components (e.g., 6001), a user interface (e.g., 6170) (e.g., a window) of a video communication application, including displaying, concurrently in the user interface of the video communication application: dynamic visual content (1804) (e.g., 6150) (e.g., video content or a shared screen of a shared-content session) (e.g., in a window, such as a picture-in-picture window) and one or more representations (1806) (e.g., 6642 or 6644) (e.g., graphical objects, tiles, video feeds, avatars, and/or identifiers (e.g., names or initials)) of participants of a video communication session, wherein the one or more representations of participants of the video communication session are displayed in a first arrangement (e.g., the arrangement shown in FIG. 6DX or the arrangement shown in FIG. 6DY). Concurrently displaying, in the user interface of the video communication application, the dynamic visual content and the one or more representations of the video communication session integrates the dynamic visual content with the user interface of the video communication application and allows the user to view the dynamic content while conveniently accessing features (e.g., controls) of the video communication application for participating in an ongoing real-time communication session without having to switching between user interfaces, which reduces the number of inputs needed to perform an operation.

The computer system (e.g., 6000) detects (1808) a change in size and/or position of the dynamic visual content (e.g., due to input 6654, 6656, 6662, or 6664) that changes an amount of the user interface of the video communication application that is covered by the dynamic video content (e.g., amount of interface 6170 covered by 6150 changes from FIG. 6DX to FIG. 6DY, and/or from FIG. 6DY to FIG. 6DZ, due to a change in position of 6150). In some embodiments, the change in size and/or position of the dynamic visual content includes a change from the dynamic visual content covering none of the user interface of the video communication application to covering some of the user interface of the video communication application. In some embodiments, the change in size and/or position of the dynamic visual content includes a changes from the dynamic visual content from covering some of the user interface of the video communication application to covering none of the user interface of the video communication application. In some embodiments, the change in size and/or position of the dynamic visual content includes increasing or decreasing the amount of the user interface of the video communication application that is covered by the dynamic visual content.

In response to detecting the change in size and/or position of the dynamic visual content, the computer system (e.g., 6000) displays (1810), via the one or more output generation components (e.g., 6001), the one or more representations of participants of the video communication session in a second arrangement (e.g., the arrangement shown in FIG. 6DY or the arrangement shown in FIG. 6DZ) in the user interface of the video communication application, wherein the second arrangement is different from the first arrangement and is based on the change in size and/or position of the dynamic visual content (e.g., arrangement of 6642 and 6644 changes from FIG. 6DX to FIG. 6DY based on the change in position of 6150). Displaying the one or more representations of participants of the video communication session in a different arrangement based on the change in size and/or position of the dynamic visual content in response to detecting the change allows the representations of participants of the video communication session to automatically adapt to changes in the dynamic visual content in order to optimize the arrangement of the representations based on the size and/or position of the dynamic visual content without requiring the user to manually adjust the user interface of the video communication application, which provides improved visual feedback and reduces the number of inputs needed to perform an operation.

In some embodiments, the change in size and/or position of the dynamic visual content occurs in response to detecting an input (e.g., 6654, 6656, 6662, 6664, 6666, 6668, or 6670) (e.g., a pinch gesture, a de-pinch gesture, or a drag gesture) via the one or more input devices (e.g., 6001, 6002, and/or 6003). In some embodiments, in response to detecting the input, the computer system changes the size and/or position of the dynamic visual content. In some embodiments, a magnitude and/or direction of the change in size and/or position of the dynamic visual content is based on a magnitude and/or direction of the input. In some embodiments, the computer system displays the one or more representations of participants of the video communication session in the second arrangement in response to detecting the input.

In some embodiments, the change in size and/or position of the dynamic visual content (e.g., 6150) occurs in response to receiving (e.g., detecting) an indication that (and/or in accordance with a determination that) an event (e.g., ending playback in FIG. 6EJ) (e.g., a predetermined event; and event that meets a set of criteria; the dynamic visual content ending; or the dynamic visual content being removed from a shared-content session) has occurred. Changing the size and/or position of the dynamic visual content in response to receiving an indication that an event has occurred provides improved visual feedback and performs an operation when a set of conditions has been met without requiring further user input. In some embodiments, in response to receiving the indication that the event has occurred, the computer system changes the size and/or position of the dynamic visual content. In some embodiments, the computer system displays the one or more representations of participants of the video communication session in the second arrangement in response to receiving the indication that the event has occurred.

In some embodiments, the change in size and/or position of the dynamic visual content includes a change in size of the dynamic visual content (e.g., reducing the size of 6150A in response to 6666).

In some embodiments, the change in size and/or position of the dynamic visual content includes a change in position of the dynamic visual content (e.g., moving 6150B in response to 6668).

In some embodiments, the change in size and/or position of the dynamic visual content includes the computer system (e.g., 6000) ceasing to display at least a portion of (e.g., some or all of) the dynamic visual content (e.g., in response to input 6654 or 6656) (e.g., at least a portion of the dynamic visual content is hidden and/or no longer displayed). Displaying the one or more representations of participants of the video communication session in a different arrangement in response to detecting that at least a portion of the dynamic visual content has ceased to be displayed allows the computer system to automatically optimize the arrangement of the representations given that display space does not need to be allocated for the dynamic visual content without requiring the user to manually adjust the user interface of the video communication application, which provides improved visual feedback and reduces the number of inputs needed to perform an operation.

In some embodiments, displaying the one or more representations of participants of the video communication session in the second arrangement in the user interface of the video communication application includes the computer system (e.g., 6000) changing a position of (e.g., moving) one or more representations of the participants of the video communication session in the user interface of the video communication application (e.g., 6642 and 6644 change position in FIGS. 6DX-6EB). Changing the position of one or more representations of the participants in response to detecting the change in size and/or position of the dynamic visual content allows the computer system to automatically and dynamically optimize the location of the representations based on changes in the size and/or position of the dynamic visual content without requiring the user to manually adjust the user interface of the video communication application, which provides improved visual feedback and reduces the number of inputs needed to perform an operation.

In some embodiments, displaying the one or more representations of participants of the video communication session in the second arrangement in the user interface of the video communication application includes the computer system (e.g., 6000) changing (e.g., increasing or decreasing) a size of one or more representations of the participants of the video communication session in the user interface of the video communication application (e.g., 6642 and 6644 change size in FIGS. 6DX-6EB). Changing the size of one or more representations of the participants in response to detecting the change in size and/or position of the dynamic visual content allows the computer system to automatically and dynamically optimize the size of the representations based on changes in the size and/or position of the dynamic visual content without requiring the user to manually adjust the user interface of the video communication application, which provides improved visual feedback and reduces the number of inputs needed to perform an operation.

In some embodiments, displaying the one or more representations of participants of the video communication session in the second arrangement in the user interface of the video communication application includes the computer system (e.g., 6000) changing an aspect ratio of one or more representations of the participants of the video communication session in the user interface of the video communication application (e.g., the aspect ratio of 6645B changes from FIG. 6DX to FIG. 6DY) (e.g., displaying a representation of a participant with an aspect ratio in the second arrangement that is different from an aspect ratio of a representation of the participant in the first arrangement, such as changing the aspect ratio from square (1:1) to rectangular with a height greater than the width (e.g., 1.25:1 (height to width), 1.5:1, or 2:1), or vice versa). Changing the aspect ratio of one or more representations of the participants in response to detecting the change in size and/or position of the dynamic visual content allows the computer system to automatically and dynamically optimize the display of the representations based on changes in the size and/or position of the dynamic visual content without requiring the user to manually adjust the user interface of the video communication application, which provides improved visual feedback and reduces the number of inputs needed to perform an operation.

In some embodiments, displaying the one or more representations of participants of the video communication session in the second arrangement in the user interface of the video communication application includes the computer system (e.g., 6000) ceasing to display (e.g., removing) one or more representations of the participants of the video communication session in the user interface of the video communication application (e.g., in FIG. 6DZ, device 6000A stops displaying tile 6642-3 in primary region 6170A-1) (e.g., in FIG. 6DZ, device 6000B stops displaying tiles 6644-5 and 6644-6 in primary region 6170B-1). Removing one or more representations of the participants in response to detecting the change in size and/or position of the dynamic visual content allows the computer system to automatically and dynamically prioritize which representations to display and saves space in a limited display area (which provides more display space for the dynamic visual content) based on changes in the size and/or position of the dynamic visual content without requiring the user to manually adjust the user interface of the video communication application, which provides improved visual feedback and reduces the number of inputs needed to perform an operation.

In some embodiments, ceasing to display one or more representations of the participants of the video communication session in the user interface of the video communication application includes: in accordance with a determination that the one or more representations of participants of the video communication session are displayed according to a first layout (e.g., the non-grid layout shown on device 6000A in FIG. 6DY) (e.g., a layout in which the representations are staggered and/or overlapping), ceasing to display a first number of the one or more representations of participants of the video communication session in the user interface of the video communication application (e.g., in FIG. 6DZ, device 6000A stops displaying tile 6642-3 in primary region 6170A-1). In some embodiments, ceasing to display one or more representations of the participants of the video communication session in the user interface of the video communication application includes: in accordance with a determination that the one or more representations of participants of the video communication session are displayed according to a second layout (e.g., the grid layout shown on device 6000B in FIG. 6DY) (e.g., a grid layout) that is different from the first layout, ceasing to display a second number of the one or more representations of participants of the video communication session in the user interface of the video communication application, wherein the second number is different from the first number (e.g., in FIG. 6DZ, device 6000B stops displaying tiles 6644-5 and 6644-6 in primary region 6170B-1). Ceasing to display different numbers of representations for different layouts of the representations allows the computer system to automatically adapt to changes in the dynamic visual content based on the layout of the representations, which performs an operation when a set of conditions has been met without requiring further user input.

In some embodiments, detecting the change in size and/or position of the dynamic visual content that changes an amount of the user interface of the video communication application that is covered by the dynamic video content occurs while the computer system (e.g., 6000) displays the one or more representations of participants of the video communication session in a third layout (e.g., the arrangement of tiles 6642 in FIG. 6DZ, or the arrangement of tiles 6644 in FIG. 6DZ). In some embodiments, displaying the one or more representations of participants of the video communication session in the second arrangement in the user interface of the video communication application includes displaying the one or more representations of participants of the video communication session in a fourth layout that is different from the first layout (e.g., in FIG. 6DZ, device 6000A stops displaying tile 6642-3 in primary region 6170A-1 and instead displays tile 6642-3 in roster region 6170A-2) (e.g., in FIG. 6DZ, device 6000B stops displaying tiles 6644-5 and 6644-6 in primary region 6170B-1 and instead displays tiles 6644-5 and 6644-6 in roster region 6170B-2) (and ceasing to display the one or more representations of participants of the video communication session in the third layout). Changing the layout of the one or more representations of participants of the video communication session in response to detecting the change in size and/or position of the dynamic visual content allows the computer system to automatically and dynamically optimize the layout of the representations without requiring a user to manually adjust the user interface of the video communication application, which provides improved visual feedback and reduces the number of inputs needed to perform an operation.

In some embodiments, displaying the one or more representations of participants of the video communication session in the second arrangement in the user interface of the video communication application includes the computer system (e.g., 6000) changing an aspect ratio (e.g., 1:1 (height to width), 1.25:1, 1.5:1, 1.75:1, or 2:1) of a first representation of a field-of-view of a camera associated with the computer system (e.g., 6000) (e.g., 6645A changes from FIG. 6DX to 6DY, or 6645B changes from FIG. 6DX to 6DY) (e.g., a representation in the video communication session of the user associated with the computer system; or a selfie view). (In some embodiments, the one or more representations of participants of the video communication session includes the first representation of the field of view of the camera associated with the computer system). Changing the aspect ratio of the one or more representations of participants of the video communication session in response to detecting the change in size and/or position of the dynamic visual content allows the computer system to automatically and dynamically optimize the proportions of the representations without requiring a user to manually adjust the user interface of the video communication application, which provides improved visual feedback and reduces the number of inputs needed to perform an operation.

In some embodiments, the computer system (e.g., 6000) receives (e.g., detecting via the one or more input devices) a request (e.g., 6668 or 6670) to change the position of the dynamic visual content (e.g., 6150B in FIGS. 6DZ and 6EA, or 6150A in FIGS. 6EA-6EC). In some embodiments, in response to receiving the request to change the position of the dynamic visual content: in accordance with a determination that the request to change the position of the dynamic visual content corresponds to a request to change the position of the dynamic visual content to a first position (e.g., the position on device 6000B in FIG. 6EA) (e.g., an allowable position), the computer system (e.g., 6000) displays the dynamic visual content at the first position (e.g., 6150B is moved to the position in FIG. 6EA). In some embodiments, in response to receiving the request to change the position of the dynamic visual content: in accordance with a determination that the request to change the position of the dynamic visual content corresponds to a request to change the position of the dynamic visual content to a second position (e.g., the position on device 6000A in FIG. 6EB) (e.g., a restricted or unallowable position; or a position that overlaps controls and/or a representation of the user of the computer system) that is different from the first position, the computer system (e.g., 6000) displays the dynamic visual content at a third position that is different from the second position (e.g., 6150A is moved to the position in FIG. 6EC). Displaying the dynamic visual content at a position that is different from a requested position (e.g., at the third position instead of the second position) based on where the dynamic visual content is requested to be moved allows the computer system to automatically avoid displaying the dynamic visual content in certain positions of the user interface of the video communication session that may contain content that is not desirable to move or obscure, which performs an operation when a set of conditions has been met without requiring further user input and provides improved visual feedback to the user. In some embodiments, the computer system does not allow the dynamic visual content to be displayed at, or moved to, certain positions or regions of the user interface of the video communication application. For example, if a user attempts to move the dynamic visual content to a restricted portion of the user interface of the video communication application, the computer system will maintain the position of the dynamic visual content or display the dynamic visual content at another position different from the requested position (e.g., an allowable position that is closest to the requested restricted position).

In some embodiments, the user interface of the video communication application includes: a first region (e.g., 6170A-1 or 6170B-1) that includes a first set of representations of participants of the video communication session (e.g., the one or more representations of participants of the video communication session; or a subset of the one or more representations of participants of the video communication session). In some embodiments, the user interface of the video communication application includes: a second region (e.g., 6170A-2 or 6170B-2) (e.g., a region that is visually distinct from the first region and/or does not overlap the first region) that includes a second set of representations of participants of the video communication session (e.g., a subset of the one or more representations of participants of the video communication session; or one or more representations of participants that are not represented by the one or more representations of participants of the video communication session). In some embodiments, the representations of the first set of representations are displayed at a larger size than the representations of the second set of representations (e.g., tiles 6642-1 and 6642-2 are larger than tiles 6642-3 to 6642-6 in FIG. 6EC) (e.g., tiles 6644-1 to 6644-4 are larger than tiles 6644-5 to 6644-6 in FIG. 6EB). In some embodiments, the second position corresponds to the second region of the user interface of the video communication application (e.g., the computer system does not allow the dynamic visual content to be displayed in the second region). Displaying the dynamic visual content at the third position instead of the second position when the second position corresponds to the second region allows the computer system to automatically avoid displaying the dynamic visual content in the second region of the user interface of the video communication session where the representations are smaller than in the first region and are thus more susceptible to being significantly (e.g., fully) obscured, which performs an operation when a set of conditions has been met without requiring further user input and provides improved visual feedback to the user. In some embodiments, the second set of representations correspond to participants of the video communication session that have a lower activity level (e.g., are less active or less recently active based on an amount and/or how recently the participants are talking and/or moving) than the participants of the video communication session corresponding to the first set of representations.

In some embodiments, the user interface of the video communication application includes a second representation (e.g., 6645A or 6645B in FIG. 6EE) of a field of view of a camera (e.g., 6002) associated with the computer system (e.g., 6000) (e.g., the representation in the video communication session of the user associated with the computer system; a selfie view). In some embodiments, the one or more representations of participants of the video communication session includes the second representation of the field of view of the camera associated with the computer system. In some embodiments, the second position corresponds to the second representation of the field of view of the camera associated with the computer system (e.g., 6000) (e.g., the computer system does not allow the dynamic visual content to be displayed overlapping the representation of the user of the computer system). Displaying the dynamic visual content at the third position instead of the second position when the second position corresponds to the second region allows the computer system to automatically avoid displaying the dynamic visual content at a position of a representation of the user of the computer system that may not be desirable to move or obscure, which thus performs an operation when a set of conditions has been met without requiring further user input and provides improved visual feedback to the user.

In some embodiments, the computer system (e.g., 6000) ceases to display (e.g., closing, minimizing, or hiding) the user interface of the video communication application (e.g., device 6000B closes interface 6170B in FIG. 6EK). In some embodiments, after (e.g., in response to) ceasing to display the user interface of the video communication application, the computer system (e.g., 6000) displays (e.g., continuing to display) the dynamic visual content (e.g., 6150B in FIG. 6EL) (e.g., overlaid on another user interface, such as, e.g., a home screen and/or one or more application windows (e.g., that were open in the background behind the user interface of the video communication application)). Displaying the dynamic visual content after ceasing to display the user interface of the video communication application allows the user to automatically continue viewing the dynamic visual content after, e.g., closing or minimizing the user interface of the video communication application to view other interfaces and/or perform functions associated with such interfaces without having to provide inputs to continue displaying the dynamic visual content, which reduces the number of inputs needed to perform an operation. In some embodiments, ceasing to display the user interface of the video communication application occurs in response to receiving (e.g., detecting) a request to cease to display the user interface of the video communication application. In some embodiments, displaying the dynamic visual content after ceasing to display the user interface of the video communication application includes displaying the dynamic visual content at the same position (e.g., maintaining the position of the dynamic visual content).

In some embodiments, the dynamic visual content includes content (e.g., 6150A or 6150B in FIG. 6CZ) that is included in a first shared-content session, wherein the first shared-content session includes one or more of the participants (e.g., 6172, 6174, 6176, or 6178) of the video communication session (e.g., the dynamic visual content is concurrently displayed at one or more external computer systems associated with respective participants of the video communication session (e.g., as discussed with respect to methods 700, 800, 900, 1000, 1100, 1200, 1300, 1500, 1600, and/or 1700). In some embodiments, the dynamic visual content includes content that is not included in a shared-content session. Concurrently displaying dynamic visual content that is included in a shared-content session with one or more representations of participants of the video communication session who are also participants of the shared-content session allows the user to view content concurrently with the other participants while also participating in a video communication session without switching between user interfaces, which reduces the number of inputs needed to perform an operation.

In some embodiments, while displaying, in the user interface of the video communication application, the dynamic visual content (e.g., content that is included in a shared-content session, where one or more participants of the video communication are participants of the shared-content session) and the one or more representations of participants of the video communication session (e.g., in the first arrangement or the second arrangement): the computer system (e.g., 6000) displays a shared-content session object (e.g., 6015) that includes information associated with a second shared-content session (e.g., where one or more participants of the video communication are participants of the shared-content session) and/or one or more selectable options that, when selected, cause the computer system (e.g., 6000) to perform a respective function associated with the second shared-content session or the video communication session. In some embodiments, while displaying, in the user interface of the video communication application, the dynamic visual content (e.g., 6150B in FIG. 6AS) (e.g., content that is included in a shared-content session, where one or more participants of the video communication are participants of the shared-content session) and the one or more representations of participants of the video communication session (e.g., 6176 and/or 6178) (e.g., in the first arrangement or the second arrangement): the computer system displays the shared-content session object, including displaying, via the one or more output generation components (e.g., 6001), the one or more representations of participants of the video communication session in a third arrangement (e.g., as shown on device 6000B in FIG. 6AS) in the user interface of the video communication application, wherein the third arrangement is different from the first arrangement and the second arrangement (e.g., as shown on device 6000B in FIG. 6AR) (and, optionally, is based on the display of the shared-content session object). Displaying the one or more representations of participants of the video communication session in a different arrangement when displaying the shared-content session object allows the computer system to automatically optimize display of the user interface upon display of the shared-content session object without requiring the user to manually adjust the user interface of the video communication application, which provides improved visual feedback and reduces the number of inputs needed to perform an operation.

In some embodiments, the shared-content session object (e.g., 6015) is displayed in response to detecting input, e.g., corresponding to selection (e.g., 6236) of the dynamic visual content (e.g., 6150). In some embodiments, displaying the one or more representations of participants of the video communication session in the third arrangement includes changing (e.g., decreasing) the size of one or more of the representations (e.g., 6176 or 6178) of participants of the video communication session, changing an aspect ratio of one or more of the representations of participants of the video communication session, and/or ceasing to display one or more of the representations of participants of the video communication session.

In some embodiments, the shared-content session object (e.g., 6015B) is displayed concurrently with (e.g., includes) a notification (e.g., 6230) that includes information related to the dynamic visual content (e.g., 6150B) (e.g., a name of the content, a title of the content, a playback status of the content, and/or a participant that initiated playback of the content). Displaying a notification that includes information related to the dynamic visual content concurrently with the shared-content session object allows the computer system to provide the user with contextually relevant information about the dynamic visual content, which provides improved visual feedback to the user.

In some embodiments, the shared-content session object (e.g., 6015) includes one or more selectable options (e.g., 6015-1, 6015-4, 6015-5, 6015-6, 6015-7, 6015-8, or 6015-9) that, when selected, cause the computer system (e.g., 6000) to perform a respective function associated with the shared-content session (e.g., to control the dynamic visual content) or the video communication session. Displaying one or more selectable options that, when selected, cause the computer system to perform a respective function associated with the shared-content session or the video communication session provides the user with additional functionality and control over the shared-content session and/or the video communication session, which provides additional control options without cluttering the user interface.

In some embodiments, after displaying the one or more representations of participants of the video communication session in the second arrangement in the user interface of the video communication application (e.g., 6170 in FIG. 6DY), and while the one or more representations of participants (e.g., 6642 or 6644 in FIG. 6DY) of the video communication session is displayed in a fourth arrangement (e.g., 6170 in FIG. 6DY) (e.g., the second arrangement): the computer system (e.g., 6000) detects a second change in size and/or position of the dynamic visual content that changes an amount of the user interface of the video communication application that is covered by the dynamic video content (e.g., displays 6150A or 6150B in FIG. 6DZ) (e.g., redisplays the dynamic visual content, resizes the dynamic visual content, moves the dynamic visual content, ceases to display the dynamic visual content, or redisplays the dynamic visual content after the dynamic visual content was hidden or minimized).

In some embodiments, after displaying the one or more representations of participants of the video communication session in the second arrangement in the user interface of the video communication application, and while the one or more representations of participants of the video communication session is displayed in a fourth arrangement (e.g., the second arrangement): in response to detecting the second change in size and/or position of the dynamic visual content, the computer system (e.g., 6000) displays, via the one or more output generation components (e.g., 6001), the one or more representations of participants of the video communication session in a fifth arrangement (e.g., the first arrangement) in the user interface of the video communication application (e.g., 6642 or 6644 in FIG. 6DZ), wherein the fifth arrangement is different from the fourth arrangement and is based on the second change in size and/or position of the dynamic visual content. Displaying the one or more representations of participants of the video communication session in a different arrangement in response to detecting the second change in size and/or position of the dynamic visual content allows the computer system to automatically revert to a previous arrangement or to a new arrangement based on further changes in size and/or position of the dynamic visual content without requiring the user to manually adjust the user interface of the video communication application, which provides improved visual feedback and reduces the number of inputs needed to perform an operation.

In some embodiments, the computer system (e.g., 6000) detects a change in the video communication session (e.g., expanding 6645A or 6645B in FIG. 6EE) (e.g., expanding a representation of a participant of the video communication session or expanding a representation of a field of view of a camera associated with the computer system). In some embodiments, in response to detecting the change in the video communication session, the computer system (e.g., 6000) displays (e.g., moving the display of), via the one or more output generation components (e.g., 6001), the dynamic visual content in accordance with the change in the video communication session (e.g., 6150A and/or 6150B move from the displayed position in FIG. 6ED to the displayed position in FIG. 6EE). Displaying the dynamic visual content in accordance with the change in the video communication session in response to detecting the change in the video communication session allows the computer system to automatically adapt the dynamic visual content based on changes in the video communication session without requiring the user to manually adjust the dynamic visual content, which provides improved visual feedback and reduces the number of inputs needed to perform an operation.

In some embodiments, while the computer system (e.g., 6000) is connected to an active shared-content session that includes the dynamic visual content: in accordance with a determination that the dynamic visual content is not visible (e.g., 6150A and/or 6150B docked and minimized in FIG. 6DY) (e.g., the dynamic visual content is minimized or the computer system is not performing (e.g., has stopped) playback of the dynamic visual content), the computer system (e.g., 6000) displays, in the user interface of the video communication application, a third representation of a field of view of a camera associated with the computer system (e.g., 6000) with a first aspect ratio (e.g., 6645A and/or 6645B displayed in an elongated shape). In some embodiments, in accordance with a determination that the dynamic visual content is visible (e.g., 6150A and/or 6150B undocked in FIG. 6DX), the computer system (e.g., 6000) displays, in the user interface of the video communication application, the third representation of a field of view of a camera associated with the computer system (e.g., 6000) with a second aspect ratio that is different from the first aspect ratio (e.g., 6645A and/or 6645B is displayed in a square shape in FIG. 6DX). Selectively displaying the third representation of a field of view of a camera associated with the computer system with a first aspect ratio or a second aspect ratio based on whether or not the dynamic visual content is visible allows the computer system to automatically select the aspect ratio of the dynamic visual content based on the context, which performs an operation when a set of conditions has been met without requiring further user input.

Note that details of the processes described above with respect to method 1800 (e.g., FIG. 18) are also applicable in an analogous manner to the methods described above. For example, method 700, 800, 900, 1000, 1100, 1200, 1300, 1500, 1600, and/or 1700 optionally includes one or more of the characteristics of the various methods described above with reference to method 1800. For brevity, these details are not repeated.

The various embodiments provided herein are generally described using devices 6000 and 1400. However, it should be appreciated that other computer systems or devices can be used (in addition to, or in lieu of, devices 6000/1400) to participate in a shared-content session, and that various aspects of a shared-content session can be implemented in different manners across the various devices participating in the shared-content session. For example, a smart speaker, optionally including a display component, can be used to participate in a shared-content session. In some embodiments, inputs at the smart speaker can be provided verbally and, optionally, via a touch input, and outputs can be audio outputs and, optionally, visual outputs provided at a connected display component. As another example, a display component of a head-mounted device (HMD) can be used to display visual aspects of the shared-content session (and a speaker used to produce audio), and inputs can be received by detecting gestures, eye gaze, hand movements, audio inputs, touch inputs, or the like. In some embodiments, the user interfaces depicted in the figures can be displayed in an extended reality environment such as augmented reality or virtual reality. For example, video tiles, windows, and/or other display regions shown in the figures can be displayed suspended in a three-dimensional environment. As another example, the representations of users or participants can be displayed as simulated three-dimensional avatars or two-dimensional avatars positioned around a three-dimensional environment rather than video tiles or windows in a video conference application. Additionally, embodiments are described herein using various types of inputs such as taps, drags, clicks, and hover gestures, however, it should be appreciated that the described embodiments can be modified to respond to other forms of input including gestures, eye gaze, hand movements, audio inputs, and the like. Additionally, different devices with different capabilities can be combined in a single shared-content session, for example a smartphone, tablet, laptop computer, desktop computer, smart speaker, smart TV, headphones or earbuds, HMD, and/or smart watch (or a subset thereof) could participate in the same shared-content session with the different devices participating in different manners according to the capabilities of the device (e.g., the HMD presenting content in a simulated three-dimensional environment or an augmented reality environment, the smart speaker providing audio outputs and inputs, the headphones providing spatial audio outputs and audio inputs, the laptop and desktop computers, smartphone and tablet providing audio and visual inputs and outputs, the smart TV providing audio and visual outputs and audio inputs (or audio and visual inputs)).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of content for a shared-content session. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in some embodiments, the present technology can be configured to allow users to select to "opt in" or "opt out" of participation in the collection of personal information data during registration for services or anytime thereafter. In another example, the present technology can be configured to allow users to prevent sharing of the personal information that may appear on the user's screen (e.g., such as in a screen-sharing embodiment). In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A computer system that is configured to communicate with one or more output generation components and one or more input devices, the computer system comprising:

one or more processors; and memory storing one or more programs configured to be executed by the one or more processors, the one or more programs including instructions for:

while a shared-content session between the computer system and an external computer system is active, wherein the shared-content session corresponds to a first application:

receiving first data associated with a request from a user of the external computer system to add first content to the shared-content session between the external computer system and the computer system, wherein the request indicates that the first content is being output at the external computer system; and in response to receiving the first data associated with the request to add the first content to the shared-content session:

in accordance with a determination that content output criteria are met based on whether the first content is available to be output by the computer system in a predetermined manner, outputting, via an output generation component of the one or more output generation components, a notification that the first content has been added to the shared-content session and outputting the first content, wherein the first content is output at the computer system using a second application that is different from the first application associated with the shared-content session, wherein the second application is configured to output respective content, including the first content, without regard to whether the shared-content session is active or inactive, and wherein the second application is configured to continue outputting the first content at the computer system subsequent to the external computer system disconnecting from the shared-content session between the computer system and the external computer system; and in accordance with a determination that the content output criteria are not met, outputting, via the output generation component of the one or more output generation components, a notification that the first content has been added to the shared-content session without outputting the first content at the computer system, wherein the notification is selectable to display a set of controls for the shared-content session and information about the content output criteria.

2. The computer system of claim 1, wherein outputting the first content includes outputting the first content in a window of the second application that is overlaid on a portion of a user interface that is concurrently output by an output generation component of the one or more output generation components.

3. The computer system of claim 1, wherein the content output criteria are based on whether the second application is available on the computer system.

4. The computer system of claim 1, wherein the content output criteria are based on whether the computer system can access a subscription service that provides access to the first content.

5. The computer system of claim 1, wherein the content output criteria are based on whether the second application that is used to output the first content is configured to output the first content in a picture-in-picture window.

6. The computer system of claim 1, wherein the content output criteria are based on a type of content sharing.

7. The computer system of claim 1, wherein outputting the first content includes:

outputting the first content at a first quality when the first content is added to the shared-content session according to a first type of content sharing, and outputting the first content at a second quality that is different from the first quality when the first content is added to the shared-content session according to a second type of content sharing.

8. The computer system of claim 1, the one or more programs further including instructions for:

in response to detecting selection of the notification, displaying the set of controls for the shared-content session and information about the content output criteria.

9. The computer system of claim 8, wherein the information about the content output criteria includes a selectable download option that, when selected, initiates a process to download the second application.

10. The computer system of claim 8, wherein the information about the content output criteria includes a selectable subscription option that, when selected, initiates a process to obtain a subscription that provides access to the first content.

11. The computer system of claim 1, the one or more programs further including instructions for:

detecting an input corresponding to selection of the notification that the first content has been added to the shared-content session; and in response to detecting the input corresponding to selection of the notification that the first content has been added to the shared-content session, displaying a user interface that provides a capability to obtain the second application.

12. The computer system of claim 11, wherein displaying the user interface that provides a capability to obtain the second application includes displaying a selectable download option that, when selected, initiates a process for downloading the second application.

13. The computer system of claim 1, the one or more programs further including instructions for:

while the shared-content session is active and after ceasing output of the first content, detecting a request to rejoin the shared-content session; and in response to detecting the request to rejoin the shared-content session, outputting the first content.

14. The computer system of claim 13, wherein the request to output the first content includes selection of an output content option included in a shared-content session object that includes information associated with the shared-content session and/or one or more selectable shared-content session function options that, when selected, cause the computer system to perform a respective function associated with the shared-content session.

15. The computer system of claim 13, wherein ceasing output of the first content occurs in response to receiving an incoming call.

16. The computer system of claim 13, wherein ceasing output of the first content occurs in response to detecting a request to output content that cannot be added to the shared-content session.

17. The computer system of claim 16, the one or more programs further including instructions for:

while outputting the first content, detecting a request to play second content that cannot be added to the shared-content session;

in response to detecting the request to play the second content, initiating a process for playing the second content;

after playing at least a portion of the second content, ceasing to play the second content; and after ceasing to play the second content, in accordance with a determination that the shared-content session is ongoing, displaying a selectable output content notification that, when selected, initiates a process to output respective content that is currently playing in the shared-content session.

18. The computer system of claim 17, the one or more programs further including instructions for:

after ceasing to play the second content, in accordance with a determination that the shared-content session is no longer ongoing, forgoing displaying the selectable output content notification that, when selected, initiates a process to output respective content that is currently playing in the shared-content session.

19. The computer system of claim 1, the one or more programs further including instructions for:

while the shared-content session between the computer system and the external computer system is inactive:

receiving, via the one or more input devices, a request to output the first content using the second application; and in response to receiving the request to output the first content using the second application:

in accordance with a determination that the content output criteria are met, outputting, via the output generation component of the one or more output generation components, the first content using the second application; and in accordance with a determination that the content output criteria are not met, forgoing outputting the first content using the second application.

20. A non-transitory computer-readable storage medium storing one or more programs configured to be executed by one or more processors of a computer system that is in communication with one or more output generation components and one or more input devices, the one or more programs including instructions for:

while a shared-content session between the computer system and an external computer system is active, wherein the shared-content session corresponds to a first application:

receiving first data associated with a request from a user of the external computer system to add first content to the shared-content session between the external computer system and the computer system, wherein the request indicates that the first content is being output at the external computer system; and in response to receiving the first data associated with the request to add the first content to the shared-content session:

in accordance with a determination that content output criteria are met based on whether the first content is available to be output by the computer system in a predetermined manner, outputting, via an output generation component of the one or more output generation components, a notification that the first content has been added to the shared-content session and outputting the first content, wherein the first content is output at the computer system using a second application that is different from the first application associated with the shared-content session, wherein the second application is configured to output respective content, including the first content, without regard to whether the shared-content session is active or inactive, and wherein the second application is configured to continue outputting the first content at the computer system subsequent to the external computer system disconnecting from the shared-content session between the computer system and the external computer system; and in accordance with a determination that the content output criteria are not met, outputting, via the output generation component of the one or more output generation components, a notification that the first content has been added to the shared-content session without outputting the first content at the computer system, wherein the notification is selectable to display a set of controls for the shared-content session and information about the content output criteria.

21. The non-transitory computer-readable storage medium of claim 19, wherein outputting the first content includes outputting the first content in a window of the second application that is overlaid on a portion of a user interface that is concurrently output by an output generation component of the one or more output generation components.

22. The non-transitory computer-readable storage medium of claim 19, wherein the content output criteria are based on whether the second application is available on the computer system.

23. The non-transitory computer-readable storage medium of claim 19, wherein the content output criteria are based on whether the computer system can access a subscription service that provides access to the first content.

24. The non-transitory computer-readable storage medium of claim 19, wherein the content output criteria are based on whether the second application that is used to output the first content is configured to output the first content in a picture-in-picture window.

25. The non-transitory computer-readable storage medium of claim 19, wherein the content output criteria are based on a type of content sharing.

26. The non-transitory computer-readable storage medium of claim 19, wherein outputting the first content includes:

outputting the first content at a first quality when the first content is added to the shared-content session according to a first type of content sharing, and outputting the first content at a second quality that is different from the first quality when the first content is added to the shared-content session according to a second type of content sharing.

27. The non-transitory computer-readable storage medium of claim 19, the one or more programs further including instructions for:

in response to detecting selection of the notification, displaying the set of controls for the shared-content session and information about the content output criteria.

28. The non-transitory computer-readable storage medium of claim 27, wherein the information about the content output criteria includes a selectable download option that, when selected, initiates a process to download the second application.

29. The non-transitory computer-readable storage medium of claim 27, wherein the information about the content output criteria includes a selectable subscription option that, when selected, initiates a process to obtain a subscription that provides access to the first content.

30. The non-transitory computer-readable storage medium of claim 19, the one or more programs further including instructions for:

detecting an input corresponding to selection of the notification that the first content has been added to the shared-content session; and in response to detecting the input corresponding to selection of the notification that the first content has been added to the shared-content session, displaying a user interface that provides a capability to obtain the second application.

31. The non-transitory computer-readable storage medium of claim 30, wherein displaying the user interface that provides a capability to obtain the second application includes displaying a selectable download option that, when selected, initiates a process for downloading the second application.

32. The non-transitory computer-readable storage medium of claim 19, the one or more programs further including instructions for:

while the shared-content session is active and after ceasing output of the first content, detecting a request to rejoin the shared-content session; and in response to detecting the request to rejoin the shared-content session, outputting the first content.

33. The non-transitory computer-readable storage medium of claim 32, wherein the request to output the first content includes selection of an output content option included in a shared-content session object that includes information associated with the shared-content session and/or one or more selectable shared-content session function options that, when selected, cause the computer system to perform a respective function associated with the shared-content session.

34. The non-transitory computer-readable storage medium of claim 32, wherein ceasing output of the first content occurs in response to receiving an incoming call.

35. The non-transitory computer-readable storage medium of claim 32, wherein ceasing output of the first content occurs in response to detecting a request to output content that cannot be added to the shared-content session.

36. The non-transitory computer-readable storage medium of claim 35, the one or more programs further including instructions for:

while outputting the first content, detecting a request to play second content that cannot be added to the shared-content session;

in response to detecting the request to play the second content, initiating a process for playing the second content;

after playing at least a portion of the second content, ceasing to play the second content; and after ceasing to play the second content, in accordance with a determination that the shared-content session is ongoing, displaying a selectable output content notification that, when selected, initiates a process to output respective content that is currently playing in the shared-content session.

37. The non-transitory computer-readable storage medium of claim 36, the one or more programs further including instructions for:

after ceasing to play the second content, in accordance with a determination that the shared-content session is no longer ongoing, forgoing displaying the selectable output content notification that, when selected, initiates a process to output respective content that is currently playing in the shared-content session.

38. The non-transitory computer-readable storage medium of claim 20, the one or more programs further including instructions for:

while the shared-content session between the computer system and the external computer system is inactive:

receiving, via the one or more input devices, a request to output the first content using the second application; and in response to receiving the request to output the first content using the second application:

in accordance with a determination that the content output criteria are met, outputting, via the output generation component of the one or more output generation components, the first content using the second application; and in accordance with a determination that the content output criteria are not met, forgoing outputting the first content using the second application.

39. A method, comprising:

at a computer system that is in communication with one or more output generation components and one or more input devices:

while a shared-content session between the computer system and an external computer system is active, wherein the shared-content session corresponds to a first application:

receiving first data associated with a request from a user of the external computer system to add first content to the shared-content session between the external computer system and the computer system, wherein the request indicates that the first content is being output at the external computer system; and in response to receiving the first data associated with the request to add the first content to the shared-content session:

in accordance with a determination that content output criteria are met based on whether the first content is available to be output by the computer system in a predetermined manner, outputting, via an output generation component of the one or more output generation components, a notification that the first content has been added to the shared-content session and outputting the first content, wherein the first content is output at the computer system using a second application that is different from the first application associated with the shared-content session, wherein the second application is configured to output respective content, including the first content, without regard to whether the shared-content session is active or inactive, and wherein the second application is configured to continue outputting the first content at the computer system subsequent to the external computer system disconnecting from the shared-content session between the computer system and the external computer system; and in accordance with a determination that the content output criteria are not met, outputting, via the output generation component of the one or more output generation components, a notification that the first content has been added to the shared-content session without outputting the first content at the computer system, wherein the notification is selectable to display a set of controls for the shared-content session and information about the content output criteria.

40. The method of claim 39, wherein outputting the first content includes outputting the first content in a window of the second application that is overlaid on a portion of a user interface that is concurrently output by an output generation component of the one or more output generation components.

41. The method of claim 39, wherein the content output criteria are based on whether the second application is available on the computer system.

42. The method of claim 39, wherein the content output criteria are based on whether the computer system can access a subscription service that provides access to the first content.

43. The method of claim 39, wherein the content output criteria are based on whether the second application that is used to output the first content is configured to output the first content in a picture-in-picture window.

44. The method of claim 39, wherein the content output criteria are based on a type of content sharing.

45. The method of claim 39, wherein outputting the first content includes:

outputting the first content at a first quality when the first content is added to the shared-content session according to a first type of content sharing, and outputting the first content at a second quality that is different from the first quality when the first content is added to the shared-content session according to a second type of content sharing.

46. The method of claim 39, further comprising:

in response to detecting selection of the notification, displaying the set of controls for the shared-content session and information about the content output criteria.

47. The method of claim 46, wherein the information about the content output criteria includes a selectable download option that, when selected, initiates a process to download the second application.

48. The method of claim 46, wherein the information about the content output criteria includes a selectable subscription option that, when selected, initiates a process to obtain a subscription that provides access to the first content.

49. The method of claim 39, further comprising:

detecting an input corresponding to selection of the notification that the first content has been added to the shared-content session; and in response to detecting the input corresponding to selection of the notification that the first content has been added to the shared-content session, displaying a user interface that provides a capability to obtain the second application.

50. The method of claim 49, wherein displaying the user interface that provides a capability to obtain the second application includes displaying a selectable download option that, when selected, initiates a process for downloading the second application.

51. The method of claim 39, further comprising:

while the shared-content session is active and after ceasing output of the first content, detecting a request to rejoin the shared-content session; and in response to detecting the request to rejoin the shared-content session, outputting the first content.

52. The method of claim 51, wherein the request to output the first content includes selection of an output content option included in a shared-content session object that includes information associated with the shared-content session and/or one or more selectable shared-content session function options that, when selected, cause the computer system to perform a respective function associated with the shared-content session.

53. The method of claim 51, wherein ceasing output of the first content occurs in response to receiving an incoming call.

54. The method of claim 51, wherein ceasing output of the first content occurs in response to detecting a request to output content that cannot be added to the shared-content session.

55. The method of claim 54, further comprising:

while outputting the first content, detecting a request to play second content that cannot be added to the shared-content session;

in response to detecting the request to play the second content, initiating a process for playing the second content;

after playing at least a portion of the second content, ceasing to play the second content; and after ceasing to play the second content, in accordance with a determination that the shared-content session is ongoing, displaying a selectable output content notification that, when selected, initiates a process to output respective content that is currently playing in the shared-content session.

56. The method of claim 55, further comprising:

after ceasing to play the second content, in accordance with a determination that the shared-content session is no longer ongoing, forgoing displaying the selectable output content notification that, when selected, initiates a process to output respective content that is currently playing in the shared-content session.

57. The method of claim 39, further comprising:

while the shared-content session between the computer system and the external computer system is inactive:

receiving, via the one or more input devices, a request to output the first content using the second application; and in response to receiving the request to output the first content using the second application:

in accordance with a determination that the content output criteria are met, outputting, via the output generation component of the one or more output generation components, the first content using the second application; and in accordance with a determination that the content output criteria are not met, forgoing outputting the first content using the second application.

* * * * *